US011727392B2

(12) United States Patent
Shrivastava

(10) Patent No.: US 11,727,392 B2
(45) Date of Patent: Aug. 15, 2023

(54) MULTI-PURPOSE VIRTUAL CARD TRANSACTION APPARATUSES, METHODS AND SYSTEMS

(71) Applicant: Visa International Service Association, San Francisco, CA (US)

(72) Inventor: Abhinav Shrivastava, Redmond, WA (US)

(73) Assignee: Visa International Service Association, San Francisco, CA (US)

( * ) Notice: Subject to any disclaimer, the term of this patent is extended or adjusted under 35 U.S.C. 154(b) by 68 days.

(21) Appl. No.: 16/912,639

(22) Filed: Jun. 25, 2020

(65) Prior Publication Data

US 2020/0327538 A1 Oct. 15, 2020

Related U.S. Application Data

(63) Continuation of application No. 13/938,176, filed on Jul. 9, 2013, now abandoned, which is a
(Continued)

(51) Int. Cl.
*G06Q 20/36* (2012.01)
*G06Q 20/12* (2012.01)
(Continued)

(52) U.S. Cl.
CPC ......... *G06Q 20/3674* (2013.01); *G06Q 20/02* (2013.01); *G06Q 20/12* (2013.01);
(Continued)

(58) Field of Classification Search
USPC ........................................................... 705/41
See application file for complete search history.

(56) References Cited

U.S. PATENT DOCUMENTS 5,613,012 A 3/1997 Hoffman et al.
5,781,438 A 7/1998 Lee et al.
(Continued)

OTHER PUBLICATIONS

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.
(Continued)

*Primary Examiner* — Ambreen A. Alladin
(74) *Attorney, Agent, or Firm* — Kilpatrick Townsend & Stockton LLP

(57) ABSTRACT

The MULTI-PURPOSE VIRTUAL CARD TRANSACTION APPARATUSES, METHODS AND SYSTEMS ("WIP") transform wallet in proxy card generation requests and purchase inputs via WIP components into wallet in proxy card generation notifications and wallet in proxy card-based transaction purchase notifications. In one implementation, the WIP server may receive a transaction authentication request associated with a proxy payment identifier, and then determine that the proxy payment identifier is associated with an electronic wallet. The WIP sever may further obtain a payment identifier associated with the electronic wallet, and authenticate the transaction using the obtained payment identifier associated with the electronic wallet.

14 Claims, 165 Drawing Sheets

Example Data Flow: WIP Wallet Card Selection Transaction

Related U.S. Application Data continuation-in-part of application No. 13/624,859, filed on Sep. 21, 2012, now abandoned, which is a continuation-in-part of application No. 13/520,481, filed as application No. PCT/US2012/026205 on Feb. 22, 2012, now Pat. No. 10,223,691, which is a continuation-in-part of application No. 13/398,817, filed on Feb. 16, 2012, now abandoned, and a continuation-in-part of application No. 13/348,634, filed on Jan. 11, 2012, now abandoned.

(60) Provisional application No. 61/669,525, filed on Jul. 9, 2012, provisional application No. 61/545,971, filed on Oct. 11, 2011, provisional application No. 61/539,969, filed on Sep. 27, 2011, provisional application No. 61/538,761, filed on Sep. 23, 2011, provisional application No. 61/473,728, filed on Apr. 8, 2011, provisional application No. 61/469,965, filed on Mar. 31, 2011, provisional application No. 61/466,409, filed on Mar. 22, 2011, provisional application No. 61/445,482, filed on Feb. 22, 2011.

(51) Int. Cl.

| | |
|---|---|
| ***G06Q 20/02*** | (2012.01) |
| ***G06Q 20/40*** | (2012.01) |
| ***G06Q 20/42*** | (2012.01) |
| ***G06Q 20/34*** | (2012.01) |

(52) U.S. Cl.
CPC ........... *G06Q 20/351* (2013.01); *G06Q 20/36* (2013.01); *G06Q 20/407* (2013.01); *G06Q 20/42* (2013.01)

(56) References Cited

U.S. PATENT DOCUMENTS

| | | | |
|---|---|---|---|
| 5,883,810 | A | 3/1999 | Franklin et al. |
| 5,953,710 | A | 9/1999 | Fleming |
| 5,956,699 | A | 9/1999 | Wong et al. |
| 6,000,832 | A | 12/1999 | Franklin et al. |
| 6,014,635 | A | 1/2000 | Harris et al. |
| 6,044,360 | A | 3/2000 | Picciallo |
| 6,163,771 | A | 12/2000 | Walker et al. |
| 6,227,447 | B1 | 5/2001 | Campisano |
| 6,236,981 | B1 | 5/2001 | Hill |
| 6,341,724 | B2 | 1/2002 | Campisano |
| 6,385,596 | B1 | 5/2002 | Wiser et al. |
| 6,422,462 | B1 | 7/2002 | Cohen |
| 6,425,523 | B1 | 7/2002 | Shem-Ur et al. |
| 6,592,044 | B1 | 7/2003 | Wong et al. |
| 6,636,833 | B1 | 10/2003 | Flitcroft et al. |
| 6,748,367 | B1 | 6/2004 | Lee |
| 6,805,287 | B2 | 10/2004 | Bishop et al. |
| 6,879,965 | B2 | 4/2005 | Fung et al. |
| 6,891,953 | B1 | 5/2005 | DeMello et al. |
| 6,901,387 | B2 | 5/2005 | Wells et al. |
| 6,931,382 | B2 | 8/2005 | Laage et al. |
| 6,938,019 | B1 | 8/2005 | Uzo |
| 6,941,285 | B2 | 9/2005 | Sarcanin |
| 6,980,670 | B1 | 12/2005 | Hoffman et al. |
| 6,990,470 | B2 | 1/2006 | Hogan et al. |
| 6,991,157 | B2 | 1/2006 | Bishop et al. |
| 7,051,929 | B2 | 5/2006 | Li |
| 7,069,249 | B2 | 6/2006 | Stolfo et al. |
| 7,103,576 | B2 | 9/2006 | Mann, III et al. |
| 7,113,930 | B2 | 9/2006 | Eccles et al. |
| 7,136,835 | B1 | 11/2006 | Flitcroft et al. |
| 7,177,835 | B1 | 2/2007 | Walker et al. |
| 7,209,561 | B1 | 4/2007 | Shankar et al. |
| 7,264,154 | B2 | 9/2007 | Harris |
| 7,287,692 | B1 | 10/2007 | Patel et al. |
| 7,292,999 | B2 | 11/2007 | Hobson et al. |
| 7,350,230 | B2 | 3/2008 | Forrest |
| 7,353,382 | B2 | 4/2008 | Labrou et al. |
| 7,379,919 | B2 | 5/2008 | Hogan et al. |
| RE40,444 | E | 7/2008 | Linehan |
| 7,415,443 | B2 | 8/2008 | Hobson et al. |
| 7,444,676 | B1 | 10/2008 | Asghari-Kamrani et al. |
| 7,469,151 | B2 | 12/2008 | Khan et al. |
| 7,548,889 | B2 | 6/2009 | Bhambri et al. |
| 7,567,934 | B2 | 7/2009 | Flitcroft et al. |
| 7,567,936 | B1 | 7/2009 | Peckover et al. |
| 7,571,142 | B1 | 8/2009 | Flitcroft et al. |
| 7,580,898 | B2 | 8/2009 | Brown et al. |
| 7,584,153 | B2 | 9/2009 | Brown et al. |
| 7,593,896 | B1 | 9/2009 | Flitcroft et al. |
| 7,606,560 | B2 | 10/2009 | Labrou et al. |
| 7,627,531 | B2 | 12/2009 | Breck et al. |
| 7,627,895 | B2 | 12/2009 | Gifford et al. |
| 7,650,314 | B1 | 1/2010 | Saunders |
| 7,685,037 | B2 | 3/2010 | Reiners et al. |
| 7,702,578 | B2 | 4/2010 | Fung et al. |
| 7,707,120 | B2 | 4/2010 | Dominguez et al. |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II et al. |
| 7,784,685 | B1 | 8/2010 | Hopkins, III |
| 7,793,851 | B2 | 9/2010 | Mullen |
| 7,801,826 | B2 | 9/2010 | Labrou et al. |
| 7,805,376 | B2 | 9/2010 | Smith |
| 7,805,378 | B2 | 9/2010 | Berardi et al. |
| 7,818,264 | B2 | 10/2010 | Hammad |
| 7,828,220 | B2 | 11/2010 | Mullen |
| 7,835,960 | B2 | 11/2010 | Breck et al. |
| 7,841,523 | B2 | 11/2010 | Oder, II et al. |
| 7,841,539 | B2 | 11/2010 | Hewton |
| 7,844,550 | B2 | 11/2010 | Walker et al. |
| 7,848,980 | B2 | 12/2010 | Carlson |
| 7,849,020 | B2 | 12/2010 | Johnson |
| 7,853,529 | B1 | 12/2010 | Walker et al. |
| 7,853,995 | B2 | 12/2010 | Chow et al. |
| 7,865,414 | B2 | 1/2011 | Fung et al. |
| 7,873,579 | B2 | 1/2011 | Hobson et al. |
| 7,873,580 | B2 | 1/2011 | Hobson et al. |
| 7,890,393 | B2 | 2/2011 | Talbert et al. |
| 7,891,563 | B2 | 2/2011 | Oder, II et al. |
| 7,896,238 | B2 | 3/2011 | Fein et al. |
| 7,908,216 | B1 | 3/2011 | Davis et al. |
| 7,922,082 | B2 | 4/2011 | Muscato |
| 7,931,195 | B2 | 4/2011 | Mullen |
| 7,937,324 | B2 | 5/2011 | Patterson |
| 7,938,318 | B2 | 5/2011 | Fein et al. |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders et al. |
| 8,046,256 | B2 | 10/2011 | Chien et al. |
| 8,060,448 | B2 | 11/2011 | Jones |
| 8,060,449 | B1 | 11/2011 | Zhu |
| 8,074,877 | B2 | 12/2011 | Mullen et al. |
| 8,074,879 | B2 | 12/2011 | Harris |
| 8,082,210 | B2 | 12/2011 | Hansen et al. |
| 8,095,113 | B2 | 1/2012 | Kean et al. |
| 8,104,679 | B2 | 1/2012 | Brown |
| RE43,157 | E | 2/2012 | Bishop et al. |
| 8,109,436 | B1 | 2/2012 | Hopkins, III |
| 8,121,942 | B2 | 2/2012 | Carlson et al. |
| 8,121,956 | B2 | 2/2012 | Carlson et al. |
| 8,126,449 | B2 | 2/2012 | Beenau et al. |
| 8,171,525 | B1 | 5/2012 | Pelly et al. |
| 8,175,973 | B2 | 5/2012 | Davis et al. |
| 8,190,523 | B2 | 5/2012 | Patterson |
| 8,196,813 | B2 | 6/2012 | Vadhri |
| 8,205,791 | B2 | 6/2012 | Randazza et al. |
| 8,219,489 | B2 | 7/2012 | Patterson |
| 8,225,385 | B2 | 7/2012 | Chow et al. |
| 8,229,852 | B2 | 7/2012 | Carlson |
| 8,265,993 | B2 | 9/2012 | Chien et al. |
| 8,281,991 | B2 | 10/2012 | Wentker et al. |
| 8,328,095 | B2 | 12/2012 | Oder, II et al. |

(56) References Cited

U.S. PATENT DOCUMENTS 8,336,088 B2 12/2012 Raj et al.
8,346,666 B2 1/2013 Lindelsee et al.
8,376,225 B1 2/2013 Hopkins, III
8,387,873 B2 3/2013 Saunders et al.
8,401,539 B2 3/2013 Beenau et al.
8,401,898 B2 3/2013 Chien et al.
8,402,555 B2 3/2013 Grecia
8,403,211 B2 3/2013 Brooks et al.
8,412,623 B2 4/2013 Moon et al.
8,412,837 B1 4/2013 Emigh et al.
8,417,642 B2 4/2013 Oren
8,433,116 B2 4/2013 Butler et al.
8,447,699 B2 5/2013 Batada et al.
8,453,223 B2 5/2013 Svigals et al.
8,453,925 B2 6/2013 Fisher et al.
8,458,487 B1 6/2013 Palgon et al.
8,484,134 B2 7/2013 Hobson et al.
8,485,437 B2 7/2013 Mullen et al.
8,494,959 B2 7/2013 Hathaway et al.
8,498,908 B2 7/2013 Mengerink et al.
8,504,475 B2 8/2013 Brand et al.
8,504,478 B2 8/2013 Saunders et al.
8,510,816 B2 8/2013 Quach et al.
8,533,860 B1 9/2013 Grecia
8,538,845 B2 9/2013 Liberty
8,555,079 B2 10/2013 Shablygin et al.
8,566,168 B1 10/2013 Bierbaum et al.
8,571,939 B2 10/2013 Lindsey et al.
8,577,336 B2 11/2013 Mechaley, Jr.
8,577,803 B2 11/2013 Chatterjee et al.
8,577,813 B2 11/2013 Weiss
8,578,176 B2 11/2013 Mattsson
8,583,494 B2 11/2013 Fisher
8,584,251 B2 11/2013 McGuire et al.
8,589,237 B2 11/2013 Fisher
8,589,271 B2 11/2013 Evans
8,589,291 B2 11/2013 Carlson et al.
8,595,098 B2 11/2013 Starai et al.
8,595,812 B2 11/2013 Bomar et al.
8,595,850 B2 11/2013 Spies et al.
8,606,638 B2 12/2013 Dragt
8,606,700 B2 12/2013 Carlson et al.
8,606,720 B1 12/2013 Baker et al.
8,615,468 B2 12/2013 Varadarajan
8,620,754 B2 12/2013 Fisher
8,635,157 B2 1/2014 Smith et al.
8,646,059 B1 2/2014 Von Behren et al.
8,651,374 B2 2/2014 Brabson et al.
8,656,180 B2 2/2014 Shablygin et al.
8,751,391 B2 6/2014 Freund
8,762,263 B2 6/2014 Gauthier et al.
8,793,186 B2 7/2014 Patterson
8,838,982 B2 9/2014 Carlson et al.
8,856,539 B2 10/2014 Weiss
8,887,308 B2 11/2014 Grecia
9,065,643 B2 6/2015 Hurry et al.
9,070,129 B2 6/2015 Sheets et al.
9,100,826 B2 8/2015 Weiss
9,160,741 B2 10/2015 Wentker et al.
9,229,964 B2 1/2016 Stevelinck
9,245,267 B2 1/2016 Singh
9,249,241 B2 2/2016 Dai et al.
9,256,871 B2 2/2016 Anderson et al.
9,280,765 B2 3/2016 Hammad
9,530,137 B2 12/2016 Weiss
9,552,584 B1* 1/2017 Bierbaum .......... G06Q 20/3263
2001/0029485 A1 10/2001 Brody et al.
2001/0034720 A1 10/2001 Armes
2001/0054003 A1 12/2001 Chien et al.
2002/0007320 A1 1/2002 Hogan et al.
2002/0016749 A1 2/2002 Borecki et al.
2002/0029193 A1 3/2002 Ranjan et al.
2002/0035548 A1 3/2002 Hogan et al.
2002/0073045 A1 6/2002 Rubin et al.
2002/0116341 A1 8/2002 Hogan et al.
2002/0133467 A1 9/2002 Hobson et al.
2002/0147913 A1 10/2002 Lun Yip
2003/0055785 A1* 3/2003 Lahiri .................. G06Q 20/403
705/41
2003/0130955 A1 7/2003 Hawthorne
2003/0191709 A1 10/2003 Elston et al.
2003/0191945 A1 10/2003 Keech
2004/0010462 A1 1/2004 Moon et al.
2004/0050928 A1 3/2004 Bishop et al.
2004/0059682 A1 3/2004 Hasumi et al.
2004/0093281 A1 5/2004 Silverstein et al.
2004/0139008 A1 7/2004 Mascavage, III
2004/0143532 A1 7/2004 Lee
2004/0158532 A1 8/2004 Breck et al.
2004/0210449 A1 10/2004 Breck et al.
2004/0210498 A1 10/2004 Freund
2004/0232225 A1 11/2004 Bishop et al.
2004/0260646 A1 12/2004 Berardi et al.
2005/0080730 A1 4/2005 Sorrentino
2005/0108178 A1 5/2005 York
2005/0199709 A1 9/2005 Linlor
2005/0246293 A1 11/2005 Ong
2005/0269401 A1 12/2005 Spitzer et al.
2005/0269402 A1 12/2005 Spitzer et al.
2006/0235795 A1 10/2006 Johnson et al.
2006/0237528 A1 10/2006 Bishop et al.
2006/0278704 A1 12/2006 Saunders et al.
2007/0107044 A1 5/2007 Yuen et al.
2007/0129955 A1 6/2007 Dalmia et al.
2007/0136193 A1 6/2007 Starr
2007/0136211 A1 6/2007 Brown et al.
2007/0170247 A1 7/2007 Friedman
2007/0179885 A1 8/2007 Bird et al.
2007/0208671 A1 9/2007 Brown et al.
2007/0245414 A1 10/2007 Chan et al.
2007/0288377 A1 12/2007 Shaked
2007/0291995 A1 12/2007 Rivera
2008/0015988 A1 1/2008 Brown et al.
2008/0029607 A1 2/2008 Mullen
2008/0035738 A1 2/2008 Mullen
2008/0052226 A1 2/2008 Agarwal et al.
2008/0054068 A1 3/2008 Mullen
2008/0054079 A1 3/2008 Mullen
2008/0054081 A1 3/2008 Mullen
2008/0065554 A1 3/2008 Hogan et al.
2008/0065555 A1 3/2008 Mullen
2008/0201264 A1 8/2008 Brown et al.
2008/0201265 A1 8/2008 Hewton
2008/0228646 A1 9/2008 Myers et al.
2008/0243702 A1 10/2008 Hart et al.
2008/0245855 A1 10/2008 Fein et al.
2008/0245861 A1 10/2008 Fein et al.
2008/0283591 A1 11/2008 Oder, II et al.
2008/0302869 A1 12/2008 Mullen
2008/0302876 A1 12/2008 Mullen
2008/0313264 A1 12/2008 Pestoni
2008/0319905 A1* 12/2008 Carlson .................. G06Q 40/02
235/379
2009/0006262 A1 1/2009 Brown et al.
2009/0010488 A1 1/2009 Matsuoka et al.
2009/0037326 A1 2/2009 Chitti et al.
2009/0037333 A1 2/2009 Flitcroft et al.
2009/0037388 A1 2/2009 Cooper et al.
2009/0043702 A1 2/2009 Bennett
2009/0048971 A1 2/2009 Hathaway et al.
2009/0106112 A1 4/2009 Dalmia et al.
2009/0106160 A1 4/2009 Skowronek
2009/0134217 A1 5/2009 Flitcroft et al.
2009/0157555 A1 6/2009 Biffle et al.
2009/0159673 A1 6/2009 Mullen et al.
2009/0159700 A1 6/2009 Mullen et al.
2009/0159707 A1 6/2009 Mullen et al.
2009/0173782 A1 7/2009 Muscato
2009/0200371 A1 8/2009 Kean et al.
2009/0248583 A1 10/2009 Chhabra
2009/0276347 A1 11/2009 Kargman
2009/0281948 A1 11/2009 Carlson
2009/0294527 A1 12/2009 Brabson et al.
2009/0307139 A1 12/2009 Mardikar et al.

(56) References Cited

U.S. PATENT DOCUMENTS

2009/0308921 A1 12/2009 Mullen
2009/0327131 A1 12/2009 Beenau et al.
2010/0008535 A1 1/2010 Abulafia et al.
2010/0088237 A1 4/2010 Wankmueller
2010/0094755 A1 4/2010 Kloster
2010/0106644 A1 4/2010 Annan et al.
2010/0120408 A1 5/2010 Beenau et al.
2010/0133334 A1 6/2010 Vadhri
2010/0138347 A1 6/2010 Chen
2010/0145860 A1 6/2010 Pelegero
2010/0185545 A1 7/2010 Royyuru et al.
2010/0211505 A1 8/2010 Saunders et al.
2010/0223186 A1 9/2010 Hogan et al.
2010/0228668 A1 9/2010 Hogan et al.
2010/0235284 A1 9/2010 Moore
2010/0258620 A1 10/2010 Torreyson et al.
2010/0291904 A1 11/2010 Musfeldt et al.
2010/0299267 A1 11/2010 Faith et al.
2010/0306076 A1 12/2010 Taveau et al.
2010/0325041 A1 12/2010 Berardi et al.
2011/0010292 A1 1/2011 Giordano et al.
2011/0016047 A1 1/2011 Wu et al.
2011/0016320 A1 1/2011 Bergsten et al.
2011/0040640 A1 2/2011 Erikson
2011/0047076 A1 2/2011 Carlson et al.
2011/0083018 A1 4/2011 Kesanupalli et al.
2011/0087596 A1 4/2011 Dorsey
2011/0093397 A1 4/2011 Carlson et al.
2011/0125597 A1 5/2011 Oder, II et al.
2011/0153437 A1 6/2011 Archer et al.
2011/0153498 A1 6/2011 Makhotin et al.
2011/0154466 A1 6/2011 Harper et al.
2011/0161233 A1 6/2011 Tieken
2011/0178926 A1 7/2011 Lindelsee et al.
2011/0180598 A1 7/2011 Morgan et al.
2011/0191244 A1 8/2011 Dai
2011/0238511 A1 9/2011 Park et al.
2011/0238573 A1 9/2011 Varadarajan
2011/0246317 A1 10/2011 Coppinger
2011/0258111 A1 10/2011 Raj et al.
2011/0272471 A1 11/2011 Mullen
2011/0272478 A1 11/2011 Mullen
2011/0276380 A1 11/2011 Mullen et al.
2011/0276381 A1 11/2011 Mullen et al.
2011/0276424 A1 11/2011 Mullen
2011/0276425 A1 11/2011 Mullen
2011/0295745 A1 12/2011 White et al.
2011/0302081 A1 12/2011 Saunders et al.
2012/0023567 A1 1/2012 Hammad
2012/0028609 A1 2/2012 Hruska
2012/0030047 A1 2/2012 Fuentes et al.
2012/0035998 A1 2/2012 Chien et al.
2012/0041881 A1 2/2012 Basu et al.
2012/0047237 A1 2/2012 Arvidsson et al.
2012/0066078 A1 3/2012 Kingston et al.
2012/0072350 A1 3/2012 Goldthwaite et al.
2012/0078735 A1 3/2012 Bauer et al.
2012/0078798 A1 3/2012 Downing et al.
2012/0078799 A1 3/2012 Jackson et al.
2012/0095852 A1 4/2012 Bauer et al.
2012/0095865 A1 4/2012 Doherty et al.
2012/0116902 A1 5/2012 Cardina et al.
2012/0123882 A1 5/2012 Carlson et al.
2012/0123940 A1 5/2012 Killian et al.
2012/0129514 A1 5/2012 Beenau et al.
2012/0143767 A1 6/2012 Abadir
2012/0143772 A1 6/2012 Abadir
2012/0158580 A1 6/2012 Eram et al.
2012/0158593 A1 6/2012 Garfinkle et al.
2012/0185386 A1 7/2012 Salama et al.
2012/0197794 A1 8/2012 Grigg et al.
2012/0197807 A1 8/2012 Schlesser et al.
2012/0203664 A1 8/2012 Torossian et al.
2012/0203666 A1 8/2012 Torossian et al.
2012/0215688 A1 8/2012 Musser et al.
2012/0215696 A1 8/2012 Salonen
2012/0226582 A1 9/2012 Hammad
2012/0233004 A1 9/2012 Bercaw
2012/0246070 A1 9/2012 Vadhri
2012/0246071 A1 9/2012 Jain et al.
2012/0246079 A1 9/2012 Wilson et al.
2012/0265631 A1 10/2012 Cronic et al.
2012/0271770 A1 10/2012 Harris et al.
2012/0297446 A1 11/2012 Webb et al.
2012/0300932 A1 11/2012 Cambridge et al.
2012/0303503 A1 11/2012 Cambridge et al.
2012/0303961 A1 11/2012 Kean et al.
2012/0310725 A1 12/2012 Chien et al.
2012/0310831 A1 12/2012 Harris et al.
2012/0316992 A1 12/2012 Oborne
2012/0317035 A1 12/2012 Royyuru et al.
2012/0317036 A1 12/2012 Bower et al.
2013/0017784 A1 1/2013 Fisher
2013/0018757 A1 1/2013 Anderson et al.
2013/0019098 A1 1/2013 Gupta et al.
2013/0031006 A1 1/2013 McCullagh et al.
2013/0054337 A1 2/2013 Brendell et al.
2013/0054466 A1 2/2013 Muscato
2013/0054474 A1 2/2013 Yeager
2013/0081122 A1 3/2013 Svigals et al.
2013/0091028 A1 4/2013 Oder et al.
2013/0110658 A1 5/2013 Lyman et al.
2013/0111599 A1 5/2013 Gargiulo
2013/0117185 A1 5/2013 Collison et al.
2013/0124290 A1 5/2013 Fisher
2013/0124291 A1 5/2013 Fisher
2013/0124364 A1 5/2013 Mittal
2013/0138525 A1 5/2013 Bercaw
2013/0144888 A1 6/2013 Faith et al.
2013/0145148 A1 6/2013 Shablygin et al.
2013/0145172 A1 6/2013 Shablygin et al.
2013/0159178 A1 6/2013 Colon et al.
2013/0159184 A1 6/2013 Thaw
2013/0166402 A1 6/2013 Parento et al.
2013/0166456 A1 6/2013 Zhang et al.
2013/0173736 A1 7/2013 Krzeminski et al.
2013/0185202 A1 7/2013 Goldthwaite et al.
2013/0191286 A1 7/2013 Cronic et al.
2013/0191289 A1 7/2013 Cronic et al.
2013/0198071 A1 8/2013 Jurss
2013/0198080 A1 8/2013 Anderson et al.
2013/0200146 A1 8/2013 Moghadam
2013/0204787 A1 8/2013 Dubois
2013/0204793 A1 8/2013 Kerridge et al.
2013/0212007 A1 8/2013 Mattsson et al.
2013/0212017 A1 8/2013 Bangia
2013/0212019 A1 8/2013 Mattsson et al.
2013/0212024 A1 8/2013 Mattsson et al.
2013/0212026 A1 8/2013 Powell et al.
2013/0212666 A1 8/2013 Mattsson et al.
2013/0218698 A1 8/2013 Moon et al.
2013/0218769 A1 8/2013 Pourfallah et al.
2013/0226799 A1 8/2013 Raj
2013/0226813 A1 8/2013 Voltz
2013/0246199 A1 9/2013 Carlson
2013/0246202 A1 9/2013 Tobin
2013/0246203 A1 9/2013 Laracey
2013/0246258 A1 9/2013 Dessert
2013/0246259 A1 9/2013 Dessert
2013/0246261 A1 9/2013 Purves et al.
2013/0246267 A1 9/2013 Tobin
2013/0254028 A1 9/2013 Said
2013/0254052 A1 9/2013 Royyuru et al.
2013/0254102 A1 9/2013 Royyuru
2013/0254117 A1 9/2013 Von Mueller et al.
2013/0262296 A1 10/2013 Thomas et al.
2013/0262302 A1 10/2013 Lettow et al.
2013/0262315 A1 10/2013 Hruska
2013/0262316 A1 10/2013 Hruska
2013/0262317 A1 10/2013 Collinge et al.
2013/0275300 A1 10/2013 Killian et al.
2013/0275307 A1 10/2013 Khan
2013/0275308 A1 10/2013 Paraskeva et al.
2013/0282502 A1 10/2013 Jooste

(56) References Cited

U.S. PATENT DOCUMENTS

| | | | |
|---|---|---|---|
| 2013/0282575 | A1 | 10/2013 | Mullen et al. |
| 2013/0282588 | A1 | 10/2013 | Hruska |
| 2013/0297501 | A1 | 11/2013 | Monk et al. |
| 2013/0297504 | A1 | 11/2013 | Nwokolo et al. |
| 2013/0297508 | A1 | 11/2013 | Belamant |
| 2013/0304649 | A1 | 11/2013 | Cronic et al. |
| 2013/0308778 | A1 | 11/2013 | Fosmark et al. |
| 2013/0311382 | A1 | 11/2013 | Fosmark et al. |
| 2013/0317982 | A1 | 11/2013 | Mengerink et al. |
| 2013/0332344 | A1 | 12/2013 | Weber |
| 2013/0339253 | A1 | 12/2013 | Sincai |
| 2013/0346314 | A1 | 12/2013 | Mogollon et al. |
| 2014/0007213 | A1 | 1/2014 | Sanin et al. |
| 2014/0013106 | A1 | 1/2014 | Redpath |
| 2014/0013114 | A1 | 1/2014 | Redpath |
| 2014/0013452 | A1 | 1/2014 | Aissi et al. |
| 2014/0025581 | A1 | 1/2014 | Caiman |
| 2014/0025585 | A1 | 1/2014 | Caiman |
| 2014/0025958 | A1 | 1/2014 | Caiman |
| 2014/0032417 | A1 | 1/2014 | Mattsson |
| 2014/0032418 | A1 | 1/2014 | Weber |
| 2014/0040137 | A1 | 2/2014 | Carlson et al. |
| 2014/0040139 | A1 | 2/2014 | Brudnicki et al. |
| 2014/0040144 | A1 | 2/2014 | Plomske et al. |
| 2014/0040145 | A1 | 2/2014 | Ozvat et al. |
| 2014/0040628 | A1 | 2/2014 | Fort et al. |
| 2014/0041018 | A1 | 2/2014 | Bomar et al. |
| 2014/0046853 | A1 | 2/2014 | Spies et al. |
| 2014/0047551 | A1 | 2/2014 | Nagasundaram et al. |
| 2014/0052532 | A1 | 2/2014 | Tsai et al. |
| 2014/0052620 | A1 | 2/2014 | Rogers et al. |
| 2014/0052637 | A1 | 2/2014 | Jooste et al. |
| 2014/0068706 | A1 | 3/2014 | Aissi |
| 2014/0074637 | A1 | 3/2014 | Hammad |
| 2014/0108172 | A1 | 4/2014 | Weber et al. |
| 2014/0114857 | A1 | 4/2014 | Griggs et al. |
| 2014/0143137 | A1 | 5/2014 | Carlson |
| 2014/0164243 | A1 | 6/2014 | Aabye et al. |
| 2014/0188586 | A1 | 7/2014 | Carpenter et al. |
| 2014/0294701 | A1 | 10/2014 | Dai et al. |
| 2014/0297534 | A1 | 10/2014 | Patterson |
| 2014/0310183 | A1 | 10/2014 | Weber |
| 2014/0330721 | A1 | 11/2014 | Wang |
| 2014/0330722 | A1 | 11/2014 | Laxminarayanan et al. |
| 2014/0331265 | A1 | 11/2014 | Mozell et al. |
| 2014/0337236 | A1 | 11/2014 | Wong et al. |
| 2014/0344153 | A1 | 11/2014 | Raj et al. |
| 2014/0372308 | A1 | 12/2014 | Sheets |
| 2015/0019443 | A1 | 1/2015 | Sheets et al. |
| 2015/0032625 | A1 | 1/2015 | Dill et al. |
| 2015/0032626 | A1 | 1/2015 | Dill et al. |
| 2015/0032627 | A1 | 1/2015 | Dill et al. |
| 2015/0046338 | A1 | 2/2015 | Laxminarayanan et al. |
| 2015/0046339 | A1 | 2/2015 | Wong et al. |
| 2015/0052064 | A1 | 2/2015 | Karpenko et al. |
| 2015/0088756 | A1 | 3/2015 | Makhotin et al. |
| 2015/0106239 | A1 | 4/2015 | Gaddam et al. |
| 2015/0112870 | A1 | 4/2015 | Nagasundaram et al. |
| 2015/0112871 | A1 | 4/2015 | Kumnick |
| 2015/0120472 | A1 | 4/2015 | Aabye et al. |
| 2015/0127529 | A1 | 5/2015 | Makhotin et al. |
| 2015/0127547 | A1 | 5/2015 | Powell et al. |
| 2015/0140960 | A1 | 5/2015 | Powell et al. |
| 2015/0142673 | A1 | 5/2015 | Nelsen et al. |
| 2015/0161597 | A1 | 6/2015 | Subramanian et al. |
| 2015/0178724 | A1 | 6/2015 | Ngo et al. |
| 2015/0180836 | A1 | 6/2015 | Wong et al. |
| 2015/0186864 | A1 | 7/2015 | Jones et al. |
| 2015/0193222 | A1 | 7/2015 | Pirzadeh et al. |
| 2015/0195133 | A1 | 7/2015 | Sheets et al. |
| 2015/0199679 | A1 | 7/2015 | Palanisamy et al. |
| 2015/0199689 | A1 | 7/2015 | Kumnick et al. |
| 2015/0220917 | A1 | 8/2015 | Aabye et al. |
| 2015/0269566 | A1 | 9/2015 | Gaddam et al. |
| 2015/0312038 | A1 | 10/2015 | Palanisamy |
| 2015/0319158 | A1 | 11/2015 | Kumnick |
| 2015/0332262 | A1 | 11/2015 | Lingappa |
| 2015/0356560 | A1 | 12/2015 | Shastry et al. |
| 2016/0028550 | A1 | 1/2016 | Gaddam et al. |
| 2016/0042263 | A1 | 2/2016 | Gaddam et al. |
| 2016/0065370 | A1 | 3/2016 | Le Saint et al. |
| 2016/0092696 | A1 | 3/2016 | Guglani et al. |
| 2016/0092872 | A1 | 3/2016 | Prakash et al. |
| 2016/0103675 | A1 | 4/2016 | Aabye et al. |
| 2016/0119296 | A1 | 4/2016 | Laxminarayanan et al. |
| 2016/0140545 | A1 | 5/2016 | Flurscheim et al. |
| 2016/0148197 | A1 | 5/2016 | Dimmick |
| 2016/0148212 | A1 | 5/2016 | Dimmick |
| 2016/0171479 | A1 | 6/2016 | Prakash et al. |
| 2016/0173483 | A1 | 6/2016 | Wong et al. |
| 2016/0224976 | A1 | 8/2016 | Basu et al. |
| 2017/0046696 | A1 | 2/2017 | Powell et al. |
| 2017/0103387 | A1 | 4/2017 | Weber |
| 2017/0220818 | A1 | 8/2017 | Nagasundaram et al. |
| 2017/0228723 | A1 | 8/2017 | Taylor et al. |

OTHER PUBLICATIONS

"ShopSawy Blog", Availabe online at https ://web .archive .org/web/20 1202121 0461 /http :1/shopsawy.com/blog., 2012, pp. 1-13.

U.S. Appl. No. 13/938,176 , "Final Office Action", dated Nov. 6, 2015, 32 pages.

U.S. Appl. No. 13/938,176 , "Final Office Action", dated Aug. 10, 2017, 35 pages.

U.S. Appl. No. 13/938,176 , "Final Office Action", dated Sep. 21, 2018, 35 pages.

U.S. Appl. No. 13/938,176 , "Non-Final Office Action", dated Mar. 27, 2015, 27 pages.

U.S. Appl. No. 13/938,176 , "Non-Final Office Action", dated Dec. 23, 2016, 32 pages.

U.S. Appl. No. 13/938,176 , "Non-Final Office Action", dated Feb. 9, 2018, 46 pages.

U.S. Appl. No. 14/600,523 , "U.S. Patent Application No.", Secure Payment Processing Using Authorization Request, filed Jan. 20, 2015, 42 pages.

U.S. Appl. No. 15/008,388 , "U.S. Patent Application No.", Methods for Secure Credential Provisioning, filed Jan. 27, 2016, 90 pages.

U.S. Appl. No. 15/011,366 , "U.S. Patent Application No.", Token Check Offline, filed Jan. 29, 2016, 60 pages.

U.S. Appl. No. 15/019,157 , "U.S. Patent Application No.", Token Processing Utilizing Multiple Authorizations, filed Feb. 9, 2016, 62 pages.

U.S. Appl. No. 15/041,495 , "U.S. Patent Application No.", Peer Forward Authorization of Digital Requests, filed Feb. 11, 2016, 63 pages.

U.S. Appl. No. 15/265,282 , "U.S. Patent Application No.", Self-Cleaning Token Valut, filed Sep. 14, 2016, 52 pages.

U.S. Appl. No. 15/462,658 , "U.S. Patent Application No.", Replacing Token on a Multi-Token User Device, filed Mar. 17, 2017, 58 pages.

U.S. Appl. No. 61/738,832 , "U.S. Provisional Application No.", Management of Sensitive Data, filed Dec. 18, 2012, 22 pages.

U.S. Appl. No. 61/751,763 , "U.S. Provisional Application No.", Payments Bridge, filed Jan. 11, 2013, 64 pages.

U.S. Appl. No. 61/879,632 , "U.S. Provisional Application No.", Systems and Methods for Managing Mobile Cardholder Verification Methods, Sep. 18, 2013, 24 pages.

U.S. Appl. No. 61/892,407 , "U.S. Provisional Application No.", Issuer Over-The-Air Update Method and System, filed Oct. 17, 2013, 28 pages.

U.S. Appl. No. 61/894,749 , "U.S. Provisional Application No.", Methods and Systems for Authentication and Issuance of Tokens in a Secure Environment, filed Oct. 23, 2013, 67 pages.

U.S. Appl. No. 61/926,236 , "U.S. Provisional Application No.", Methods and Systems for Provisioning Mobile Devices With Payment Credentials and Payment Token Identifiers, filed Jan. 10, 2014, 51 pages.

(56) References Cited

OTHER PUBLICATIONS

U.S. Appl. No. 62/000,288 , "U.S. Provisional Application No.", Payment System Canonical Address Format, filed May 19, 2014, 58 pages.
U.S. Appl. No. 62/003,717 , "U.S. Provisional Application No.", Mobile Merchant Application, filed May 28, 2014, 58 pages.
U.S. Appl. No. 62/024,426 , "U.S. Provisional Application No.", Secure Transactions Using Mobile Devices, filed Jul. 14, 2014, 102 pages.
U.S. Appl. No. 62/037,033 , "U.S. Provisional Application No.", Sharing Payment Token, filed Aug. 13, 2014, 36 pages.
U.S. Appl. No. 62/038,174 , "U.S. Provisional Application No.", Customized Payment Gateway, filed Aug. 15, 2014, 42 pages.
U.S. Appl. No. 62/042,050 , "U.S. Provisional Application No.", Payment Device Authentication and Authorization System, filed Aug. 26, 2014, 120 pages.
U.S. Appl. No. 62/053,736 , "U.S. Provisional Application No.", Completing Transactions Without a User Payment Device, filed Sep. 22, 2014, 31 pages.
U.S. Appl. No. 62/054,346 , "U.S. Provisional Application No.", Mirrored Token Vault, filed Sep. 23, 2014, 38 pages.
U.S. Appl. No. 62/103,522 , "U.S. Provisional Application No.", Methods and Systems for Wallet Provider Provisioning, filed Jan. 14, 2015, 39 pages.
U.S. Appl. No. 62/108,403 , "U.S. Provisional Application No.", Wearables With NFC HCE, filed Jan. 27, 2015, 32 pages.
U.S. Appl. No. 62/117,291 , "U.S. Provisional Application No.", Token and Cryptogram Using Transaction Specific Information, filed Feb. 17, 2015, 25 pages.
U.S. Appl. No. 62/128,709 , "U.S. Provisional Application No.", Tokenizing Transaction Amounts, filed Mar. 5, 2015, 30 pages.
Shopsavvy Blog , Available at https://web.archive.org/web/20120212104611/http://shopsavvy.com/blog, Feb. 2012, pp. 1-13.

* cited by examiner

Example: Transaction Denied by WIP Parameters

Example: Automatic Trigger of WIP Rules

WIP Example: Data Flow

Example: Logic Flow

WIP Example: Logic Flow

WIP Example: Logic Flow

WIP Example UI Diagram

WIP Example UI Diagram

WIP Example UI Diagram

WIP Example UI Diagram

WIP Example UI Diagram

WIP Example UI Diagram

WIP Example UI Diagram

WIP Example UI Diagram

WIP Example UI Diagram

WIP Example Checkout Transaction Flow

WIP Example Checkout Transaction Flow

WIP Example Checkout Transaction Flow

WIP Example Checkout Transaction Flow

WIP Example Checkout Transaction Flow

Virtual Wallet Purchasing 6 00

Example: Universal Electronic Payment ("UEP")

Example: UEP Application Embodiment - Shop Mode

FIG. 7B
Carrier
7:54 PM
SEARCH
Acme type:snap in:2052
See/Add Filters...
Type
Date
Description
Offers
Buy
Oct 1 2052
Acme 2TB HD
Then $109.99 | NOW $134.99
Acme Co.
Amzn: 11%(web)
Bestby:5%(2 ml)
B&N: 7%(7ml)
See More...>
Coupon
Aug 11 2052
Acme, Inc. (General)
Not stackable
Acme, Inc. (expires 01/30/02)
5% Off with In-person check-in
-extra 2% for web order
Bill
Jun 12 2052
Acme Cable Service
Due (0/16/2052 (autopay ON)
Acme Co.
Pay
Schedule
Snooze
Settings
New Aje
May 21 2052
Visa Gold Credit
*1234 | Pre-approved
By Agent, Inc.
Import
Look
P-2-Me
May 15 2052
Joe AcmE
$234.4E
Peio Alto, CA, 02-03-14
Cart / Wishlist Name
Wishlist?
ADD
Shop
Wallet
History
Snap
Offers
Settings

Example: UEP Application Embodiment - (Local) Merchant Shopping Mode: Virtual Store Injection Example: User Shopping Trail Generation ("USTG") component 1600

Example: Shopping Trail Revenue Sharing ("STRS") component 1620

Example: Snap Mobile Payment Execution ("SMPE") component 1700

Example: Quick Response Code Processing ("QRCP") component 1710

Example: Quick Response Code Processing ("QRCP") component 1720

Example: Offer Recommendation and Exchange ("ORE") component 1800

Example: Virtual Wallet Settings Configuration ("VWSC") component 2200

Example: Purchase Controls Settings ("PCS") component 2220

Example: Purchase Controls Settings ("PCS") component 2220

Example: Centralized Personal Information Platform

Example: Centralized Personal Information Platform Components

Example: Search Results Aggregation

Example: Search Results Aggregation ("SRA") component 2700

Example: Card-Based Transaction Execution

Example: Card-Based Transaction Execution

Example: Card-Based Transaction Execution

Example: Card-Based Transaction Execution

Example: Card-Based Transaction Data Acquisition ("CTDA") component 2900

Example: Card-Based Transaction Data Acquisition ("CTDA") component 2900

Example: Card-Based Transaction Data Acquisition ("CTDA") component 2900

Example: Card-Based Transaction Data Acquisition ("CTDA") component 2900

Example: Card-Based Transaction Data Acquisition ("CTDA") component 2900

Example: Transaction Data Aggregation

Example: Transaction Data Aggregation (TDA) component 3100

Example: Social Data Aggregation

Example: Social Data Aggregation ("SDA") component 3300

Example: Value-Add Service Enrollment

Example: Value-Add Service Enrollment ("VASE") component 3500

Example: Aggregated Data Record Normalization ("ADRN") component 3600

Example: Aggregated Data Record Normalization ("ADRN") component 3600

Example: Data Field Recognition ("DFR") component 3700

Example: Entity Type Classification ("ETC") component 3800

Example: Cross-Entity Correlation ("CEC") component 3900

Example: Entity Attribute Association ("EAA") component 4000

Example: Entity Profile-Graph Updating ("EPGU") component 4100

Example: Search Term Generation ("STG") component 4200

Example: User Behavior Analysis ("UBA") component 4300

Example: User Behavior-Based Offer Recommendation ("UBOR") component 4400

Example: SocialPay

Example Data Flow: Social Pay Enrollment

Example Logic Flow: Social Pay Enrollment ("SPE") component 4700

Example Data Flow: Social Payment Triggering

Example Data Flow: Social Payment Triggering

Example Data Flow: Social Payment Triggering

Example Logic Flow: Social Payment Triggering ("SPT") component 4900

Example Logic Flow: Social Payment Triggering ("SPT") component 4900

Example Logic Flow: Social Payment Triggering ("SPT") component 4930

Example Logic Flow: Wallet Security and Settings ("WSS") component 5000

Example Logic Flow: Wallet Security and Settings ("WSS") component 5000

Example Data Flow: Social Merchant Consumer Bridging

Example Logic Flow: Social Merchant Consumer Bridging ("SMCB") component 5200

Example: Virtual Wallet Mobile App - Feature Overview

Example: Virtual Wallet Mobile App - Shopping Mode

Example: Virtual Wallet Mobile App - Payment Mode

Example: Virtual Wallet Mobile App - Dynamic Payment Optimization

Example: Virtual Wallet Mobile App

Example: Virtual Wallet Mobile App

Example: Virtual Wallet Mobile App

Example: Virtual Wallet Mobile App

Example: Virtual Wallet Mobile App - History

Example: Virtual Wallet Mobile App

Example Data Flow: User Purchase Checkout

Example Logic Flow: User Purchase Checkout ("UPC") component 6100

Example Data Flow: Purchase Transaction Authorization

Example Data Flow: Purchase Transaction Authorization

Example: Purchase Transaction Authorization ("PTA") component 6300

Example: Purchase Transaction Authorization ("PTA") component 6300

Example Data Flow: Purchase Transaction Clearance

Example Data Flow: Purchase Transaction Clearance

Example Logic Flow: Purchase Transaction Clearance ("PTC") component 6000

Example Logic Flow: Purchase Transaction Clearance ("PTC") component 6500

Example: Wallet In Proxy ("WIP")

Example: Wallet In Proxy ("WIP")

Example Data Flow: WIP Wallet Card Generation

Example Logic Flow: WIP Wallet Card Generation

Example Data Flow: WIP Wallet Card Selection Transaction

Example: WIP Wallet Card Selection Component

Example: WIP User Interface Embodiment 71 41
71 42
71 43
71 44
71 45

Example: WIP User Interface Embodiment

Example: WIP User Interface Embodiment

Example: WIP User Interface Embodiment 71 69

Example: WIP User Interface Embodiment

Example: WIP User Interface Embodiment

Example: WIP User Interface Embodiment

MULTI-PURPOSE VIRTUAL CARD TRANSACTION APPARATUSES, METHODS AND SYSTEMS

PRIORITY CLAIM

This application is a Continuation of U.S. patent application Ser. No. 13/938,176, filed on Jul. 9, 2013, which claims the benefit of U.S. Patent Provisional Application No. 61/669,525, filed on Jul. 9, 2012.

U.S. patent application Ser. No. 13/938,176, filed on Jul. 9, 2013 is also a Continuation-in-Part of and claims priority of U.S. patent application Ser. No. 13/624,859, filed Sep. 21, 2012, which claims the benefit of U.S. Patent Provisional Application No. 61/538,761, filed on Sep. 23, 2011.

U.S. application Ser. No. 13/624,859 is also a Continuation-in-Part of and claims priority of U.S. patent application Ser. No. 13/520,481, filed Mar. 31, 2014, which is a National Stage of International Application No. PCT/US2012/26205, filed Feb. 22, 2012, which claims the benefit of U.S. Patent Provisional Application No. 61/445,482, filed on Feb. 22, 2011, U.S. Patent Provisional Application No. 61/545,971, filed Oct. 11, 2011, U.S. Patent Provisional Application No. 61/473,728, filed Apr. 8, 2011, U.S. Patent Provisional Application No. 61/466,409, filed Mar. 22, 2011, U.S. Patent Provisional Application No. 61/469,965, filed March 2011, U.S. Patent Provisional Application No. 61/538,761, filed Sep. 23, 2011, and U.S. Patent Provisional Application No. 61/539,969, filed Sep. 27, 2011.

PCT Application No. PCT/US2012/26205 is also a Continuation-in-Part of U.S. patent application Ser. No. 13/398,817, filed Feb. 16, 2012 and U.S. patent application Ser. No. 13/348,634, filed Jan. 11, 2012.

This application is related to PCT International Patent Application No. 13/938,173, filed Jul. 9, 2013.

This application is related to U.S. Provisional Patent Application No. 61/778,258, filed Mar. 12, 2013.

This application is related to U.S. patent application Ser. No. 13/487,148, filed Jun. 1, 2012.

U.S. patent application Ser. No. 13/624,859 is related to PCT International Patent Application No. PCT/US2012/056759, filed Sep. 21, 2012.

The entire contents of the aforementioned applications are expressly incorporated by reference herein.

This patent for letters patent document discloses and describes various novel innovations and inventive aspects of MULTI-PURPOSE VIRTUAL CARD TRANSACTION technology (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for electronic purchase transactions, and more particularly, include MULTI-PURPOSE VIRTUAL CARD TRANSACTION APPARATUSES, METHODS AND SYSTEMS ("WIP").

BACKGROUND

Consumers may be presented with a number of payment options, including payment by cash, check, credit card, or debit card, at a checkout counter when a purchase is desired. When a purchase is made on a website, consumers may enter in a credit card number.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIGS. 4A-4I provide exemplary mobile wallet user interface (UI) diagrams illustrating aspects of consumer configuration within embodiments of the WIP;

FIG. 69 shows a datagraph diagram illustrating examples of transforming purchase inputs using a wallet in proxy card via a WIP wallet card selection component and a WIP purchase transaction component into wallet in proxy card-based transaction purchase notifications;

Figure 1A:
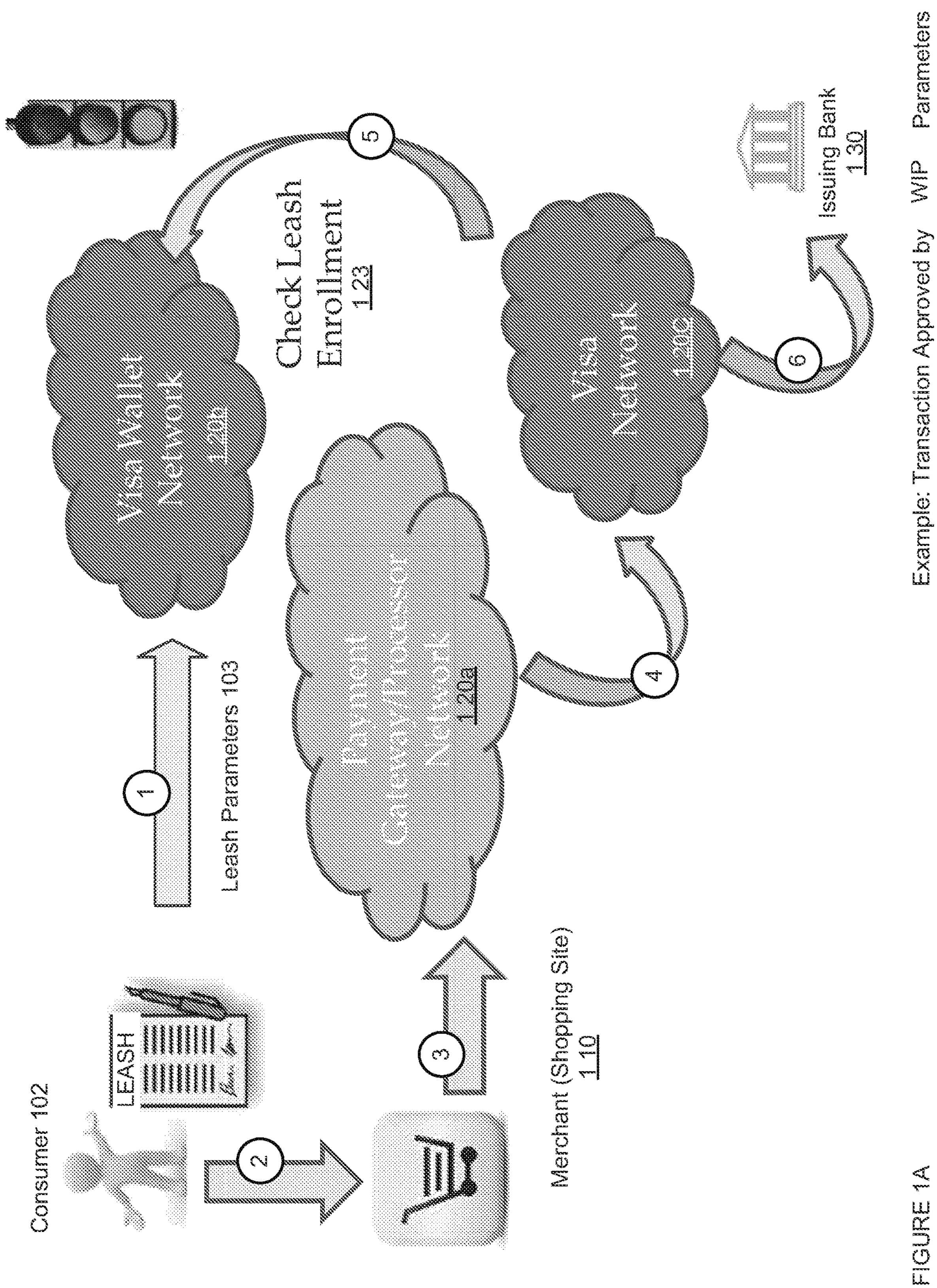
FIGS. 1A-1C provide block diagrams illustrating example aspects of processing transactions based on consumer configured leash parameters within embodiments of the WIP.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Introduction

The MULTI-PURPOSE VIRTUAL CARD TRANSACTION APPARATUSES, METHODS AND SYSTEMS (hereinafter "WIP") transform wallet in proxy card generation requests and purchase inputs, via WIP components, into wallet in proxy card generation notifications and wallet in proxy card-based transaction purchase notifications.

In some embodiments, the WIP may be broken down into three parts:

Mobile Application—It may include the mobile App or the Web UI portal. The customer may interact with this component to enable and configure the Proxy Credit card to be used as a valid Payment instrument inside and outside of a user's Wallet account.

Wallet Common Services—The wallet common services may provide the backbone functionality to configure and control the Proxy credit card properties for the customer, for example, which Physical payment instrument do they want to connect this Virtual Wallet Credit card, etc. The Pay Network may make calls to the common services to validate these properties before successfully processing transactions.

Pay Network—The Pay Network may perform its role of receiving authorization requests from the acquirer and forward them to the issuers. Before it forwards the requests, it may be performing the WIP CHECKs in the Wallet common services network and replace the virtual/proxy card with actual card details from wallet store.

In some embodiments, a wallet customer may go to the Mobile App and enable the WIP service to start using their wallet to pay for goods and services even when merchants do not support Wallet as valid FOP. Once the service is enabled, the customer may be presented with a Virtual Credit card number, which may get refreshed automatically after every transaction. Alternatively, a physical Credit card may also be sent to the customer for making in-person purchases. This physical card is the Proxy Card which may be used by the customer to make in-person or online purchases. The Pay Network may use the virtual credit card generated in the wallet or this Physical Proxy card to access the actual payment instrument in the customer's wallet, and complete the transactional flow.

In some embodiments, the common services in the Wallet backend is a one stop shop which maintains the customer account/transaction details. These common services may be extended to support the WIP service properties for each customer holding a wallet account. The common services may persist these properties setup by the customer in the common service DB, which may be already a part of the current architecture. Any updates by the customer to change these properties may be updated in the common services DB, and will be readily available to the Pay Network for successful transaction processing.

In some embodiments, a new service may also be implemented as part of the Wallet common services suite, which may be called the "WInterChangeEngine-Wallet Interchange Engine". This service may act as a back channel gateway for the Pay Network to determine if the card is actually a Proxy/Virtual Card and is enrolled for WIP service. In case the reply for the above Req is TRUE, the Pay Network may make a subsequest call with the transaction details to the WInterchange Engine to validate the transaction as per the customer set WIP properties, and replace the Virtual/Proxy card with the actual Credit card details.

The Consumer Transaction Leash Control Apparatuses, Methods And Systems (hereinafter "WIP") provides a platform to facilitate a consumer enroll with an electronic payment wallet with consumer specified restriction parameters. In one implementation, a consumer may configure consumer-controlled fraud prevention parameters to restrict a purchase transaction via his electronic wallet, e.g., transaction time, maximum amount, type, number of transactions per day, and/or the like.

For example, a consumer may enroll with an electronic wallet service (e.g., Visa V-Wallet) by creating an e-wallet account and adding a payment account to the e-wallet (e.g., a credit card, a debit card, a PayPal account, etc.). The consumer may configure parameters to restrict the wallet transactions. For example, the consumer may configure a maximum one time transaction amount (e.g., $500.00, etc.). For another example, the consumer may specify a time range of transactions to be questionable (e.g., all transactions occurring between 2 am-6 am, etc.). For another example, the consumer may specify the maximum number of transactions per day (e.g., 20 per day, etc.). For further examples, the consumer may specify names and/or IDs of merchants with whom the transactions may be questionable (e.g., Internet spam sites, etc.).

In one implementation, the consumer may configure the WIP to detect and block all susceptible transactions. For example, when an attempted transaction of an amount that exceeds the maximum specified transaction amount occurs, the electronic wallet may be configured to reject the transaction and send an alert to the consumer. The transaction may be resumed once the consumer approves the transaction. In another implementation, if the WIP does not receive confirmation from the consumer to resume a susceptible transaction, the WIP may send a notification to the merchant to cancel the transaction. In one implementation, the consumer may configure the time period of clearance (e.g., 12 hours, etc.). In another implementation, WIP may determine a default maximum clearance period in compliance with regulatory requirements (e.g., 24 hours after soft posting, etc.).

In another implementation, the WIP consumer transaction control may be integrated with a universal payment platform, wherein a user may associated one or more payment accounts with a universal payment platform and pay with the universal payment platform. Within embodiments, the consumer may create an electronic wallet service account and enroll with the electronic wallet (e.g., Visa V.me wallet, etc.) via WIP. In alternative embodiments, a consumer may associate a consumer bank account with an existing electronic wallet. For example, a consumer may provide payment information, such as bank account number, bank routing number, user profile information, to an electronic wallet management consumer onboarding user interface (e.g., FIGS. 4A-4P, etc.), to associate an account with the electronic wallet. In another implementation, a consumer may enroll with the electronic wallet during online checkout. For example, a merchant site may provide an electronic wallet button at the checkout page (e.g., a Visa V-Wallet logo, etc.), and upon consumer selection of the electronic wallet button, the consumer may be prompted to enter bank account information (e.g., card number, etc.) to register a payment card (e.g., a credit card, a debit card, etc.) with the electronic wallet via a pop-up window.

Integration of the previously discussed electronic wallet, a desktop application, a plug-in to existing applications, a standalone mobile application, a web based application, a smart prepaid card, and/or the like in capturing consumer account control usage rules (e.g., WIP parameters, etc.), payment transaction related objects such as purchase labels, payment cards, barcodes, receipts, and/or the like reduces the number of network transactions and messages that fulfill a transaction payment initiation and procurement of payment information (e.g., the consumer does not need to walk to a bank branch, call a bank customer service to set up fraud preventing usage restriction rules, hand in a physical payment card to a cashier, etc., to initiate a payment transaction, fund transfer, and/or the like). In this way, with the reduction of network communications, the number of transactions that may be processed per day is increased, i.e., processing efficiency is improved.

It should be noted that although a mobile platform is depicted (e.g., see FIGS. 4A-4I), a digital/electronic wallet, a smart/prepaid card linked to a user's various payment accounts, and/or other payment platforms are contemplated embodiments as well; as such, subset and superset features and data sets of each or a combination of the aforementioned payment platforms may be accessed, modified, provided, stored, etc. via cloud/server services and a number of varying client devices throughout the instant specification. Similarly, although mobile wallet user interface elements are depicted, alternative and/or complementary user interfaces are also contemplated including: desktop applications, plug-ins to existing applications, stand alone mobile applications, web based applications (e.g., applications with web objects/frames, HTML 5 applications/wrappers, web pages, etc.), a voice interface (e.g., Apple Siri, Samsung S Voice, Google Voice, etc.) and other interfaces are contemplated. It should be further noted that the WIP payment processing component may be integrated with an digital/electronic wallet (e.g., a Visa V-Wallet, etc.), comprise a separate stand alone component instantiated on a user device, comprise a server/cloud accessed component, be loaded on a smart/prepaid card that can be substantiated at a PoS terminal, an ATM, a kiosk, etc., which may be accessed through a physical card proxy, and/or the like. In further implementations, the WIP may provide a consumer enrollment UI for a consumer to configure various types of consumer wallet leash parameters, such as but not limited to restricted time of the day a card can be used, usage frequency, etc. that the card may be activated or deactivated. Additionally, the WIP may provide triggers to auto-activate wallet/card account, e.g., tied to calendar events, geo-locations, etc. In another implementation, a consumer's Corporate cards sub-accounts, bonded accounts may use access control list (ACL)-like pre-configured leash settings (e.g., corporate card accounts, parent/child debit accounts may use ACL-like templates to control usage, etc.) In this way, the WIP reduces redundant information exchange and communication messages between consumers and an issuing bank, and thus improves network transmission and processing efficiency.

Multi-Purpose Virtual Card Transaction (WIP)

Figure 1B:
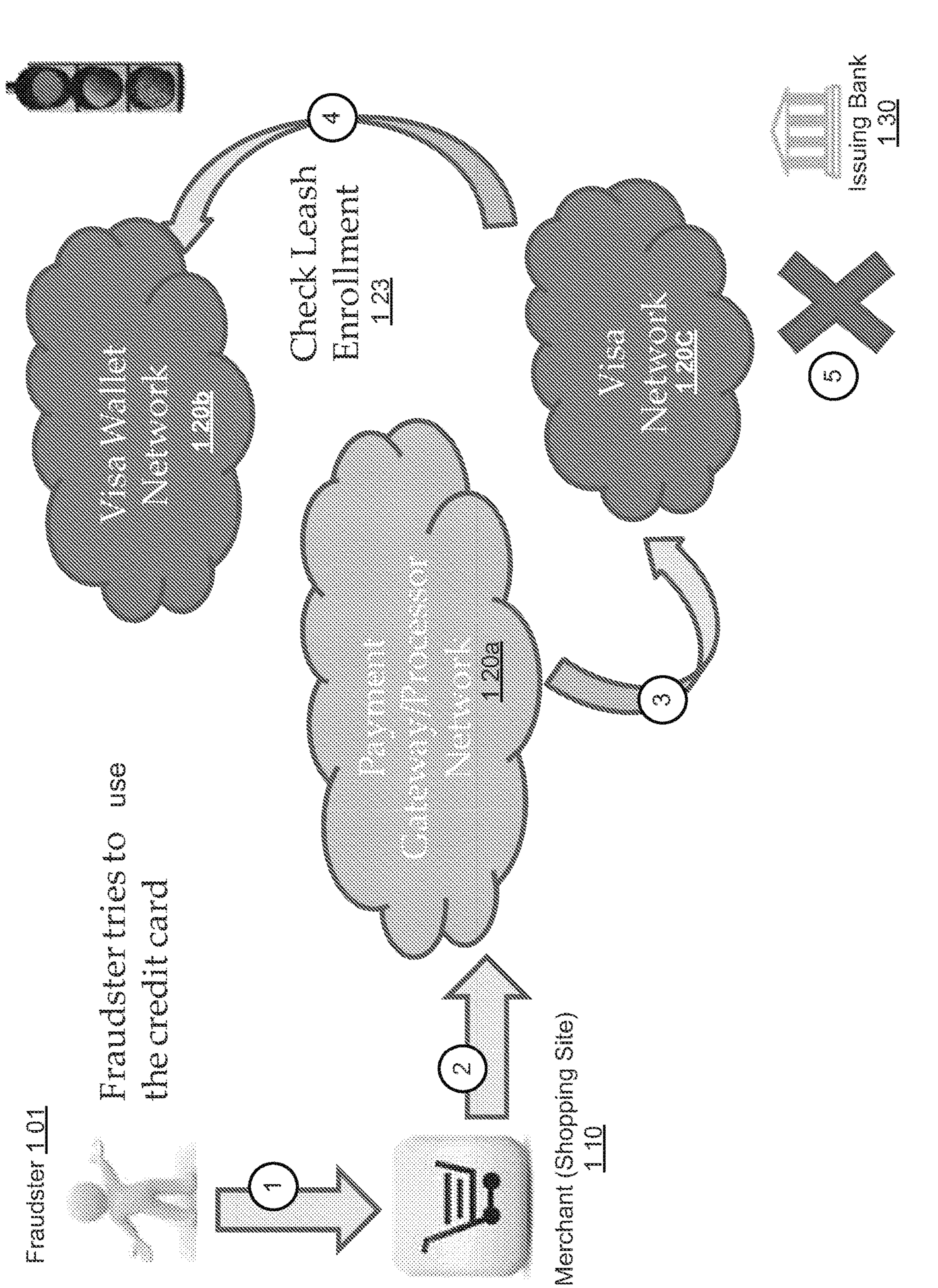

FIGS. 1A-1B provide block diagrams illustrating consumer transaction flow within implementations of the WIP. In one implementation, a consumer 102 may configure transaction restriction parameters via a consumer enrollment user interface. For example, in one implementation, an electronic wallet user may receive an invitation from WIP to sign up with WIP service, and following a link provided in the invitation (e.g., an email, etc.), the user may provide registration information in a registration form.

In one implementation, a user may configure payment methods and alerts with WIP. For example, the user may add a payment account to the wallet, and register for timely alerts with transactions associated with the payment account. In one implementation, the user may establish customized rules for triggers of a transaction alert. For example, an alert message may be triggered when a susceptible transaction occurs as the transaction amount exceeds a maximum one time transaction amount (e.g., $500.00, etc.). For another example, an alert may be triggered when a transaction occurs within a susceptible time range (e.g., all transactions occurring between 2 am-6 am, etc.). For another example, an alert may be triggered when the frequency of transactions exceeds a maximum number of transactions per day (e.g., 20 per day, etc.). For further examples, an alert may be triggered when the transacting merchant is one of a consumer specified susceptible merchants (e.g., Internet spam sites, etc.). For another example, an alert may be triggered when the type of the transaction is a blocked transaction type (e.g., a user may forbid wallet transactions at a gas station for gas fill, etc.).

In one implementation, the WIP may provide an enrollment user interface for a consumer to fill in leash parameters 103 (e.g., see FIGS. 4A-4I). In another implementation, the WIP may automatically capture leash parameters from the consumer's wallet calendar events. For example, when the consumer's calendar indicates the consumer will be on a business trip for a period of time, the WIP may automatically capture the event and trigger/release leash parameters for a corporate card usage enrolled in the wallet. For example, the consumer may specify to limit use of the corporate card for daily consumption other than for business purpose, as further illustrated in FIG. 1.

In one implementation, the user may subscribe to WIP alerts by selecting alert channels. For example, the user may providing his mobile number, email address, mailing address and/or the like to WIP, and subscribe to alerts via email, text messages, consumer service calls, mail, and/or the like. In one implementation, the user may configure rules and subscription channels for different payment account associated with the electronic wallet. In one implementation, upon receiving user configured parameters 103 via a user interface, the wallet network 120*b* may store the leash parameters 103 associated with a consumer wallet profile.

Within implementations, the consumer may proceed to engage an electronic wallet to purchase goods from a merchant 110 (e.g., a physical merchant store, a shopping site, etc.). Such payment requests may be sent to a payment gateway/processor network 120*a* (e.g., an acquirer, etc.), which may in turn forward the message to a financial processing network 120C (e.g., VisaNet, etc.). In one implementation, the financial processing network 120C may check the consumer's leash enrollment configurations 123 with the wallet network 120*b*, and determine whether the submitted payment request complies with the leash settings, e.g., whether the requested payment amount exceeds a maximum amount, a maximum frequency, within a valid time period, etc. If no leash rule is violated, the processing network 120C may send a payment authorization request to the consumer's issuing bank 130 to complete the payment transaction (see FIG. 62A).

In an alternative implementation, as shown in FIG. 1B, when an unauthorized user attempts to initiate a payment transaction using a consumer's wallet, e.g., a fraudster 101 tries to use a stolen credit card, etc., the WIP settings 123 may help detect the fraudulent usage. For example, the WIP parameters configured by the consumer may limit purchases to be within a geographical area, and if the authorization request is originated from a store outside of the specified geographical area, the processing network 120C may deny the payment request. Other examples of violations of the WIP parameters may include the requested amount exceeding a specified maximum amount, the requested payment exceeding the maximum usage frequency, etc.

Figure 1C:
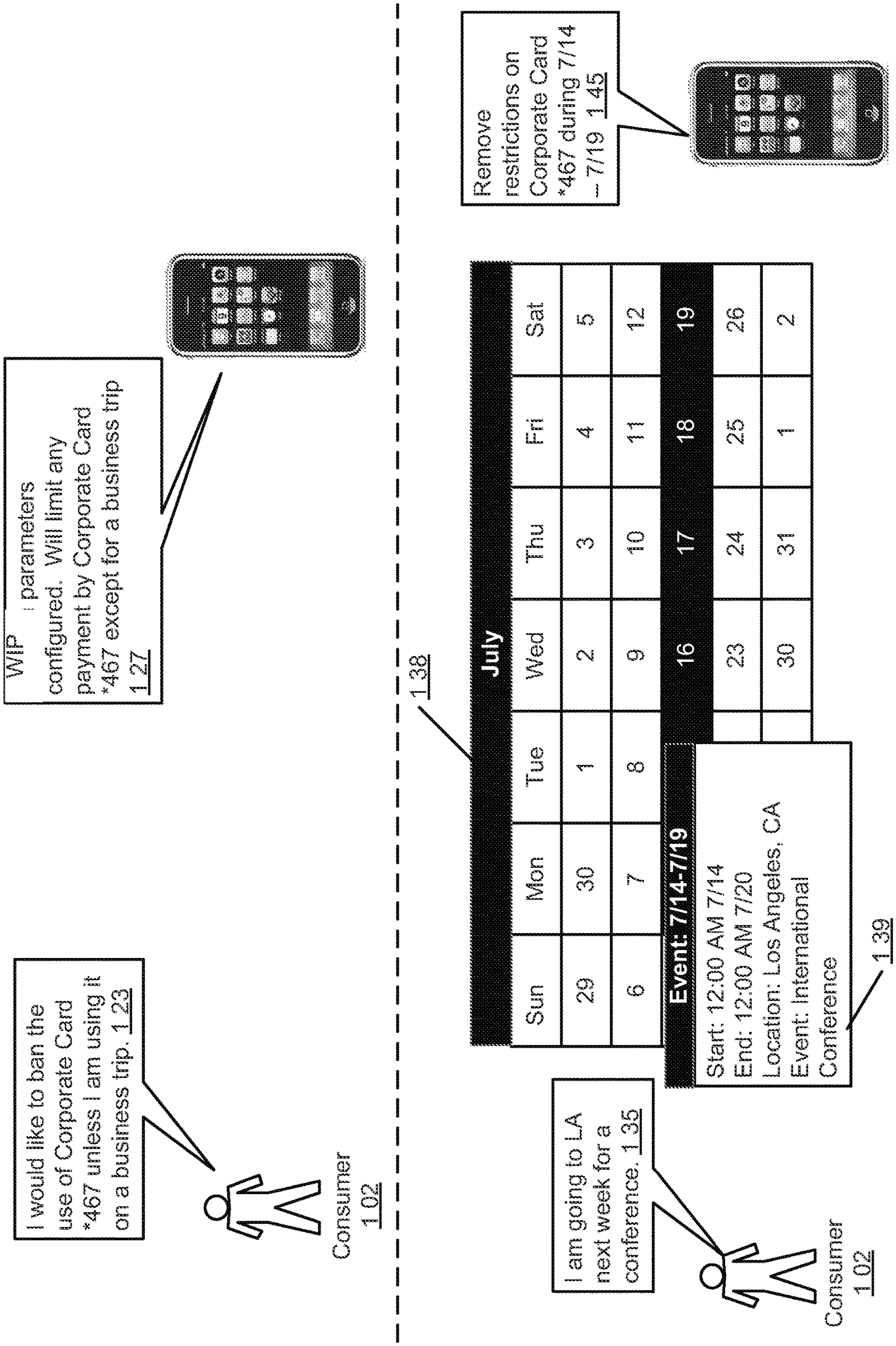

FIG. 1C provides a block diagram illustrating aspects of automatic leash configuration by calendar events within embodiments of the WIP. In one implementation, a consumer 102 may configure WIP parameters to limit the use of a corporate credit card account 123. For example, a consumer 102 may possess a corporate group account card for business purpose payment and reimbursement, and may not want to use it for personal consumption. The consumer's mobile wallet may receive such leash parameters for credit card payment accordingly 127. It should be noted that in one embodiment, the user may establish leash access payment control through through a number of interfaces. For example, the user may establish controls through the mobile interfaces (e.g., FIGS. 4A-4I). As another example, such settings may be configured through a web based interface (e.g., FIGS. 4J-4Q). In another embodiment, input controls may be provided via voice, through services such as Apple Siri, Samsung S Voice, or Google Voice, etc., where a speech-to-textconversion may take place and the resulting text may be parsed for key words, which may act as command and command parameters for establishing accessing payment control in WIP.

In one implementation, when the consumer 102 goes on a business trip 135, the consumer may configure such events on an electronic calendar 138 (e.g., Google calendar, Microsoft outlook calendar, Apple iCal, etc.). In one implementation, the calendar event may specify a period of time as a business trip 139. In one implementation, such calendar 138 may be instantiated on the consumer's mobile device, wherein the consumer's mobile wallet may automatically associate the credit card leash settings with the calendar events. For example, as shown at 145, the mobile wallet may identify the duration of a business trip, and relax the constraint on the leash rule for corporate account usage, e.g., during the business trip, the WIP will no longer apply usage limitations of the consumer's corporate account.

Figure 2A:
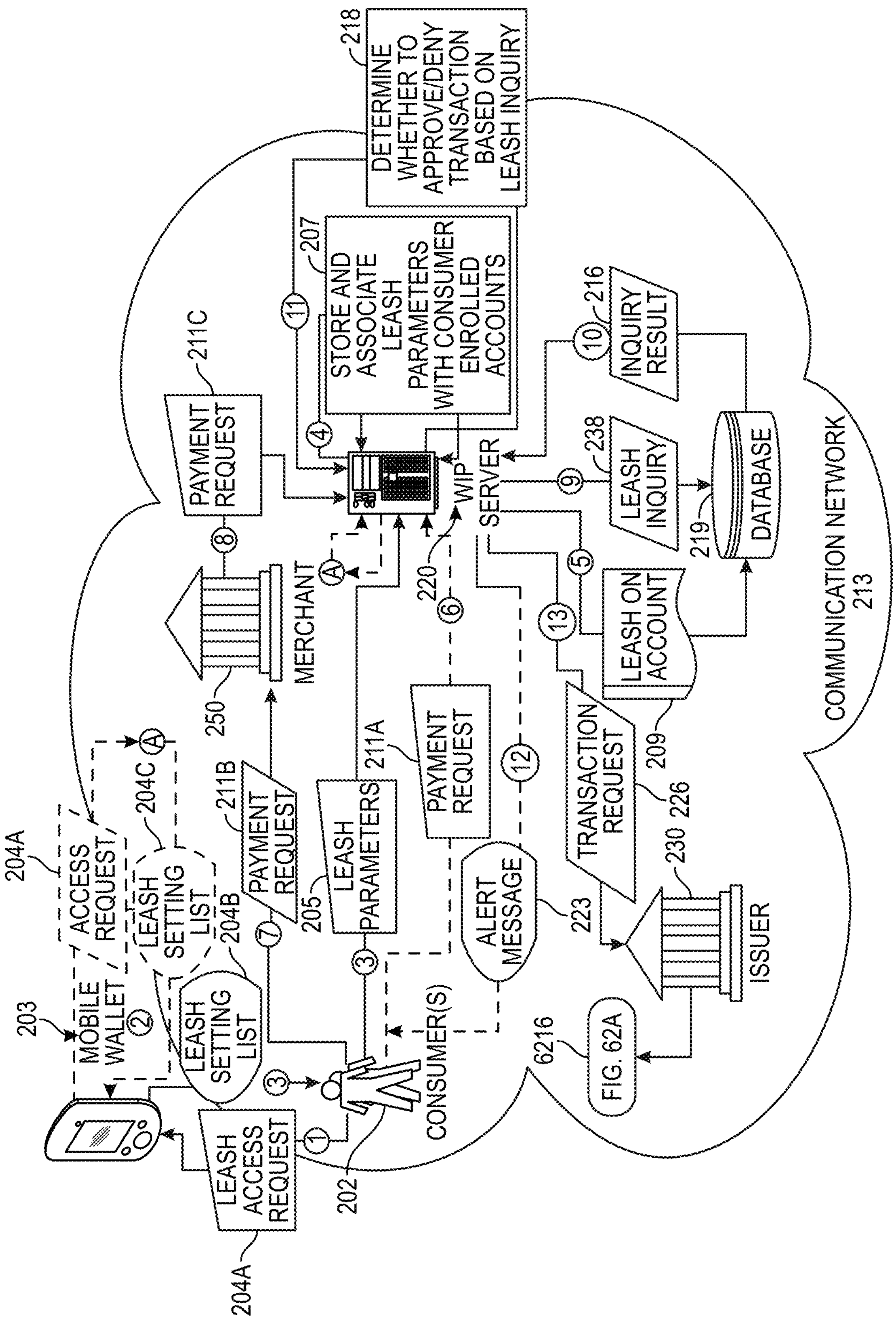
FIGS. 2A-2B provide data block diagrams illustrating data flow interactions between WIP server 220 and its affiliated entities within embodiments of the WIP.

FIG. 2A provides a data block diagram illustrating data flow interactions between WIP server and its affiliated entities within embodiments of the WIP. Within various embodiments, one or more user(s)/consumer(s) 202 operating one or more mobile wallet(s) 203, a WIP server 220, WIP merchants 250, an issuer 230, and/or WIP database(s) 219 are shown to interact via various communication network 213.

Within various embodiments, the consumer 202 may include a wide variety of different communications devices and technologies within embodiments of WIP operation. For example, in one embodiment, the consumers 102 may include, but are not limited to, terminal computers, work stations, servers, cellular telephony handsets, smart phones, PDAs, and/or the like. In one embodiment, the WIP server 220 may be equipped at a terminal computer of the consumer 202. In another embodiment, the WIP server 220 may be a remote server which is accessed by the consumer 102 via a communication network 213, such as, but not limited to local area network (LAN), in-house intranet, the Internet, and/or the like. In a further implementation, the WIP merchant 250 may be integrated with a consumer 202 at a computer terminal.

In one implementation, a consumer may request 204*a* to access leash settings via a user interface, e.g., a mobile wallet interface, a web browser based interface, a voice interface, and/or the like. In one implementation, the mobile wallet 203 may be configured to provide a pre-stored leash setting UI 204*b* to the user (e.g., see 401 in FIG. 4A). In another implementation, the mobile wallet may generate a WIP access request to the WIP server and receive a leash setting list 204*c* from the server 220. For example, in one implementation, the mobile wallet may provide a (Secure) Hypertext Transfer Protocol ("HTTP(S)") PUT message including the consumer leash access request 204*a* in the form of data formatted according to the eXtensible Markup Language ("XML"). Below is an example HTTP(S) PUT consumer leash access request message 204*a* substantially in the form of an XML-formatted message:

```
PUT /access_request.php HTTP/1.1
Host: 65.202.245.00
Content-Type: Application/XML
Content-Length: 718
<?XML version = "1.0" encoding = "UTF-8"?>
<leash_access>
    <UserID> JDoe <\UserID>
    <WalletID> JD0001 </WalletID>
    <time> 19:23:23 <time>
    <date> 10-23-2014 </date>
    <request> leash setting </request>
    ...
</leash_access>
```

In one implementation, the WIP may generate a HTTPS PUT message including the leash setting UI 204*b* in the form of XML. Below is an example HTTP(S) PUT leash setting UI 204*b* message substantially in the form of an XML-formatted message:

```
PUT /leash_setting.php HTTP/1.1
Host: www.leash.com
Content-Type: Application/XML
Content-Length: 718
<?XML version = "1.0" encoding = "UTF-8"?>
<leash_setting>
    <UserID> JDoe <\UserID>
    <WalletID> JD0001 </WalletID>
    <time> 19:23:26 <time>
    <date> 10-23-2014 </date>
    <current_leash>
        <account_1>
            <account_name> amazon visa </account_name>
            <account_no> 0000 0000 0000 0000 </account_no>
            ...
            <time>
                <allowed_time_of_day> ...
                </allowed_time_of_day>
                <day_of_week> ... </day_of_week>
                ...
            </time>
            <amount>
                <max_day> ... </max_day>
                <max_week> ... </max_week>
                ...
            </amount>
            <count>
                <count_day> ... </count_day>
                <count_week> ... </count_week>
                ...
            </count>
            <type>
                <blacklist> ... </blacklist>
                ...
            </type>
            <merchant>
                <only_allow_online> ... </only_allow_oline>
            ...
        </merchant>
        ...
    </account_1>
    ...
</leash_access>
```

Figure 4A:
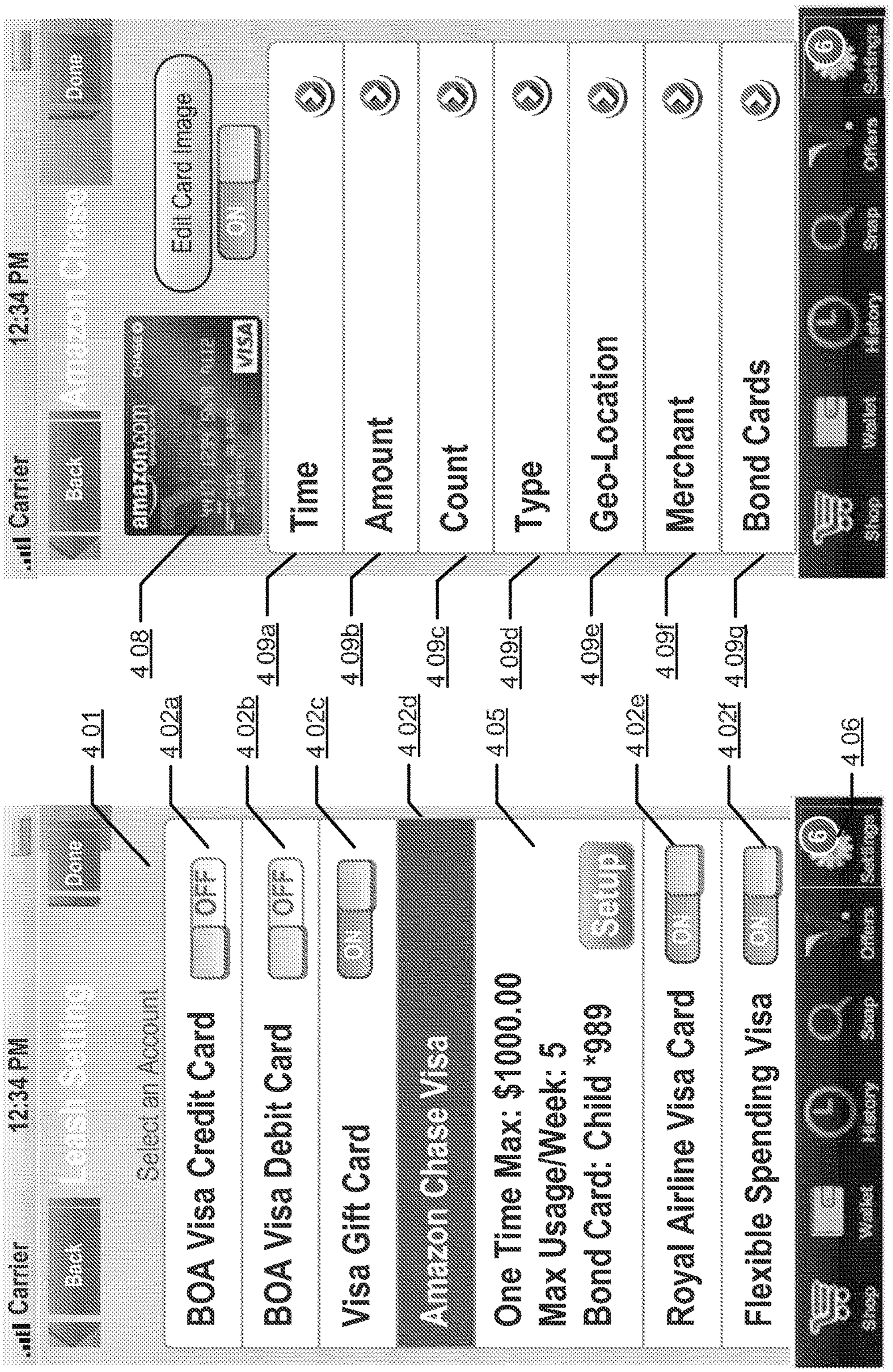

In one implementation, the consumer may configure leash parameters 205 with the WIP server 220. For example, a consumer may enter a "settings" mode of his/her electronic wallet, and edit the control parameters of an enrolled account, as shown in FIG. 4A. Such leash parameters may include, but not limited to transaction amount, transaction type, transaction frequency, activated period of time, transaction location, and/or the like.

Figure 4B:
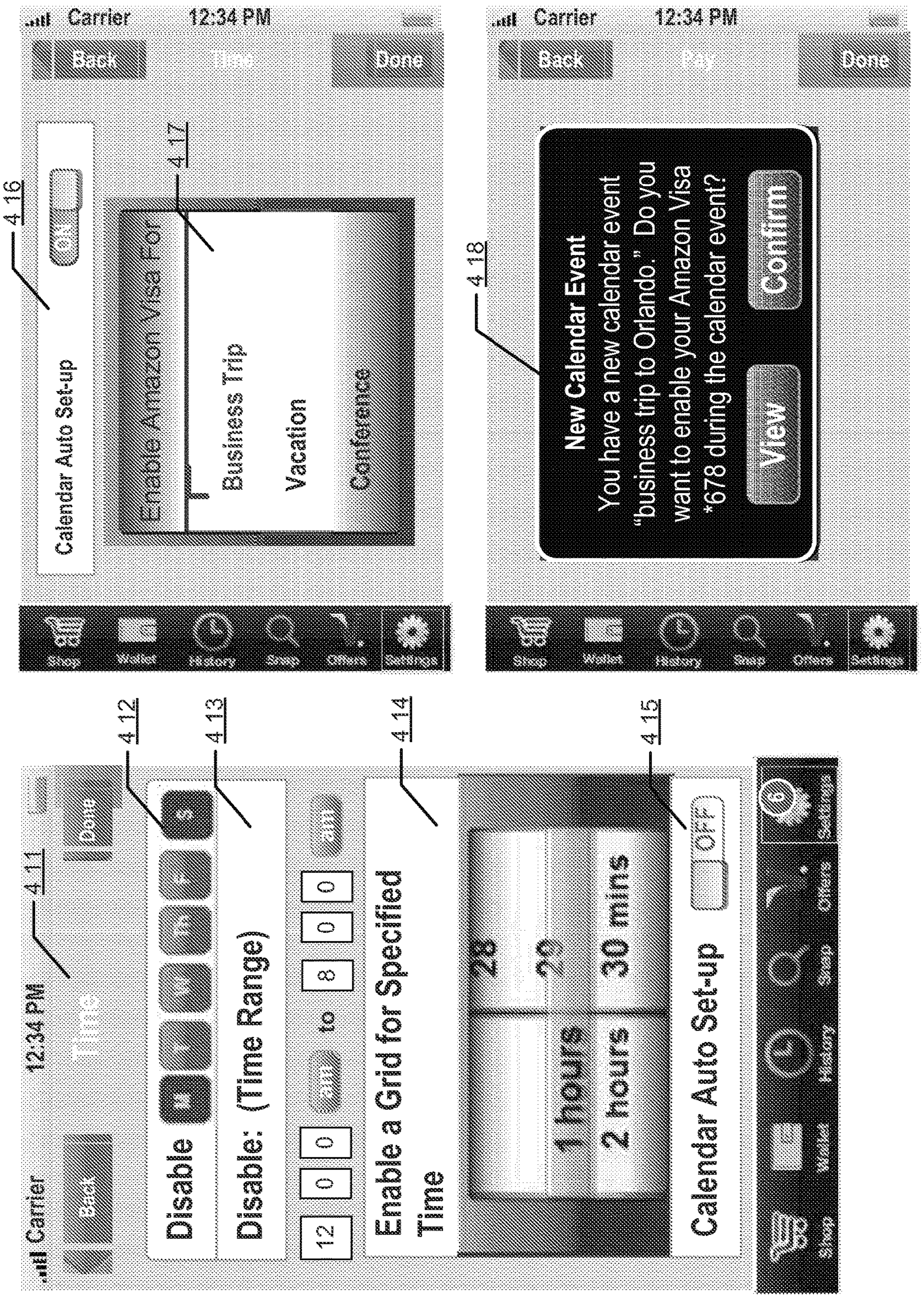

In one implementation, as shown at 411-415 in FIG. 4B, the WIP may allow the customer to specify when the payment instrument may be used. If transactions are generated outside of the specified time windows, then WIP may deny the transactions. For example, a consumer may specify to enable their credit card for about a period of time (e.g., 10 minutes, etc.) at a time. When the consumer is about to use the card, the consumer goes to the wallet and requests for card to be activated for the specified time. Upon completing their purchase, and once the timer expires, the credit card goes back to dormant state. As another example, the consumer may specify to enable the card during certain time intervals in the day only, e.g., 8:00 AM to 8:00 PM. A ny transactions outside of this time window may be denied. As another example, the consumer may specify certain days of the week when the card may be enabled, e.g., enable the card for Mondays and Thursdays ONLY. Hence any transactions conducted on the card other than these days may be denied. As another example, the consumer may keep his or her credit cards in the disabled state, and when about to make a transaction, they set the credit card state to "ENABLED"! or "ON." Once the transaction goes through, the switch may automatically go back to OFF STATE and the card may not be used. If the user needs to conduct another transaction they may have to enable the card again.

Figure 4C:
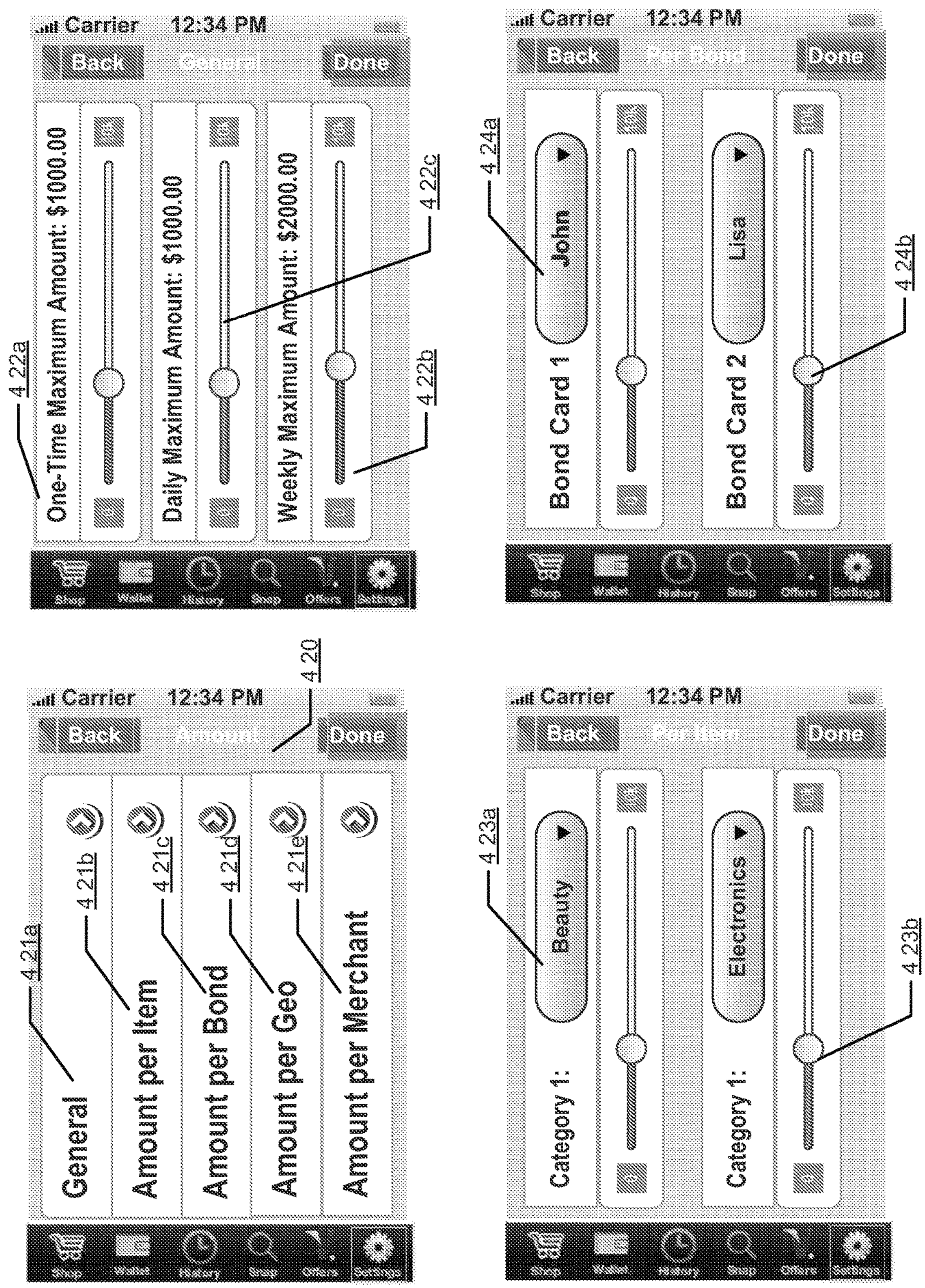

In a further implementation, as shown in FIG. 4C, the WIP may allow the customer to specify the maximum amount for which the payment instrument may be used. If transactions are generated outside of the specified amount window, the WIP may deny them. For example, a consumer may specify the maximum and minimum amount for which they may use the credit card for. Any transaction outside of this window may be denied. As another example, a consumer may specify the valid currency in which the transaction may be performed using this credit card. If the consumer needs to modify the currency, they may have to change the WIP settings As another example, consumers may set properties on the type of transactions which a credit card may support, e.g., to block transaction with high risks such as interpersonal transfers, web sale, etc. As another example, consumers may set throttles such that the credit card may not get used more than a maximum counts in a day, etc. In further implementations, the WIP may recommend leash parameters as default values, e.g., based on the consumer's transaction pattern (e.g., most frequent purchasing time frames, merchants, item categories, etc.).

In one implementation, WIP (e.g., the Visa Wallet network 120*b*) may provide a (Secure) Hypertext Transfer Protocol ("HTTP(S)") PUT message including the user leash parameters 205 in the form of data formatted according to the eXtensible Markup Language ("XML"). Below is an example HTTP(S) PUT leash parameter setting 205 message substantially in the form of an XML-formatted message:

```
PUT /leash.php HTTP/1.1
Host: www.leash.com
Content-Type: Application/XML
Content-Length: 718
<?XML version = "1.0" encoding = "UTF-8"?>
<UserLeashRule>
    <UserID> JDoe <\UserID>
    <WalletID> JD0001 </WalletID>
    <Rule1>
        <status> ON </status>
        <RuleID> 00001 </RuleID>
        <CardNo> 0000 0000 0000 </CardNo>
        <MaxAmount> 500.00 </MaxAmount>
        <MaxPerDay> 20 </MaxPerDay>
        <Subscription> Mobile 000-000-0000 </Subscription>
        <Channel> SMS </Channel>
        ...
    </Rule1>
    <Rule2>
        <status> OFF </status>
        <RuleID> 00002 </RuleID>
        <CardNo> 0000 0000 0002 </CardNo>
        <MaxAmount> 100.00 </MaxAmount>
        <MaxPerDay> 10 </MaxPerDay>
        <BlackListMerchants>
            <Merchant1> abc.com </Merchant1>
            <Merchant2> xyz </Merchant2>
            ...
        </BlacklistMerchants>
        ...
        <Subscription> Email </Subscription>
        <Channel> jdoe@email.com </Channel>
        ...
    </Rule2>
    ..
<\UserLeashRule>
```

As another example, the HTTPS PUT leash parameter setting 205 message may be substantially in the form of the following XML-formatted message:

```
PUT /leash.php HTTP/1.1
Host: www.leash.com
Content-Type: Application/XML
Content-Length: 718
<?XML version = "1.0" encoding = "UTF-8"?>
<UserLeashRule>
    <UserID> JDoe <\UserID>
    <WalletID> JD0001 </WalletID>
    <account>
        <account_no> 0000 0000 0000 0000 </account_no>
        <account_name> Amazon Chase </account_name>
        ...
    </account>
    <leash_setting>
            <status> ON </status>
            <time>
                <allowed_time_of_day> 8 - 12
                </allowed_time_of_day>
                <day_of_week> thu </day_of_week>
                ...
            </time>
            <amount>
                <max_day> 500.00 </max_day>
                <max_week> 2000.00 </max_week>
                ...
            </amount>
            <count>
                <count_day> 4 </count_day>
                <count_week> 20 </count_week>
                ...
            </count>
            <type>
                <blacklist> alcohol </blacklist>
                ...
            </type>
            <merchant>
```

-continued

```
                <only_allow_online> amazon.com
                </only_allow_oline>
                ...
            </merchant>
            ...
</UserLeashRule>
```

In the above example, the consumer has elected to limit the one-time payment for a card to no more than $500.00, and no more than 20 times a day. In another implementation, the consumer has elected to limit usage of another card with a list of merchants, and/or the like. In further implementations, the consumer may specify a maximum amount cap at a specific merchant, e.g., maximum cap of $500.00 at Amazon.com, maximum cap of $5000.00 at Saks 5th Ave., and/or the like.

In one implementation, upon receivint the leash parameters, the WIP server 220 may store and associate leash parameters 205 with each consumer enrolled account 207. For example, the WIP server 220 may generate a leash record 209 and save it at a database 219. The leash record 209 may comprise a XML data file, which may take a similar form to that of data message 205.

As another example, the WIP server may issue PHP/SQL commands to store the leash parameters to a database table (such as FIG. 66, leash table 6619*q*). An example leash parameters store 209 command, substantially in the form of PHP/SQL commands, is provided below:

```
<?PHP
header('Content-Type: text/plain');
mysql_connect("254.92.185.103",$DBserver,$password); // access
database server
mysql_select("WIP_DB.SQL"); // select database to append
mysql_query("INSERT INTO Leash_Table (user_id, wallet_id,
rule_id, rule_type,
    rule_parameters, subscription, ...)
VALUES ($user_id, $wallet_id, $rule_id, $rule_type,
$rule_parameters,
    $subscription,...)"); // add data to table in database
mysql_close("WIP_DB.SQL"); // close connection to database
```

In one implementation, upon configuring the leash parameters, when a consumer 202 shops with a merchant 250 (e.g., a merchant store, a shopping site, etc.), the consumer may submit a payment request 211*a* for processing. In one implementation, the consumer 202 may send the payment request 211*a* to a payment processor network (e.g., VisaNet, etc.) which may forward the payment request to the WIP server 220. For example, the consumer 202 may proceed to a checkout page on a shopping site, which may activate a WIP checkout lightbox (e.g., a V.me checkout box, etc.) and generate a payment request message to the payment processing network upon the consumer's actuation (e.g., the consumer clicking on the lightbox to checkout, etc.). In another implementation, the consumer 202 may submit a payment request 211*b* to a merchant 250, which may in turn forward the payment request message 211C to the payment processing network and WIP server 220. For example, the consumer may operate a payment device (e.g., an mobile wallet, a payment card, etc.) and proceed to pay at a point of sale (POS) terminal at a merchant store.

In one implementation, the payment request message 211*a-c* may take a form similar to a HTTP(S) PUT message including payment request data in the form of XML. Below is an example HTTP(S) PUT payment request 211*a-c* substantially in the form of an XML-formatted message:

```
PUT /PaymentRequest.php HTTP/1.1
Host: www.shopping.com
Content-Type: Application/XML
Content-Length: 718
<?XML version = "1.0" encoding = "UTF-8"?>
<PeymentRequest>
    <UserID> JDoe <\UserID>
    <WalletID> JD0001 </WalletID>
    <Time> 23:23:34 00-00-1900 <Time>
    <TransactionID> 000000 <TransactionID>
    <User>
        <user_name> John Doe </user_name>
        <user_email> jdoe@email.com </user_email>
        <user_number> 111-111-1111 </user_number>
        <user_address> ... </user_address>
        ...
    </User>
    <Item>
        <MCC> MC0101 </MCC>
        <item_name> Samsung galaxy II </item_name>
        <item_quant> 1 </item_quant>
        <unit_price> 399.99 </unit_price>
        <tax> 39.99 </tax>
        ...
    </Item>
    <Payment>
        <amount> 439.98 </amount>
        <payment_type> credit </payment_type>
        <card> 0000 0000 0000 0000 </card>
        <CCV> 000 </CCV>
        ...
    </Payment>
    ...
<\PaymentRequest>
```

Figure 62A:
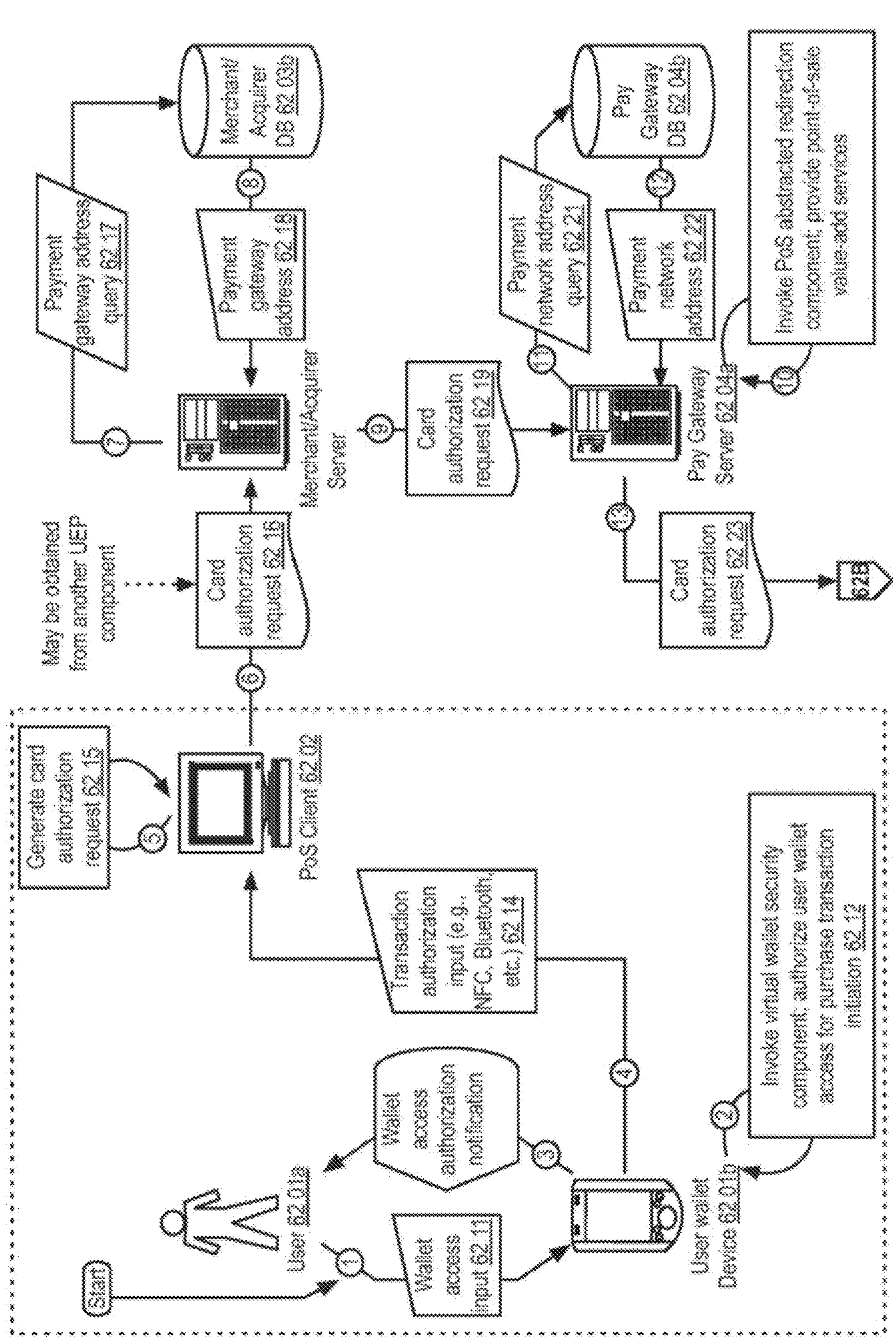
FIGS. 62A-B show data flow diagrams illustrating an example purchase transaction authorization procedure in some embodiments of the WIP.

Further implementations and exemplary data structures of consumer initiated payment request are illustrated in FIG. 62A.

Upon receiving the payment request, e.g., the processing network may forward such payment request message to the WIP server 220 (which may be an independent or affiliated with the payment processing network, etc.), the WIP server 220 may query on a leash parameter list to determine whether the payment request is subject to any account usage limitation. In one implementation, the WIP server 220 may issue PHP commands to request for search results. The WIP server 220 may execute a hypertext preprocessor ("PHP") script including SQL commands to query the database for details of the issuer server. An example substantively in the form of PHP/SQL command listing including the inquiry 238, illustrating substantive aspects of querying the database 219 for leash parameters associated with a consumer account, is provided below:

```
<?PHP
header('Content-Type: text/plain');
mysql_connect("254.93.179.112",$DBserver,$password); // access
database server
mysql_select_db("leash.SQL"); // select database table to search
//create query for issuer server data
$query = "SELECT consumer_id, wallet_id, account_no, card_ccv,
rule_id,
    rule_name, rule_type, FROM LeashTable WHERE account_num
    LIKE '%'
    $accountnum";
$result = mysql_query($query); // perform the search query
mysql_close("leash.SQL"); // close database access
?>
```

In another implementation, the WIP may act as a back channel gateway for the payment processing network (e.g., VisaNet, etc.) to determine if the card has enrolled with WIP service and if the customer has setup his/or her credit card to be protected by WIP. In such scenarios, the leash inquiry 238 may comprise two enrollment API calls generated from the WIP server 220. For example, upon receiving the payment request 211*a*, the WIP may check leash enrollment for the card and leash configuration for transaction originated on this card via an enrollment API call, which may comprise a blocking call the payment processing network makes into the WIP. An example of check leash enrollment request API call may be substantially in the form of an XML-formatted message:

```
<?xml version="1.0" encoding="UTF-8"?>
<Transaction>
    <PersonalInfo>
    <payment_method_type>CreditCard</payment_method_type>
            <payment_method>
                    <exp_month>12</exp_month>
                    <exp_year>2011</exp_year>
                    <holder>Abhinav Shri</holder>
                    <number>4222222222222</number>
                    <verification_value>029</verification_value>
                <hashValue>098fdf98df0h98f09hs87df87fh67r234jl223m42df4f5fh45jd3s8a1fg
        </hashValue> "THIS IS THE HASH OF CUSTOMER NAME AND CC NUMBER. THIS VALUE
        WHEN PASSED BY THE VISA NET TO COMMON SERVICE ALLOWS FOR LTE SERVICE TO
        QUICKY LOCATE THE USER ACCOUNT IN THE COMMON SERVICE DB, AND DETERMINE IF
        THE USER IS A VALID VISA WALLET CUSTOMER, AND IF THEY HAVE SIGNED UP FOR
        LEASH SECURITY SERVICE"
            </payment_method>
    </ PersonalInfo >
</Transaction>
```

An example response check leash enrollment request API call 216 may be substantially in the form of an XML-formatted message similar to the following:

```
<Transaction>
    <enrollmentStatus>Y</type>
<SessionToken>CXYZ1234ASD</SessionToken>
</Transaction>
```

In another implementation, if the reply to this request is "ENROLLED", the WIP may make the second API call to check the configuration for the transaction. An example check leash configuration request API call may take a form similar to the following:

```
<?xml version="1.0" encoding="UTF-8"?>
<Transaction>
<SessionToken>CXYZ1234ASD</SessionToken>
    <type>Sale</type>
<StatusInfo>
<TimeZone>Pacific Time Zone</TimeZone>
<DateTime>12/31/2011 10:20AM</DateTime>
<StatusInfo>
    <PersonalInfo>
      <details>
            <amount type="decimal">100.01</amount>
            <currency>USD</currency>
            <description>Product description</description>
            <email>shriabhi@example.com</email>
            <ip>10.12.27.11</ip>
        </details>
    <BillingInfo>
            <address>111 1st Street</address>
            <city>Denver</city>
            <country>US</country>
            <first_name>Abhinav</first_name>
            <last_name>Shri</last_name>
            <phone>1555555777</phone>
            <state>AL</state>
            <zip>92006</zip>
        </BillingInfo>
    </ PersonalInfo >
</Transaction>
```

An example response check leash enrollment request API call 216 may be substantially in the form of an XML-formatted message similar to the following:

```
<Transaction>
    <Status>AMOUNT_CHECK_FAIL</Status> "A FRAUDSTER
    IS TRYING TO USE A CREDIT CARD
        FOR 100.01$, WHILE THE CUSTOMER ABHINAV HAS
        SET THE MAX AMOUNT ON HIS CARD
        TO NOT EXCEED 20$ per Transaction"
<SessionToken>CXYZ1234ASD</SessionToken>
</Transaction>
```

An alternative inquiry result 216 may comprise retrieved leash parameters associated with the queried account, which may take a similar form to that in 205.

Within implementation, the query results 216 may be returned to the WIP server 220, which may in turn determine whether to approve or deny the payment transaction request base on the leash inquiry results 218. For example, in one implementation, the WIP may retrieve the user leash parameters, and inspect the transaction amount, transaction type, transaction frequency, and/or the like of the received transaction request based on the leash parameters.

For example, if the payment request 211*a-c* comprises a payment amount of $5000.00, but the queried results 216 shows the account has a maximum one-time payment cap of $2000.00, the WIP may not proceed with processing the payment request. In one implementation, the WIP server 220 may send an alert message 223 (e.g., see also FIG. 4G) to the consumer if the transaction request is denied.

In one implementation, if the proposed transaction triggers an alert, WIP may generate an alert message, e.g., by providing a HTTP(S) PUT message including the alert content in the form of data formatted according to the XML. Below is an example HTTP(S) PUT alert 223 message substantially in the form of an XML-formatted message:

```
PUT /alert.php HTTP/1.1
Host: www.leash.com
Content-Type: Application/XML
Content-Length: 718
<?XML version = "1.0" encoding = "UTF-8"?>
<Alert>
    <UserID> JDoe <\UserID>
    <WalletID> JD0001 </WalletID>
    <Time> 23:23:34 00-00-2015 <Time>
    <TransactionID> 000000 <TransactionID>
    <Trigger>
    MaxAmount>
    </Trigger>
    <AlertTemplateID> Tem00001 </AlertTemplateID>
    <Subscription> Email </Subscription>
    <Channel> jdoe@email.com </Channel>
    <Content>
        <Title> "Transaction Alert: $5000.00 from Amazon.com
        </Title>
        <Greeting> "Dear Joe" </Greeting>
        <Body> "We recently note that you have a transaction attempt
    to spend $5000.00 for a one-time checkout. According to the account
    setting, we are going to temporarily suspend the transaction. If you
    have any questions, please contact us. ..." </Body>
        ...
    </Content>
    ...
<\Alert>
```

In one implementation, the WIP may also generate a message and send it to the issuing bank 226, e.g., the user's bank that issues the payment account, etc., to alert the issuing bank not to credit funds to the merchant unless a clearance message is received subsequently. In another implementation, the WIP may generate a payment request message. Further example work flows of WIP are discussed FIGS. 3A-3C.

Figure 2B:
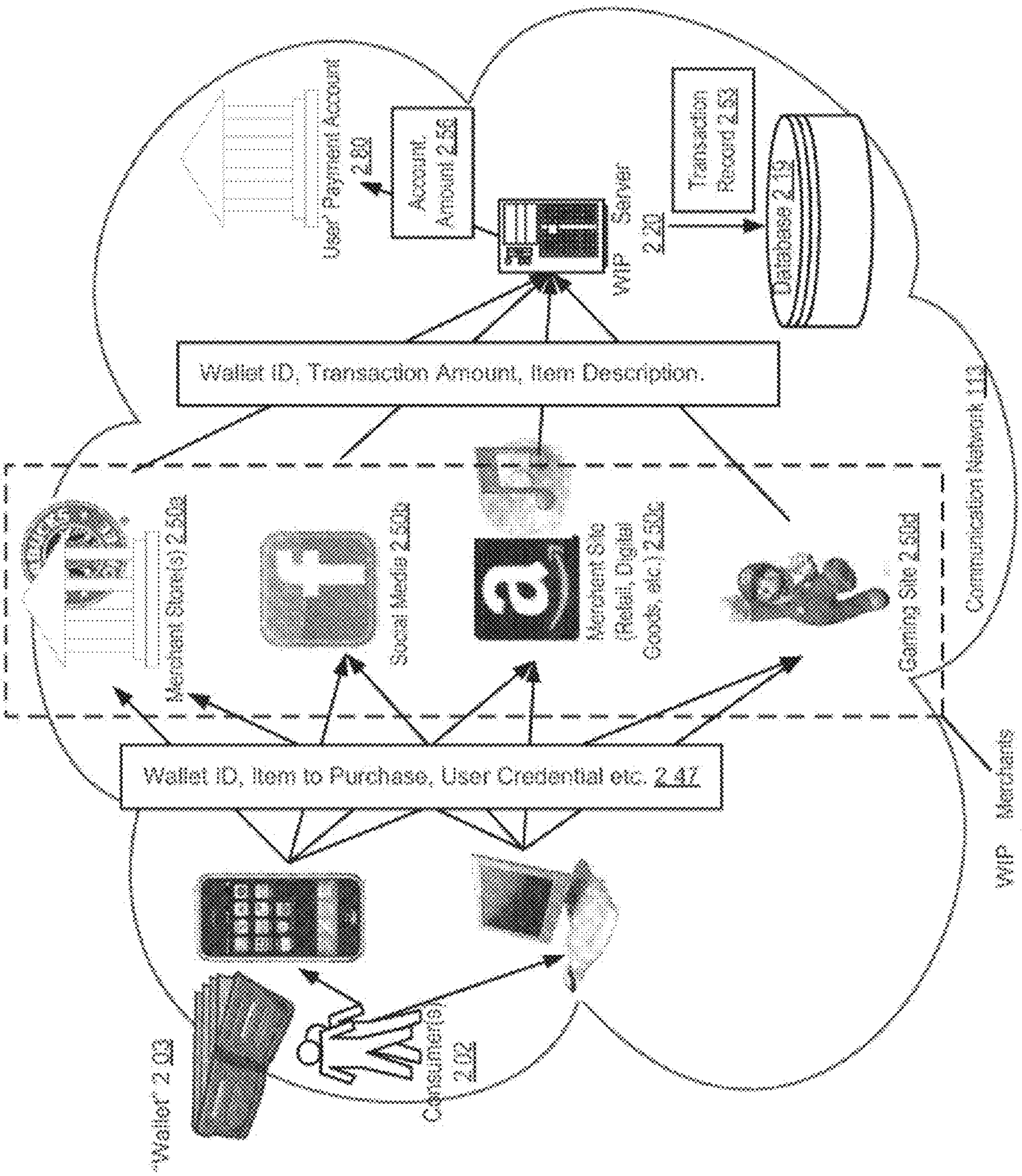

FIG. 2B shows a block diagram illustrating data flows between WIP server and affiliated entities for consumer account enrollment and purchase payment within alternative embodiments of the WIP.

In one embodiment, a consumer may register a "wallet" 203 with the WIP server 220. For example, the consumer may provide user profile information, payment information, bank account information, and/or the like to the WIP server 220, to establish a record comprising the bank account information at the WIP server. In another embodiment, a merchant 250, such as a merchant store 250*a*, a social media platform 250*b*, a merchant shopping website 250*c*, a gaming site 250*d*, and/or the like, may register with the WIP server 220, such that the WIP server 220 may authorize the merchant 250 to engage a WIP component to facilitate consumers to pay via the WIP. For example, a social media platform 250*b*, a merchant site 250*c*, and/or the like, may comprise an icon of WIP on the shopping page, whereas the consumer 202 may click on the icon to pay for a transaction via the consumer's WIP.

In one embodiment, the consumer 202 may operate a personal device, such as a desktop, a laptop, a PDA, a smart phone and/or the like to access a WIP 220, such as, but not limited to merchant store 250*a*, a social media platform 250*b*, a merchant shopping website 250*c*, a gaming site 250*d*, and/or the like. For example, the consumer 202 may open a webpage of Amazon.com, ebay.com, etc., to browse listed items for online shopping. When the user is interested in buying an item, he may click an "Add to Cart" button on the shopping page to indicate an intention of purchasing. As another example, the consumer 202 may access a social media platform 250*b*, a gaming site 250*d*, to purchase gaming points via WIP. The consumer 202 may submit his WIP ID, password, an item to purchase, user credentials 247, and/or the like to the WIP merchant 250.

In one embodiment, upon receiving an indication to engage WIP payment and consumer credentials with regard to his WIP account, the WIP merchant 250 may forward the WIP ID, a transaction amount, an item description 257, and/or the like to the WIP server 220, which may verify the received WIP ID and consumer credentials and proceed with payment processing. For example, the WIP server may retrieve a registered user record based on the received WIP ID, and obtain previously registered user financial information, such as, but not limited to a checking account, a credit card account, a PayPal account, and/or the like, and submit a fund transfer request, comprising an account number and an amount 256 to the user's financial account 180 via a financial network. The consumer's payment account 280 may process the fund transfer and return with a payment confirmation to the WIP server 220 to indicate successful payment processing. Upon confirmation of payment, the WIP may generate and store the transaction record 387 at a database 219.

In one implementation, the WIP server 220 may send the payment confirmation to the merchant 250, which may provide a confirmation page to the consumer 202 to complete the transaction.

In one implementation, the WIP server 220 may also communicate with a WIP database 219. In some embodiments, a WIP server 220 may be integrated with a local WIP database 219. I other embodiments, a WIP server 120 may access a remote WIP database 219 via the communication network 113. The WIP server 220 may send the information to the database 219 for storage, such as, but not limited to user account information, order record information, payment record information, and/or the like, as further illustrated at 6619 in FIG. 66.

Within implementations, the WIP may be used in a variety of transactions, such as but not limited to eCommerce, social networks, money transfer/personal payments, mobile commerce, proximity payments, gaming, and/or the like.

Figure 3A:
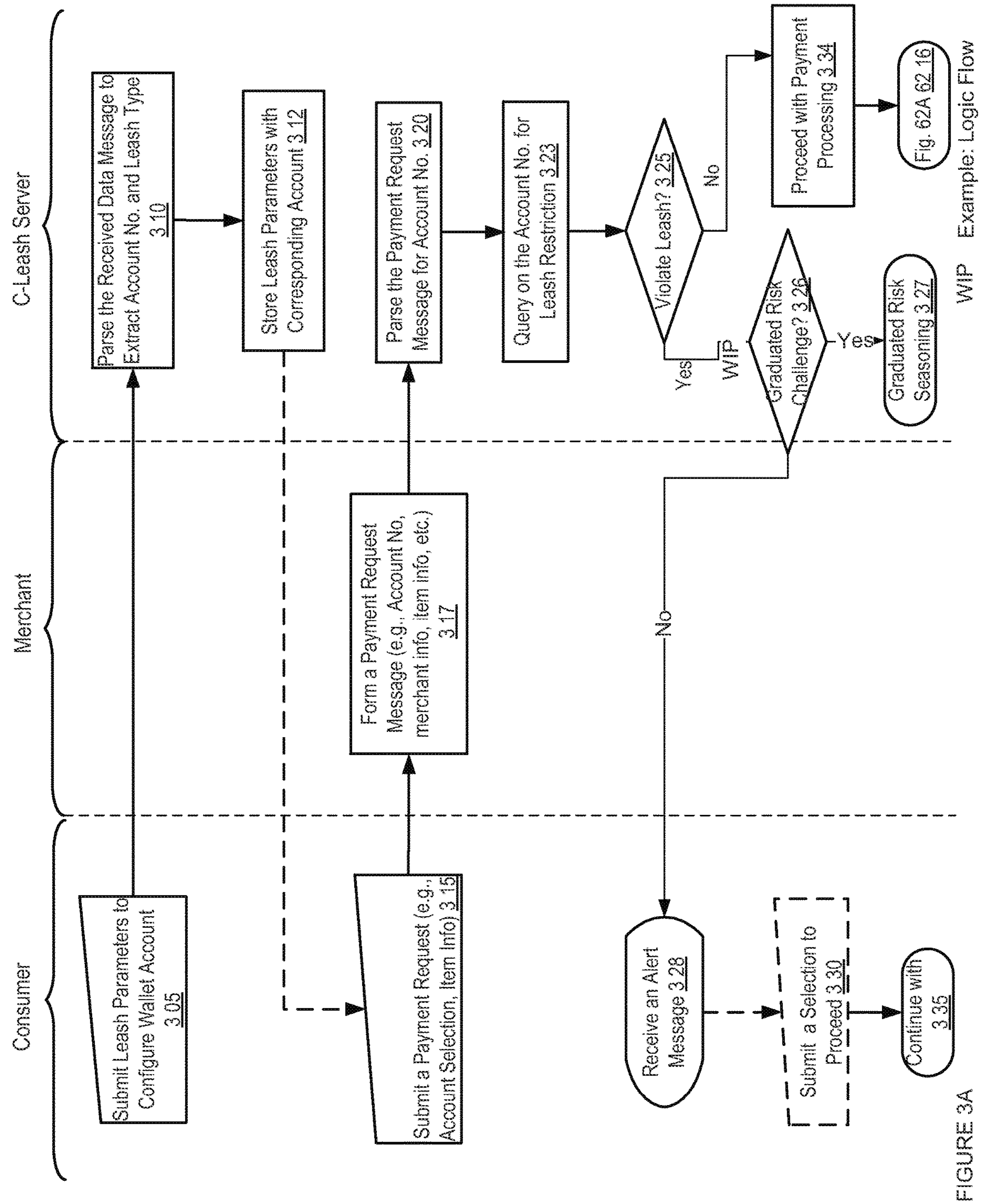
FIGS. 3A-3C provide logic flow diagrams illustrating payment processing within embodiments of the WIP.
Figure 3B:
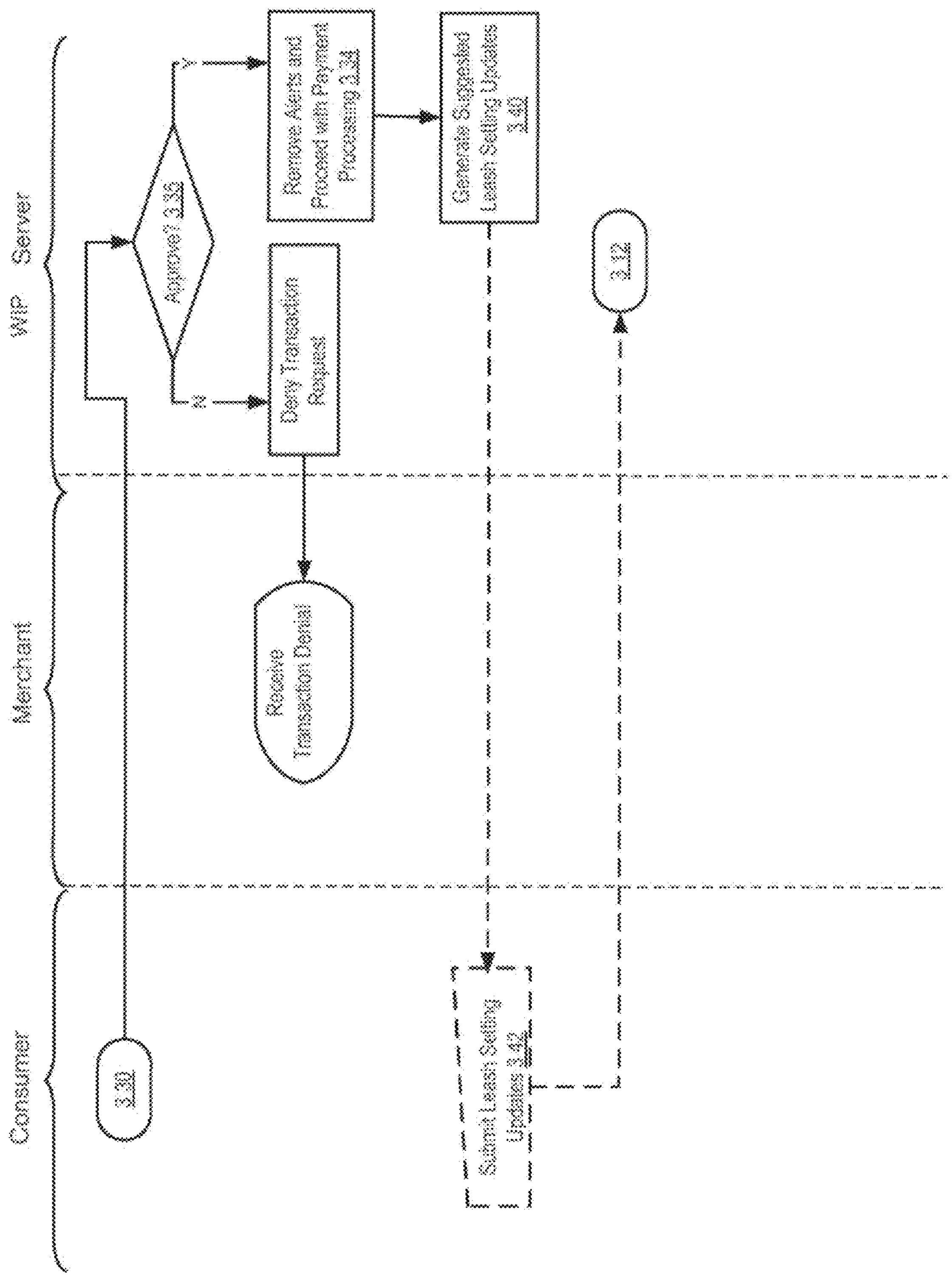

FIGS. 3A-3B provide logic flow diagrams illustrating payment processing within embodiments of the WIP. Within implementations, a consumer may submit leash parameters to configure wallet account 305 via an electronic user interface (e.g., see FIG. 4A). The consumer configured leash parameters may be received at the WIP server, which may in turn parse the received data message (e.g., 205 in FIG. 2A) to extract account number and leash type (e.g., time, amount, type, bond, etc.) 310. In one implementation, the WIP server may store leash parameters with the corresponding account 312 (e.g., 209 in FIG. 2A).

Within implementations, the consumer may submit a payment request (e.g., with the account selection, item information, etc.) 315 to a merchant, e.g., at a POS checkout terminal, at an online shopping checkout page (e.g., via a lightbox, etc.) 317. The merchant may form a payment request message (e.g., see 211*c* in FIG. 2A) that include consumer's payment information, merchant information and item information 317 to the WIP server. The WIP server may parse the payment request message for a payment account number 320, and query (e.g., 238 in FIG. 2A) on the account number to determine whether there is any payment control leash parameters associated with the account 323. For example, the WIP may retrieve the stored payment control rules, and compare against the merchant information, item information in the payment request message to determine whether the requested payment violate any of the leash parameters, e.g., exceeding a maximum payment amount, a maximum payment counts per day, payment originated from a disabled geo-location, an unapproved merchant, etc.

In one implementation, if the payment request does not violate any of the leash restrictions 325, the WIP may proceed with payment processing 334. For example, the WIP server may forward the payment request message to a payment processing unit (e.g., VisaNet, etc.), e.g., at 6216 in FIG. 62A.

In another implementation, if the payment request violates the leash parameters 325, the WIP may determine whether the violation suffices a graduated risk challenge 326, and if yes, the WIP may proceed to graduated risk seasoning 327 to process the transaction request, as noted in greater detail in U.S. application Ser. No. 13/434,818, filed Mar. 29, 2012, entitled "Graduated Security Seasoning Apparatuses, Methods And Systems,". The entirety of the application is hereby expressly incorporated by reference. In such scenarios, WIP may allow a user to relax leash constraints by assessing the risk and providing appropriate challenge to the user (e.g., asking for user password, sending a text requesting a PIN as a response, having an agent to call the consumer to overwrite, etc.)

Figure 4D:
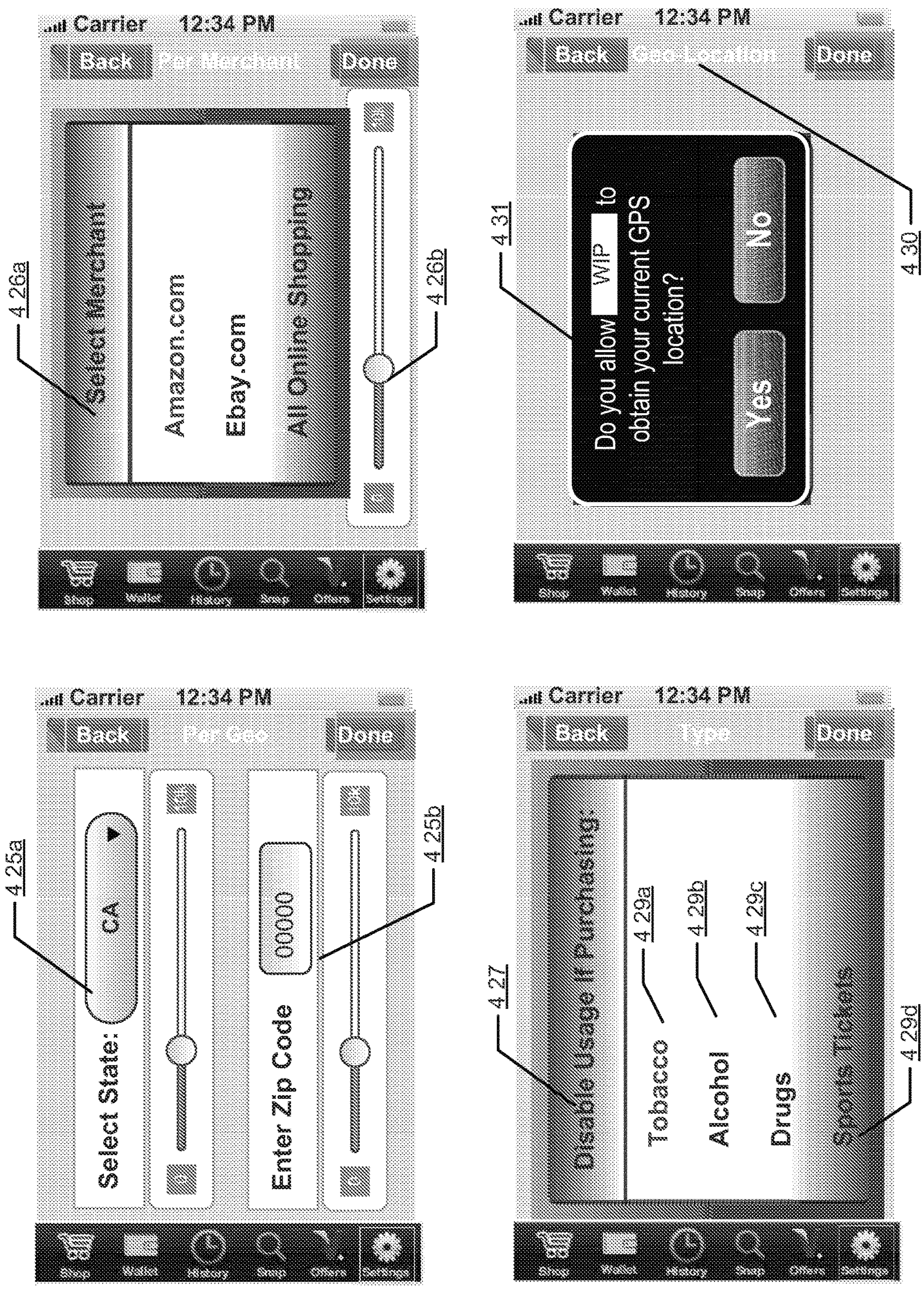
Figure 4E:
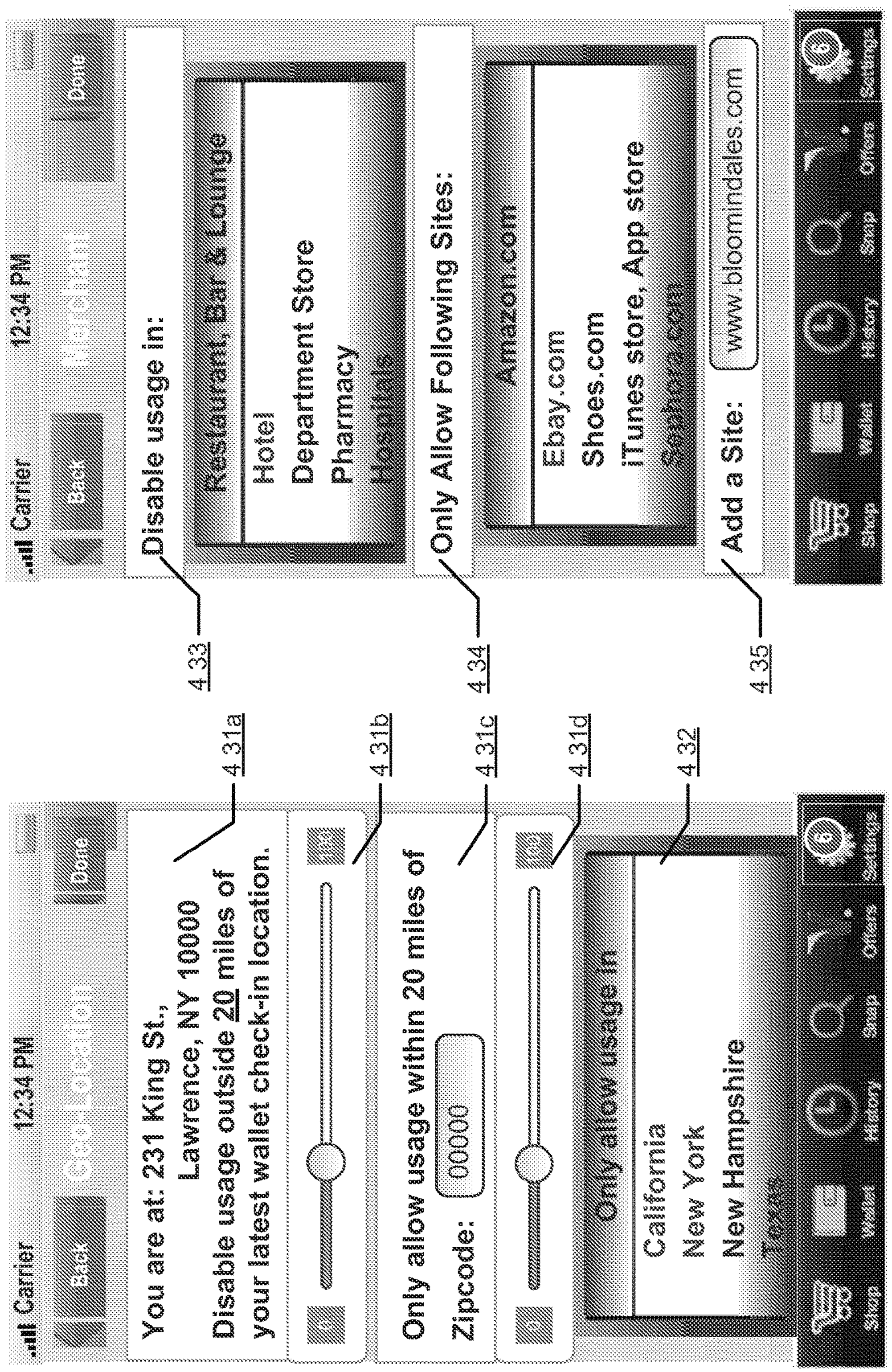
Figure 4F:
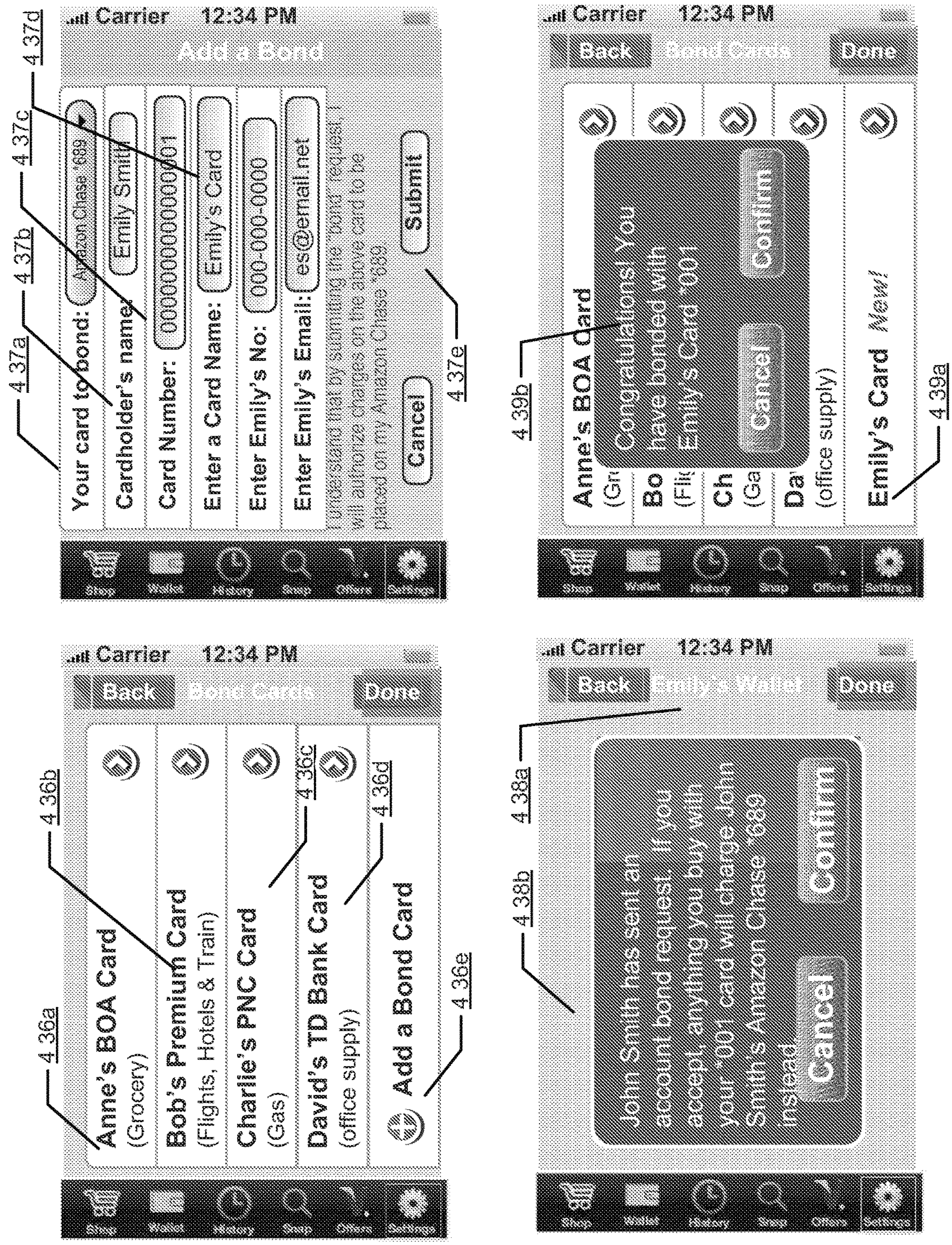
Figure 4G:
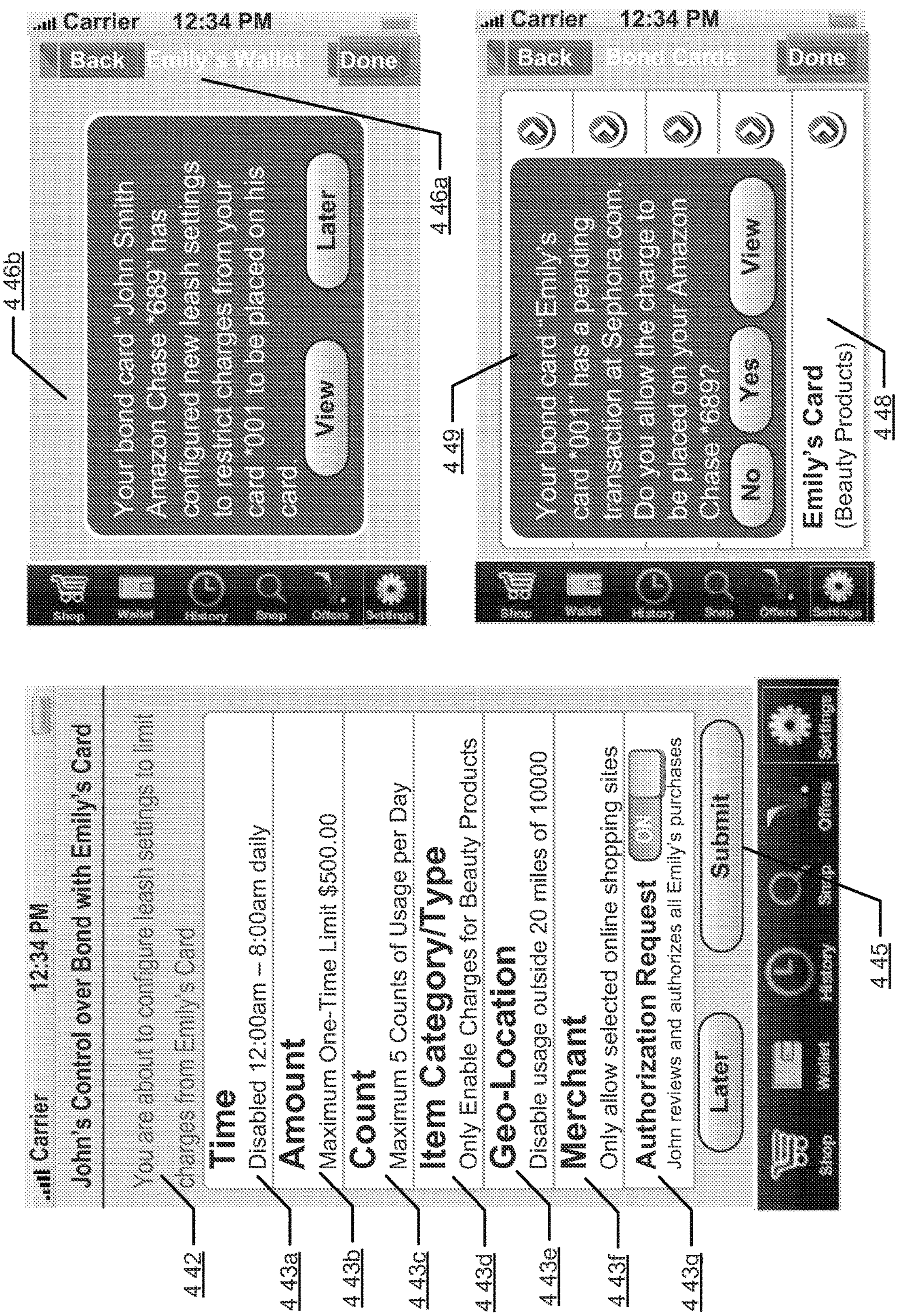

In another implementation, if the transaction request fails the graduated risk challenge at 326, the consumer may receive an alert message 328 (e.g., 442*a-g* in FIG. 4G). The consumer may review the alert message and elect to submit a selection to proceed 330. For example, continuing with FIG. 3B, the consumer may elect to approve the alerted transaction even if it violates one or more payment control rules 335. In such scenarios, the WIP server may remove alerts and proceed with payment processing 334, and may optionally generate suggested leash setting updates 340. For example, if the payment rules have been configured to disable any payment transaction during the time 12:00 AM to 8:00 AM, but the consumer has manually approve a transaction request at 12:23 AM, the WIP server may inquire whether the consumer would like to update the leash settings, e.g., by relaxing the time constraint to 12:30 AM to 8:00 AM, and/or the like. In other embodiments, the WIP server may deny a transaction request 337 and the merchant may receive the transaction denial 338.

In one implementation, the WIP may provide suggested leash setting at 340 based on consumer recently transaction records. For example, if the consumer has manually approved a transaction occurred at 12:23 AM, but disapproved transactions occurred at 12:47 AM, the WIP server may suggest the consumer to relax the original time constraints from 12:00 AM to 8:00 AM to restrict transactions after 12:30 AM. As another example, when the original payment control has a maximum one-time payment amount of $500.00, if the consumer has manually approved a transaction with an amount of $550.00 but disapproved transactions greater than $800.00 or more, the WIP may suggest the consumer to reset the maximum one-time amount to be $600.00, etc.

In one implementation, the consumer may submit leash setting updates 342, e.g., to accept suggested leash parameters or to enter new leash settings, in a similar format as that at 312.

Figure 3C:
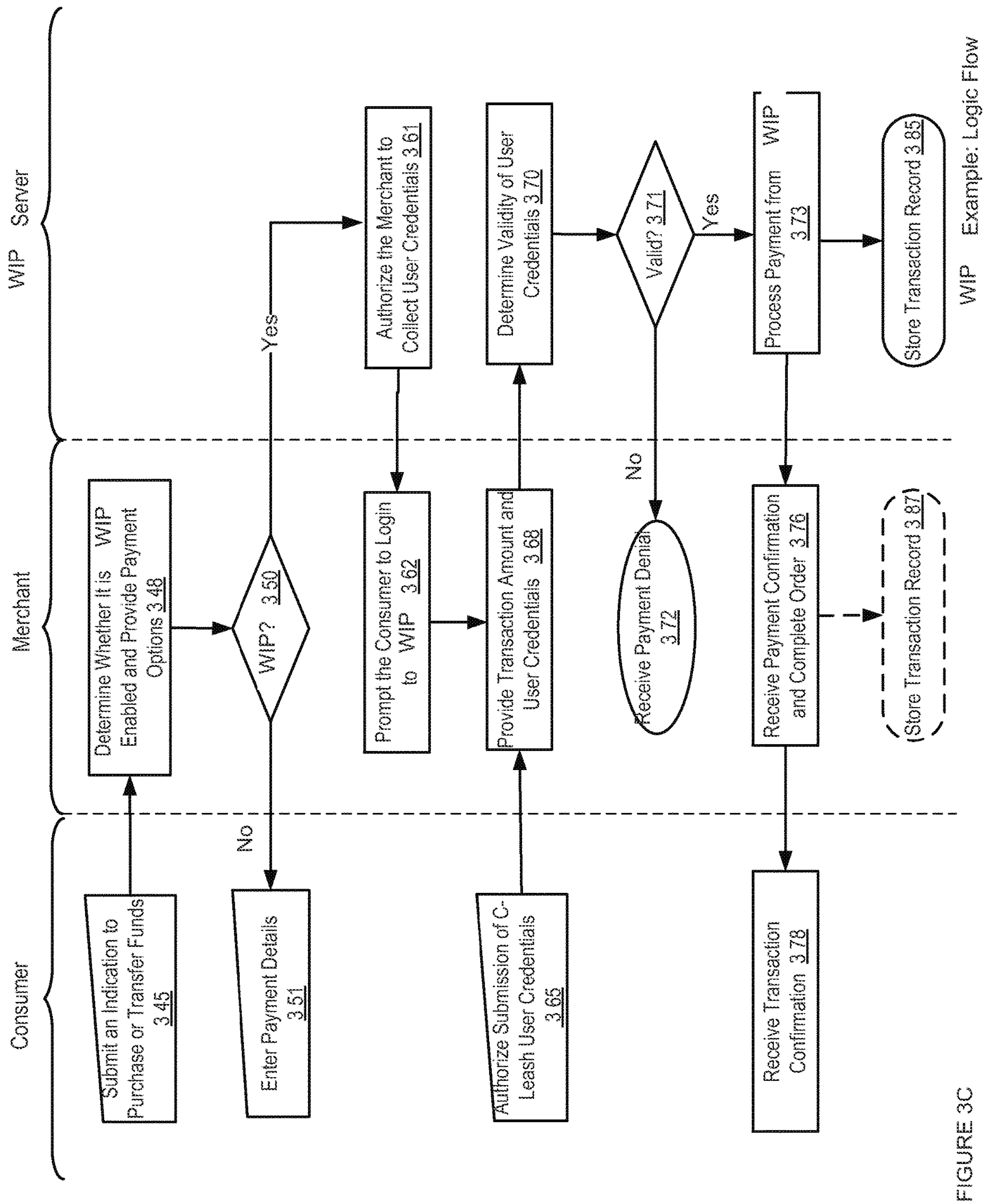

FIG. 3C provides a logic flow diagram illustrating payment processing within embodiments of the WIP. In one embodiment, the consumer may submit an indication to purchase or transfer funds 345. For example, the consumer may visit a merchant website, e.g., Facebook.com, Amazon.com, etc., and request purchasing an item from the website, transfer funds to a friend, and/or the like. The merchant website may determine whether WIP is authorized on its website, and may provide a list of payment options 348.

If the merchant is registered with WIP 350, the WIP server may authorize the merchant to collect user credentials for login to the WIP 311, and the merchant website may prompt the consumer to login to WIP 362. Otherwise, the merchant website may request the consumer to provide payment details for alternative payment options 351, e.g., credit card, debit card, PayPal account, and/or the like.

In one implementation, the consumer may authorize submission of his WIP user credentials 361, such as, but not limited to a WIP ID, a password, and/or the like. For example, the consumer may enter the WIP ID and password into a pop-up window provided from the merchant website. For another example, the consumer may authorize the merchant website to provide the WIP user credentials, e.g., previously stored in HTML5, cookies, etc., to the WIP server. For another example, the consumer may authorize the WIP server, via a remote component running on the merchant website (e.g., a Java applet, etc.) to provide user credentials to the WIP for verification.

In one implementation, when the user submits user credentials to log into WIP 362, the merchant website may forward the user credentials and transaction details to the WIP server, which may determine the validity of the user credentials 370. If the WIP credentials are not valid, the WIP server may deny the payment request and send a notification of denial to the merchant website. In another implementation, if the consumer provided credentials are valid 371, the WIP server may process payment from the WIP 373. For example, the WIP server may communicate with a consumer's bank account associated with the WIP and request a fund transfer of an indicated amount. The WIP server may then store a transaction record 387.

In one implementation, after processing the payment, the WIP server 120 may send a payment confirmation notice to the merchant website, which may in turn complete the order 376 and store transaction record 387 in the database. In one implementation, the merchant website may provide a confirmation page comprising transaction confirmation to the consumer 378.

FIGS. 4A-4I provide exemplary mobile wallet user interface (UI) diagrams illustrating aspects of consumer configuration within embodiments of the WIP. With reference to FIG. 4A, a consumer may enter a panel for leash settings within the mobile wallet, and select an account 401 to set up payment control parameters. For example, the consumer may select from a list of enrolled accounts 402*a-f*. In one implementation, the consumer may activate or deactivate the leash settings associated with each account by sliding the buttons to be ON or OFF. Toddling the switch may cause an updated leash parameters message (e.g., 205 in FIG. 2A) to be sent to activate or deactivate the account; if the account is activated, existing leash parameters stored and associated with the account may be put in effect. Alternatively, when the leash settings of the account is turned off, the account may be used without the existing restrictions. In another implementation, the consumer may configure the WIP to automatically activate leash settings by synchronizing with calendar events, e.g., see in FIG. 4B. In one implementation, the consumer may tap on a listed account and view a brief summary of the payment control rules associated with the account 405, such as but not limited to the one time maximum payment amount, maximum usages per week, bond cards, and/or the like. In one implementation, the WIP may notify the consumer of new alerts 406.

In one implementation, when a consumer selects an account to configure "leash setting," e.g., an "Amazon Chase" account 408, the consumer may be provided a list of options to configure the payment control parameters such as transaction time 409*a*, transaction amount 409*b*, transaction count 409*c*, purchase type 409*d*, transaction geo-location 409*e*, merchant 409*f*, bond cards 409*g*, and/or the like.

With reference to FIG. 4B, when a consumer chooses to configure time constraint 411, in one implementation, the consumer may disable card usages in selected days of a week 412, e.g., disabling corporate card usage during weekend, etc. In another implementation, the consumer may specify a period of time 413, e.g., 12:00 AM to 8:00 AM to block usage of the card. In another implementation, the consumer may allow transactions within a period of time 414. Additionally, the consumer may configure whether to automatically configure card usage control by downloading calendar events 415.

For example, when the consumer activates the calendar auto-setup 416, the consumer may choose to enable the card for various calendar events, e.g., business trips, vacation, conferences, etc. 417. For example, when the calendar events indicate "business trip" for a period of time, the WIP may automatically enable use of a corporate card. In such scenarios, the WIP may send a notification of the calendar event 418 for the consumer to confirm enabling usage of an otherwise restricted corporate card.

With reference to FIG. 4C, when the consumer elects to configure amount limits 420, the consumer may configure general amount limits 421*a*, amount per item 421*b*, amount per bond card 421*c*, amount per geo-location 421*d*, amount per merchant 421*e*, and/or the like. For example, the consumer may generally configure a one-time maximum amount 422*a*, a daily maximum amount 422*c*, a weekly maximum amount 422*b* via a sliding button.

As another example, the consumer may configure maximum amount limit defined by purchase item category, e.g., a maximum amount for beauty products 423*a*, another maximum amount for electronics 423*b*, etc. As another example, the consumer may configure maximum amount limits for different bond card accounts, e.g., spouse account, child account, parent account, corporate group account, and/or the like 424*a* via a sliding button 424*b*.

With reference to FIG. 4D, when the consumer elects to configure amount limits per geo-location, the consumer may configure a maximum amount limit per state 425*a*, or per zip code 425*b*. As another example, the consumer may elect to configure an amount limit 426*b* per different merchant 426*a*.

In another implementation, consumer may configure to disable restricted item category/type 427, e.g., to disable purchases of tobacco 429*a*, alcohol 429*b*, drugs 429*c*, sports tickets 429*d*, etc. with the "Amazon Chase" card.

In another implementation, the WIP may allow a user to configure usage restrictions based on the geo-location 430 so as to prevent fraudulent use, e.g., the mobile wallet may be stolen and been used by unauthorized users, but the WIP setting will block such unauthorized usage if it occurred in suspicious geo-locations. For example, the WIP may attempt to obtain the GPS location of the consumer 431, and with reference to FIG. 4E, the WIP may determine the location of the consumer 431*a*, and allow the consumer to allow transactions within a distance 431*b* of his/her own geo-location. In one implementation, the consumer's location may be updated periodically so that the mobile wallet captures the latest location of the consumer's.

In another implementation, the consumer may enter a zipcode 431*c* and allow transactions within a radius of the zipcode 431*d*. In another implementation, the consumer may select allowable states 432.

In another implementation, the consumer may configure a blacklist and/or whitelist of merchants for usage limits based on merchant types. For example, the consumer may have a blacklist of merchants to disable usage in restaurant, hotel, department stores, and/or the like, e.g., 433. As another example, the consumer may maintain a blacklist of disabled merchants to disable transactions that take place in certain online shopping sites. For another example, the consumer may maintain a whitelist of allowable merchants, e.g., only authorizing transactions from reputable shopping sites such as ebay.com, Amazon.com, Apple iTunes store, Sephora.com, etc., but disable usage from other unverified sites 434. In another implementation, the consumer may add verified shopping sites by entering a URL 435.

With reference to FIG. 4F, the consumer may configure leash control parameters of the bond cards 436*a-c*. In one implementation, a consumer may set up bond cards for his/her own cards enrolled in a wallet, e.g., the consumer's "Amazon Chase Visa" card 402*d* in FIG. 4A, etc. In one implementation, a consumer may allow charges on the bond cards to be automatically placed onto his/her own card. For example, when the cardholder of the bond card "Anne's BOA card" 436*a* purchases grocery, the shopping expenses may be automatically placed onto the consumer's "Amazon Chase Visa" card, instead of the "Anne's BOA card." Example aspects of the bond cards may be applied for cost sharing between family and/or friends, corporate purchase reimbursement, cash back incentives, and/or the like. One of the advantages to bond numerous cardholders onto a single card is that any reward, benefits, points, etc., offered on that single card may accrue at a faster rate.

In one implementation, the consumer may configure restrictions on charges from the bond cards to be placed on his/her own card. For example, the consumer may have configured that charges only from certain product category/type may be placed onto his/her own Amazon Visa account, e.g., only allowing grocery expenses from Anne's BOA card 436*a*, travel expenses including flights, trains and hotels from Bob's premium card 436*b*, gas filling from Charlie's PNC card 436*c*, office supply purchases from David's TD Bank card 436*d*, and/or the like. In one implementation, the consumer may add a new bond card by choosing an "ADD" icon 436*e*.

Upon choosing the "ADD" icon 436*e*, the consumer may be directed to fill in information for the bond subsidiary card, such as, but not limited to the bond subsidiary cardholder's name 437*b*, bond subsidiary card number 437*c*, the bond subsidiary cardholder's phone number and email address, and/or the like. The consumer may be optionally asked to provide bank routing number, CCV code, and/or the like. In one implementation, the consumer may designate a card name for the new bond card, or the WIP may suggest a name 437*d* for the new card based on the cardholder's name, bank name, and/or the like. In one implementation, the consumer may select and/or confirm his/her own bond master account from a drop down menu 437*c*, e.g., to select the bond master account as "Amazon Chase *689."

In one implementation, the consumer may proceed to submit 437*d* the bond request, and the cardholder, e.g., "Emily," may receive a notice within her wallet 438*a* that a bond request is originated from the consumer's Amazon Chase Visa card 438*b*. It should be noted that such notices may be received within an electronic wallet, email, telephone, instant messages, SMS, and/or the like. Although the previous scenarios describe a push bond request, WIP may also allow the subsidiary account holder to make a pull bond request to the bond master account holder, requiring the bond master account holder to authorize charges being placed onto the master account. Although 438*a-b* in FIG. 4F show a bond request requiring only a selection of the "Confirmation" button, depending upon risk factors, increased challenges (e.g., PIN code, user name and password, biometrics, voice identification, and/or the like) may be employed as a prerequisite to establish the bond, as noted in greater detail in U.S. application Ser. No. 13/434,818, filed Mar. 29, 2012, entitled "Graduated Security Seasoning Apparatuses, Methods And Systems,". The entirety of the application is hereby expressly incorporated by reference.

The above embodiments show a bond push request message being sent from a bond master account (e.g., John Smith's Amazon Chase Visa *689) holder to a subsidiary bond user (e.g., Emily's *001 card). Once confirmed, this bond between the bond master account and the subsidiary bond account may allow the subsidiary account user to make charges with their card, and such charges and/or benefits (e.g., cash back, rewards, points, etc.) accrued on the bond master account. In such scenarios, the subsidiary account may act as a proxy of the bond master account. More details of use of a proxy account is provided in U.S. application Ser. No. 61/669,525, filed Jul. 9, 2012, entitled "Wallet In Proxy Apparatuses, Methods And Systems," which is expressly incorporated by reference.

In one implementation, upon the bonded cardholder, e.g., "Emily" confirming the bond request, the consumer may receive a notice 439*b* that "Emily's card" has been successfully bonded, and the entry of "Emily's card" may be added to the bond card list 439*a*.

With reference to FIG. 4G, upon establishing the bond with "Emily's card," the consumer may configure leash settings 442. For example, the consumer may limit charges from usage of "Emily's card" to a restricted time frame 443*a*, amount restrictions 443*b*, count restrictions 443*c*, item category/type restrictions 443*d*, geo-location restrictions 443*e*, merchant restrictions 443*f*, and/or the like. In one implementation, the consumer, as the bond master account holder, may request to review and authorize the bond subsidiary account's transaction details prior to placing a charge on the master account. For example, the consumer may turn on the authorization request 443*g* restriction button. In one implementation, the consumer may submit the configured leash parameters to the WIP, which may in turn store the leash parameters. For example, the consumer may configure that only usage of "Emily's Card" near their home zipcode (e.g., 443*e*) and only for beauty products (e.g., 443*d*) can be transferred to the consumer's card. As such, if the cardholder "Emily" uses the bonded "Emily's card" outside of the geographical range specified in the leash setting 443*e*, or to purchase items that have a Merchant Category Code (MCC) not in the category of beauty products, the WIP may deny such a charge to be placed onto the consumer's Amazon Chase Visa card.

In one implementation, upon leash configuration, the cardholder of the bond card, e.g., "Emily," 446*a*, may receive a notice indicating that new leash settings have been configured by the cardholder of the bond card 446*b*.

In one implementation, upon configuring leash settings, the consumer may view from the bond card list that the bonded "Emily's card" is for "beauty products" 448. In one implementation, as the bond master account holder has requested authorization for every transaction from the bond subsidiary account holder, when the subsidiary account holder uses the subsidiary account to purchase items, e.g., Emily shops at Sephora.com, the bond master account holder may receive a notification 449 of the purchasing activity. The bond master account holder may elect to review transaction details to approve and/or disapprove that a charge is to be placed onto the master account, e.g., the Amazon Chase *689 account.

Figure 4H:
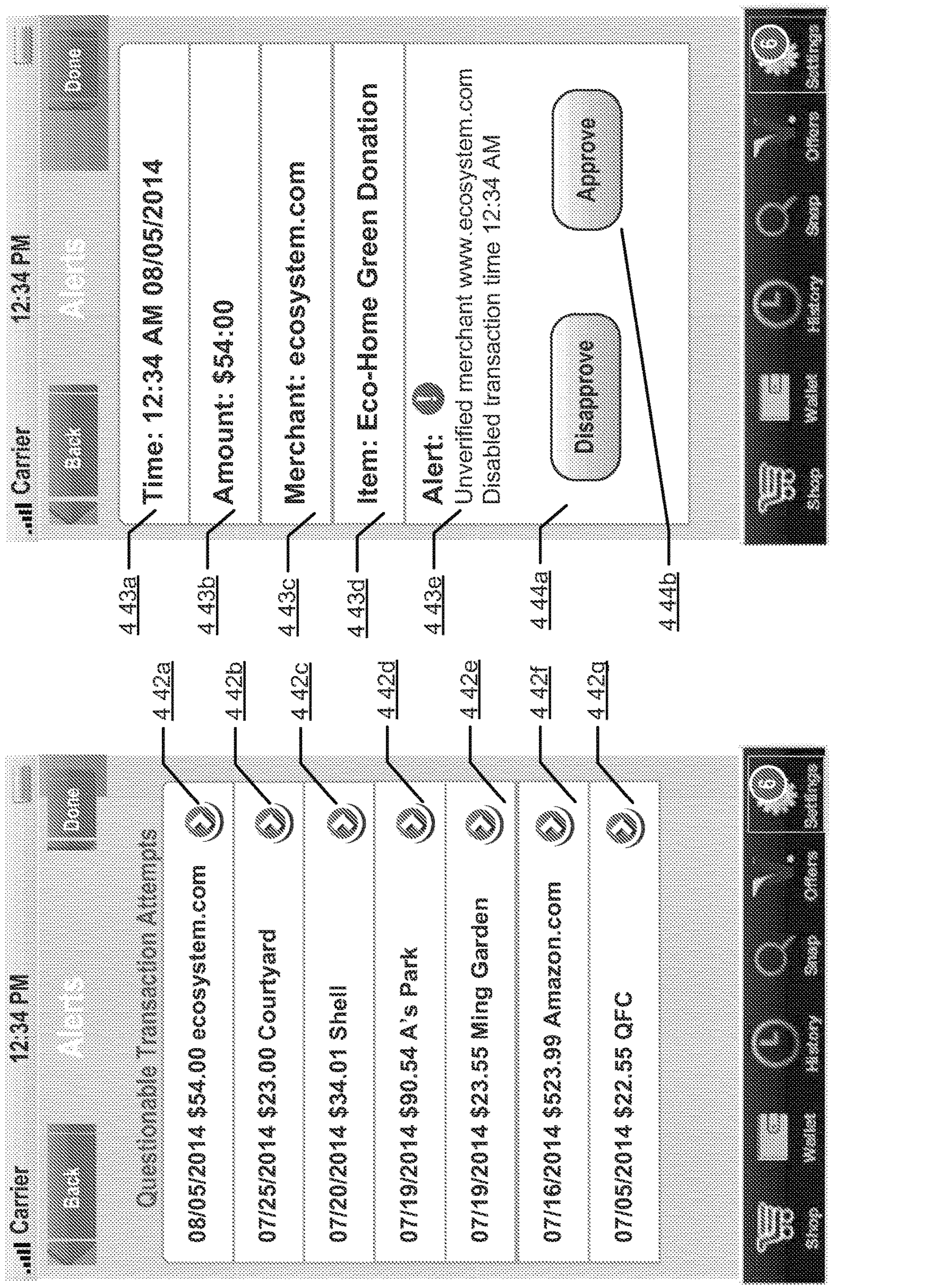

With reference to FIG. 4H, when a consumer taps on the notification icon 406 in FIG. 4A, the consumer may view a list of questionable transaction attempts 442*a*-442*g*, which may have violated one or more leash usage rules. For example, the consumer may view details of a questionable transaction including the time 443*a*, amount 443*b*, merchant 443*c*, purchase item 443*d*, as well as an alert 443*e* providing reasons to suspend the transaction attempt. In one implementation, the consumer may disapprove the transaction 444*a* so that the transaction request will be denied. Consequently, as shown in FIG. 4I, the consumer may receive a confirmation 445 message that the questionable transaction has been denied in order to protect the account.

In another implementation, the consumer may have the option to manually approve the transaction 444*b*, and subsequently as shown in FIG. 4H, the consumer may view a summary of the approved transaction 446, and an option to update the current leash settings 447.

Figure 4J:
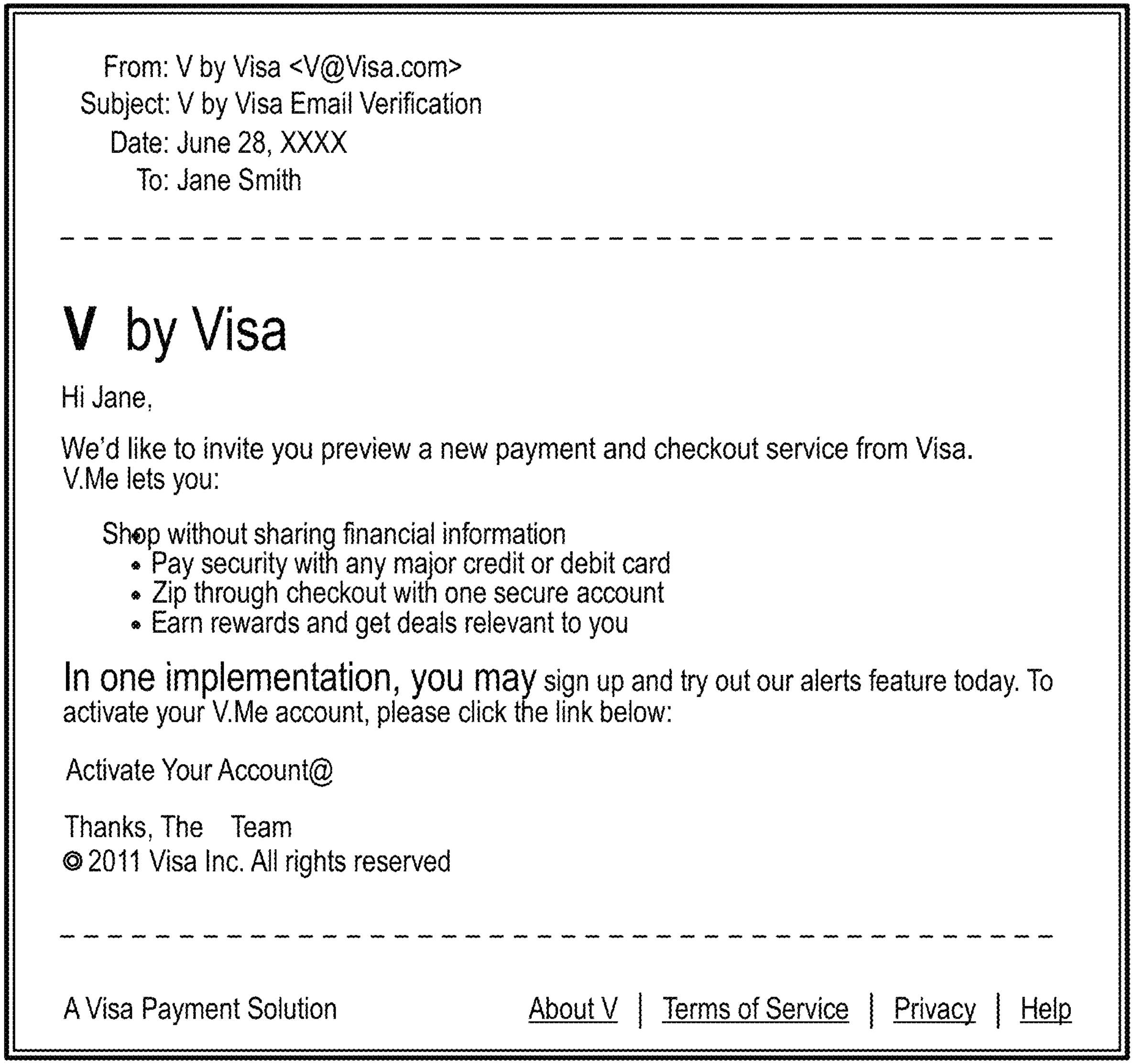
FIGS. 4J-4Q provide exemplary web based UI diagrams illustrating consumers signing up for WIP alerts within embodiments of the WIP.
Figure 4K:
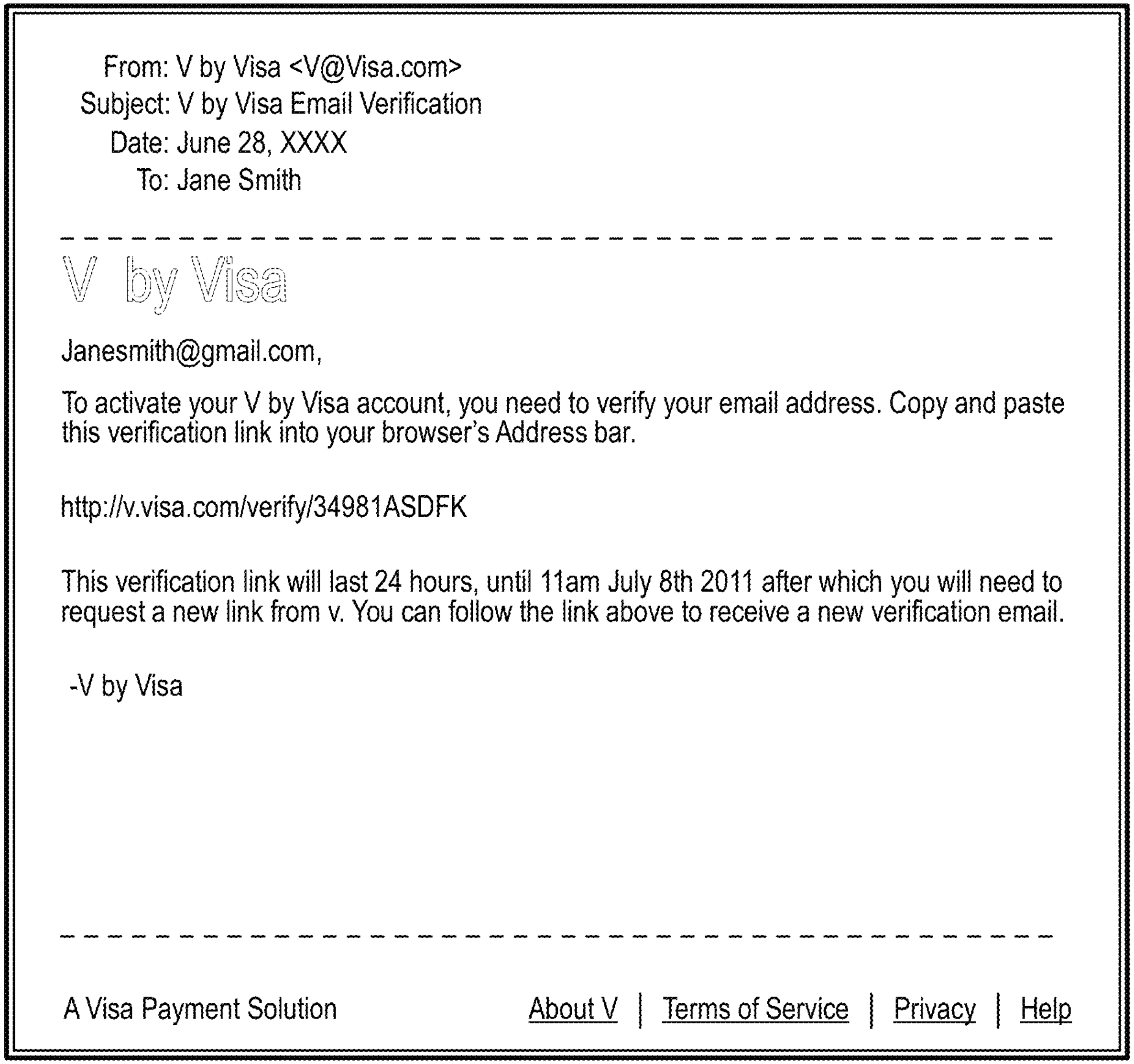
Figure 4L:
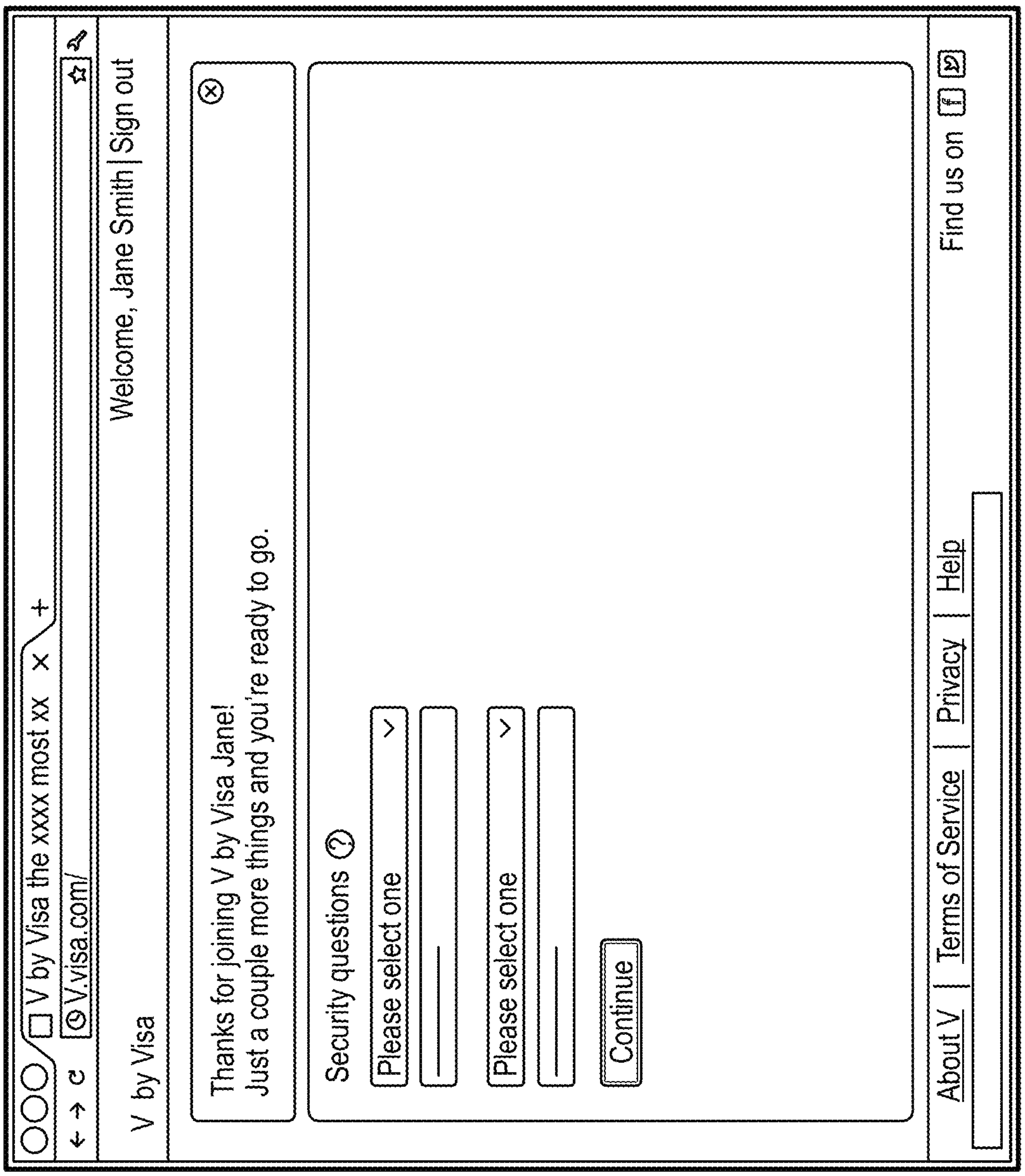
Figure 4M:
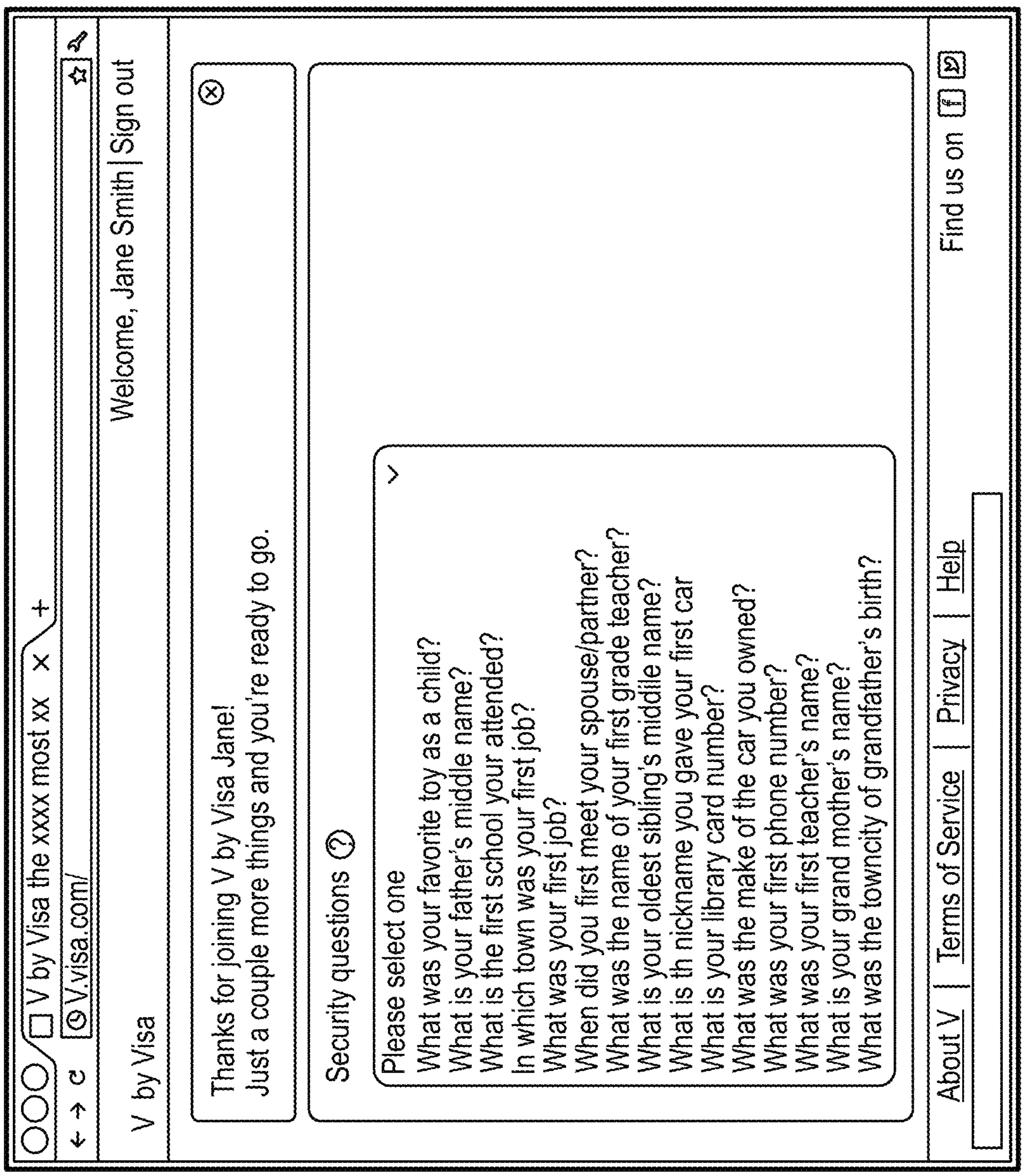
Figure 4N:
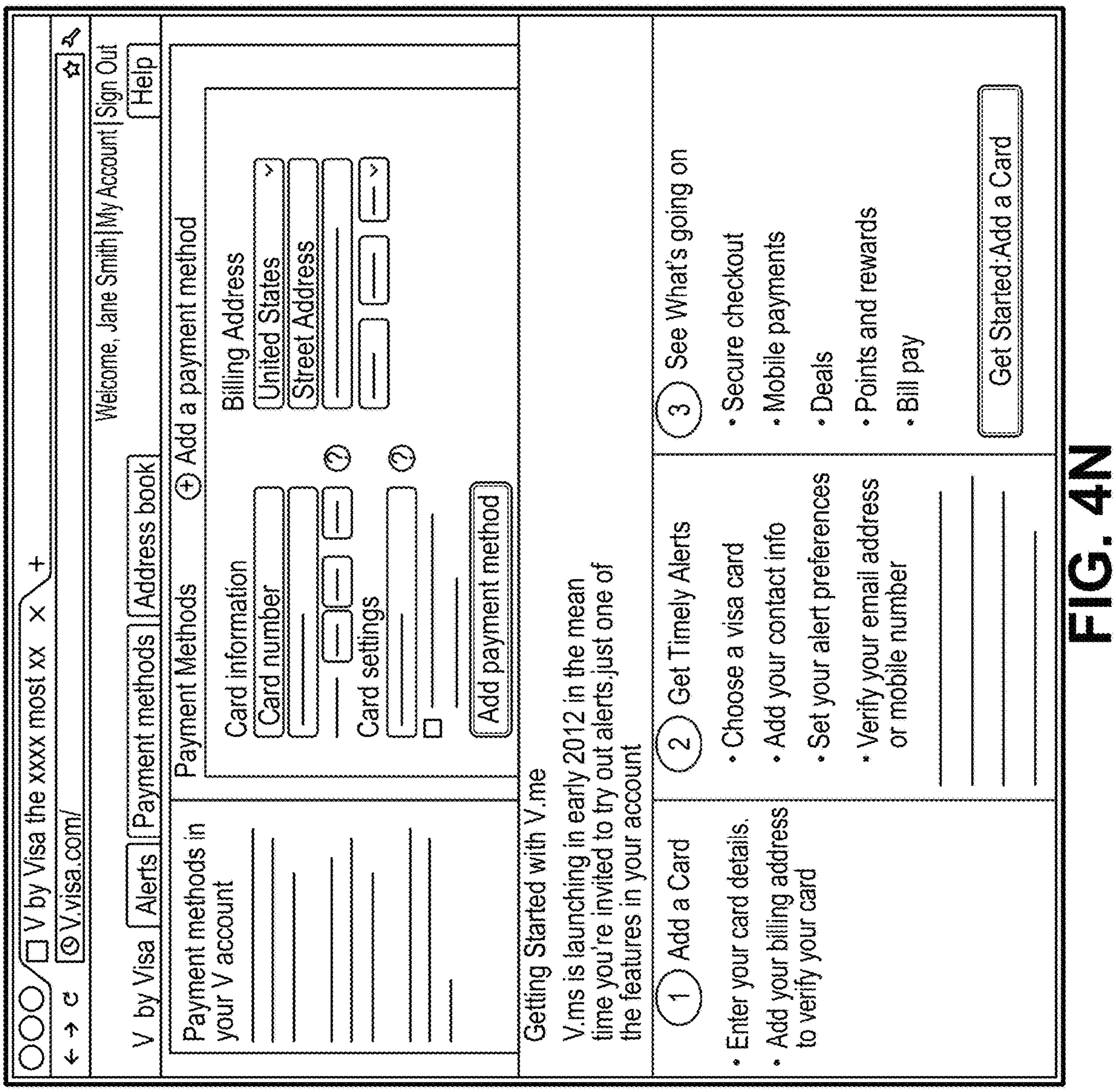
Figure 4O:
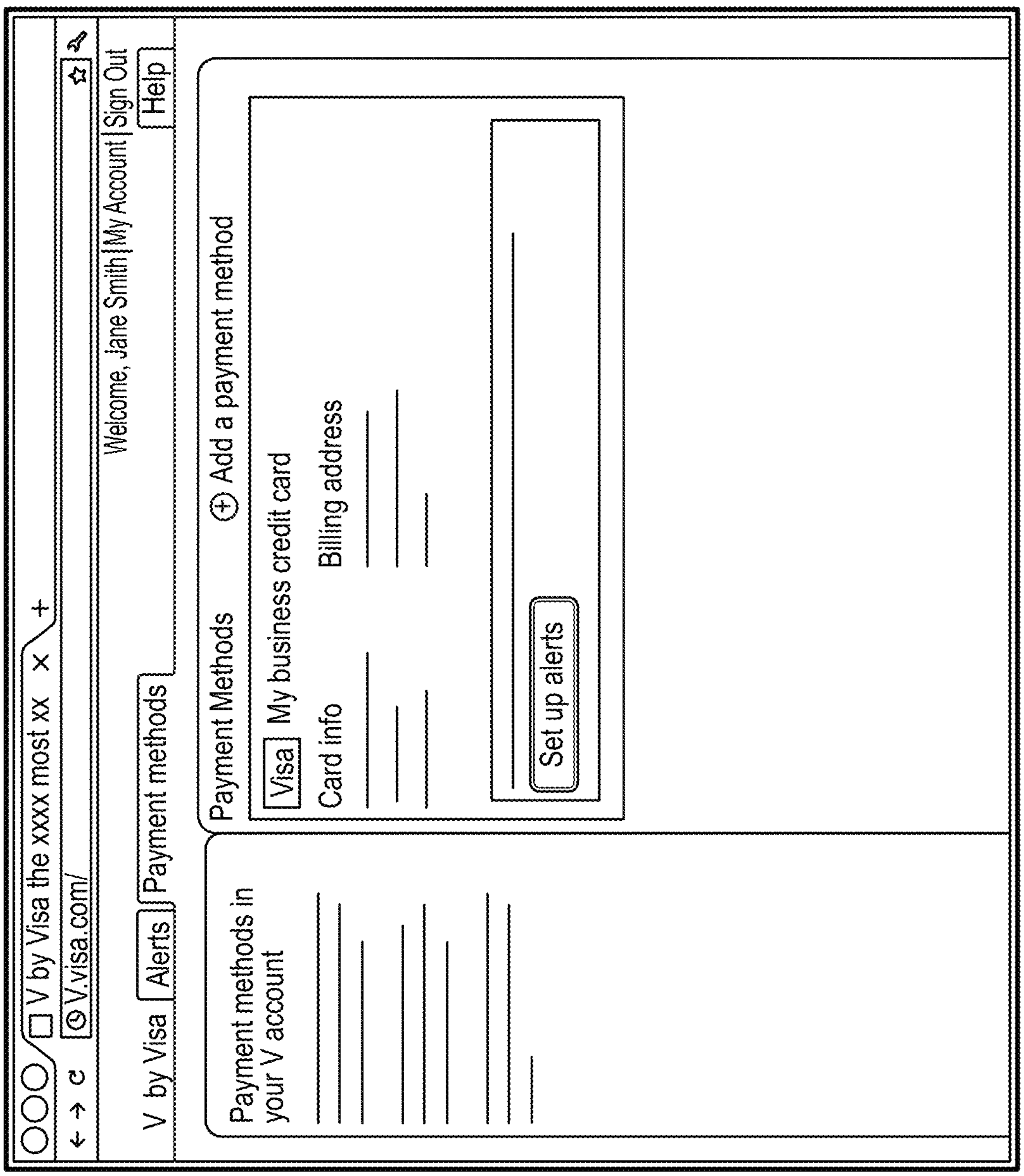
Figure 4P:
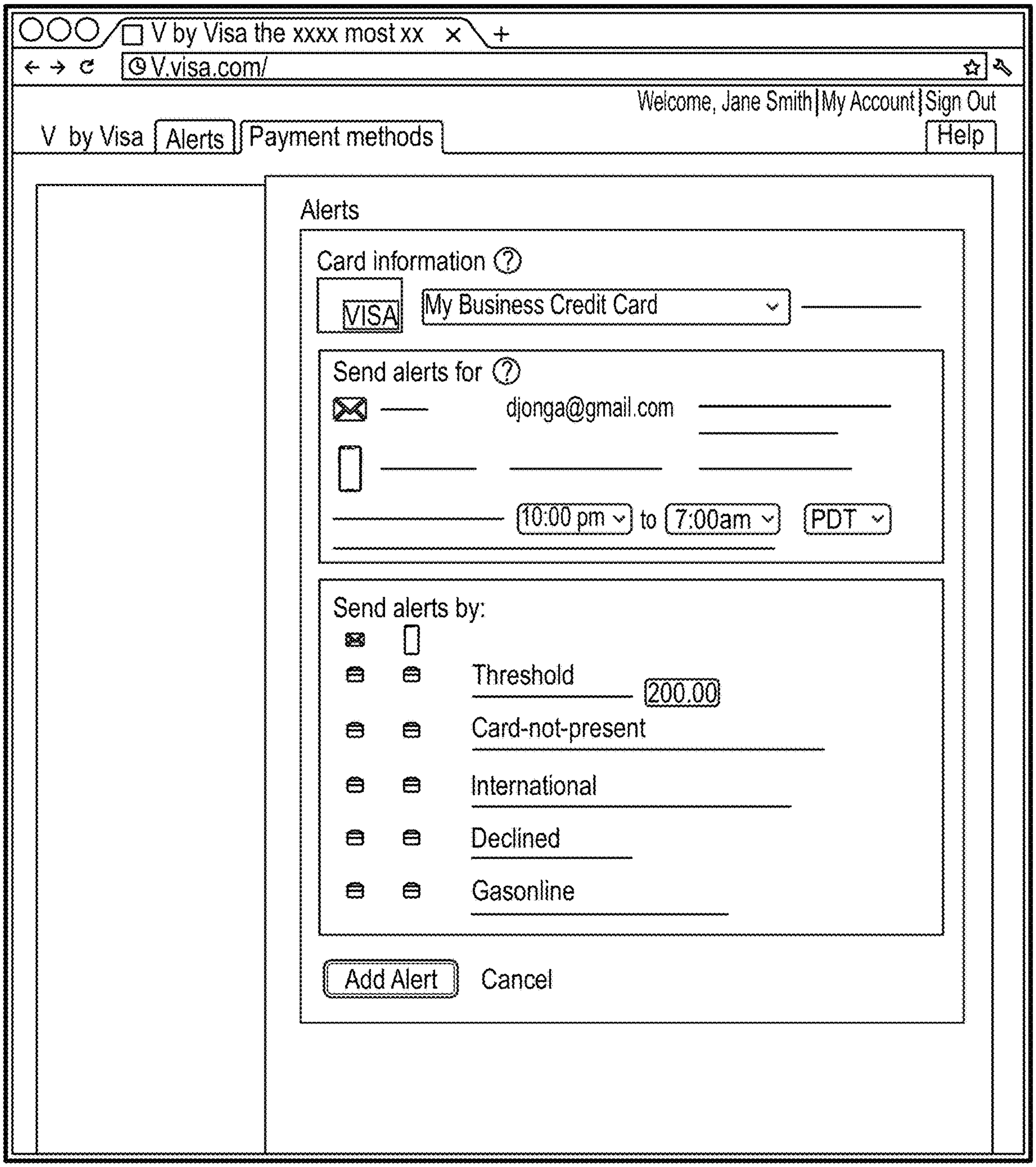
Figure 4Q:
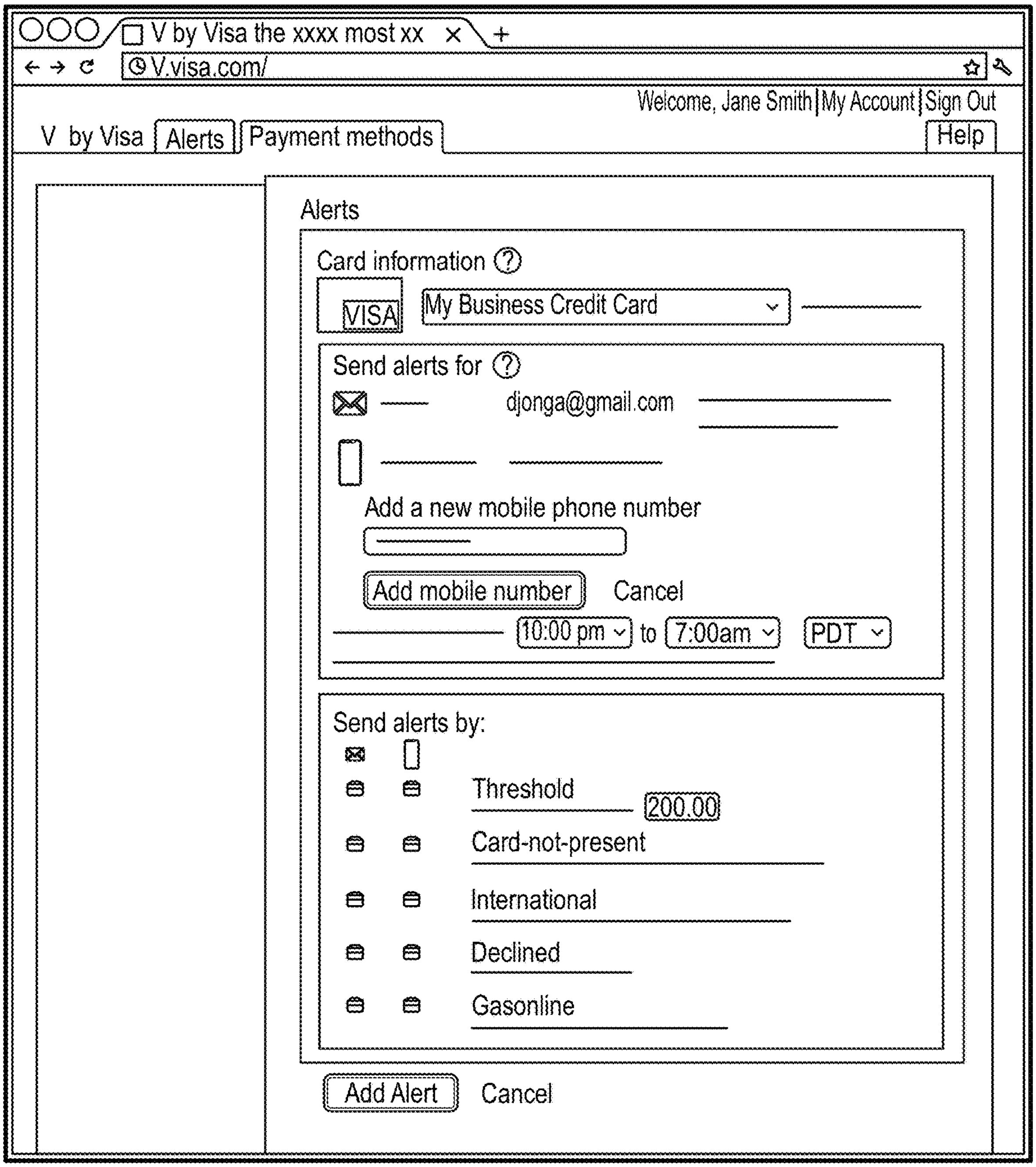

FIGS. 4J-4Q provide exemplary web based UI diagrams illustrating consumers signing up for WIP alerts within embodiments of the WIP. With reference to FIG. 4J, consumers who receive an invitation email may be able to enroll with WIP. Invitation may be sent to pre-selected partner employees and may not be offered to external consumers. With reference to FIG. 4K, in one implementation, after consumer enter their invite code, the invitation box "dissolves" and renders the enrollment form, and consumers may verify their email address before they continue, e.g., by clicking on a confirmation link sent to their email address. With reference to FIGS. 4L-4M, consumer may enter security questions after email verification. With reference to FIGS. 4N-4O, consumer may have a step by step guide for setting up payment methods and alerts, and enter an enrolled account profile page to click on set up alerts. With reference to FIGS. 4P-4Q, in one implementation, before subscribing to alerts, consumer may start by adding a mobile number to their profile. In one implementation, consumer may be asked to verify their mobile number before it can be added to their profile, and consumer may enter pin sent to their mobile number in this screen to verify the mobile phone number. In one implementation, the consumer may add alerts for multiple Visa cards and see their alert subscriptions, and may manage their account information such as adding a secondary email address or mobile number, or changing password.

Figure 5A:
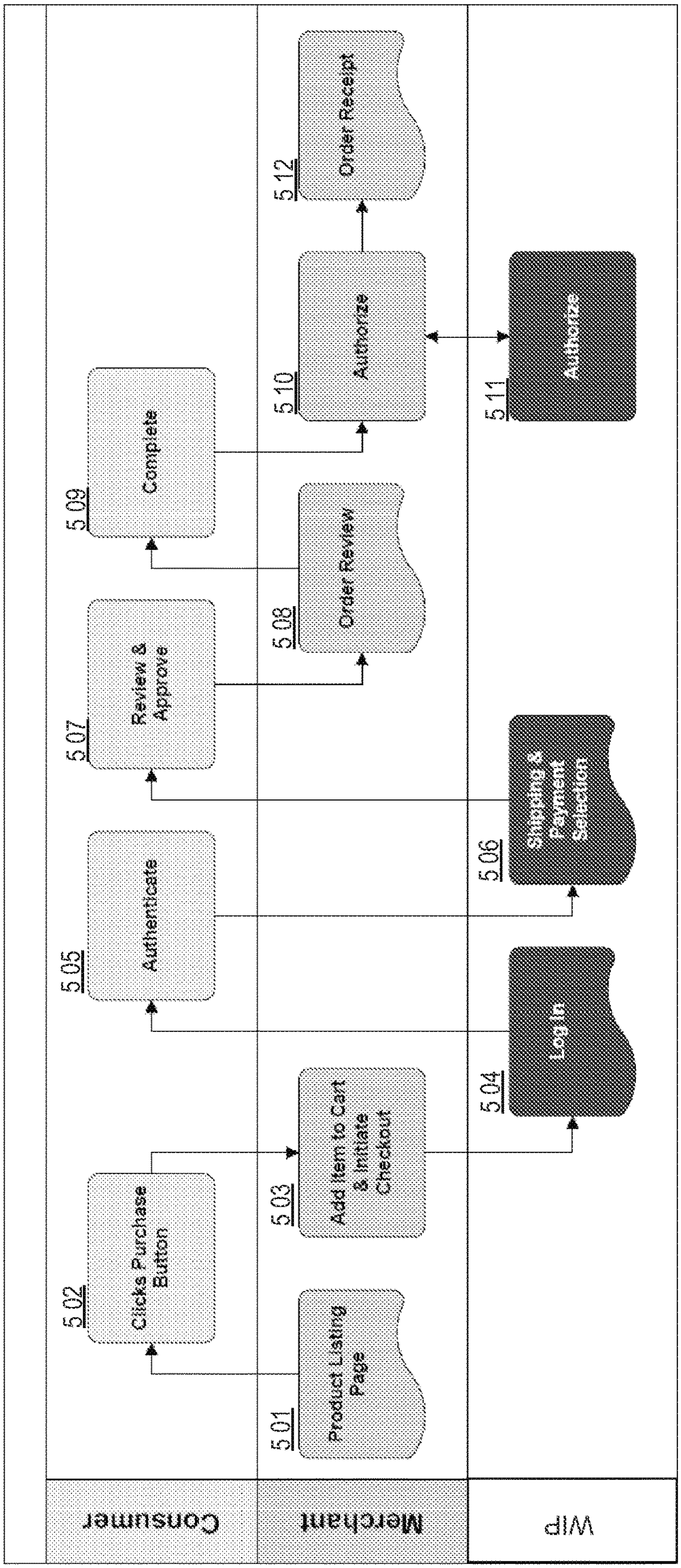
FIGS. 5A-5E provide transaction flow diagrams illustrating aspects of checkout with a WIP lightbox within embodiments of the WIP.

FIGS. 5A-5D provide transaction flow diagrams illustrating aspects of checkout with a WIP lightbox within embodiments of the WIP. With reference to FIG. 5A, from the product listing page 501, the consumer may click a checkout button 502, and a specific item is immediately added to the consumers cart 503 and the checkout process is initiated, using WIP as the Method of Payment (MOP). The WIP light-box is instantiated with authentication 505, where the consumer is given the opportunity to log into 504 their WIP account and select their shipping address and payment method 506. Once selected, the consumer is returned back to the Merchant Name Order Review page 507, where the consumer may make any final changes to their order or purchase up-sell/cross-sell items 508. After the consumer clicks a Complete Button, the merchant will create an authorization for the transaction 510-511 for the consumer, display the Order Receipt page 512 to the consumer, and continue processing the transaction.

Figure 5B:
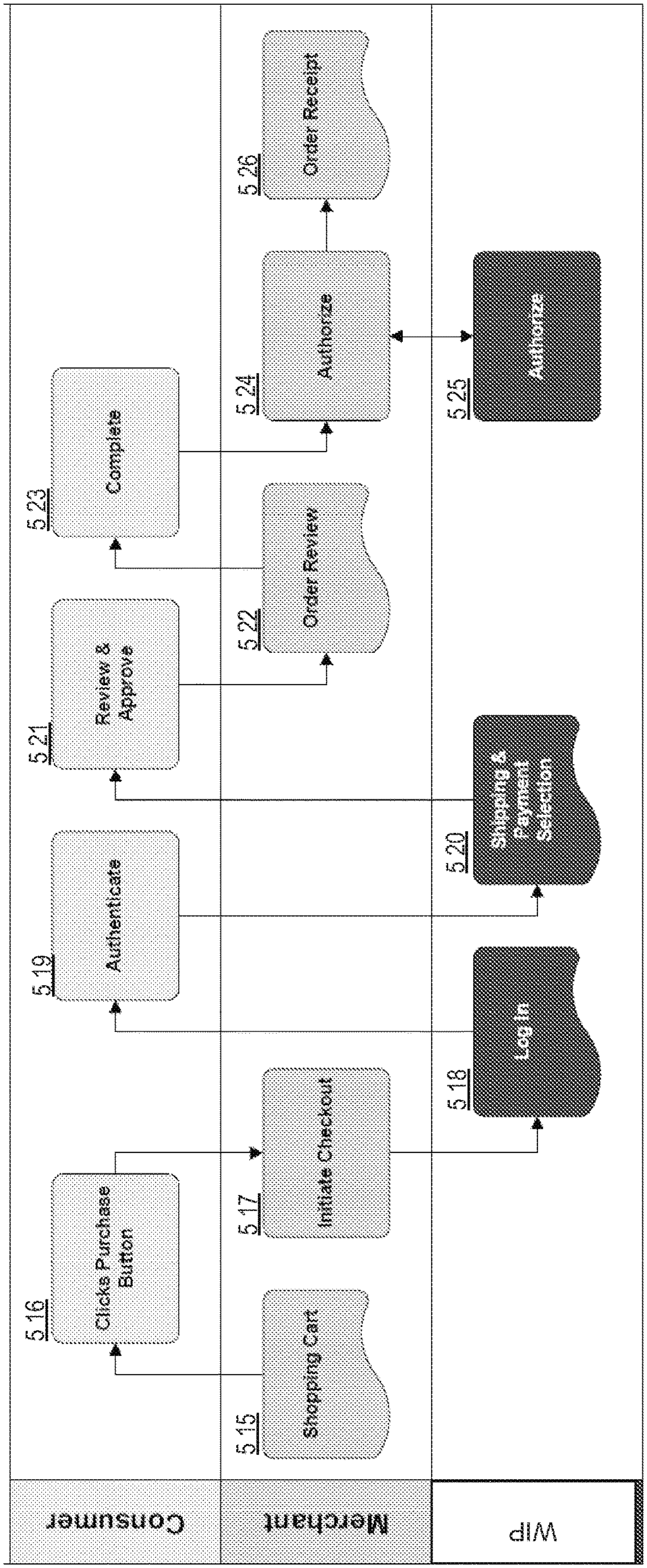

With reference to FIG. 5B, from a Shopping Cart page 515, the consumer may click a WIP checkout button 516. The checkout process is initiated 517, using WIP as the Method of Payment (MOP). The WIP light-box is instantiated with authentication 519, where the consumer is given the opportunity to log into 518 their WIP account and select their shipping address and payment method 520. Once selected, the consumer is returned back to the Merchant Name Order Review page 521-522, where the Consumer can make any final changes to their order or purchase up-sell/cross-sell items. After the consumer clicks a Complete Button, the merchant may create an authorization 524-525 for the transaction, display the Order Receipt page to the consumer 526, and continue processing the transaction.

Figure 5C:
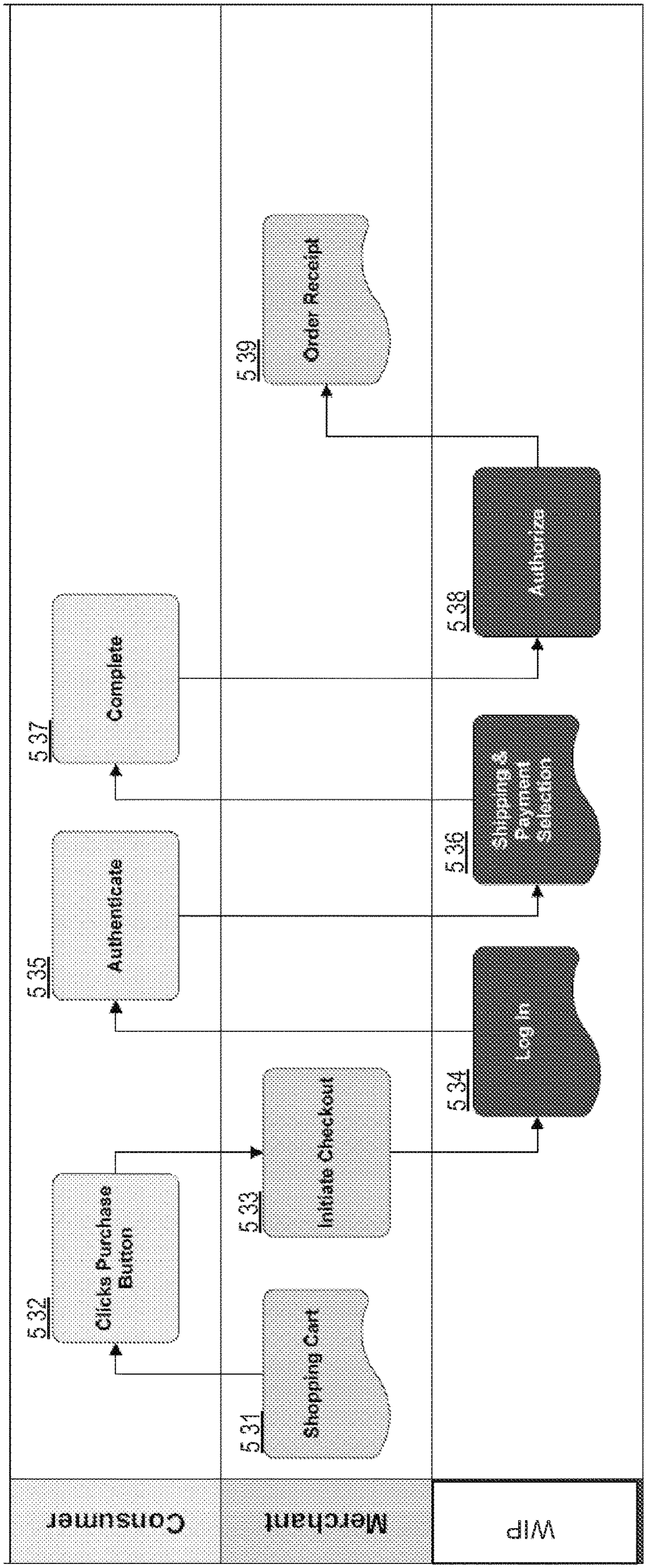

With reference to FIG. 5C, from a Shopping Cart page 531, the consumer may click the WIP checkout button 532. The checkout process is initiated 533, using WIP as the Method of Payment (MOP). The WIP light-box is instantiated with authentication 535, where the consumer is given the opportunity to log into 534 their WIP account and select their shipping address and payment method 520 to log into their WIP account and select their shipping address and payment method 536. Once selected, the consumer may click the Pay Button where a payment authorization is created 537, and the consumer is returned to the merchant where the authorization is recorded 538. The Order Receipt page is shown 539, and WIP may continue processing the transaction.

Figure 5D:
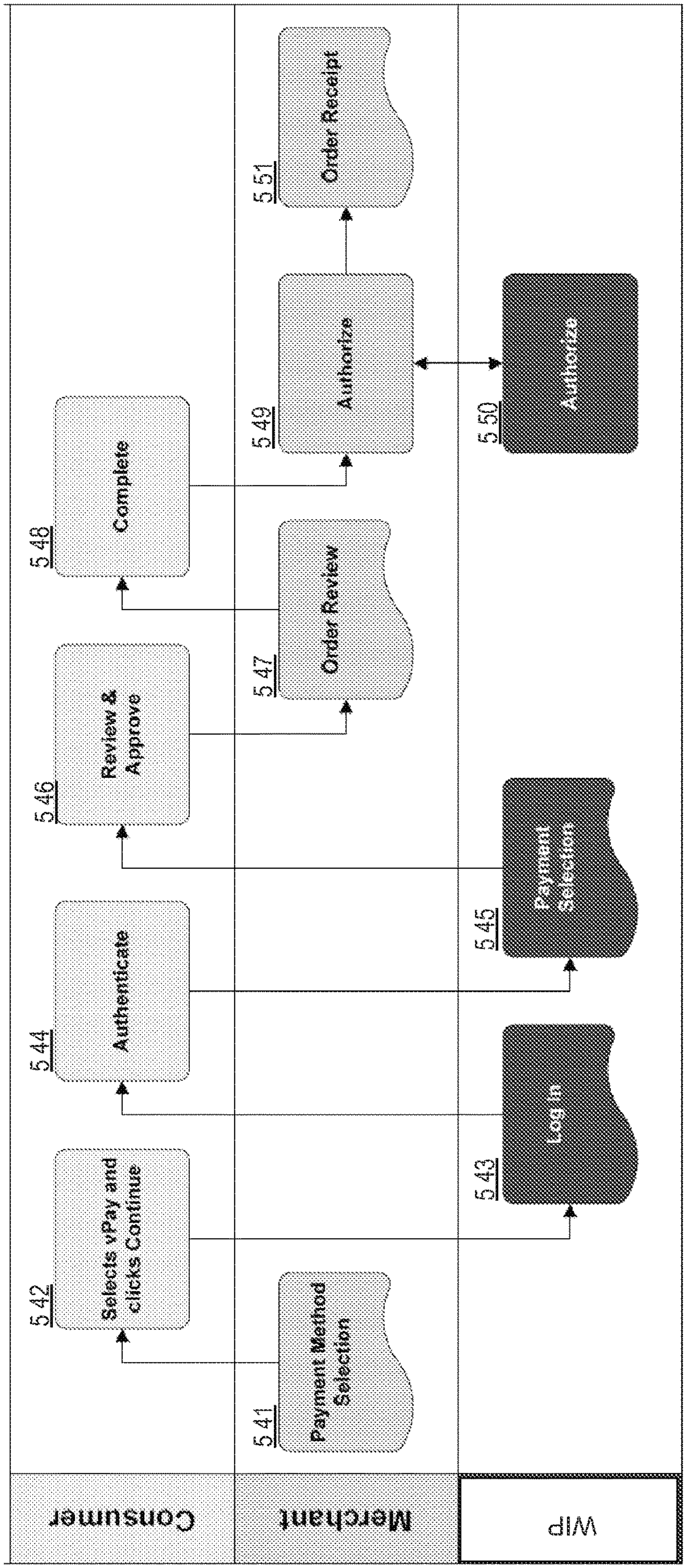

With reference to FIG. 5D, from the Payment Method Selection page 541, the consumer may select the WIP option 542. In one implementation, upon clicking continue, the WIP light-box is instantiated 544, where the consumer is given the opportunity to log into 543 their WIP account and select their payment method (shipping information has already been collected by the merchant) 545. Once selected, the consumer is returned back to the Merchant Name Order Review page 546, where the Consumer can make any final changes to their order or purchase up-sell/cross-sell items 547. After the consumer clicks the Complete Button 548, the merchant may create an authorization 549-550 for the transaction, display the Order Receipt page 551 to the consumer, and continue processing the transaction.

Figure 5E:
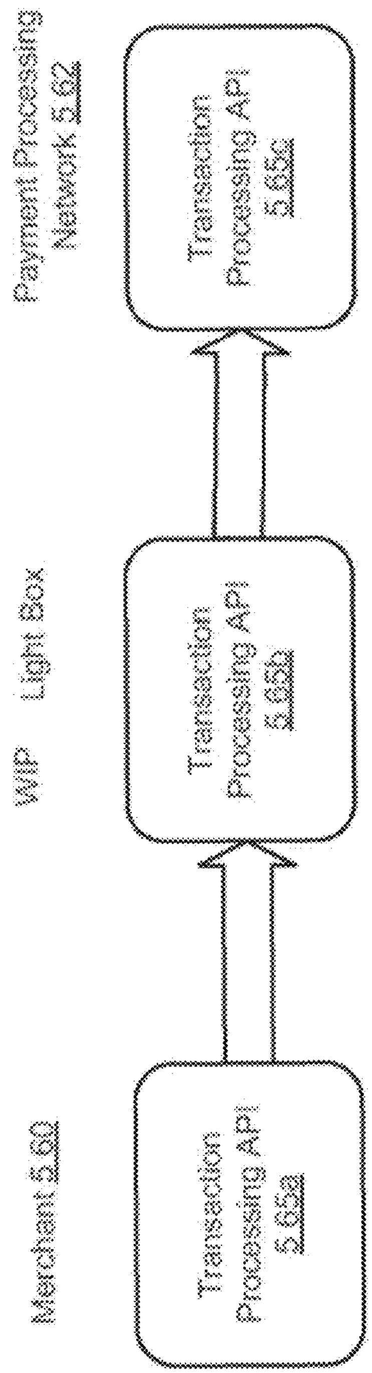

FIG. 5E provides a transaction flow diagram illustrating API call and responses between entities within embodiments of the WIP. Within implementations, transaction-related API calls 565*a*-*c* may be made directly with the WIP system, including authorization, settlement, refund, and/or the like between merchant 560, WIP lightbox 561, and payment processing network 562. For example, a transaction authentication message may include a Website Root Tag, e.g., below the <body> tag to use any WIP widget. As another example, an initialization tag may set up the keys and tokens to be used to authenticate the merchant within the WIP system. The initialization tag may take fields as input such as but not limited to API Key (e.g., the API Key that identifies a consumer as the specific caller and loads your specific configuration and developer settings), token (e.g., the encrypted token for your merchant account such as an MD5 hash of the API Key and currency with no spaces, quotes, or delimiters API secret shared key), user ID (e.g., application name registered to an account)

As another example, a script tag may be included in the WIP JavaScript library which may be inserted immediately above the closing </body> tag in a page HTML. As another example, a buy widget is a button which initiates the purchase, causing a unique identifier that can be used to retrieve an authorization against the consumers wallet. In other implementations, a callback function may be invoked, e.g., a globally accessible static JavaScript function that will be triggered once the WIP payment process is completed, which may be used to update the Merchant Name with the specific token that will be used during the transaction authorization process.

In one implementation, the buy widget tag may return the following fields to the Callback JavaScript Function so they can be consumed by the system: debit event type (e.g., one of the valid debit event types supported by the callback javascript reference), merchant transaction id (e.g., the merchant name unique identifier for the particular transaction, call id (e.g., the token which will be used to get an authorization). In one implementation, the buy widget tag may take the following required fields as input: api key (e.g., the api key that identifies the specific caller and loads specific configuration and developer settings), token (e.g., the encrypted token for merchant account including a md5 hash of the api key and currency with no spaces, quotes, or delimiters api secret shared key), amount (e.g., the total amount of the transaction to be charged (as a decimal)), currency (e.g., the currency of the transaction, etc.), product information (e.g., an id and name of the product being purchased, etc.), merchant transaction id (e.g., the merchant name unique identifier for the particular transaction), and/or the like.

As another example, The Callback JavaScript Function is called when the WIP authentication process is complete which may take parameters as input including, but not limited to: debit event type, transaction data (e.g., a data structure that contains information that can be used to further process the transaction, etc.), and/or the like. In one implementation, the debit event types may be returned and processed appropriately by the merchant with a status indication, such as success (e.g., the transaction was successfully approved and can be further authorized; in this case, WIP may take the token and perform an authorization call), cancel (e.g., The consumer clicked the "Cancel" button in the WIP flow; In this case, WIP may prompt the consumer to select another form of payment), fail (e.g., the attempt to approve the transaction failed; In this case, WIP may message that the transaction was declined and prompt the consumer to select another form of payment), and/or the like.

Figure 6:
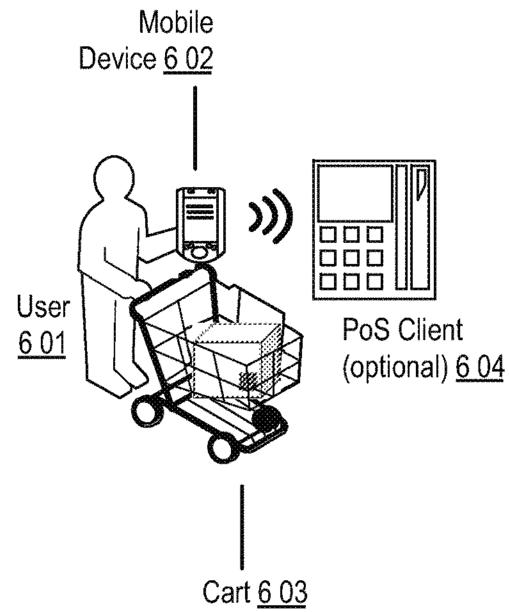
FIG. 6 shows a block diagram illustrating example aspects of virtual mobile wallet purchasing in some embodiments of the WIP.

FIG. 6 shows a block diagram illustrating example aspects of virtual mobile wallet purchasing in some embodiments of the WIP. In further implementations, a universal electronic payment platform may transform touchscreen inputs into a virtual wallet mobile application interface, via WIP components, into purchase transaction triggers and receipt notices. In some implementations, the WIP may facilitate use of a virtual wallet, e.g., boo, for conducting purchase transactions. For example, a user 601 may utilize a mobile device 602 (e.g., smartphone, tablet computer, etc.) to conduct a purchase transaction for contents of a cart 603 (e.g., physical cart at a brick-and-mortar store, virtual cart at an online shopping site), optionally at a point-of-sale (PoS) client 604 (e.g., legacy terminal at a brick-and-mortar store, computing device at an online shopping site, another user with a virtual wallet application, for person-to-person funds transfers, etc.). The user may be able to choose from one or more cards to utilize for a transactions, the cards chosen from a virtual wallet of cards stored within a virtual mobile wallet application executing on the mobile device. Upon selecting one or more of the card options, the mobile device may communicate (e.g., via one/two-way near-field communication [NFC], Bluetooth, Wi-Fi, cellular connection, creating and capturing images of QR codes, etc.) the card selection information to the PoS terminal for conducting the purchase transaction. In some embodiments, the mobile device may obtain a purchase receipt upon completion of authorization of the transaction. Various additional features may be provided to the user via the virtual mobile wallet application executing on the mobile device, as described further below in the discussion with reference to at least FIGS. 7-59.

Figure 7A:
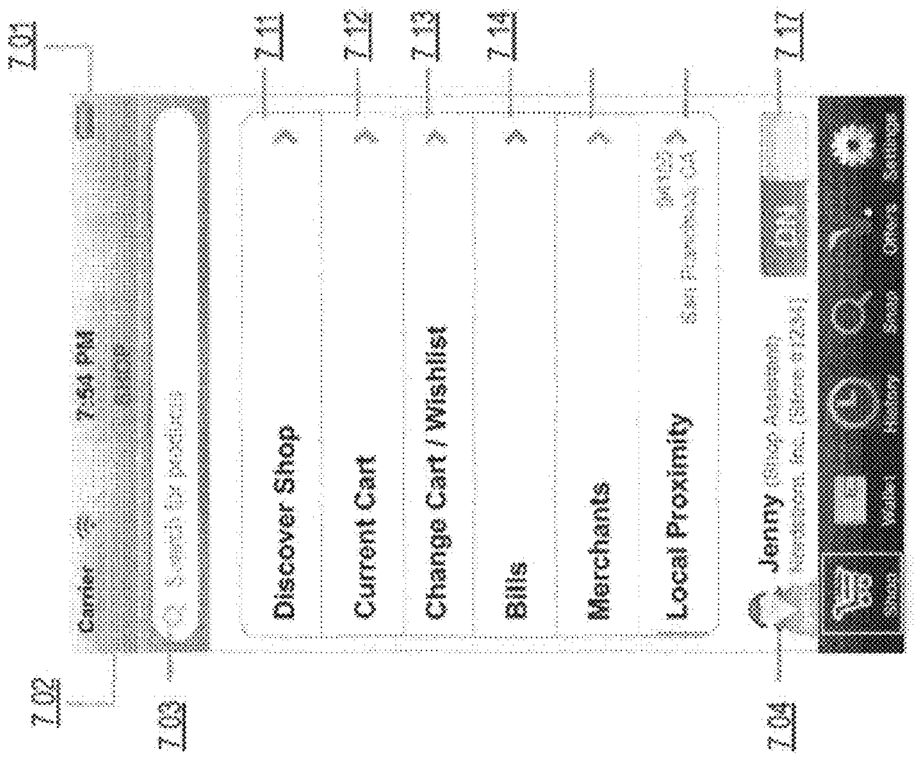
FIGS. 7A-B show user interface diagrams illustrating example aspects of a shopping mode of a virtual wallet application in some embodiments of the WIP.
Figure 7B:

FIGS. 7A-B shows user interface diagrams illustrating example aspects of a shopping mode of a virtual wallet application in some embodiments of the WIP. With reference to FIG. 7A, in some embodiments, a user may utilize a virtual wallet application 701 to engage in purchase transactions. In various embodiments described herein, the virtual wallet application may provide numerous features to facilitate the user's shopping experience 702. For example, the virtual wallet application may allow a user to perform broad searches for products 703, as discussed further below in the discussion with reference to FIG. 7B.

In some implementations, the virtual wallet application may provide a 'discover shopping' mode 711. For example, the virtual wallet application executing on a user device may communicate with a server. The server may provide information to the virtual wallet on the consumer trends across a broad range of consumers in the aggregate. For example, the server may indicate what types of transactions consumers in the aggregate are engaging in, what they are buying, which reviews they pay attention to, and/or the like. In some implementations, the virtual wallet application may utilize such information to provide a graphical user interface to facilitate the user's navigation through such aggregate information, such as described in the discussion below with reference to FIGS. 8A-C. For example, such generation of aggregate information may be facilitate by the WIP's use of centralized personal information platform components described below in the discussion with reference to FIGS. 23-42.

In some implementations, the virtual wallet application may allow the user to simultaneously maintain a plurality of shopping carts. Such carts may, in some implementation, be purely virtual carts for an online website, but in alternate implementations, may reflect the contents of a physical cart in a merchant store. In some implementations, the virtual wallet application may allow the user to specify a current cart to which items the user desires will be placed in by default, unless the user specifies otherwise. In some implementations, the virtual wallet application may allow the user to change the current cart (e.g., 713). In some implementations, the virtual wallet application may allow the user to create wishlists that may be published online or at social networks to spread to the user's friends. In some implementations, the virtual wallet application may allow the user to view, manage, and pay bills for the user, 714. For example, the virtual wallet application may allow the user to import bills into the virtual wallet application interface by taking a snapshot of the bill, by entering information about the bill sufficient for the virtual wallet application to establish a communication with the merchant associated with the bill, etc.

In some implementations, the virtual wallet application may allow the user to shop within the inventories of merchants participating in the virtual wallet 715. For example, the inventories of the merchants may be provided within the virtual wallet application for the user to make purchases. In some implementations, the virtual wallet application may provide a virtual storefront for the user within the graphical user interface of the virtual wallet application. Thus, the user may be virtually injected into a store of the merchant participating in the WIP's virtual wallet application.

In some implementations, the virtual wallet application may utilize the location coordinates of the user device (e.g., via GPS, IP address, cellular tower triangulation, etc.) to identify merchants that are in the vicinity of the user's current location 716. In some implementations, the virtual wallet application may utilize such information to provide information to the user on the inventories of the merchants in the locality, and or may inject the merchant store virtually into the user's virtual wallet application.

In some implementations, the virtual wallet application may provide a shopping assistant 704. For example, a user may walk into a physical store of a merchant. The user may require assistance in the shopping experience. In some implementations, the virtual wallet application may allow the user to turn on the shop assistant (see 717), and a store executive in the merchant store may be able to assist the user via another device. In some embodiments, a user may enter into a store (e.g., a physical brick-and-mortar store, virtual online store [via a computing device], etc.) to engage in a shopping experience. The user may have a user device. The user device 102 may have executing thereon a virtual wallet mobile app, including features such as those as described herein. Upon entering the store, the user device may communicate with a store management server. For example, the user device may communicate geographical location coordinates, user login information and/or like check-in information to check in automatically into the store. In some embodiments, the WIP may inject the user into a virtual wallet store upon check in. For example, the virtual wallet app executing on the user device may provide features as described below to augment the user's in-store shopping experience. In some embodiments, the store management server may inform a customer service representative ("CSR") of the user's arrival into the store. For example, the CSR may have a CSR device, and an app ("CSR app") may be executing thereon. For example, the app may include features such as described below in the discussion herein. The CSR app may inform the CSR of the user's entry, including providing information about the user's profile, such as the user's identity, user's prior and recent purchases, the user's spending patterns at the current and/or other merchants, and/or the like. In some embodiments, the store management server may have access to the user's prior purchasing behavior, the user's real-time in-store behavior (e.g., which items' barcode did the user scan using the user device, how many times did the user scan the barcodes, did the user engage in comparison shopping by scanning barcodes of similar types of items, and/or the like), the user's spending patterns (e.g., resolved across time, merchants, stores, geographical locations, etc.), and/or like user profile information. The store management system may utilize this information to provide offers/coupons, recommendations and/or the like to the CSR and/or the user, via the CSR device and/or user device, respectively. In some embodiments, the CSR may assist the user in the shopping experience. For example, the CSR may convey offers, coupons, recommendations, price comparisons, and/or the like, and may perform actions on behalf of the user, such as adding/removing items to the user's physical/virtual cart, applying/removing coupons to the user's purchases, searching for offers, recommendations, providing store maps, or store 3D immersion views, and/or the like. In some embodiments, when the user is ready to checkout, the WIP may provide a checkout notification to the user's device and/or CSR device. The user may checkout using the user's virtual wallet app executing on the user device, or may utilize a communication mechanism (e.g., near field communication, card swipe, QR code scan, etc.) to provide payment information to the CSR device. Using the payment information, the WIP may initiate the purchase transaction(s) for the user, and provide an electronic receipt to the user device and/or CSR device. Using the electronic receipt, the user may exit the store with proof of purchase payment.

With reference to FIG. 7B, in some implementations, the virtual wallet application 721 may provide a broad range of search results 722 in response to a user providing search keywords and/or filters for a search query. For example, the in the illustration of FIG. 7B, a user searched for all items including "Acme" that were obtained by taking a snapshot of an item (as discussed further below in greater detail), and were dated in the year "2052" (see 723). In some implementations the search results may include historical transactions of the user 731, offers (for a new account, which the user can import into the virtual wallet application) and/or recommendations for the user based on the user's behavioral patterns, coupons 732, bills 734, discounts, person-2-person transfer requests 736, etc., or offers based on merchant inventory availability, and/or the like. For example, the search results may be organized according to a type, date, description, or offers. In some implementations, the descriptions may include listings of previous prior (e.g., at the time of prior purchase), a current price at the same location where it was previously bought, and/or other offers related to the item (see, e.g., 731). Some of the offerings may be stacked on top of each other, e.g., they may be applied to the same transaction. In some instances, such as, e.g., the payment of bills (see 734), the items may be paid for by an auto-pay system. In further implementations, the user may be have the ability to pay manually, or schedule payments, snooze a payment (e.g., have the payment alerts show up after a predetermined amount of time, with an additional interest charge provided to account for the delayed payment), and/or modify other settings (see 734). In some implementations, the user may add one or more of the items listed to a cart, 724, 737. For example, the user may add the items to the default current cart, or may enter the name of an alternate (or new cart/wishlist) to add the items, and submit the command by activating a graphical user interface ("GUI") element 737.

Figure 8A:
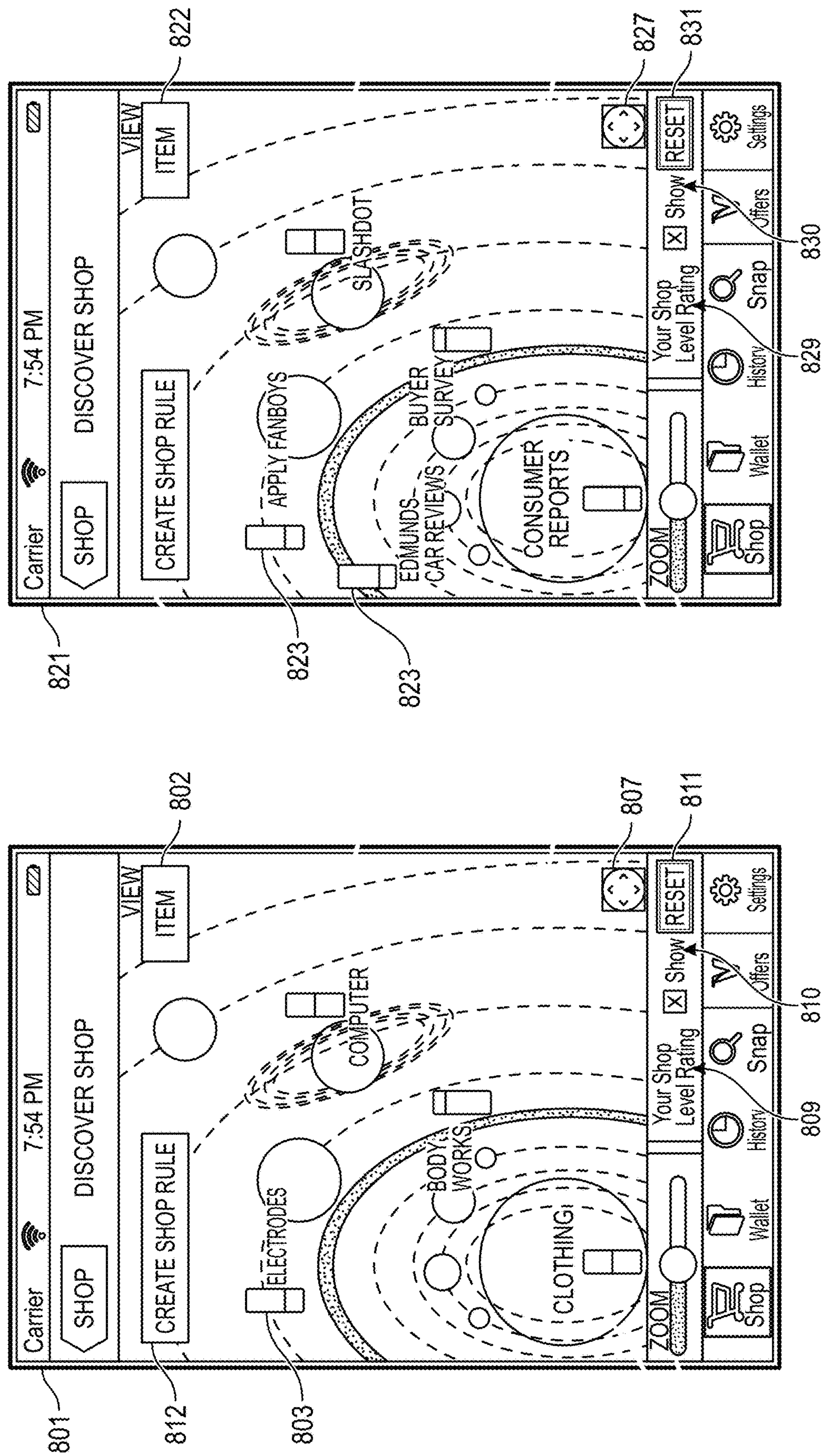
FIGS. 8A-C show user interface diagrams illustrating example aspects of a discovery shopping mode of a virtual wallet application in some embodiments of the WIP.
Figure 8B:
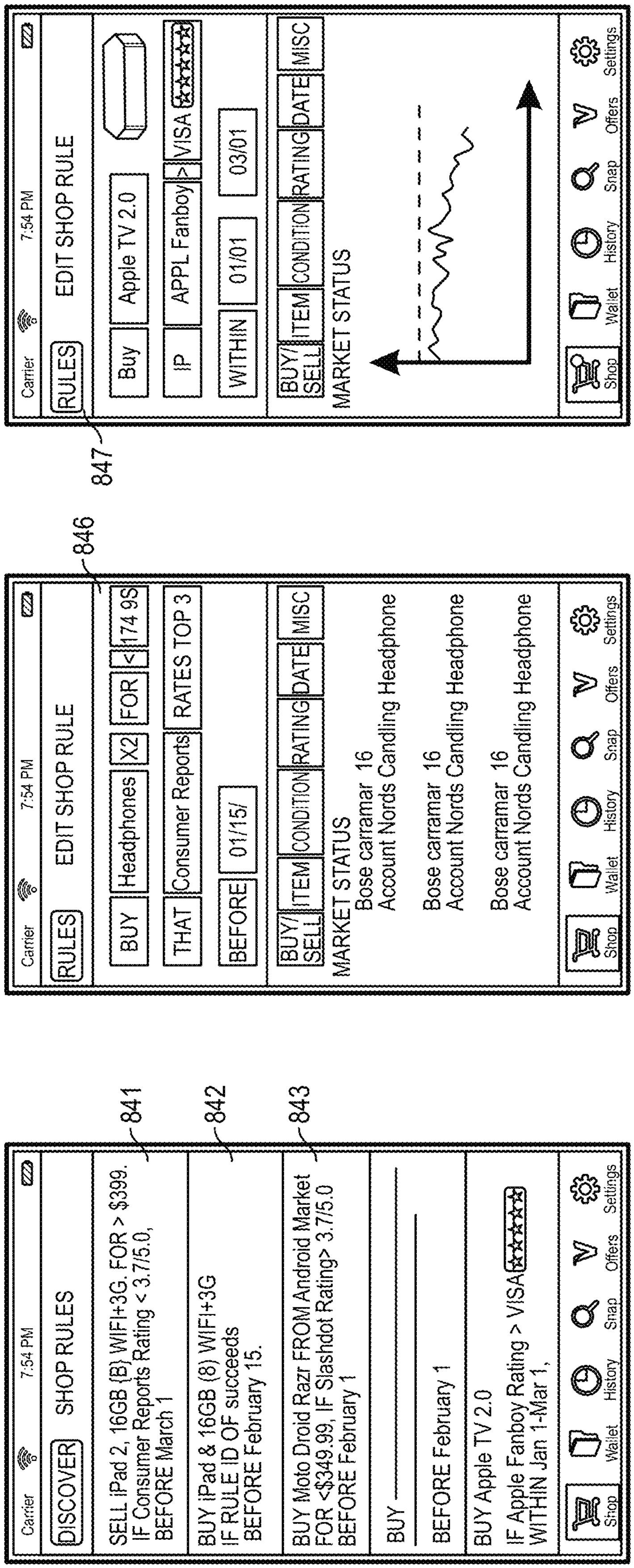
Figure 8C:
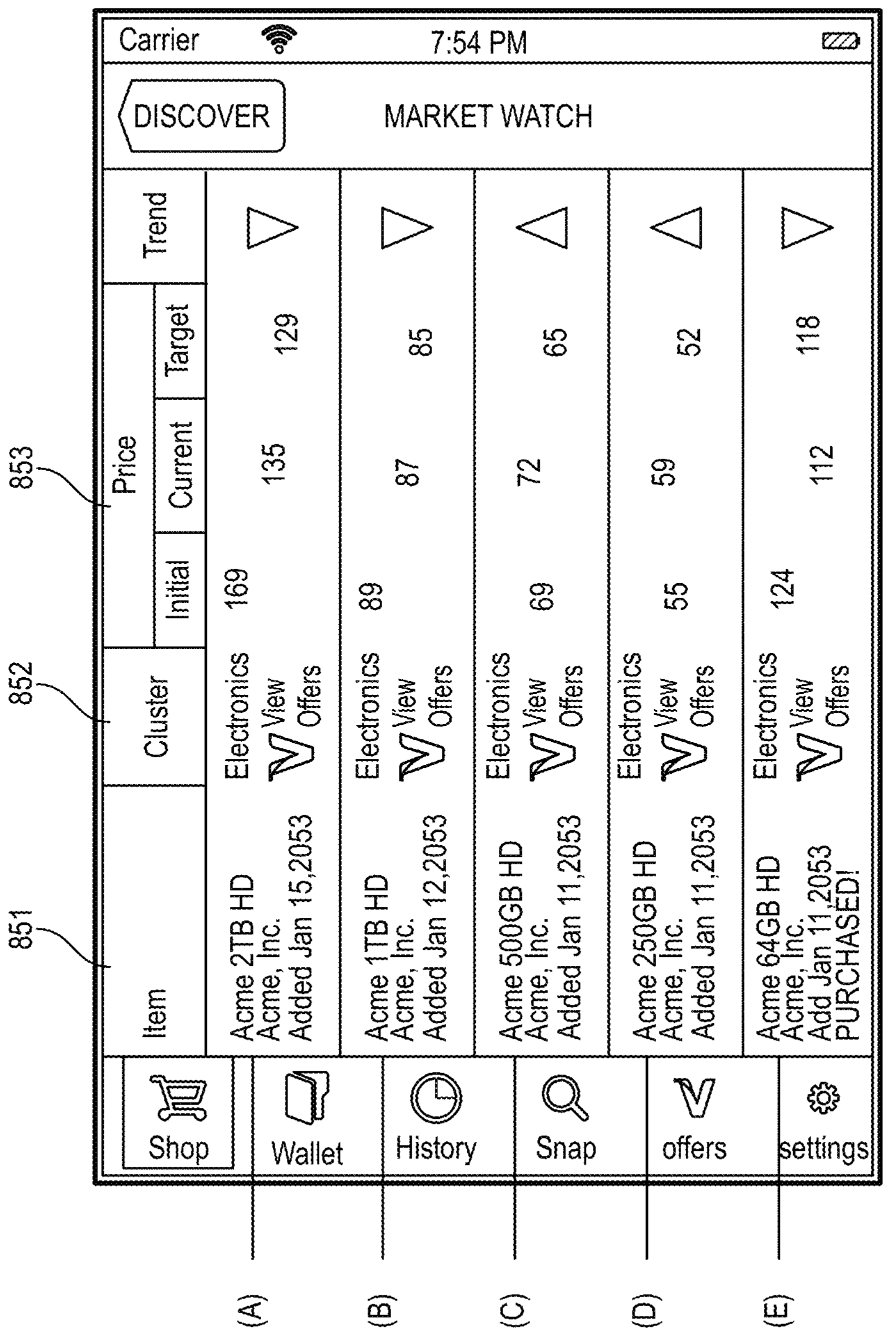

FIGS. 8A-C show user interface diagrams illustrating example aspects of a discovery shopping mode of a virtual wallet application in some embodiments of the WIP. In some embodiments, the virtual wallet application may provide a 'discovery shopping' mode for the user. For example, the virtual wallet application may obtain information on aggregate purchasing behavior of a sample of a population relevant to the user, and may provide statistical/aggregate information on the purchasing behavior for the user as a guide to facilitate the user's shopping. For example, with reference to FIG. 8A, the discovery shopping mode 801 may provide a view of aggregate consumer behavior, divided based on product category (see 802). For example, the centralized personal information platform components described below in the discussion with reference to FIGS.

23-42 may facilitate providing such data for the virtual wallet application. Thus, the virtual wallet application may provide visualization of the magnitude of consumer expenditure in particular market segment, and generate visual depictions representative of those magnitudes of consumer expenditure (see 803, 804, 805, 806, 823, 824, 825, 826). In some embodiments, the virtual wallet application may also provide an indicator (see 809, 829) of the relative expenditure of the user of the virtual wallet application (see blue bars); thus the user may be able to visualize the differences between the user's purchasing behavior and consumer behavior in the aggregate. The user may be able to turn off the user's purchasing behavior indicator (see 810, 830). In some embodiments, the virtual wallet application may allow the user to zoom in to and out of the visualization, so that the user may obtain a view with the appropriate amount of granularity as per the user's desire (see 807, 808, 827, 828). At any time, the user may be able to reset the visualization to a default perspective (see 811, 831).

Similarly, the discovery shopping mode 821 may provide a view of aggregate consumer response to opinions of experts, divided based on opinions of experts aggregated form across the web (see 802). For example, the centralized personal information platform components described below in the discussion with reference to FIGS. 23-42 may facilitate providing such data for the virtual wallet application. Thus, the virtual wallet application may provide visualizations of how well consumers tend to agree with various expert opinion on various product categories, and whose opinions matter to consumers in the aggregate (see 823-326). In some embodiments, the virtual wallet application may also provide an indicator (see 829) of the relative expenditure of the user of the virtual wallet application (see blue bars); thus the user may be able to visualize the differences between the user's purchasing behavior and consumer behavior in the aggregate. The user may be able to turn off the user's purchasing behavior indicator (see 830). In some embodiments, the virtual wallet application may allow the user to zoom in to and out of the visualization, so that the user may obtain a view with the appropriate amount of granularity as per the user's desire (see 827-328). At any time, the user may be able to reset the visualization to a default perspective (see 831).

With reference to FIG. 8B, in some implementations, the virtual wallet application may allow users to create targeted shopping rules for purchasing (see FIG. 8A, 812, 832). For example, the user may utilize the consumer aggregate behavior and the expert opinion data to craft rules on when to initiate purchases automatically. As an example, rule 841 specifies that the virtual wallet should sell the users iPad2 if its consumer reports rating falls below 8.75/5.0, before March 1, provided a sale price of $399 can be obtained. As another example, rule 842 specifies that the virtual wallet should buy an iPad3 if rule 841 succeeds before February 15. As another example, rule 843 specifies that the wallet should buy a Moto Droid Razr from the Android Market for less than $349.99 if its Slashdot rating is greater than 8.75 before February 1. Similarly, numerous rules with a wide variety of variations and dependencies may be generated for targeted shopping in the discovery mode. In some implementations, the virtual wallet user may allow the user to modify a rule. For example, the wallet may provide the user with an interface similar to 844 or 845. The user may utilize tools available in the rule editor toolbox to design the rule according to the user's desires. In some implementations, the wallet may also provide a market status for the items that are subject to the targeted shopping rules.

With reference to FIG. 8C, in some implementations, the virtual wallet application may provide a market watch feature, wherein the trends associated with items subject to targeted shopping rules may be tracked and visually represented for the user. For example, the visualization may take, in some implementations, the form of a ticker table, wherein against each item 851(A)-(E) are listed a product category or cluster of expert opinions to which the product is related 852, pricing indicators, including, but not limited to: price at the time of rule creation 852, price at the time of viewing the market watch screen 853, and a target price for the items (A)-(E). Based on the prices, the market watch screen may provide a trending symbol (e.g., up, down, no change, etc.) 854 for each item that is subject to a targeted shopping rule. Where an item satisfied the targeted rule (see item (E)), the virtual wallet may automatically initiate a purchase transaction for that item once the target price is satisfied.

Figure 9A:
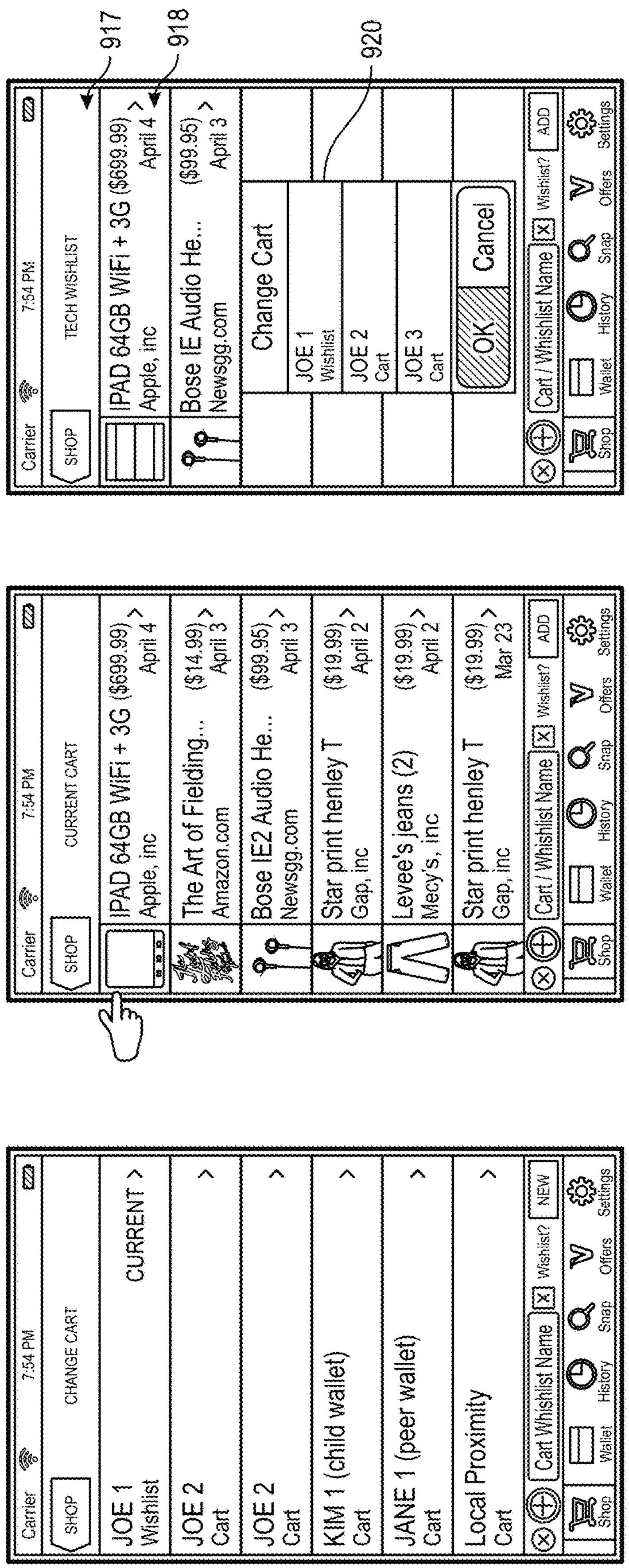
FIGS. 9A-B show user interface diagrams illustrating example aspects of a shopping cart mode of a virtual wallet application in some embodiments of the WIP.
Figure 9B:
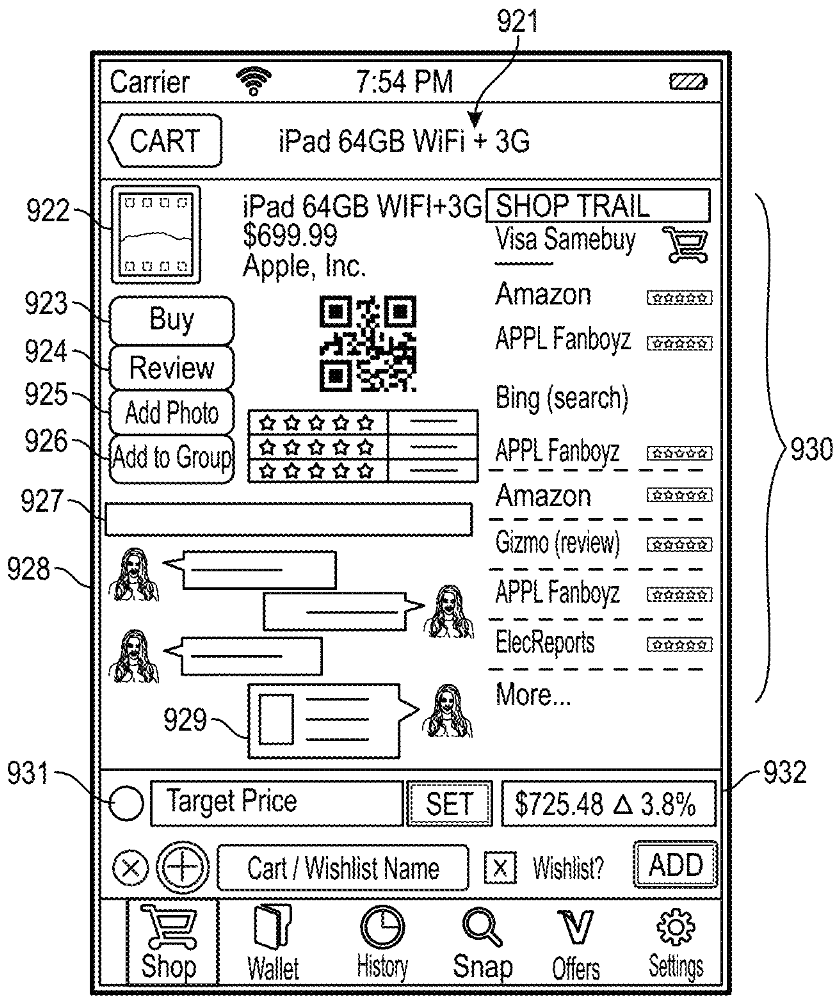

FIGS. 9A-B show user interface diagrams illustrating example aspects of a shopping cart mode of a virtual wallet application in some embodiments of the WIP. With reference to FIG. 9A, in some implementations, the virtual wallet application may be able to store, maintain and manage a plurality of shopping carts and/or wishlists (901-906) for a user. The carts may be purely virtual, or they may represent the contents of a physical cart in a merchant store. The user may activate any of the carts listed to view the items currently stored in a cart (e.g., 910-916). In some implementations, the virtual wallet application may also provide wishlists, e.g., tech wishlist 917, with items that the user desires to be gifted (see 918-919). In some implementations, the virtual wallet may allow the user to quickly change carts or wishlists from another cart or wishlist, using a pop-up menu, e.g., 920.

With reference to FIG. 9B, in one implementation, the user may select a particular item to obtain a detailed view of the item, 921. For example, the user may view the details of the items associated with the transaction and the amount(s) of each item, the merchant, etc., 922. In various implementations, the user may be able to perform additional operations in this view. For example, the user may (re)buy the item 923, obtain third-party reviews of the item, and write reviews of the item 924, add a photo to the item so as to organize information related to the item along with the item 925, add the item to a group of related items (e.g., a household), 926, provide ratings 927, or view quick ratings from the user's friends or from the web at large. For example, such systems may be implemented using the example centralized personal information platform components described below in the discussion with reference to FIGS. 18-37. The user may add a photo to the transaction. In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The virtual wallet, in another embodiment, may offer facilities for obtaining and displaying ratings 927 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 928 shows FACEBOOK message exchanges between two users. In one implementation, a user may share a link via a message 929. Selection of such a message having embedded link to a product may allow the user to view a description of the product and/or purchase the product directly from the history mode.

In some implementations, the wallet application may display a shop trail for the user, e.g., 930. For example, a user may have reviewed a product at a number of websites (e.g., ElecReports, APPL FanBoys, Gizmo, Bing, Amazon, Visa Smartbuy feature (e.g., that checks various sources automatically for the best price available according to the user preferences, and provides the offer to the user), etc.), which may have led the user to a final merchant website where the user finally bought the product. In some implementations, the WIP may identify the websites that the user visited, that contributed to the user deciding to buy the product, and may reward them with a share of the revenues obtained by the "point-of-sale" website for having contributed to the user going to the point-of-sale website and purchasing the product there. For example, the websites may have agreements with product manufacturers, wholesalers, retail outlets, payment service providers, payment networks, amongst themselves, and/or the like with regard to product placement, advertising, user redirection and/or the like. Accordingly, the WIP may calculate a revenue share for each of the websites in the user's shopping trail using a revenue sharing model, and provide revenue sharing for the websites.

In some implementations, the virtual wallet may provide a SmartBuy targeted shopping feature. For example, the user may set a target price 931 for the product 922 that the user wishes to buy. The virtual wallet may provide a real-time market watch status update 932 for the product. When the market price available for the user falls below the user's target price 931, the virtual wallet may automatically buy the product for the user, and provide a shipment/notification to the user.

Figure 10:
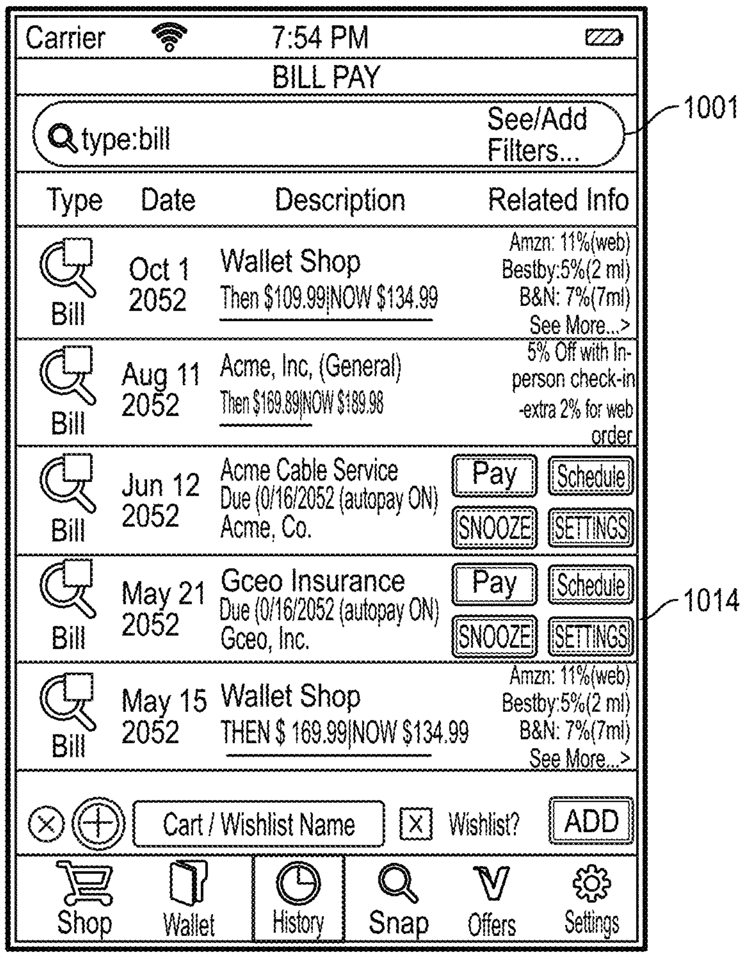
FIG. 10 shows a user interface diagram illustrating example aspects of a bill payment mode of a virtual wallet application in some embodiments of the WIP.

FIG. 10 shows a user interface diagram illustrating example aspects of a bill payment mode of a virtual wallet application in some embodiments of the WIP. In some implementations, the virtual wallet application may provide a list of search results for bills 1001-1003 in response to a user activating element 214 in FIG. 2A. In some implementations the search results may include historical billing transactions of the user, as well as upcoming bills (e.g., 1011-1015). For example, the search results may be organized according to a type, date, description. In some implementations, the descriptions may include listings of previous prior (e.g., at the time of prior purchase), a current price at the same location where it was previously bought, and/or other offers related to the item (see, e.g., ion). In some instances, such as, e.g., the payment of bills (see 1014), the items may be paid for by an auto-pay system. In further implementations, the user may be have the ability to pay manually, or schedule payments, snooze a payment (e.g., have the payment alerts show up after a predetermined amount of time, with an additional interest charge provided to account for the delayed payment), and/or modify other settings (see 1014).

Figure 11A:
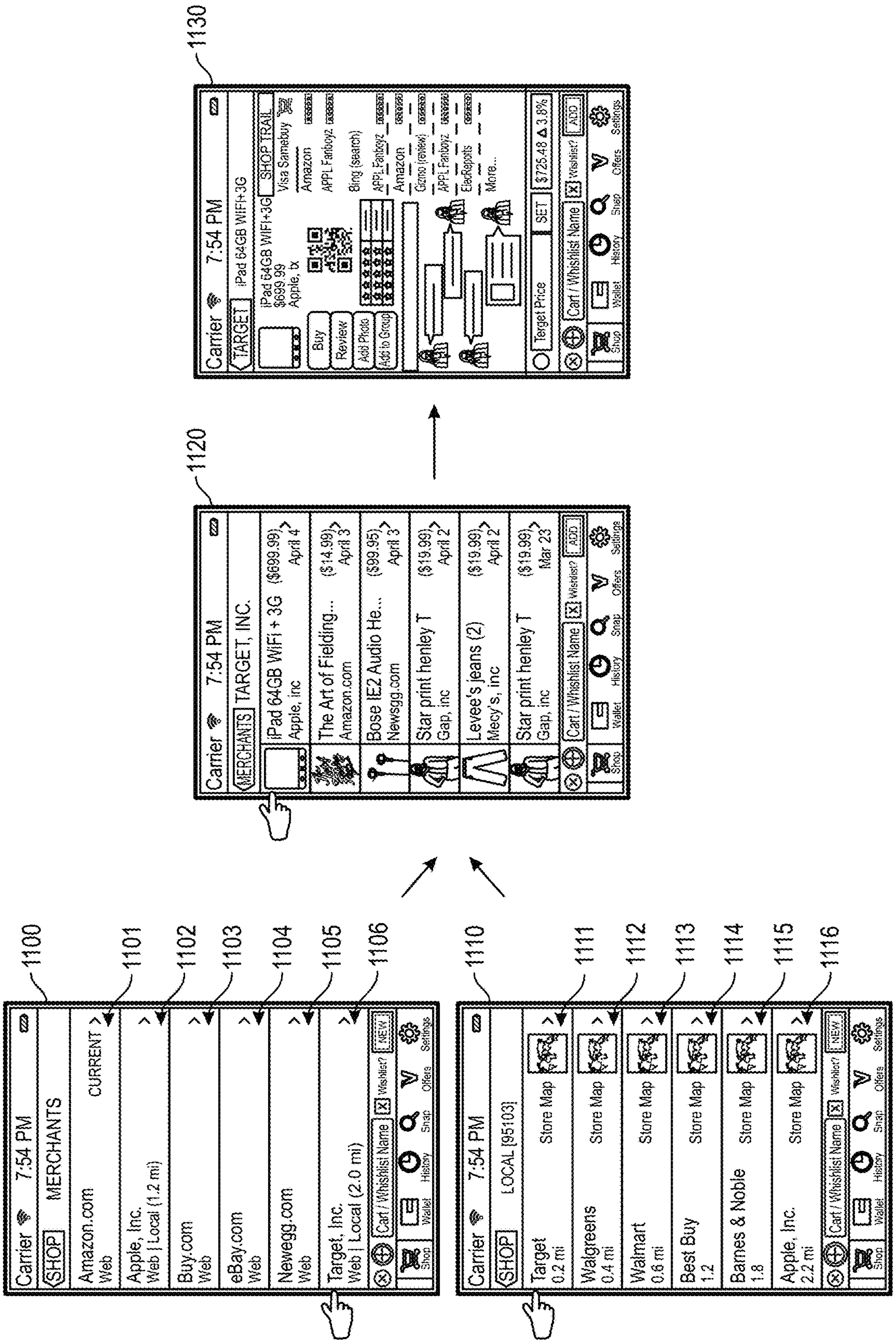
FIGS. 11A-B show user interface diagrams illustrating example aspects of a (local proximity) merchant shopping mode of a virtual wallet application in some embodiments of the WIP.
Figure 11B:
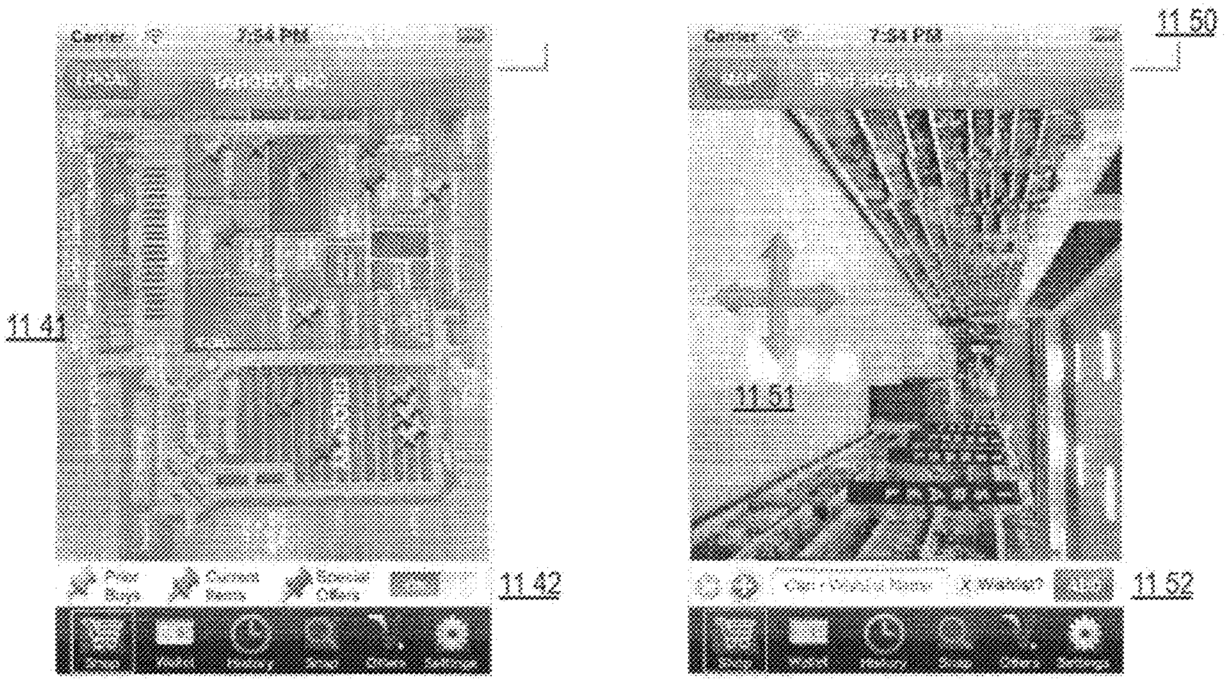

FIGS. 11A-B show user interface diagrams illustrating example aspects of a (local proximity) merchant shopping mode of a virtual wallet application in some embodiments of the WIP. In some implementations, upon activating elements 215 of in FIG. 2A, the virtual wallet application may presents screens 1100 and 1110, respectively, as depicted in FIG. 11A. In FIG. 11, 1100, the virtual wallet application displays a list of merchants participating in the virtual wallet of the WIP, e.g., 1101-1106 and 1111-1116. Similarly, in FIG. 11A, 1110, the virtual wallet application displays a list of merchants participating in the virtual wallet of the WIP and at or nearby the approximate location of the user the user. The user may click on any of the merchants listed in the two screens 1100 and 1110, to be injected into the store inventory of the merchant. Upon injection, the user may be presented with a screen such as 1120, which is similar to the screen discussed above in the description with reference to FIG. 9A (center). Also, in some implementation, if a user clicks on any of the items listed on screen 1120, the user may be taken to a screen 1130, similar to the screen discussed above in the description with reference to FIG. 9B. With reference to FIG. 11B, in some embodiments, the user may be injected into a virtual reality 2D/3D storefront of the merchant in screen 1140. For example, the user may be presented with a plan map view of the store 1141. In some map views, the user may provided with the user's location (e.g., using GPS, or if not available, then using a coarse approximation using a cellular signal). In some implementations, the locations of the user's prior and current purchases may be provided for the user, if the user wishes (see 1142, the user can turn the indications off, in some implementations). In some implementations, the user may be provided with a 3D aisle view of an aisle within the virtual storefront. The user may point the view direction at any of the objects to obtain virtual tools to obtain items from off the "virtual shelf," and place them in the user's virtual cart. The screen at 1150 shows an augmented reality view of an aisle, where user may see pins of items suggested by a concierge, or that were bookmarked in their cart/wishlist highlighted through a live video view 115X. In another view, a virtual store aisle view (e.g., akin to a Google map Street View) may be navigated 1151 when the consumer is not at the store, but would like to look for product; the directional control 1151 allows for navigation up and down the aisle, and rotation and views of items at the merchant location. Additionally, consumers may tap items in the shelves and create a new product pin, which may then be added 1152 to a cart or wishlist for further transacting.

Figure 12:
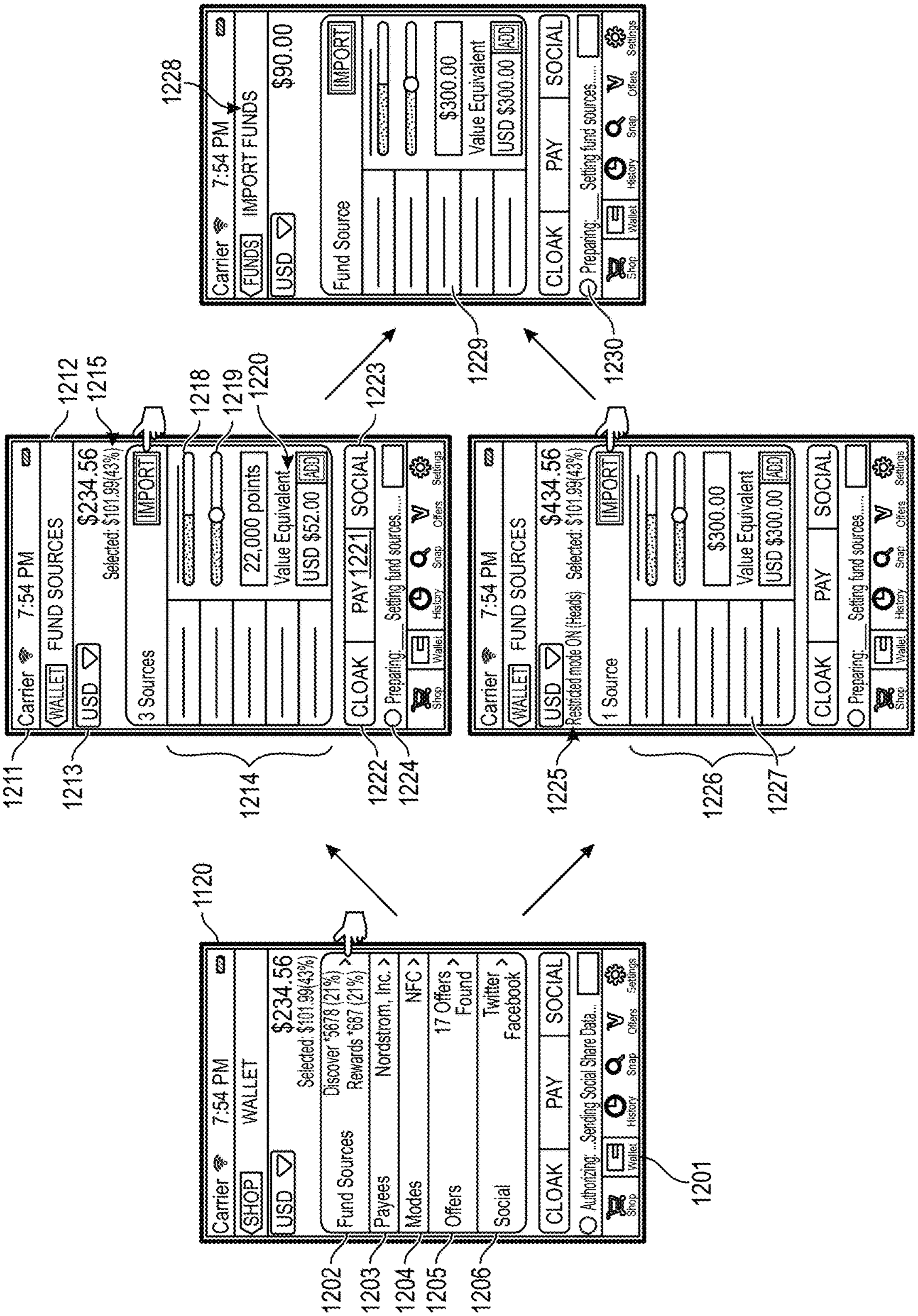
FIG. 12 shows user interface diagrams illustrating example aspects of allocating funds for a purchase payment within a virtual wallet application in some embodiments of the WIP.

FIG. 12 shows user interface diagrams illustrating example aspects of allocating funds for a purchase payment within a virtual wallet application in some embodiments of the WIP. In one embodiment, the wallet mobile application may provide a user with a number of options for paying for a transaction via the wallet mode 1201. The wallet mode may facilitate a user to set preferences for a payment transaction, including settings funds sources 1202, payee 1203, transaction modes 1204, applying real-time offers to the transaction 1205, and publishing the transaction details socially 1206, as described in further detail below.

In one implementation, an example user interface 1211 for making a payment is shown. The user interface may clearly identify the amount 1212 and the currency 1213 for the transaction. The amount may be the amount payable and the currency may include real currencies such as dollars and euros, as well as virtual currencies such as reward points. The user may select the funds tab 1202 to select one or more forms of payment 1217, which may include various credit, debit, gift, rewards and/or prepaid cards. The user may also have the option of paying, wholly or in part, with reward points. For example, the graphical indicator 1218 on the user interface shows the number of points available, the graphical indicator 1219 shows the number of points to be used towards the amount due 234.56 and the equivalent 1220 of the number of points in a selected currency (USD, for example).

In one implementation, the user may combine funds from multiple sources to pay for the transaction. The amount 1215 displayed on the user interface may provide an indication of the amount of total funds covered so far by the selected forms of payment (e.g., Discover card and rewards points). The user may choose another form of payment or adjust the amount to be debited from one or more forms of payment until the amount 1215 matches the amount payable 1214. Once the amounts to be debited from one or more forms of payment are finalized by the user, payment authorization may begin.

In one implementation, the user may select a secure authorization of the transaction by selecting the cloak button 1222 to effectively cloak or anonymize some (e.g., pre-configured) or all identifying information such that when the user selects pay button 1221, the transaction authorization is conducted in a secure and anonymous manner. In another implementation, the user may select the pay button 1221 which may use standard authorization techniques for transaction processing. In yet another implementation, when the user selects the social button 1223, a message regarding the transaction may be communicated to one of more social networks (set up by the user), which may post or announce the purchase transaction in a social forum such as a wall post or a tweet. In one implementation, the user may select a social payment processing option 1223. The indicator 1224 may show the authorizing and sending social share data in progress.

In another implementation, a restricted payment mode 1225 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 1226 under the funds tab to select specialized accounts such as a flexible spending account (FSA), health savings account (HAS) 1227, and/or the like and amounts to be debited to the selected accounts. In one implementation, such restricted payment mode 1225 processing may disable social sharing of purchase information.

In one embodiment, the wallet mobile application may facilitate importing of funds via the import funds user interface 1228. For example, a user who is unemployed may obtain unemployment benefit fund 1229 via the wallet mobile application. In one implementation, the entity providing the funds may also configure rules for using the fund as shown by the processing indicator message 1230. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 13:
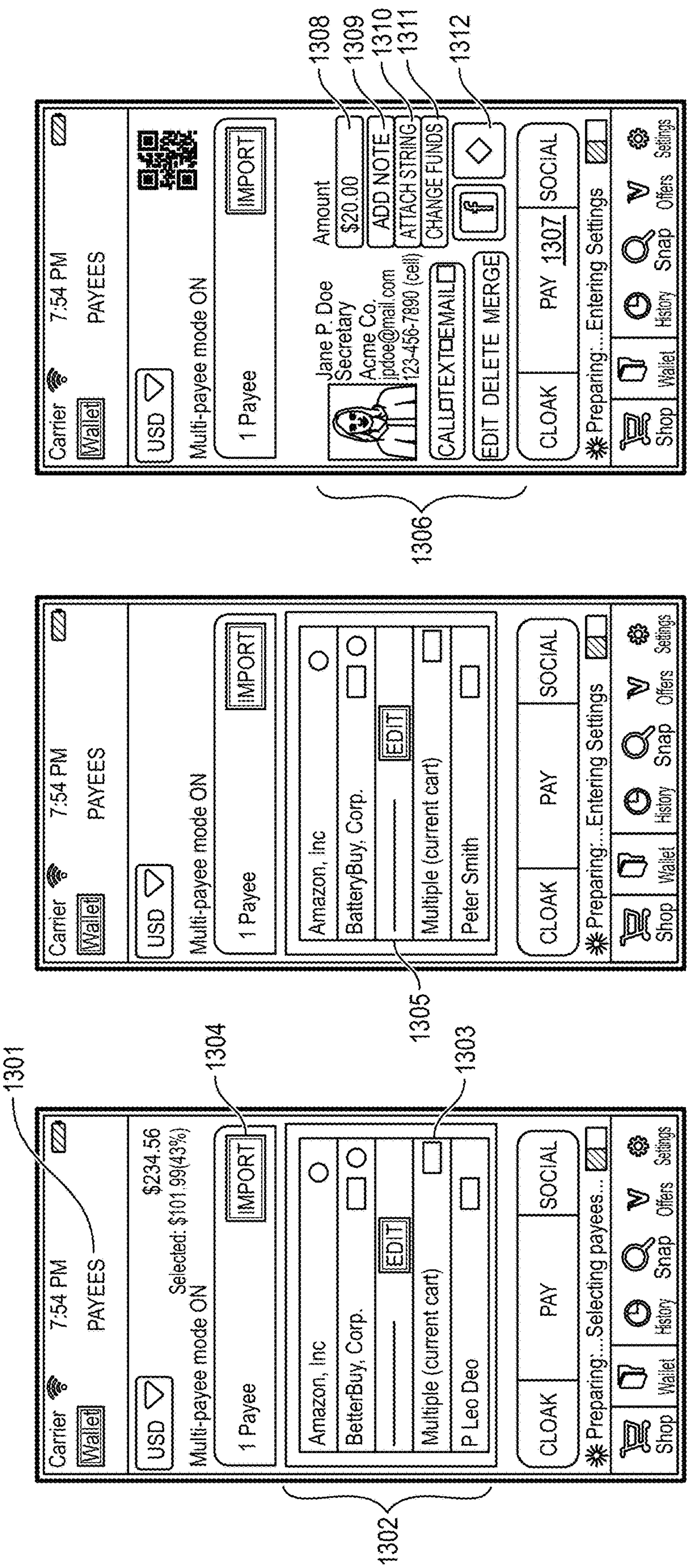
FIG. 13 shows user interface diagrams illustrating example aspects of selecting payees for funds transfers within a virtual wallet application in some embodiments of the WIP.

FIG. 13 shows user interface diagrams illustrating example aspects of selecting payees for funds transfers within a virtual wallet application in some embodiments of the WIP. In one embodiment, the payee screen 1301 in the wallet mobile application user interface may facilitate user selection of one or more payees receiving the funds selected in the funds tab. In one implementation, the user interface may show a list of all payees 1302 with whom the user has previously transacted or available to transact. The user may then select one or more payees, 1303. For example, a selection may include a multiple-merchant entry—this may be the case when a user is paying for products in a cart, wherein the products themselves are from multiple merchants. In another example, the user may be paying for the products placed in a plurality of cart, each cart including products from one or more merchants. The payees 1303 may include larger merchants such as Amazon.com Inc., and individuals such as Jane P. Doe. Next to each payee name, a list of accepted payment modes for the payee may be displayed. In some implementations, the user may import 1304 additional names into the address book included within the user interface 1302.

In one implementation, the user may select the payee Jane P. Doe 1305 for receiving payment. Upon selection, the user interface may display additional identifying information 1306 relating to the payee. The user interface may allow the user to contact the payee (e.g., call, text, email), modify the entry of the payee in the address book (e.g., edit, delete, merge with another contact), or make a payment to the payee 1307. For example, the user can enter an amount 1308 to be paid to the payee. The user can include a note for the payee (or for the user herself) related to the payment, 1309. The user can also include strings attached to the payment. For example, the user can provide that the payment processing should occur only if the payee re-posts the user's note on a social networking site, 1310. The user can, at any time, modify the funding sources to utilize in the payment, 1311. Also, the user can utilize a number of different payment modes for each user, 1312. For example, additional modes such as those described in the discussion with reference to FIG. 14B may be used for the person-to-person payment. For example, a social payment mechanism may be employed for the person-to-person payment. Additional description on the social payment mechanism may be found in the discussion with reference to FIGS. 45-52 and 54D. As another example, person-to-person payment may be made via a snap mobile mechanism, as described further below in the discussion with reference to FIG. 17A.

Figure 14A:
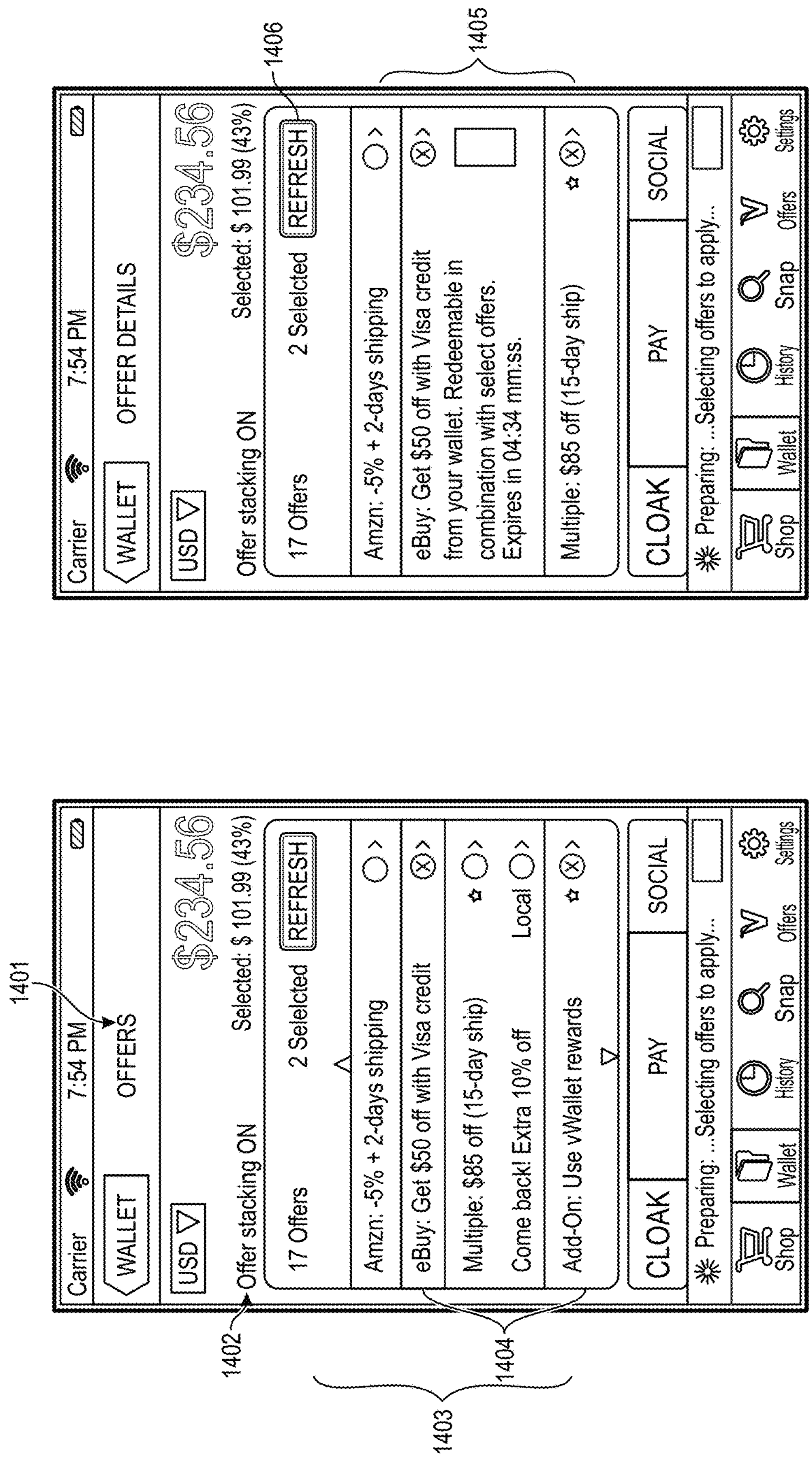
FIGS. 14A-B show user interface diagrams illustrating example additional aspects of the virtual wallet application in some embodiments of the WIP.
Figure 14B:
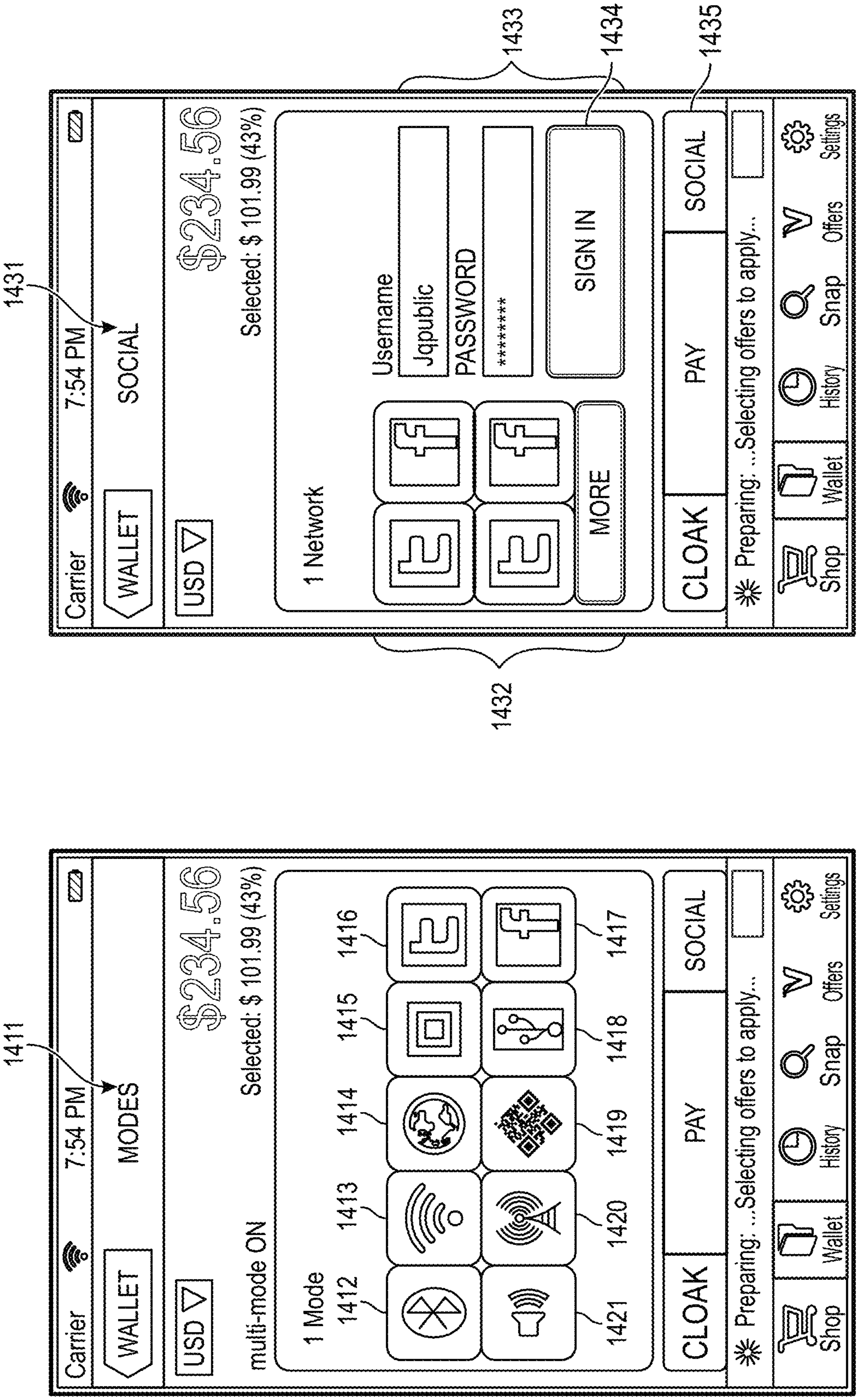

FIGS. 14A-B show user interface diagrams illustrating example additional aspects of the virtual wallet application in some embodiments of the WIP. With reference to FIG. 14A, in some implementations, an offers screen 1401 may provide real-time offers that are relevant to items in a user's cart for selection by the user. The user may select one or more offers (see 1402) from the list of applicable offers 1403 for redemption. In one implementation, some offers may be combined (see, e.g., 1404), while others may not (optionally). When the user selects an offer that may not be combined with another offer, the unselected offers may be disabled. In a further implementation, offers that are recommended by the wallet application's recommendation engine may be identified by an indicator, such as the one shown by 1405. An example offer recommendation engine is described further below in the discussion with reference to FIG. 44. In a further implementation, the user may read the details of the offer by expanding the offer row as shown by 1405 in the user interface. The user may refresh offers displayed in the real-time offers screen at any time (see 1406).

With reference to FIG. 14B, in some implementations, the mode tab 1411 may facilitate selection of a payment mode accepted by the payee. A number of payment modes may be available for selection. Example modes include, Bluetooth 1412, wireless 1413, snap mobile by user-obtained QR code 1414, secure chip 1415, TWITTER 1416, near-field communication (NFC) 1421, cellular 1420, snap mobile by user-provided QR code 1419, USB 1418 and FACEBOOK 1417, among others. In one implementation, only the payment modes that are accepted by the payee may be selectable by the user. Other non-accepted payment modes may be disabled.

In one embodiment, the social tab 1431 may facilitate integration of the wallet application with social channels 1432. In one implementation, a user may select one or more social channels 1432 and may sign in to the selected social channel from the wallet application by providing to the wallet application the social channel user name and password 1433 and signing in 1434. The user may then use the social button 1435 to send or receive money through the integrated social channels. In a further implementation, the user may send social share data such as purchase information or links through integrated social channels. In another embodiment, the user supplied login credentials may allow WIP to engage in interception parsing.

Figure 15A:
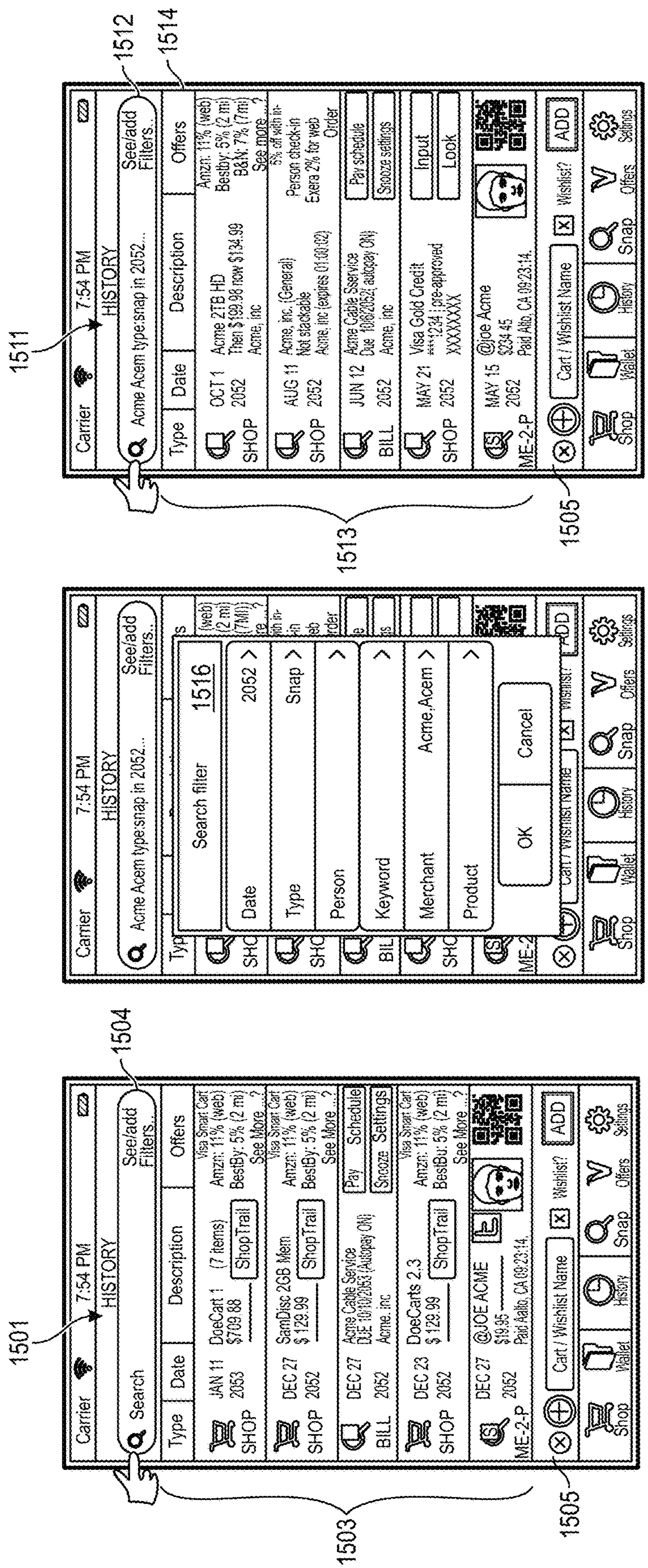
FIGS. 15A-B show user interface diagrams illustrating example aspects of a history mode of a virtual wallet application in some embodiments of the WIP.
Figure 15B:
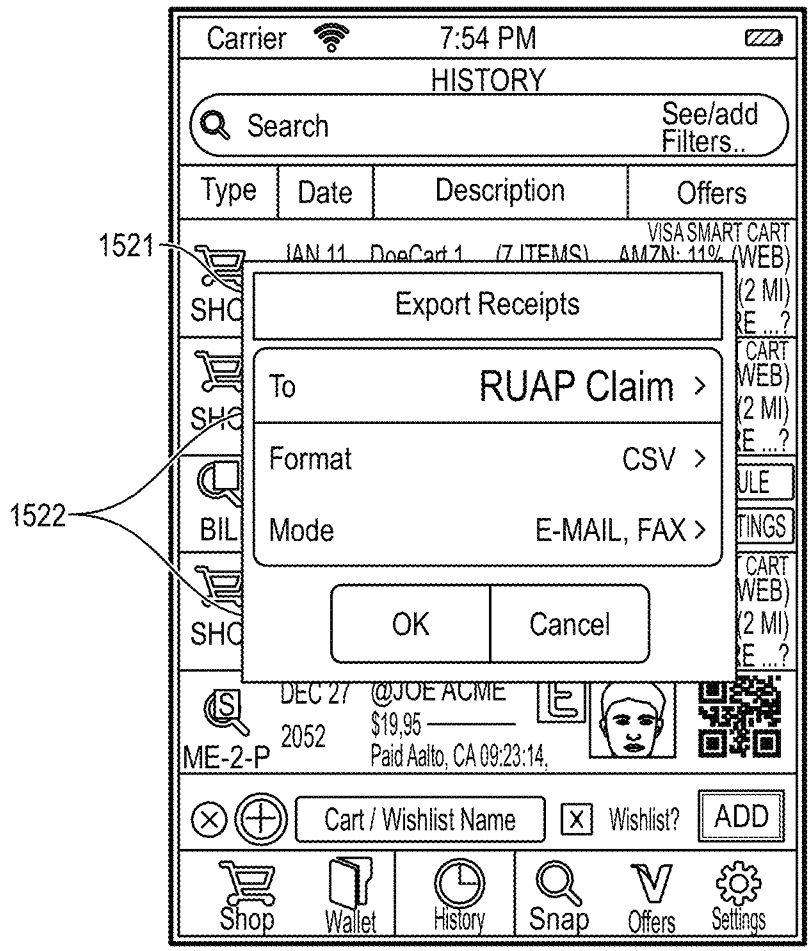

FIGS. 15A-B show user interface diagrams illustrating example aspects of a history mode of a virtual wallet application in some embodiments of the WIP. With reference to FIG. 15A, in one embodiment, a user may select the history mode 1501 to view a history of prior purchases and perform various actions on those prior purchases. The wallet application may query the storage areas in the mobile device or elsewhere (e.g., one or more databases and/or tables remote from the mobile device) for prior transactions. The user interface may then display the results of the query such as transactions 1503. The user interface may identify 1504: a type of the transaction (e.g., previously shopped for items, bills that have been captured by camera in a snap mode, a person-to-person transfer [e.g., via social payment mechanism as described below in the discussion with reference to FIGS. 40-47], etc.); the date of the transaction; a description of the transaction, including but not limited to: a cart name, cart contents indicator, total cost, merchant(s) involved in the transaction; a link to obtain a shoptrail (explained further below in greater detail), offers relating to the transaction, and any other relevant information. In some implementation, any displayed transaction, coupon, bill, etc. may be added to a cart for (re)purchase, 1505.

In one embodiment, a user may select the history mode 1511 to view a history of filtered prior purchases and perform various actions on those prior purchases. For example, a user may enter a merchant identifying information such as name, product, MCC, and/or the like in the search bar 1512. In another implementation, the user may use voice activated search feature to search the history. In another implementations, the wallet application may display a pop up screen 1516, in which the user may enter advanced search filters, keywords, and/or the like. The wallet application may query the storage areas in the mobile device or elsewhere (e.g., one or more databases and/or tables remote from the mobile device) for transactions matching the search keywords. The user interface may then display the results of the query such as transactions 1503. The user interface may identify 1514: a type of the transaction (e.g., previously shopped for items, bills that have been captured by camera in a snap mode, a person-to-person transfer [e.g., via social payment mechanism as described below in the discussion with reference to FIGS. 40-47], etc.); the date of the transaction; a description of the transaction, including but not limited to: a cart name, cart contents indicator, total cost, merchant(s) involved in the transaction; a link to obtain a shoptrail (explained further below in greater detail), offers relating to the transaction, and any other relevant information. In some implementation, any displayed transaction, coupon, bill, etc. may be added to a cart for (re)purchase, 1515.

With reference to FIG. 15B, in one embodiment, the history mode may also include facilities for exporting receipts. The export receipts pop up 1521 may provide a number of options for exporting the receipts of transactions in the history. For example, a user may use one or more of the options 1522, which include save (to local mobile memory, to server, to a cloud account, and/or the like), print to a printer, fax, email, and/or the like. The user may utilize his or her address book to look up email or fax number for exporting. The user may also specify format options for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button to initiate export of receipts.

Figure 16A:
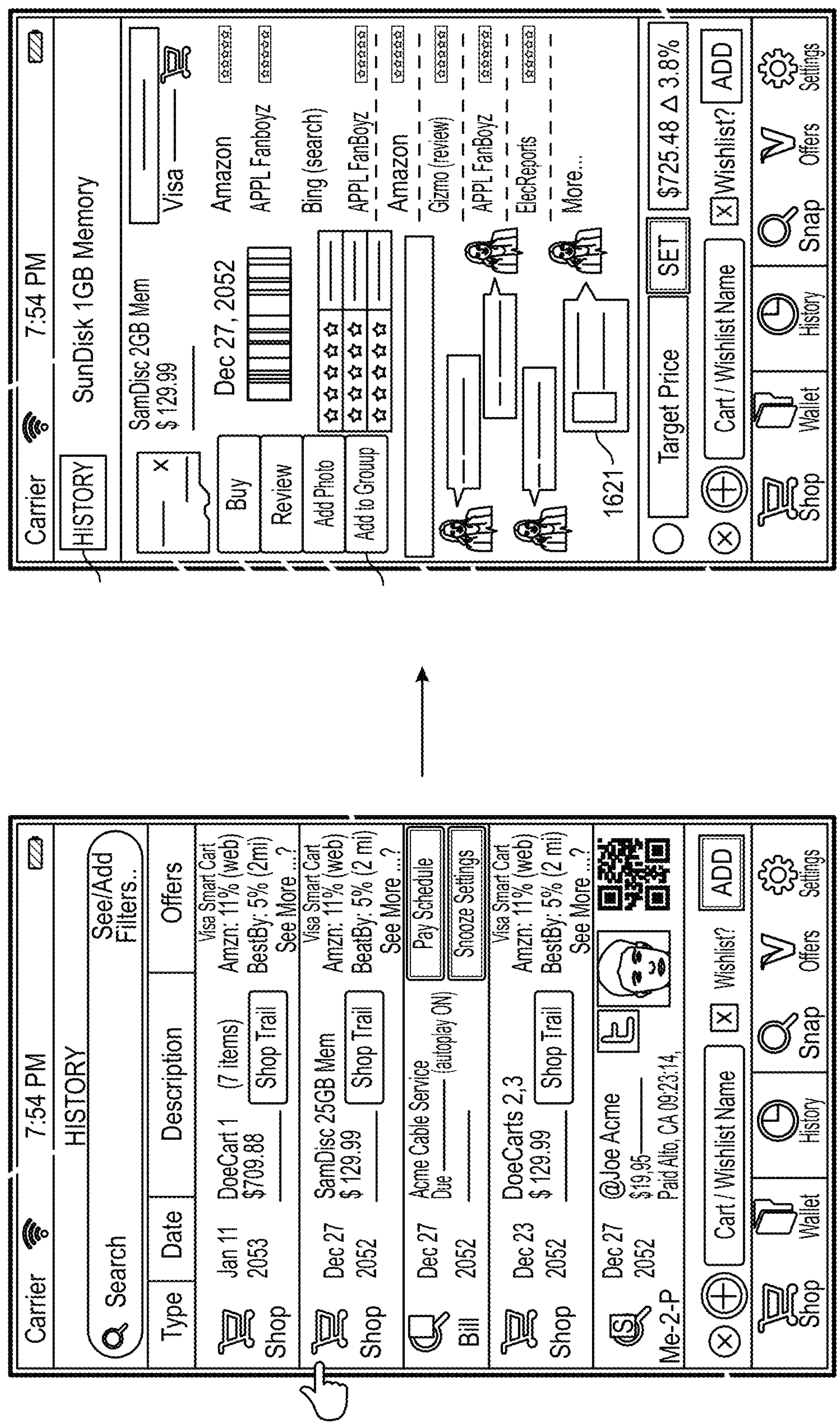
FIGS. 16A-C show user interface and logic flow diagrams illustrating example aspects of creating a user shopping trail within a virtual wallet application and associated revenue sharing scheme in some embodiments of the WIP.
Figure 16B:
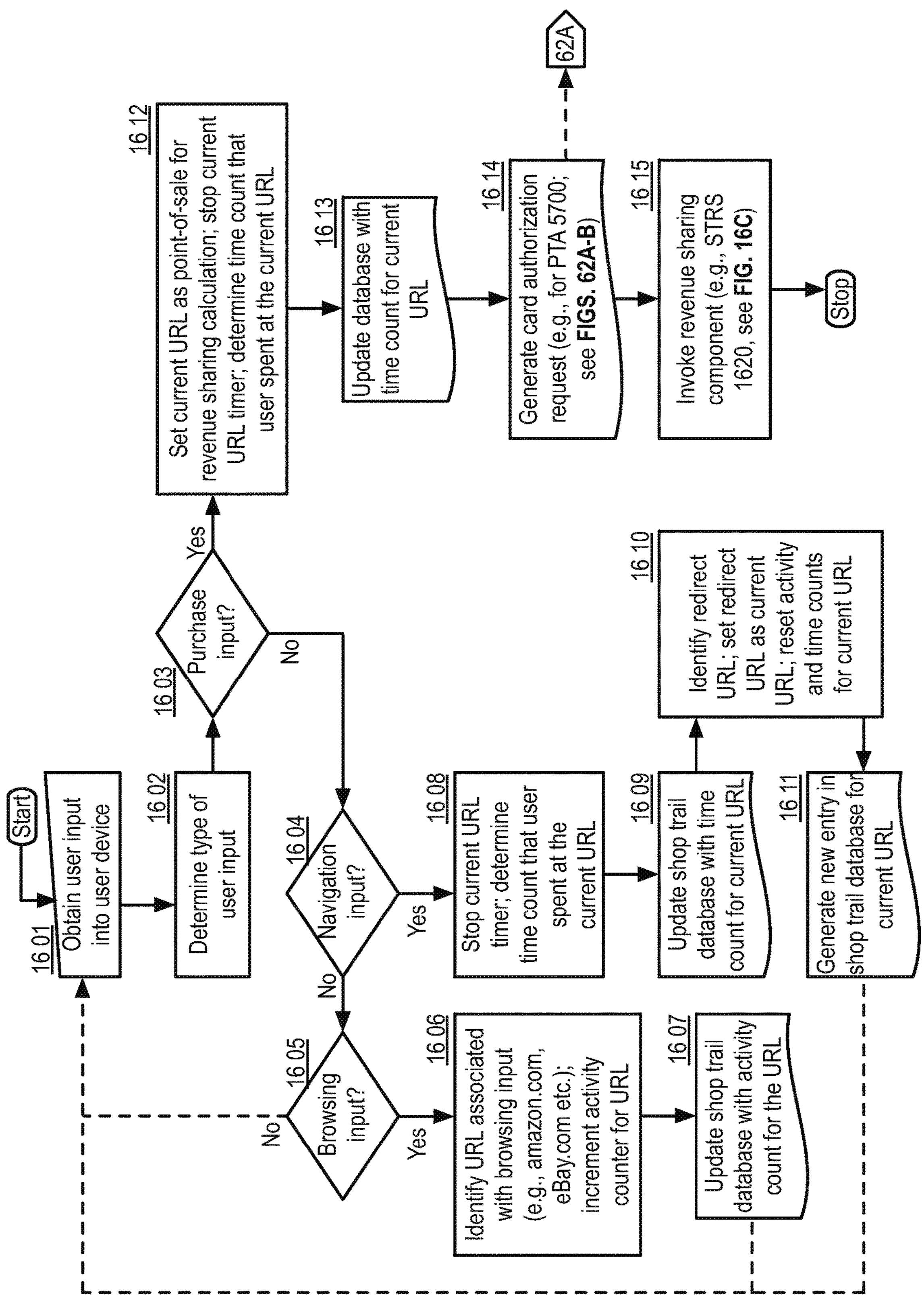
Figure 16C:
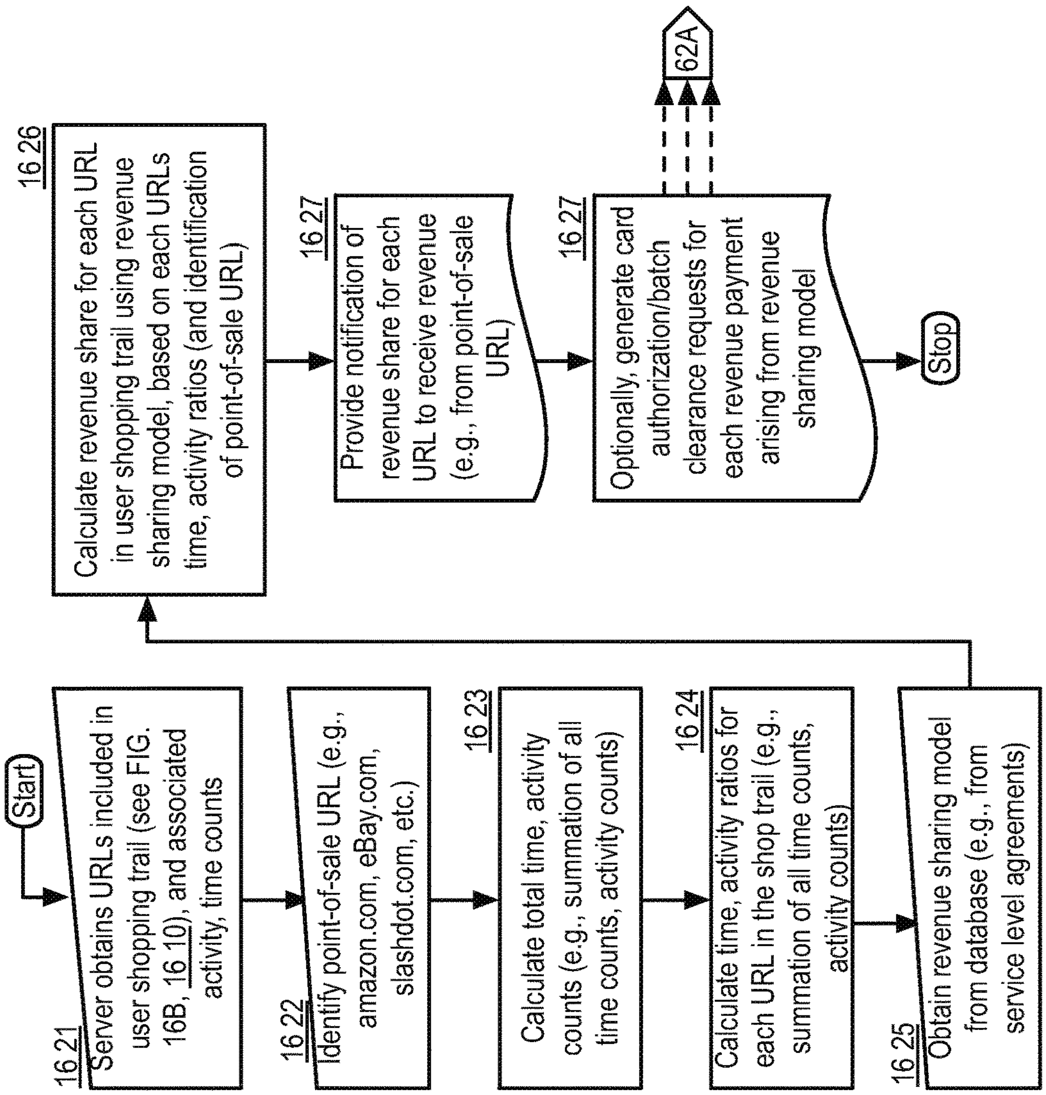

FIGS. 16A-C show user interface and logic flow diagrams illustrating example aspects of creating a user shopping trail within a virtual wallet application and associated revenue sharing scheme in some embodiments of the WIP. With reference to FIG. 16A, in some implementations, a user may select the history mode to view a history of prior purchases and perform various actions on those prior purchases. The wallet application may query the storage areas in the mobile device or elsewhere (e.g., one or more databases and/or tables remote from the mobile device) for prior transactions. The user interface may then display the results of the query such as transactions. The user interface may identify: a type of the transaction (e.g., previously shopped for items, bills that have been captured by camera in a snap mode, a person-to-person transfer [e.g., via social payment mechanism as described below in the discussion with reference to FIGS. 40-47], etc.); the date of the transaction; a description of the transaction, including but not limited to: a cart name, cart contents indicator, total cost, merchant(s) involved in the transaction; a link to obtain a shoptrail (explained further below in greater detail), offers relating to the transaction, and any other relevant information. In some implementations, any displayed transaction, coupon, bill, etc. may be added to a cart for (re)purchase.

In one implementation, the user may select a transaction, to view the details of the transaction. For example, the user may view the details of the items associated with the transaction and the amount(s) of each item, the merchant, etc. In various implementations, the user may be able to perform additional operations in this view. For example, the user may (re)buy the item, obtain third-party reviews of the item, and write reviews of the item, add a photo to the item so as to organize information related to the item along with the item, add the item to a group of related items (e.g., a household), provide ratings, or view quick ratings from the user's friends or from the web at large. For example, such systems may be implemented using the example centralized personal information platform components described below in the discussion with reference to FIGS. 18-37. The user may add a photo to the transaction. In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area shows FACEBOOK message exchanges between two users. In one implementation, a user may share a link via a message. Selection of such a message having embedded link to a product may allow the user to view a description of the product and/or purchase the product directly from the history mode.

In some implementations, the wallet application may display a shop trail for the user. For example, a user may have reviewed a product at a number of websites (e.g., ElecReports, APPL FanBoys, Gizmo, Bing, Amazon, Visa Smartbuy feature (e.g., that checks various sources automatically for the best price available according to the user preferences, and provides the offer to the user), etc.), which may have led the user to a final merchant website where the user finally bought the product. In some implementations, the WIP may identify the websites that the user visited, that contributed to the user deciding to buy the product, and may reward them with a share of the revenues obtained by the "point-of-sale" website for having contributed to the user going to the point-of-sale website and purchasing the product there. For example, the websites may have agreements with product manufacturers, wholesalers, retail outlets, payment service providers, payment networks, amongst themselves, and/or the like with regard to product placement, advertising, user redirection and/or the like. Accordingly, the WIP may calculate a revenue share for each of the websites in the user's shopping trail using a revenue sharing model, and provide revenue sharing for the websites.

In some implementations, the virtual wallet may provide a SmartBuy targeted shopping feature. For example, the user may set a target price for the product that the user wishes to buy. The virtual wallet may provide a real-time market watch status update for the product. When the market price available for the user falls below the user's target price, the virtual wallet may automatically buy the product for the user, and provide a shipment/notification to the user.

FIG. 16B shows a logic flow diagram illustrating example aspects of generating a virtual wallet user shopping trail in some embodiments of the WIP, e.g., a User Shopping Trail Generation ("USTG") component. In some implementations, a user device of a user, executing a virtual wallet application for the user, may track the shopping activities of a user for later retrieval and/or analysis. The device may obtain a user's input, 1601, and determine a type of user input, 1602. If the user engages in either browsing activity at a website of a merchant, or is navigating between websites (e.g., sometime when 1603, option "No"), the device may track such activities. For example, the device may determine that the user's input is a navigational input (1604, option "Yes"). The device may stop a timer associated with the current URL (e.g., of a merchant such as amazon.com, ebay.com, newegg.com, etc., or a review website such as shlashdot.org, cnet.com, etc.) that the user is located at, and determine a time count that the user spent at the URL, 1608. The device may update a shop trail database (e.g., a local database, a cloud database, etc.) with the time count for the current URL, 1609. The device may also identify a redirect URL to which the user will be navigating as a result of the user's navigation input, 1610. The device may set the redict URL as the current URL, and reset activity and time counters for the current URL. The device may generate a new entry in the shop trail database for the URL that has been made current by the user's navigational input, 1611.

If the user engaged in browsing activity at a current URL (1605, option "Yes"), the device may identify the URL associated with the browsing activity (e.g., if the browsing can be performed on the device across multiple windows or tabs, etc.). The device may increment an activity counter to determine a level of user activity of the user at the URL where the browsing activity is occurring, 1606. The device may update the shop trail database with the activity count for the URL, 1607.

If the user desires to engage in a purchase transaction, e.g., after visiting a number of URLs about the product (e.g., after reading reviews about a product at a number of consumer report websites, the user navigates to amazon.com to buy the product), see 1603, option "Yes," the device may set the current URL as the "point-of-sale" URL (e.g., the merchant at which the user finally bought the product—e.g., amazon.com), 1612. The device may stop the time for the current URL, and update the shop trail database for the current URL, 1613. The device may generate a card authorization request to initiate the purchase transaction, 1614, and provide the card authorization request for transaction processing (see, e.g., PTA 5700 component described below in the discussion with reference to FIG. 57A-B).

In some implementations, the device may also invoke a revenue sharing component, such as the example STRS 1620 component described below in the discussion with reference to FIG. 16C.

FIG. 16C shows a logic flow diagram illustrating example aspects of implementing a user shopping trail-based revenue sharing model in some embodiments of the WIP, e.g., a Shopping Trail Revenue Sharing ("STRS") component 1620. In some implementations, a user may have reviewed a product at a number of websites, which may have led the user to a final merchant website where the user finally bought the product. In some implementations, the WIP may identify the websites that the user visited, that contributed to the user deciding to buy the product, and may reward them with a share of the revenues obtained by the "point-of-sale" website for having contributed to the user going to the point-of-sale website and purchasing the product there. For example, the websites may have agreements with product manufacturers, wholesalers, retail outlets, payment service providers, payment networks, amongst themselves, and/or the like with regard to product placement, advertising, user redirection and/or the like. For example, a server may have stored a table of revenue sharing ratios, that provides a predetermined revenue sharing scheme according to which contributing websites will receive revenue for the user's purchase.

Accordingly, in some implementations, a server may obtain a list of URLs included in a user's shopping trail, and their associated activity and time counts, 1621. The server may identify a point-of-sale URL where the user made the purchase for which revenue is being shared among the URLs in the shopping trail, 1622. The server may calculate a total activity count, and a total time count, by summing up activity and time counts, respectively, of all the URLs in the user's shopping trail, 1623. The server may calculate activity and time ratios of each of the URLs, 1624. The server may obtain a revenue sharing model (e.g., a database table/matrix of weighting values) for converting activity and time ratios for each URL into a revenue ratio for that URL, 1625. The server may calculate a revenue share, 1626, for each of the URLs in the user's shopping trail using the revenue sharing model and the revenue ratios calculated for each URL. The server may provide a notification of the revenue for each URL (e.g., to each of the URLs and/or the point-of-sale URL from whom revenue will be obtained to pay the revenue shares of the other URLs in the user's shopping trail), 1627. In some implementations, the server may generate card authorization requests and/or batch clearance requests for each of the revenue payments due to the URLs in the user's shopping trail, to process those transactions for revenue sharing.

Figure 17A:
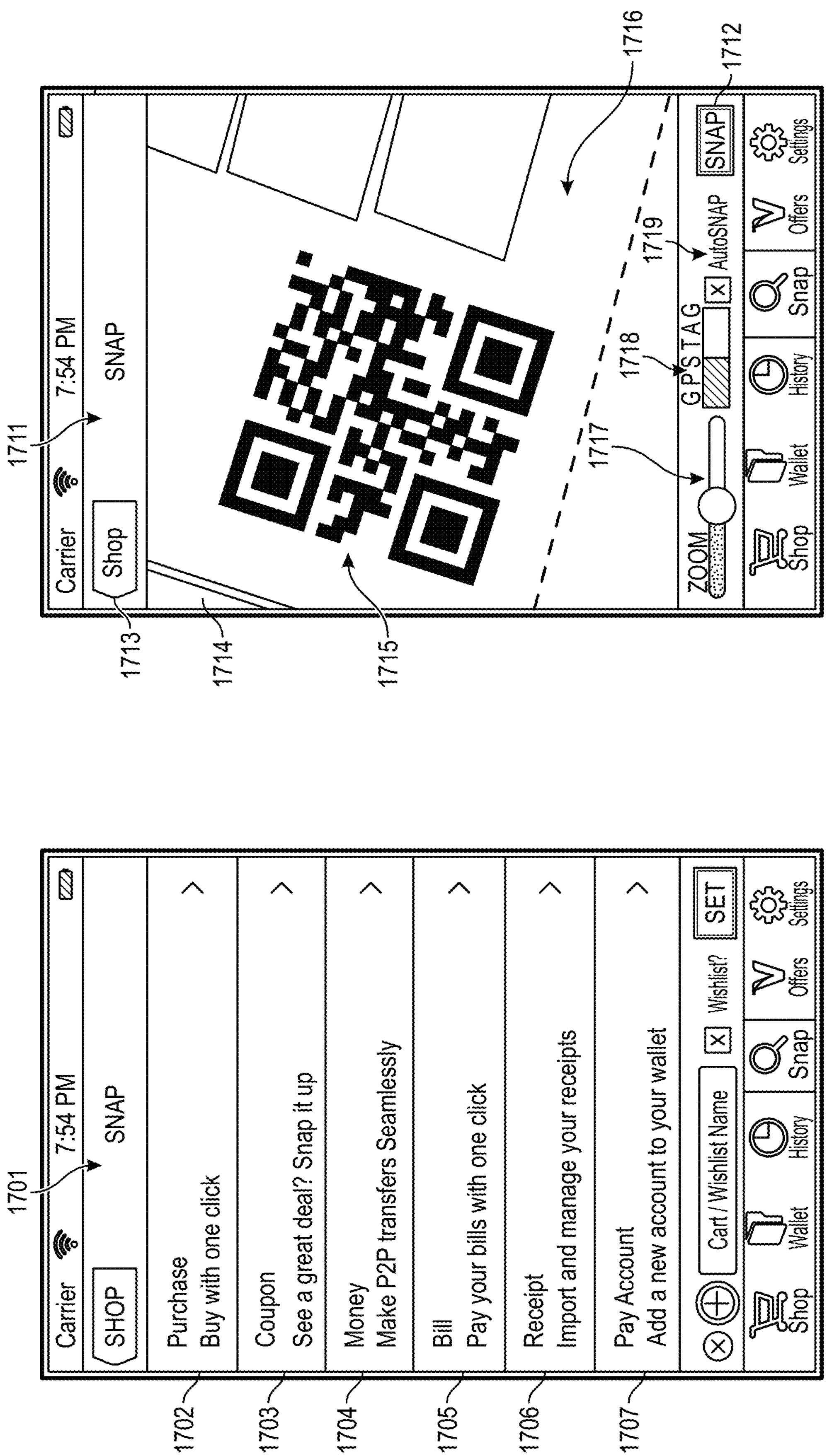
FIGS. 17A-I show user interface and logic flow diagrams illustrating example aspects of a snap mode of a virtual wallet application in some embodiments of the WIP.

FIGS. 17A-H show user interface and logic flow diagrams illustrating example aspects of a snap mode of a virtual wallet application in some embodiments of the WIP. With reference to FIG. 17A, in some implementations, a user may select the snap mode 1701 to access its snap features. The snap mode may handle any machine-readable representation of data. Examples of such data may include linear and 2D bar codes such as UPC code and QR codes. These codes may be found on receipts 1706, product packaging 1702, coupons 1703, payment notes 1704, invoices 1705, credit cards and/or other payment account plastic cards or equivalent 1707, and/or the like. The snap mode may process and handle pictures of receipts, products, offers, credit cards or other payment devices, and/or the like. An example user interface 1711 in snap mode is shown in FIG. 17A. A user may use his or her mobile phone to take a picture of a QR code 1715 and/or a barcode 1714. In one implementation, the bar 1716 and snap frame 1713 may assist the user in snapping codes properly. For example, the snap frame 1713, as shown, does not capture the entirety of the code 1714. As such, the code captured in this view may not be resolvable as information in the code may be incomplete. When the code 1715 is completely framed by the snap frame 5215, the device may automatically snap a picture of the code, 1719. Upon finding the code, in one implementation, the user may initiate code capture using the mobile device camera, 1712. In some implementations, the user may adjust the zoom level of the camera to assist in capturing the code, 1717. In some implementations, the user may add a GPS tag to the captured code, 1718.

Figure 17B:
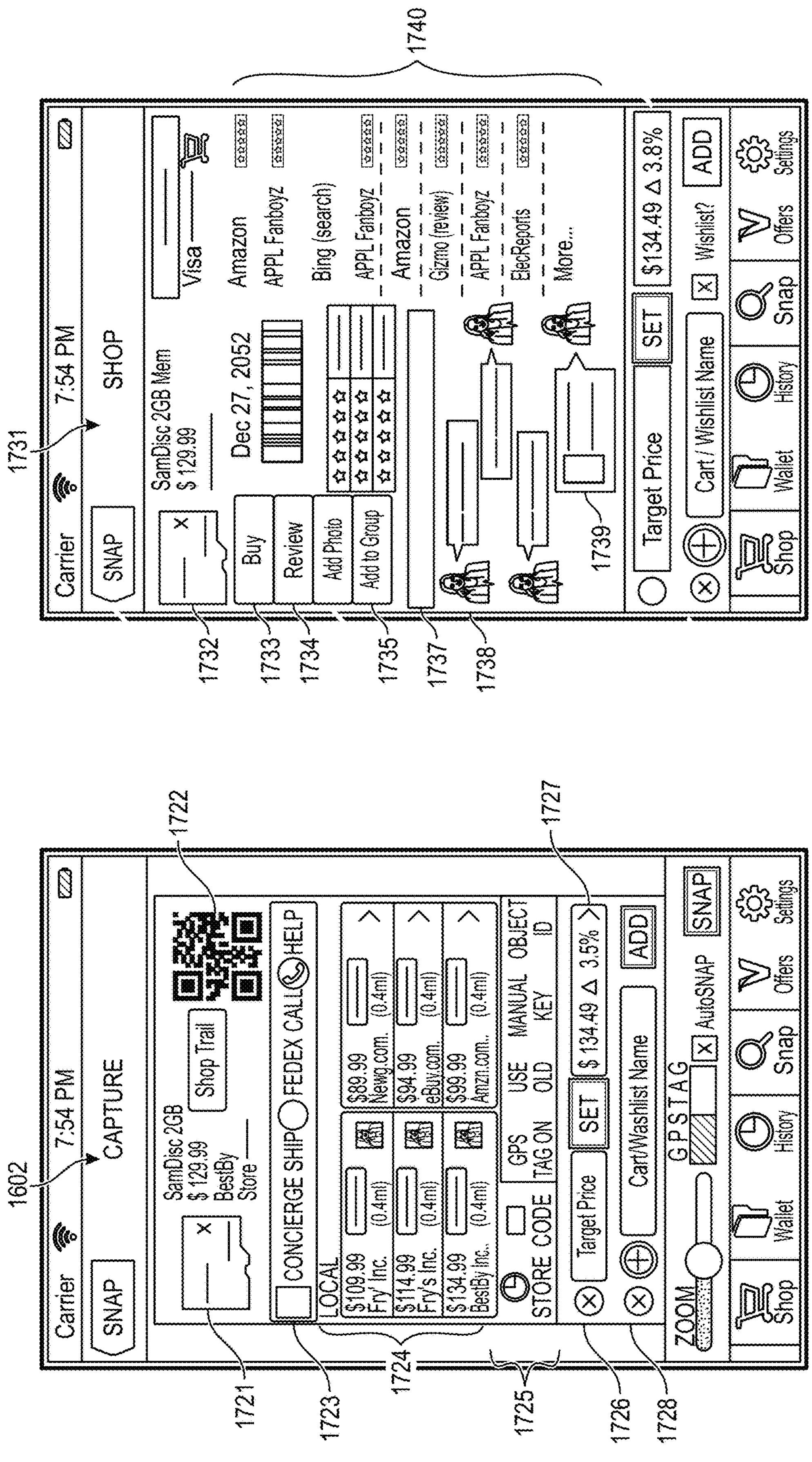

With reference to FIG. 17B, in some implementations, where the user has not yet interacted with an item, the user may view details of the item designed to facilitate the user to purchase the item at the best possible terms for the user. For example, the virtual wallet application may provide a detailed view of the item at the point where it was snapped by the user using the user device, 1721, including an item description, price, merchant name, etc. The view may also provide a QR code 1722, which the user may tap to save to the wallet for later use, or to show to other users who may snap the QR code to purchase the item. In some implementations, the view may provide additional services for the user, including but not limited to: concierge service; shipment services, helpline, and/or the like, 1723. In some implementations, the view may provide prices from competing merchants locally or on the web, 1724. Such pricing data may be facilitated by the centralized personal information platform components described further below in the discussion with reference to FIGS. 23-42. In some implementations, the view may provide the user with the option to (see 1725): store the snapped code for later, start over and generate a new code, turn on or off a GPS tagging feature, use a previously snapped QR code, enter keywords associated with the QR code, associated the items related to the QR code to an object, and/or the like. In some implementations, the virtual wallet may provide a SmartBuy targeted shopping feature. For example, the user may set a target price 1726 for the product 1721 that the user wishes to buy. The virtual wallet may provide a real-time market watch status update 1727 for the product. When the market price available for the user falls below the user's target price 1726, the virtual wallet may automatically buy the product for the user, and provide a shipment/notification to the user. The user may at any time add the item to one of the user's carts or wishlists (see 1728).

In one implementation, in particular when the user has previously interacted with the item that is snapped, the user may view the details of the items 1732 and the amount(s) of each item, the merchant, etc., 1732. In various implementations, the user may be able to perform additional operations in this view. For example, the user may (re)buy the item 1733, obtain third-party reviews of the item, and write reviews of the item 1734, add a photo to the item so as to organize information related to the item along with the item 1735, add the item to a group of related items 1736 (e.g., a household), provide ratings 1737, or view quick ratings from the user's friends or from the web at large. For example, such systems may be implemented using the example centralized personal information platform components described below in the discussion with reference to FIGS. 23-42. The user may add a photo to the transaction. In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 1737 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area shows FACEBOOK message exchanges between two users. In one implementation, a user may share a link via a message. Selection of such a message having embedded link to a product may allow the user to view a description of the product and/or purchase the product directly from the history mode.

In some implementations, the wallet application may display a shop trail for the user. For example, a user may have reviewed a product at a number of websites (e.g., ElecReports, APPL FanBoys, Gizmo, Bing, Amazon, Visa Smartbuy feature (e.g., that checks various sources automatically for the best price available according to the user preferences, and provides the offer to the user), etc.), which may have led the user to a final merchant website where the user finally bought the product. In some implementations, the WIP may identify the websites that the user visited, that contributed to the user deciding to buy the product, and may reward them with a share of the revenues obtained by the "point-of-sale" website for having contributed to the user going to the point-of-sale website and purchasing the product there. For example, the websites may have agreements with product manufacturers, wholesalers, retail outlets, payment service providers, payment networks, amongst themselves, and/or the like with regard to product placement, advertising, user redirection and/or the like. Accordingly, the WIP may calculate a revenue share for each of the websites in the user's shopping trail using a revenue sharing model, and provide revenue sharing for the websites.

In some implementations, the virtual wallet may provide a SmartBuy targeted shopping feature. For example, the user may set a target price for the product that the user wishes to buy. The virtual wallet may provide a real-time market watch status update for the product. When the market price available for the user falls below the user's target price, the virtual wallet may automatically buy the product for the user, and provide a shipment/notification to the user.

Figure 17C:
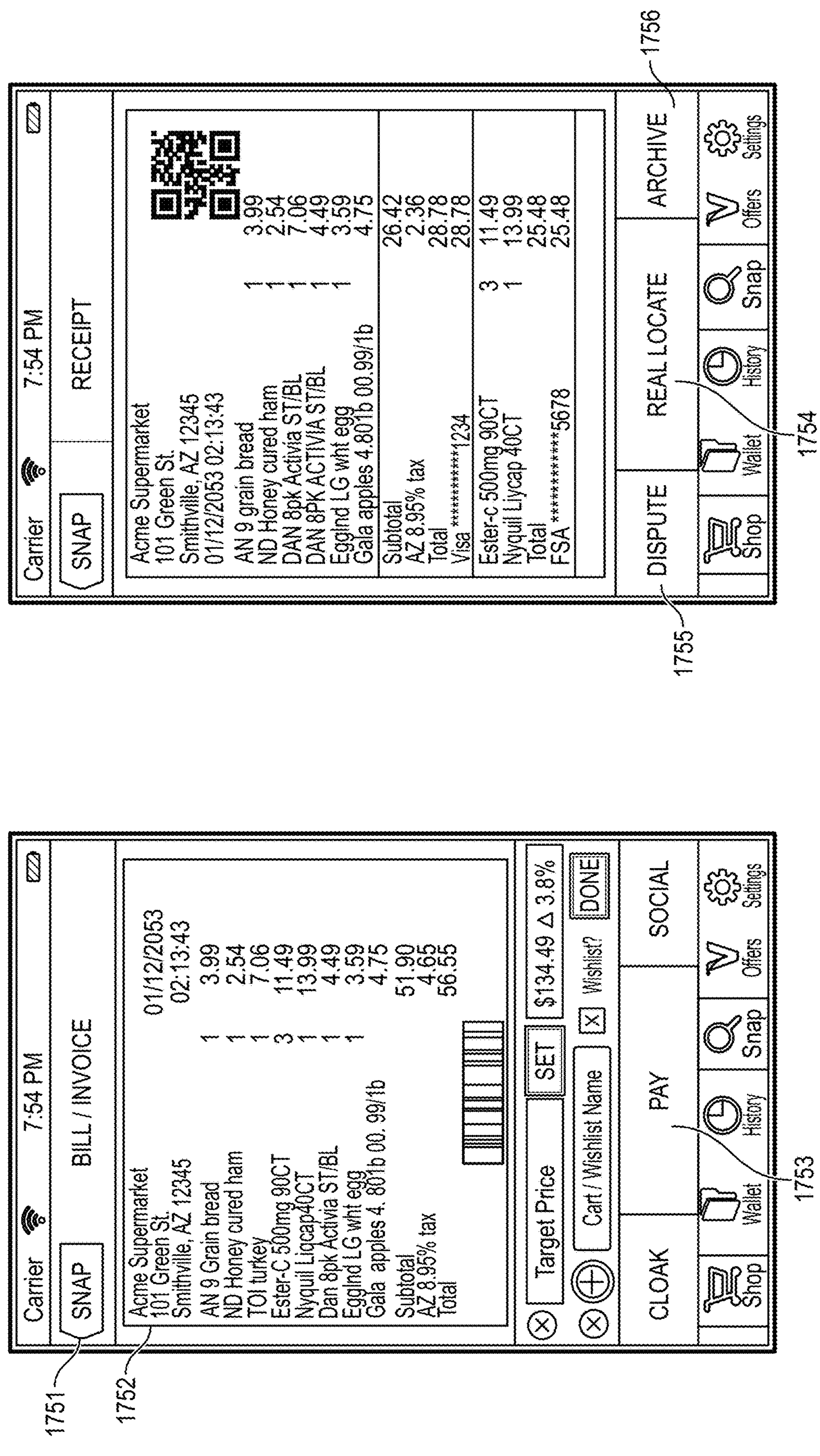
Figure 17D:
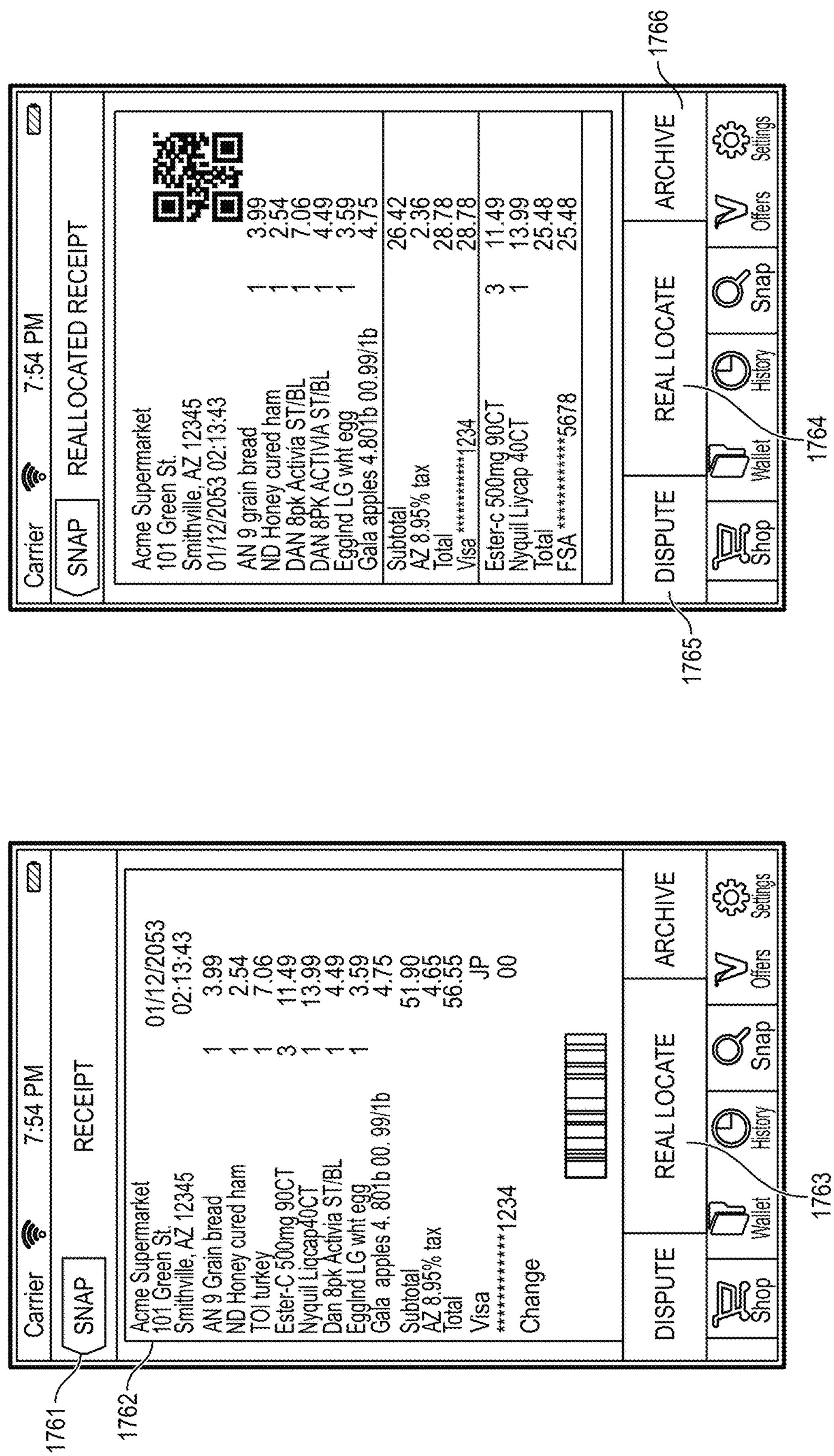

With reference to FIGS. 17C-D, in one embodiment, the snap mode may facilitate payment reallocation for a previously completed transaction (FIG. 17C), or a transaction to performed at present (FIG. 17D). For example, a user may buy grocery and prescription items from a retailer Acme Supermarket. The user may, inadvertently or for ease of checkout for example, have already used his or her traditional payment card to pay for both grocery and prescription items, and obtained a receipt. However, the user may have an FSA account that could have been used to pay for prescription items, and which would have provided the user a better price or other economic benefits. In such a situation, the user may use the snap mode to initiate transaction reallocation.

As shown, the user may snap 1751, 1761 a picture of a barcode on an receipt 1753, 1763, upon which the virtual wallet application may present the receipt data 1752, 1762 using information from the pay code. The user may now reallocate expenses to their optimum accounts 1754, 1764. In some implementations, the user may also dispute the transaction 1755, 1765 or archive the receipt 1756, 1766.

In one implementation, when the reallocate button is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt may be generated after the completion of the reallocation process. As discussed, the receipt shows that some charges have been moved from the Visa account to the FSA.

Figure 17E:
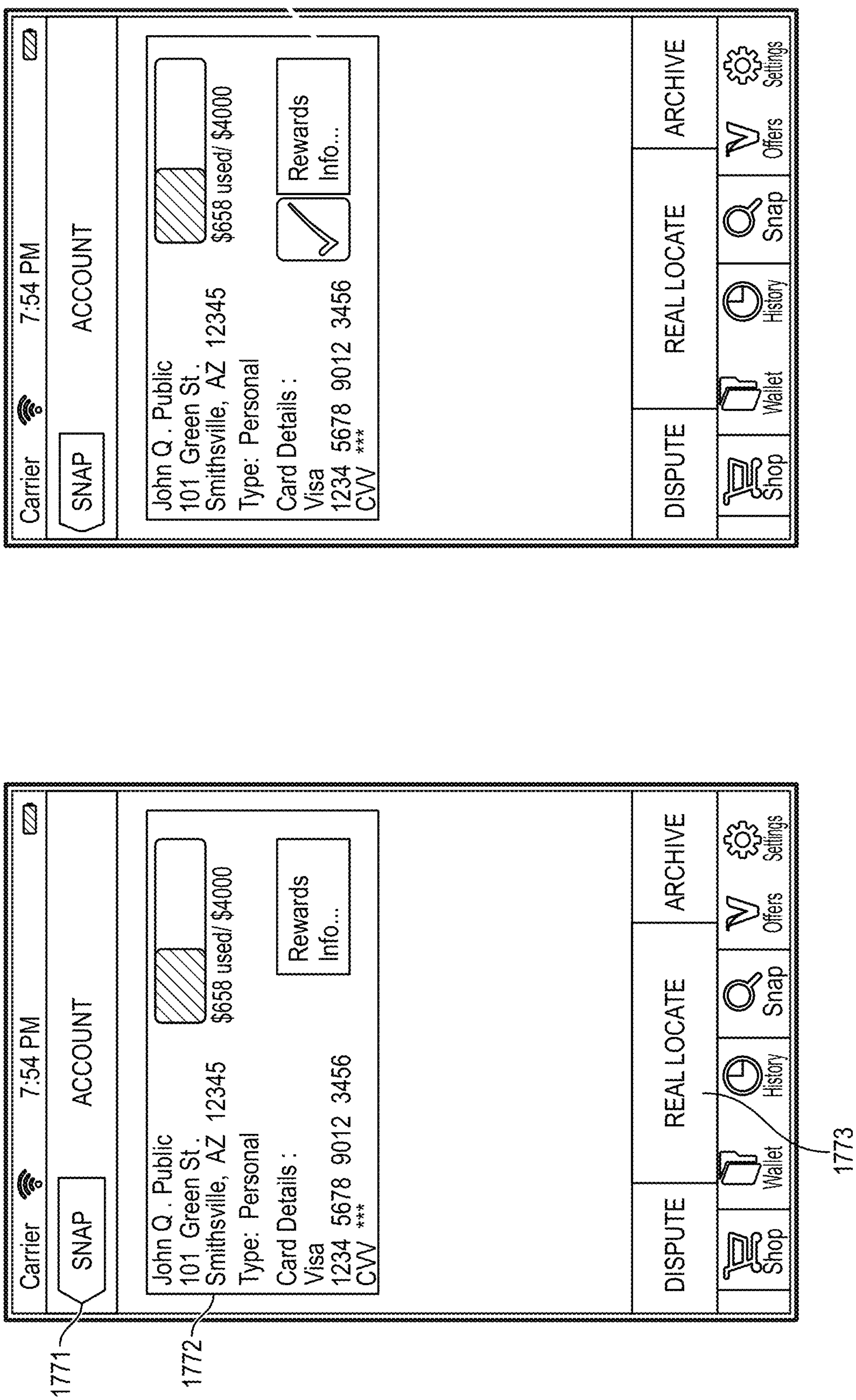

With reference to FIG. 17E, in one embodiment, the snap mode may also facilitate offer identification, application and storage for future use. For example, in one implementation, a user may snap an account code, an offer code 1771 (e.g., a bar code, a QR code, and/or the like). The wallet application may then generate an account card text, coupon text, offer text 1772, 1774 from the information encoded in the offer code. The user may perform a number of actions on the offer code. For example, the user may use the reallocate button 1773 to reallocate prior purchases that would have been better made using the imported card, coupon, offer, etc., and the virtual wallet application may provide a notification of reallocation upon modifying the accounts charged for the previous transactions of the user.

In one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card and may display the textual information encoded in the pay card. The user may then perform verification of the information by selecting a verify button. In one implementation, the verification may include contacting the issuer of the pay card for confirmation of the decoded information and any other relevant information. In one implementation, the user may add the pay card to the wallet by selecting a 'add to wallet' button. The instruction to add the pay card to the wallet may cause the pay card to appear as one of the forms of payment under the funds tab discussed above.

Figure 17F:
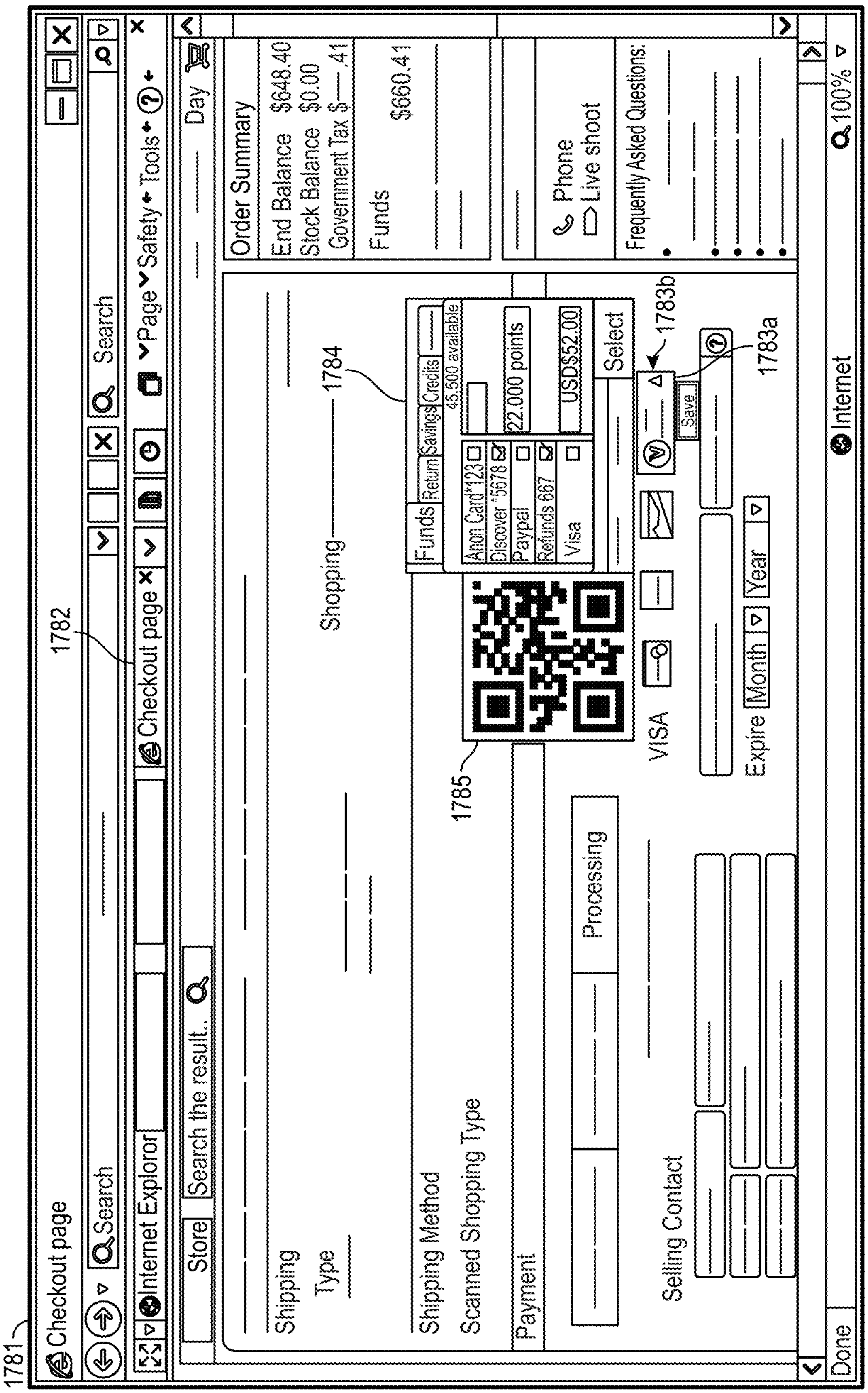

With reference to FIG. 17F, in some implementations, a user may be advantageously able to provide user settings into a device producing a QR code for a purchase transaction, and then capture the QR code using the user's mobile device. For example, a display device of a point-of-sale terminal may be displaying a checkout screen, such as a web browser executing on a client, e.g., 1781, displaying a checkout webpage of an online shopping website, e.g., 1782. In some implementations, the checkout screen may provide a user interface element, e.g., 1783*a-b*, whereby the user can indicate the desire to utilize snap mobile payment. For example, if the user activates an element, the website may generate a QR code using default settings of the user, and display the QR code, e.g., 1785, on the screen of the client for the user to capture using the user's mobile device. In some implementations, the user may be able to activate a user interface element, e.g., 1783*b*, whereby the client may display a pop-up menu, e.g., 1784, with additional options that the user may select from. In some implementations, the website may modify the QR code 1785 in real-time as the user modifies settings provided by activating the user interface element 1783*b*. Once the user has modified the settings using the pop-up menu, the user may capture a snapshot of the QR code to initiate purchase transaction processing.

product pricing, sales tax, offers, discounts, rewards, and/or other information to process the purchase transaction.

In response to obtaining the product data, the merchant server may generate, e.g., 1706, a QR pay code, and/or secure display element according to the security settings of the user. For example, the merchant server may generate a QR code embodying the product information, as well as merchant information required by a payment network to process the purchase transaction. For example, the merchant server may first generate in real-time, a custom, user-specific merchant-product XML data structure having a time-limited validity period, such as the example 'QR_data' XML data structure provided below:

```
<QR_data>
    <session_ID>4NFU4RG94</session_ID>
    <timestamp>2011-02-22 15:22:43</timestamp>
    <expiry_lapse>00:00:30</expiry_lapse>
    <transaction_cost>$34.78</transaction_cost>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <secure_element>www.merchant.com/securedyn/0394733/123.png</secure_element>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
<QR_data>
```

Figure 17G:
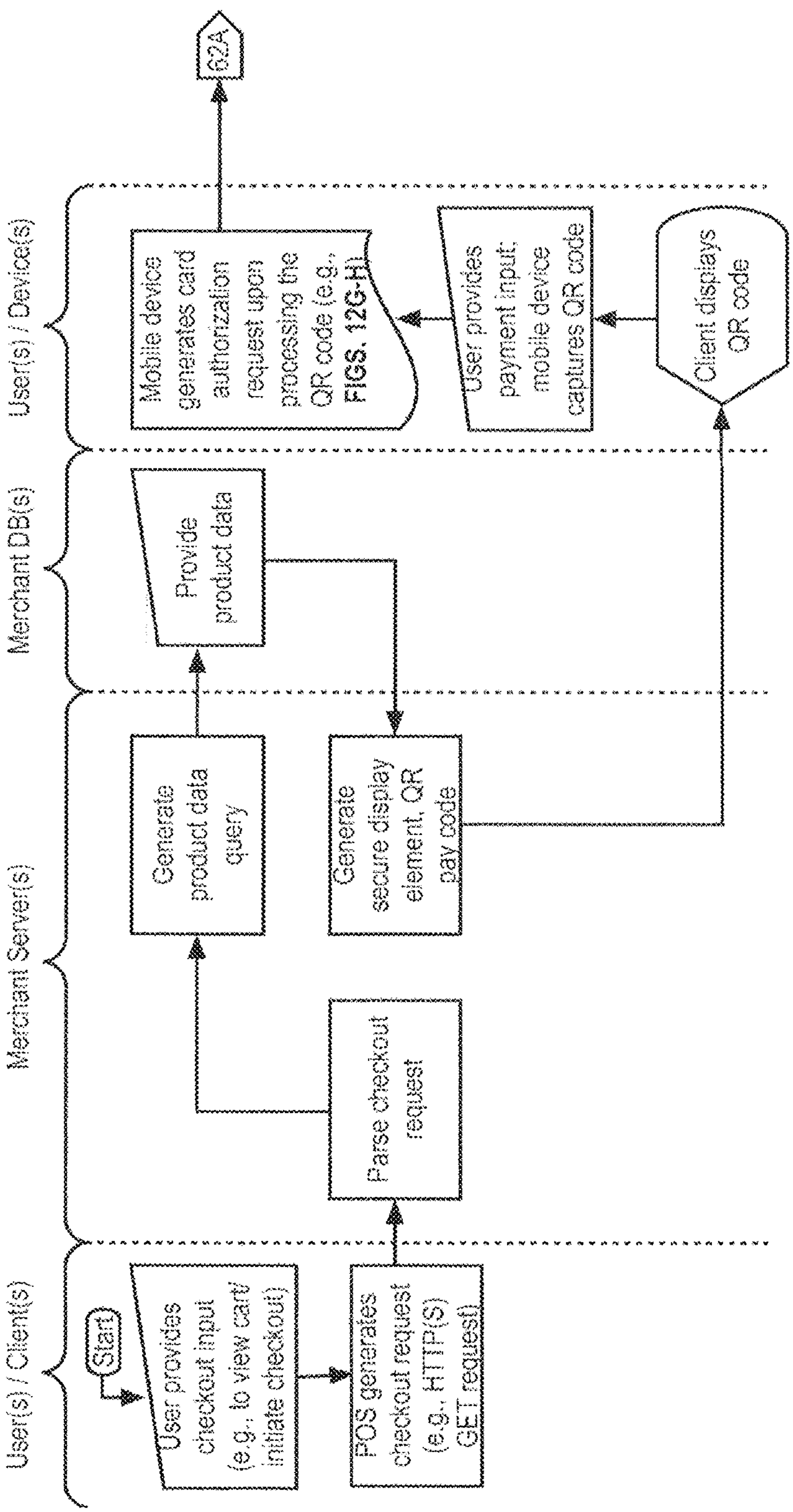

FIG. 17G shows a logic flow diagram illustrating example aspects of executing a snap mobile payment in some embodiments of the WIP, e.g., a Snap Mobile Payment Execution ("SMPE") component. In some implementations, a user may desire to purchase a product, service, offering, and/or the like ("product"), from a merchant via a merchant online site or in the merchant's store. The user may communicate with a merchant server via a client. For example, the user may provide user input, e.g., into the client indicating the user's desire to checkout shopping items in a (virtual) shopping cart. The client may generate a checkout request, e.g., and provide the checkout request to the merchant server. The merchant server may obtain the checkout request from the client, and extract the checkout detail (e.g., XML data) from the checkout request, e.g. For example, the merchant server may utilize a parser such as the example parsers described below in the discussion with reference to FIG. 66. The merchant server may extract the product data, as well as the client data from the checkout request. In some implementations, the merchant server may query, e.g., a merchant database to obtain product data, e.g., such as In some implementations, the merchant may generate QR code using the XML data. For example, the merchant server may utilize the PHP QR Code open-source (LGPL) library for generating QR Code, 2-dimensional barcode, available at http://phpqrcode.sourceforge.net/. For example, the merchant server may issue PHP commands similar to the example commands provided below:

```
<?PHP
header('Content-Type: text/plain');
// Create QR code image using data stored in $data variable
QRcode::png($data, 'qrcodeimg.png');
?>
```

The merchant server may provide the QR pay code to the client, e.g., 1706. The client may obtain the QR pay code, and display the QR code, e.g., 1707 on a display screen associated with the client device. In some implementations, the user may utilize a user device, e.g., 1709, to capture the QR code presented by the client device for payment processing. The client device may decode the QR code to extract the information embedded in the QR code. For example, the client device may utilize an application such as the ZXing multi-format 1D/2D barcode image processing library, available at http://code.google.com/p/zxing/to extract the information from the QR code. In some implementations, the user may provide payment input into the user device, e.g., 1708. Upon obtaining the user purchase input, the user device may generate a card authorization request, e.g., 1709, and provide the card authorization request to a pay network server (see, e.g., FIG. 57A).

Figure 17H:
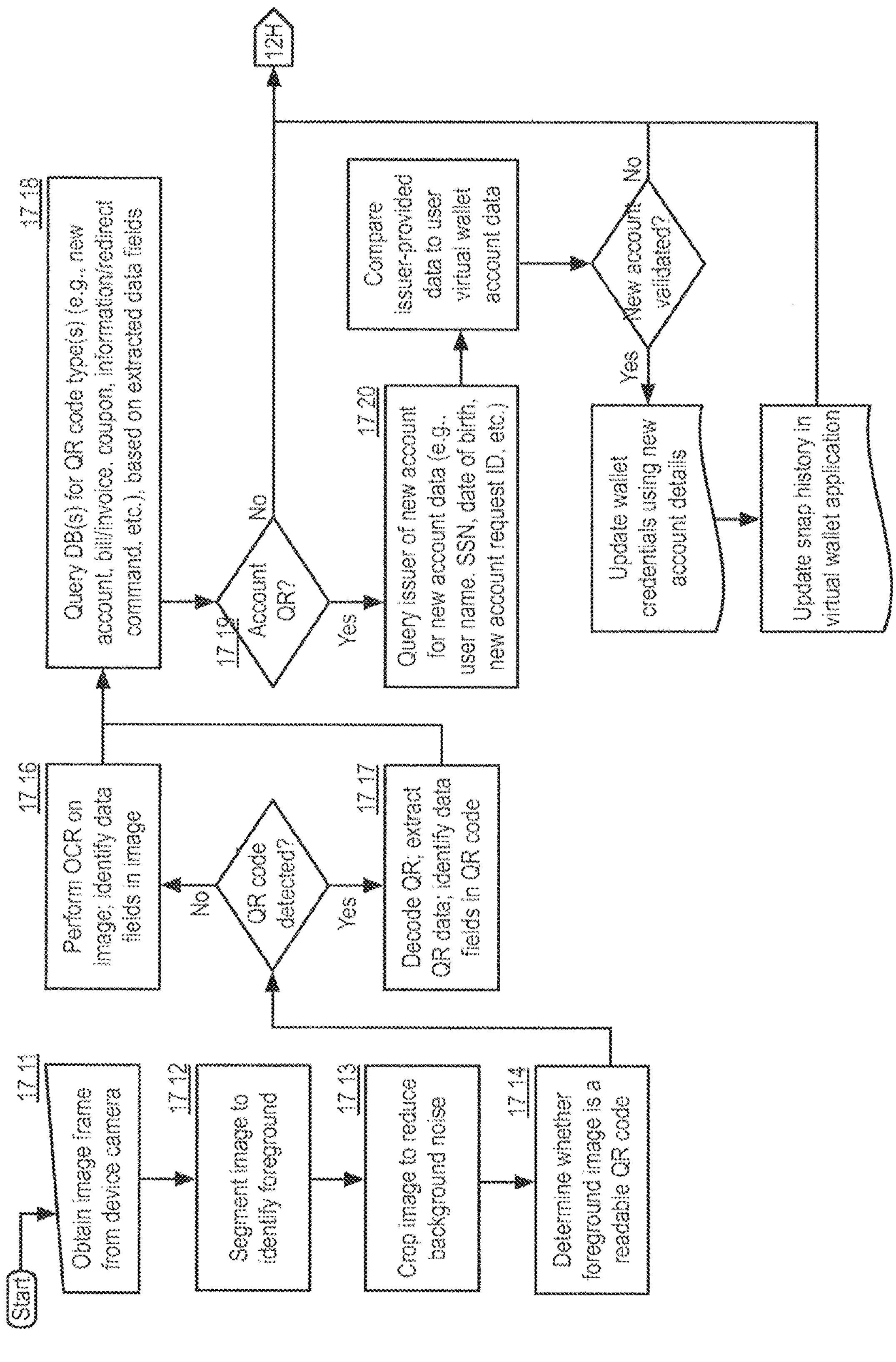
Figure 17I:
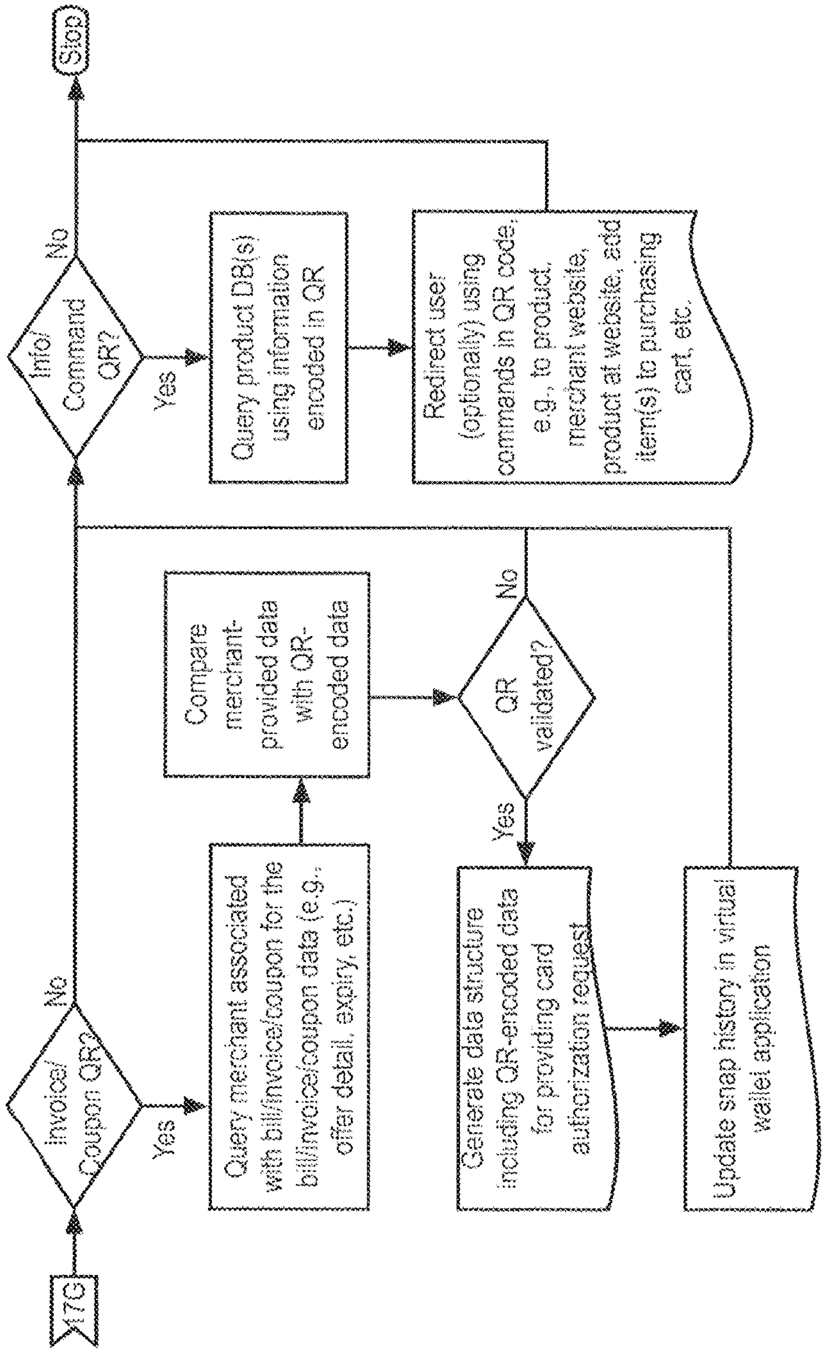

FIGS. 17H-I show logic flow diagrams illustrating example aspects of processing a Quick Response code in some embodiments of the WIP, e.g., a Quick Response Code Processing ("QRCP") component 1710. With reference to FIG. 17H, in some implementations, a virtual wallet application executing on a user device may determine whether a QR code has been captured in an image frame obtained by a camera operatively connected to the user device, and may also determine the type, contents of the QR code. Using such information, the virtual wallet application may redirect the user experience of the user and/or initiating purchases, update aspects of the virtual wallet application, etc. For example, the virtual wallet application may trigger the capture of an image frame by a camera operatively connected to the user device, 1711. The virtual wallet application may utilize an image segmentation algorithm to identify a foreground in the image, 1712, and may crop the rest of the image to reduce background noise in the image, 1713. The virtual wallet application may determine whether the foreground image includes a QR code from which data can be reliably read (e.g., this may not be so if the image does not include a QR code, or the QR code is partially cropped, blurred, etc.), 1714. For example, the virtual wallet application may utilize a code library such as the ZXing multi-format 1D/2D barcode image processing library, available at http://code.google.com/p/zxing/to try and extract the information from the QR code. If the virtual wallet application is able to detect a QR code (, option "Yes"), the virtual wallet application may decode the QR code, and extract data from the QR code, 1717. If the virtual wallet application is unable to detect a QR code (1215, option "No"), the virtual wallet application may attempt to perform Optical Character Recognition on the image. For example, the virtual wallet application may utilize the Tesseract C++ open source OCR engine, available at www.pixel-technology.com/freewarw/tessnet2, to perform the optical character recognition, 1716. Thus, the virtual wallet application may obtain the data encoded into the image, and may continue if the data can be processed by the virtual wallet application. The virtual wallet application may query a database using fields identified in the extracted data, for a type of the QR code, 1718. For example, the QR code could include an invoice/bill, a coupon, a money order (e.g., in a P2P transfer), a new account information packet, product information, purchase commands, URL navigation instructions, browser automation scripts, combinations thereof, and/or the like.

In some embodiments, the QR code may include data on a new account to be added to the virtual wallet application (see 1719). The virtual wallet application may query an issuer of the new account (as obtained from the extracted data), for the data associated with the new account, 1720. The virtual wallet application may compare the issuer-provided data to the data extracted from the QR code. If the new account is validated (option "Yes"), the virtual wallet application may update the wallet credentials with the details of the new account, and update the snap history of the virtual wallet application using the data from the QR code.

With reference to FIG. 17I, in some embodiments, the QR code may include data on a bill, invoice, or coupon for a purchase using the virtual wallet application. The virtual wallet application may query merchant(s) associated with the purchase (as obtained from the extracted data), for the data associated with the bill, invoice, or coupon for a purchase (e.g., offer details, offer ID, expiry time, etc.). The virtual wallet application may compare the merchant-provided data to the data extracted from the QR code. If the bill, invoice, or coupon for a purchase is validated (, option "Yes"), the virtual wallet application may generate a data structure (see e.g., XML QR_data structure in description above with reference to FIG. 17F) including the QR-encoded data for generating and providing a card authorization request and update the snap history of the virtual wallet application using the data from the QR code.

In some embodiments, the QR code may include product information, commands, user navigation instructions, etc. for the virtual wallet application (see 1731). The virtual wallet application may query a product database using the information encoded in the QR. The virtual wallet application may provide various features including, without limitation, displaying product information, redirecting the user to: a product page, a merchant website, a product page on a merchant website, add item(s) to a user shopping cart at a merchant website, etc. In some implementations, the virtual wallet application may perform a procedure such as described above for any image frame pending to be processed, and/or selected for processing by the user (e.g., from the snap history).

Figure 18A:
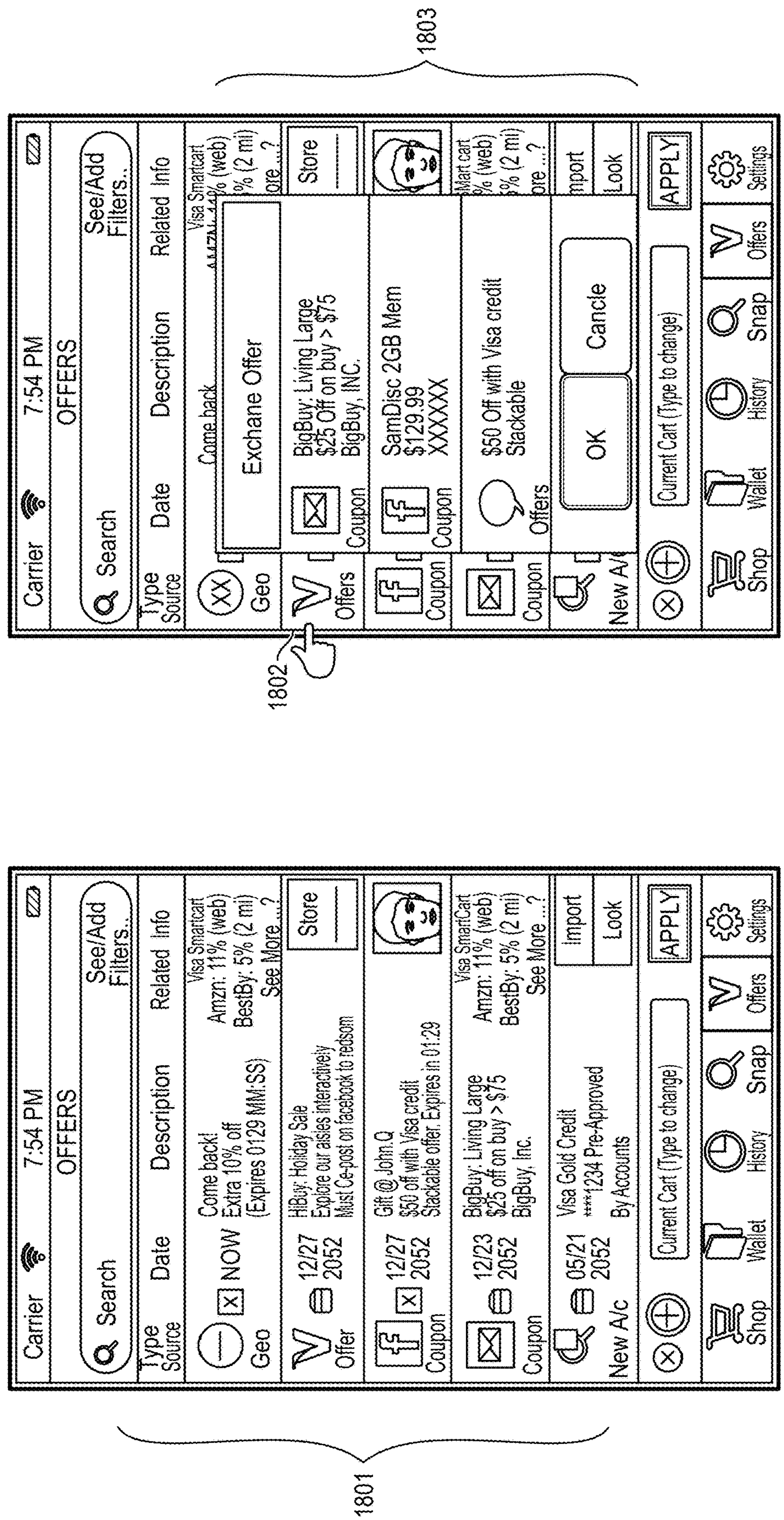
FIGS. 18A-B show user interface and logic flow diagrams illustrating example aspects of an offers mode of a virtual wallet application in some embodiments of the WIP.
Figure 18B:
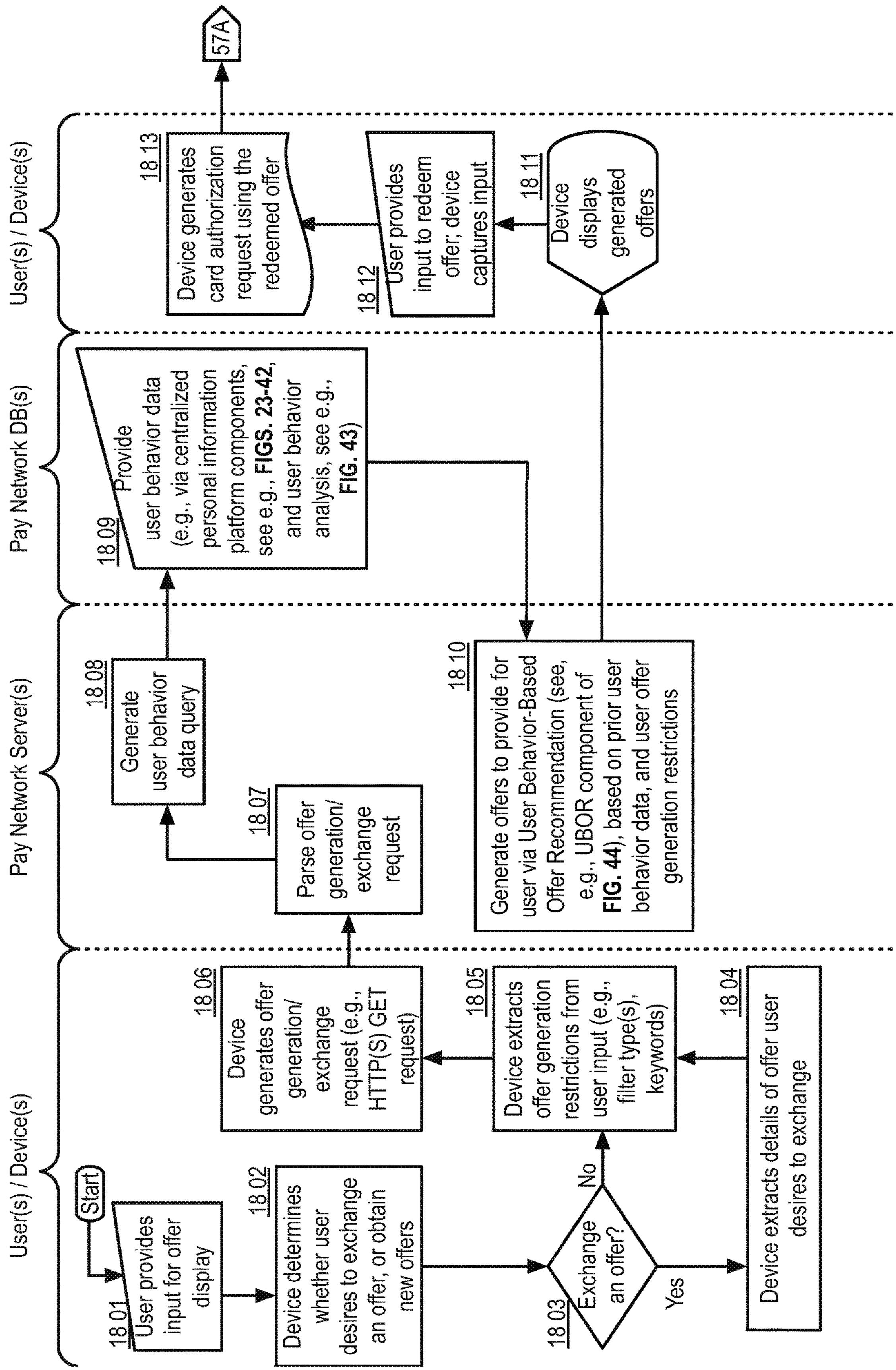

FIGS. 18A-B show user interface and logic flow diagrams illustrating example aspects of an offers mode of a virtual wallet application in some embodiments of the WIP. With reference to FIG. 18A, in some implementations, a user may desire to obtain new offers in the user's virtual wallet application, or may desire to exchange an existing offer for a new one (or a plurality of offers) (e.g., offers 1801 may be replaced at the user's command). For example, the user may provide an input indicating a desire to replace offer 1802. In response, the virtual wallet application may provide a set of replacement offers 1803, from which the user may choose one or more offers to replace the offer 1802.

FIG. 18B shows a logic flow diagram illustrating example aspects of generating and exchanging offer recommendations in some embodiments of the WIP, e.g., an Offer Recommendation and Exchange ("ORE") component 1810. In some implementations, a user may desire to obtain new offers in the user's virtual wallet application, or may desire to exchange an existing offer for a new one (or a plurality of offers). The user may provide an input for display of such offers, 1801. The user's device may obtain the user's input, and determine whether the user desires to obtain a new offer, or obtain offers in exchange for an offer currently stored within the user's virtual wallet application executing on the device, 1802. If the device determines that the user desires to exchange a pre-existing offer, e.g., 1803, option "Yes," the device may extract details of the offer that the user desires to exchange. For example, the device may correlate the position of the user's touchscreen input (e.g., where the device has a touchscreen interface) to an offer displayed on the screen. The device may also determine that the user utilized a gesture associated with the offer displayed on the screen that indicates the user's desire to exchange the offer with which the user gesture is associated. The device may query its database for an offer corresponding to the displayed offer, and may extract the details of the offer, 1804, by parsing the database-returned offer using a parser, such as the example parsers described below in the discussion with reference to FIG. 66. In some implementations, the device may extract any user-input offer generation restrictions (e.g., such as types of filters the user may have applied to offers the user desires, keywords related to the kinds of offers the user may desire, etc.) provided by the user as input, 1805. The device may generate an offer generation/exchange request for a pay network server using the extracted data on the offer to be exchanged (if any), and the user preferences for types of offers desired (if any), e.g., as a HTTP(S) POST request similar to the examples provided in the discussions below.

In some implementations, the pay network server may parse the offer generation/exchange request, 1807, using parsers such as the example parser described below in the discussion with reference to FIG. 66. The pay network server may generate a user behavior data query, 1808. For example, the server may utilize PHP/SQL commands to query a relational pay network database for user prior behavior data. For example, the pay network server may obtain such data generated using centralized personal information platform components, such as those described in the discussion below with reference to FIGS. 23-42, as well as a user behavior analysis component, such as the example UBA component described below in the discussion with reference to FIG. 38. The database may provide such user behavior data and analysis thereof to the pay network server, 1809. Using the prior user behavior data and/or analysis thereof, and using the details of the exchanged offer and/or user offer generation restrictions, the pay network server may generate offers to provide for the user 1810. For example, the pay network server may utilize a user behavior-based offer recommendation component such as the example UBOR component described in the discussion below with reference to FIG. 44. The server may provide the generated offers to the device, which may display the received offers to the user, 1811. In some implementations, the user may provide an input indicating a desire to redeem one of the offers provided by the pay network server, 1812. In response, the device may generate a card authorization request incorporating the details of the offer chosen for redemption by the user, 1813, and provide the generated card authorization request for purchase transaction processing (e.g., as an input to the example PTA component described below in the discussion with reference to FIGS. 62A-B).

Figure 19:
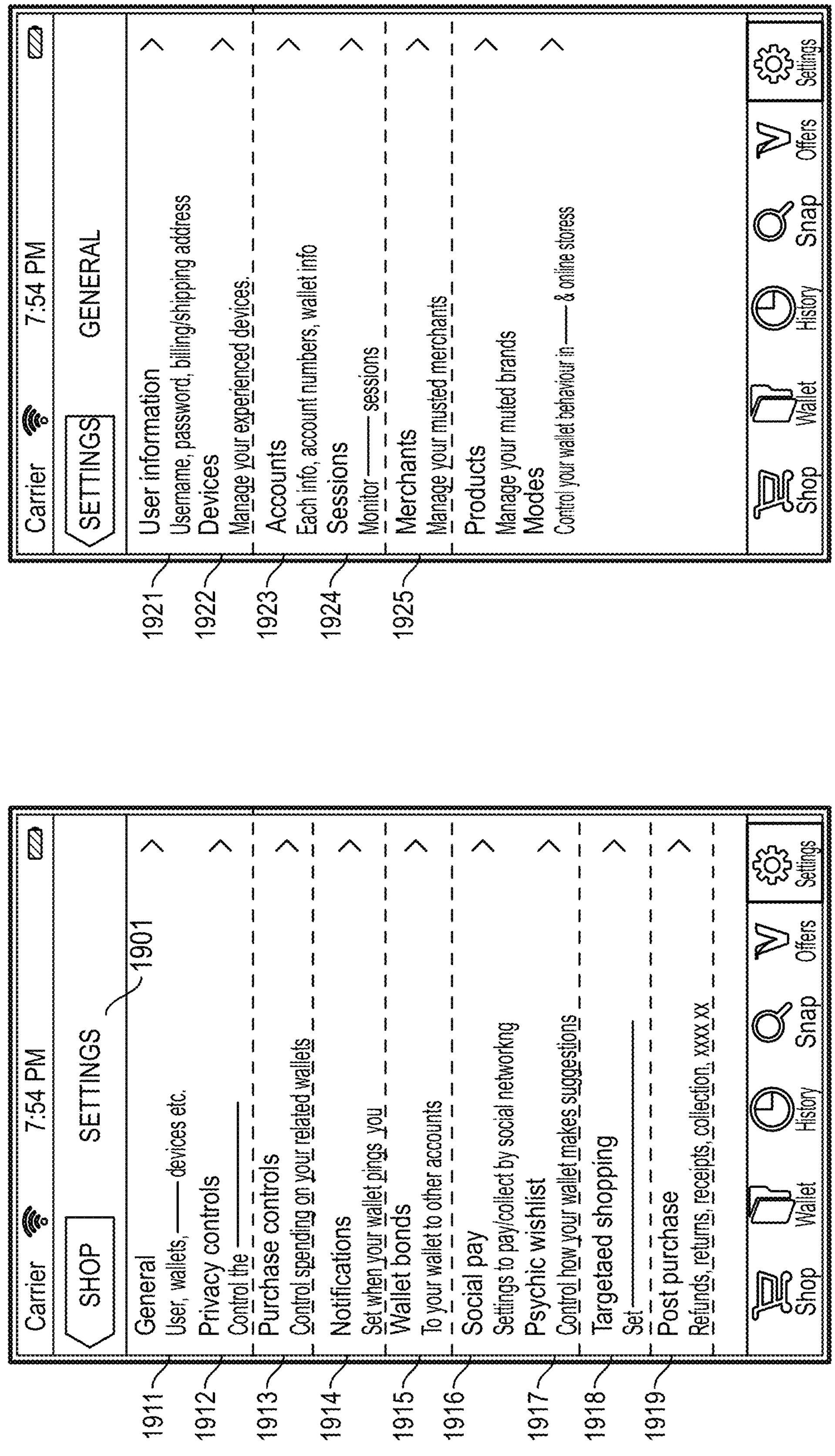
FIG. 19 shows user interface diagrams illustrating example aspects of a general settings mode of a virtual wallet application in some embodiments of the WIP.

FIG. 19 shows user interface diagrams illustrating example aspects of a general settings mode of a virtual wallet application in some embodiments of the WIP. In some implementations, the virtual wallet application may provide a user interface where the user can modify the settings of the wallet, 1901. For example, the user may modify settings such as, but not limited to: general settings 1911 (e.g., user information, wallet information, account information within the wallet, devices linked to the wallet, etc.); privacy controls 1912 (e.g., controlling information that is provided to merchants, payment networks, third-parties, etc.); purchase controls 1913 (e.g., placing specific spending restrictions, or proscribing particular type of transaction); notifications 1914; wallet bonds 1915 (e.g., relationship made with other virtual wallets, such that information, settings, (parental) controls, and/or funds may flow between the wallets seamlessly); 1916 social payment settings (see, e.g., FIGS. 40-47); psychic wishlists (e.g., controlling the type of user behaviors to consider in generating offers, recommendations—see, e.g., FIG. 39); targeted shopping 1918 (e.g., setting target prices at which buying of products is automatically triggered—see, e.g., FIGS. 11A, 12B-C); or post purchase settings 1919 (e.g., settings regarding refunds, returns, receipts, reallocation of expenses (e.g., to FSA or HSA accounts), price matching (e.g., if the price of the purchased item falls after the user buys it), etc.

In a category of general settings (1411), a user may be able to modify settings such as, but not limited to: user information 1921, user device 1922, user accounts 1923, shopping sessions 1924, merchants that are preferred 1925, preferred products and brand names 1926, preferred modes (e.g., settings regarding use of NFC, Bluetooth, and/or the like) 1927, etc.

Figure 20:
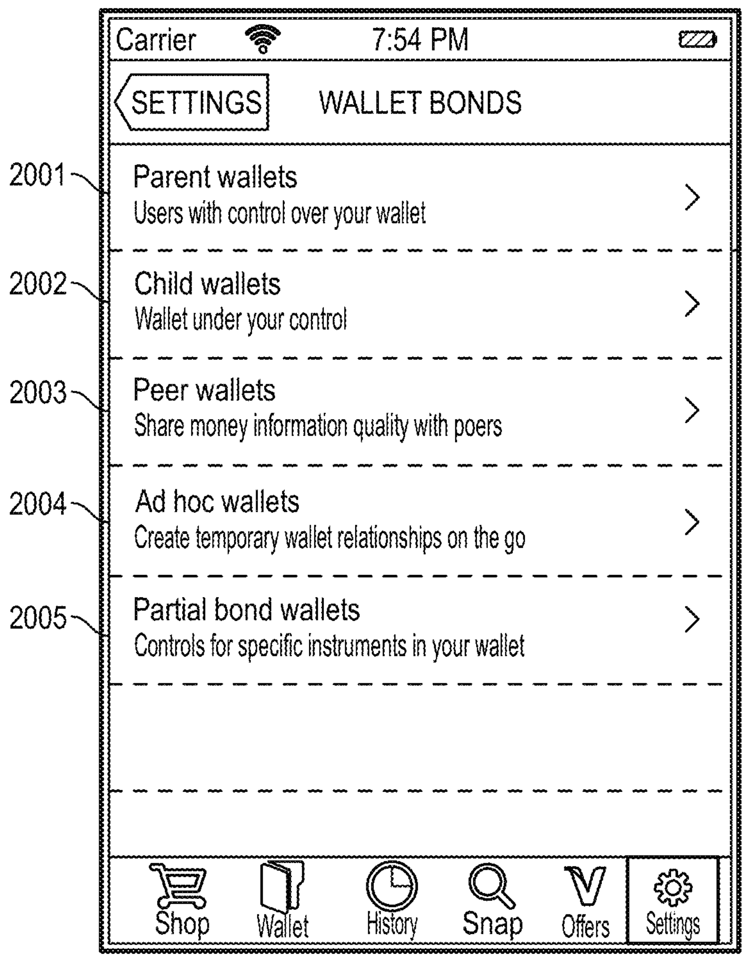
FIG. 20 shows a user interface diagram illustrating example aspects of a wallet bonds settings mode of a virtual wallet application in some embodiments of the WIP.

FIG. 20 shows a user interface diagram illustrating example aspects of a wallet bonds settings mode of a virtual wallet application in some embodiments of the WIP. In a category of wallet bonds settings (see FIG. 14, 1415), a user may be able to modify settings such as, but not limited to, settings regarding: parent wallets 2001 (e.g., those that have authorization to place restriction on the user's wallet); child wallets 2002 (e.g., those wallets over which the user has authorization to place restrictions); peer wallets 2003 (e.g., those wallets that have a similar level of control and transparency); ad hoc wallets 2004 (e.g., those wallets that are connected temporarily in real-time, for example, for a one-time funds transfer); partial bond wallets (e.g., such as bonds between corporate employer virtual wallet and an employee's personal wallet, such that an employer wallet may provide limited funds with strings attached for the employee wallet to utilize for business purposes only), and/or the like.

Figure 21A:
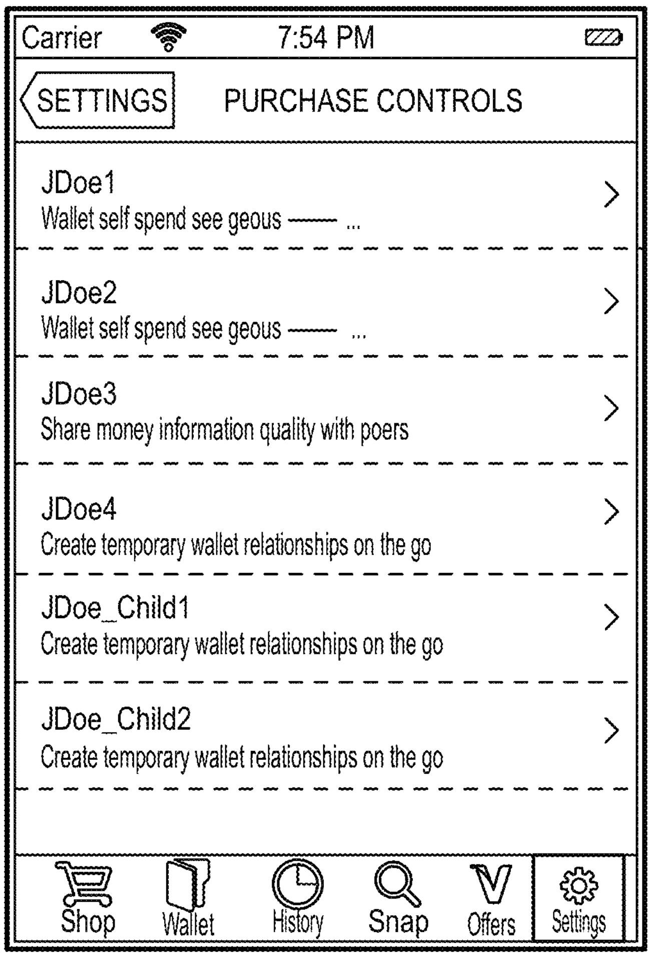
FIGS. 21A-C show user interface diagrams illustrating example aspects of a purchase controls settings mode of a virtual wallet application in some embodiments of the WIP.
Figure 21B:
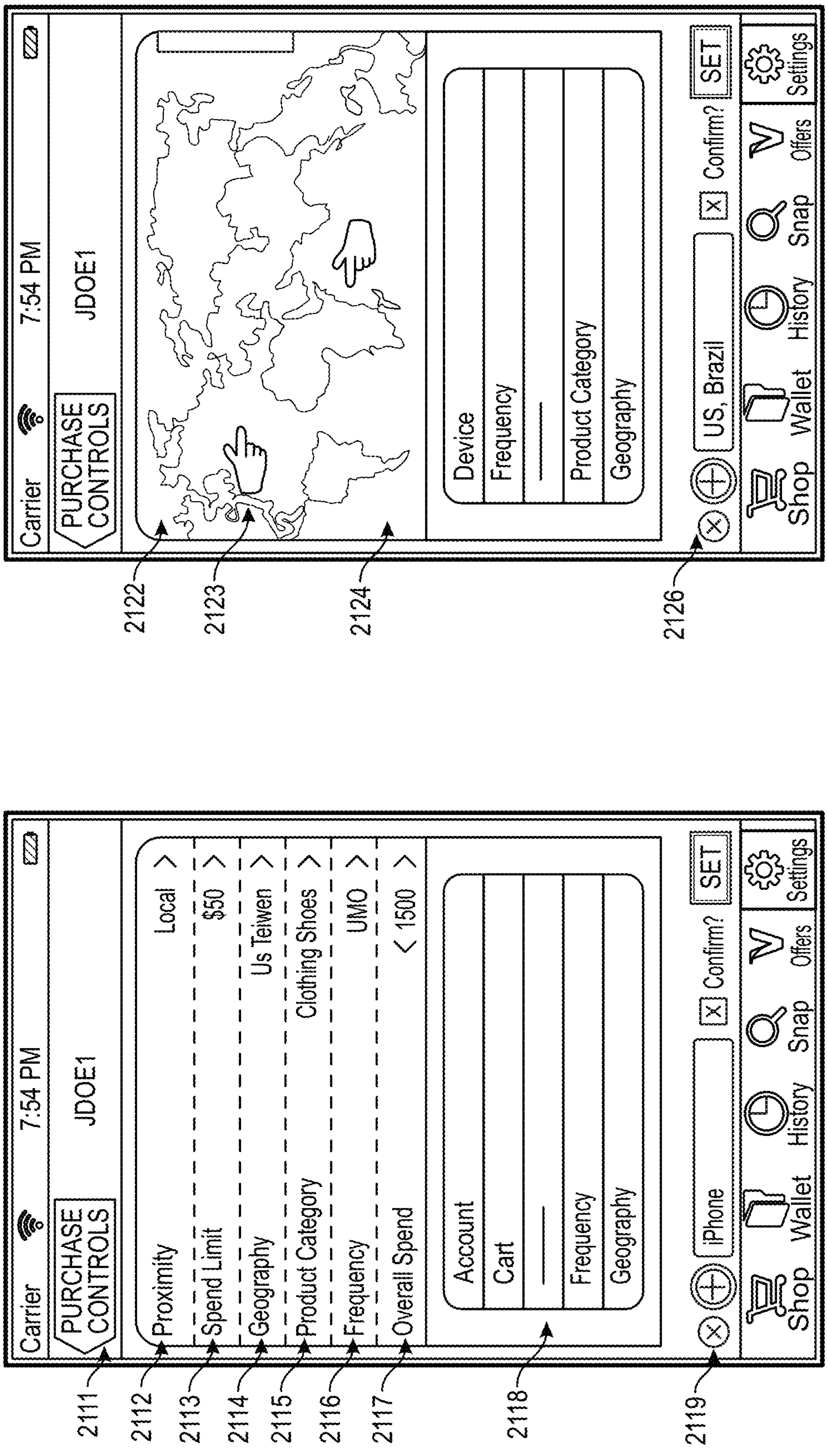
Figure 21C:
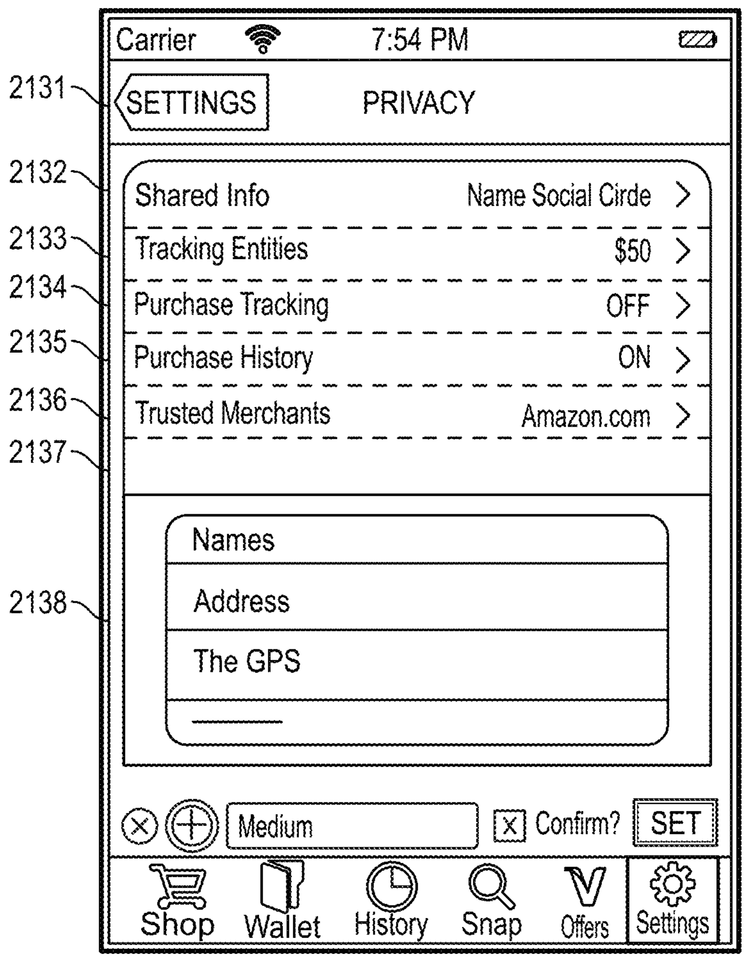

FIGS. 21A-C show user interface diagrams illustrating example aspects of a purchase controls settings mode of a virtual wallet application in some embodiments of the WIP. With reference to FIG. 21A, in some implementations, a user may be able to view and/or modify purchase controls that allow only transaction that satisfy the purchase controls to be initiated from the wallet. In one implementation, a consumer may configure consumer-controlled fraud prevention parameters to restrict a purchase transaction via his electronic wallet, e.g., transaction time, maximum amount, type, number of transactions per day, and/or the like. For example, a consumer may enroll with an electronic wallet service (e.g., Visa V-Wallet) by creating an e-wallet account and adding a payment account to the e-wallet (e.g., a credit card, a debit card, a PayPal account, etc.). The consumer may configure parameters to restrict the wallet transactions. For example, the consumer may configure a maximum one-time transaction amount (e.g., $500.00, etc.). For another example, the consumer may specify a time range of transactions to be questionable (e.g., all transactions occurring between 2 am-6 am, etc.). For another example, the consumer may specify the maximum number of transactions per day (e.g., 20 per day, etc.). For further examples, the consumer may specify names and/or IDs of merchants with whom the transactions may be questionable (e.g., Internet spam sites, etc.).

In one implementation, the consumer may configure the purchase control settings to detect and block all susceptible transactions. For example, when an attempted transaction of an amount that exceeds the maximum specified transaction amount occurs, the electronic wallet may be configured to reject the transaction and send an alert to the consumer. The transaction may be resumed once the consumer approves the transaction. In another implementation, if the WIP does not receive confirmation from the consumer to resume a susceptible transaction, the WIP may send a notification to the merchant to cancel the transaction. In one implementation, the consumer may configure the time period of clearance (e.g., 12 hours, etc.). In another implementation, WIP may determine a default maximum clearance period in compliance with regulatory requirements (e.g., 24 hours after soft posting, etc.).

In one implementation, the WIP may provide the consumer with a universal payment platform, wherein a user may associated one or more payment accounts with a universal payment platform and pay with the universal payment platform. Within embodiments, the consumer may create an electronic wallet service account and enroll with the electronic wallet (e.g., Visa V-Wallet, etc.) via WIP. In alternative embodiments, a consumer may associate a consumer bank account with an existing electronic wallet. For example, a consumer may provide payment information, such as bank account number, bank routing number, user profile information, to an electronic wallet management consumer onboarding user interface, to associate an account with the electronic wallet. In another implementation, a consumer may enroll with the electronic wallet during online checkout. For example, a merchant site may provide an electronic wallet button at the checkout page (e.g., a Visa V-Wallet logo, etc.), and upon consumer selection of the electronic wallet button, the consumer may be prompted to enter bank account information (e.g., card number, etc.) to register a payment card (e.g., a credit card, a debit card, etc.) with the electronic wallet via a pop-up window.

In one implementation, upon receiving consumer enrollment bank account data, the WIP may generate an enrollment request to the electronic wallet platform (e.g., Visa V-Wallet payment network, etc.). In one implementation, an exemplary consumer enrollment data request in eXtensible Markup Language (XML). In further implementations, the consumer may be issued a WIP electronic wallet device upon enrollment, e.g., a mobile application, a magnetic card, etc.

In one implementation, a user may configure transaction restriction parameters via a consumer enrollment user interface. For example, in one implementation, an electronic wallet user may receive an invitation from WIP to sign up with WIP service, and following a link provided in the invitation (e.g., an email, etc.), the user may provide registration information in a registration form.

In one implementation, a user may configure payment methods and alerts with WIP. For example, the user may add a payment account to the wallet, and register for timely alerts with transactions associated with the payment account. In one implementation, the user may establish customized rules for triggers of a transaction alert. For example, an alert message may be triggered when a susceptible transaction occurs as the transaction amount exceeds a maximum one time transaction amount (e.g., $500.00, etc.). For another example, an alert may be triggered when a transaction occurs within a susceptible time range (e.g., all transactions occurring between 2 am-6 am, etc.). For another example, an alert may be triggered when the frequency of transactions exceeds a maximum number of transactions per day (e.g., 20 per day, etc.). For further examples, an alert may be triggered when the transacting merchant is one of a consumer specified susceptible merchants (e.g., Internet spam sites, etc.). For another example, an alert may be triggered when the type of the transaction is a blocked transaction type (e.g., a user may forbid wallet transactions at a gas station for gas fill, etc.).

In one implementation, the user may subscribe to WIP alerts by selecting alert channels. For example, the user may providing his mobile number, email address, mailing address and/or the like to WIP, and subscribe to alerts via email, text messages, consumer service calls, mail, and/or the like. In one implementation, the user may configure rules and subscription channels for different payment account associated with the electronic wallet.

In one implementation, upon receiving user configured parameters via a user interface, WIP (e.g., a Visa Wallet network) may provide a (Secure) Hypertext Transfer Protocol ("HTTP(S)") PUT message including the user leash parameters in the form of data formatted according to the eXtensible Markup Language ("XML"). Below is an example HTTP(S) PUT message including an XML-formatted user leash parameters for storage in a database:

```
PUT /leash.php HTTP/1.1
Host: www.leash.com
Content-Type: Application/XML
Content-Length: 718
<?XML version = "1.0" encoding = "UTF-8"?>
<UserLeashRule>
    <UserID> JDoe <\UserID>
    <WalletID> JD0001 </WalletID>
    <Rule1>
        <RuleID> 00001 </RuleID>
        <CardNo> 0000 0000 0000 </CardNo>
        <MaxAmount> 500.00 </MaxAmount>
        <MaxPerDay> 20 </MaxPerDay>
        <Subscription> Mobile 000-000-0000 </Subscription>
        <Channel> SMS </Channel>
        ...
    </Rule1>
    <Rule2>
        <RuleID> 00002 </RuleID>
        <CardNo> 0000 0000 0002 </CardNo>
        <MaxAmount> 100.00 </MaxAmount>
        <MaxPerDay> 10 </MaxPerDay>
        <BlackListMerchants>
            <Merchant1> abc.com </Merchant1>
            <Merchant2> xyz </Merchant2>
            ...
        </BlacklistMerchants>
        ...
        <Subscription> Email </Subscription>
        <Channel> jdoe@email.com </Channel>
        ...
    </Rule2>
    ..
<\UserLeashRule>
```

In one implementation, upon configuring the leash parameters, when a consumer shops with a merchant (e.g., a shopping site, etc.), the payment processor network may forward the purchasing request to Visa network, which may apply the consumer's WIP enrollment with the electronic wallet (e.g., Visa wallet network, etc.). For example, in one implementation, the WIP may retrieve the user leash parameters, and inspect the transaction amount, transaction type, transaction frequency, and/or the like of the received transaction request based on the leash parameters.

In one implementation, if the proposed transaction triggers an alert, WIP may generate an alert message, e.g., by providing a (Secure) Hypertext Transfer Protocol ("HTTP(S)") PUT message including the alert content in the form of data formatted according to the XML. Below is an example HTTP(S) PUT message including an XML-formatted alert:

```
PUT /alert.php HTTP/1.1
Host: www.leash.com
Content-Type: Application/XML
Content-Length: 718
<?XML version = "1.0" encoding = "UTF-8"?>
<Alert>
```

-continued

```
<UserID> JDoe <\UserID>
<WalletID> JD0001 </WalletID>
<Time> 23:23:34 00-00-1900 <Time>
<TransactionID> 000000 <TransactionID>
<Trigger>
MaxAmount>
</Trigger>
<AlertTemplateID> Tem00001 </AlertTemplateID>
<Subscription> Email </Subscription>
<Channel> jdoe@email.com </Channel>
<Content>
    <Title> "Transaction Alert: $1000.00 from Amazon.com
    </Title>
    <Greeting> "Dear Joe" </Greeting>
    <Body> "We recently note that ..." </Body>
    ...
</Content>
...
<\Alert>
```

In one implementation, the WIP may also generate a message and send it to the issuing bank, e.g., the user's bank that issues the payment account, etc., to alert the issuing bank not to credit funds to the merchant unless a clearance message is received subsequently.

With reference to FIG. 21B, in some implementations, the virtual wallet application may provide an interface via which user may efficiently set purchase controls for transactions. For example, the user may enter a purchase controls settings screen ("JDOE1") 2111, 2121, wherein the user may add restriction parameters to the purchase control setting. For example, the user interface on the left of FIG. 21B shows a purchase control that only allows in-person (see 2112) transactions below $50 (see 2113) to be made from US or Taiwan (see 2114), when made for clothes or shoes (see 2115), and not more than once a month (see 2116), and given that the user's overall spend for the time frame (1 mo) is less than $1500 (see 2117). Such parametric restrictions may be imposed using the user interface elements 2118, 2125 (e.g., to select a parameter) and 2119 (e.g., to enter a value corresponding to the parameter). In some situations, the virtual wallet may provide a graphical user interface component (e.g., 2122) to facilitate user input entry. For example, the virtual wallet may display a map of the world when the user wishes to place a geographic restriction on a purchase control, and the user may touch the map at the appropriate sport (e.g., 2123, 2124) to set the locations from which transaction may be allowed (or alternatively, blocked). In some implementations the virtual wallet may also allow the user to manually enter the value (see 2126), instead of utilizing the visual touch-based GUI component provided by the virtual wallet application.

With reference to FIG. 21C, in some implementations, the virtual wallet application may allow a user to manage privacy settings 2131 associated with the users' use of the wallet. For example, the user may be able to specify the information (e.g., 2132-2137) about the user that may be shared during the course of a purchase transaction. For example, in the illustration, the user has allowed the virtual wallet application to share the user's name, and social circle. The user has not yet set a preference for sharing the user's address; thus it may take a default value of medium (e.g., if the risk in the transaction is assessed by the WIP as being above medium, then the WIP may cloak the user's address during the transaction) depending on the type of transaction, in some implementations. The user has explicitly opted against sharing the user's account numbers (e.g., the user wishes for the payment network to cloak the user's account number during the transaction), and the user's live GPS location (see 2138). Boxes 2133-2139 are also shown.

Figure 22A:
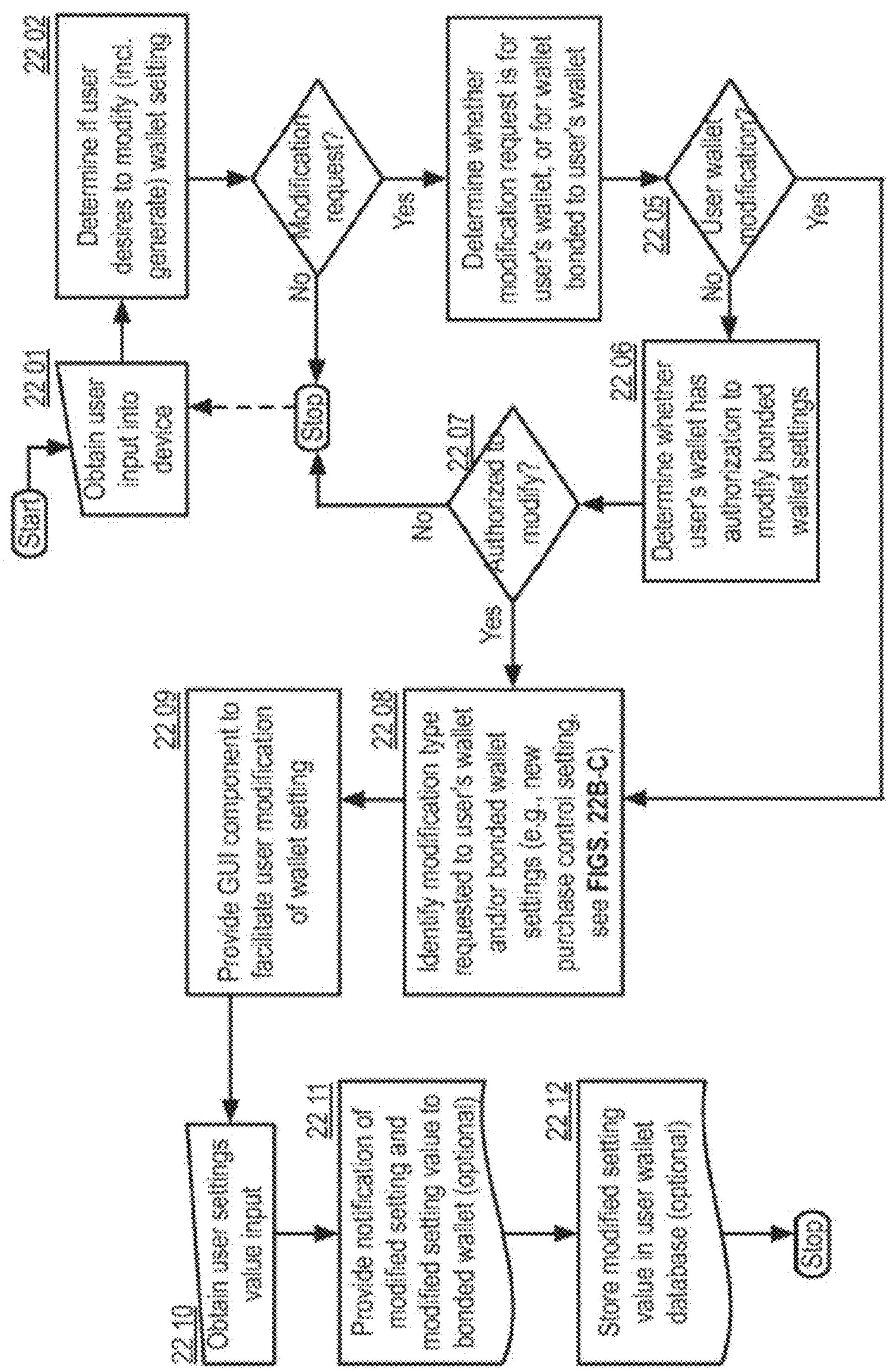
FIGS. 22A-C show logic flow diagrams illustrating example aspects of configuring virtual wallet application settings and implementing purchase controls settings in some embodiments of the WIP.

FIG. 22A shows a logic flow diagram illustrating example aspects of configuring virtual wallet application settings in some embodiments of the WIP, e.g., a Virtual Wallet Settings Configuration ("VWSC") component 2200. In some implementations, a user may desire to modify a setting within the user's virtual wallet application and/or within a virtual wallet application that has a relationship to the user's wallet (e.g., bonded wallet is a child wallet of the user's wallet). The user may provide input to a user device, 2201, indicating the desire to modify a wallet setting. Upon determining that the user desires to modify a wallet setting (see 2202-2203), the device may determine whether the user request is for modification of the user's wallet, or for modification of a wallet bonded to the user's wallet. In some implementations, the wallet application may require the user to enter a password or answer a challenge question successfully before allowing the user to modify a user setting 2204. Further, in some implementations, the device may, if the user desires to modify the wallet settings of a bonded wallet (see 2205), the device may determine whether the user is authorized to do so, 2206. For example, the device may determine the type of relationship between the user's wallet and the bonded wallet; whether the bonded wallet (or its user) is required to provide permission before the wallet settings can be modified; and/or the like. In implementations requiring authorization from the bonded wallet user, the device may provide a request to a device of the bonded wallet user (e.g., via a server system storing network addresses for the devices of each user utilizing a virtual wallet). Upon determining that the user's wallet has authorization to modify the settings of the bonded wallet (see 2207), the device may identify a type of modification that the user desires to perform, 2208. In some implementations, whether the user is authorized to modify a wallet setting may depend on the wallet setting the user desires to modify, in which case the identification of the type of modification may be performed before determining whether the user is authorized to modify the wallet setting. Based on the type of modification requested by the user, the device may provide a graphical user interface (GUI) component (see, e.g., geographical map for marking countries from which transactions may be initiated for a particular purchase control setting, FIG. 16B [center]) to facilitate user entry of the modification to a wallet setting, 2209. The device may obtain the user setting value input via the GUI component, 2210. Where the modification involves a bonded wallet, the device may optionally provide a notification of modification of a setting involving the bonded wallet, 2211. The device may optionally store the modification of the wallet setting in a database, e.g., in a local database or a cloud storage database, 2212.

Figure 22B:
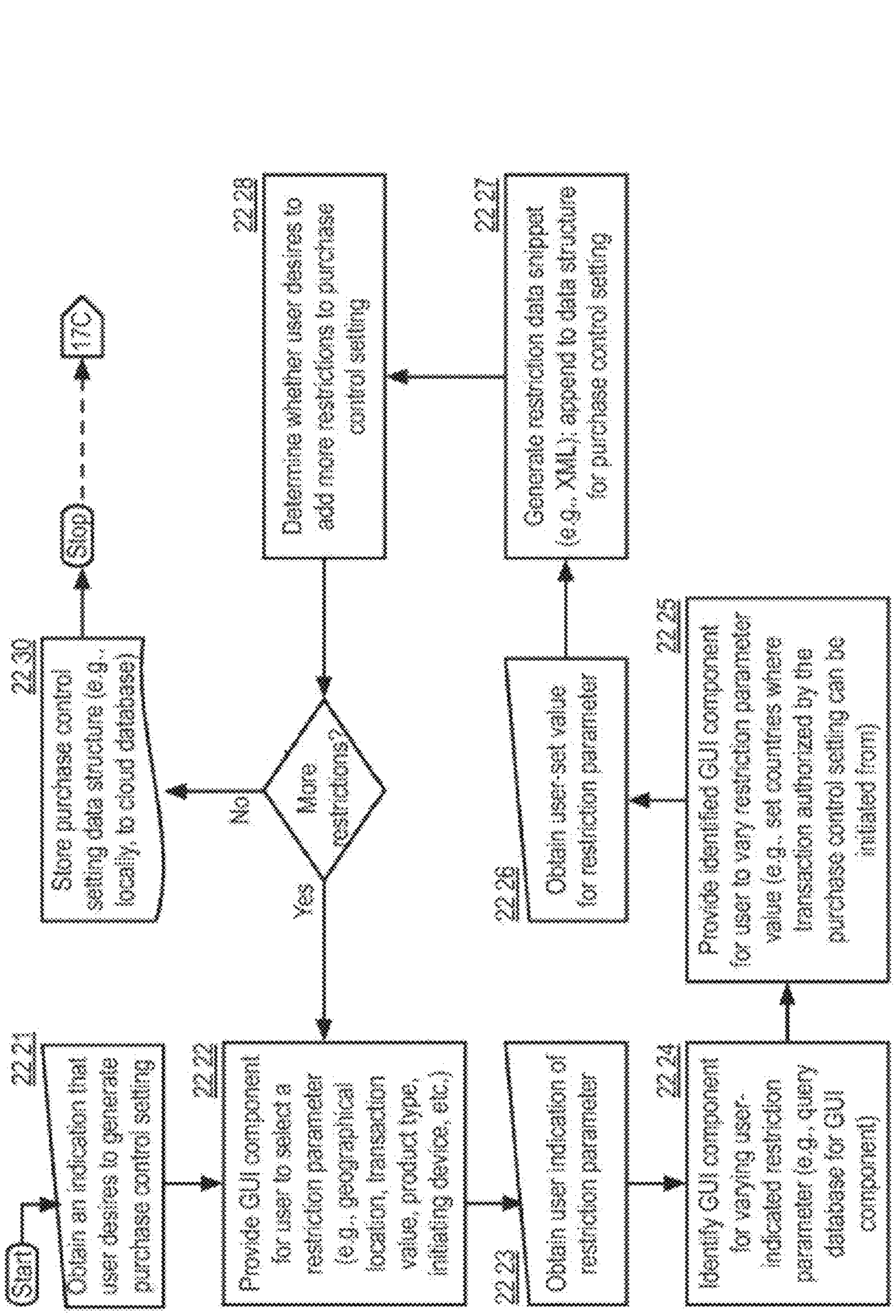
Figure 22C:
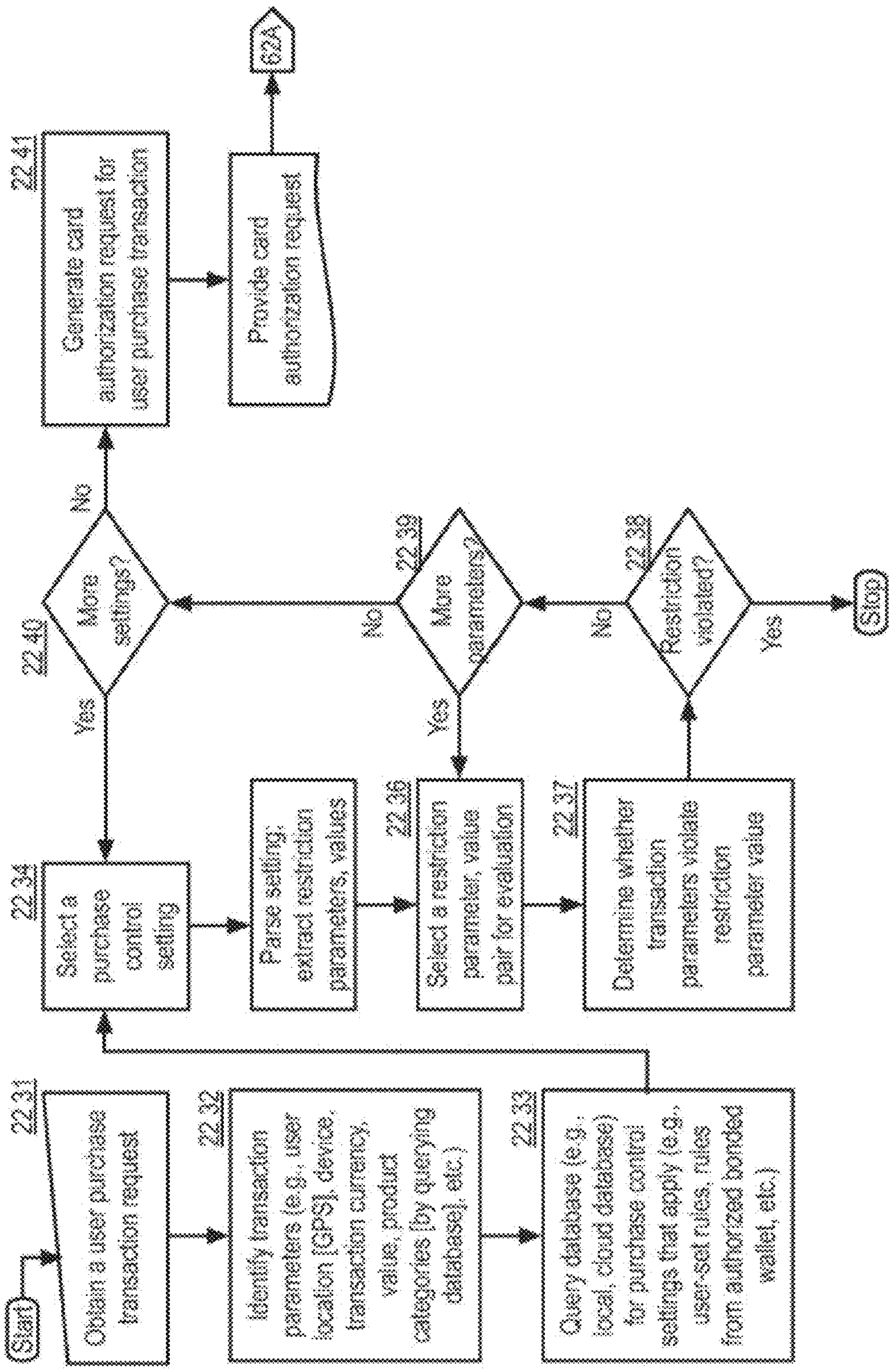

FIGS. 22B-C show logic flow diagrams illustrating example aspects of implementing purchase controls settings in some embodiments of the WIP, e.g., a Purchase Controls Settings ("PCS") component 2220. With reference to FIG. 22B, in some implementations, a user may desire to generate a purchase control setting to monitor and/or restrict transactions of a specific character from being processed by the WIP. The user may provide such an indication into a user device executing a virtual wallet application for the user, 2221. In response, the device may provide a GUI component for the user to select a parameter according to which to restrict transactions initiated from the virtual wallet of the user, 2222 (see, e.g., scroll wheels of FIG. 16B). The user may utilize the GUI component to select a restriction parameter, 2223. Based on the restriction parameter selected (e.g., geographical location, transaction value, transaction card, product category, time, date, currency, account balance(s), etc.), the device may identify, e.g., by querying a database, a GUI component to provide the user for facilitate the user providing a value associated with the restriction parameter (see, e.g., world map of FIG. 16B [center]), 2224. The device may provide the identified GUI component to the user, 2225. Using the GUI component, the user may provide a value for the restriction parameter, 2226. In response, the device may generate a data snippet including an identification of a restriction parameter, and an associated value for the restriction parameter, 2227. For example, the data snippet may be formatted as an XML data structure. In some implementations, the data structure may also include an indication of whether the restriction parameter value represents an upper bound or lower bound of the range of allowed values for that parameter. The device may append the data structure for the restriction parameter to a data structure for the overall purchase control setting, 2227. In some implementations, the device may determine whether the user desires to enter more such restriction parameters, and may facilitate the user entering such restriction parameters on top of any previously provided restriction parameters (see 2228-2229). Upon obtaining all restriction parameters for a given purchase control setting, the device may store the finalized purchase control setting to a database (e.g., a local database, a cloud storage database, etc.), 2230.

With reference to FIG. 22C, in some implementations, a user may desire to enter into a purchase transaction. The user may provide an input into user device executing a virtual wallet application indicative of the user's desire to enter into the purchase transaction, 2231. In response, the device may identify the parameters of the transaction (e.g., geographical location, transaction value, transaction card, product category, time, date, cart, wallet type [bonded, unbonded], currency, account balance(s) around the time of initiation of the transaction, etc.), 2232. The device may query a database for purchase control settings that may apply to the purchase transaction request, 2233. For example, these could include rules set by a bonded wallet user who has authorization to set purchase controls on the user's wallet. The device may process each purchase control setting to ensure that no setting is violated. In alternative schemes, the device may process purchase control settings until at least one purchase control setting permits the purchase transaction to be performed (or the purchase transaction may be denied if no setting permits it), see 2234. The device may select a purchase control setting, and extract the restriction parameters and their associated value from the purchase control setting data structure. For example, in 2235, the device may use a parser similar to the example parsers described below in the discussion with reference to FIG. 66. The device may select a restriction parameter-value pair, 2236, and determine whether the transaction parameters violate the restriction parameter value, 2237. If the restriction is violated (1738, option "Yes"), the device may deny the purchase transaction request. Otherwise, the device may check each restriction parameter in the purchase control setting (see 2239) in a similar procedure to that described above. If the purchase control setting does not restrict the transaction, the device may execute similar procedure for all the other purchase control settings, unless one of the settings is violated (or, in the alternative scheme, if at least one purchase control setting permits the purchase transaction) (see 2240). If the device determines that the purchase transaction is permitted by the purchase control settings of the user and/or bonded wallet users (1740, option "No"), the device may generate a card authorization request, 2241, and provide the card authorization request for purchase transaction authorization (see FIG. 62A) 2242.

Figure 23:
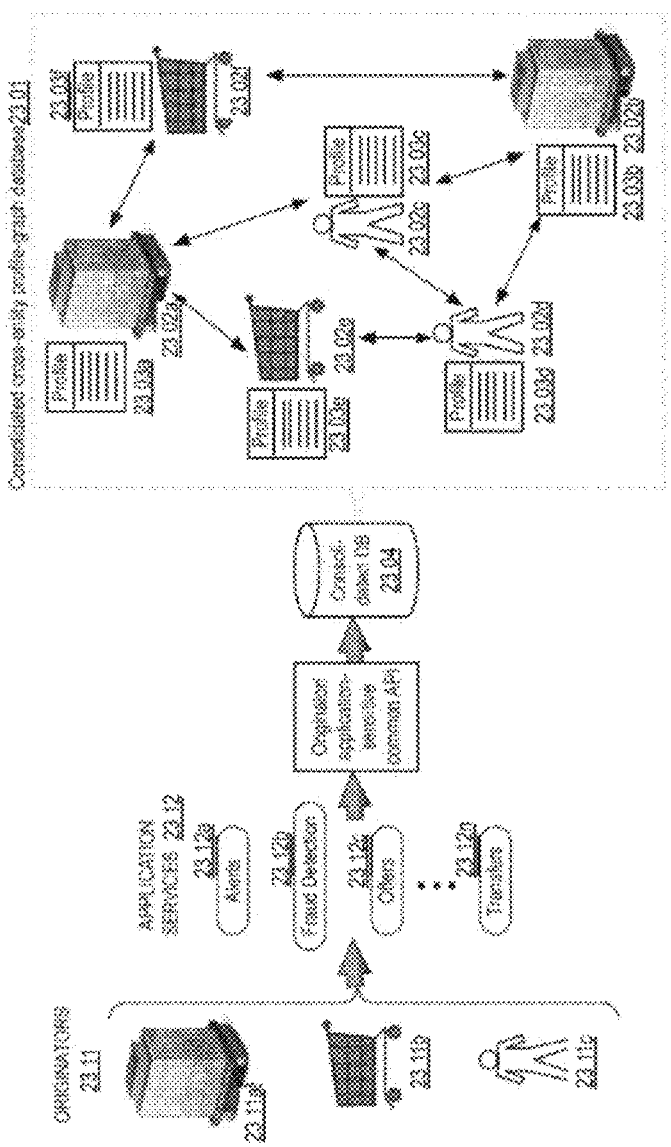
FIG. 23 shows a block diagram illustrating example aspects of a centralized personal information platform in some embodiments of the WIP.
Figure 24A:
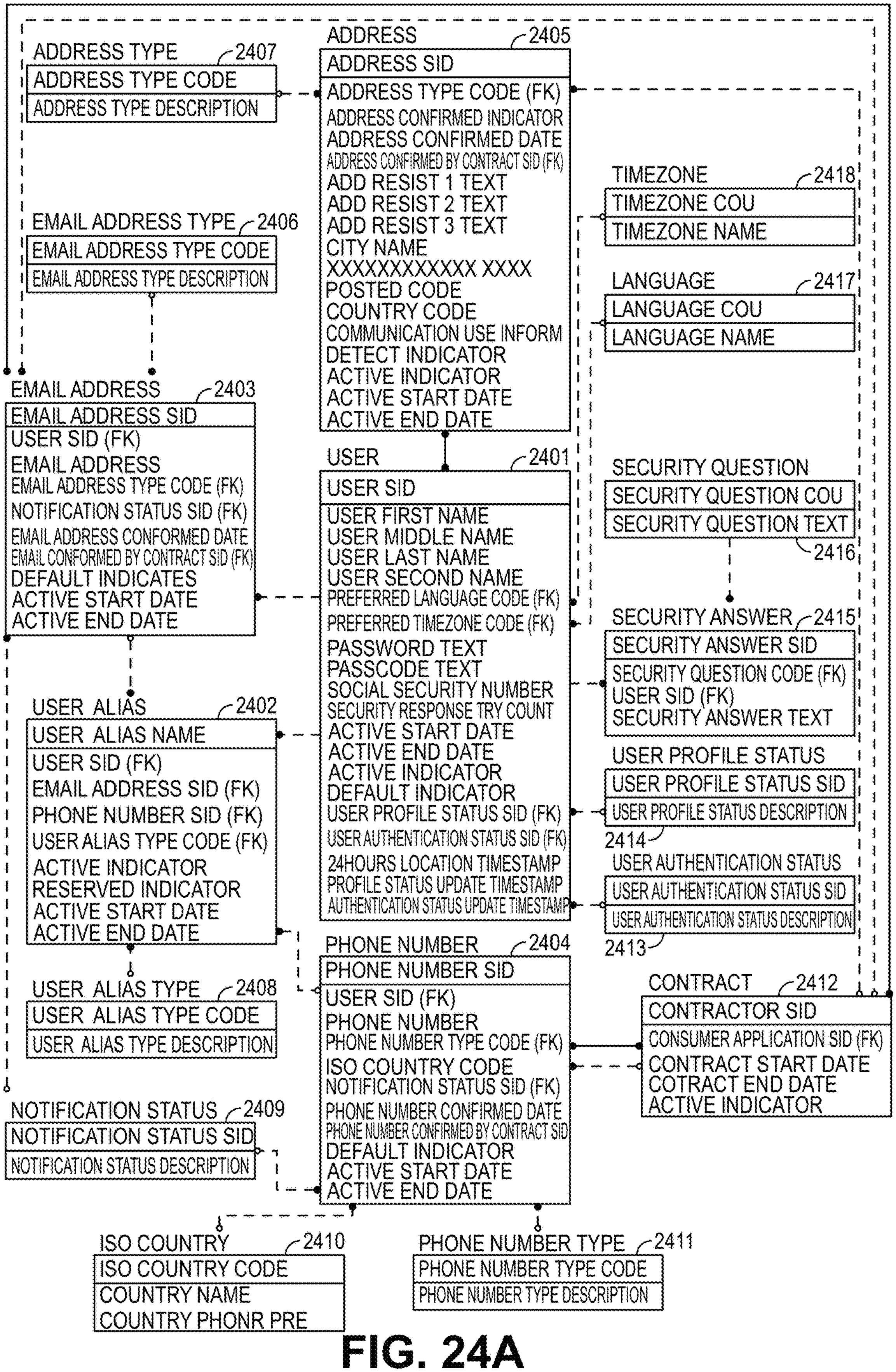
FIGS. 24A-F show block diagrams illustrating example aspects of data models within a centralized personal information platform in some embodiments of the WIP.
Figure 24B:
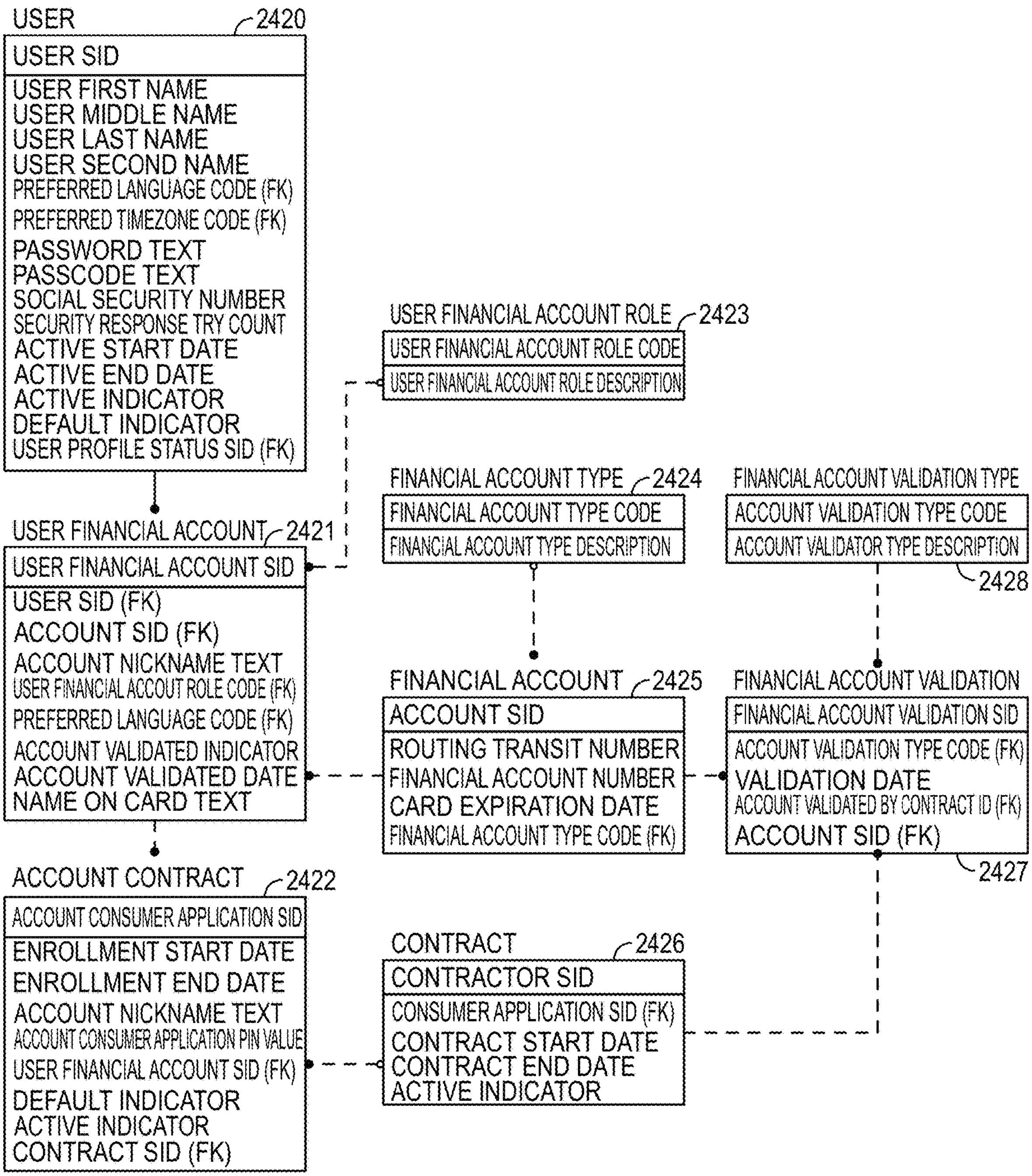
Figure 24C:
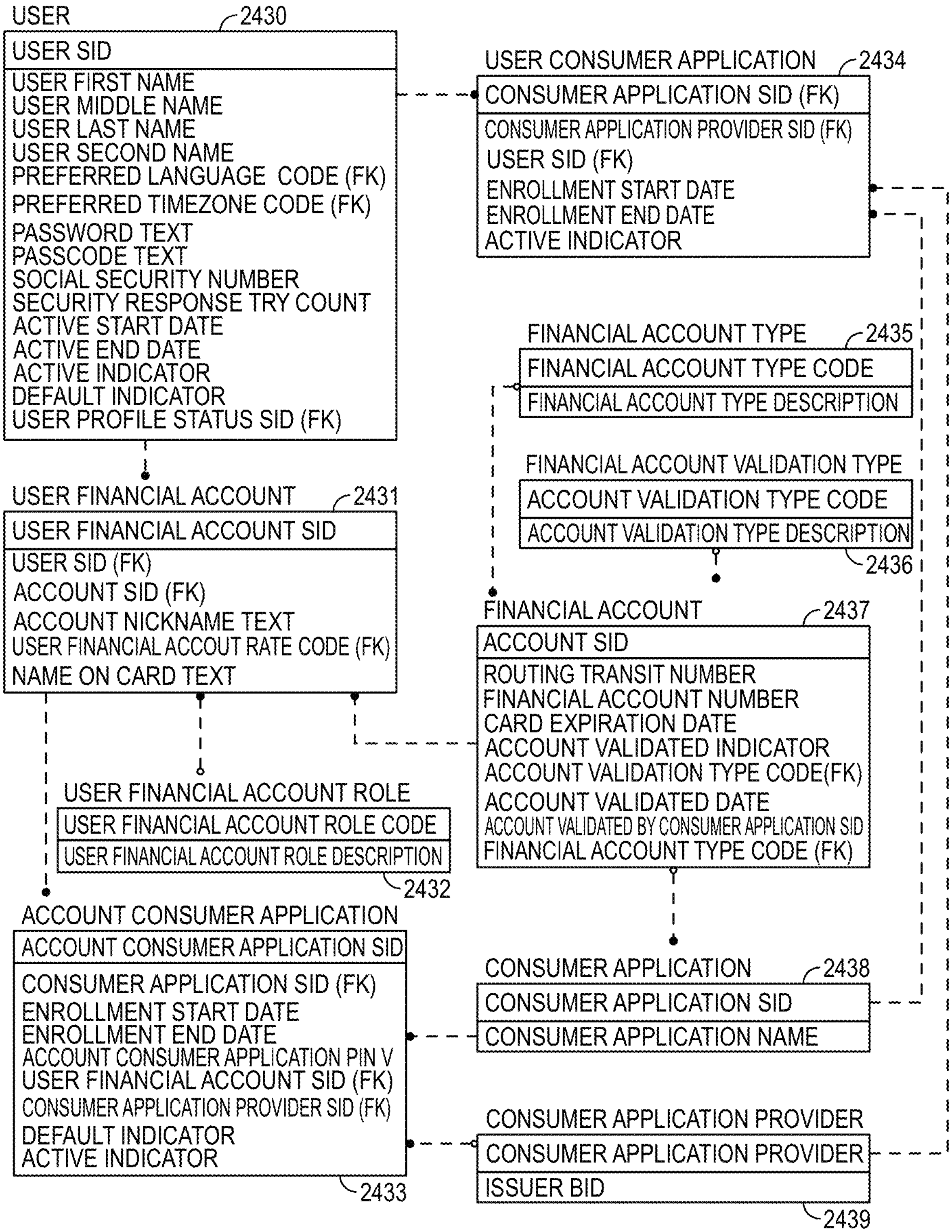
Figure 24D:
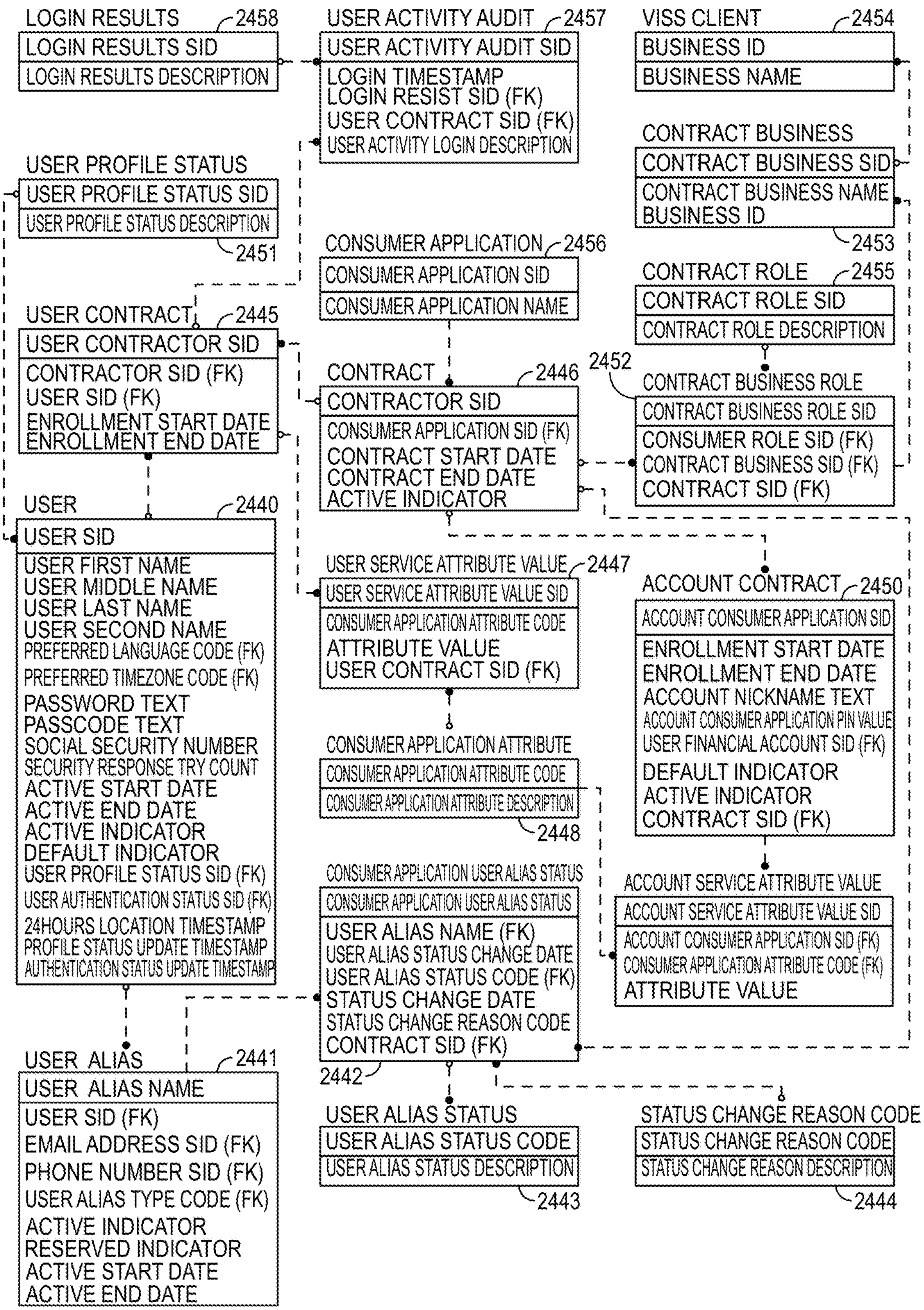
Figure 24E:
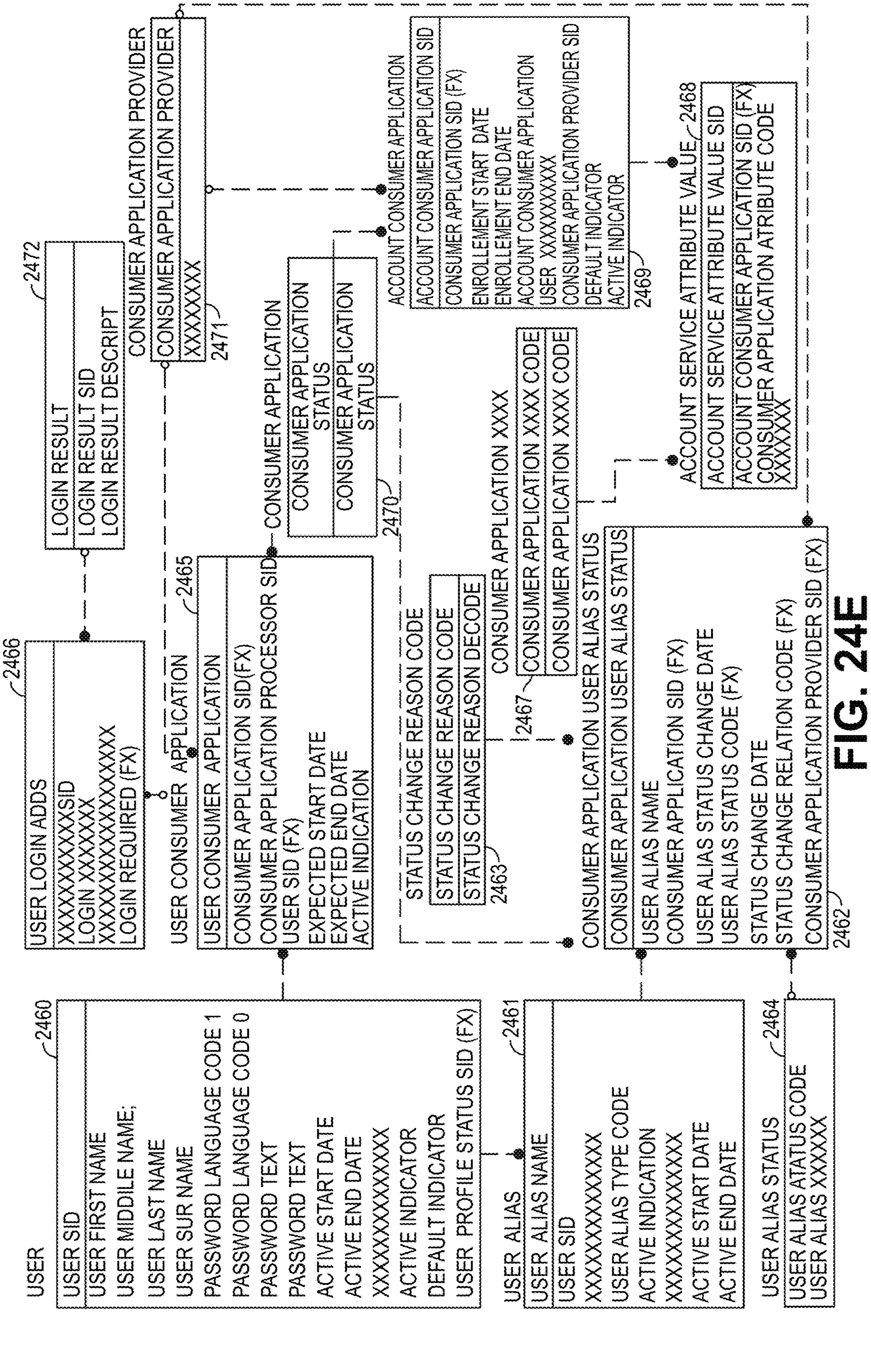
Figure 24F:
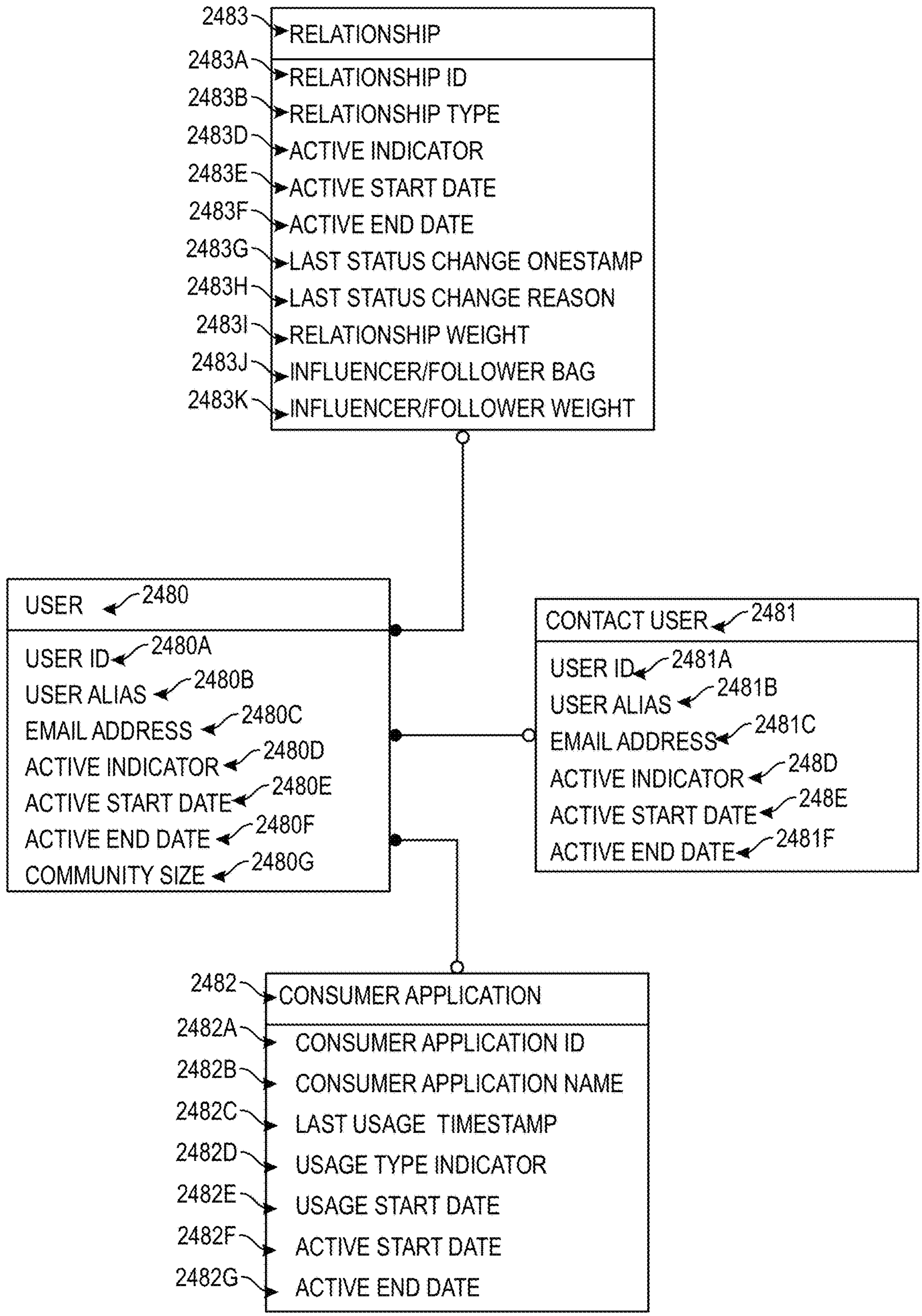

FIG. 23 shows a block diagram illustrating example aspects of a centralized personal information platform in some embodiments of the WIP. In various scenarios, originators 2311 such as merchants 2311*b*, consumers 2311*c*, account issuers, acquirers 2311*a*, and/or the like, desire to utilize information from payment network systems for enabling various features for consumers. Such features may include application services 2312 such as alerts 2312*a*, offers 2312*c*, money transfers 2312*n*, fraud detection 2312*b*, and/or the like. In some embodiments of the WIP, i, such originators may request data to enable application services from a common, secure, centralized information platform including a consolidated, cross-entity profile-graph database 2304. For example, the originators may submit complex queries to the WIP in a structure format, such as the example below. In this example, the query includes a query to determine a location (e.g., of a user), determine the weather associated with the location, perform analyses on the weather data, and provide an exploded graphical view of the results of the analysis:

```
<int
    Model_id ="1"
    environment_type="RT"
    meta_data="./fModels/robotExample.meta"
    tumblar_location="./fModels/robotExample.tumblar.location"
    input_format="JSON"
    pmmls="AUTONOMOUS_AGENTS.PMML"
    Model_type ="AUTONOMOUS_AGENTS"
>
<vault >
<door:LOCATION>
        <lock name="DETERMINE LOCATION"
            inkey="INPUT" inkeyname="lat"
            inkey2="INPUT" inkeyname2="long"
            function="ROUND"
            fnct1-prec="-2"
            function-1="JOIN"
            fnct2-delim=":"
            tumblar='LAT_LONG.Key'
            outkey="TEMP" out keyname="location"
            type="STRING"
        />
        <lock name="DETERMINE WEATHER"
            inkey="TEMP" inkeyname="location"
            mesh='MESHRT.RECENTWEATHER'
            mesh-query='HASH'
            outkey="TEMP" outkeyname="WEATHERDATA"
            type="ARRAY"
        />
        <lock name="EXPLODE DATA"
            inkey="TEMP" inkeyname="WEATHERDATA"
            function="EXPLODE"
            fnct-delim=":"
            outkey="MODELDATA" outkeystartindex=1
        />
        <lock name="USER SETTINGS"
            inkey="INPUT" inkeyname="USERID"
            mesh='MESHRT.AUTONOMOUSAGENT.SETTINGS'
            mesh-query='HASH'
            outkey="TEMP" outkeyname="USERSETTINGS"
            type="ARRAY"
        />
        <lock name="EXPLODE USER"
            inkey="TEMP" inkeyname="USERSETTINGS"
            function="EXPLODE"
            fnct-delim=":"
            outkey="USERDATA" outkeystartindex=1
        />
        <lock name="RUN MODELE"
            inkey="MODELDATA"
            inkey1="USERDATA"
```

-continued

```
            function="TREE"
            fnc-pmml="AUTONOMOUS__AGENTS.PMML"
            outkey="OUTPUT" outkeyname="WEATHER"
            type="NUMERIC"
        />
</door>
</vault>
```

A non-limiting, example listing of data that the WIP may return based on a query is provided below. In this example, a user may log into a website via a computing device. The computing device may provide a IP address, and a timestamp to the WIP. In response, the WIP may identify a profile of the user from its database, and based on the profile, return potential merchants for offers or coupons:

```
--------------------------------------------------
----------------- Use Case 3 -------------------
-- User log into a website
-- Only IP address, GMT and day of week is passed to Mesh
-- Mesh matches profile based on Affinity Group
-- Mesh returns potential Merchants for offers or coupons based on tempory
    model using suppression rules
--------------------------------------------------
-- Test case 1 IP:24:227:206 Hour:9 Day:3
-- Test case 2 IP:148:181:75 Hour:4 Day:5
--------------------------------------------------
------- AffinityGroup Lookup -------------------
--------------------------------------------------
Look up test case 1
[OrderedDict([('ISACTIVE', 'True'), ('ENTITYKEY', '24:227:206:3:1'), ('XML',
    None), ('AFFINITYGROUPNAME', '24:227:206:3:1'), ('DESCRIPTION', None),
    ('TYPEOF', None), ('UUID', '5f8df970b9ff11e09ab9270cf67eca90')]),
    OrderedDict([('ISACTIVE', 'True'), ('BASEUUID',
    '4fbea327b9ff11e094f433b5d7c45677'), ('TOKENENTITYKEY',
    '4fbea327b9ff11e094f433b5d7c45677:TOKEN:349:F'), ('BASETYPE',
    'MODEL__002__001__00'), ('STATUS', 'ACTIVE'), ('ISSUEDDATE', None), ('WEIGHT',
    '349'), ('CATEGORY', 'F'), ('DOUBLELINKED', None), ('UUID',
    '6b6aab39b9ff11e08d850dc270e3ea06')]), OrderedDict([('ISACTIVE', 'True'),
    ('BASEUUID', '4fbea328b9ff11e0a5f833b5d7c45677'), ('TOKENENTITYKEY',
    '4fbea328b9ff11e0a5f833b5d7c45677:TOKEN:761:1'), ('BASETYPE',
    'MODEL__003__001__00'), ('STATUS', 'ACTIVE'), ('ISSUEDDATE', None), ('WEIGHT',
    '761'), ('CATEGORY', '1'), ('DOUBLELINKED', None), ('UUID',
    '68aaca40b9ff11e0ac799fd4e415d9de')]), OrderedDict([('ISACTIVE', 'True'),
    ('BASEUUID', '4fbea328b9ff11e0a5f833b5d7c45677'), ('TOKENENTITYKEY',
    '4fbea328b9ff11e0a5f833b5d7c45677:TOKEN:637:2'), ('BASETYPE',
    'MODEL__003__001__00'), ('STATUS', 'ACTIVE'), ('ISSUEDDATE', None), ('WEIGHT',
    '637'), ('CATEGORY', '2'), ('DOUBLELINKED', None), ('UUID',
    '6b6d1c38b9ff11e08ce10dc270e3ea06')]), OrderedDict([('ISACTIVE', 'True'),
    ('BASEUUID', '4fbea328b9ff11e0a5f833b5d7c45677'), ('TOKENENTITYKEY',
    '4fbea328b9ff11e0a5f833b5d7c45677:TOKEN:444:3'), ('BASETYPE',
    'MODEL__003__001__00'), ('STATUS', 'ACTIVE'), ('ISSUEDDATE', None), ('WEIGHT',
    '444'), ('CATEGORY', '3'), ('DOUBLELINKED', None), ('UUID',
    '6342aa53b9ff11e0bcdb9fd4e415d9de')]), OrderedDict([('ISACTIVE', 'True'),
    ('BASEUUID', '4fbea328b9ff11e0a5f833b5d7c45677'), ('TOKENENTITYKEY',
    '4fbea328b9ff11e0a5f833b5d7c45677:TOKEN:333:4'), ('BASETYPE',
    'MODEL__003__001__00'), ('STATUS', 'ACTIVE'), ('ISSUEDDATE', None), ('WEIGHT',
    '333'), ('CATEGORY', '4'), ('DOUBLELINKED', None), ('UUID',
    '62bd26a2b9ff11e0bc239fd4e415d9de')]), OrderedDict([('ISACTIVE', 'True'),
    ('BASEUUID', '4fbea328b9ff11e0a5f833b5d7c45677'), ('TOKENENTITYKEY',
    '4fbea328b9ff11e0a5f833b5d7c45677:TOKEN:307:5'), ('BASETYPE',
    'MODEL__003__001__00'), ('STATUS', 'ACTIVE'), ('ISSUEDDATE', None), ('WEIGHT',
    '307'), ('CATEGORY', '5'), ('DOUBLELINKED', None), ('UUID',
    '6b6d1c39b9ff11e0986c0dc270e3ea06')]), OrderedDict([('ISACTIVE', 'True'),
    ('BASEUUID', '4fbea32db9ff11e09f3e33b5d7c45677'), ('TOKENENTITYKEY',
    '4fbea32db9ff11e09f3e33b5d7c45677:TOKEN:801:Spend'), ('BASETYPE',
    'MODEL__008__001__00'), ('STATUS', 'ACTIVE'), ('ISSUEDDATE', None), ('WEIGHT',
    '801'), ('CATEGORY', 'Spend), ('DOUBLELINKED', None), ('UUID',
    '6b6d1c3ab9ff11e0a4ec0dc270e3ea06')]), OrderedDict([('ISACTIVE', 'True'),
    ('BASEUUID', '4fbea32eb9ff11e0b55133b5d7c45677'), ('TOKENENTITYKEY',
    '4fbea32eb9ff11e0b55133b5d7c45677:TOKEN:1:Volume'), ('BASETYPE',
    'MODEL__009__001__00'), ('STATUS', 'ACTIVE'), ('ISSUEDDATE', None), ('WEIGHT',
    '1'), ('CATEGORY', 'Volume'), ('DOUBLELINKED', None), ('UUID',
    '62a09df3b9ff11e090d79fd4e415d9de')])]
Found a direct match
148:181:75:1:2
-- Failed to find a direct match
-- Try again with only IP address and hour
[OrderedDict([('ISACTIVE', 'True'), ('ENTITYKEY', '148:181:75:1:1'), ('XML',
    None), ('AFFINITYGROUPNAME', '148:181:75:1:1'), ('DESCRIPTION', None),
    ('TYPEOF', None)])]
-- Found match for case 2
```

-continued

```
-----------------------------------------------------------
----------------- Temporary model rules -------------------
-----------------------------------------------------------
{1: {‘LOWER’: 10, ‘BASETYPE’: [‘MODEL__002__001__00 ’, ‘MODEL__003__001__00’],
    ‘attribute’: ‘WEIGHT’, ‘rule’: ‘NEAR’, ‘OP’: ‘PROX’, ‘type’: ‘TOKENENTITY’,
    ‘HIGHER’: 10}, 2: {‘type’: [‘MERCHANT’], ‘rule’: ‘FOLLOW’}, 3: {‘rule’:
    ‘RESTRICTSUBTYPE’, ‘BASETYPE’: [‘MODEL__002__001__00’, ‘MODEL__003__001__00’]}}
-----------------------------------------------------------
----------------- Temporary Model Output -----------------
------------------- For Use Case 1 --------------------
-----------------------------------------------------------
-- Number of Nodes:102
_____LIVRARIASICILIAN
_________GDPCOLTD
___GOODWILLINDUSTRIES
________DISCOUNTDE
_______BARELANCHOE
______BLOOMINGDALES
_____PARCWORLDTENNIS
_____STRIDERITEOUTLET
________PARCCEANOR
_________PONTOFRIO
_______FNACPAULISTA
_________FINISHLINE
_____WALMARTCENTRAL
_____BESNIINTERLARGOS
____PARCLOJASCOLOMBO
______SHOPTIMEINTER
_____BEDBATHBEYOND
________MACYSWEST
___PARCRIACHUELOFILIAL
_____JCPENNEYCORPINC
____PARCLOJASRENNERFL
__PARCPAQUETAESPORTES
_________MARISALJ
___PARCLEADERMAGAZINE
________INTERFLORA
________DECATHLON
_____PERNAMBUCANASFL
________KARSTADTDE
_______PARCCEAMCO
__________CHAMPS
_______ACCESSORIZE
___BLOOMINGDALESDVRS
__PARCLIVRARIACULTURA
_______PARCCEALOJA
______ARQUIBANCADA
___________KITBAG
____FREDERICKSOFHLWD
_________WALMART
___PARCLOJASINSINUANTE
____WALMARTCONTAGEM
________FOOTLOCKER
_____PARCSANTALOLLA
______RICARDOELETRO
______PARCPONTOFRIO
_____DOTPAYPLPOLSKA
_________CAMICADO
_________KARSTADT
_______PARCRAMSONS
_______PARCGREGORY
________GREMIOFBPA
________WALMARTSJC
___PRODIRECTSOCCERLTD
________LAVIEENROSE
_______PARCMARISALJ
__________ORDERS
___PARCNSNNATALNORTE
_____LOJASINSINUANTE
______________B
________CITYCOUNTY
____WALMARTPACAEMBU
____________SOHO
_____WALMARTOSASCO
_____FOSSILSTORESIINC
_______MENARDSCLIO
_______PARCPEQUENTE
___________BEALLS
______THEHOMEDEPOT
```

-continued

```
____________________VIAMIA
_____PARCLOJASRIACHUELO
_________PARCLOJASMILANO
_______________NORDSTROM
_____WAILANACOFFEEHOUSE
___________LANCHOEBELLA
____________________PUKET
_______WALMARTSTORESINC
___PARCPERNAMBUCANASFL
___________SMARTSHOPPER
___PARCMAGAZINELUIZASP
__COLUMBIASPORTSWEARCO
_________BARELANCESTADA
_______________DONATEEBAY
_____PARCRICARDOELETRO
___________PARCDISANTINNI
_______________SCHUHCOUK
___________________CEANOR
___________PARCCAMICADO
_________PARCCENTAUROCE
_________PARCMARLUIJOIAS
_________________ALBADAH
_________________MARTINEZ
_______MONEYBOOKERSLTD
____________________MACYS
___________PARCRIOCENTER
_________PARCCASASBAHIA
_______PARCSUBMARINOLOJA
________________________INC
___________SUBMARINOLOJA
___________LOJASRENNERFL
_________RIACHUELOFILIAL
_________PARCSONHODOSPES
___________________PINKBIJU
_____________PARCCEAMRB
----------------------------------------------------------
----------------- Temporary model Output ----------------
------------------ For Use Case 2 -------------------
----------------------------------------------------------
-- Number of Nodes:3
____________________KITBAG
__COLUMBIASPORTSWEARCO
_______________GREMIOFBPA
-------------------------------------------------------------
--------          End of Example Use Case          ---
-------------------------------------------------------------
```

In some embodiments, the WIP may provide access to information on a need-to-know basis to ensure the security of data of entities on which the WIP stores information. Thus, in some embodiments, access to information from the centralized platform may be restricted based on the originator as well as application services for which the data is requested. In some embodiments, the WIP may thus allow a variety of flexible application services to be built on a common database infrastructure, while preserving the integrity, security, and accuracy of entity data. In some implementations, the WIP may generate, update, maintain, store and/or provide profile information on entities, as well as a social graph that maintains and updates interrelationships between each of the entities stored within the WIP. For example, the WIP may store profile information on an issuer bank 2302*a* (see profile 2303*a*), a acquirer bank 2302*b* (see profile 2303*b*), a consumer 2302*c* (see profile 2303*c*), a user 2302*d* (see profile 2303*d*), a merchant 2302*e* (see profile 2303*e*), a second merchant 2302*f* (see profile 2303*f*). The WIP may also store relationships between such entities. For example, the WIP may store information on a relationship of the issuer bank 2302*a* to the consumer 2302*c* shopping at merchant 2302*e*, who in turn may be related to user 2302*d*, who might bank at the back 2302*b* that serves as acquirer for merchant 2302*f*.

FIGS. 24A-F show block diagrams illustrating example aspects of data models within a centralized personal information platform in some embodiments of the WIP. In various embodiments, the WIP may store a variety of attributes of entities according to various data models. A few non-limiting example data models are provided below. In some embodiments, the WIP may store user profile attributes. For example, a user profile model may store user identifying information 2401, user aliases 2402, email addresses 2403, phone numbers 2404, addresses 2405, email address types 2406, address types 2407, user alias types 2408, notification statuses 2409, ISO country 2410, phone number types 2411, contract information with the WIP 2412, user authorization status 2413, user profile status 2414, security answer 2415, security questions 2416, language 2417, time zone 2418, and/or the like, each of the above field types including one or more fields and field values. As another example, a user financial attributes model may store user identifying information 2420, user financial account information 2421, account contract information 2422, user financial account role 2423, financial account type 2424, financial account identifying information 2425, contract information 2426, financial account validation 2427, financial account validation type 2428, and/or the like. As another example, a user payment card attributes data model may include field types such s, but not limited to: user identifying information 2430, user financial account information 2431, user financial account role 2432, account consumer applications 2433, user consumer application 2434, financial account type 2435, financial account validation type 2436, financial account information 2437, consumer application information 2438, consumer application provider information 2439, and/or the like. As another example, a user services attributes data model may include field types such as, but not limited to: user identifying information 2440, user alias 2441, consumer application user alias status 2442, user alias status 2443, status change reason code 2444, user contract 2445, contract information 2446, user service attribute value 2447, consumer application attributes 2448, account service attribute value, account contract 2449, user profile status 2451, contract business role 2452, contract business 2453, client information 2454, contract role 2455, consumer application 2456, user activity audit 2457, login results 2458, and/or the like. As another example, a user services usage attributes data model may include field types such as, but not limited to: user identifying information 2460, user alias 2461, consumer application user alias status 2462, status change reason code 2463, user alias status 2464, user consumer application 2465, user login audit 2466, login result 2467, account service attribute value 2468, account consumer application 2469, consumer application 2470, consumer application provider 2471, login result 2472, and/or the like. As another example, a user graph attributes data model may include field types such as, but not limited to: user identifying information 2480, 2480*a-g*, user contact 2481, 2481*a-f*, consumer application user alias status 2482, 2482*a-g*, relationship 2483, 2483*a-k*, and/or the like. In some embodiments, the WIP may store each object (e.g., user, merchant, issuer, acquirer, IP address, household, etc.) as a node in graph database, and store data with respect to each node in a format such as the example format provided below:

```
<Nodes Data>
ID,Nodes,Label
2fdc7e3fbd1c11e0be645528b00e8d0e,2fdc7e3fbd1c11e0be645528b00e8d0e,AFFINITYGROUPNAME:49:95:0:3:1
32b1d53ebd1c11e094172557fb829fdf,32b1d53ebd1c11e094172557fb829fdf,TOKENENTITYKEY:2b8494f0bd1c11e09c856d888c43f7c2:TOKEN:0:F
2e6381e4bd1c11e0b9ffc929a54bb0fd,2e6381e4bd1c11e0b9ffc929a54bb0fd,MERCHANTNAME:MERCHANT_ABC
2fdc7e3dbd1c11e0a22d5528b00e8d0e,2fdc7e3dbd1c11e0a22d5528b00e8d0e,AFFINITYGROUPNAME:49:95:0:1:1
2e6381e7bd1c11e091b7c929a54bb0fd,2e6381e7bd1c11e091b7c929a54bb0fd,MERCHANTNAME:MERCHANT_XYZ
2cf8cbabbd1c11e0894a5de4f9281135,2cf8cbabbd1c11e0894a5de4f9281135,USERNAME:000060FF6557F103
2e6381debd1c11e0b336c929a54bb0fd,2e6381debd1c11e0b336c929a54bb0fd,MERCHANTNAME:MERCHANT_123
2e6381e0bd1c11e0b4e8c929a54bb0fd,2e6381e0bd1c11e0b4e8c929a54bb0fd,MERCHANTNAME:MERCHANT_FGH
2cf681c1bd1c11e0b8815de4f9281135,2cf681c1bd1c11e0b8815de4f9281135,USERNAME:000030C57080FFE8
2b8494f1bd1c11e0acbd6d888c43f7c2,2b8494f1bd1c11e0acbd6d888c43f7c2,MODELNAME:MODEL_003_001_00
32b44638bd1c11e0b01c2557fb829fdf,32b44638bd1c11e0b01c2557fb829fdf,TOKENENTITYKEY:2b8494f1bd1c11e0acbd6d888c43f7c2:TOKEN:1000:1
2fdc7e40bd1c11e094675528b00e8d0e,2fdc7e40bd1c11e094675528b00e8d0e,AFFINITYGROUPNAME:49:95:0:4:1
2b8494f0bd1c11e09c856d888c43f7c2,2b8494f0bd1c11e09c856d888c43f7c2,MODELNAME:MODEL_002_001_00
32b44639bd1c11e0b15b2557fb829fdf,32b44639bd1c11e0b15b2557fb829fdf,TOKENENTITYKEY:2b8494f1bd1c11e0acbd6d888c43f7c2:TOKEN:0:2
32ce84febd1c11e0b0112557fb829fdf,32ce84febd1c11e0b0112557fb829fdf,TOKENENTITYKEY:2b8494f1bd1c11e0acbd6d888c43f7c2:TOKEN:1000:4
2e6381e3bd1c11e095b1c929a54bb0fd,2e6381e3bd1c11e095b1c929a54bb0fd,MERCHANTNAME:MERCHANT_789
34582a87bd1c11e080820167449bc60f,34582a87bd1c11e080820167449bc60f,TOKENENTITYKEY:2b8494f1bd1c11e0acbd6d888c43f7c2:TOKEN:778:5
2e6381e5bd1c11e0b62cc929a54bb0fd,2e6381e5bd1c11e0b62cc929a54bb0fd,MERCHANTNAME:MERCHANT_456
2fdc7e3ebd1c11e088b55528b00e8d0e,2fdc7e3ebd1c11e088b55528b00e8d0e,AFFINITYGROUPNAME:49:95:0:2:1
32c4e80dbd1c11e09e442557fb829fdf,32c4e80dbd1c11e09e442557fb829fdf,TOKENENTITYKEY:2b8494f1bd1c11e0acbd6d888c43f7c2:TOKEN:774:5
2e6381e1bd1c11e0bf28c929a54bb0fd,2e6381e1bd1c11e0bf28c929a54bb0fd,MERCHANTNAME:MERCHANT_WER
2cf681b8bd1c11e08be85de4f9281135,2cf681b8bd1c11e08be85de4f9281135,USERNAME:00002552FC930FF8
2cf8cba8bd1c11e09fbc5de4f9281135,2cf8cba8bd1c11e09fbc5de4f9281135,USERNAME:0000570FF1B46A24
32b4463abd1c11e0bdaa2557fb829fdf,32b4463abd1c11e0bdaa2557fb829fdf,TOKENENTITYKEY:2b8494f1bd1c11e0acbd6d888c43f7c2:TOKEN:0:3
2cf8cbaebd1c11e0b6515de4f9281135,2cf8cbaebd1c11e0b6515de4f9281135,USERNAME:000064A20FF962D4
2e6381e6bd1c11e08087c929a54bb0fd,2e6381e6bd1c11e08087c929a54bb0fd,MERCHANTNAME:MERCHANT_496
2e6381e2bd1c11e0941dc929a54bb0fd,2e6381e2bd1c11e0941dc929a54bb0fd,MERCHANTNAME:MERCHANT_SDF
<Edge Data>Source,Target,Type,label, Weight
```

-continued

32ce84febd1c11e0b0112557fb829fdf,2e6381e6bd1c11e08087c929a54bb0fd,MODEL__003__001__00,2b8494f1bd1c11e0acbd6d888c43f7c2:TOKEN:1000:4,1000
2fdc7e3ebd1c11e088b55528b00e8d0e,32ce84febd1c11e0b0112557fb829fdf,MODEL__003__001__00,2b8494f1bd1c11e0acbd6d888c43f7c2:TOKEN:1000:4,1000
2e6381e2bd1c11e0941dc929a54bb0fd,34582a87bd1c11e080820167449bc60f,MODEL__003__001__00,2b8494f1bd1c11e0acbd6d888c43f7c2:TOKEN:778:5,778
2b8494f1bd1c11e0acbd6d888c43f7c2,34582a87bd1c11e080820167449bc60f,MODEL__003__001__00,2b8494f1bd1c11e0acbd6d888c43f7c2:TOKEN:778:5,778
2e6381e1bd1c11e0bf28c929a54bb0fd,32b44639bd1c11e0b15b2557fb829fdf,MODEL__003__001__00,2b8494f1bd1c11e0acbd6d888c43f7c2:TOKEN:0:2,0
2e6381e0bd1c11e0b4e8c929a54bb0fd,32ce84febd1c11e0b0112557fb829fdf,MODEL__003__001__00,2b8494f1bd1c11e0acbd6d888c43f7c2:TOKEN:1000:4,1000
32b44639bd1c11e0b15b2557fb829fdf,2e6381e6bd1c11e08087c929a54bb0fd,MODEL__003__001__00,2b8494f1bd1c11e0acbd6d888c43f7c2:TOKEN:0:2,0
2e6381e1bd1c11e0bf28c929a54bb0fd,32ce84febd1c11e0b0112557fb829fdf,MODEL__003__001__00,2b8494f1bd1c11e0acbd6d888c43f7c2:TOKEN:1000:4,1000
2e6381debd1c11e0b336c929a54bb0fd,32ce84febd1c11e0b0112557fb829fdf,MODEL__003__001__00,2b8494f1bd1c11e0acbd6d888c43f7c2:TOKEN:1000:4,1000
2e6381e3bd1c11e095b1c929a54bb0fd,34582a87bd1c11e080820167449bc60f,MODEL__003__001__00,2b8494f1bd1c11e0acbd6d888c43f7c2:TOKEN:778:5,778
2fdc7e40bd1c11e094675528b00e8d0e,32b44639bd1c11e0b15b2557fb829fdf,MODEL__003__001__00,2b8494f1bd1c11e0acbd6d888c43f7c2:TOKEN:0:2,0
2b8494f1bd1c11e0acbd6d888c43f7c2,32b4463abd1c11e0bdaa2557fb829fdf,MODEL__003__001__00,2b8494f1bd1c11e0acbd6d888c43f7c2:TOKEN:0:3,0
2e6381e3bd1c11e095b1c929a54bb0fd,32b4463abd1c11e0bdaa2557fb829fdf,MODEL__003__001__00,2b8494f1bd1c11e0acbd6d888c43f7c2:TOKEN:0:3,0
2e6381e3bd1c11e095b1c929a54bb0fd,32b1d53ebd1c11e094172557fb829fdf,MODEL__002__001__00,2b8494f0bd1c11e09c856d888c43f7c2:TOKEN:0:F,0
2e6381e5bd1c11e0b62cc929a54bb0fd,34582a87bd1c11e080820167449bc60f,MODEL__003__001__00,2b8494f1bd1c11e0acbd6d888c43f7c2:TOKEN:778:5,778
2cf8cbabbd1c11e0894a5de4f9281135,32b44638bd1c11e0b01c2557fb829fdf,MODEL__003__001__00,2b8494f1bd1c11e0acbd6d888c43f7c2:TOKEN:1000:1,1000
2cf681b8bd1c11e08be85de4f9281135,32b1d53ebd1c11e094172557fb829fdf,MODEL__002__001__00,2b8494f0bd1c11e09c856d888c43f7c2:TOKEN:0:F,0
32b4463abd1c11e0bdaa2557fb829fdf,2e6381e6bd1c11e08087c929a54bb0fd,MODEL__003__001__00,2b8494f1bd1c11e0acbd6d888c43f7c2:TOKEN:0:3,0
2e6381debd1c11e0b336c929a54bb0fd,32b44639bd1c11e0b15b2557fb829fdf,MODEL__003__001__00,2b8494f1bd1c11e0acbd6d888c43f7c2:TOKEN:0:2,0
2e6381e1bd1c11e0bf28c929a54bb0fd,32b44638bd1c11e0b01c2557fb829fdf,MODEL__003__001__00,2b8494f1bd1c11e0acbd6d888c43f7c2:TOKEN:1000:1,1000
2e6381e5bd1c11e0b62cc929a54bb0fd,32ce84febd1c11e0b0112557fb829fdf,MODEL__003__001__00,2b8494f1bd1c11e0acbd6d888c43f7c2:TOKEN:1000:4,1000
2e6381e1bd1c11e0bf28c929a54bb0fd,32b4463abd1c11e0bdaa2557fb829fdf,MODEL__003__001__00,2b8494f1bd1c11e0acbd6d888c43f7c2:TOKEN:0:3,0
2e6381e2bd1c11e0941dc929a54bb0fd,32b44639bd1c11e0b15b2557fb829fdf,MODEL__003__001__00,2b8494f1bd1c11e0acbd6d888c43f7c2:TOKEN:0:2,0
2b8494f1bd1c11e0acbd6d888c43f7c2,32c4e80dbd1c11e09e442557fb829fdf,MODEL__003__001__00,2b8494f1bd1c11e0acbd6d888c43f7c2:TOKEN:774:5,774
2e6381e2bd1c11e0941dc929a54bb0fd,32b1d53ebd1c11e094172557fb829fdf,MODEL__002__001__00,2b8494f0bd1c11e09c856d888c43f7c2:TOKEN:0:F,0
2e6381e4bd1c11e0b9ffc929a54bb0fd,32b4463abd1c11e0bdaa2557fb829fdf,MODEL__003__001__00,2b8494f1bd1c11e0acbd6d888c43f7c2:TOKEN:0:3,0
2fdc7e3fbd1c11e0be645528b00e8d0e,32b4463abd1c11e0bdaa2557fb829fdf,MODEL__003__001__00,2b8494f1bd1c11e0acbd6d888c43f7c2:TOKEN:0:3,0
2e6381e1bd1c11e0bf28c929a54bb0fd,32b1d53ebd1c11e094172557fb829fdf,MODEL__002__001__00,2b8494f0bd1c11e09c856d888c43f7c2:TOKEN:0:F,0
2fdc7e40bd1c11e094675528b00e8d0e,32ce84febd1c11e0b0112557fb829fdf,MODEL__003__001__00,2b8494f1bd1c11e0acbd6d888c43f7c2:TOKEN:1000:4,1000
2cf8cba8bd1c11e09fbc5de4f9281135,32c4e80dbd1c11e09e442557fb829fdf,MODEL__003__001__00,2b8494f1bd1c11e0acbd6d888c43f7c2:TOKEN:774:5,774
2e6381e2bd1c11e0941dc929a54bb0fd,32b44638bd1c11e0b01c2557fb829fdf,MODEL__003__001__00,2b8494f1bd1c11e0acbd6d888c43f7c2:TOKEN:1000:1,1000
2e6381e4bd1c11e0b9ffc929a54bb0fd,32b1d53ebd1c11e094172557fb829fdf,MODEL__002__001__00,2b8494f0bd1c11e09c856d888c43f7c2:TOKEN:0:F,0
2e6381e5bd1c11e0b62cc929a54bb0fd,32b44639bd1c11e0b15b2557fb829fdf,MODEL__003__001__00,2b8494f1bd1c11e0acbd6d888c43f7c2:TOKEN:0:2,0
32b1d53ebd1c11e094172557fb829fdf,2e6381e6bd1c11e08087c929a54bb0fd,MODEL__002__001__00,2b8494f0bd1c11e09c856d888c43f7c2:TOKEN:0:F,0
2b8494f1bd1c11e0acbd6d888c43f7c2,32b44639bd1c11e0b15b2557fb829fdf,MODEL__003__001__00,2b8494f1bd1c11e0acbd6d888c43f7c2:TOKEN:0:2,0
2e6381e3bd1c11e095b1c929a54bb0fd,32b44638bd1c11e0b01c2557fb829fdf,MODEL__003__001__00,2b8494f1bd1c11e0acbd6d888c43f7c2:TOKEN:1000:1,1000
2fdc7e3dbd1c11e0a22d5528b00e8d0e,32ce84febd1c11e0b0112557fb829fdf,MODEL__003__001__00,2b8494f1bd1c11e0acbd6d888c43f7c2:TOKEN:1000:4,1000
2cf681c1bd1c11e0b8815de4f9281135,32b44638bd1c11e0b01c2557fb829fdf,MODEL__003__001__00,2b8494f1bd1c11e0acbd6d888c43f7c2:TOKEN:1000:1,1000
2cf681c1bd1c11e0b8815de4f9281135,32b1d53ebd1c11e094172557fb829fdf,MODEL__002__001__00,2b8494f0bd1c11e09c856d888c43f7c2:TOKEN:0:F,0

-continued

```
2e6381e3bd1c11e095b1c929a54bb0fd,32b44639bd1c11e0b15b2557fb829fdf,MODEL__003__001
    __00,2b8494f1bd1c11e0acbd6d888c43f7c2:TOKEN:0:2,0
2fdc7e3fbd1c11e0be645528b00e8d0e,32b1d53ebd1c11e094172557fb829fdf,MODEL__002__001
    __00,2b8494f0bd1c11e09c856d888c43f7c2:TOKEN:0:F,0
32b44638bd1c11e0b01c2557fb829fdf,2e6381e6bd1c11e08087c929a54bb0fd,MODEL__003__001
    __00,2b8494f1bd1c11e0acbd6d888c43f7c2:TOKEN:1000:1,1000
2cf8cbaebd1c11e0b6515de4f9281135,32ce84febd1c11e0b0112557fb829fdf,MODEL__003__001
    __00,2b8494f1bd1c11e0acbd6d888c43f7c2:TOKEN:1000:4,1000
2e6381e6bd1c11e08087c929a54bb0fd,32b1d53ebd1c11e094172557fb829fdf,MODEL__002__001
    __00,2b8494f0bd1c11e09c856d888c43f7c2:TOKEN:0:F,0
2e6381e7bd1c11e091b7c929a54bb0fd,34582a87bd1c11e080820167449bc60f,MODEL__003__001
    __00,2b8494f1bd1c11e0acbd6d888c43f7c2:TOKEN:778:5,778
2e6381e1bd1c11e0bf28c929a54bb0fd,34582a87bd1c11e080820167449bc60f,MODEL__003__001
    __00,2b8494f1bd1c11e0acbd6d888c43f7c2:TOKEN:778:5,778
2e6381e5bd1c11e0b62cc929a54bb0fd,32b1d53ebd1c11e094172557fb829fdf,MODEL__002__001
    __00,2b8494f0bd1c11e09c856d888c43f7c2:TOKEN:0:F,0
2b8494f0bd1c11e09c856d888c43f7c2,32b1d53ebd1c11e094172557fb829fdf,MODEL__002__001
    __00,2b8494f0bd1c11e09c856d888c43f7c2:TOKEN:0:F,0
2b8494f1bd1c11e0acbd6d888c43f7c2,32b44638bd1c11e0b01c2557fb829fdf,MODEL__003__001
    __00,2b8494f1bd1c11e0acbd6d888c43f7c2:TOKEN:1000:1,1000
2e6381e6bd1c11e08087c929a54bb0fd,32b4463abd1c11e0bdaa2557fb829fdf,MODEL__003__001
    __00,2b8494f1bd1c11e0acbd6d888c43f7c2:TOKEN:0:3,0
2b8494f1bd1c11e0acbd6d888c43f7c2,32ce84febd1c11e0b0112557fb829fdf,MODEL__003__001
    __00,2b8494f1bd1c11e0acbd6d888c43f7c2:TOKEN:1000:4,1000
2cf681c1bd1c11e0b8815de4f9281135,32b44639bd1c11e0b15b2557fb829fdf,MODEL__003__001
    __00,2b8494f1bd1c11e0acbd6d888c43f7c2:TOKEN:0:2,0
2cf681c1bd1c11e0b8815de4f9281135,32b4463abd1c11e0bdaa2557fb829fdf,MODEL__003__001
    __00,2b8494f1bd1c11e0acbd6d888c43f7c2:TOKEN:0:3,0
2e6381e2bd1c11e0941dc929a54bb0fd,32b4463abd1c11e0bdaa2557fb829fdf,MODEL__003__001
    __00,2b8494f1bd1c11e0acbd6d888c43f7c2:TOKEN:0:3,0
2e6381e3bd1c11e095b1c929a54bb0fd,32ce84febd1c11e0b0112557fb829fdf,MODEL__003__001
    __00,2b8494f1bd1c11e0acbd6d888c43f7c2:TOKEN:1000:4,1000
2e6381e6bd1c11e08087c929a54bb0fd,32ce84febd1c11e0b0112557fb829fdf,MODEL__003__001
    __00,2b8494f1bd1c11e0acbd6d888c43f7c2:TOKEN:1000:4,1000
2e6381e6bd1c11e08087c929a54bb0fd,34582a87bd1c11e080820167449bc60f,MODEL__003__001
    __00,2b8494f1bd1c11e0acbd6d888c43f7c2:TOKEN:778:5,778
2e6381e6bd1c11e08087c929a54bb0fd,32b44638bd1c11e0b01c2557fb829fdf,MODEL__003__001
    __00,2b8494f1bd1c11e0acbd6d888c43f7c2:TOKEN:1000:1,1000
2fdc7e3ebd1c11e088b55528b00e8d0e,32b44639bd1c11e0b15b2557fb829fdf,MODEL__003__001
    __00,2b8494f1bd1c11e0acbd6d888c43f7c2:TOKEN:0:2,0
2e6381e5bd1c11e0b62cc929a54bb0fd,32b4463abd1c11e0bdaa2557fb829fdf,MODEL__003__001
    __00,2b8494f1bd1c11e0acbd6d888c43f7c2:TOKEN:0:3,0
2e6381e4bd1c11e0b9ffc929a54bb0fd,34582a87bd1c11e080820167449bc60f,MODEL__003__001
    __00,2b8494f1bd1c11e0acbd6d888c43f7c2:TOKEN:778:5,778
2e6381e4bd1c11e0b9ffc929a54bb0fd,32b44638bd1c11e0b01c2557fb829fdf,MODEL__003__001
    __00,2b8494f1bd1c11e0acbd6d888c43f7c2:TOKEN:1000:1,1000
34582a87bd1c11e080820167449bc60f,2e6381e6bd1c11e08087c929a54bb0fd,MODEL__003__001
    __00,2b8494f1bd1c11e0acbd6d888c43f7c2:TOKEN:778:5,778
2e6381e6bd1c11e08087c929a54bb0fd,32b44639bd1c11e0b15b2557fb829fdf,MODEL__003__001
    __00,2b8494f1bd1c11e0acbd6d888c43f7c2:TOKEN:0:2,0
2e6381e5bd1c11e0b62cc929a54bb0fd,32b44638bd1c11e0b01c2557fb829fdf,MODEL__003__001
    __00,2b8494f1bd1c11e0acbd6d888c43f7c2:TOKEN:1000:1,1000
2fdc7e3fbd1c11e0be645528b00e8d0e,32b44638bd1c11e0b01c2557fb829fdf,MODEL__003__001
    __00,2b8494f1bd1c11e0acbd6d888c43f7c2:TOKEN:1000:1,1000
2cf681b8bd1c11e08be85de4f9281135,32b44639bd1c11e0b15b2557fb829fdf,MODEL__003__001
    __00,2b8494f1bd1c11e0acbd6d888c43f7c2:TOKEN:0:2,0
2e6381e4bd1c11e0b9ffc929a54bb0fd,32b44639bd1c11e0b15b2557fb829fdf,MODEL__003__001
    __00,2b8494f1bd1c11e0acbd6d888c43f7c2:TOKEN:0:2,0
2cf681b8bd1c11e08be85de4f9281135,32b4463abd1c11e0bdaa2557fb829fdf,MODEL__003__001
    __00,2b8494f1bd1c11e0acbd6d888c43f7c2:TOKEN:0:3,0
2e6381e4bd1c11e0b9ffc929a54bb0fd,32ce84febd1c11e0b0112557fb829fdf,MODEL__003__001
    __00,2b8494f1bd1c11e0acbd6d888c43f7c2:TOKEN:1000:4,1000
2e6381e2bd1c11e0941dc929a54bb0fd,32ce84febd1c11e0b0112557fb829fdf,MODEL__003__001
    __00,2b8494f1bd1c11e0acbd6d888c43f7c2:TOKEN:1000:4,1000
2fdc7e3dbd1c11e0a22d5528b00e8d0e,32b44639bd1c11e0b15b2557fb829fdf,MODEL__003__001
    __00,2b8494f1bd1c11e0acbd6d888c43f7c2:TOKEN:0:2,0
2cf681b8bd1c11e08be85de4f9281135,32b44638bd1c11e0b01c2557fb829fdf,MODEL__003__001
    __00,2b8494f1bd1c11e0acbd6d888c43f7c2:TOKEN:1000:1,1000
```

In alternate examples, the WIP may store data in a JavaScript Object Notation ("JSON") format. The stored information may include data regarding the object, such as, but not limited to: commands, attributes, group information, payment information, account information, etc., such as in the example below:

```
{'MERCHANT': {'TYPEOFTYPES': ['MERCHANTS', 'SYNTHETICNETWORKS'], 'FUNCTIONS':
    {'ENTITYCREATION': 'putNetwork'}
```

-continued

, 'UNIQUEATTIBUTES': ['MERCHANTNAME'], 'TOKENENTITIESRELATIONSHIPS': [ ],
'ATTRIBUTES': {'MERCHANT': (2, 'STRING', 0, 'VALUE'), 'MERCH_ZIP_CD': (7,
'STRING', 0, 'VALUE'), 'MERCH_NAME': (8, 'STRING', 0, 'VALUE'),
'MERCHANTNAME': (3, 'STRING', 0, 'VALUE'), 'ACQ_CTRY_NUM': (4, 'STRING', 0,
'VALUE'), 'ACQ_PCR': (6, 'STRING', 0, 'VALUE'), 'ACQ_REGION_NUM': (5,
'STRING', 0, 'VALUE'), 'ISACTIVE': (0, 'BOOL', 1, 'VALUE'), 'ENTITYKEY': (1,
'STRING', 0, 'VALUE')}
}
, 'AFFINITYGROUP': {'TYPEOFTYPES': ['AFFINITYGROUPS'], 'FUNCTIONS':
{'ENTITYCREATION': 'putNetwork'}
, 'UNIQUEATTIBUTES': ['AFFINITYGROUPNAME'], 'TOKENENTITIESRELATIONSHIPS': [ ],
'ATTRIBUTES': {'XML': (2, 'STRING', 0, 'VALUE'), 'DESCRIPTION': (4,
'STRING', 0, 'VALUE'), 'ENTITYKEY': (1, 'STRING', 0, 'VALUE'), 'TYPEOF': (5,
'STRING', 0, 'VALUE'), 'AFFINITYGROUPNAME': (3, 'STRING', 0, 'VALUE'),
'ISACTIVE': (0, 'BOOL', 1, 'VALUE')}
}
, 'CASCADINGPAYMENT': {'TYPEOFTYPES': ['CASCADINGPAYMENT'], 'FUNCTIONS':
{'ENTITYCREATION': 'putNetwork'}
, 'UNIQUEATTIBUTES': ['CASCADINGPAYMENTNAME'], 'TOKENENTITIESRELATIONSHIPS':
['GROUP'], 'ATTRIBUTES': {'STATUS': (2, 'STRING', 0, 'VALUE'), 'EXPDT': (6,
'DATETIME', 0, 'VALUE'), 'GROUP': (3, 'STRING', 0, 'VALUE'), 'RESTRICTIONS':
(7, 'DICT', 0, 'VALUE'), 'CASCADINGPAYMENTNAME': (4, 'STRING', 0, 'VALUE'),
'STARTDT': (5, 'DATETIME', 0, 'VALUE'), 'ISACTIVE': (0, 'BOOL', 1, 'VALUE'),
'ENTITYKEY': (1, 'STRING', 0, 'VALUE')}
}
, 'GROUP': {'TYPEOFTYPES': [ ], 'FUNCTIONS': {'ENTITYCREATION': 'putNetwork'}
, 'UNIQUEATTIBUTES': ['GROUPNAME'], 'TOKENENTITIESRELATIONSHIPS': { }
, 'ATTRIBUTES': {GROUPNAME': (2, 'STRING', 0, 'VALUE'), 'DESCRIPTION': (2,
'STRING', 0, 'VALUE'), 'ISACTIVE': (0, 'BOOL', 1, 'VALUE'), 'ENTITYKEY': (1,
'STRING', 0, 'VALUE')}
}
, 'USERS': {'TYPEOFTYPES': [ ], 'FUNCTIONS': {'ENTITYCREATION': 'putNetwork'}
, 'UNIQUEATTIBUTES': ['USERSID'], 'TOKENENTITIESRELATIONSHIPS': { }
, 'ATTRIBUTES': {'USERSID': (2, 'STRING', 0, 'VALUE'), 'ISACTIVE': (0, 'BOOL',
1, 'VALUE'), 'ENTITYKEY': (1, 'STRING', 0, 'VALUE')}
}
, 'TWITTERUSER': {'TYPEOFTYPES': ['TOKENENTITY'], 'FUNCTIONS':
{'ENTITYCREATION': 'putWGTNetwork'}
, 'UNIQUEATTIBUTES': ['USERNAME'], 'TOKENENTITIESRELATIONSHIPS': ['USER'],
'ATTRIBUTES': {'USERNAME': (2, 'STRING', 0, 'VALUE'), 'CITY': (5, 'STRING',
0, 'VALUE'), 'ENTITYKEY': (1, 'STRING', 0, 'VALUE'), 'USERLINK': (6,
'STRING', 0, 'VALUE'), 'FULLNAME ': (4, 'STRING', 0, 'VALUE'), 'USERTAG': (3,
'STRING', 0, 'VALUE'), 'ISACTIVE': (0, 'BOOL', 1, 'VALUE')}
}
, 'COUPON': {'TYPEOFTYPES': ['COUPON'], 'FUNCTIONS': {'ENTITYCREATION':
'putNetwork'}
, 'UNIQUEATTIBUTES': ['COUPONNAME'], 'TOKENENTITIESRELATIONSHIPS':
['MERCHANT'], 'ATTRIBUTES': {'STATUS': (2, 'STRING', 0, 'VALUE'),
'MERCHANT': (3, 'STRING', 0, 'VALUE'), 'TITLE': (5, 'STRING', 0, 'VALUE'),
'NOTES': (7, 'STRING', 0, 'VALUE'), 'UPDATEDBY': (11, 'STRING', 0, 'VALUE'),
'ENTITYKEY': (1, 'STRING', 0, 'VALUE'), 'DECRIPTION ': (6, 'STRING', 0,
'VALUE'), 'CREATEDBY': (10, 'STRING', 0, 'VALUE'), 'LASTUPDATEDT': (9,
'DATETIME', 0, 'VALUE'), 'EXPDT': (13, 'DATETIME', 0, 'VALUE'),
'RESTRICTIONS': (14, 'DICT', 0, 'VALUE'), 'COUPONNAME ': (4, 'STRING', 0,
'VALUE'), 'CREATIONDT': (8, 'DATETIME', 0, 'VALUE'), 'STARTDT': (12,
'DATETIME', 0, 'VALUE'), 'ISACTIVE': (0, 'BOOL', 1, 'VALUE')}
}
, 'MEMBERSHIP': {'TYPEOFTYPES ': ['MEMBERSHIPS'], 'FUNCTIONS':
{'ENTITYCREATION': 'putNetwork'}
, 'UNIQUEATTIBUTES': ['MEMBERSHIPNAME'], 'TOKENENTITIESRELATIONSHIPS':
['MERCHANT'], 'ATTRIBUTES': {'STATUS': (2, 'STRING', 0, 'VALUE'),
'MERCHANT': (3, 'STRING', 0, 'VALUE'), 'RESTRICTIONS': (7, 'DICT', 0,
'VALUE'), 'MEMBERSHIPNAME': (4, 'STRING', 0, 'VALUE'), 'STARTDT': (5,
'DATETIME', 0, 'VALUE'), 'EXPDT ': (6, 'DATETIME', 0, 'VALUE'), 'ISACTIVE':
(0, 'BOOL', 1, 'VALUE'), 'ENTITYKEY': (1, 'STRING', 0, 'VALUE')}
}
, 'USERSECURITY': {'TYPEOFTYPES': ['SECURITY'], 'FUNCTIONS': {'ENTITYCREATION':
'putNetwork'}
, 'UNIQUEATTIBUTES': ['USERSECURITYNAME'], 'TOKENENTITIESRELATIONSHIPS':
['USER'], 'ATTRIBUTES': {'STATUS': (2, 'STRING', 0, 'VALUE'), 'EXPDT': (6,
'DATETIME', 0, 'VALUE'), 'USERSECURITYNAME': (4, 'STRING', 0, 'VALUE'),
'USER': (3, 'STRING', 0, 'VALUE'), 'RESTRICTIONS': (7, 'DICT', 0, 'VALUE'),
'STARTDT': (5, 'DATETIME', 0, 'VALUE'), 'ISACTIVE': (0, 'BOOL', 1, 'VALUE'),
'ENTITYKEY': (1, 'STRING', 0, 'VALUE')}
}
, 'MCC': {'TYPEOFTYPES': ['MCC'], 'FUNCTIONS': {'ENTITYCREATION':
'putWGTNetwork'}

-continued

, 'UNIQUEATTIBUTES': ['MCCNAME', 'MCC'], 'TOKENENTITIESRELATIONSHIPS': ['MCCSEG'], 'ATTRIBUTES': {'MCCSEG': (4, 'STRING', 0, 'VALUE'), 'MCC': (2, 'STRING', 0, 'VALUE'), 'MCCNAME': (3, 'STRING', 0, 'VALUE'), 'ISACTIVE': (0, 'BOOL', 1, 'VALUE'), 'ENTITYKEY': (1, 'STRING', 0, 'VALUE')}
}
, 'ZIPCODE': {'TYPEOFTYPES': ['LOCATION'], 'FUNCTIONS': {'ENTITYCREATION': 'putNetwork'}
, 'UNIQUEATTIBUTES': ['ZIPCODE'], 'TOKENENTITIESRELATIONSHIPS': [ ], 'ATTRIBUTES': {'STATE': (4, 'STRING', 0, 'VALUE'), 'POPULATION': (3, 'STRING', 0, 'VALUE'), 'ZIPCODE': (2, 'STRING', 0, 'VALUE'), 'ISACTIVE': (0, 'BOOL', 1, 'VALUE'), 'ENTITYKEY': (1, 'STRING', 0, 'VALUE')}
}
, 'PAYMENTCARD': {'TYPEOFTYPES': ['PAYMENTCARDS'], 'FUNCTIONS': {'ENTITYCREATION': 'putNetwork'}
, 'UNIQUEATTIBUTES': ['CARDNUMBER'], 'TOKENENTITIESRELATIONSHIPS': ['USER'], 'ATTRIBUTES': {'EXPDATE': (5, 'DATETIME', 0, 'VALUE'), 'ENTITYKEY': (1, 'STRING', 0, 'VALUE'), 'CARDTYPE': (4, 'STRING', 0, 'VALUE'), 'CARDNUMBER': (2, 'STRING', 0, 'VALUE'), 'USER': (3, 'STRING', 0, 'VALUE'), 'ISACTIVE': (0, 'BOOL', 1, 'VALUE')}
}
, 'GENERICTOKEN': {'TYPEOFTYPES': ['COUPON'], 'FUNCTIONS': {'ENTITYCREATION': 'putNetwork'}
, 'UNIQUEATTIBUTES': ['GENERICTOKENNAME'], 'TOKENENTITIESRELATIONSHIPS': ['MERCHANT'], 'ATTRIBUTES': {'STATUS': (2, 'STRING', 0, 'VALUE'), 'MERCHANT': (3, 'STRING', 0, 'VALUE'), 'TITLE': (5, 'STRING', 0, 'VALUE'), 'NOTES': (7, 'STRING', 0, 'VALUE'), 'UPDATEDBY': (11, 'STRING', 0, 'VALUE'), 'ENTITYKEY': (1, 'STRING', 0, 'VALUE'), 'DECRIPTION ': (6, 'STRING', 0, 'VALUE'), 'CREATEDBY': (10, 'STRING', 0, 'VALUE'), 'LASTUPDATEDT': (9, 'DATETIME', 0, 'VALUE'), 'EXPDT ': (13, 'DATETIME', 0, 'VALUE'), 'RESTRICTIONS': (14, 'DICT', 0, 'VALUE'), 'STARTDT': (12, 'DATETIME', 0, 'VALUE'), 'CREATIONDT': (8, 'DATETIME', 0, 'VALUE'), 'GENERICTOKENNAME': (4, 'STRING', 0, 'VALUE'), 'ISACTIVE': (0, 'BOOL', 1, 'VALUE')}
}
, 'USER': {'TYPEOFTYPES': ['USERS', 'SYNTHETICNETWORKS'], 'FUNCTIONS': {'ENTITYCREATION': 'putNetwork'}
, 'UNIQUEATTIBUTES': ['USERNAME'], 'TOKENENTITIESRELATIONSHIPS': ['USERS'], 'ATTRIBUTES': {'USERNAME': (5, 'STRING', 0, 'VALUE'), 'USERS': (2, 'STRING', 0, 'VALUE'), 'FIRSTNAME': (3, 'STRING', 0, 'VALUE'), 'LASTNAME': (4, 'STRING', 0, 'VALUE'), 'ENTITYKEY': (1, 'STRING', 0, 'VALUE'), 'ISACTIVE': (0, 'BOOL', 1, 'VALUE')}
}
, 'TWEETS': {'TYPEOFTYPES': ['TOKENENTITY'], 'FUNCTIONS': {'ENTITYCREATION': 'putWGTNetwork'}
, 'UNIQUEATTIBUTES': ['TWEETID'], 'TOKENENTITIESRELATIONSHIPS': ['TWITTERUSER'], 'ATTRIBUTES': {'Title': (4, 'STRING', 0, 'VALUE'), 'RawTweet': (5, 'STRING', 0, 'VALUE'), 'DATETIME': (3, 'STRING', 0, 'VALUE'), 'CLEANEDTWEET': (6, 'STRING', 0, 'VALUE'), 'ENTITYKEY': (1, 'STRING', 0, 'VALUE'), 'TWEETID': (2, 'STRING', 0, 'VALUE'), 'ISACTIVE': (0, 'BOOL', 1, 'VALUE')}
}
, 'MODEL': {'TYPEOFTYPES': ['MODELS'], 'FUNCTIONS': {'ENTITYCREATION': 'putNetwork'}
, 'UNIQUEATTIBUTES': ['MODELNAME'], 'TOKENENTITIESRELATIONSHIPS': ['USER', 'MERCHANT', 'PAYMENTCARD'], 'ATTRIBUTES': {'XML': (2, 'STRING', 0, 'VALUE'), 'MODELNAME': (3, 'STRING', 0, 'VALUE'), 'DESCRIPTION': (4, 'STRING', 0, 'VALUE'), 'ENTITYKEY': (1, 'STRING', 0, 'VALUE'), 'TYPEOF ': (5, 'STRING', 0, 'VALUE'), 'ISACTIVE': (0, 'BOOL', 1, 'VALUE')}
}
, 'MCCSEG': {'TYPEOFTYPES': ['MCCSEG'], 'FUNCTIONS': {'ENTITYCREATION': 'putWGTNetwork'}
, 'UNIQUEATTIBUTES': ['MCCSEGID'], 'TOKENENTITIESRELATIONSHIPS': { }
, 'ATTRIBUTES': {'MCCSEGID': (2, 'STRING', 0, 'VALUE'), 'MCCSEGNAME': (3, 'STRING', 0, 'VALUE'), 'ISACTIVE': (0, 'BOOL', 1, 'VALUE'), 'ENTITYKEY': (1, 'STRING', 0, 'VALUE')}
}
, 'TOKENENTITY': {'TYPEOFTYPES': ['TOKENENTITY'], 'FUNCTIONS': {'ENTITYCREATION': 'putWGTNetwork'}
, 'UNIQUEATTIBUTES': ['TOKENENTITYKEY'], 'TOKENENTITIESRELATIONSHIPS': { }
, 'ATTRIBUTES': {'STATUS': (4, 'STRING', 0, 'VALUE'), 'ISSUEDDATE': (5, 'STRING', 0, 'VALUE'), 'DOUBLELINKED': (8, 'BOOL', 1, 'VALUE'), 'BASEUUID': (1, 'STRING', 0, 'VALUE'), 'WEIGHT': (6, 'STRING', 0, 'VALUE'), 'BASETYPE': (3, 'STRING', 0, 'VALUE'), 'CATEGORY': (7, 'STRING', 0, 'VALUE'), 'ISACTIVE': (0, 'BOOL', 1, 'VALUE'), 'TOKENENTITYKEY': (2, 'STRING', 0, 'VALUE')}
}
}

Figure 25:
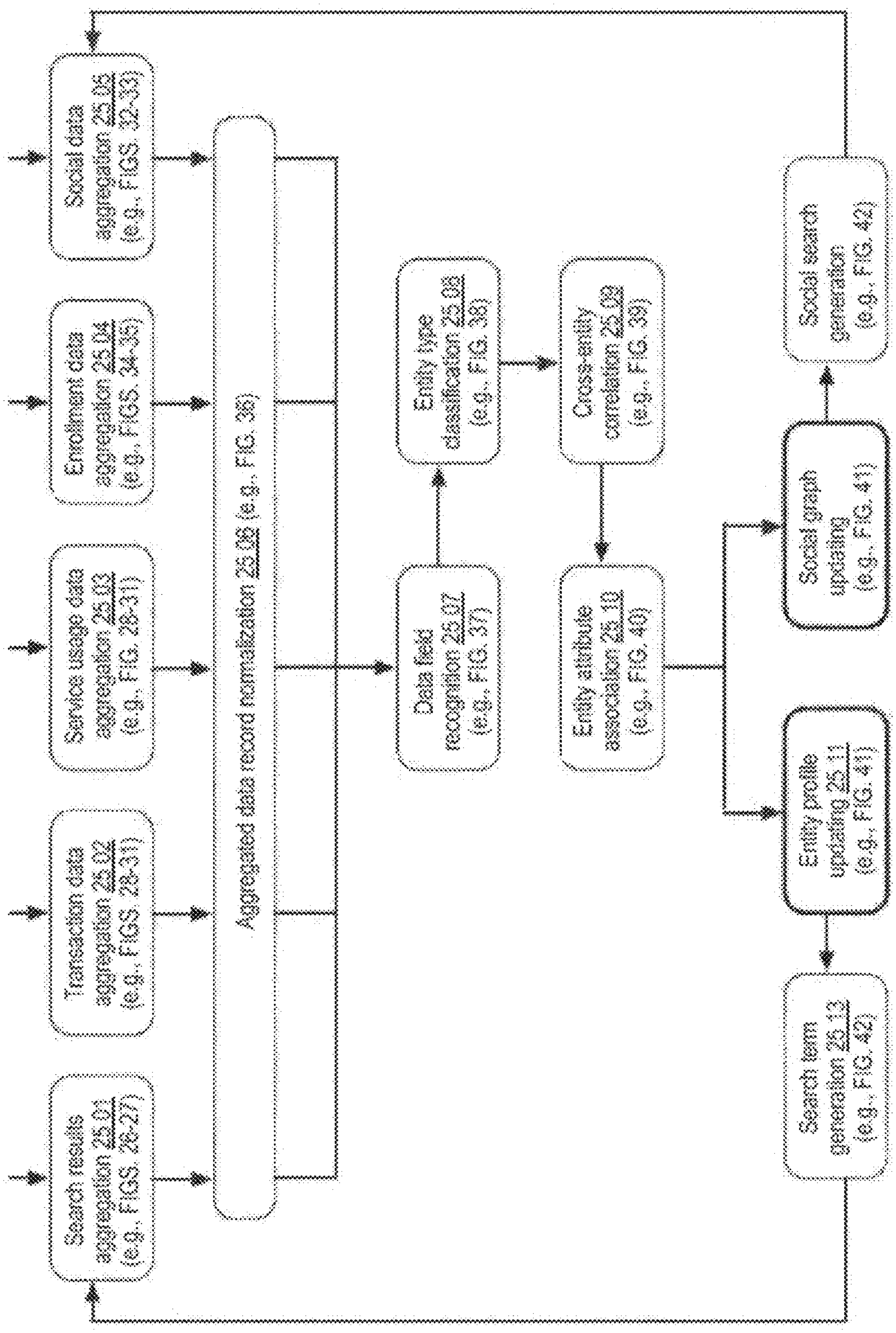
FIG. 25 shows a block diagram illustrating example WIP component configurations in some embodiments of the WIP.

FIG. 25 shows a block diagram illustrating example WIP component configurations in some embodiments of the WIP. In some embodiments, the WIP may aggregate data from a variety of sources to generate centralized personal information. The may also aggregate various types of data in order to generate the centralized personal information. For example, the WIP may utilize search results aggregation component(s) 2501 (e.g., such as described in FIGS. 21-22) to aggregate search results from across a wide range of computer networked systems, e.g., the Internet. As another example, the WIP may utilize transaction data aggregation component(s) 2502 (e.g., such as described in FIGS. 23-26) to aggregate transaction data, e.g., from transaction processing procedure by a payment network. As another example, the WIP may utilize service usage data aggregation component(s) 2503 (e.g., such as described in FIGS. 23-26) to aggregate data on user's usage of various services associated with the WIP. As another example, the WIP may utilize enrollment data component(s) 2504 (e.g., such as described in FIGS. 23-26) to aggregate data on user's enrollment into various services associated with the WIP. As another example, the WIP may utilize social data aggregation component(s) 2505 (e.g., such as described in FIGS. 27-28) to aggregate data on user's usage of various social networking services accessible by the WIP.

Figure 31:
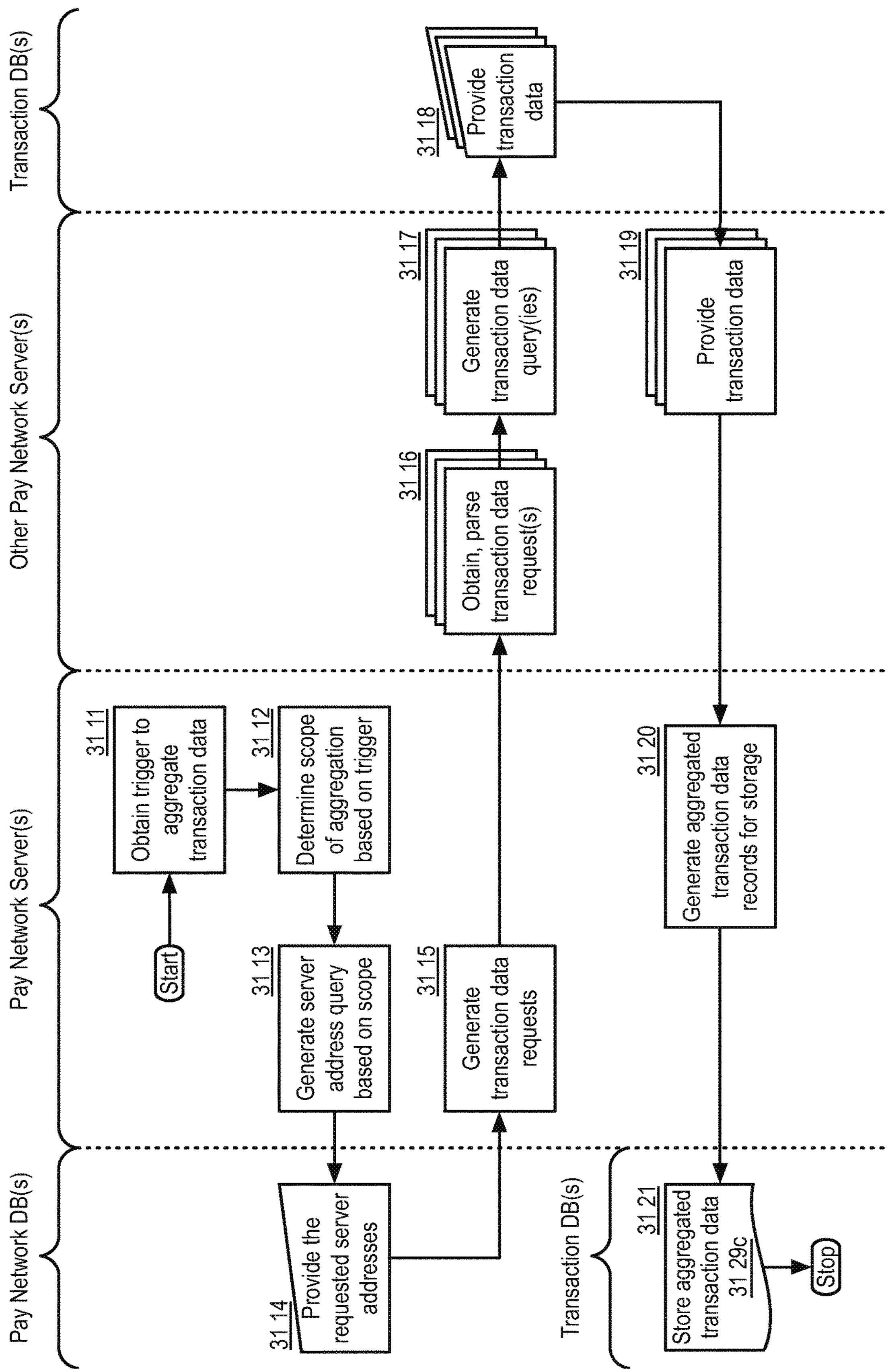
FIG. 31 shows a logic flow diagram illustrating example aspects of aggregating card-based transaction data in some embodiments of the WIP, e.g., a Transaction Data Aggregation ("TDA") component 2600.

In some embodiments, the WIP may acquire the aggregated data, and normalize the data into formats that are suitable for uniform storage, indexing, maintenance, and/or further processing via data record normalization component(s) 2506 (e.g., such as described in FIG. 31). The WIP may extract data from the normalized data records, and recognize data fields, e.g., the WIP may identify the attributes of each field of data included in the normalized data records via data field recognition component(s) 2507 (e.g., such as described in FIG. 32). For example, the WIP may identify names, user ID(s), addresses, network addresses, comments and/or specific words within the comments, images, blog posts, video, content within the video, and/or the like from the aggregated data. In some embodiments, for each field of data, the WIP may classify entity types associated with the field of data, as well as entity identifiers associated with the field of data, e.g., via component(s) 2508 (e.g., such as described in FIG. 33). For example, the WIP may identify an Internet Protocol (IP) address data field to be associated with a user ID john.q.public (consumer entity type), a user John Q. Public (consumer entity type), a household (the Public household—a multi-consumer entity type/household entity type), a merchant entity type with identifier Acme Merchant Store, Inc. from which purchases are made from the IP address, an Issuer Bank type with identifier First National Bank associated with the purchases made from the IP address, and/or the like. In some embodiments, the WIP may utilize the entity types and entity identifiers to correlate entities across each other, e.g., via cross-entity correlation component(s) 2509 (e.g., such as described in FIG. 34). For example, the WIP may identify, from the aggregated data, that a household entity with identifier H123 may include a user entity with identifier John Q. Public and social identifier john.q.public@facebook.com, a second user entity with identifier Jane P. Doe with social identifier jpdoe@twitter.com, a computer entity with identifier IP address 192.168.4.5, a card account entity with identifier **1234, a bank issuer entity with identifier AB23145, a merchant entity with identifier Acme Stores, Inc. where the household sub-entities make purchases, and/or the like. In some embodiments, the WIP may utilize the entity identifiers, data associated with each entity and/or correlated entities to identify associations to other entities, e.g., via entity attribute association component(s) 2510 (e.g., such as described in FIG. 35). For example, the WIP may identify specific purchases made via purchase transactions by members of the household, and thereby identify attributes of members of the household on the basis of the purchases in the purchase transactions made by members of the household. Based on such correlations and associations, the WIP may update a profile for each entity identified from the aggregated data, as well as a social graph interrelating the entities identified in the aggregated data, e.g., via entity profile-graph updating component(s) 2511 (e.g., such as described in FIG. 36). In some embodiments, the updating of profile and/or social graphs for an entity may trigger a search for additional data that may be relevant to the newly identified correlations and associations for each entity, e.g., via search term generation component(s) (e.g., such as described in FIG. 37). For example, the updating of a profile and/or social graph 2512, 2514** may trigger searches across the Internet, social networking websites, transaction data from payment networks, services enrolled into and/or utilized by the entities, and/or the like. In some embodiments, such updating of entity profiles and/or social graphs may be performed continuously, periodically, on-demand, and/or the like.

Figure 26:
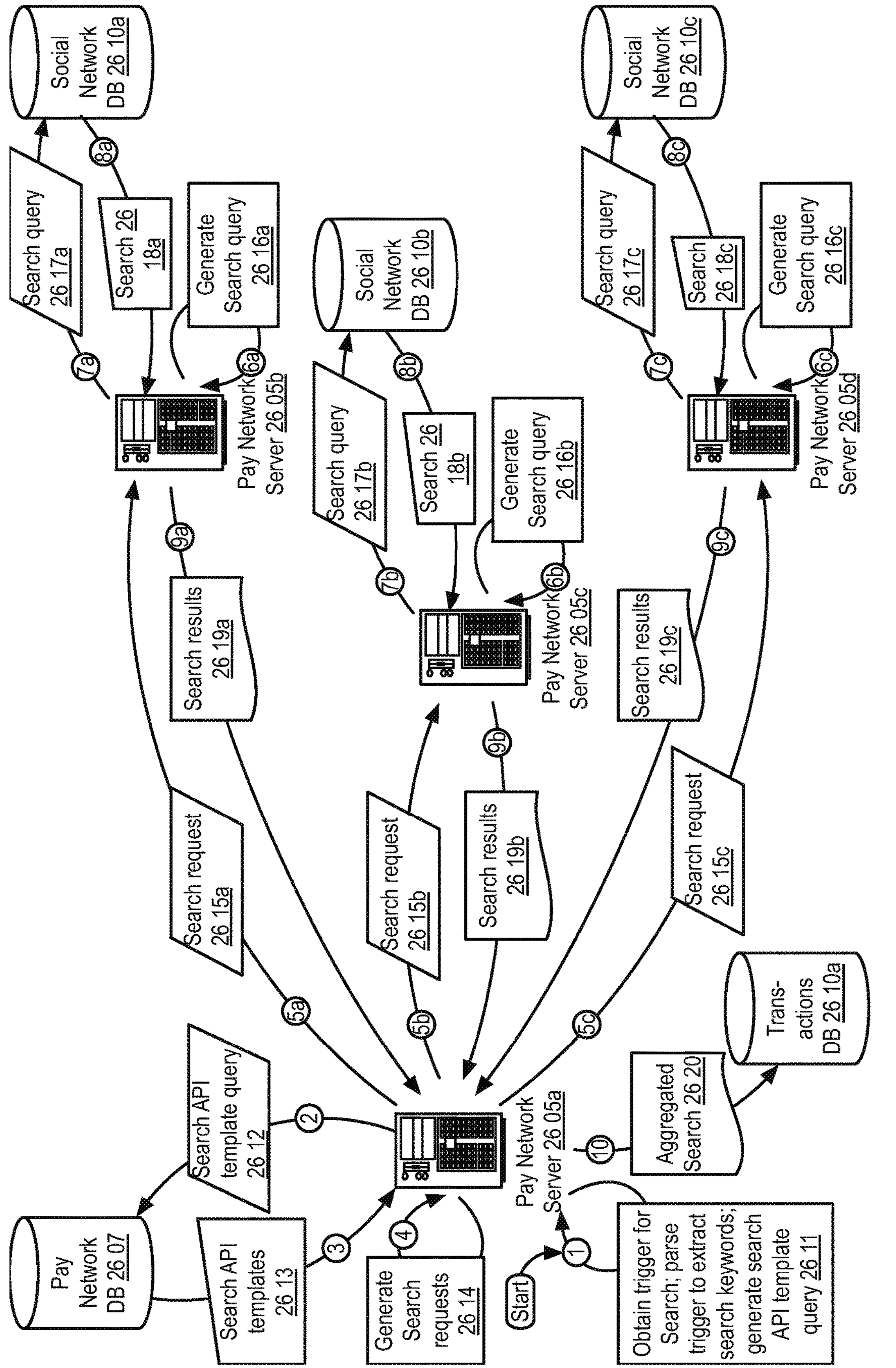
FIG. 26 shows a data flow diagram illustrating an example search result aggregation procedure in some embodiments of the WIP.

FIG. 26 shows a data flow diagram illustrating an example search result aggregation procedure in some embodiments of the WIP. In some implementations, the pay network server may obtain a trigger to perform a search 2611. For example, the pay network server 2605*a-d* may periodically perform a search update of its aggregated search database, e.g., 2610*a-c*, with new information available from a variety of sources, such as the Internet. As another example, a request for on-demand search update may be obtained as a result of a user wishing to enroll in a service, for which the pay network server may facilitate data entry by providing an automated web form filling system using information about the user obtained from the search update. In some implementations, the pay network server may parse the trigger to extract keywords using which to perform an aggregated search. The pay network server may generate a query 2616*a-c* for application programming interface (API) templates for various search engines (e.g., Google™, Bing®, AskJeeves, market data search engines, etc.) from which to collect data for aggregation. The pay network server may query, e.g., 2612, a pay network database, e.g., 2607, for search API templates for the search engines. For example, the pay network server may utilize PHP/SQL commands similar to the examples provided above. The database may provide, e.g., 2613, a list of API templates in response. Based on the list of API templates, the pay network server may generate search requests, e.g., 2614. The pay network server may issue the generated search requests, e.g., 2615*a-c*, to the search engine servers, e.g., 2601*a-c*. For example, the pay network server may issue PHP commands to request the search engine for search results. An example listing of commands to issue search requests 2615*a-c*, substantially in the form of PHP commands, is provided below:

```
<?PHP
// API URL with access key
$url = ["https://ajax.googleapis.com/ajax/services/search/web?v=1.0&"
    . "q=" $keywords
    "&key=1234567890987654&userip=datagraph.cpip.com"];
// Send Search Request
$ch = curl_init( );
```

-continued

```
curl_setopt($ch, CURLOPT_URL, $url);
curl_setopt($ch, CURLOPT_RETURNTRANSFER, 1);
curl_setopt($ch, CURLOPT_REFERER, "datagraph.cpip.com");
$body = curl_exec($ch);
curl_close($ch);
// Obtain, parse search results
$json = json_decode($body);
?>
```

In some embodiments, the search engine servers may query, e.g., 2617*a-c*, their search databases for search results falling within the scope of the search keywords. In response to the search queries, the search databases may provide search results, e.g., 2618*a-c*, to the search engine servers. The search engine servers may return the search results obtained from the search databases, e.g., 2619*a-c*, to the pay network server making the search requests. An example listing of search results 2619*a-c*, substantially in the form of JavaScript Object Notation (JSON)-formatted data, is provided below:

```
{"responseData": {
    "results": [
        {
            "GsearchResultClass": "GwebSearch",
            "unescapedUrl": "http://en.wikipedia.org/wiki/John_Q_Public",
            "url": "http://en.wikipedia.org/wiki/John_Q_Public",
            "visibleUrl": "en.wikipedia.org",
            "cacheUrl":
            "http://www.google.com/search?q\u003dcache:TwrPfhd22hYJ:en.wikipedia.org",
            "title": "\u003cb\u003eJohn Q. Public\u003c/b\u003e - Wikipedia, the free
            encyclopedia",
            "titleNoFormatting": "John Q. Public - Wikipedia, the free encyclopedia",
            "content": "\[1\] In 2006, he served as Chief Technology Officer..."
        },
        {
            "GsearchResultClass": "GwebSearch",
            "unescapedUrl": "http://www.imdb.com/name/nm0385296/",
            "url": "http://www.imdb.com/name/nm0385296/",
            "visibleUrl": "www.imdb.com",
            "cacheUrl":
            "http://www.google.com/search?q\u003dcache:1i34KkqnsooJ:www.imdb.com",
            "title": "\u003cb\u003eJohn Q. Public\u003c/b\u003e",
            "titleNoFormatting": "John Q. Public",
            "content": "Self: Zoolander. Socialite \u003cb\u003eJohn Q.
            Public\u003c/b\u003e..."
        },
        ...
    ],
    "cursor": {
        "pages": [
            { "start": "0", "label": 1 },
            { "start": "4", "label": 2 },
            { "start": "8", "label": 3 },
            { "start": "12","label": 4 }
        ],
        "estimatedResultCount": "59600000",
        "currentPageIndex": 0,
        "moreResultsUrl":
            "http://www.google.com/search?oe\u003dutf8\u0026ie\u003dutf8..."
    }
}
, "responseDetails": null, "responseStatus": 200}
```

In some embodiments, the pay network server may store the aggregated search results, e.g., 2620, in an aggregated search database, e.g., 2610.

Figure 27:
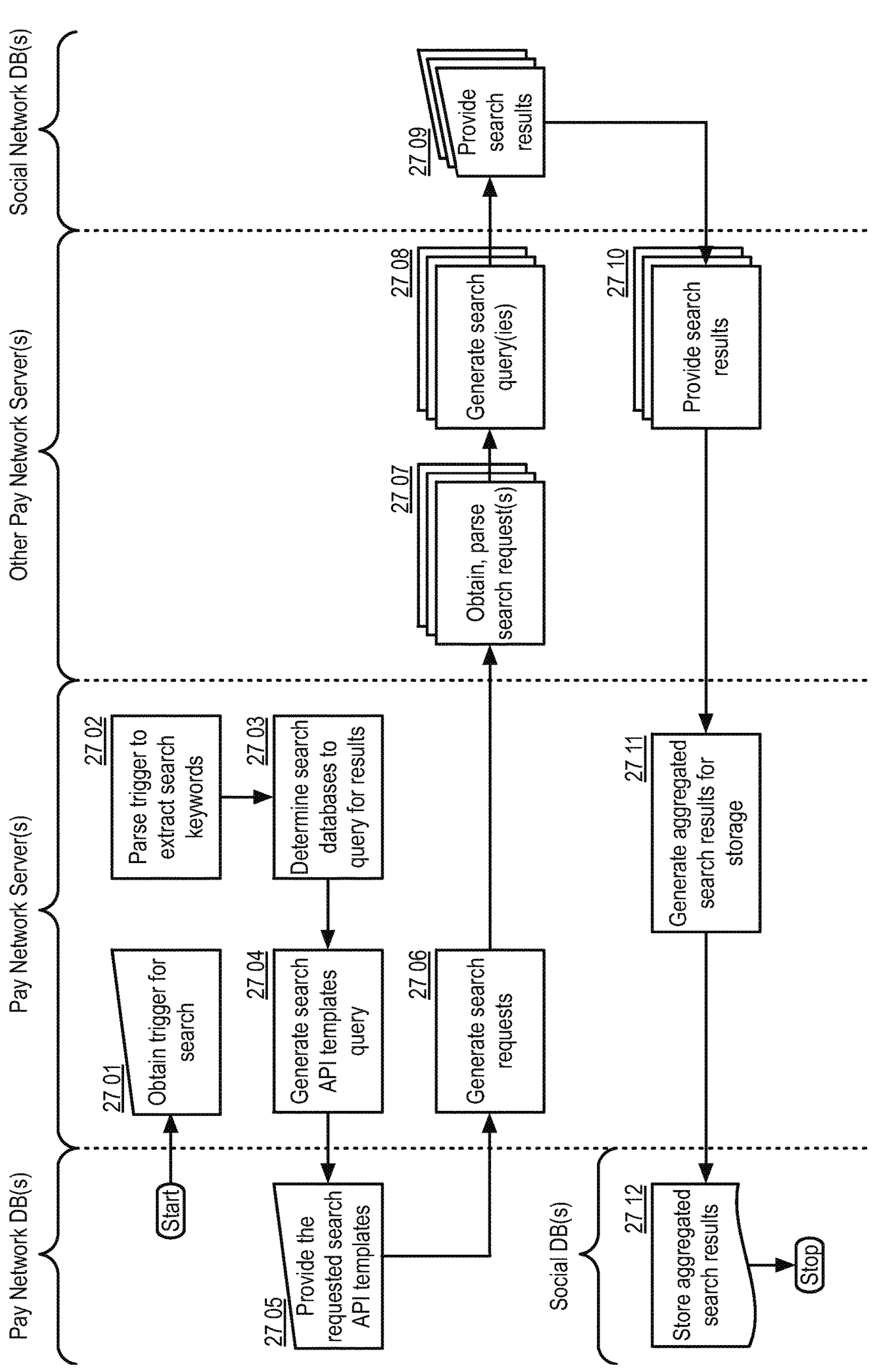
FIG. 27 shows a logic flow diagram illustrating example aspects of aggregating search results in some embodiments of the WIP, e.g., a Search Results Aggregation ("SRA") component 2200.

FIG. 27 shows a logic flow diagram illustrating example aspects of aggregating search results in some embodiments of the WIP, e.g., a Search Results Aggregation ("SRA") component 2700. In some implementations, the pay network server may obtain a trigger to perform a search, e.g., 2701. For example, the pay network server may periodically perform a search update of its aggregated search database with new information available from a variety of sources, such as the Internet. As another example, a request for on-demand search update may be obtained as a result of a user wishing to enroll in a service, for which the pay network server may facilitate data entry by providing an automated web form filling system using information about the user obtained from the search update. In some implementations, the pay network server may parse the trigger, e.g., 2702, to extract keywords using which to perform an aggregated search. The pay network server may determine the search engines to search, e.g., 2703, using the extracted keywords. Then, the pay network server may generate a query for application programming interface (API) templates for the various search engines (e.g., Google™, Bing®, AskJeeves, market data search engines, etc.) from which to collect data for aggregation, e.g., 2704. The pay network server may query, e.g., 2705, a pay network database for search API templates for the search engines. For example, the pay network server may utilize PHP/SQL commands similar to the examples provided above. The database may provide, e.g., 2705, a list of API templates in response. Based on the list of API templates, the pay network server may generate search requests, e.g., 2706. The pay network server may issue the generated search requests to the search engine servers. The search engine servers may parse the obtained search results(s), e.g., 2707, and query, e.g., 2708, their search databases for search results falling within the scope of the search keywords. In response to the search queries, the search databases may provide search results, e.g., 2709, to the search engine servers. The search engine servers may return the search results obtained from the search databases, e.g., 2710, to the pay network server making the search requests. The pay network server may generate, e.g., 2711, and store the aggregated search results, e.g., 2712, in an aggregated search database.

FIGS. 28A-D show data flow diagrams illustrating an example card-based transaction execution procedure in some embodiments of the WIP. In some implementations, a user, e.g., 2801, may desire to purchase a product, service, offering, and/or the like ("product"), from a merchant. The user may communicate with a merchant server, e.g., 2803, via a client such as, but not limited to: a personal computer, mobile device, television, point-of-sale terminal, kiosk, ATM, and/or the like (e.g., 2802). For example, the user may provide user input, e.g., purchase input 2811, into the client indicating the user's desire to purchase the product. In various implementations, the user input may include, but not be limited to: keyboard entry, card swipe, activating a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the merchant, and may select a product from the website via clicking on a hyperlink presented to the user via the website. As another example, the client may obtain track 1 data from the user's card (e.g., credit card, debit card, prepaid card, charge card, etc.), such as the example track 1 data provided below:

```
%B123456789012345^PUBLIC/J.Q.^99011200000000000000**901******?*
(wherein '123456789012345' is the card number of 'J.Q. Public' and has a CVV
    number of 901. '990112' is a service code, and *** represents decimal digits
    which change randomly each time the card is used.)
```

In some implementations, the client may generate a purchase order message, e.g., 2812, and provide, e.g., 2813, the generated purchase order message to the merchant server. For example, a browser application executing on the client may provide, on behalf of the user, a (Secure) Hypertext Transfer Protocol ("HTTP(S)") GET message including the product order details for the merchant server in the form of data formatted according to the eXtensible Markup Language ("XML"). Below is an example HTTP(S) GET message including an XML-formatted purchase order message for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
```

-continued

```
    </client_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <account_params>
        <account_name>John Q. Public</account_name>
        <account_type>credit</account_type>
        <account_num>123456789012345</account_num>
        <billing_address>123 Green St., Norman, OK
        98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</purchase_order>
```

In some implementations, the merchant server may obtain the purchase order message from the client, and may parse the purchase order message to extract details of the purchase order from the user. The merchant server may generate a card query request, e.g., 2814 to determine whether the transaction can be processed. For example, the merchant server may attempt to determine whether the user has sufficient funds to pay for the purchase in a card account provided with the purchase order. The merchant server may provide the generated card query request, e.g., 2815, to an acquirer server, e.g., 2804. For example, the acquirer server may be a server of an acquirer financial institution ("acquirer") maintaining an account of the merchant. For example, the proceeds of transactions processed by the merchant may be deposited into an account maintained by the acquirer. In some implementations, the card query request may include details such as, but not limited to: the costs to the user involved in the transaction, card account details of the user, user billing and/or shipping information, and/or the like. For example, the merchant server may provide a HTTP(S) POST message including an XML-formatted card query request similar to the example listing provided below:

```
POST /cardquery.php HTTP/1.1
Host: www.acquirer.com
Content-Type: Application/XML
Content-Length: 624
<?XML version = "1.0" encoding = "UTF-8"?>
<card_query_request>
    <query_ID>VNEI39FK</query_ID>
    <timestamp>2011-02-22 15:22:44</timestamp>
    <purchase_summary>
        <num_products>1</num_products>
        <product>
            <product_summary>Book - XML for dummies</product_summary>
            <product_quantity>1</product_quantity?
        </product>
    </purchase_summary>
    <transaction_cost>$34.78</transaction_cost>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
</card_query_request>
```

In some implementations, the acquirer server may generate a card authorization request, e.g., 2816, using the obtained card query request, and provide the card authorization request, e.g., 2817, to a pay network server, e.g., 2806. For example, the acquirer server may redirect the HTTP(S) POST message in the example above from the merchant server to the pay network server.

In some implementations, the pay network server may determine whether the user has enrolled in value-added user services. For example, the pay network server may query 2818 a database, e.g., pay network database 2807, for user service enrollment data. For example, the server may utilize PHP/SQL commands similar to the example provided above to query the pay network database. In some implementations, the database may provide the user service enrollment data, e.g., 2819. The user enrollment data may include a flag indicating whether the user is enrolled or not, as well as instructions, data, login URL, login API call template and/or the like for facilitating access of the user-enrolled services. For example, in some implementations, the pay network server may redirect the client to a value-add server (e.g., such as a social network server 2805 where the value-add service is related to social networking) by providing a HTTP(S) REDIRECT 300 message, similar to the example below:

```
HTTP/1.1 300 Multiple Choices
Location:
    https://www.facebook.com/dialog/oauth?client_id=snpa_app_ID&redirect_uri=
    www.paynetwork.com/purchase.php
<html>
    <head><title>300 Multiple Choices</title></head>
    <body><h1>Multiple Choices</h1></body>
</html>
```

In some implementations, the pay network server may provide payment information extracted from the card authorization request to the value-add server as part of a value add service request, e.g., 2820. For example, the pay network server may provide a HTTP(S) POST message to the value-add server, similar to the example below:

```
POST /valueservices.php HTTP/1.1
Host: www.valueadd.com
Content-Type: Application/XML
Content-Length: 1306
<?XML version = "1.0" encoding = "UTF-8"?>
<service_request>
    <request_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <account_params>
        <account_name>John Q. Public</account_name>
        <account_type>credit</account_type>
        <account_num>123456789012345</account_num>
        <billing_address>123 Green St., Norman, OK
        98765</billing_address>
        <phone>123-456-7809</phone>
```

-continued

```
        <sign>/jqp/</sign>
        <confirm_type>email</confirm_type>
        <contact_info>john.q.public@gmail.com</contact_info>
    </account_params>
    <!--optional-->
    <merchant>
        <merchant_id>CQN3Y42N</merchant_id>
        <merchant_name>Acme Tech, Inc.</merchant_name>
        <user_name>john.q.public</user_name>
        <cardlist>
        www.acme.com/user/john.q.public/cclist.xml<cardlist>
        <user_account_preference>1 3 2 4 7 6
        5<user_account_preference>
    </merchant>
</service_request>
```

In some implementations, the value-add server may provide a service input request, e.g., 2821, to the client. For example, the value-add server may provide a HTML input/login form to the client. The client may display, e.g., 2822, the login form for the user. In some implementations, the user may provide login input into the client, e.g., 2823, and the client may generate a service input response, e.g., 2824, for the value-add server. In some implementations, the value-add server may provide value-add services according to user value-add service enrollment data, user profile, etc., stored on the value-add server, and based on the user service input 2825. Based on the provision of value-add services, the value-add server may generate a value-add service response, e.g., 2826, and provide the response to the pay network server. For example, the value-add server may provide a HTTP(S) POST message similar to the example below:

```
    POST /serviceresponse.php HTTP/1.1
    Host: www.paynet.com
    Content-Type: Application/XML
    Content-Length: 1306
    <?XML version = "1.0" encoding = "UTF-8"?>
    <service_response>
        <request_ID>4NFU4RG94</order_ID>
        <timestamp>2011-02-22 15:22:43</timestamp>
        <result>serviced</result>
        <servcode>943528976302-45569-003829-04</servcode>
    </service_response>
```

In some implementations, upon receiving the value-add service response from the value-add server, the pay network server may extract the enrollment service data from the response for addition to a transaction data record 2827. In some implementations, the pay network server may forward the card authorization request to an appropriate pay network server, e.g., 2828, which may parse the card authorization request to extract details of the request. Using the extracted fields and field values, the pay network server may generate a query, e.g., 2829, for an issuer server corresponding to the user's card account. For example, the user's card account, the details of which the user may have provided via the client-generated purchase order message, may be linked to an issuer financial institution ("issuer"), such as a banking institution, which issued the card account for the user. An issuer server, e.g., 2808*a-n*, of the issuer may maintain details of the user's card account. In some implementations, a database, e.g., pay network database 2807, may store details of the issuer servers and card account numbers associated with the issuer servers. For example, the database may be a relational database responsive to Structured Query Language ("SQL") commands. The pay network server may execute a hypertext preprocessor ("PHP") script including SQL commands to query the database for details of the issuer server. An example PHP/SQL command listing, illustrating substantive aspects of querying the database, is provided below:

```
<?PHP
header('Content-Type: text/plain');
mysql_connect("254.93.179.112",$DBserver,$password); // access
database server
mysql_select_db("ISSUERS.SQL"); // select database table to search
//create query for issuer server data
$query = "SELECT issuer_name issuer_address issuer_id ip_address
mac_address
    auth_key port_num security_settings_list FROM IssuerTable
    WHERE account_num
    LIKE '%' $accountnum";
$result = mysql_query($query); // perform the search query
mysql_close("ISSUERS.SQL"); // close database access
?>
```

In response to obtaining the issuer server query, e.g., 2829, the pay network database may provide, e.g., 2830, the requested issuer server data to the pay network server. In some implementations, the pay network server may utilize the issuer server data to generate a forwarding card authorization request, e.g., 2831, to redirect the card authorization request from the acquirer server to the issuer server. The pay network server may provide the card authorization request, e.g., 2832*a-n*, to the issuer server. In some implementations, the issuer server, e.g., 2808*a-n*, may parse the card authorization request, and based on the request details may query 2833*a-n* database, e.g., user profile database 2809*a-n*, for data of the user's card account. For example, the issuer server may issue PHP/SQL commands similar to the example provided below:

```
<?PHP
header('Content-Type: text/plain');
mysql_connect("254.93.179.112",$DBserver,$password); // access
database server
mysql_select_db("USERS.SQL"); // select database table to search
//create query for user data
$query = "SELECT user_id user_name user_balance account_type
FROM UserTable
    WHERE account_num LIKE '%' $accountnum";
$result = mysql_query($query); // perform the search query
mysql_close("USERS.SQL"); // close database access
?>
```

In some implementations, on obtaining the user data, e.g., 2834*a-n*, the issuer server may determine whether the user can pay for the transaction using funds available in the account, e.g., 2835*a-n*. For example, the issuer server may determine whether the user has a sufficient balance remaining in the account, sufficient credit associated with the account, and/or the like. If the issuer server determines that the user can pay for the transaction using the funds available in the account, the server may provide an authorization message, e.g., 2836*a-n*, to the pay network server 2806. For example, the server may provide a HTTP(S) POST message similar to the examples above. In step 2387, it is determined whether the transaction is authorized by all issuers, and an authorization fail message may be sent if authorization is denied 2838.

In some implementations, the pay network server may obtain the authorization message, and parse the message to extract authorization details. Upon determining that the user possesses sufficient funds for the transaction, the pay network server may generate a transaction data record from the card authorization request it received, and store, e.g., 2839, the details of the transaction and authorization relating to the transaction in a database, e.g., pay network database 2807. For example, the pay network server may issue PHP/SQL commands similar to the example listing below to store the transaction data in a database:

```
<?PHP
header('Content-Type: text/plain');
mysql_connect("254.92.185.103",$DBserver,$password); // access
database server
mysql_select("TRANSACTIONS.SQL"); // select database to append
mysql_query("INSERT INTO PurchasesTable (timestamp,
    purchase_summary_list, num_products, product_summary,
    product_quantity, transaction_cost, account_params_list,
    account_name, account_type, account_num, billing_addres,
    zipcode, phone, sign, merchant_params_list, merchant_id,
    merchant_name, merchant_auth_key)
VALUES (time( ), $purchase_summary_list, $num_products,
    $product_summary, $product_quantity, $transaction_cost,
    $account_params_list, $account_name, $account_type,
    $account_num, $billing_addres, $zipcode, $phone, $sign,
    $merchant_params_list, $merchant_id, $merchant_name,
    $merchant_auth_key)");
    // add data to table in database
mysql_close("TRANSACTIONS.SQL"); // close connection to database
?>
```

In some implementations, the pay network server may forward the authorization message, e.g., 2840, to the acquirer server, which may in turn forward the authorization message, e.g., 2840, to the merchant server. The merchant may obtain the authorization message, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 2841, and store the XML data file, e.g., 2842, in a database, e.g., merchant database 2804. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365</merchant_auth_key>
    <account_number>123456789</account_number>
</merchant_data>
<transaction_data>
    <transaction 1>
        . . .
    </transaction 1>
    <transaction 2>
        . . .
    </transaction 2>
        .
        .
        .
    <transaction n>
        . . .
    </transaction n>
</transaction_data>
```

In some implementations, the server may also generate a purchase receipt, e.g., 2843, and provide the purchase receipt to the client. The client may render and display, e.g., 2844, the purchase receipt for the user. For example, the client may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 28A:
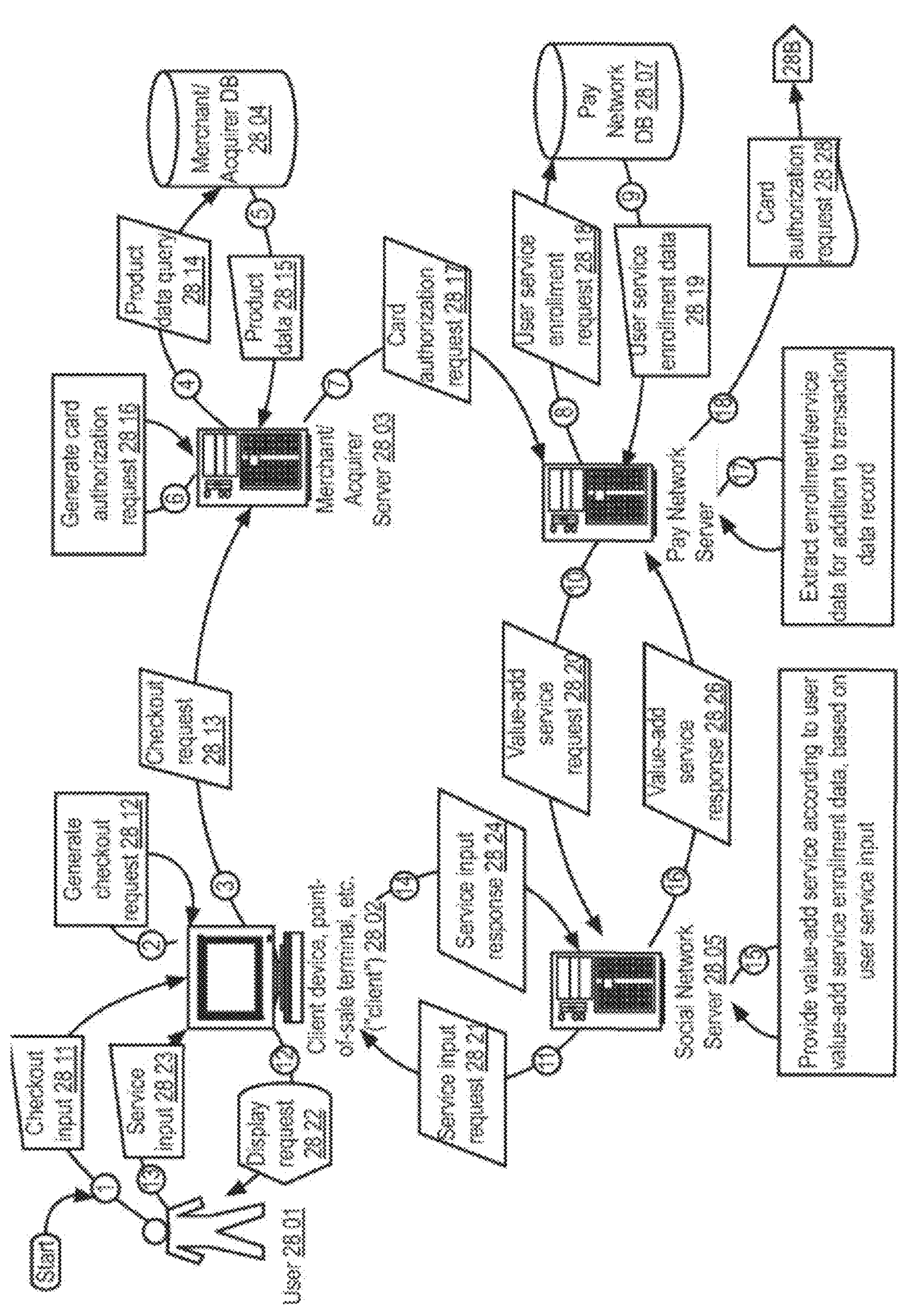
FIGS. 28A-D show data flow diagrams illustrating an example card-based transaction execution procedure in some embodiments of the WIP.
Figure 28B:
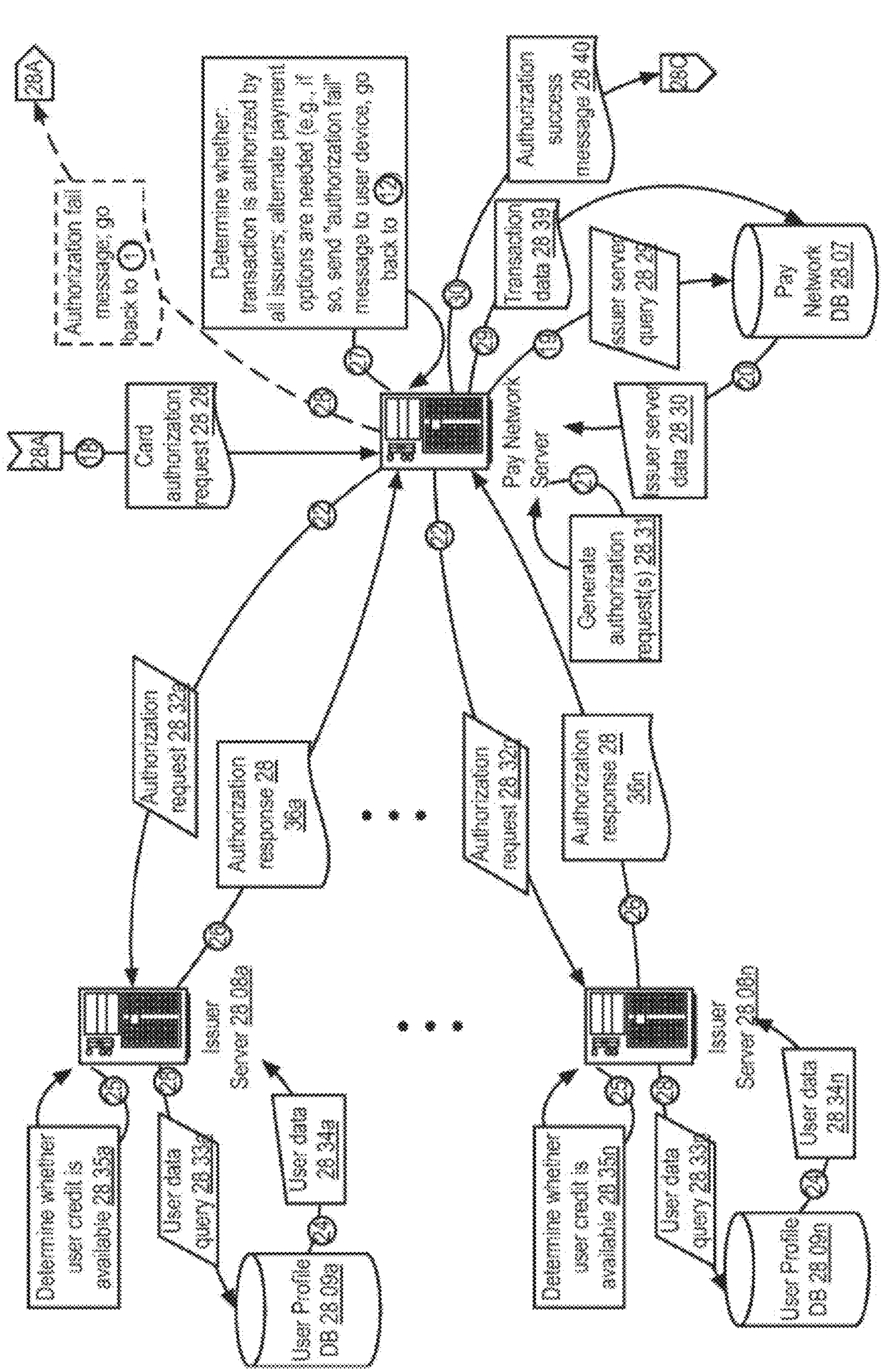
Figure 28C:
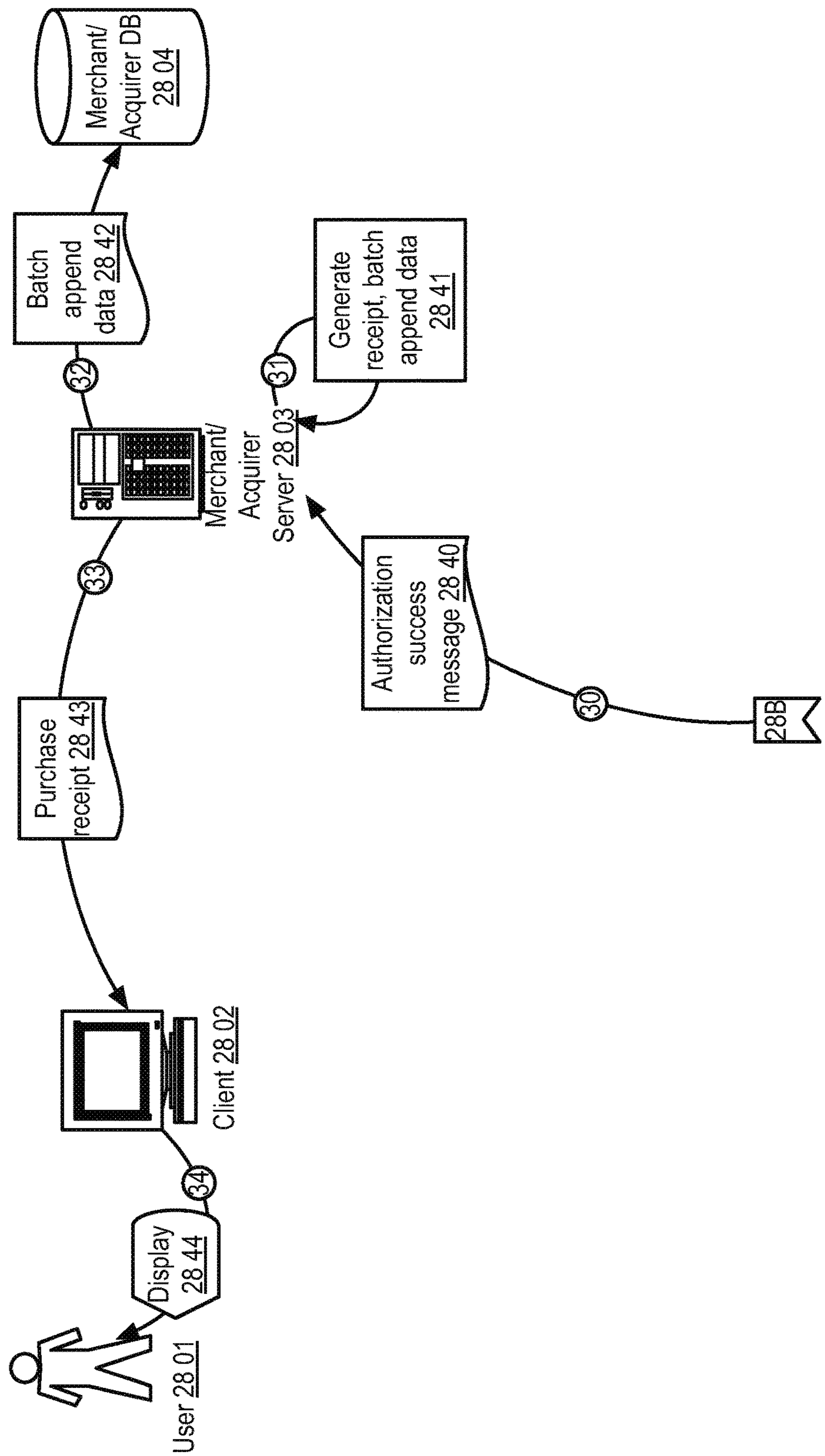
Figure 28D:
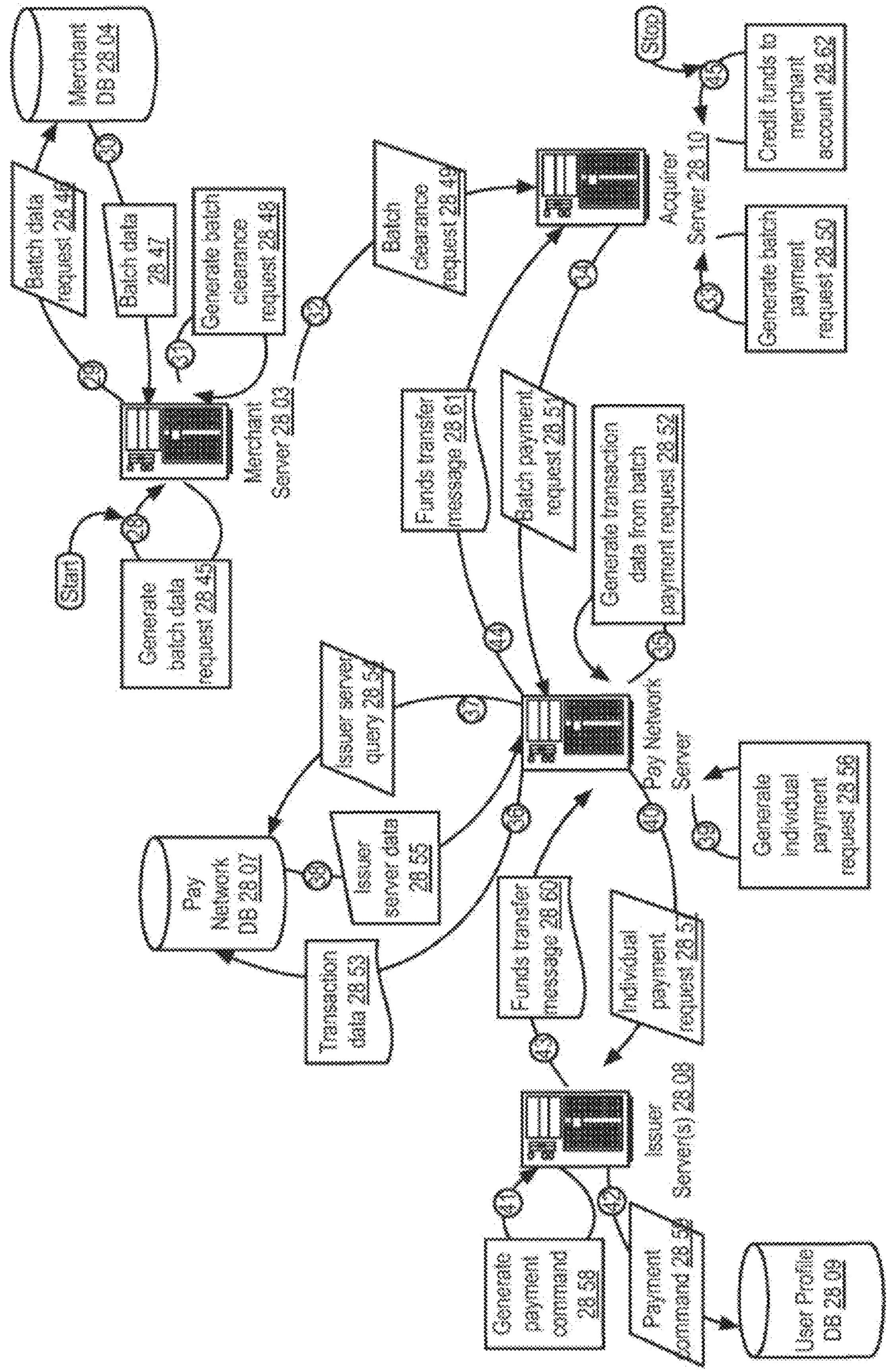

With reference to FIG. 28C, in some implementations, the merchant server may initiate clearance of a batch of authorized transactions. For example, the merchant server may generate a batch data request, e.g., 2845, and provide the request, e.g., 2846, to a database, e.g., merchant database 2804. For example, the merchant server may utilize PHP/SQL commands similar to the examples provided above to query a relational database. In response to the batch data request, the database may provide the requested batch data, e.g., 2847. The server may generate a batch clearance request, e.g., 2848, using the batch data obtained from the database, and provide, e.g., 2841, the batch clearance request to an acquirer server, e.g., 2810. For example, the merchant server may provide a HTTP(S) POST message including XML-formatted batch data in the message body for the acquirer server. The acquirer server may generate, e.g., 2850, a batch payment request using the obtained batch clearance request, and provide the batch payment request to the pay network server, e.g., 2851. The pay network server may parse the batch payment request, and extract the transaction data for each transaction stored in the batch payment request, e.g., 2852. The pay network server may store the transaction data, e.g., 2853, for each transaction in a database, e.g., pay network database 2807. For each extracted transaction, the pay network server may query, e.g., 2854-2355, a database, e.g., pay network database 2807, for an address of an issuer server. For example, the pay network server may utilize PHP/SQL commands similar to the examples provided above. The pay network server may generate an individual payment request, e.g., 2856, for each transaction for which it has extracted transaction data, and provide the individual payment request, e.g., 2857, to the issuer server, e.g., 2808. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
    <purchase_summary>
        <num_products>1</num_products>
        <product>
            <product_summary>Book - XML for dummies</product_summary>
            <product_quantity>1</product_quantity?
        </product>
    </purchase_summary>
</pay_request>
```

In some implementations, the issuer server may generate a payment command, e.g., 2858. For example, the issuer server may issue a command to deduct funds from the user's account (or add a charge to the user's credit card account). The issuer server may issue a payment command, e.g., 2859, to a database storing the user's account information, e.g., user profile database 2808. The issuer server may provide a funds transfer message, e.g., 2860, to the pay network server, which may forward, e.g., 2861, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some implementations, the acquirer server may parse the funds transfer message, and correlate the transaction (e.g., using the request ID field in the example above) to the merchant. The acquirer server may then transfer the funds specified in the funds transfer message to an account of the merchant, e.g., 2862.

FIGS. 29A-E show logic flow diagrams illustrating example aspects of card-based transaction execution, resulting in generation of card-based transaction data and service usage data, in some embodiments of the WIP, e.g., a Card-Based Transaction Execution ("CTE") component 2900. In some implementations, a user may provide user input, e.g., 2901, into a client indicating the user's desire to purchase a product from a merchant. The client may generate a purchase order message, e.g., 2902, and provide the generated purchase order message to the merchant server. In some implementations, the merchant server may obtain, e.g., 2903, the purchase order message from the client, and may parse the purchase order message to extract details of the purchase order from the user. Example parsers that the merchant client may utilize are discussed further below with reference to FIG. 61. The merchant may generate a product data query, e.g., 2904, for a merchant database, which may in response provide the requested product data, e.g., 2905. The merchant server may generate a card query request using the product data, e.g., 2904, to determine whether the transaction can be processed. For example, the merchant server may process the transaction only if the user has sufficient funds to pay for the purchase in a card account provided with the purchase order. The merchant server may optionally provide the generated card query request to an acquirer server. The acquirer server may generate a card authorization request using the obtained card query request, and provide the card authorization request to a pay network server.

In some implementations, the pay network server may determine whether the user has enrolled in value-added user services. For example, the pay network server may query a database, e.g., 2907, for user service enrollment data. For example, the server may utilize PHP/SQL commands similar to the example provided above to query the pay network database. In some implementations, the database may provide the user service enrollment data, e.g., 2908. The user enrollment data may include a flag indicating whether the user is enrolled or not, 2909, as well as instructions, data, login URL, login API call template and/or the like for facilitating access of the user-enrolled services. For example, in some implementations, the pay network server may redirect the client to a value-add server (e.g., such as a social network server where the value-add service is related to social networking) by providing a HTTP(S) REDIRECT 300 message. In some implementations, the pay network server may provide payment information extracted from the card authorization request to the value-add server as part of a value add service request, e.g., 2910.

In some implementations, the value-add server may provide a service input request, e.g., 2911, to the client. The client may display, e.g., 2912, the input request for the user. In some implementations, the user may provide input into the client, e.g., 2913, and the client may generate a service input response for the value-add server. In some implementations, the value-add server may provide value-add services according to user value-add service enrollment data, user profile, etc., stored on the value-add server, and based on the user service input 2914. A user profile query may be generated and provided 2915, 2916. Based on the provision of value-add services, the value-add server may generate a value-add service response, e.g., 2917, and provide the response to the pay network server. In some implementations, upon receiving the value-add service response from the value-add server, the pay network server may extract the enrollment service data from the response for addition to a transaction data record, e.g., 2919-2420.

Figure 29A:
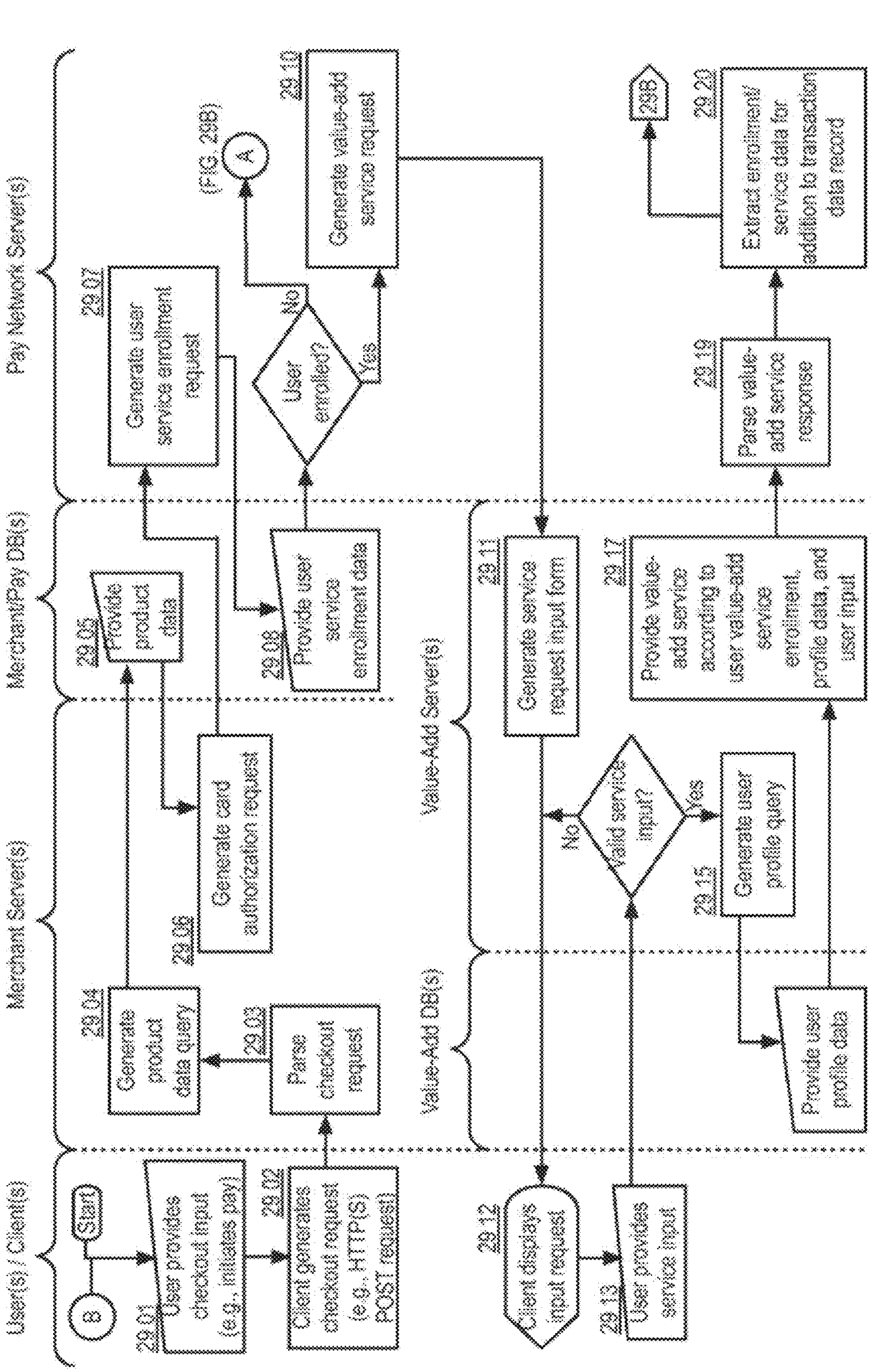
FIGS. 29A-E show logic flow diagrams illustrating example aspects of card-based transaction execution, resulting in generation of card-based transaction data and service usage data, in some embodiments of the WIP, e.g., a Card-Based Transaction Execution ("CTE") component 2400.
Figure 29B:
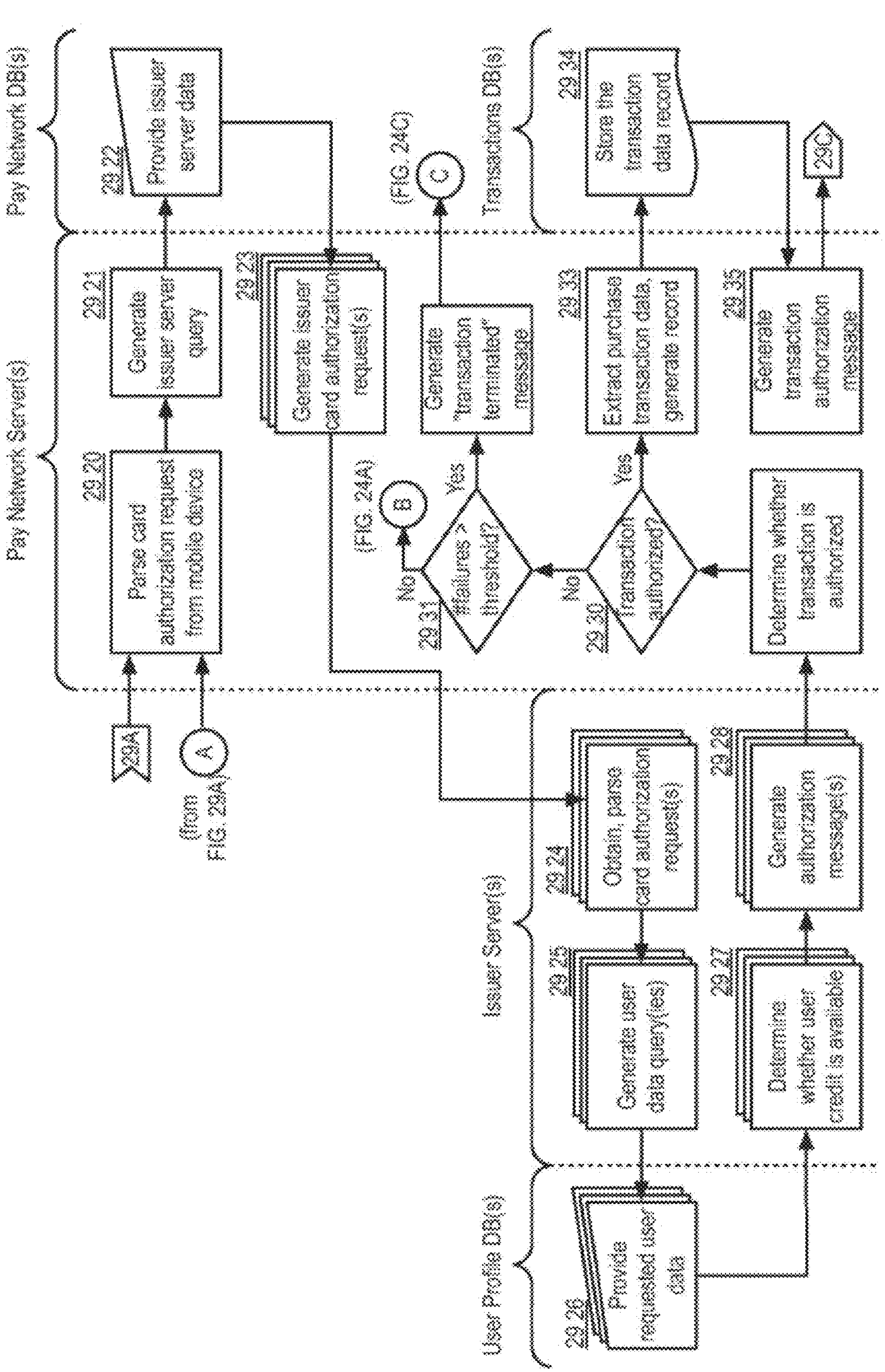
Figure 29C:
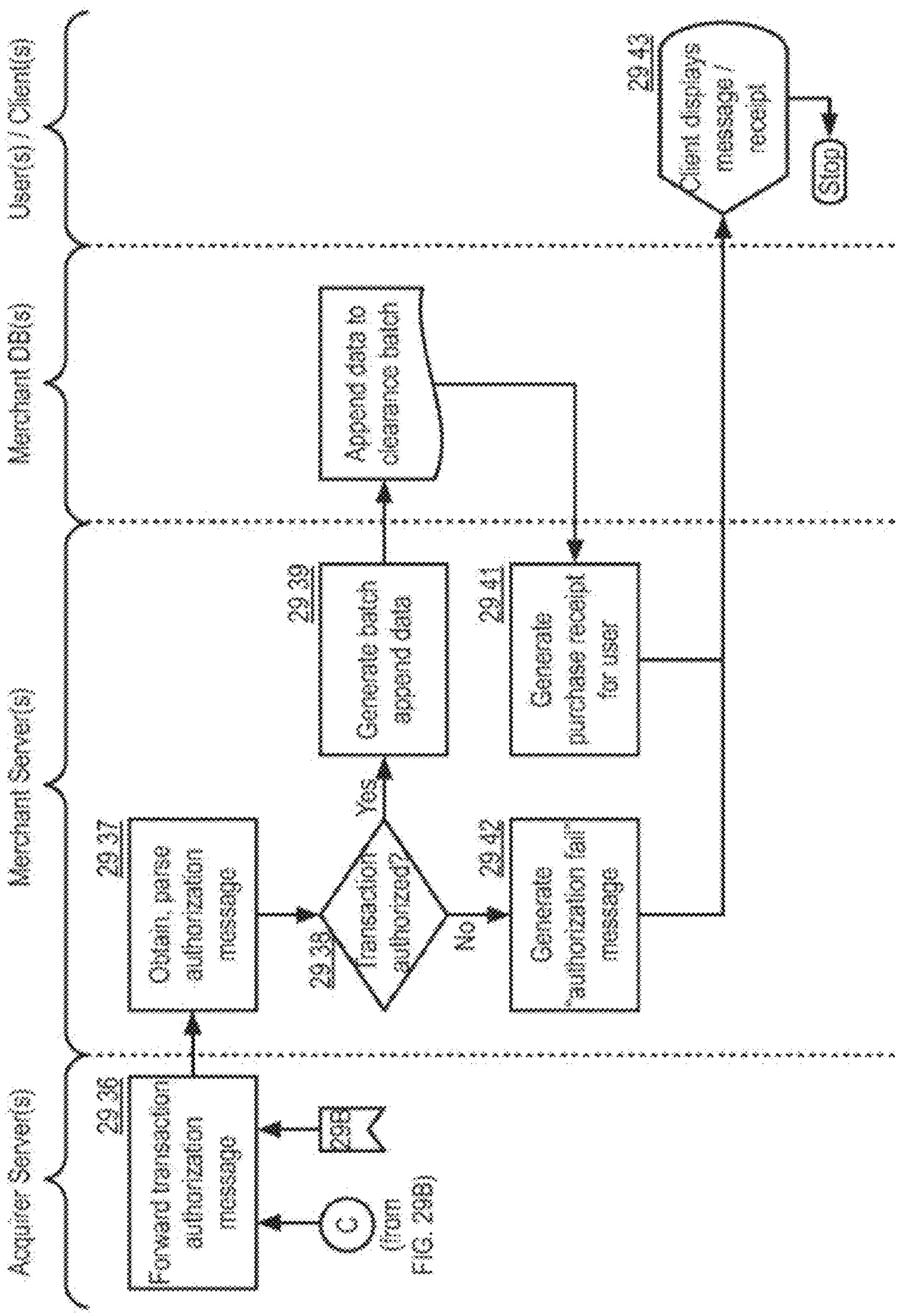
Figure 29D:
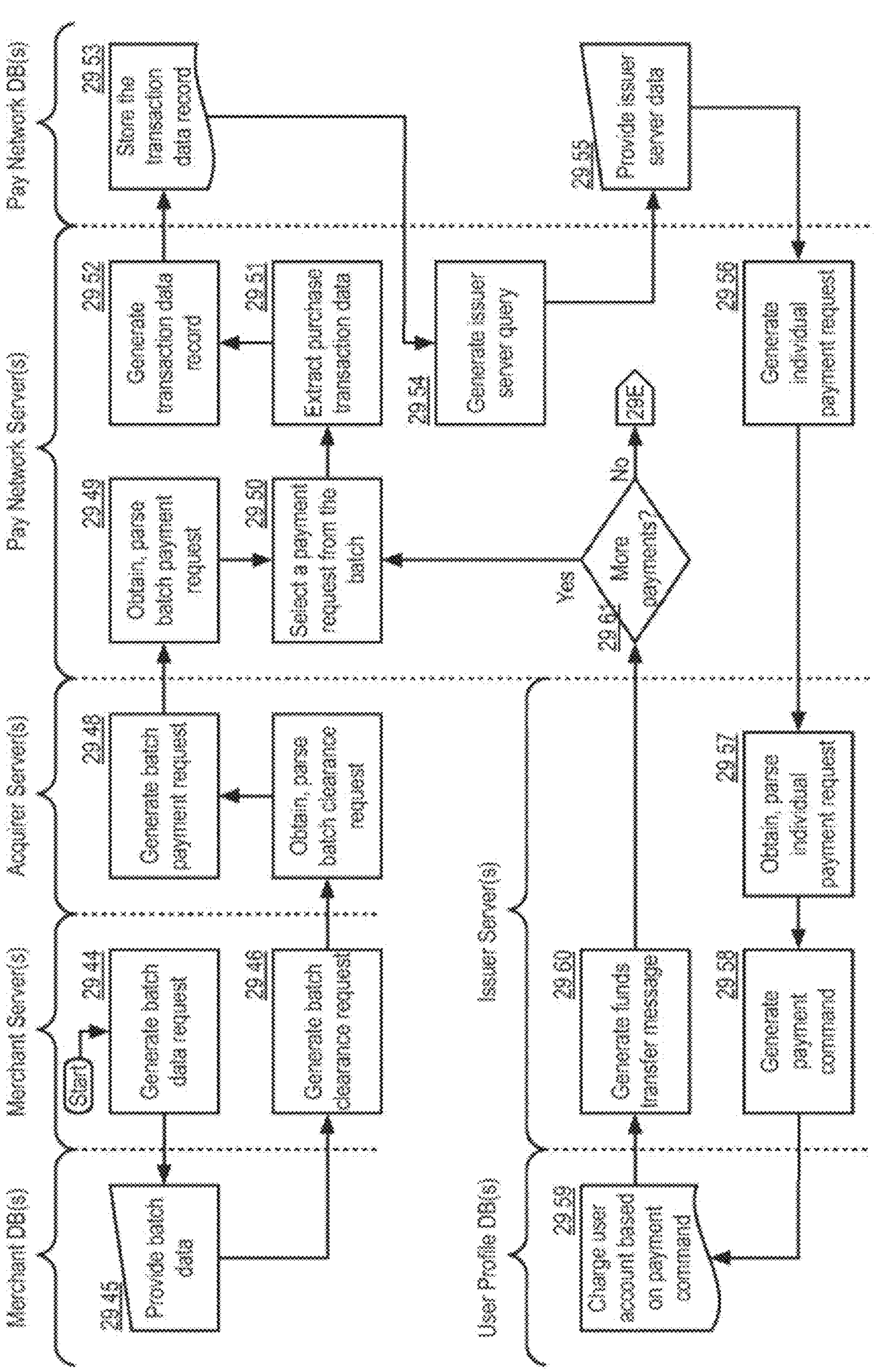
Figure 29E:
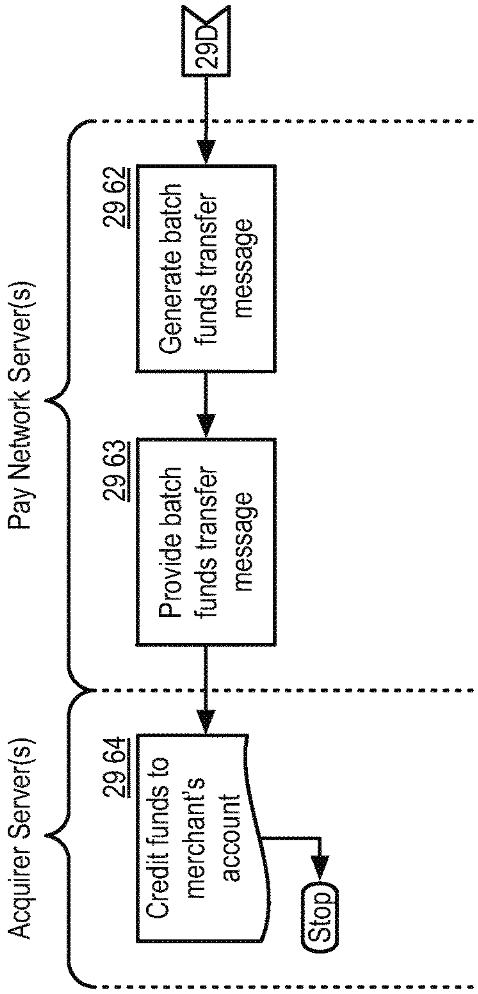

With reference to FIG. 29B, in some implementations, the pay network server may obtain the card authorization request from the acquirer server, and may parse the card authorization request to extract details of the request, e.g., 2920. Using the extracted fields and field values, the pay network server may generate a query, e.g., 2921-2422, for an issuer server corresponding to the user's card account. In response to obtaining the issuer server query the pay network database may provide, e.g., 2922, the requested issuer server data to the pay network server. In some implementations, the pay network server may utilize the issuer server data to generate a forwarding card authorization request, e.g., 2923, to redirect the card authorization request from the acquirer server to the issuer server. The pay network server may provide the card authorization request to the issuer server. In some implementations, the issuer server may parse, e.g., 2924, the card authorization request, and based on the request details may query a database, e.g., 2925, for data of the user's card account. In response, the database may provide the requested user data. On obtaining the user data, the issuer server may determine whether the user can pay for the transaction using funds available in the account, e.g., 2926. For example, the issuer server may determine whether the user has a sufficient balance remaining in the account, sufficient credit associated with the account, and/or the like, but comparing the data from the database with the transaction cost obtained from the card authorization request. If the issuer server determines that the user can pay for the transaction using the funds available in the account, the server may provide an authorization message, e.g., 2927, to the pay network server.

In some implementations, the pay network server may obtain the authorization message from steps 2928 and 2929, and parse the message to extract authorization details. Upon determining that the user possesses sufficient funds for the transaction (e.g., 2930, option "Yes"), the pay network server may extract the transaction card from the authorization message and/or card authorization request, e.g., 2933, and generate a transaction data record using the card transaction details. If not authorized, a failures threshold may be evaluated 2931 and a "transaction terminated" message may be generated 2932. If authorized, the pay network server may provide the transaction data record for storage, e.g., 2934, to a database. In some implementations, the pay network server may forward the authorization message, e.g., 2935, to the acquirer server, which may in turn forward the authorization message, e.g., 2936, to the merchant server. The merchant may obtain the authorization message, and parse the authorization message to extract its contents, e.g., 2937. The merchant server may determine whether the user possesses sufficient funds in the card account to conduct the transaction. If the merchant server determines that the user possess sufficient funds, e.g., 2938, option "Yes," the merchant server may add the record of the transaction for the user to a batch of transaction data relating to authorized transactions, e.g., 2939-2940. The merchant server may also generate a purchase receipt, e.g., 2941, for the user. If the merchant server determines that the user does not possess sufficient funds, e.g., 2938, option "No," the merchant server may generate an "authorization fail" message, e.g., 2942. The merchant server may provide the purchase receipt or the "authorization fail" message to the client. The client may render and display, e.g., 2943, the purchase receipt for the user.

In some implementations, the merchant server may initiate clearance of a batch of authorized transactions by generating a batch data request, e.g., 2944, and providing the request to a database. In response to the batch data request, the database may provide the requested batch data, e.g., 2945, to the merchant server. The server may generate a batch clearance request, e.g., 2946, using the batch data obtained from the database, and provide the batch clearance request to an acquirer server 2947. The acquirer server may generate, e.g., 2948, a batch payment request using the obtained batch clearance request, and provide the batch payment request to a pay network server. The pay network server may parse, e.g., 2949, the batch payment request, select a transaction stored within the batch data, e.g., 2950, and extract the transaction data for the transaction stored in the batch payment request, e.g., 2951. The pay network server may generate a transaction data record, e.g., 2952, and store the transaction data, e.g., 2953, the transaction in a database. For the extracted transaction, the pay network server may generate an issuer server query, e.g., 2954, for an address of an issuer server maintaining the account of the user requesting the transaction. The pay network server may provide the query to a database. In response, the database may provide the issuer server data requested by the pay network server, e.g., 2955. The pay network server may generate an individual payment request, e.g., 2956, for the transaction for which it has extracted transaction data, and provide the individual payment request to the issuer server using the issuer server data from the database.

In some implementations, the issuer server may obtain the individual payment request, and parse, e.g., 2957, the individual payment request to extract details of the request. Based on the extracted data, the issuer server may generate a payment command, e.g., 2958. For example, the issuer server may issue a command to deduct funds from the user's account (or add a charge to the user's credit card account). The issuer server may issue a payment command, e.g., 2959, to a database storing the user's account information. In response, the database may update a data record corresponding to the user's account to reflect the debit/charge made to the user's account. The issuer server may provide a funds transfer message, e.g., 2960, to the pay network server after the payment command has been executed by the database.

In some implementations, the pay network server may check whether there are additional transactions in the batch that need to be cleared and funded. If there are additional transactions, e.g., 2961, option "Yes," the pay network server may process each transaction according to the procedure described above. The pay network server may generate, e.g., 2962, an aggregated funds transfer message reflecting transfer of all transactions in the batch, and provide, e.g., 2963, the funds transfer message to the acquirer server. The acquirer server may, in response, transfer the funds specified in the funds transfer message to an account of the merchant, e.g., 2964.

Figure 30:
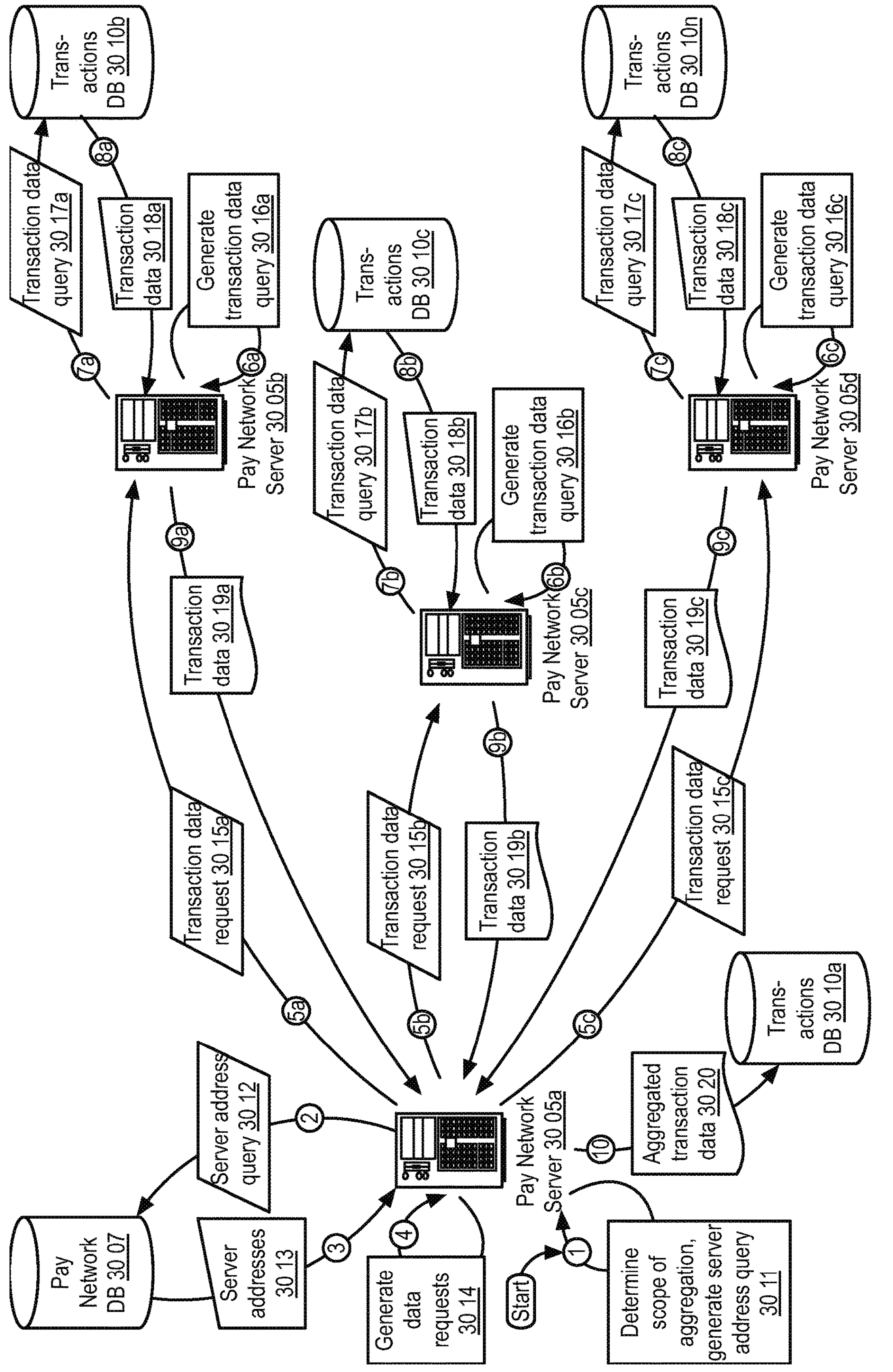
FIG. 30 shows a data flow diagram illustrating an example procedure to aggregate card-based transaction data in some embodiments of the WIP.

FIG. 30 shows a data flow diagram illustrating an example procedure to aggregate card-based transaction data in some embodiments of the WIP. In some implementations, the pay network server may determine a scope of data aggregation required to perform the analysis, e.g., 3011. The pay network server may initiate data aggregation based on the determined scope. The pay network server may generate a query for addresses of server storing transaction data within the determined scope. The pay network server may query, e.g., 3012, a pay network database, e.g., 3007, for addresses of pay network servers that may have stored transaction data within the determined scope of the data aggregation. For example, the pay network server may utilize PHP/SQL commands similar to the examples provided above. The database may provide, e.g., 3013, a list of server addresses in response to the pay network server's query. Based on the list of server addresses, the pay network server may generate transaction data requests, e.g., 3014. The pay network server may issue the generated transaction data requests, e.g., 3015*a-c*, to the other pay network servers, e.g., 3005*b-d*. The other pay network servers may query, e.g., 3017*a-c*, their pay network database, e.g., 3007, for transaction data falling within the scope of the transaction data requests. In response to the transaction data queries, the pay network databases may provide transaction data, e.g., 3018*a-c*, to the other pay network servers. The other pay network servers may return the transaction data obtained from the pay network databases, e.g., 3019*a-c*, to the pay network server making the transaction data requests, e.g., 3005*a*. The pay network server, e.g., 3005*a*, may store the aggregated transaction data, e.g., 3020, in an aggregated transactions database, e.g., 3010*a*.

FIG. 31 shows a logic flow diagram illustrating example aspects of aggregating card-based transaction data in some embodiments of the WIP, e.g., a Transaction Data Aggregation ("TDA") component 3100. In some implementations, a pay network server may obtain a trigger to aggregate transaction data, e.g., 3111. For example, the server may be configured to initiate transaction data aggregation on a regular, periodic, basis (e.g., hourly, daily, weekly, monthly, quarterly, semi-annually, annually, etc.). As another example, the server may be configured to initiate transaction data aggregation on obtaining information that the U.S. Government (e.g., Department of Commerce, Office of Management and Budget, etc) has released new statistical data related to the U.S. business economy. As another example, the server may be configured to initiate transaction data aggregation on-demand, upon obtaining a user investment strategy analysis request for processing. The pay network server may determine a scope of data aggregation required to perform the analysis, e.g., 3112. For example, the scope of data aggregation may be pre-determined. As another example, the scope of data aggregation may be determined based on a received user investment strategy analysis request. The pay network server may initiate data aggregation based on the determined scope. The pay network server may generate a query for addresses of server storing transaction data within the determined scope, e.g., 3113. The pay network server may query a database for addresses of pay network servers that may have stored transaction data within the determined scope of the data aggregation. The database may provide, e.g., 3114, a list of server addresses in response to the pay network server's query. Based on the list of server addresses, the pay network server may generate transaction data requests, e.g., 3115. The pay network server may issue the generated transaction data requests to the other pay network servers. The other pay network servers may obtain and parse the transaction data requests, e.g., 3116. Based on parsing the data requests, the other pay network servers may generate transaction data queries, e.g., 3117, and provide the transaction data queries to their pay network databases. In response to the transaction data queries, the pay network databases may provide transaction data, e.g., 3118, to the other pay network servers. The other pay network servers may return, e.g., 3119, the transaction data obtained from the pay network databases to the pay network server making the transaction data requests. The pay network server may generate aggregated transaction data records 3120 from the transaction data received from the other pay network servers, e.g., 3111, and store the aggregated transaction data in a database, e.g., 3121.

Figure 32:
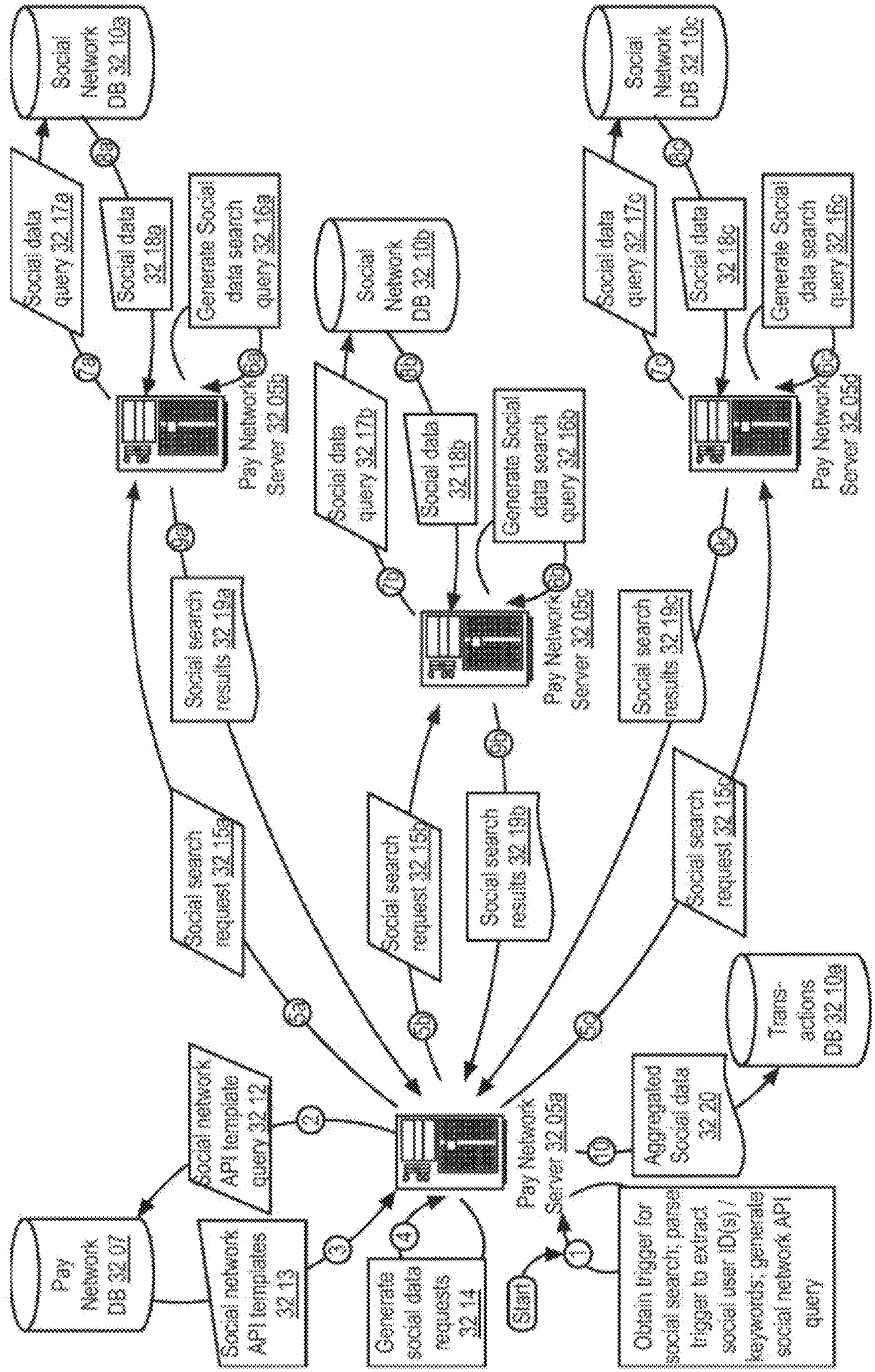
FIG. 32 shows a data flow diagram illustrating an example social data aggregation procedure in some embodiments of the WIP.

FIG. 32 shows a data flow diagram illustrating an example social data aggregation procedure in some embodiments of the WIP. In some implementations, the pay network server may obtain a trigger to perform a social data search. For example, the pay network server, 3205*a-d* may periodically perform an update of its aggregated social database, e.g., 3210, 32110*a-c* with new information available from a variety of sources, such as the social networking services operating on the Internet. As another example, a request for on-demand social data update may be obtained as a result of a user wishing to enroll in a service, for which the pay network server may facilitate data entry by providing an automated web form filling system using information about the user obtained from the social data update. In some implementations, the pay network server may parse the trigger to extract keywords using which to perform an aggregated social data update 3211. The pay network server may generate a query for application programming interface (API) templates for various social networking services (e.g., Facebook®, Twitter™, etc.) from which to collect social data for aggregation. The pay network server may query, e.g., 3212, a pay network database, e.g., 3207, for social network API templates for the social networking services. For example, the pay network server may utilize PHP/SQL commands similar to the examples provided above. The database may provide, e.g., 3213, a list of API templates in response. Based on the list of API templates, the pay network server may generate social data requests, e.g., 3214. The pay network server may issue the generated social data requests, e.g., 3215*a-c*, to the social network servers, e.g., 32*ma-c*. For example, the pay network server may issue PHP commands to request the social network servers for social data. An example listing of commands to issue social data requests 3215*a-c*, substantially in the form of PHP commands, is provided below:

```
<?PHP
header('Content-Type: text/plain');
// Obtain user ID(s) of friends of the logged-in user
$friends =
    json_decode(file_get_contents('https://graph.facebook.com/me/friends?access
    token='$cookie['oauth_access_token']), true);
```

-continued

```
$friend__ids = array__keys($friends);
// Obtain message feed associated with the profile of the logged-in user
$feed =
    json__decode(file__get__contents('https:llgraph.facebook.com/me/feed?access__tok
    en='$cookie['oauth__access__token']), true);
// Obtain messages by the user's friends
$result = mysql__query('SELECT * FROM content WHERE uid IN ('
    .implode($friend__ids, ',') . ')');
$friend__content = array( );
while ($row = mysql__fetch__assoc($result))
$friend__content [ ] $row;
?>
```

In some embodiments, the social network servers may query, e.g., 3217*a-c*, their databases, e.g., 3202*a-c*, for social data results falling within the scope of the social keywords. In response to the queries, the databases may provide social data, e.g., 3218*a-c*, to the search engine servers. The social network servers may return the social data obtained from the databases, e.g., 3219*a-c*, to the pay network server making the social data requests. An example listing of social data 3219*a-c*, substantially in the form of JavaScript Object Notation (JSON)-formatted data, is provided below:

```
[ "data":    [
             {        "name": "Tabatha Orloff",
                      "id": "483722"},
             {        "name": "Darren Kinnaman",
                      "id": "86S743"},
             {        "name": "Sharron Jutras",
                      "id": "O91274"}
] }
```

In some embodiments, the pay network server may store the aggregated search results, e.g., 3220, in an aggregated search database, e.g., 3210.

Figure 33:
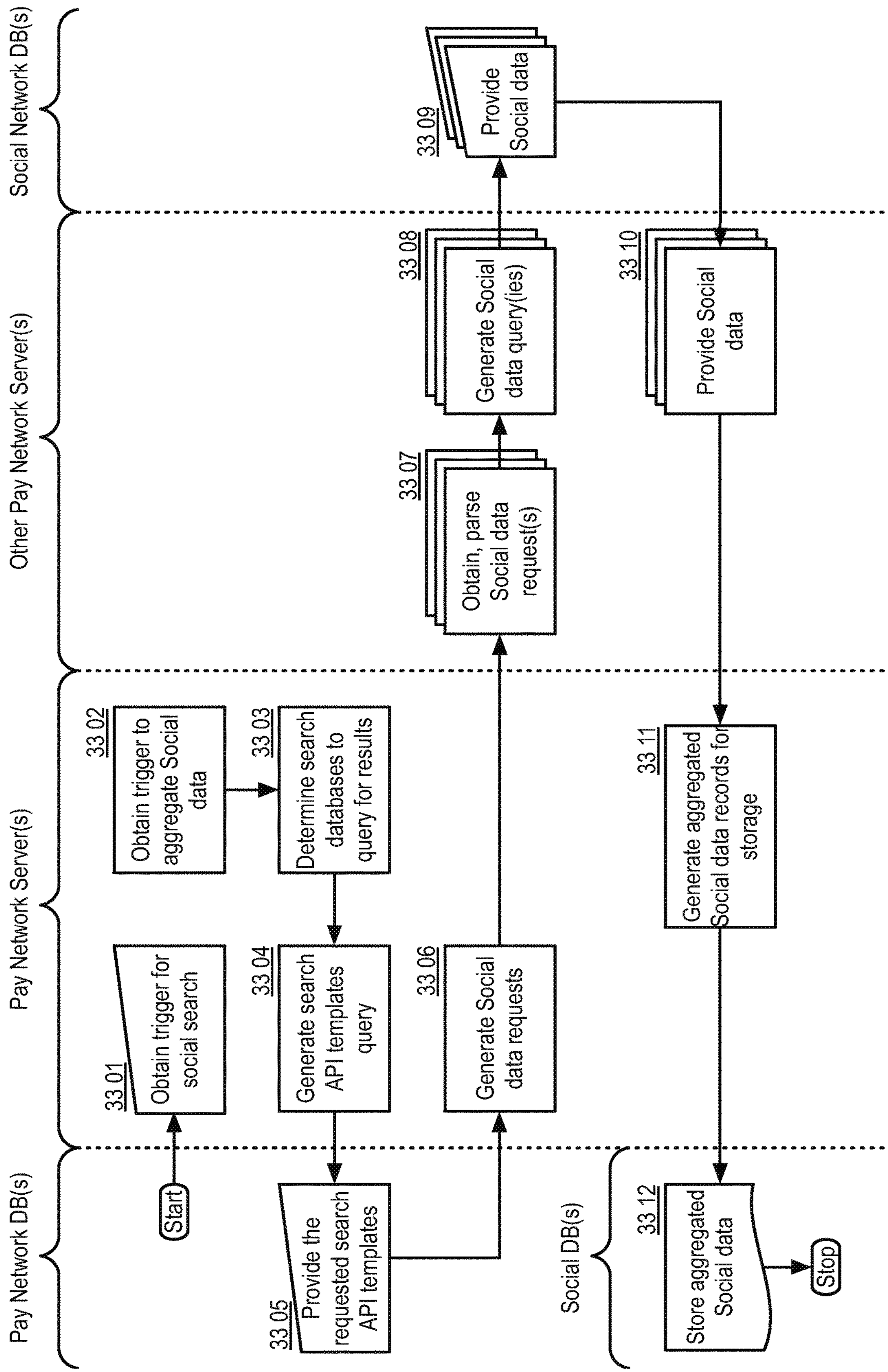
FIG. 33 shows a logic flow diagram illustrating example aspects of aggregating social data in some embodiments of the WIP, e.g., a Social Data Aggregation ("SDA") component 3300.

FIG. 33 shows a logic flow diagram illustrating example aspects of aggregating social data in some embodiments of the WIP, e.g., a Social Data Aggregation ("SDA") component 3300. In some implementations, the pay network server may obtain a trigger to perform a social search, e.g., 3301. For example, the pay network server may periodically perform an update of its aggregated social database with new information available from a variety of sources, such as the Internet. As another example, a request for on-demand social data update may be obtained as a result of a user wishing to enroll in a service, for which the pay network server may facilitate data entry by providing an automated web form filling system using information about the user obtained from the social data update. In some implementations, the pay network server may parse the trigger, e.g., 3302, to extract keywords and/or user ID(s) using which to perform an aggregated search for social data. The pay network server may determine the social networking services to search, e.g., 3303, using the extracted keywords and/or user ID(s). Then, the pay network server may generate a query for application programming interface (API) templates for the various social networking services (e.g., Facebook®, Twitter™, etc.) from which to collect social data for aggregation, e.g., 3304. The pay network server may query, e.g., 3305, a pay network database for search API templates for the social networking services. For example, the pay network server may utilize PHP/SQL commands similar to the examples provided above. The database may provide, e.g., 3305, a list of API templates in response. Based on the list of API templates, the pay network server may generate social data requests, e.g., 3306. The pay network server may issue the generated social data requests to the social networking services. The social network servers may parse the obtained search results(s), e.g., 3307, and query, e.g., 3308, their databases for social data falling within the scope of the search keywords. In response to the social data queries, the databases may provide social data, e.g., 3309, to the social networking servers. The social networking servers may return the social data obtained from the databases, e.g., 3310, to the pay network server making the social data requests. The pay network server may generate, e.g., 3311, and store the aggregated social data, e.g., 3312, in an aggregated social database.

Figure 34:
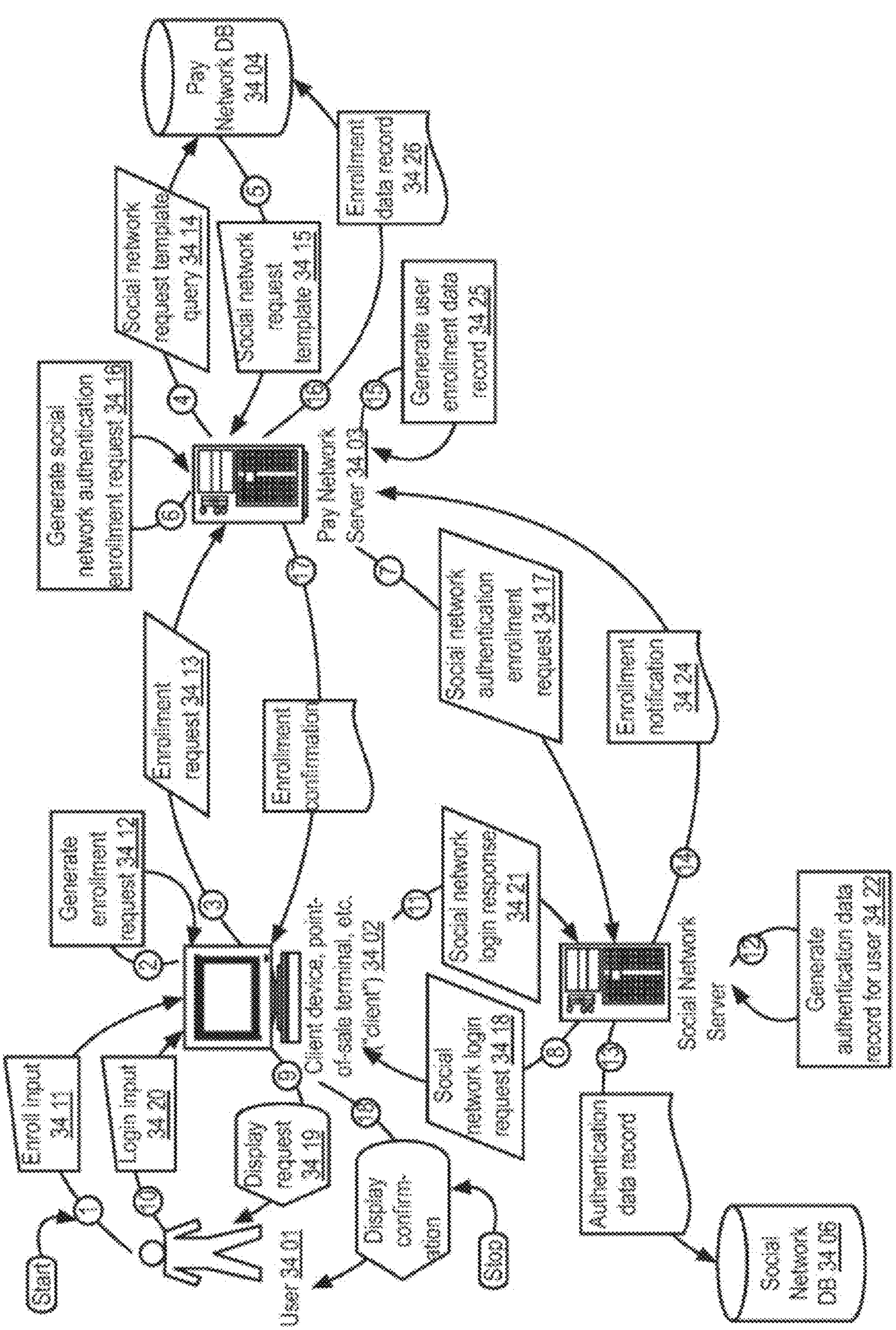
FIG. 34 shows a data flow diagram illustrating an example procedure for enrollment in value-add services in some embodiments of the WIP.

FIG. 34 shows a data flow diagram illustrating an example procedure for enrollment in value-add services in some embodiments of the WIP. In some implementations, a user, e.g., 3401, may desire to enroll in a value-added service. Let us consider an example wherein the user desires to enroll in social network authenticated purchase payment as a value-added service. It is to be understood that any other value-added service may take the place of the below-described value-added service. The user may communicate with a pay network server, e.g., 3403, via a client such as, but not limited to: a personal computer, mobile device, television, point-of-sale terminal, kiosk, ATM, and/or the like (e.g., 3402). For example, the user may provide user input, e.g., enroll input 3411, into the client indicating the user's desire to enroll in social network authenticated purchase payment. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. For example, the user may swipe a payment card at the client 3402. In some implementations, the client may obtain track 1 data from the user's card as enroll input 3411 (e.g., credit card, debit card, prepaid card, charge card, etc.), such as the example track 1 data provided below:

```
%B123456789012345^PUBLIC/J.Q.^99011200000000000000**901******?*
(wherein '123456789012345' is the card number of 'J.Q. Public' and has a CVV
    number of 901. '990112' is a service code, and *** represents decimal digits
    which change randomly each time the card is used.)
```

In some implementations, using the user's input, the client may generate an enrollment request, e.g., 3412, and provide the enrollment request, e.g., 3413, to the pay network server. For example, the client may provide a (Secure) Hypertext Transfer Protocol ("HTTP(S)") POST message including data formatted according to the eXtensible Markup Language ("XML"). Below is an example HTTP(S) POST message including an XML-formatted enrollment request for the pay network server:

```
POST /enroll.php HTTP/1.1
Host: www.merchant.com
Content-Type: Application/XML
Content-Length: 718
<?XML version = "1.0" encoding = "UTF-8"?>
<enrollment_request>
    <cart_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <!--account_params> <optional>
        <account_name>John Q. Public</account_name>
        <account_type>credit</account_type>
        <account_num>123456789012345</account_num>
        <billing_address>123 Green St., Norman, OK
        98765</billing_address>
        <phone>123-456-7809</phone>
```

-continued

```
        <sign>/jqp/</sign>
        <confirm_type>email</confirm_type>
        <contact_info>john.q.public@gmail.com</contact_info>
    </account_params-->
    <checkout_purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </checkout_purchase_details>
</enrollment_request>
```

In some implementations, the pay network server may obtain the enrollment request from the client, and extract the user's payment detail (e.g., XML data) from the enrollment request. For example, the pay network server may utilize a parser such as the example parsers described below in the discussion with reference to FIG. 61. In some implementations, the pay network server may query, e.g., 3414, a pay network database, e.g., 3404, to obtain a social network request template, e.g., 3415, to process the enrollment request. The social network request template may include instructions, data, login URL, login API call template and/or the like for facilitating social network authentication. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, e.g., 3414-2915, is provided below:

```
<?PHP
header('Content-Type: text/plain');
mysql_connect("254.93.179.112",$DBserver,$password); // access
database server
mysql_select_db("SOCIALAUTH.SQL"); // select database table to
search
//create query
$query = "SELECT template FROM EnrollTable WHERE network LIKE
'%' $socialnet";
$result = mysql_query($query); // perform the search query
mysql_close("SOCIALAUTH.SQL"); // close database access
?>
```

In some implementations, the pay network server may redirect the client to a social network server by providing a HTTP(S) REDIRECT 300 message, similar to the example below:

```
HTTP/1.1 300 Multiple Choices
Location:
    https://www.facebook.com/dialog/oauth?client_id=snpa_app_ID&redirect_uri=
    www.paynetwork.com/enroll.php
<html>
    <head><title>300 Multiple Choices</title></head>
    <body><h1>Multiple Choices</h1></body>
</html>
```

In some implementations, the pay network server may provide payment information extracted from the card authorization request to the social network server as part of a social network authentication enrollment request, e.g., 3417. For example, the pay network server may provide a HTTP (S) POST message to the social network server, similar to the example below:

```
POST /authenticate_enroll.php HTTP/1.1
Host: www.socialnet.com
Content-Type: Application/XML
Content-Length: 1306
<?XML version = "1.0" encoding = "UTF-8"?>
<authenticate_enrollment_request>
    <request_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <account_params>
        <account_name>John Q. Public</account_name>
        <account_type>credit</account_type>
        <account_num>123456789012345</account_num>
```

-continued

```
        <billing_address>123 Green St., Norman, OK
        98765</billing_address>
        <phone>123-456-7809</phone>
        <sign>/jqp/</sign>
        <confirm_type>email</confirm_type>
        <contact_info>john.q.public@gmail.com</contact_info>
    </account_params>
</authenticate_enrollment_request>
```

In some implementations, the social network server 3405 may provide a social network login request, e.g., 3418, to the client. For example, the social network server may provide a HTML input form to the client. The client may display, e.g., 3419, the login form for the user. In some implementations, the user may provide login input into the client, e.g., 3420, and the client may generate a social network login response, e.g., 3421, for the social network server. In some implementations, the social network server may authenticate the login credentials of the user, and access payment account information of the user stored within the social network 3423, e.g., in a social network database 3406. Upon authentication, the social network server may generate an authentication data record for the user, e.g., 3422, and provide an enrollment notification, e.g., 3424, to the pay network server. For example, the social network server may provide a HTTP(S) POST message similar to the example below:

```
POST /enrollnotification.php HTTP/1.1
Host: www.paynet.com
Content-Type: Application/XML
Content-Length: 1306
<?XML version = "1.0" encoding = "UTF-8"?>
<enroll_notification>
    <request_ID>4NFU4RG94</order_ID>
    <timestamp>2011-02-22 15:22:43</timestamp>
    <result>enrolled</result>
</enroll_notification>
```

Upon receiving notification of enrollment from the social network server, the pay network server may generate, e.g., 3425, a user enrollment data record, and store the enrollment data record in a pay network database, e.g., 3426, to complete enrollment. In some implementations, the enrollment data record may include the information from the enrollment notification 3424. An enrollment confirmation may be sent to the client device 3427, which may display it 3428.

Figure 35:
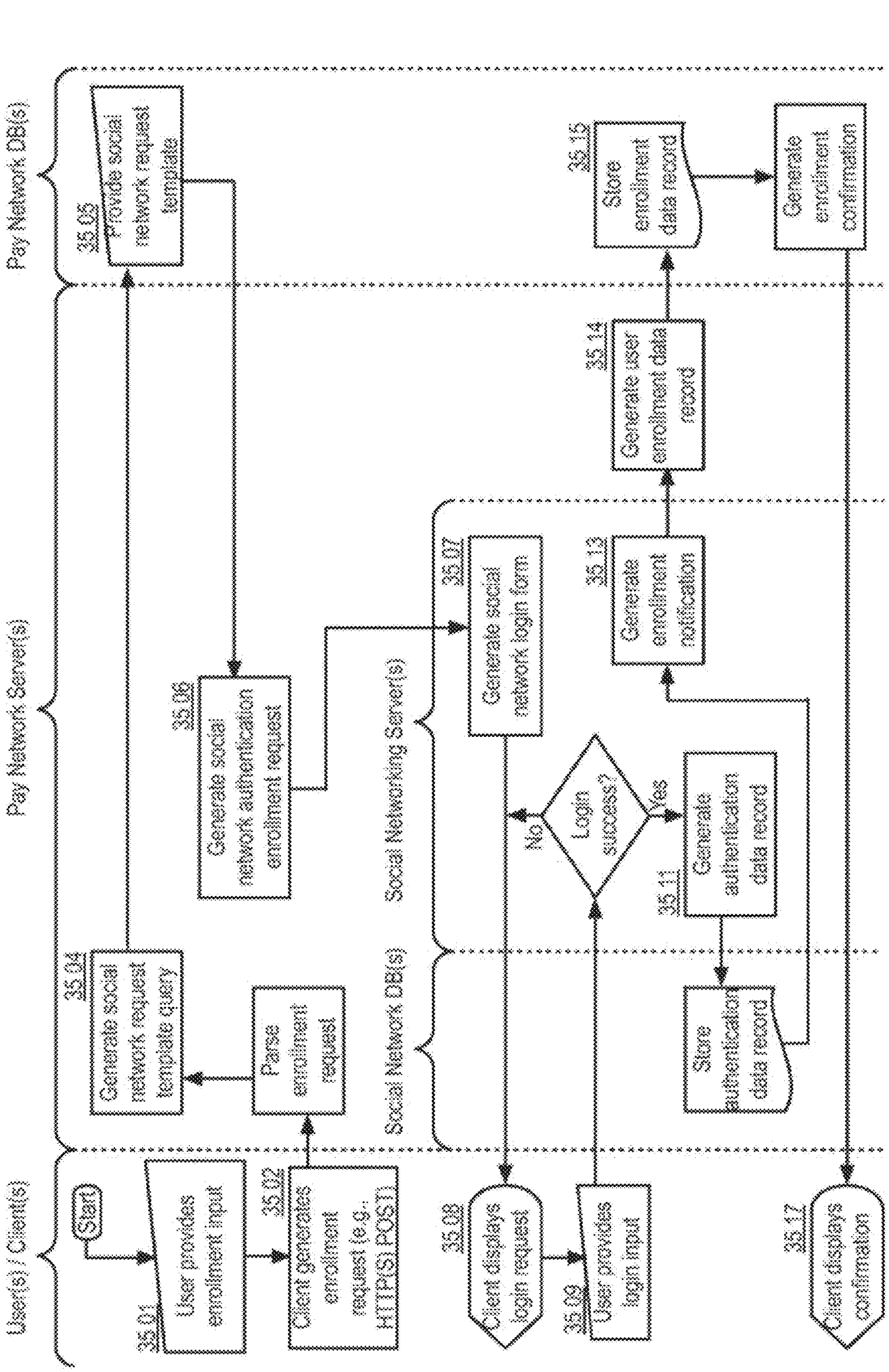
FIG. 35 shows a logic flow diagram illustrating example aspects of social network payment authentication enrollment in some embodiments of the WIP, e.g., a Value-Add Service Enrollment ("VASE") component 3500.

FIG. 35 shows a logic flow diagram illustrating example aspects of enrollment in a value-added service in some embodiments of the WIP, e.g., a Value-Add Service Enrollment ("VASE") component 3500. In some implementations, a user, e.g., 2901, may desire to enroll in a value-added service. Let us consider an example wherein the user desires to enroll in social network authenticated purchase payment as a value-added service. It is to be understood that any other value-added service may take the place of the below-described value-added service. The user may communicate with a pay network server via a client. For example, the user may provide user input, e.g., 3501, into the client indicating the user's desire to enroll in social network authenticated purchase payment. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some implementations, using the user's input, the client may generate an enrollment request, e.g., 3502, and provide the enrollment request to the pay network server. In some implementations, the SNPA may provide an enrollment button that may take the user to an enrollment webpage where account info may be entered into web form fields. In some implementations, the pay network server may obtain the enrollment request from the client, and extract the user's payment detail from the enrollment request 3503. For example, the pay network server may utilize a parser such as the example parsers described below in the discussion with reference to FIG. 61. In some implementations, the pay network server may query, e.g., 3504, a pay network database to obtain a social network request template, e.g., 3505, to process the enrollment request. The social network request template may include instructions, data, login URL, login API call template and/or the like for facilitating social network authentication. In some implementations, the pay network server may provide payment information extracted from the card authorization request to the social network server as part of a social network authentication enrollment request, e.g., 3506. In some implementations, the social network server may provide a social network login request, e.g., 3507, to the client. For example, the social network server may provide a HTML input form to the client. The client may display, e.g., 3508, the login form for the user. In some implementations, the user may provide login input into the client, e.g., 3509, and the client may generate a social network login response for the social network server. In some implementations, the social network server may authenticate the login credentials of the user, and access payment account information of the user stored within the social network, e.g., in a social network database 3510. Upon authentication, the social network server may generate and store an authentication data record for the user, e.g., 3511, 3512, and provide an enrollment notification to the pay network server, e.g., 3513. Upon receiving notification of enrollment from the social network server, the pay network server may generate, e.g., 3514, a user enrollment data record, and store the enrollment data record in a pay network database, e.g., 3515, to complete enrollment. The pay network server may provide an enrollment confirmation 3516, and provide the enrollment confirmation to the client, which may display, e.g., 3517, the confirmation for the user.

Figure 36A:
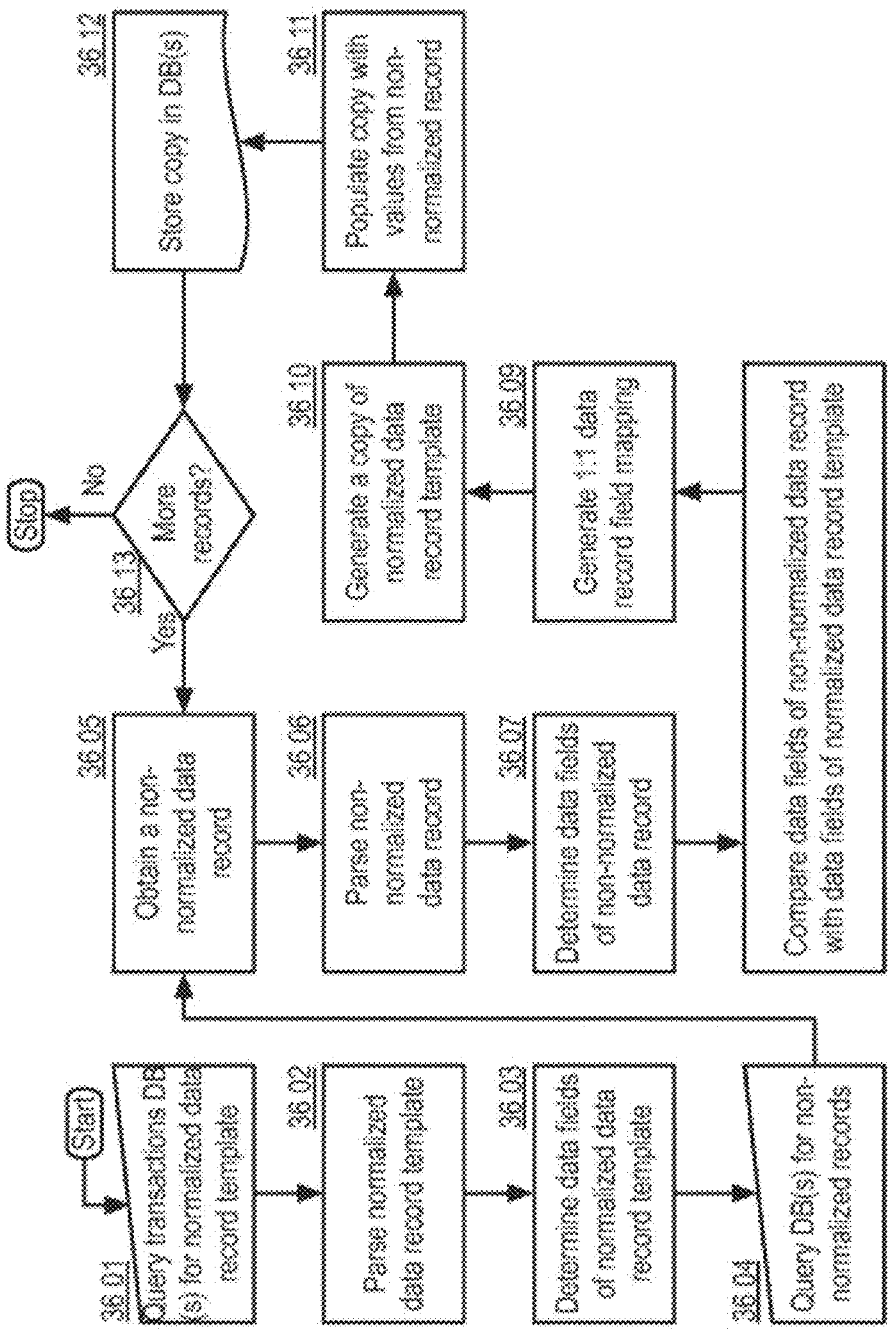
FIGS. 36A-B show flow diagrams illustrating example aspects of normalizing aggregated search, enrolled, service usage, transaction and/or other aggregated data into a standardized data format in some embodiments of the WIP, e.g., a Aggregated Data Record Normalization ("ADRN") component 3600.
Figure 36B:
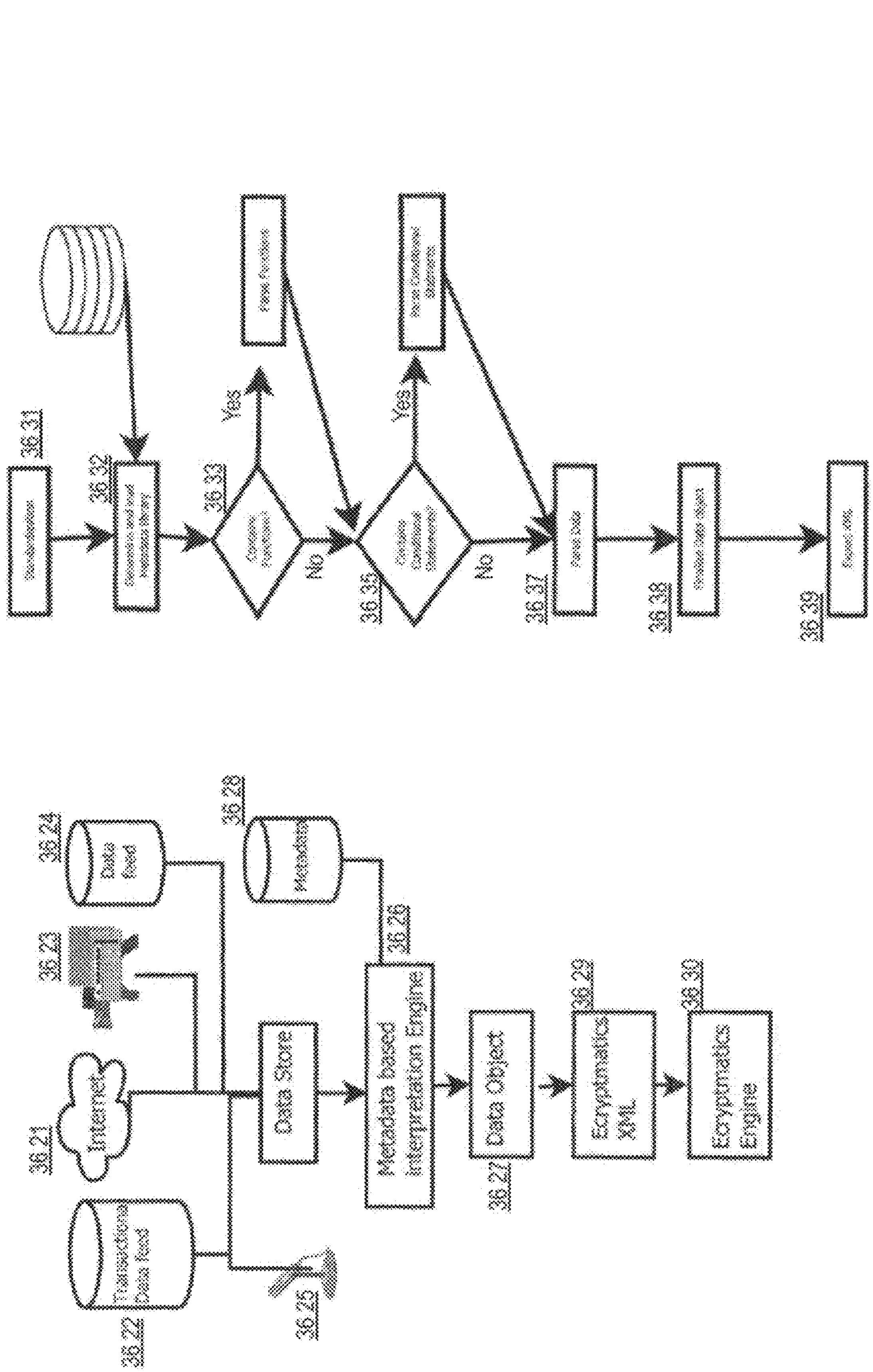

FIGS. 36A-B show flow diagrams illustrating example aspects of normalizing aggregated search, enrolled, service usage, transaction and/or other aggregated data into a standardized data format in some embodiments of the WIP, e.g., a Aggregated Data Record Normalization ("ADRN") component 3600. With reference to FIG. 36A, in some implementations, a pay network server ("server") may attempt to convert any aggregated data records stored in an aggregated records database it has access to in a normalized data format. For example, the database may have a transaction data record template with predetermined, standard fields that may store data in pre-defined formats (e.g., long integer/double float/4 digits of precision, etc.) in a pre-determined data structure. A sample XML transaction data record template is provided below:

```
<?XML version = "1.0" encoding = "UTF-8"?>
<transaction__record>
    <record__ID>00000000</record__ID>
    <norm__flag>false</norm__flag>
    <timestamp>yyyy-mm-dd hh:mm:ss</timestamp>
    <transaction__cost>$0,000,000,00</transaction__cost>
    <merchant__params>
        <merchant__id>00000000</merchant__id>
        <merchant__name>TBD</merchant__name>
        <merchant__auth__key>0000000000000000</merchant__auth__key>
    </merchant__params>
    <merchant__products>
        <num__products>000</num__products>
        <product>
            <product__type>TBD</product__type>
            <product__name>TBD</product__name>
            <class__labels__list>TBD<class__labels__list>
            <product__quantity>000</product__quantity>
            <unit__value>$0,000,000.00</unit__value>
            <sub__total>$0,000,000.00</sub__total>
            <comment>normalized transaction data record template</comment>
        </product>
    </merchant__products>
    <user__account__params>
        <account__name>JTBD</account__name>
        <account__type>TBD</account__type>
        <account__num>0000000000000000</account__num>
        <billing__line1>TBD</billing__line1>
        <billing__line2>TBD</billing__line2>
        <zipcode>TBD</zipcode>
        <state>TBD</state>
        <country>TBD</country>
        <phone>00-00-000-000-0000</phone>
        <sign>TBD</sign>
    </user__account__params>
</transaction__record>
```

In some implementations, the server may query a database for a normalized data record template, e.g., 3601. The server may parse the normalized data record template, e.g., 3602. Based on parsing the normalized data record template, the server may determine the data fields included in the normalized data record template, and the format of the data stored in the fields of the data record template, e.g., 3603. The server may obtain transaction data records for normalization. The server may query a database, e.g., 3604, for non-normalized records. For example, the server may issue PHP/SQL commands to retrieve records that do not have the 'norm_flag' field from the example template above, or those where the value of the 'norm_flag' field is 'false'. Upon obtaining the non-normalized transaction data records, the server may select one of the non-normalized transaction data records, e.g., 3605. The server may parse the non-normalized transaction data record, e.g., 3606, and determine the fields present in the non-normalized transaction data record, e.g., 3607. For example, the server may utilize a procedure similar to one described below with reference to FIG. 32. The server may compare the fields from the non-normalized transaction data record with the fields extracted from the normalized transaction data record template 3608. For example, the server may determine whether the field identifiers of fields in the non-normalized transaction data record match those of the normalized transaction data record template, (e.g., via a dictionary, thesaurus, etc.), are identical, are synonymous, are related, and/or the like. Based on the comparison, the server may generate a 1:1 mapping between fields of the non-normalized transaction data record match those of the normalized transaction data record template, e.g., 3609. The server may generate a copy of the normalized transaction data record template, e.g., 3610, and populate the fields of the template using values from the non-normalized transaction data record, e.g., 3611. The server may also change the value of the 'norm_flag' field to 'true' in the example above. The server may store the populated record in a database (for example, replacing the original version), e.g., 3612. The server may repeat the above procedure for each non-normalized transaction data record (see e.g., 3613), until all the non-normalized transaction data records have been normalized.

With reference to FIG. 36B, in some embodiments, the server may utilize metadata (e.g., easily configurable data) to drive an analytics and rule engine that may convert any structured data into a standardized XML format ("encryptmatics" XML). The encryptmatics XML may then be processed by an encryptmatics engine that is capable of parsing, transforming and analyzing data to generate decisions based on the results of the analysis. Accordingly, in some embodiments, the server may implement a metadata-based interpretation engine that parses structured data, including, but not limited to: web content (see e.g., 3621), graph databases (see e.g., 3622), micro blogs, images or software code (see e.g., 3624), and converts the structured data into commands in the encryptmatics XML file format. For example, the structured data may include, without limitation, software code, images, free text, relational database queries, graph queries, sensory inputs (see e.g., 3623, 3625), and/or the like. A metadata based interpretation engine engine, e.g., 3626, may populate a data/command object, e.g., 3627, based on a given record using configurable metadata, e.g., 3628. The configurable metadata may define an action for a given glyph or keyword contained within a data record. The engine may then process the object to export its data structure as a collection of encryptmatics vaults in a standard encryptmatics XML file format, e.g., 3629. The encryptmatics XML file may then be processed to provide various features by an encryptmatics engine, e.g., 3630.

In some embodiments, the server may obtain the structured data, and perform a standardization routine using the structured data as input (e.g., including script commands, for illustration). For example, the server may remove extra line breaks, spaces, tab spaces, etc. from the structured data, e.g. 3631. The server may determine and load a metadata library, e.g., 3632, using which the server may parse subroutines or functions within the script, based on the metadata, e.g., 3633-3634. In some embodiments, the server may pre-parse conditional statements based on the metadata, e.g., 3635-3636. The server may also parse data 3637 to populate a data/command object based on the metadata and prior parsing, e.g., 3638. Upon finalizing the data/command object, the server may export 3639 the data/command object as XML in standardized encryptmatics format.

Figure 37:
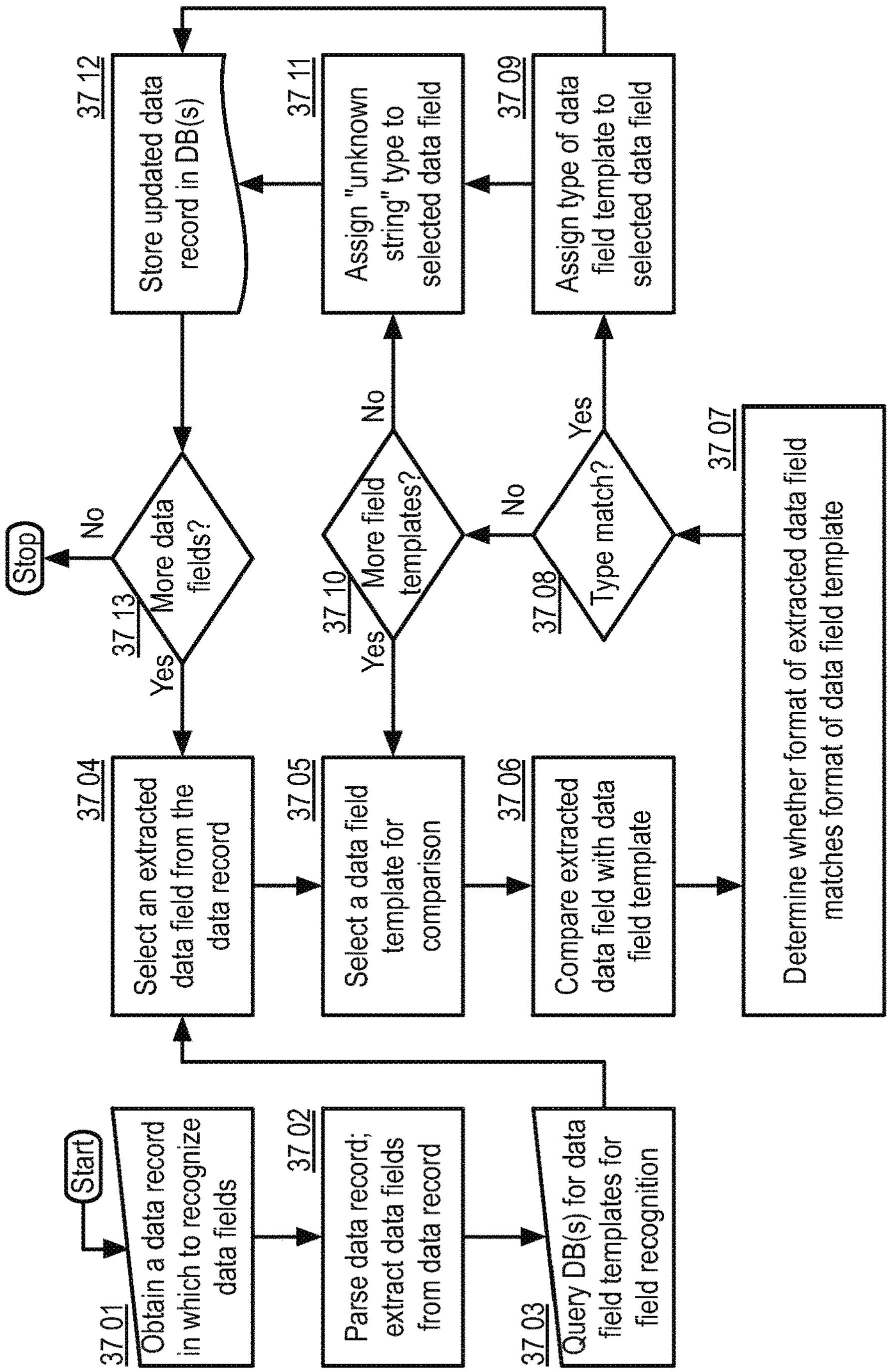
FIG. 37 shows a logic flow diagram illustrating example aspects of recognizing data fields in normalized aggregated data records in some embodiments of the WIP, e.g., a Data Field Recognition ("DFR") component 3700.

FIG. 37 shows a logic flow diagram illustrating example aspects of recognizing data fields in normalized aggregated data records in some embodiments of the WIP, e.g., a Data Field Recognition ("DFR") component 3700. In some implementations, a server may recognize the type of data fields included in a data record, e.g, date, address, zipcode, name, user ID, email address, payment account number (PAN), CVV2 numbers, and/or the like. The server may select an unprocessed data record for processing, e.g., 3701. The server may parse the data record rule, and extract data fields from the data record, e.g., 3702. The server may query a database for data field templates, e.g., 3703. For example, the server may compare the format of the fields from the data record to the data record templates to identify a match between one of the data field templates and each field within the data record, thus identifying the type of each field within the data record. The server may thus select an extracted data field from the data record, e.g., 3704. The server may select a data field template for comparison with the selected data field, e.g., 3705, and compare the data field template with the selected data field, e.g., 3706, to determine whether format of extracted data field matches format of data field template, e.g., 3707. If the format of the selected extracted data field matches the format of the data field template, e.g., 3708, option "Yes," the server may assign the type of data field template to the selected data field, e.g., 3709. If the format of the extracted data field does not match the format of the data field template, e.g., 3708, option "No," the server may try another data field template until no more data field templates are available for comparison, see e.g., 3710. If no match is found, the server may assign "unknown" string as the type of the data field, e.g., 3711. The server may store the updated data record in the database, e.g., 3712. The server may perform such data field recognition for each data field in the data record (and also for each data record in the database), see e.g., 3713.

Figure 38:
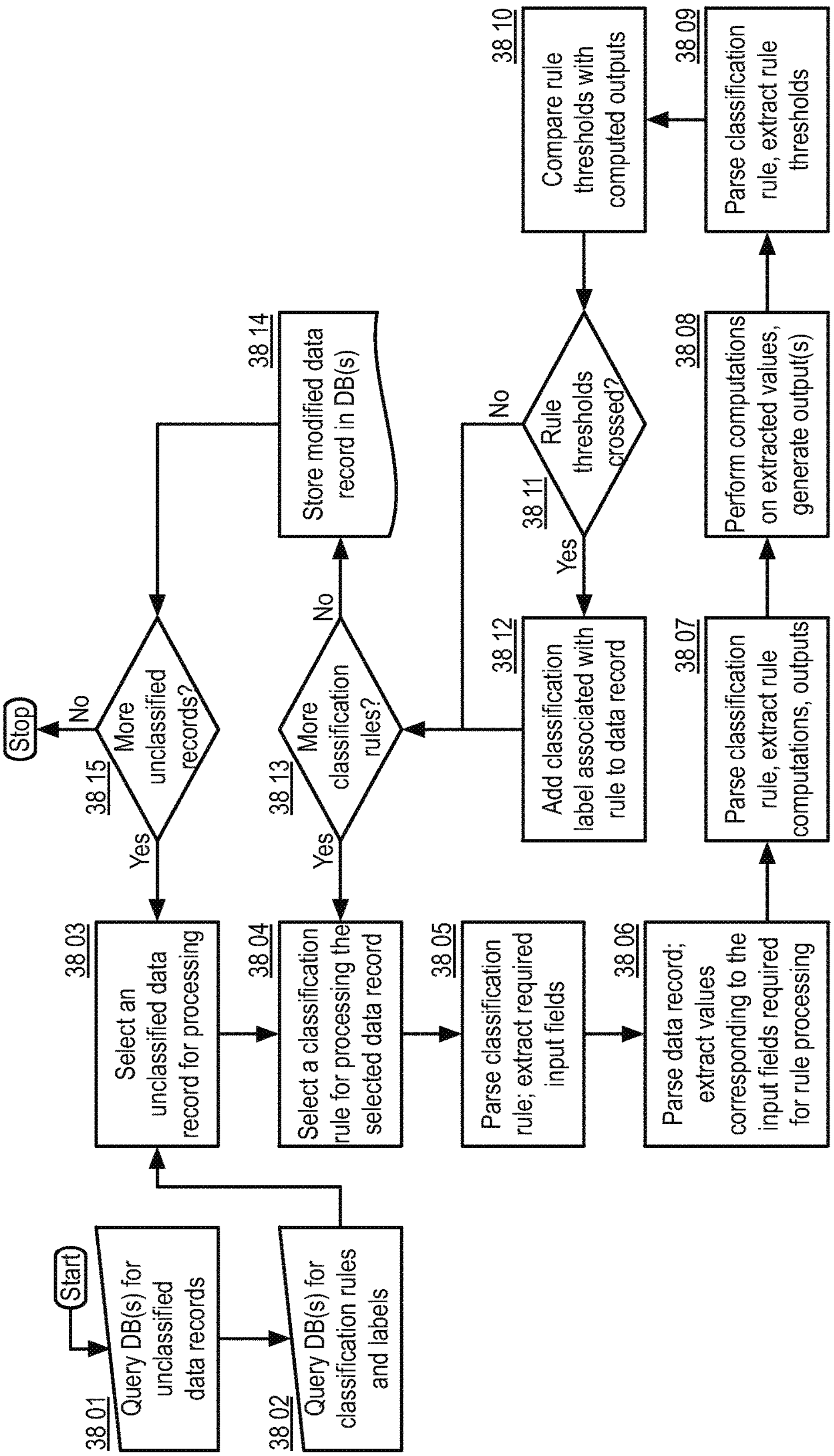
FIG. 38 shows a logic flow diagram illustrating example aspects of classifying entity types in some embodiments of the WIP, e.g., an Entity Type Classification ("ETC") component 3800.

FIG. 38 shows a logic flow diagram illustrating example aspects of classifying entity types in some embodiments of the WIP, e.g., an Entity Type Classification ("ETC") component 3800. In some implementations, a server may apply one or more classification labels to each of the data records. For example, the server may classify the data records according to entity type, according to criteria such as, but not limited to: geo-political area, number of items purchased, and/or the like. The server may obtain transactions from a database that are unclassified, e.g., 3801, and obtain rules and labels for classifying the records, e.g., 3802. For example, the database may store classification rules, such as the exemplary illustrative XML-encoded classification rule provided below:

```
<rule>
    <id>PURCHASE_44_45</id>
    <name>Number of purchasers</name>
    <inputs>num_purchasers</inputs>
    <operations>
        <1>label = 'null'</1>
        <2>IF (num_purchasers > 1) label = 'household'</2>
    </operations>
    <outputs>label</outputs>
</rule>
```

The server may select an unclassified data record for processing, e.g., 3803. The server may also select a classification rule for processing the unclassified data record, e.g., 3804. The server may parse the classification rule, and determine the inputs required for the rule, e.g., 3805. Based on parsing the classification rule, the server may parse the normalized data record template, e.g., 3806, and extract the values for the fields required to be provided as inputs to the classification rule. The server may parse the classification rule, and extract the operations to be performed on the inputs provided for the rule processing, e.g., 3807. Upon determining the operations to be performed, the server may perform the rule-specified operations on the inputs provided for the classification rule, e.g., 3808. In some implementations, the rule may provide threshold values. For example, the rule may specify that if the number of products in the transaction, total value of the transaction, average luxury rating of the products sold in the transaction, etc. may need to cross a threshold in order for the label(s) associated with the rule to be applied to the transaction data record. The server may parse the classification rule to extract any threshold values required for the rule to apply, e.g., 3809. The server may compare the computed values with the rule thresholds, e.g., 3810. If the rule threshold(s) is crossed, e.g., 3811, option "Yes," the server may apply one or more labels to the transaction data record as specified by the classification rule, e.g., 3812. For example, the server may apply a classification rule to an individual product within the transaction, and/or to the transaction as a whole. In some implementations, the server may process the transaction data record using each rule (see, e.g., 3813). Once all classification rules have been processed for the transaction record, e.g., 3813, option "No," the server may store the transaction data record in a database, e.g., 3814. The server may perform such processing for each transaction data record until all transaction data records have been classified (see, e.g., 3815).

Figure 39:
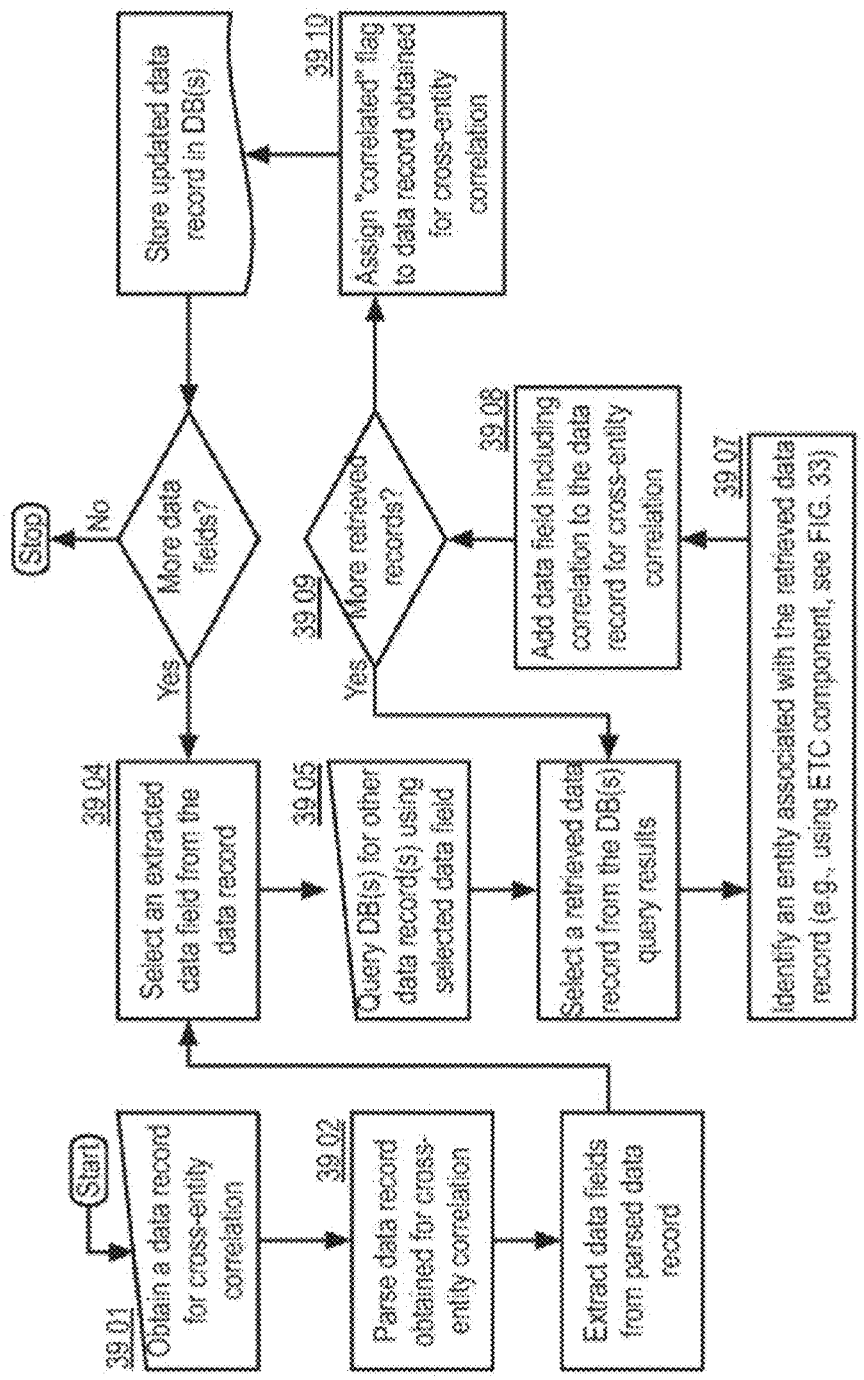
FIG. 39 shows a logic flow diagram illustrating example aspects of identifying cross-entity correlation in some embodiments of the WIP, e.g., a Cross-Entity Correlation ("CEC") component 3900.

FIG. 39 shows a logic flow diagram illustrating example aspects of identifying cross-entity correlation in some embodiments of the WIP, e.g., a Cross-Entity Correlation ("CEC") component 3900. In some implementations, a server may recognize that two entities in the WIP share common or related data fields, e.g, date, address, zipcode, name, user ID, email address, payment account number (PAN), CVV2 numbers, and/or the like, and thus identify the entities as being correlated. The server may select a data record for cross-entity correlation, e.g., 3901. The server may parse the data record rule, and extract data fields from the data record, e.g., 3902, 3903, 3403. The server may select an extracted data field from the data record, e.g., 3904, and query a database for other data records having the same data field as the extracted data field, e.g., 3905, 3906. From the list of retrieved data records from the database query, the server may select a record for further analysis. The server may identify, e.g., 3907, an entity associated with the retrieved data record, e.g., using the ETC 3300 component discussed above in the description with reference to FIG. 33.

The server may add a data field to the data record obtained for cross-entity correlation specifying the correlation to the retrieved selected data record, e.g., 3908. In some embodiments, the server may utilize each data field in the data record obtained for cross-entity correlation to identify correlated entities, see e.g., 3909. The server may add, once complete, a "correlated" flag to the data record obtained for cross-entity correlation, e.g., 3910, e.g., along with as timestamp specifying the time at which the cross-entity correlation was performed. For example, such a timestamp may be used to determine at a later time whether the data record should be processed again for cross-entity correlation. The server may store the updated data record in a database 3911 and the process can continue at 3912.

Figure 40:
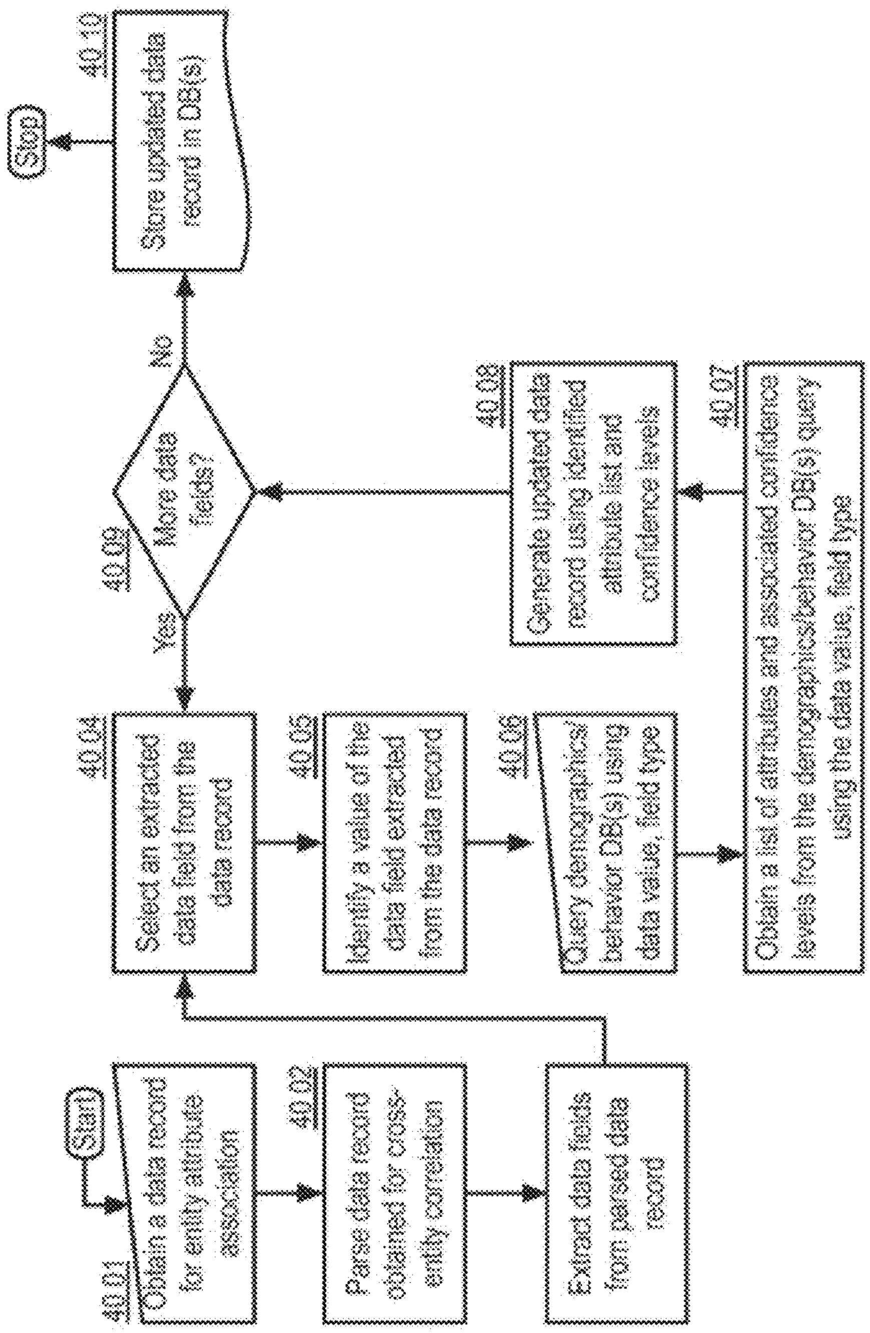
FIG. 40 shows a logic flow diagram illustrating example aspects of associating attributes to entities in some embodiments of the WIP, e.g., an Entity Attribute Association ("EAA") component 4000.
Figure 41:
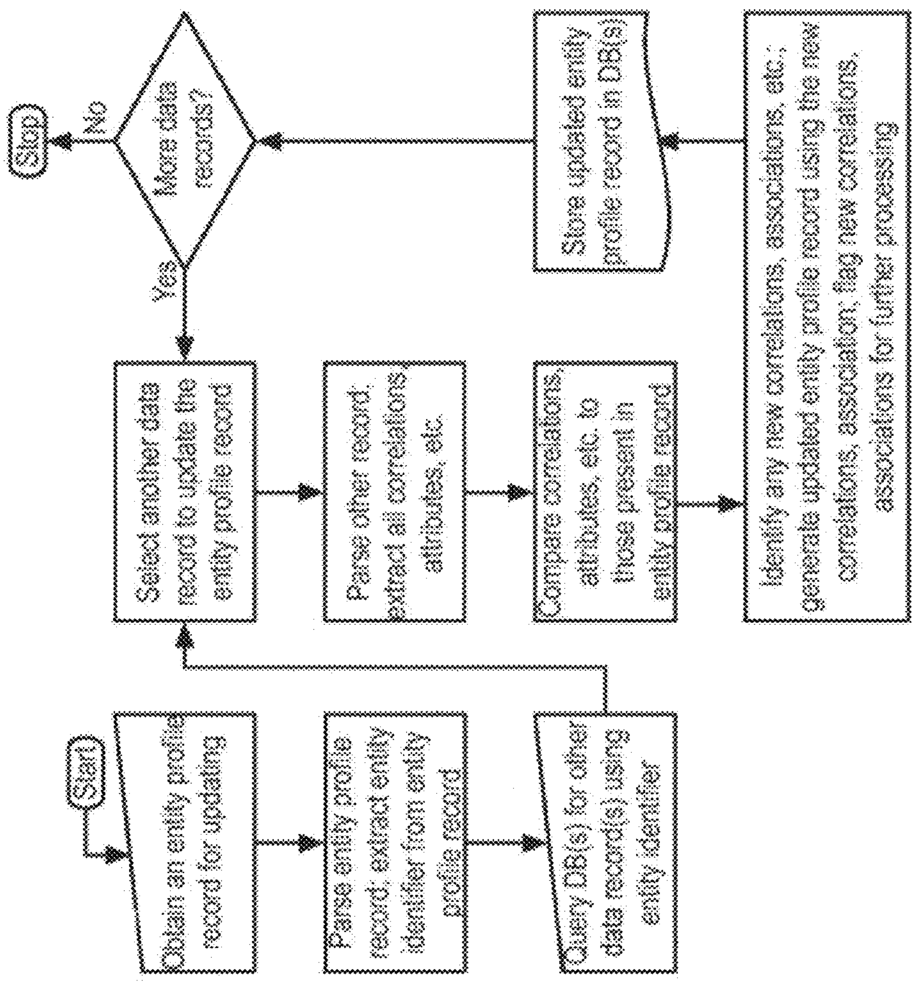

FIG. 40 shows a logic flow diagram illustrating example aspects of associating attributes to entities in some embodiments of the WIP, e.g., an Entity Attribute Association ("EAA") component 4000. In some implementations, a server may associate attributes to an entity, e.g., if the entity id a person, the server may identify a demographic (e.g., male/female), a spend character, a purchase preferences list, a merchants preference list, and/or the like, based on field values of data fields in data records that are related to the entity. In some implementations, a server may obtain a data record for entity attribute association, e.g., 4001. The server may parse the data record rule, and extract data fields from the data record, e.g., 4002-4003. The server may select an extracted data field from the data record, e.g., 4004, and identify a field value for the selected extracted data field from the data record, e.g., 4005. The server may query a database for demographic data, behavioral data, and/or the like, e.g., 4006, using the field value and field type. In response, the database may provide a list of potential attributes, as well as a confidence level in those attribute associations to the entity, see e.g., 4007. The server may add data fields to the data record obtained for entity attribute association specifying the potentially associated attributes and their associated confidence levels, e.g., 4008. In some embodiments, the server may utilize each data field in the data record obtained for cross-entity correlation to identify correlated entities, see e.g., 4009. The server may store the updated data record in a database, e.g., 4010.

Figure 41:
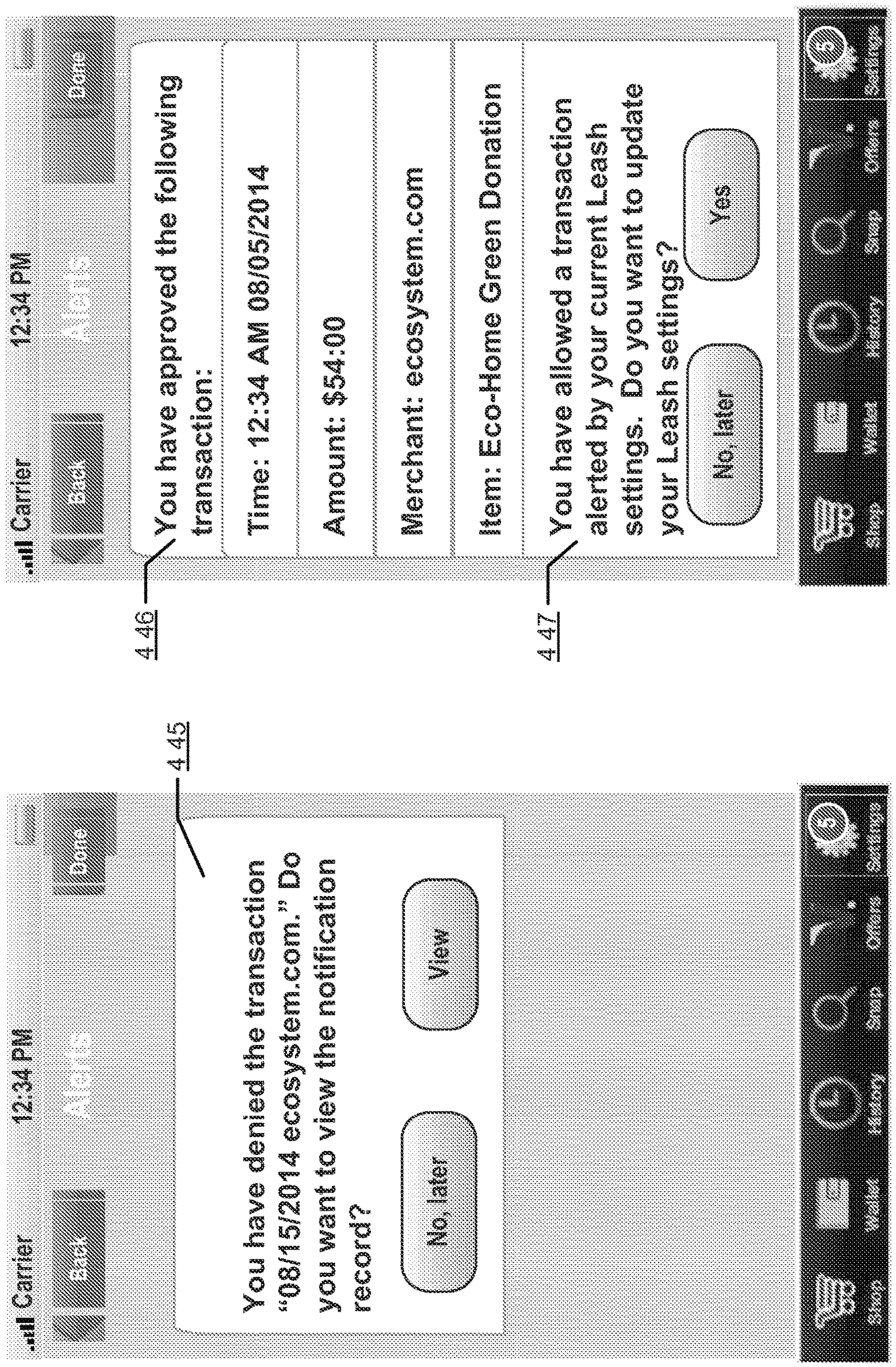
FIG. 41 shows a logic flow diagram illustrating example aspects of updating entity profile-graphs in some embodiments of the WIP, e.g., an Entity Profile-Graph Updating ("EPGU") component 4100.

FIG. 41 shows a logic flow diagram illustrating example aspects of updating entity profile-graphs in some embodiments of the WIP, e.g., an Entity Profile-Graph Updating ("EPGU") component 4100. In some implementations, a server may generate/update a profile for an entity whose data is stored within the WIP. The server may obtain an entity profile record for updating, e.g., 4111. The server may parse the entity profile record, and extract an entity identifier data field from the data record, e.g., 4112. The server may query a database for other data records that are related to the same entity, e.g., 4113, using the value for the entity identifier data field. In response, the database may provide a list of other data records for further processing. The server may select one of the other data records to update the entity profile record, e.g., 4114. The server may parse the data record, and extract all correlations, associations, and new data from the other record, e.g., 4115. The server may compare the correlations, attributes, associations, etc., from the other data record with the correlations, associations and attributes from the entity profile. Based on this comparison, the server may identify any new correlations, associations 4116, etc., and generate an updated entity profile record using the new correlations, associations; flag new correlations, associations for further processing, e.g., 4117. In some embodiments, the server may utilize each data record obtained for updating the entity profile record as well as its social graph (e.g., as given by the correlations and associations for the entity), see e.g., 4119. The server may store the updated entity profile record in a database, e.g., 4118.

Figure 42:
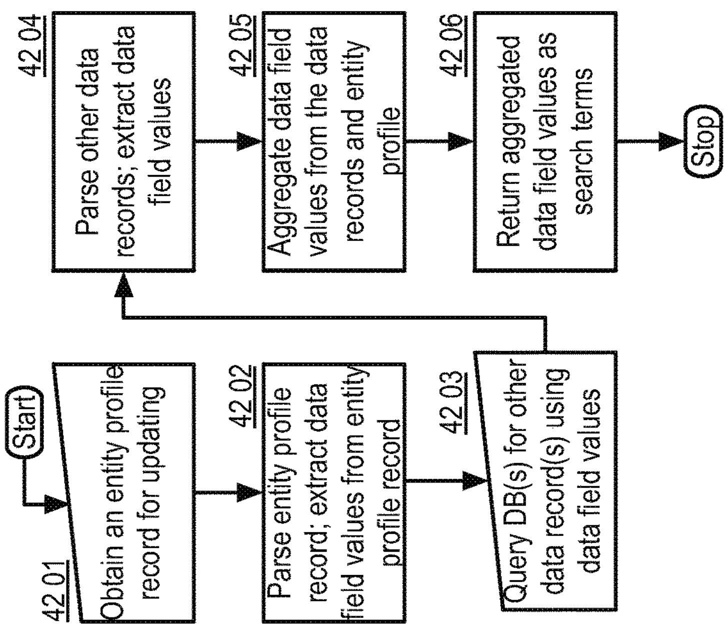
FIG. 42 shows a logic flow diagram illustrating example aspects of generating search terms for profile-graph updating in some embodiments of the WIP, e.g., a Search Term Generation ("STG") component 4200.

FIG. 42 shows a logic flow diagram illustrating example aspects of generating search terms for profile-graph updating in some embodiments of the WIP, e.g., a Search Term Generation ("STG") component 4200. In some implementations, a server may generate/update a profile for an entity whose data is stored within the WIP, by performing search for new data, e.g., across the Internet and social networking services. The server may obtain an entity profile record for updating, e.g., 4201. The server may parse the entity profile record, and extract data field types and field values from the entity profile record, e.g., 4202. The server may query a database for other data records that are related to the same entity, e.g., 4203, using the values for the extracted data fields. In response, the database may provide a list of other data records for further processing. The server may parse the data records, and extract all correlations, associations, and data from the data records, e.g., 4204. The server may aggregate all the data values from all the records and the entity profile record, e.g., 4205. Based on this, the server may return the aggregated data values as search terms to trigger search processes (see e.g., FIG. 25, 2501-2505), e.g., 4206.

Figure 43:
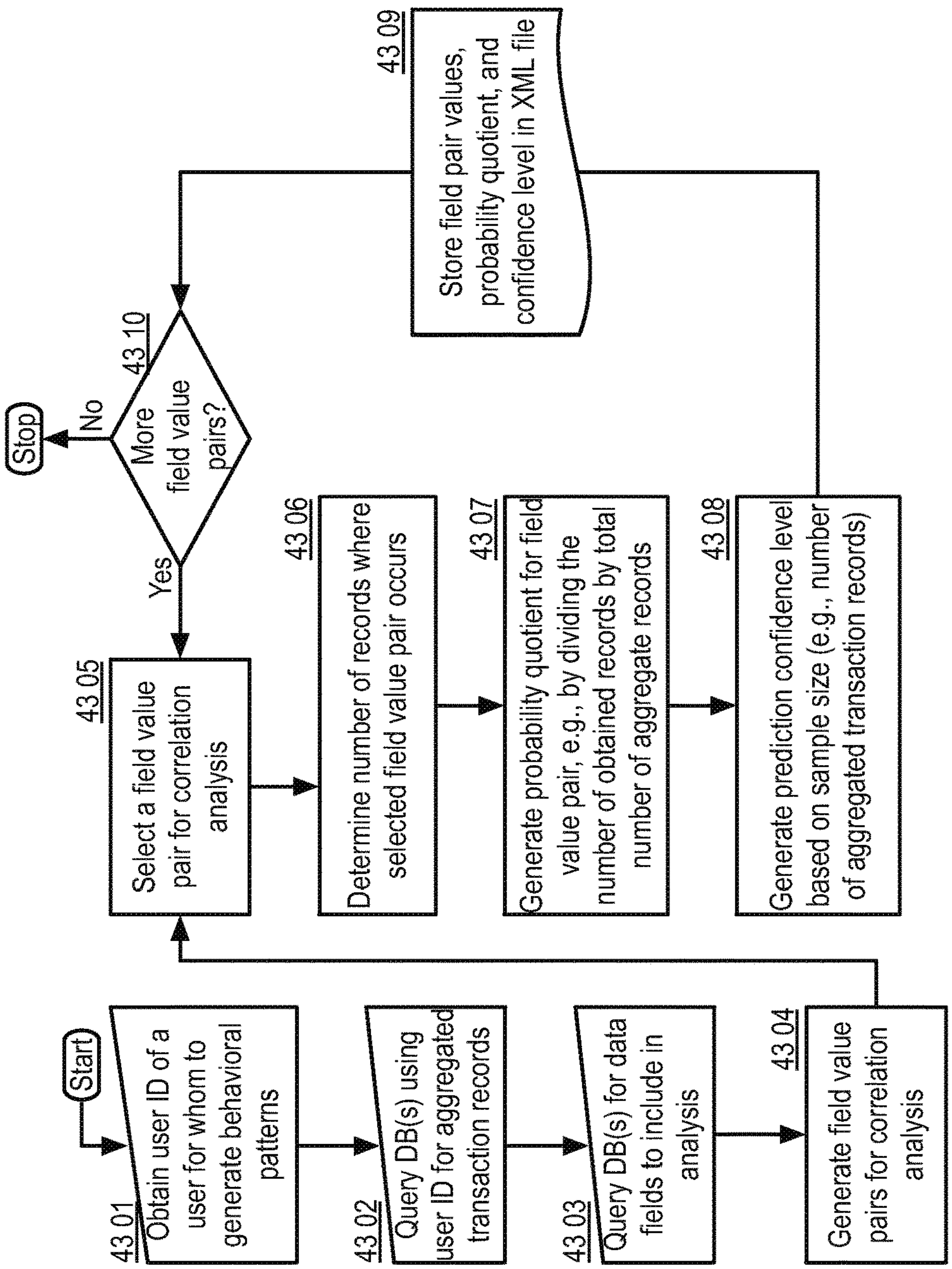
FIG. 43 shows a logic flow diagram illustrating example aspects of analyzing a user's behavior based on aggregated purchase transaction data in some embodiments of the WIP, e.g., a User Behavior Analysis ("UBA") component 4300.

FIG. 43 shows a logic flow diagram illustrating example aspects of analyzing a user's behavior based on aggregated purchase transaction data in some embodiments of the WIP, e.g., a User Behavior Analysis ("UBA") component 4300. In some implementations, a pay network server ("server") may obtain a user ID of a user for whom the server is required to generate user behavioral patterns, e.g., 4301. The server may query a database, e.g., a pay network database, for aggregated card transaction data records of the user, e.g., 4302. The server may also query, e.g., 4303, the pay network database for all possible field value that can be taken by each of the field values (e.g., AM/PM, zipcode, merchant_ID, merchant_name, transaction cost brackets, etc.). Using the field values of all the fields in the transaction data records, the server may generate field value pairs, for performing a correlation analysis on the field value pairs, e.g., 4304. An example field value pair is: 'time' is 'AM' and 'merchant' is 'Walmart'. The server may then generate probability estimates for each field value pair occurring in the aggregated transaction data records. For example, the server may select a field value pair, e.g., 4305. The server may determine the number of records within the aggregated transaction data records where the field value pair occurs, e.g., 4306. The server may then calculate a probability quotient for the field value pair by dividing the number determined for the occurrences of the field value pair by the total number of aggregate transaction data records, e.g., 4307. The server may also assign a confidence level for the probability quotient based on the sample size, e.g., total number of records in the aggregated transaction data records, e.g., 4308. The server may generate and store an XML snippet, including the field value pair, the probability quotient, and the confidence level associated with the probability quotient, e.g., 4309. The server may perform such a computation for each field value pair (see 4310) generated in 4304.

Figure 44:
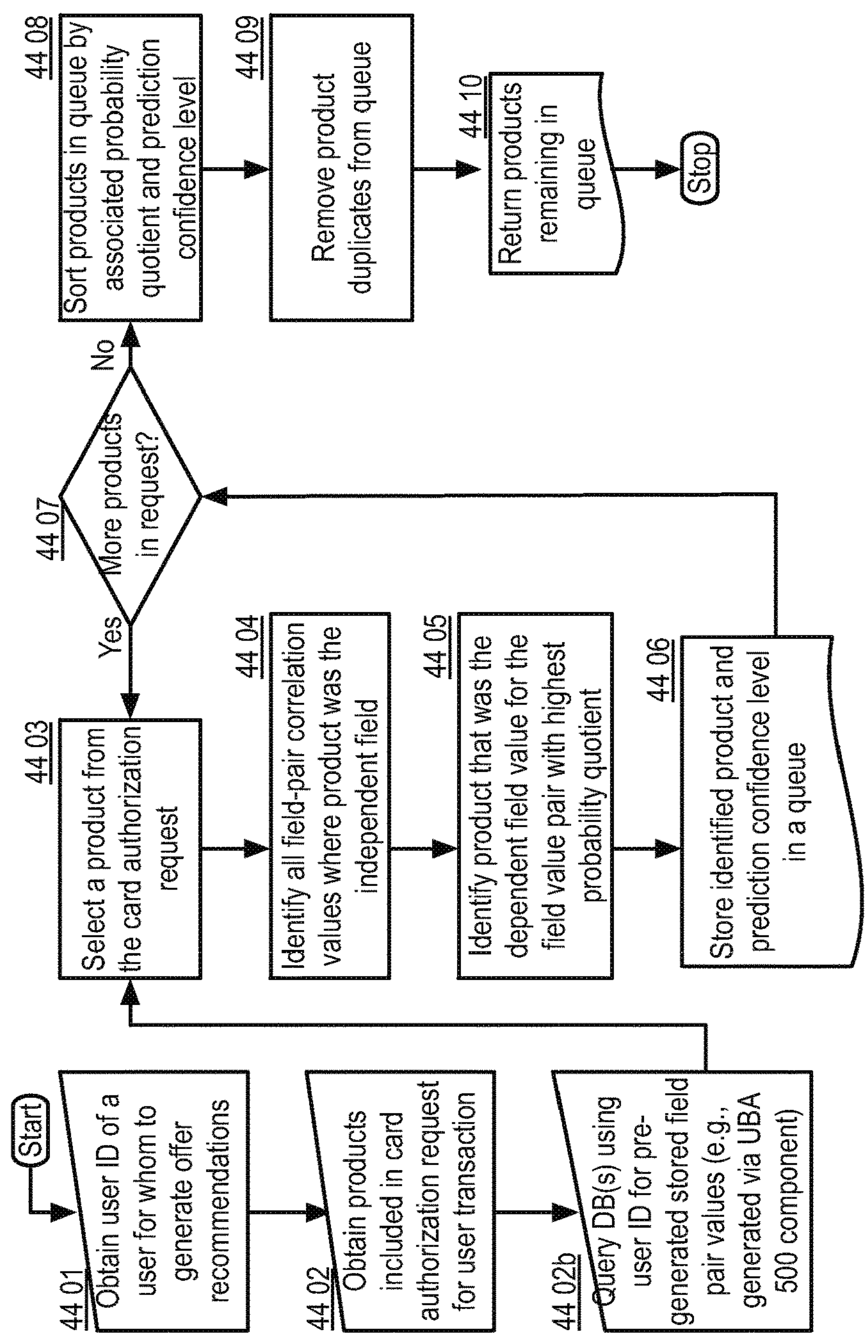
FIG. 44 shows a logic flow diagram illustrating example aspects of generating recommendations for a user based on the user's prior aggregate purchase transaction behavior in some embodiments of the WIP, e.g., a User Behavior-Based Offer Recommendations ("UBOR") component 4400.

FIG. 44 shows a logic flow diagram illustrating example aspects of generating recommendations for a user based on the user's prior aggregate purchase transaction behavior in some embodiments of the WIP, e.g., a User Behavior-Based Offer Recommendations ("UBOR") component 4400. In some implementations, a pay network server ("server") may obtain a user ID of a user for whom the server is required to generate offer recommendations, e.g., 4401. The server may obtain a list of products included in a card authorization request for processing the purchase transaction for the user, e.g., 4402. The server may also query a database for pre-generated pair-wise correlations of various user transaction-related variables, e.g., 4402*b*, such as those generated by the UBA 3800 component described above with reference to FIG. 38. The server may select a product from the list of products included in the card authorization request, e.g., 4403. The server may identify all field pair-correlation values where the selected product was the independent field into the field-pair correlation, e.g., 4404. The server may, e.g., 4405, from among the identified field-pair values, identify the product that was the dependent field value for the field value pair having the highest probability quotient (e.g., product most likely to be bought together with the product selected from the product list included in the card authorization request). The server may store the identified product, along with its associated prediction confidence level, in a queue of products for recommendation, e.g., 4406. The server may perform the analysis for each product included in the product list from the card authorization request, see e.g., 4407.

In some implementations, upon completing such an analysis for all the products in the card authorization request, the server may sort the queue according to their associated probability quotient and prediction confidence level, e.g., 4408. For example, if the prediction confidence level of a product is higher than a threshold, then it may be retained in the queue, but not if the prediction confidence level is lower than the threshold. Also, the retained products may be sorted in descending order of their associated probability quotients. In some implementations, the server may eliminate any duplicated products form the queue, e.g., 4409. The server may return the sorted queue of products for product offer recommendation, e.g., 4410.

Figure 45:
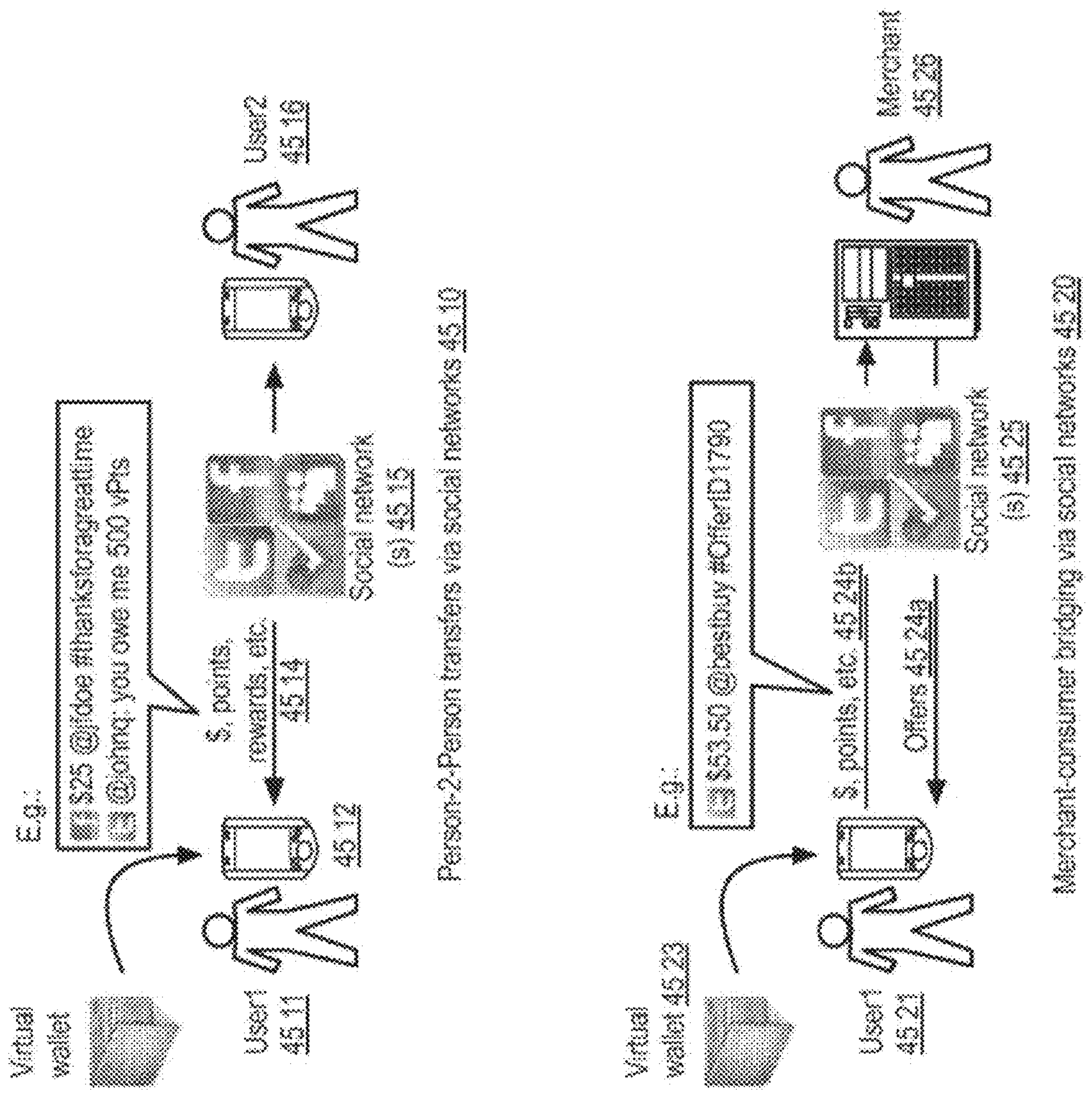
FIG. 45 shows a block diagram illustrating example aspects of payment transactions via social networks in some embodiments of the WIP.

FIG. 45 shows a block diagram illustrating example aspects of payment transactions via social networks in some embodiments of the WIP. In some embodiments, the WIP may facilitate per-2-person transfers 4510 of money via social networks. For example, a user (user1 4511) may wish to provide funds (dollars, rewards, points, miles, etc. 4514) to another user (user2 4516). The user may utilize a virtual wallet 4513 to provide a source of funds. In some embodiments, the user may utilize a device 4512 (such as a smartphone, mobile device, laptop computer, desktop computer, and/or the like) to send a social post message via the social network 4515. In some embodiments, the social post message may include information on an amount of funds to be transferred and an identity of another user to whom the funds should be transferred. The WIP may intercept the message before it is sent to the social networking service, or it may obtain the message from the social networking service. Using the social post message, the WIP may resolve the identities of a payor and payee in the transaction. The WIP may identify accounts of the payor and payee to/from which funds need be credited or debited, and an amount of credit/debit to apply to each of the accounts. The WIP may, on the basis of resolving this information, execute a transaction to transfer funds from the payor to the payee. For example, the WIP may allow a payor, by sending a tweet on Twitter™ such as "$25 @jfdoe #ackpls" to transfer funds to a payee (user ID jfdoe), and request an acknowledgement from WIP of receipt of funds. In another example, the WIP may allow a potential payee to request funds from another user by sending a tweet on Twitter™ such as "@johnq, you owe me 50000 Visa rewards points #id1234"; the WIP may automatically provide an alert within a virtual wallet application of the user with user ID johnq to provide the funds to the potential payee user. The user johnq may respond by sending a tweet in response, referencing the id (#id1234), such as "50000 vpts @jfdoe #id1234"; the WIP may transfer the funds and recognize transaction request #id1234 as being fulfilled. In some embodiments, the WIP may generate transaction/request ID numbers for the users to prevent coinciding transaction/request ID numbers for different transaction/requests.

In some embodiments, the WIP may utilize one or more social networking services (e.g., Facebook®, Twitter™, MySpace™, etc.). In some embodiments, the WIP may allow users across different social networks to transact with each other. For example, a user may make a request for payment on one social network. As an example, a Twitter™ user may tweet "@johnq@facebook.com, you owe me 500 vpts #ID7890"). The WIP may provide an alert to the user with ID johnq@facebook.com either via the other social networking or via the user's virtual wallet. In response, the payee may social post to Facebook® a message "@jfdoe: here's your 500 vpts #ID7890", and the WIP may facilitate the payment transaction and provide a receipt/acknowledgment to the two users on their respective social networks or virtual wallets.

In some embodiments, the WIP may facilitate transfers of funds to more than one payee by a payor via a single social post message. In some embodiments, the WIP may facilitate use of more than one source of funds of a payee to fund payment of funds to one or more payors via a single post message. For example, the WIP may utilize default settings or customized rules, stored within a virtual wallet of a payor, to determine which funding sources to utilize to fund a payment transaction to one or more payees via a social post message.

In some implementations, the WIP may facilitate merchants to make offers of products and/or services to consumers via social networks 4520. For example, a merchant 4526 may sign up to participate in the WIP. The WIP may aggregate transactions of a user, and determine any products or services that may relevant for offering to the user. The WIP may determine whether any participating merchants are available to provide the products or services for the users. If so, the WIP may provide social post messages via a social network 4525 on behalf of the merchants (or, alternatively, inform the merchants who may then send social post messages to the users) providing the offers 4524*a* to the user 4521 (operating device 4522). An example of an offer to the followers of a merchant on may be "@amazon offers the new Kindle™ at only $149.99—click here to buy." In such an example, the offer posted on the social networking site may have a link embedded (e.g., "here") that users can click to make the purchase (which may be automatically performed with one-click if they are currently logged into their virtual wallet accounts 4523). Another example of a merchant offer may be "@amazon offers the new Kindle™ at only $149.99— reply with #offerID123456 to buy." In such an example, the hash tag value serves as an identifier of the offer, which the users can reference when making their purchase via their social post messages (e.g., "buy from @amazon #offerID123456"). In some embodiments, merchants may provide two or more offers via a single social post message. In some embodiments, users may reference two or more offers in the same social post message.

In some implementations, users and/or merchants may utilize alternate messaging modes. For example, a user may be able to utilize electronic mail, SMS messages, phone calls, etc., to communicate with the WIP and the social networks. For example, a merchant may provide a social post message offer such as "“@amazon offers the new Kindle™ at only $149.99— text #offerID123456 to buy”. When a user utilize a mobile phone to send a text message to redeem the offer, the WIP may utilize a user profile of the user store on the social networking service to identify an identifying attribute of the user's mobile phone (e.g., a phone number), using which the WIP may correlate the text message to a particular user. Thus, the WIP may be able to process a transaction with the merchant on behalf of the user, using user information from the user's virtual wallet. In some embodiments where a social network is incapable of handling a particular mode of communication, the WIP may serve as an intermediary translator to convert the message to a form that can be utilized by the social network.

Figure 46:
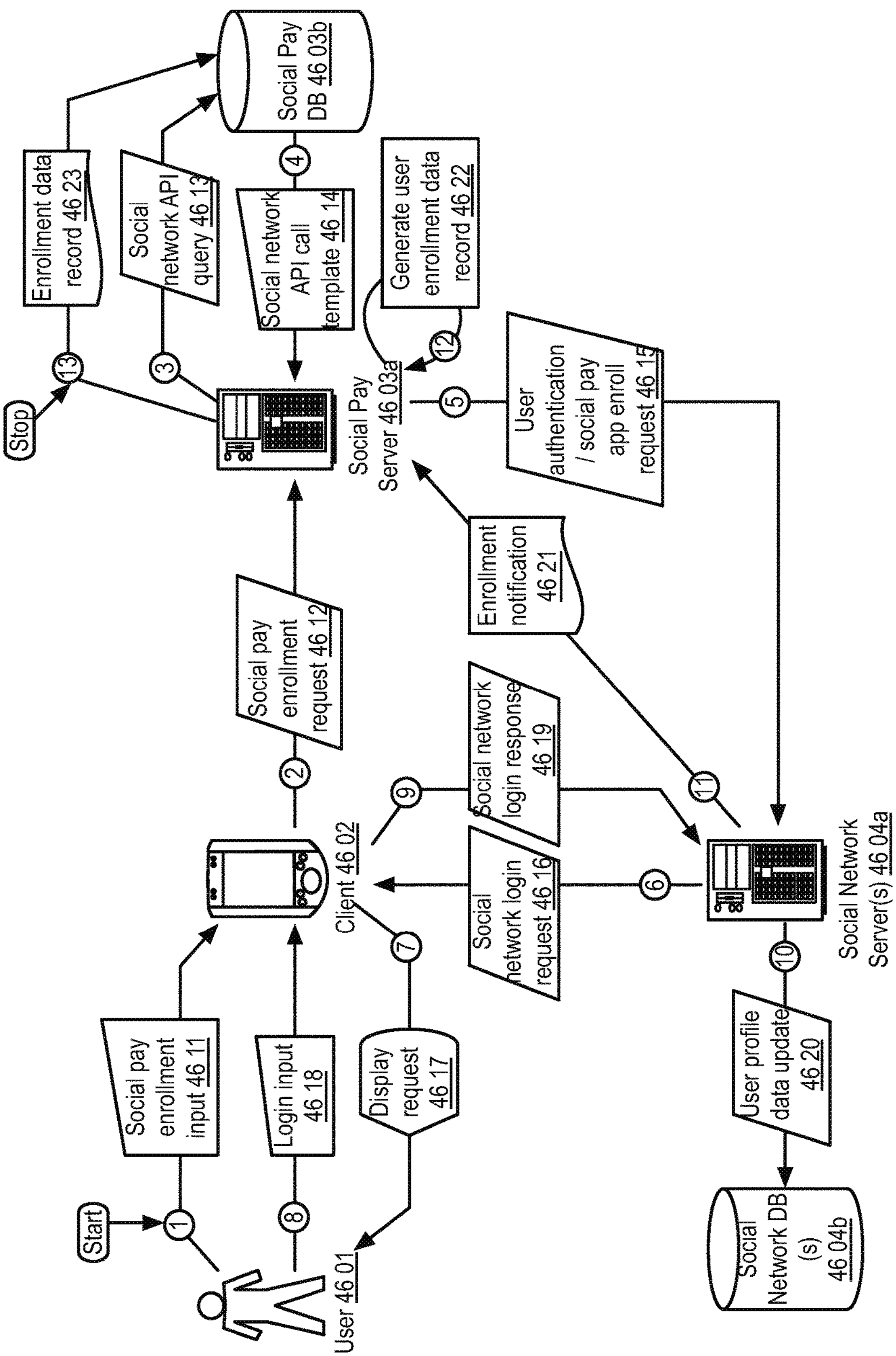
FIG. 46 shows a data flow diagram illustrating an example social pay enrollment procedure in some embodiments of the WIP.

FIG. 46 shows a data flow diagram illustrating an example social pay enrollment procedure in some embodiments of the WIP. In some embodiments, a user, e.g., 4601, may desire to enroll in WIP. The user may communicate with a social pay server, e.g., 4603*a*, via a client such as, but not limited to: a personal computer, mobile device, television, point-of-sale terminal, kiosk, ATM, and/or the like (e.g., 4602). For example, the user may provide user input, e.g., social pay enrollment input 4611, into the client indicating the user's desire to enroll in social network authenticated purchase payment. In various implementations, the user input may include, but not be limited to: a single tap (e.g., a one-tap mobile app purchasing embodiment) of a touch-screen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like.

In some implementations, using the user's input, the client may generate a social pay enrollment request, e.g., 4612, and provide the enrollment request to the social pay server 4603*a*. For example, the client may provide a (Secure) Hypertext Transfer Protocol ("HTTP(S)") POST message including data formatted according to the eXtensible Markup Language ("XML"). Below is an example HTTP(S) POST message including an XML-formatted enrollment request for the social pay server:

```
POST /enroll.php HTTP/1.1
Host: www.socialpay.com
Content-Type: Application/XML
Content-Length: 484
<?XML version = “1.0” encoding = “UTF-8”?>
<enrollment_request>
    <request_ID>4NFU4RG94</request_ID>
    <timestamp>2011-02-22 15:22:43</timestamp>
    <user_ID>john.q.public@facebook.com</user_ID>
    <wallet_account_ID>7865493028712345</wallet_account_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
</enrollment_request>
```

In some embodiments, the social pay server may obtain the enrollment request from the client, and extract the user's payment detail (e.g., XML data) from the enrollment request. For example, the social pay server may utilize a parser such as the example parsers described below in the discussion with reference to FIG. 66. In some implementations, the social pay server may query, e.g., 4613, a social pay database, e.g., 4603*b*, to obtain a social network request template, e.g., 4614, to process the enrollment request. The social network request template may include instructions, data, login URL, login API call template and/or the like for facilitating social network authentication. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, e.g., 4614-4115, is provided below:

```
<?PHP
header('Content-Type: text/plain');
mysql_connect(“254.93.179.112”,$DBserver,$password); // access
database server
mysql_select_db(“SOCIALPAY.SQL”); // select database table to search
//create query
$query = “SELECT template FROM EnrollTable WHERE network LIKE
'%' $socialnet”;
$result = mysql_query($query); // perform the search query
mysql_close(“SOCIALAUTH.SQL”); // close database access
?>
```

In some implementations, the social pay server may redirect the client to a social network server, e.g., 4604*a*, by providing a HTTP(S) REDIRECT 300 message, similar to the example below:

```
HTTP/1.1 300 Multiple Choices
Location:
    https://www.facebook.com/dialog/oauth?client_id=snpa_app_ID&redirect_uri=
    www.paynetwork.com/enroll.php
<html>
    <head><title>300 Multiple Choices</title></head>
    <body><h1>Multiple Choices</h1></body>
</html>
```

In some implementations, the social pay server may provide information extracted from the social pay enrollment request to the social network server as part of a user authentication/social pay app enroll request, e.g., 4615. For example, the social pay server may provide a HTTP(S) POST message to the social network server, similar to the example below:

```
POST /authenticate_enroll.php HTTP/1.1
Host: www.socialnet.com
Content-Type: Application/XML
Content-Length: 484
<?XML version = "1.0" encoding = "UTF-8"?>
<enrollment_request>
    <request_ID>4NFU4RG94</request_ID>
    <timestamp>2011-02-22 15:22:43</timestamp>
    <user_ID>john.q.public@facebook.com</user_ID>
    <wallet_account_ID>7865493028712345</wallet_account_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
</enrollment_request>
```

In some implementations, the social network server may provide a social network login request, e.g., 4616, to the client. For example, the social network server may provide a HTML input form to the client. The client may display, e.g., 4617, the login form for the user. In some implementations, the user may provide login input into the client, e.g., 4618, and the client may generate a social network login response, e.g., 4619, for the social network server. In some implementations, the social network server may authenticate the login credentials of the user, and upon doing so, update the profile of the user to indicate the user's enrollment in the social pay system. For example, in a social networking service such as Facebook®, the social network server may provide permission to a social pay third-party developer app to access the user's information stored within the social network. In some embodiments, such enrollment may allow a virtual wallet application installed on a user device of to access the user's social profile information stored within the social network. Upon authentication, the social network server may generate an updated data record for the user, e.g., 4620, and provide an enrollment notification, e.g., 4621, to the social pay server. For example, the social network server may provide a HTTP(S) POST message similar to the example below:

```
POST /enrollnotification.php HTTP/1.1
Host: www.socialpay.com
Content-Type: Application/XML
Content-Length: 1306
<?XML version = "1.0" encoding = "UTF-8"?>
<enroll_notification>
    <request_ID>4NFU4RG94</order_ID>
    <timestamp>2011-02-22 15:22:43</timestamp>
    <result>enrolled</result>
</enroll_notification>
```

Upon receiving notification of enrollment from the social network server, the social pay server may generate, e.g., 4622, a user enrollment data record, and store the enrollment data record in a social pay database, e.g., 4623, to complete enrollment. In some implementations, the enrollment data record may include the information from the enrollment notification 4621.

Figure 47:
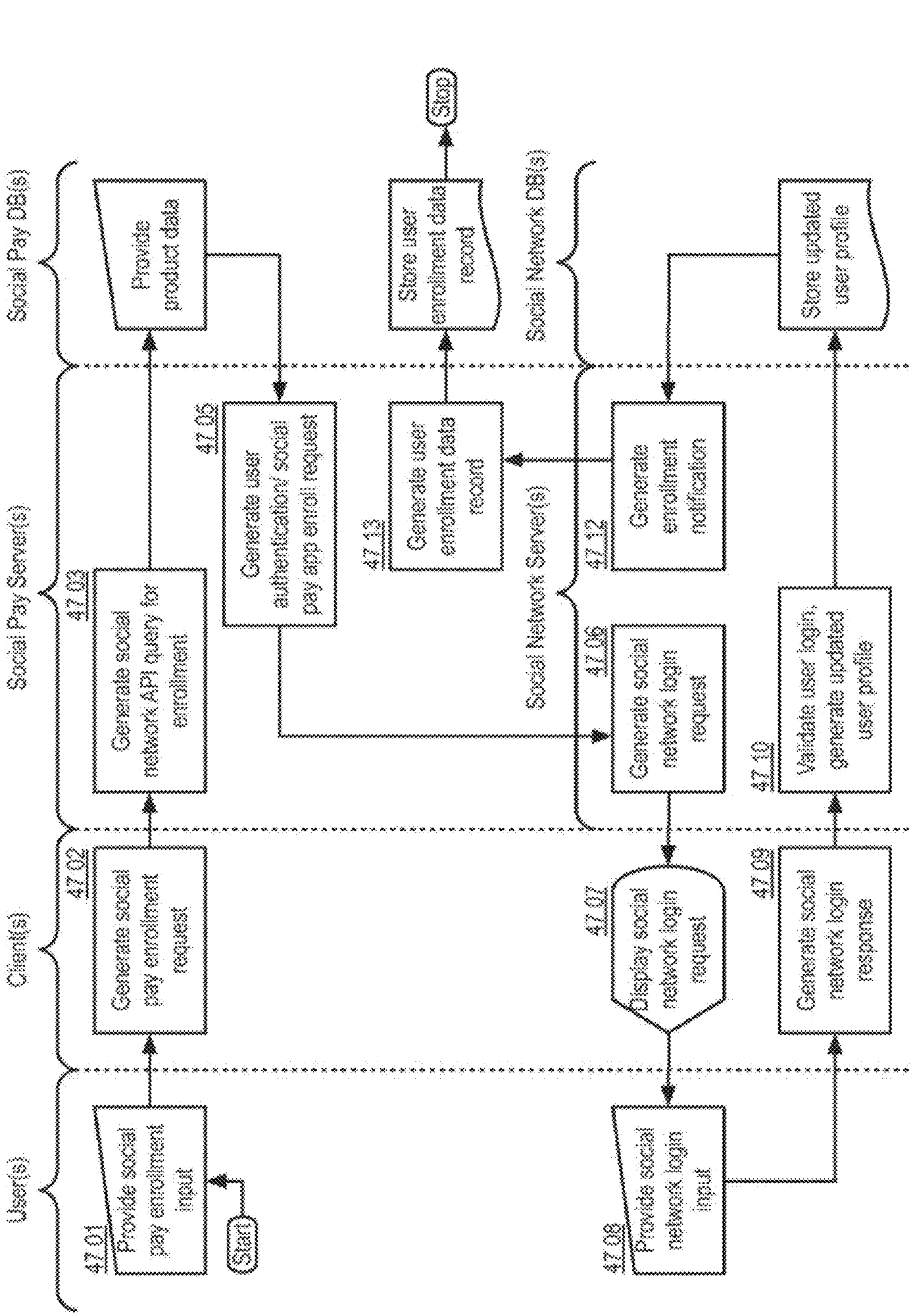
FIG. 47 shows a logic flow diagram illustrating example aspects of social pay enrollment in some embodiments of the WIP, e.g., a Social Pay Enrollment ("SPE") component 4200.

FIG. 47 shows a logic flow diagram illustrating example aspects of social pay enrollment in some embodiments of the WIP, e.g., a Social Pay Enrollment ("SPE") component 4700. In some embodiments, a user may desire to enroll in WIP. The user may provide user input, e.g., social pay enrollment input 4701, into the client indicating the user's desire to enroll in social network authenticated purchase payment. In some implementations, using the user's input, the client may generate a social pay enrollment request, e.g., 4702, and provide the enrollment request to the social pay server. In some embodiments, the social pay server may obtain the enrollment request from the client, and extract the user's payment detail (e.g., XML data) from the enrollment request 4704. For example, the social pay server may utilize a parser such as the example parsers described below in the discussion with reference to FIG. 66. In some implementations, the social pay server may query, e.g., 4703, a social pay database to obtain a social network request template to process the enrollment request. The social network request template may include instructions, data, login URL, login API call template and/or the like for facilitating social network authentication. In some implementations, the social pay server may redirect the client to a social network server. In some implementations, the social pay server may provide information extracted from the social pay enrollment request to the social network server as part of a user authentication/ social pay app enroll request, e.g., 4705. In some implementations, the social network server may provide a social network login request, e.g., 4706, to the client. For example, the social network server may provide a HTML input form to the client. The client may display, e.g., 4707, the login form for the user. In some implementations, the user may provide login input into the client, e.g., 4708, and the client may generate a social network login response, e.g., 4709, for the social network server. In some implementations, the social network server may authenticate the login credentials of the user, and upon doing so, update the profile of the user to indicate the user's enrollment in the social pay system. For example, in a social networking service such as Facebook®, the social network server may provide permission to a social pay third-party developer app to access the user's information stored within the social network. In some embodiments, such enrollment may allow a virtual wallet application installed on a user device of to access the user's social profile information stored within the social network. Upon authentication, the social network server may generate and store an updated data record for the user, e.g., 4710-4711, and provide an enrollment notification, e.g., 4712 to the social pay server. Upon receiving notification of enrollment from the social network server, the social pay server may generate, e.g., 4713, a user enrollment data record, and store the enrollment data record in a social pay database, e.g., 4714, to complete enrollment. In some implementations, the enrollment data record may include the information from the enrollment notification.

Figure 48A:
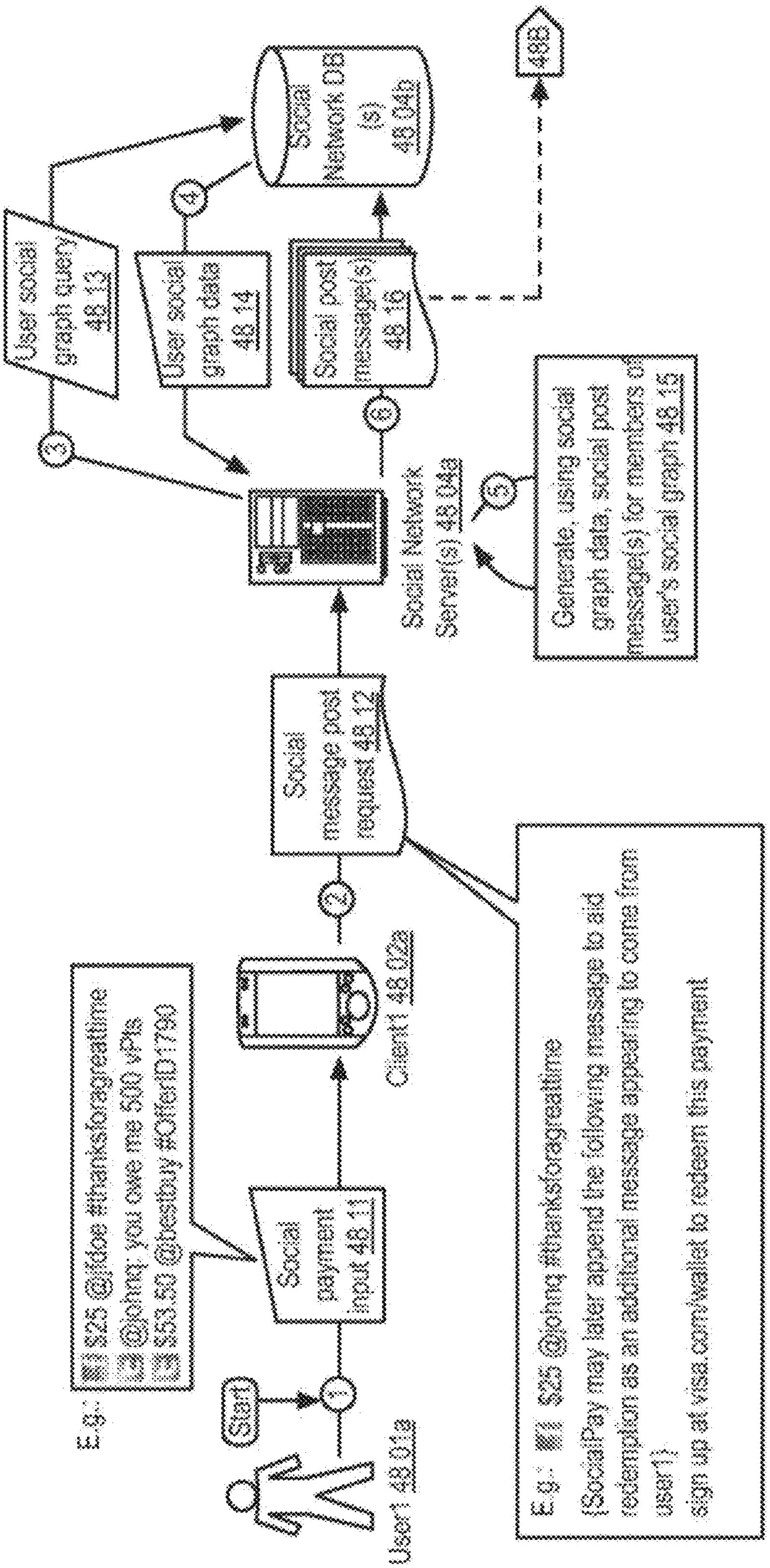
FIGS. 48A-C show data flow diagrams illustrating an example social payment triggering procedure in some embodiments of the WIP.
Figure 48B:
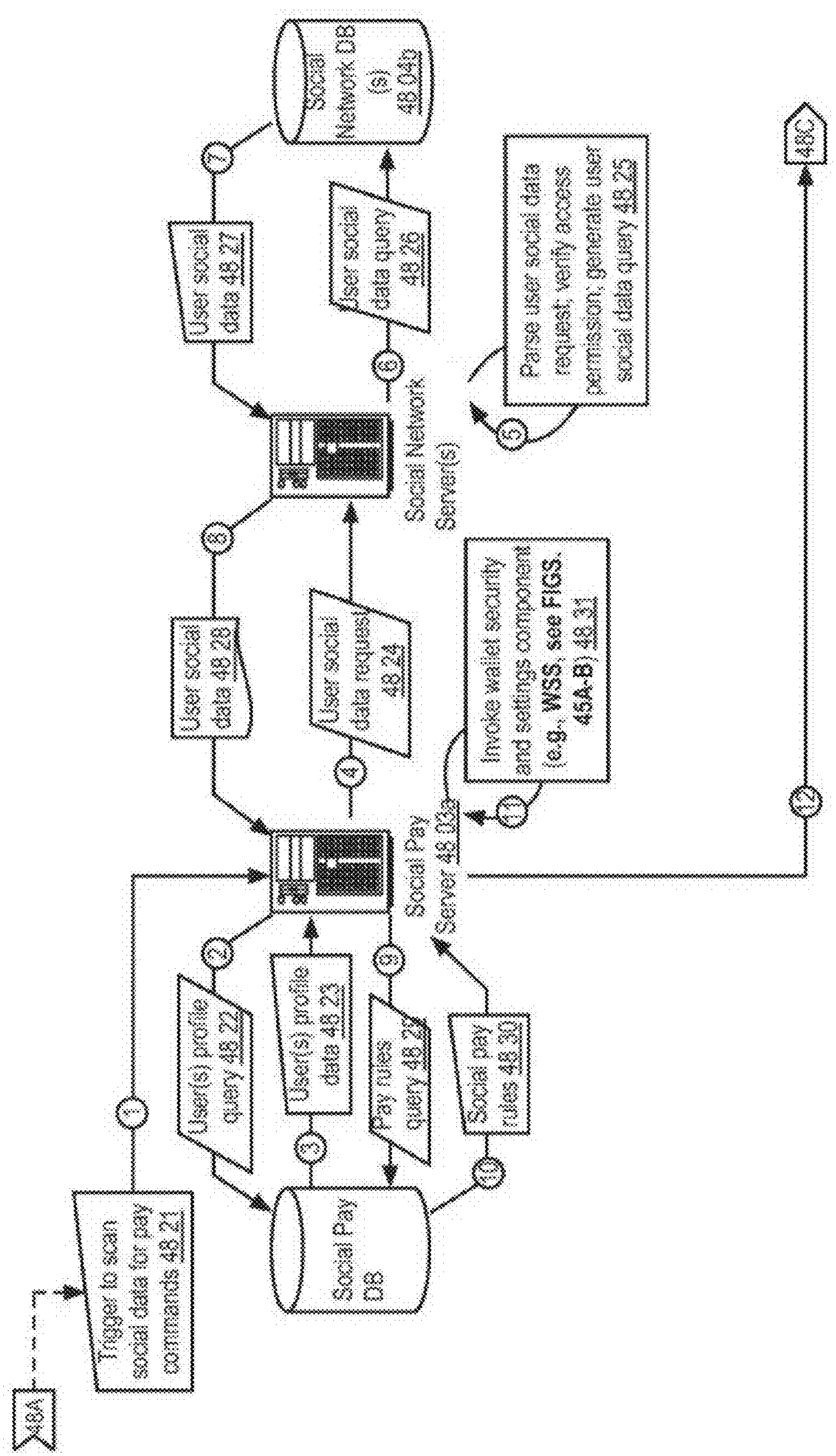
Figure 48C:
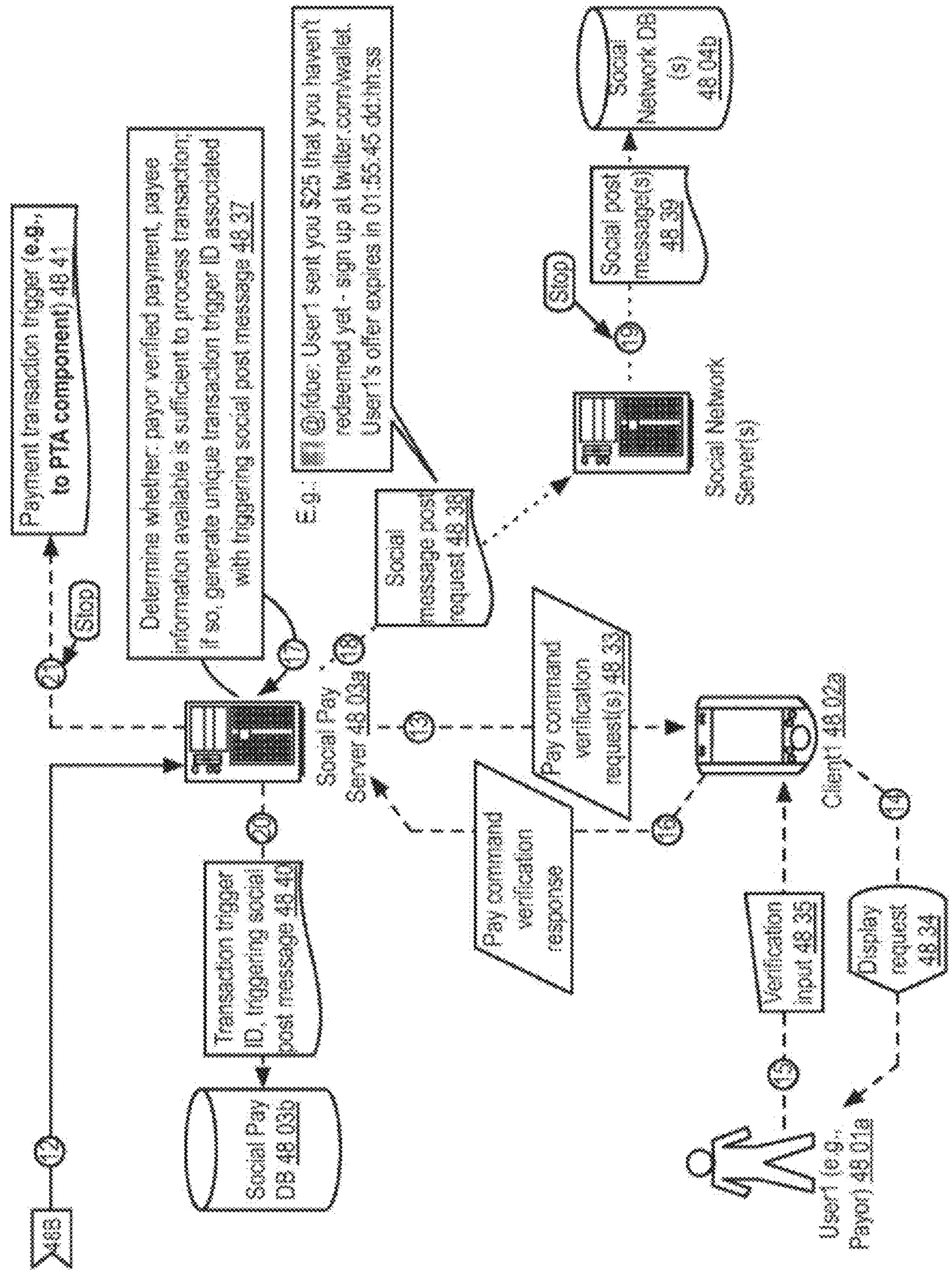

FIGS. 48A-C show data flow diagrams illustrating an example social payment triggering procedure in some embodiments of the WIP. With reference to FIG. 48A, in some embodiments, a user, e.g., user1 4801*a*, may desire to provide or request funds from another (e.g., a user, a participating merchant, etc.). The user may communicate with a social network server, e.g., 4803*a*, via a client (client1 4802*a*) such as, but not limited to: a personal computer, mobile device, television, point-of-sale terminal, kiosk, ATM, and/or the like. For example, the user may provide social payment input 4811, into the client indicating the user's desire to provide or request funds from another. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In response, the client may provide a social message post request 4812, 4812*b* to the social network server. In some implementations, a virtual wallet application executing on the client may provide the user with an easy-to-use interface to generate and send the social message post request. In alternate implementations, the user may utilize other applications to provide the social message post request. For example, the client may provide a social message post request to the social network server server as a HTTP(S) POST message including XML-formatted data. An example listing of a social message post request 4812, substantially in the form of a HTTP(S) POST message including XML-formatted data, is provided below:

```
POST /socialpost.php HTTP/1.1
Host: www.socialnetwork.com
Content-Type: Application/XML
Content-Length: 310
<?XML version = "1.0" encoding = "UTF-8"?>
<message_post_request>
    <request_ID>value</request_ID>
    <timestamp>2011-02-02 03:04:05</timestamp>
    <sender_id>jfdoe@facebook.com</sender_id>
    <receiver_id>johnqp@facebook.com</receiver_id>
    <message>$25 @johnqp #thanksforagreattimelastnite</message>
</message_post_request>
```

In some embodiments, the social network server 4804*a* may query its social network database for a social graph of the user, e.g., 4813. For example, the social network server may issue PHP/SQL commands to query a database table (such as FIG. 66, Social Graph 6619*p*) for social graph data associated with the user. An example user social graph query 4813, substantially in the form of PHP/SQL commands, is provided below:

```
<?PHP
header('Content-Type: text/plain');
mysql_connect("254.93.179.112",$DBserver,$password); // access
database server
mysql_select_db("WIP_DB.SQL"); // select database table to
search
//create query
$query = "SELECT friend_name friend_type friend_weight
message_params_list
    messaging_restrictions FROM SocialGraphTable WHERE user
    LIKE '%' $user_id";
```

-continued

```
$result = mysql_query($query); // perform the search query
mysql_close("WIP_DB.SQL"); // close database access
?>
```

In some embodiments, the social network database may provide the requested social graph data in response, e.g., 4814. Using the social graph data, the social network server may generate message(s) as appropriate for the user and/or members of the user's social graph, e.g., 4815, and store the messages 4816 for the user and/or social graph members.

With reference to FIG. 48B, in some embodiments, such posting of social messages may trigger WIP actions. For example, a social pay server 4803*a* may be triggered to scan the social data for pay commands. In embodiments where every social post message originates from the virtual wallet application of a user, the WIP may optionally obtain the pay commands from the virtual wallet applications, and skip scanning the social networks for pay commands associated with the user. In embodiments where a user is allowed to issue pay commands from any device (even those not linked to the user's virtual wallet), the WIP may periodically, or even continuously scan the social networks for pay commands, e.g., 4821. In embodiments where the WIP scans the social networks, the social pay server may query a social pay database 4803*b* for a profile of the user. For example, the social pay server may request a user ID and password for the social networks that the user provided to the social pay server during the enrollment phase (see, e.g., FIGS. 46-47). For example, the social pay server server may issue PHP/SQL commands to query a database table (such as FIG. 66, Users 6619*a*) for user profile data. An example user profile data query 4822, substantially in the form of PHP/SQL commands, is provided below:

```
<?PHP
header('Content-Type: text/plain');
mysql_connect("254.93.179.112",$DBserver,$password); // access
database server
mysql_select_db("WIP_DB.SQL"); // select database table to
search
//create query
$query = "SELECT network_id network_name network_api user_login
user_pass FROM
    UsersTable WHERE userid LIKE '%' $user_id";
$result = mysql_query($query); // perform the search query
mysql_close("WIP_DB.SQL"); // close database access
?>
```

In response, the social pay database may provide the requested information, e.g., 4823. In some embodiments, the social pay server may provide a user social data request 4824 to the social network server. An example listing of commands to issue a user social data request 4824, substantially in the form of PHP commands, is provided below:

```
<?PHP
header('Content-Type: text/plain');
// Obtain user ID(s) of friends of the logged-in user
$friends =
    json_decode(file_get_contents('https://graph.facebook.com/me/friends?access
    token='$cookie['oauth_access_token']), true);
$friend_ids = array_keys($friends);
// Obtain message feed associated with the profile of the logged-in user
$feed =
    json_decode(file_get_contents('https:llgraph.facebook.com/me/feed?access_tok
    en='$cookie['oauth_access_token']), true);
```

-continued

```
// Obtain messages by the user's friends
$result = mysql__query('SELECT * FROM content WHERE uid IN ('
    .implode($friend__ids, ',') . ')');
$friend__content = array( );
while ($row = mysql__fetch__assoc($result))
$friend__content [ ] $row;
?>
```

In some embodiments, the social network server 4804*a* may query, e.g., 4826, it social network database 4804*b* for social data results falling within the scope of the request. In response to the query, the database may provide social data, e.g., 4827. The social network server may return the social data obtained from the databases, e.g., 4828, to the social pay server. An example listing of user social data 4828, substantially in the form of JavaScript Object Notation (JSON)-formatted data, is provided below:

```
[ "data":    [
             {      "name": "Tabatha Orloff",
                    "id": "483722"},
             {      "name": "Darren Kinnaman",
                    "id": "86S743"},
             {      "name": "Sharron Jutras",
                    "id": "O91274"}
] }
```

In some embodiments, the social pay server may query the social pay database for social pay rules, e.g., 4829. For example, the social pay server may issue PHP/SQL commands to query a database table (such as FIG. 66, 6619) for the social pay rules 4830. An example pay rules query 4829, substantially in the form of PHP/SQL commands, is provided below:

```
<?PHP
header('Content-Type: text/plain');
mysql__connect("254.93.179.112",$DBserver,$password); // access
database server
mysql__select__db("WIP__DB.SQL"); // select database table to
search
//create query
$query = "SELECT rule__id rule__type rule__description rule__priority
rule__source
    FROM SocialPayRulesTable WHERE rule__type LIKE pay__rules";
$result = mysql__query($query); // perform the search query
mysql__close("WIP__DB.SQL"); // close database access
?>
```

In some embodiments, the social pay server may process the user social data using the social pay rules to identify pay commands, pay requests, merchant offers, and/or like content of the user social data. In some embodiments, rules may be provided by the WIP to ensure the privacy and security of the user's social data and virtual wallet. As another example, the rules may include procedures to detect fraudulent transaction attempts, and request user verification before proceeding, or cancel the transaction request entirely. In some embodiments, the social pay server may utilize a wallet security and settings component, such as the example WSS 4500 component described further below in the discussion with reference to FIGS. 45A-B.

With reference to FIG. 48C, in some embodiments, the social pay server may optionally determine that, based on processing of the rules, user verification is needed to process a transaction indicated in a pay command. For example, if the rules processing indicated that there is a probability of the pay command being an attempt at a fraudulent transaction attempt, the social pay server may determine that the user must be contacted for payment verification before the transaction can be processed. In such scenarios, the social pay server may provide a pay command verification request 4833 to the client, which the client may display, e.g., 4834, to the user. For example, the social pay server may provide a pay command verification request to the client 4802*a* as a HTTP(S) POST message including XML-formatted data. An example listing of a pay command verification request 4833, substantially in the form of a HTTP(S) POST message including XML-formatted data, is provided below:

```
POST /verifyrequest.php HTTP/1.1
Host: www.client.com
Content-Type: Application/XML
Content-Length: 256
<?XML version = "1.0" encoding = "UTF-8"?>
<verify__request>
    <transaction__ID>AE1234</transaction__ID>
    <timestamp>2011-02-02 03:04:05</timestamp>
    <amount>50000 vpts</amount>
    <message__string>5000000 vpts @jfdoe #thx</message__string>
</verify__request>
```

In some embodiments, the user may provide a verification input 4835 into the client, which may provide a pay command verification response to the social pay server 4836. The social pay server may determine whether the payor verified payment, whether payee information available is sufficient to process the transaction, and/or the like. In scenarios where sufficient payee information is unavailable, the social pay server may optionally provide a social post message 4838 to a social networking service associated with the potential payee requesting the payee to enroll in social pay service (e.g., using the SPE 4200 component described above in the discussion with reference to FIGS. 46-47), which the social network server may post 4839 for the payee. If all the requirements are met for processing the transaction, the social pay server may generate a unique transaction trigger associated with the triggering social post message, e.g., 4837, and store a transaction trigger ID, triggering social post message, etc., for recordkeeping or analytics purposes, e.g., 4840. The social pay server may provide the transaction trigger to trigger a purchase transaction 4841, e.g., via a purchase transaction authorization such as the example PTA component described below in the discussion with reference to FIG. 63.

Figure 49A:
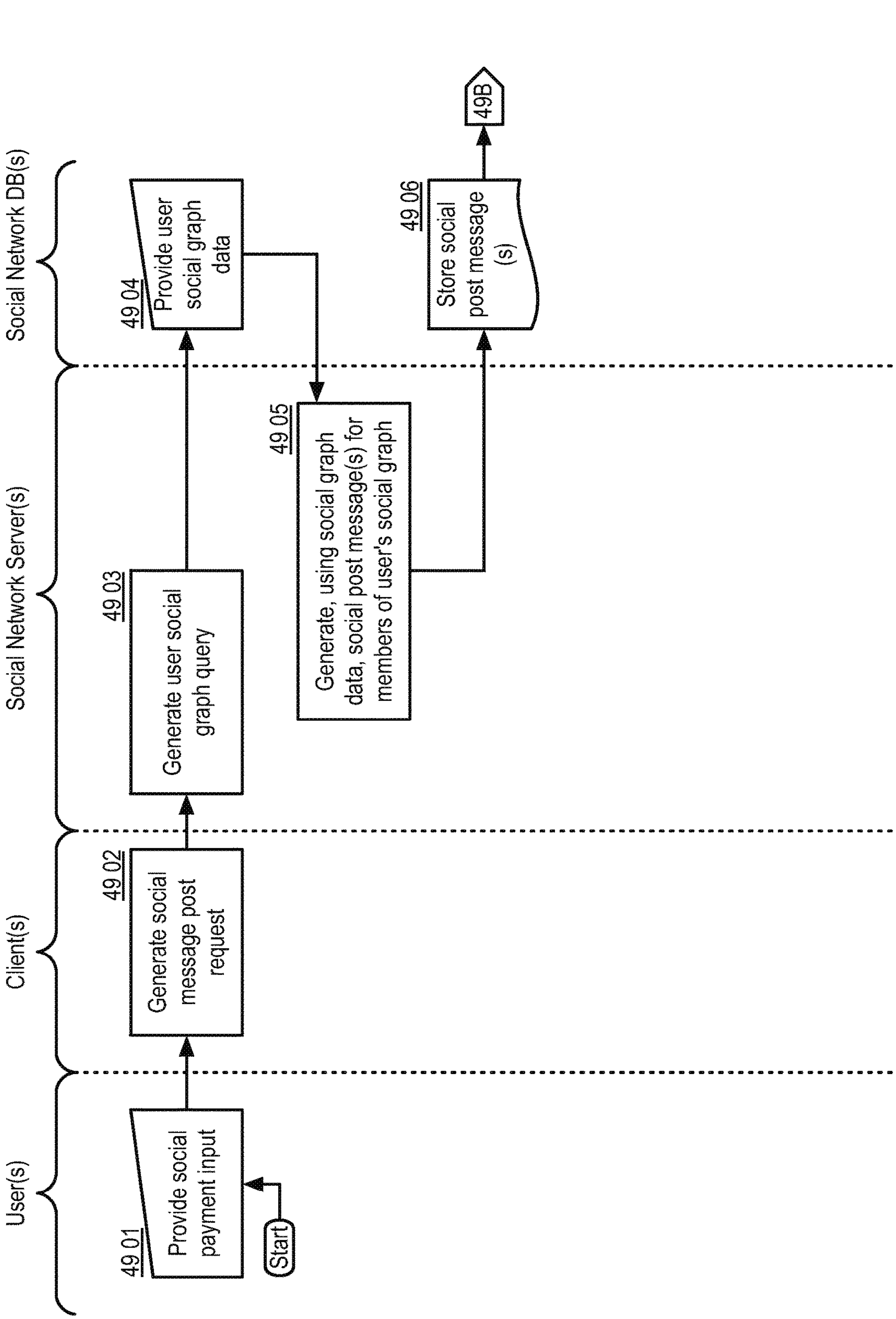
FIGS. 49A-C show logic flow diagrams illustrating example aspects of social payment triggering in some embodiments of the WIP, e.g., a Social Payment Triggering ("SPT") component 4900.
Figure 49B:
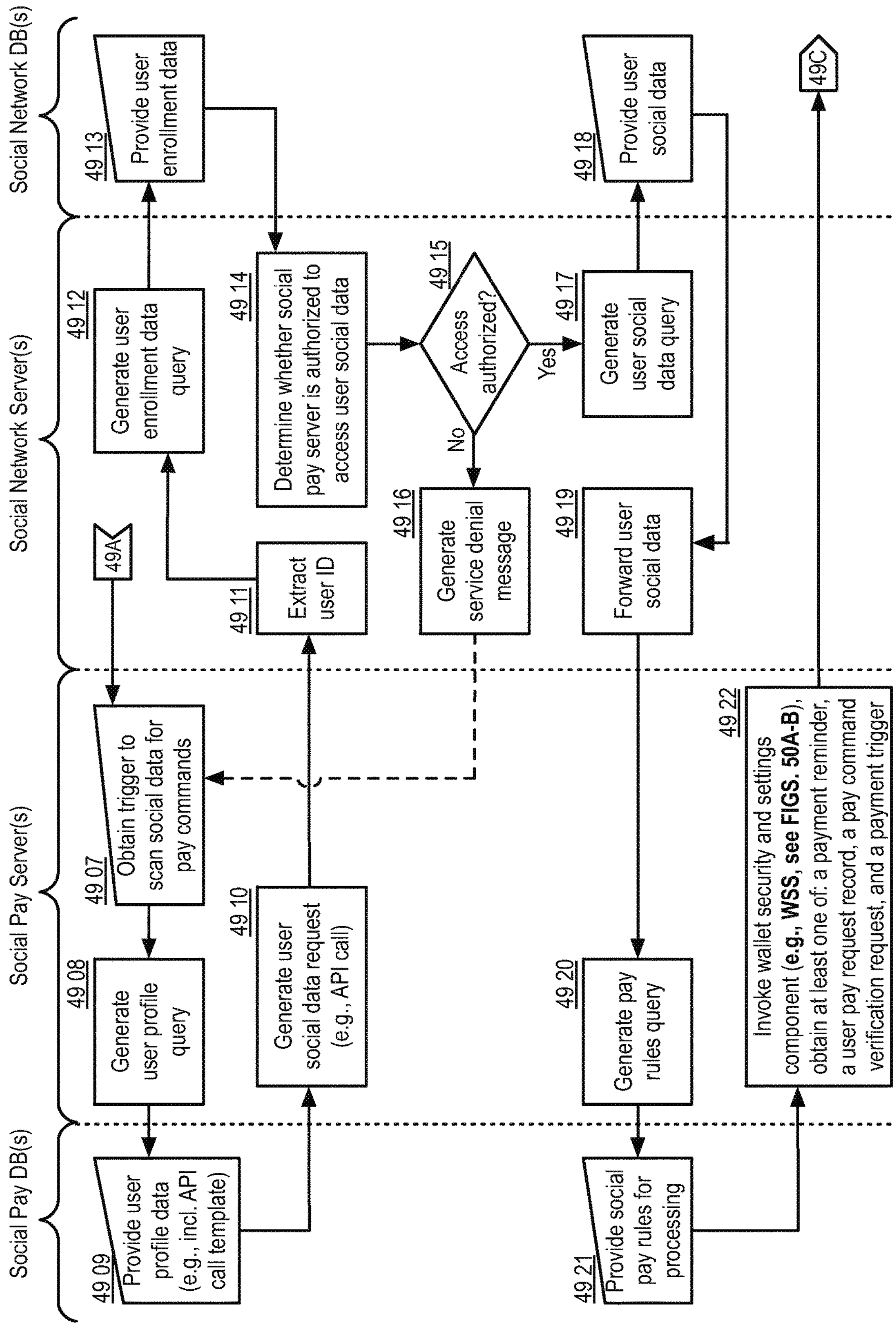
Figure 49C:
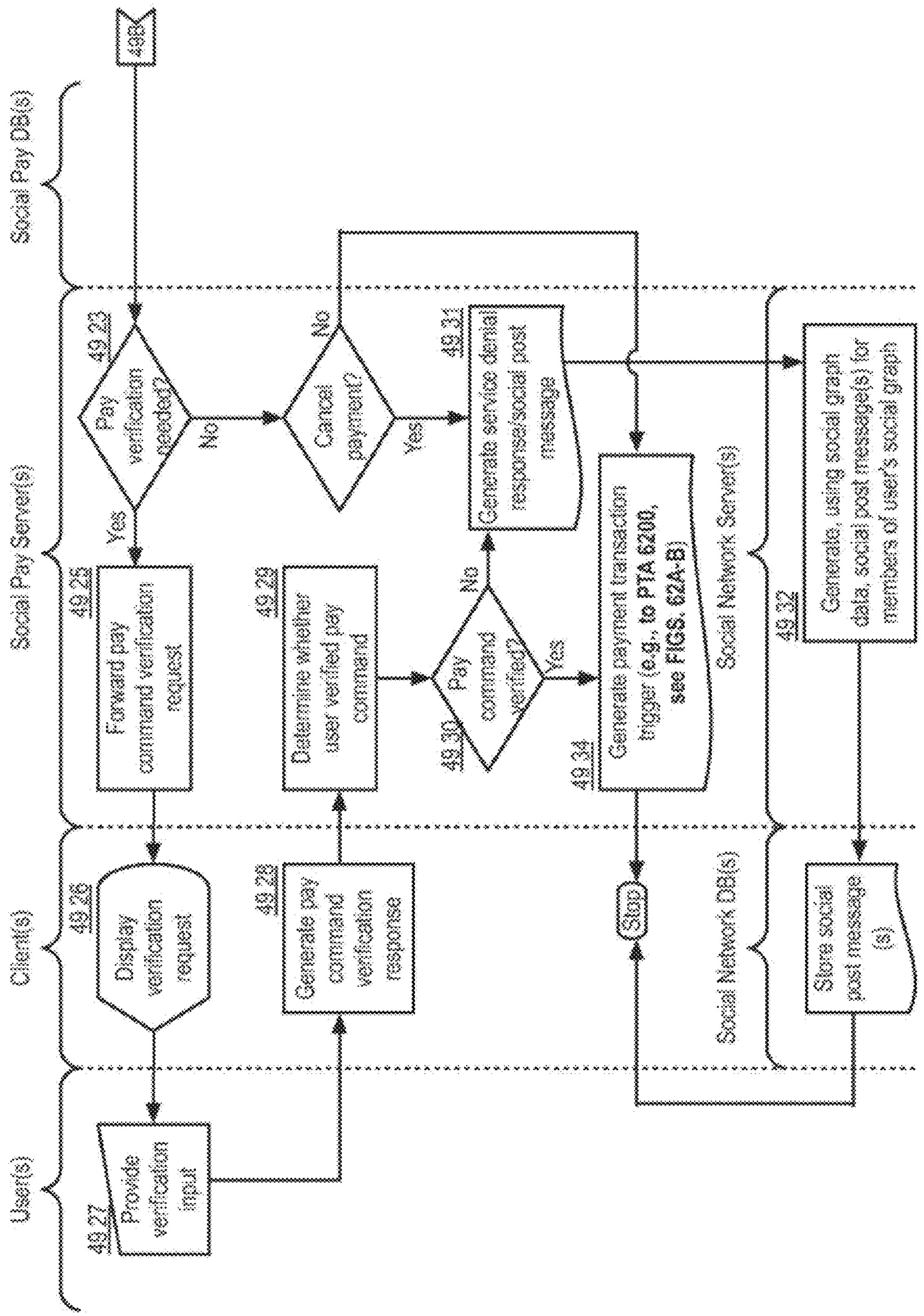

FIGS. 49A-C show logic flow diagrams illustrating example aspects of social payment triggering in some embodiments of the WIP, e.g., a Social Payment Triggering ("SPT") component 4900. With reference to FIG. 49A, in some embodiments, a user may desire to provide or request funds from another (e.g., a user, a participating merchant, etc.). The user may communicate with a social network server via a client. For example, the user may provide social payment input 4901, into the client indicating the user's desire to provide or request funds from another. In response, the client may generate and provide a social message post request 4902 to the social network server. In some implementations, a virtual wallet application executing on the client may provide the user with an easy-to-use interface to generate and send the social message post request. In alternate implementations, the user may utilize other applications to provide the social message post request. In some embodiments, the social network server may query its social network database for a social graph of the user, e.g., 4903. In response, the social network database may provide the requested social graph data, e.g., 4904. Using the social graph data, the social network server may generate message(s) as appropriate for the user and/or members of the user's social graph, e.g., 4905, and store the messages 4906 for the user and/or social graph members.

With reference to FIG. 49B, in some embodiments, such posting of social messages may trigger WIP actions. For example, a social pay server may be triggered to scan the social data for pay commands, e.g., 4907. In embodiments where every social post message originates from the virtual wallet application of a user, the WIP may optionally obtain the pay commands from the virtual wallet applications, and skip scanning the social networks for pay commands associated with the user. In embodiments where a user is allowed to issue pay commands from any device (even those not linked to the user's virtual wallet), the WIP may periodically, or even continuously scan the social networks for pay commands. In embodiments where the WIP scans the social networks, the social pay server may query a social pay database for a profile of the user, 4908. For example, the social pay server may request a user ID and password for the social networks that the user provided to the social pay server during the enrollment phase (see, e.g., FIGS. 46-47). In response, the social pay database may provide the requested information, e.g., 4909. In some embodiments, the social pay server may generate provide a user social data request 4910 to the social network server.

In some embodiments, the social network server may extract a user ID from the user social data request, e.g., 4911. The social network server may query, e.g., 4912, it social network database to determine whether the user is enrolled in WIP with the social network (e.g., "did the user allow the WIP Facebook® app to access user data?"). In response, the social network database may provide user enrollment data relating to WIP 4913. The social network server may determine whether the user is enrolled, and thus whether the social pay server is authorized to access the user social data, 4914. If the social network server determines that the social pay server is not authorized, 4915, option "No," it may generate a service denial message, 4916, and provide the message to the social pay server. If the social network server determines that the social pay server is authorized to access the user social data, 4915, option "Yes," the social network server may generate a user social data query 4917, and provide it to the social network database. In response, the social network database may provide the user social data requested, 4918. The social network server may provide the user social data 4919 to the social pay server.

In some embodiments, the social pay server may query the social pay database for social pay rules, e.g., 4920-4921. In some embodiments, the social pay server may process the user social data using the social pay rules to identify pay commands, pay requests, merchant offers, and/or like content of the user social data, 4922. In some embodiments, rules may be provided by the WIP to ensure the privacy and security of the user's social data and virtual wallet. As another example, the rules may include procedures to detect fraudulent transaction attempts, and request user verification before proceeding, or cancel the transaction request entirely. In some embodiments, the social pay server may utilize a wallet security and settings component, such as the example WSS 4500 component described further below in the discussion with reference to FIGS. 50A-B.

With reference to FIG. 49C, in some embodiments, the social pay server may optionally determine that, based on processing of the rules, user verification is needed to process a transaction indicated in a pay command, 4923, option "Yes." For example, if the rules processing indicated that there is a probability of the pay command being an attempt at a fraudulent transaction attempt, the social pay server may determine that the user must be contacted for payment verification before the transaction can be processed. In such scenarios, the social pay server may provide a pay command verification request 4925 to the client, which the client may display, e.g., 4926, to the user. In some embodiments, the user may provide a verification input 4927 into the client, which may provide a pay command verification response to the social pay server, 4928. The social pay server may determine whether the payor verified payment, whether payee information available is sufficient to process the transaction, and/or the like, 4929. In scenarios where sufficient payee information is unavailable or the payor needs to be contacted for payment verification, 4930, option "No," the social pay server may ask to cancel the payment 4924, and optionally provide a social post message 4931 to a social networking service associated with the potential payee/payor requesting the payee to enroll in social pay service (e.g., using the SPE 4200 component described above in the discussion with reference to FIGS. 51-52) or provide verification, which the social network server may post 4932-4933 for the payee. If all the requirements are met for processing the transaction, 4930, option "Yes," the social pay server may generate a unique transaction trigger associated with the triggering social post message, e.g., 4934, and may optionally store a transaction trigger ID, triggering social post message, etc., for recordkeeping or analytics purposes. The social pay server may provide the transaction trigger to trigger a purchase transaction, e.g., via a purchase transaction authorization component.

Figure 50A:
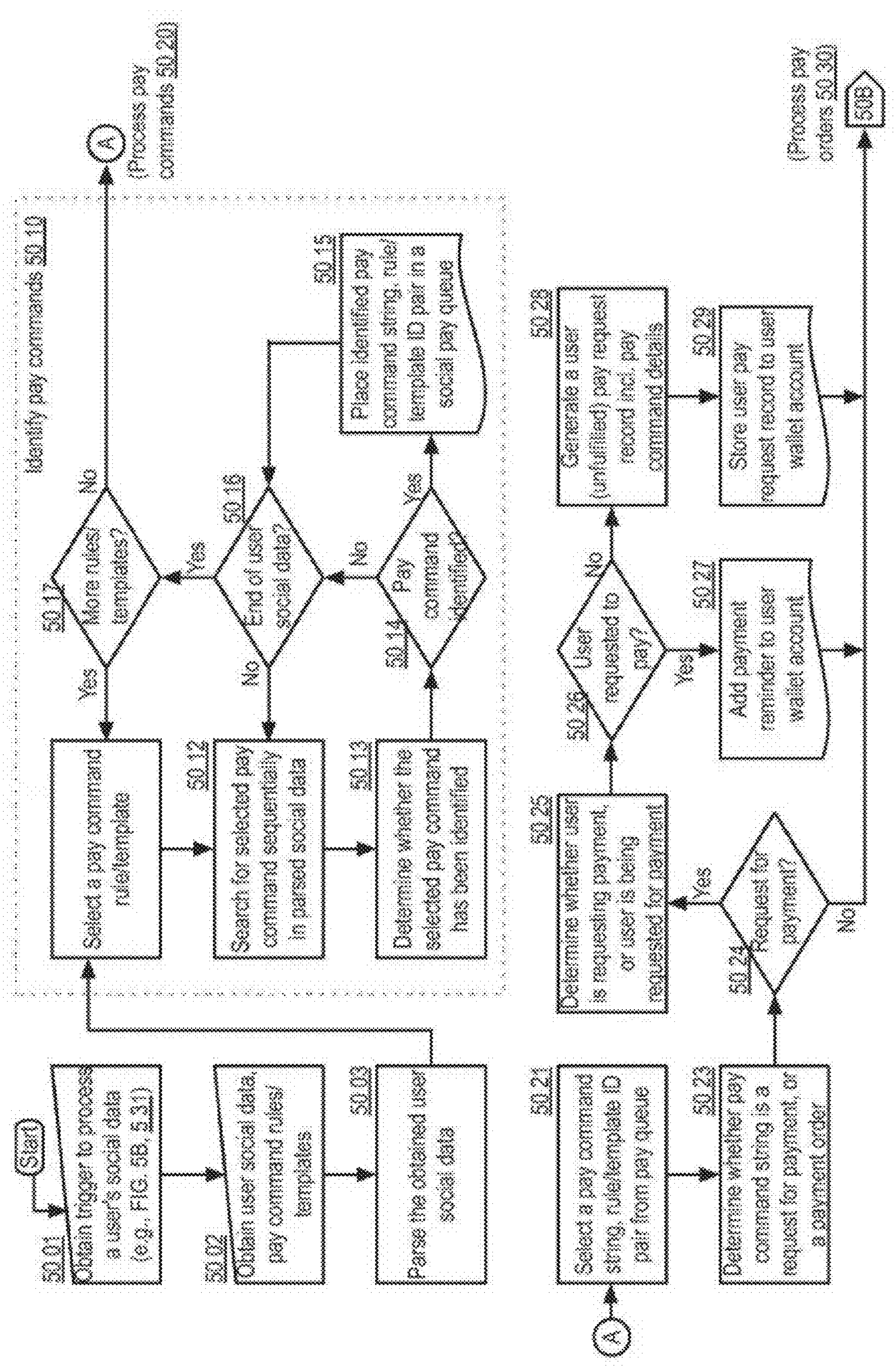
FIGS. 50A-B show logic flow diagrams illustrating example aspects of implementing wallet security and settings in some embodiments of the WIP, e.g., a Something ("WSS") component 5000.
Figure 50B:
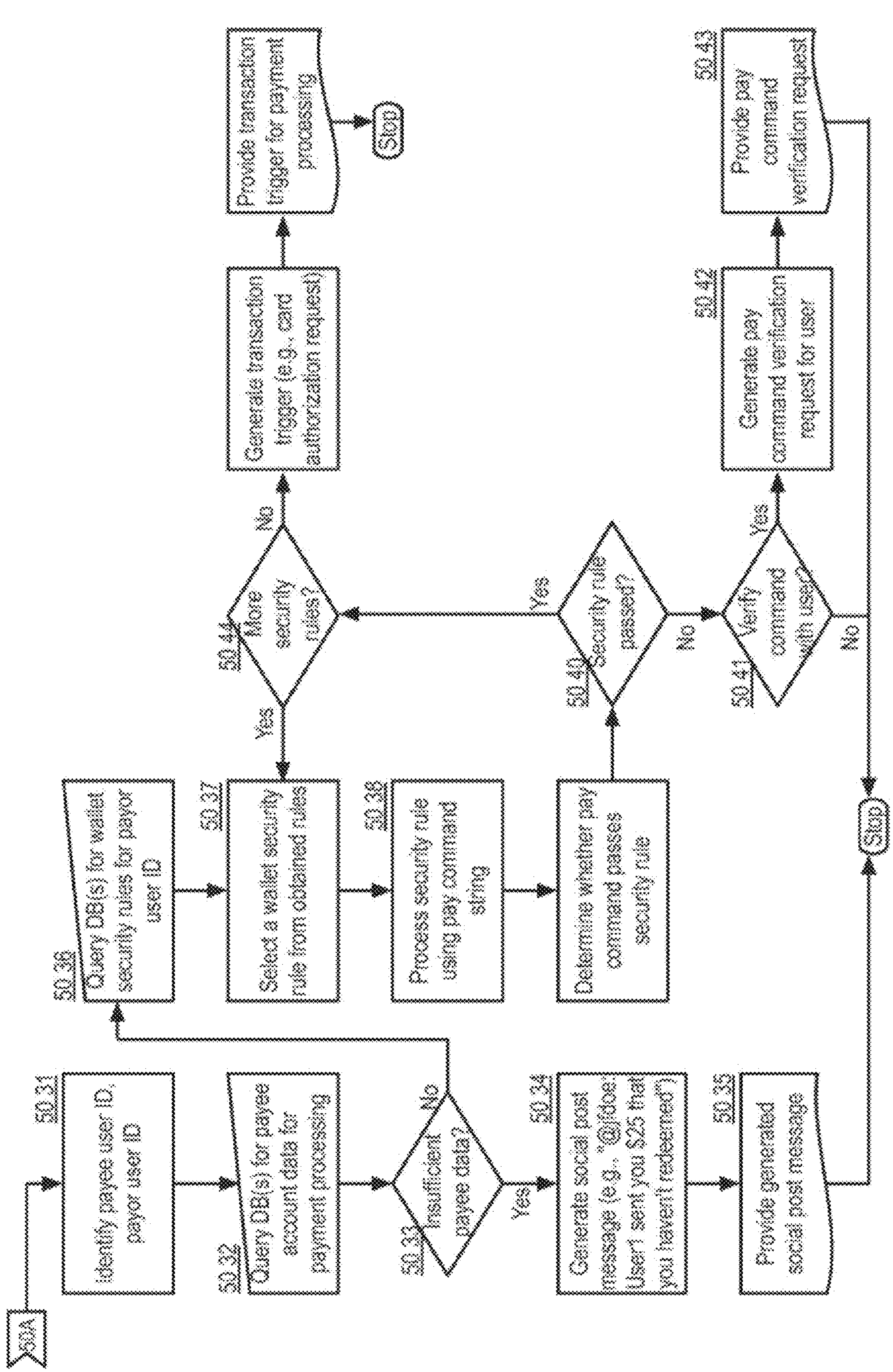

FIGS. 50A-B show logic flow diagrams illustrating example aspects of implementing wallet security and settings in some embodiments of the WIP, e.g., a Something ("WSS") component 5000. In some embodiments, the social pay server may process the user social data using the social pay rules to identify pay commands, pay requests, merchant offers, and/or like content of the user social data. In some embodiments, rules may be provided by the WIP to ensure the privacy and security of the user's social data and virtual wallet. As another example, the rules may include procedures to detect fraudulent transaction attempts, and request user verification before proceeding, or cancel the transaction request entirely.

Accordingly, with reference to FIG. 50A, in some embodiments, the WIP may obtain a trigger to process a user's social data (e.g., from FIG. 44B, element 4431), 5001. The WIP may obtain user and/or user social graph member social data, as well as pay command rules and templates (e.g., for identifying standard pay commands), 5002. The WIP may parse the obtained user social data in preparation for rules processing, 5003. For example, the WIP may utilize parsers such as the example parsers described below in the discussion with reference to FIG. 66. The WIP may select a pay command rule/template for processing 5011. The WIP may search through the parsed user social data, e.g., in a sequential manner, for the selected pay command, 5012, and determine whether the pay command is present in the user social data, 5013. If the pay command is identified, 5014, option "Yes," the WIP may place the identified pay command string, an identification of the rule/template, the actual listing of the rule/template, and/or the like in a queue for further processing, 5015. The WIP may perform such a procedure until the entirety of the user's social data has been searched through (see 5016). In some embodiments, the WIP may perform the above procedure for all available rules/templates, to identify all the pay command strings included in the user social data (see 5017).

In some embodiments, the WIP may process each pay command identified from the user social data, 5020. For example, the WIP may select a pay command string from the queue and its associated template/identification rule, 5021. Using the rule/template and pay command string, the WIP may determine whether the string represents a request for payment, or an order to pay, 5023. If the pay command string represents a request for payment (e.g., "hey @jfdoe, you owe me 25 bucks #cashflowblues"), 5024, option "Yes," the WIP may determine whether the user for whom the WSS component is executing is the requested payor, or the payee, 5025. If the user has been requested to pay, 5026, option "Yes," the WIP may add a payment reminder to the user wallet account, 5027. Otherwise, the WIP may generate a user pay request record including the pay command details, 5028, and store the pay request record in the user's wallet account for recordkeeping purposes or future analytics processing, 5029.

With reference to FIG. 50B, in some embodiments, the WIP may extract an identification of a payor and payee in the transaction, 5031. The WIP may query a database for payee account data for payment processing, 5032. If the payee data available is insufficient, 5033, option "Yes," the WIP may generate a social post message to the payee's social network account 5034, requesting that the payee either enroll in the WIP (if not already), or provide additional information so that the WIP may process the transaction. The WIP may provide 5035 the social post message to the social networking service associated with the payee. If sufficient payee information is available, 5033, option "No," the WIP may query the payor's wallet account for security rules associated with utilizing the virtual wallet account, 5036. The WIP may select a wallet security rule, 5037, and process the security rule using the pay command string as input data, 5038. Based on the processing, the WIP may determine whether the pay command passes the security rule, or instead poses a security risk to the user wallet 5039. If the security rule is not passed, 5040, option "No," the WIP may determine whether verification from the user can salvage the pay command string, 5041. If the WIP determines that the risk is too great, the WIP may directly terminate the transaction and remove the pay command string from the processing queue. Otherwise (4541, option "Yes"), the WIP may generate a pay command verification request for the user, 5042, and provide the pay command verification request as an output of the component, 5043. If all security rules are passed for the pay command string, 5044, option "No," the WIP may generate a transaction trigger with a trigger ID (such as a card authorization request), and provide the transaction trigger for payment processing 5045, 5046.

Figure 51:
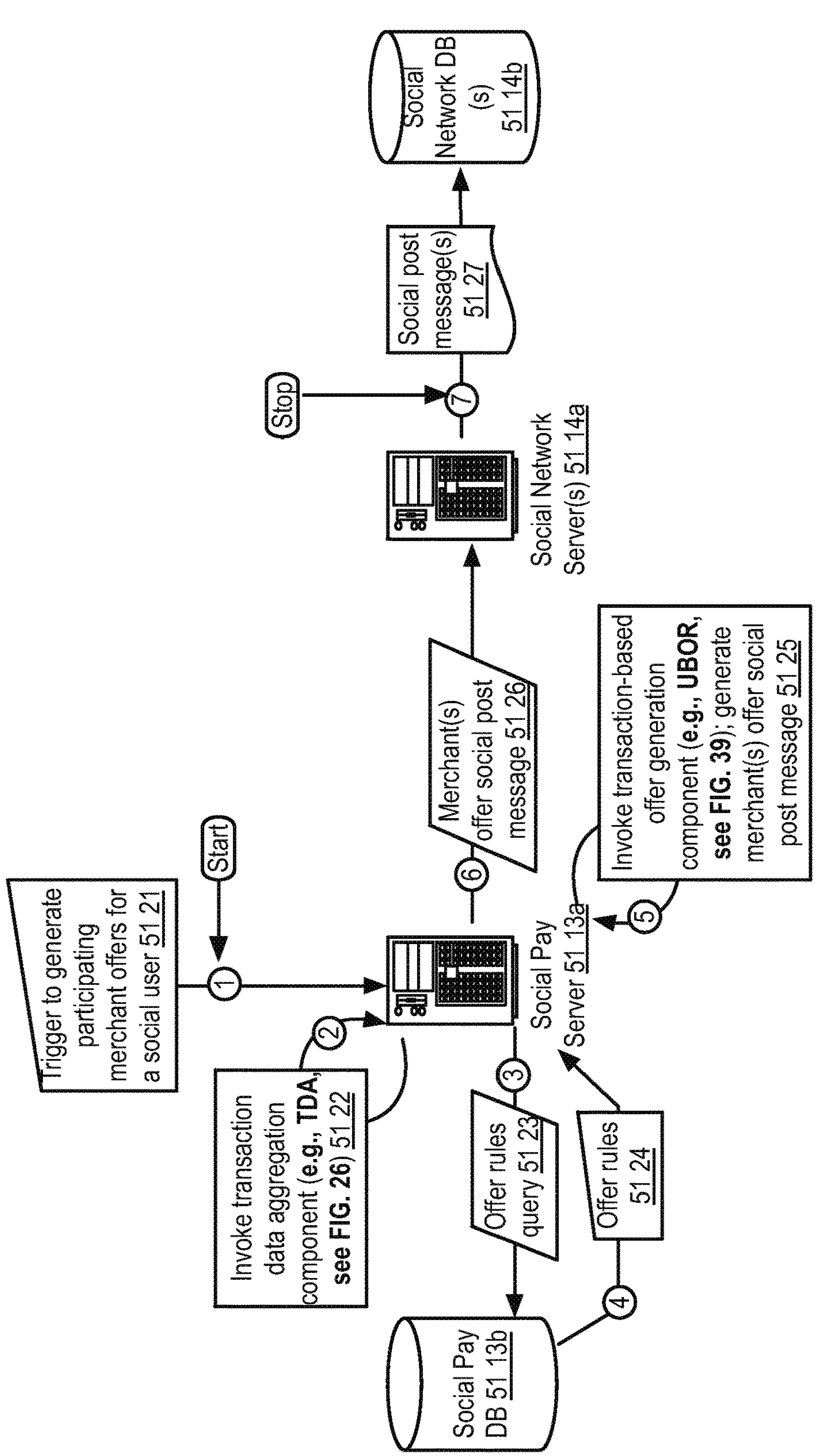
FIG. 51 shows a data flow diagram illustrating an example social merchant consumer bridging procedure in some embodiments of the WIP.

FIG. 51 shows a data flow diagram illustrating an example social merchant consumer bridging procedure in some embodiments of the WIP. In some implementations, a social pay server 5113*a* may be triggered, e.g., 5121, to provide services that bridge consumers and merchants over social networks. For example, the social pay server may identify a consumer in need of offers for products or services, and may identify merchants participating in WIP that can provide the needed products or services. The social pay server may generate offers on behalf of the participating merchants, and provide the offers to consumers via social networks. In some embodiments, the social pay server may periodically initiate merchant-consumer bridging services for a user. In alternate embodiments, the social pay server may initiate merchant-consumer bridging upon notification of a consumer engaging in a transaction (e.g., a consumer may request checkout for a purchase via the user's virtual wallet; for illustration, see the example User Purchase Checkout (UPC) component 6100 described further below in the discussion with reference to FIG. 61), or when a authorization is requested for a purchase transaction (see the example Purchase Transaction Authorization (PTA) component 6300 described further below in the discussion with reference to FIG. 63). Upon obtaining a trigger to perform merchant-consumer bridging, the social pay server may invoke 5122 a transaction data aggregation component, e.g., the TDA component 2600 described further below in the discussion with reference to FIG. 26. The social pay server may query a social pay database 5113*b* for offer generation rules, e.g., 5123. For example, the social pay server may utilize PHP/SQL commands similar to the other examples described herein. In response, the database may provide the requested offer generation rules, e.g., 5124. Using the aggregated transaction data and the offer generation rules, the social pay server may generate merchant(s) offer social post messages for posting to profiles of the user on social networks, e.g., 5125. For example, the social pay server may invoke a transaction-based offer generation component, such as the example UBOR 3900 component described further below in the discussion with reference to FIG. 44. The social pay server may provide the generated social post messages 5126 to a social network server 5114*a*. The social network server may store the social post messages 5127 to a social network database 5114*b* for distribution to the user (e.g., when the user logs onto the social networking service provided by the social network server).

Figure 52:
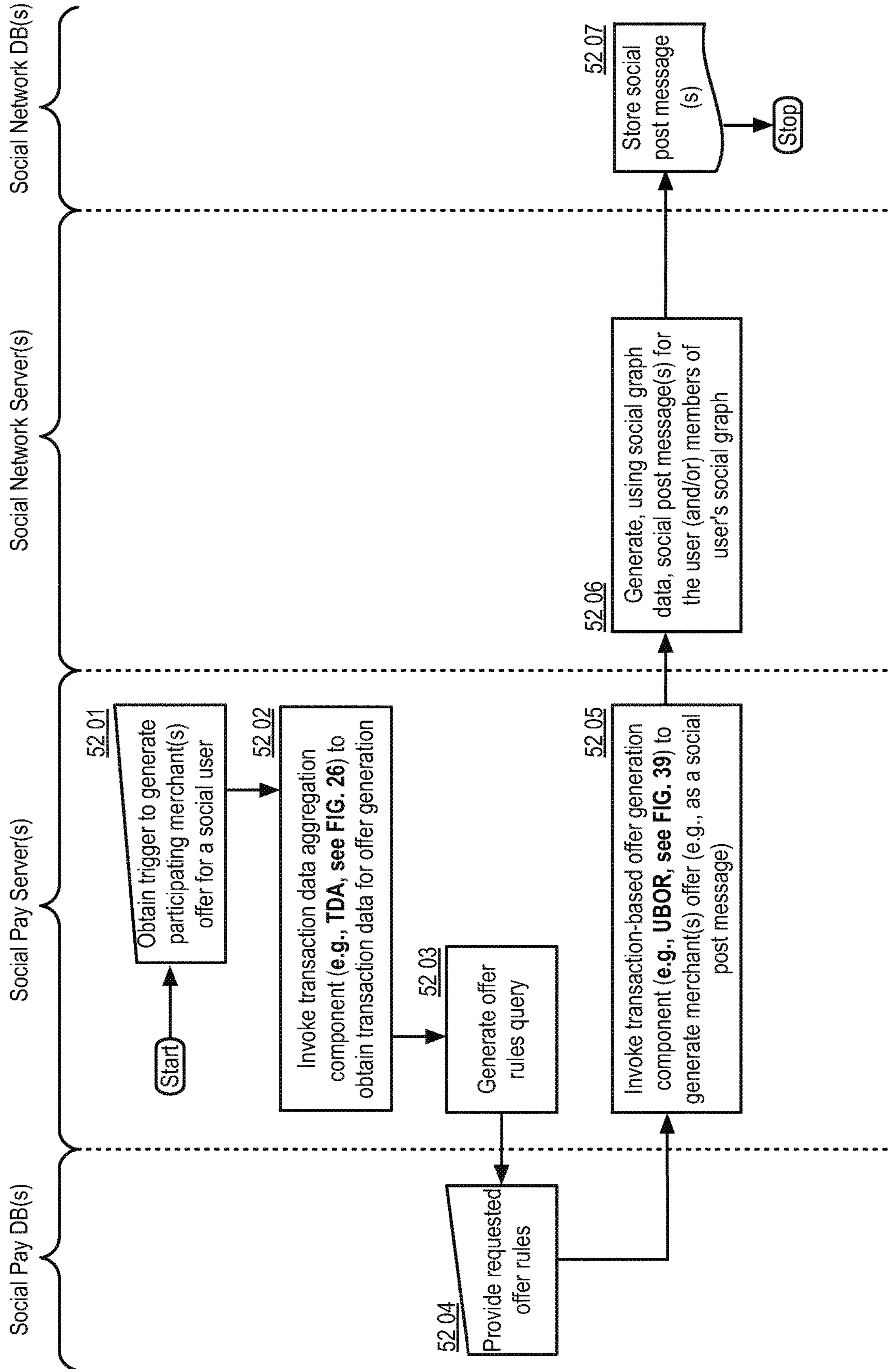
FIG. 52 shows a logic flow diagram illustrating example aspects of social merchant consumer bridging in some embodiments of the WIP, e.g., a Social Merchant Consumer Bridging ("SMCB") component 5200.

FIG. 52 shows a logic flow diagram illustrating example aspects of social merchant consumer bridging in some embodiments of the WIP, e.g., a Social Merchant Consumer Bridging ("SMCB") component 5200. In some implementations, a social pay server may be triggered to provide services that bridge consumers and merchants over social networks, e.g., 5201. Upon obtaining a trigger to perform merchant-consumer bridging, the social pay server may invoke a transaction data aggregation component such as the TDA component 2600 described further below in the discussion with reference to FIG. 26, e.g., 5202. The social pay server may query a social pay database for offer generation rules, e.g., 5203. For example, the social pay server may utilize PHP/SQL commands similar to the other examples described herein. In response, the database may provide the requested offer generation rules, e.g., 5204. Using the aggregated transaction data and the offer generation rules, the social pay server may generate merchant(s) offer social post messages for posting to profiles of the user on social networks, e.g., 5205. For example, the social pay server may invoke a transaction-based offer generation component, such as the example UBOR 3900 component described further below in the discussion with reference to FIG. 39. The social pay server may provide the generated social post messages to a social network server. The social network server may store the social post messages to a social network database for distribution to the user (e.g., when the user logs onto the social networking service provided by the social network server). In some embodiments, the social network server may generate, using social graph data of the user, social post messages for the user and/or members of the user's social graph, e.g., 5206, and store the social post message in a social network database for posting to their profiles, e.g., 5207.

Figure 53:
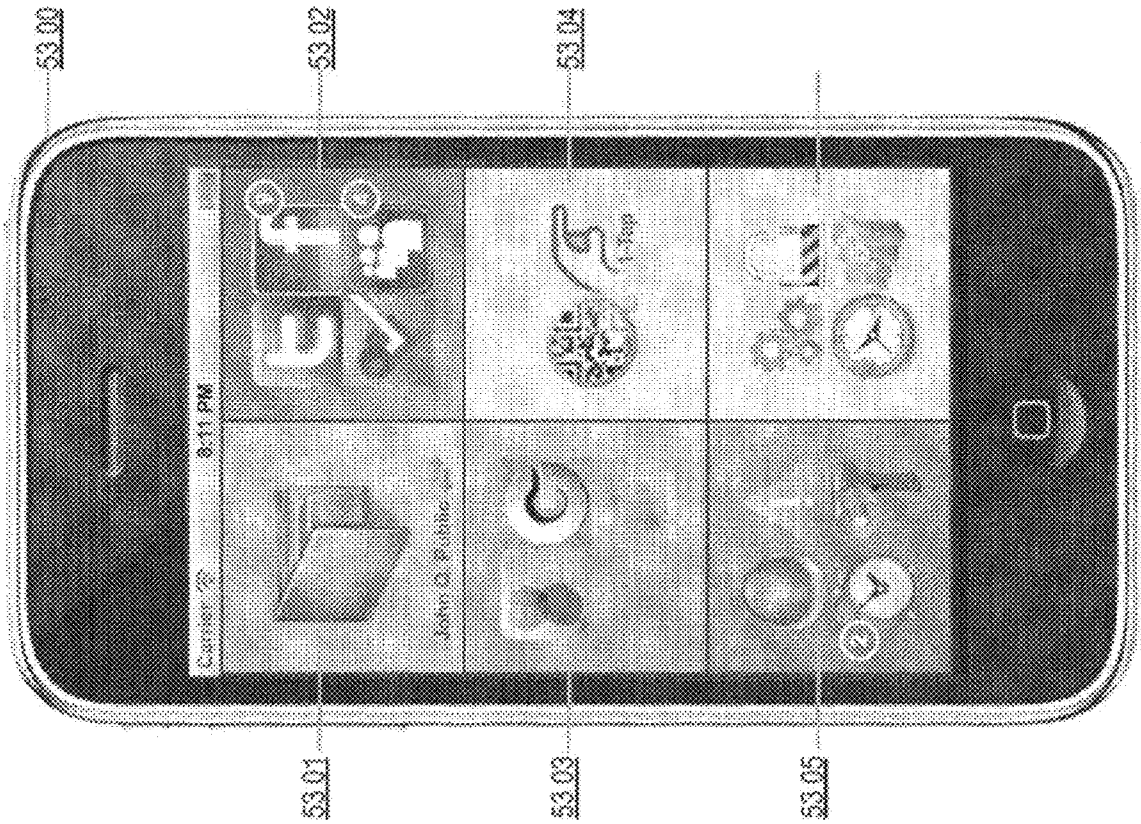
FIG. 53 shows a user interface diagram illustrating an overview of example features of virtual wallet applications in some embodiments of the WIP.

FIG. 53 shows a user interface diagram illustrating an overview of example features of virtual wallet applications in some embodiments of the WIP. FIG. 53 shows an illustration of various exemplary features of a virtual wallet mobile application 5300. Some of the features displayed include a wallet 5301, social integration via TWITTER, FACEBOOK, etc. 5302, offers and loyalty 5303, snap mobile purchase 5304, alerts 5305 and security, setting and analytics 5306. These features are explored in further detail below.

Figure 54A:
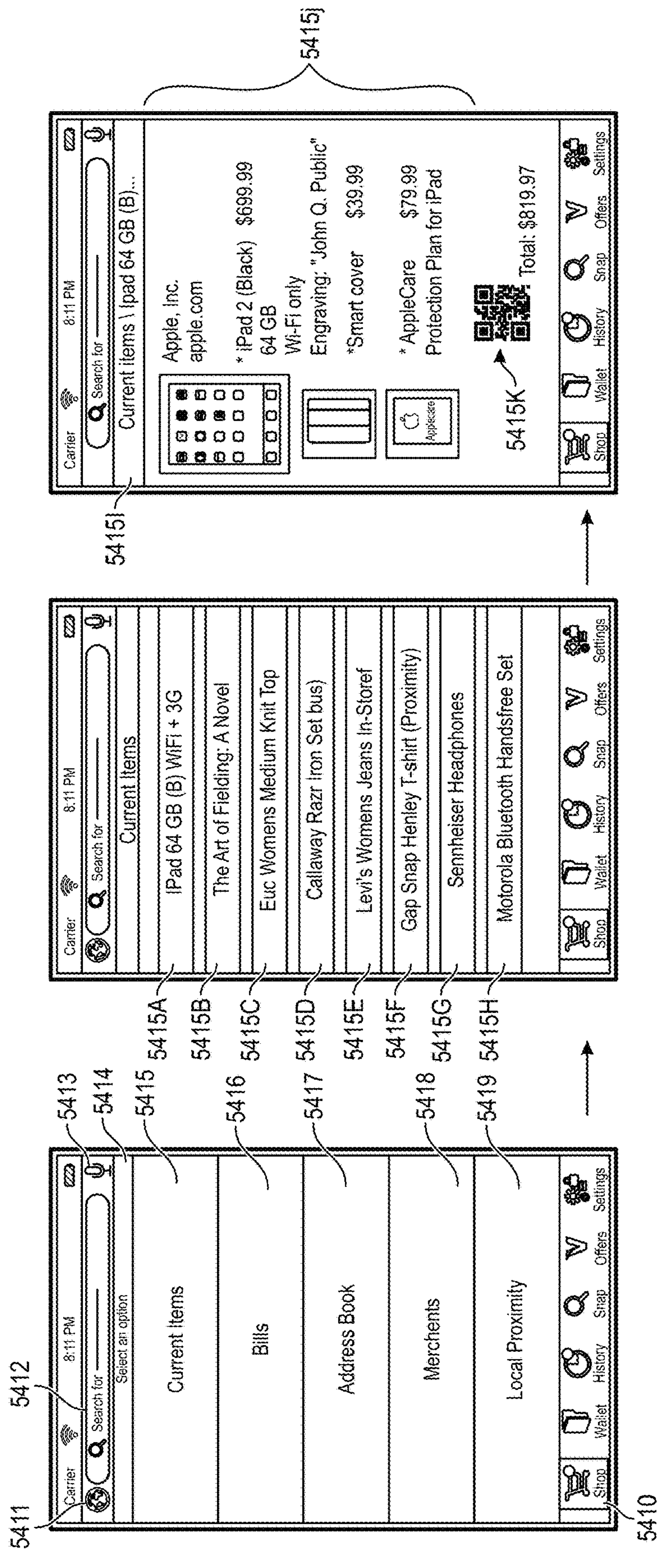
FIGS. 54A-G show user interface diagrams illustrating example features of virtual wallet applications in a shopping mode, in some embodiments of the WIP.

FIGS. 54A-G show user interface diagrams illustrating example features of virtual wallet applications in a shopping mode, in some embodiments of the WIP. With reference to FIG. 54A, some embodiments of the virtual wallet mobile app facilitate and greatly enhance the shopping experience of consumers. A variety of shopping modes, as shown in FIG. 54A, may be available for a consumer to peruse. In one implementation, for example, a user may launch the shopping mode by selecting the shop icon 5410 at the bottom of the user interface. A user may type in an item in the search field 5412 to search and/or add an item to a cart 5411. A user may also use a voice activated shopping mode by saying the name or description of an item to be searched and/or added to the cart into a microphone 5413. In a further implementation, a user may also select other shopping options 5414 such as current items 5415, bills 5416, address book 5417, merchants 5418 and local proximity 5419.

In one embodiment, for example, a user may select the option current items 5415, as shown in the left most user interface of FIG. 54A. When the current items 5415 option is selected, the middle user interface may be displayed. As shown, the middle user interface may provide a current list of items 5415*a-h* in a user's shopping cart 5411. A user may select an item, for example item 5415*a*, to view product description 5415*j* of the selected item and/or other items from the same merchant. The price and total payable information may also be displayed, along with a QR code 5415*k* that captures the information necessary to effect a snap mobile purchase transaction.

Figure 54B:
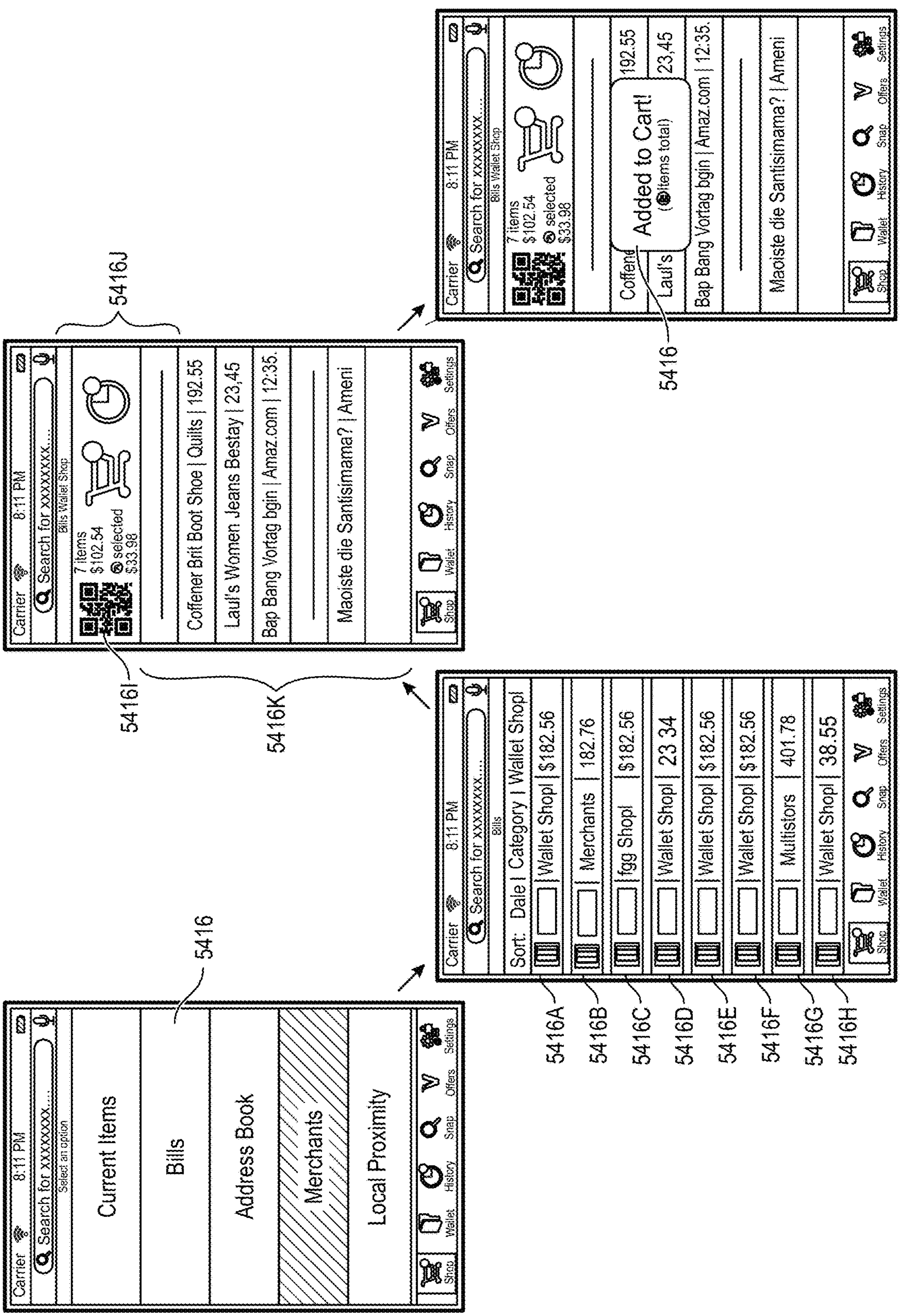

With reference to FIG. 54B, in another embodiment, a user may select the bills 5416 option. Upon selecting the bills 5416 option, the user interface may display a list of bills and/or receipts 5416*a-h* from one or more merchants. Next to each of the bills, additional information such as date of visit, whether items from multiple stores are present, last bill payment date, auto-payment, number of items, and/or the like may be displayed. In one example, the wallet shop bill 5416*a* dated Jan. 20, 2011 may be selected. The wallet shop bill selection may display a user interface that provides a variety of information regarding the selected bill. For example, the user interface may display a list of items 5416*k* purchased, <<5416*i*>>, a total number of items and the corresponding value. For example, 7 items worth $102.54 were in the selected wallet shop bill. A user may now select any of the items and select buy again to add purchase the items. The user may also refresh offers 5416*j* to clear any invalid offers from last time and/or search for new offers that may be applicable for the current purchase. As shown in FIG. 54B, a user may select two items for repeat purchase. Upon addition, a message 54161 may be displayed to confirm the addition of the two items, which makes the total number of items in the cart 14.

Figure 54C:
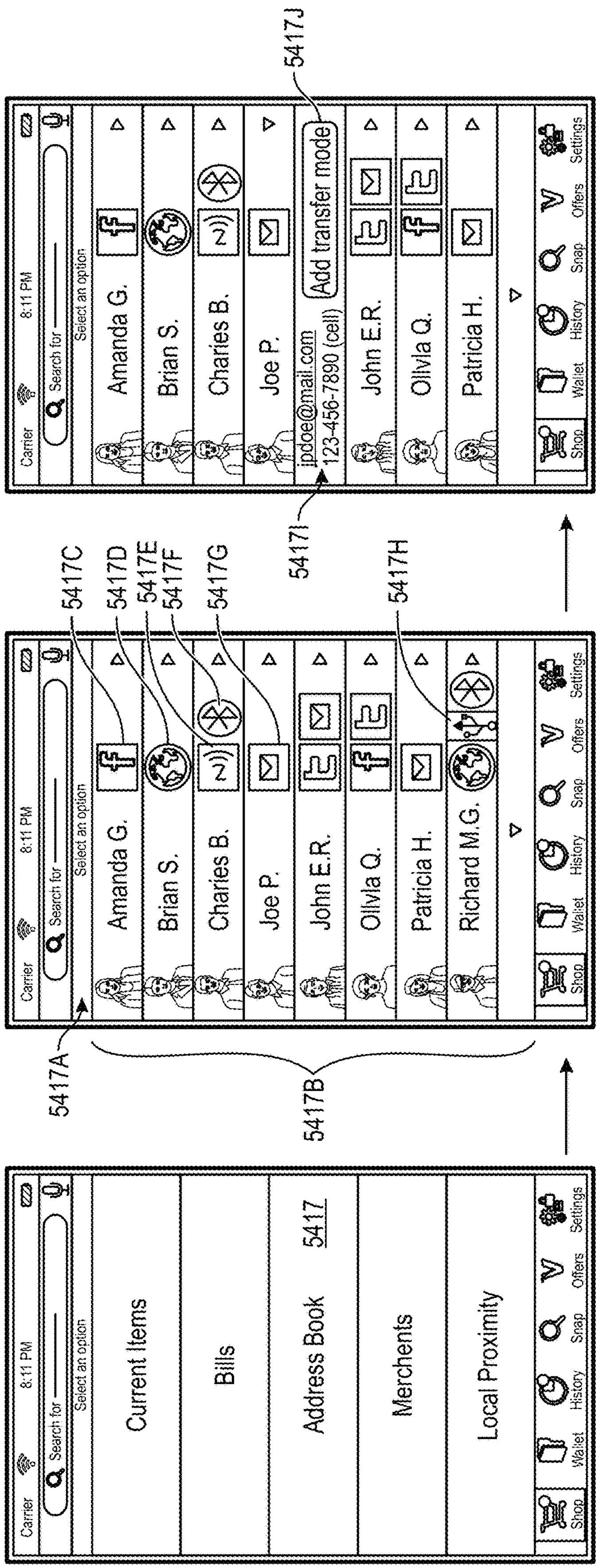

With reference to FIG. 54C, in yet another embodiment, a user may select the address book option 5417 to view the address book 5417 which includes a list of contacts 5417*b* and make any money transfers or payments. In one embodiment, the address book may identify each contact using their names and available and/or preferred modes of payment. For example, a contact Amanda G. may be paid via social pay (e.g., via FACEBOOK) as indicated by the icon 5417*c*. In another example, money may be transferred to Brian S. via QR code as indicated by the QR code icon 5417*d*. In yet another example, Charles B. may accept payment via near field communication 5417*e*, Bluetooth 5417*f* and email 5417*g*. Payment may also be made via USB 5417*h* (e.g., by physically connecting two mobile devices) as well as other social channels such as TWITTER.

Figure 54D:
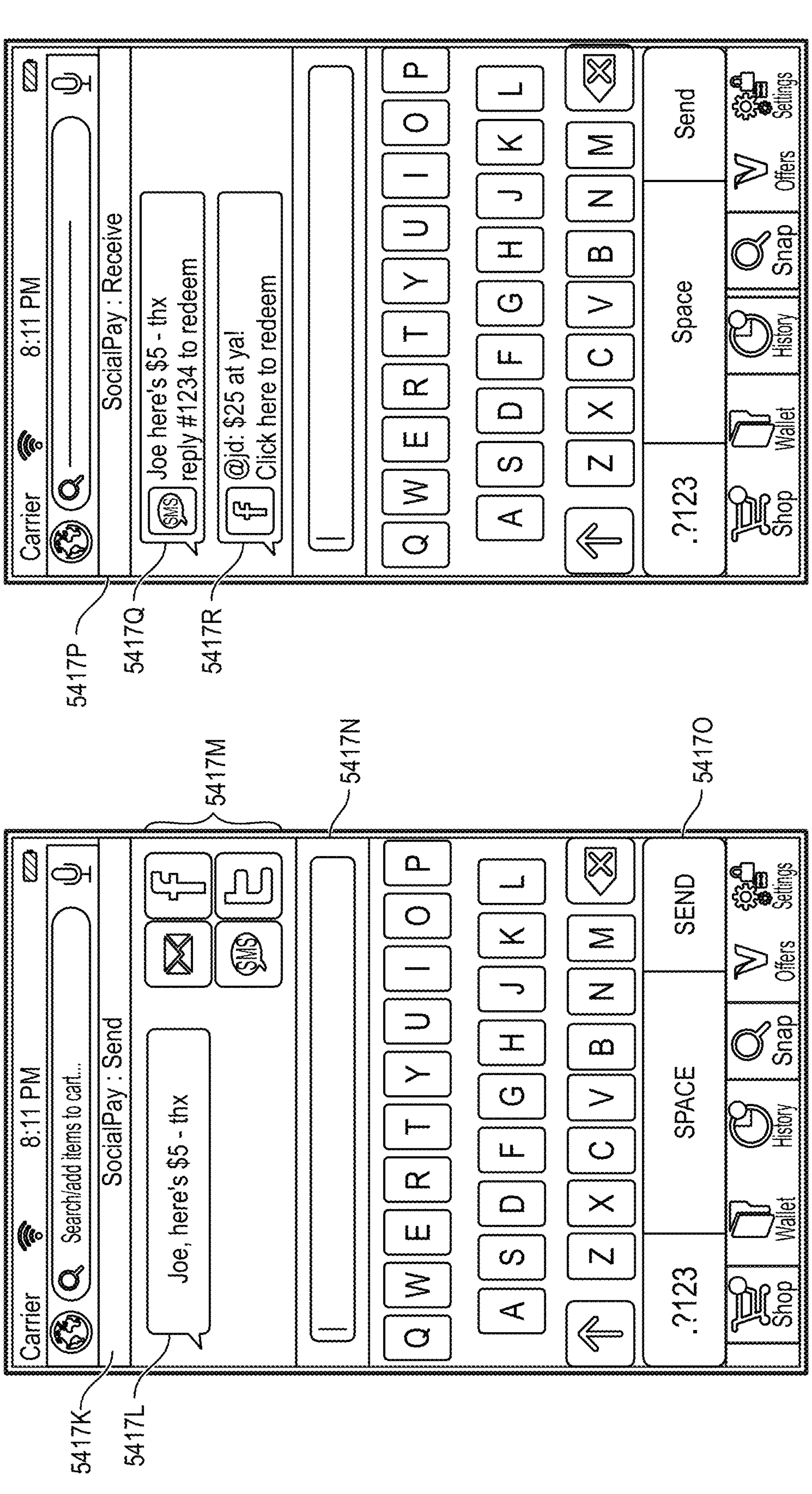

In one implementation, a user may select Joe P. for payment. Joe P., as shown in the user interface, has an email icon 5417*g* next to his name indicating that Joe P. accepts payment via email. When his name is selected, the user interface may display his contact information such as email, phone, etc. If a user wishes to make a payment to Joe P. by a method other than email, the user may add another transfer mode 5417*j* to his contact information and make a payment transfer. With reference to FIG. 54D, the user may be provided with a screen 5417*k* where the user can enter an amount to send Joe, as well as add other text to provide Joe with context for the payment transaction 5417*l*. The user can choose modes (e.g., SMS, email, social networking) via which Joe may be contacted via graphical user interface elements, 5417*m*. As the user types, the text entered may be provided for review within a GUI element 5417*n*. When the user has completed entering in the necessary information, the user can press the send button 5417*o* to send the social message to Joe. If Joe also has a virtual wallet application, Joe may be able to review 5417*p* social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 54D, the SMS 5417*q* Joe received indicates that Joe can redeem the $5 obtained via SMS by replying to the SMS and entering the hash tag value 41234'. In the same illustration, Joe has also received a message 5417*r* via Facebook®, which includes a URL link that Joe can activate to initiate redemption of the $25 payment.

Figure 54E:
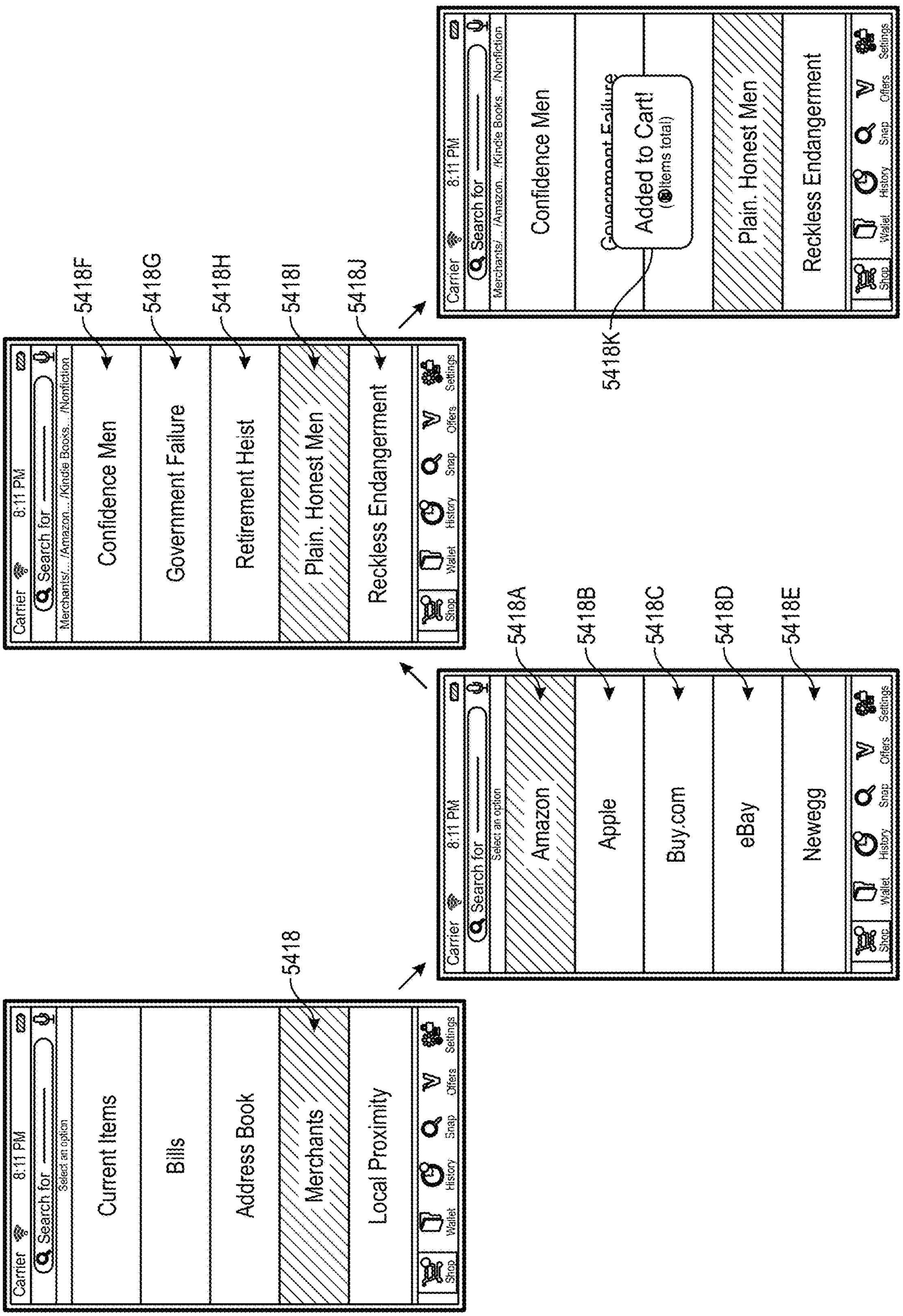

With reference to FIG. 54E, in some other embodiments, a user may select merchants 5418 from the list of options in the shopping mode to view a select list of merchants 5418*a-e*. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 5418*a* for example. The user may then navigate through the merchant's listings to find items of interest such as 5418*f-j*. Directly through the wallet and without visiting the merchant site from a separate page, the user may make a selection of an item 5418*j* from the catalog of Amazon 5418*a*. As shown in the right most user interface of FIG. 54D, the selected item may then be added to cart. The message 5418*k* indicates that the selected item has been added to the cart, and updated number of items in the cart is now 13.

Figure 54F:
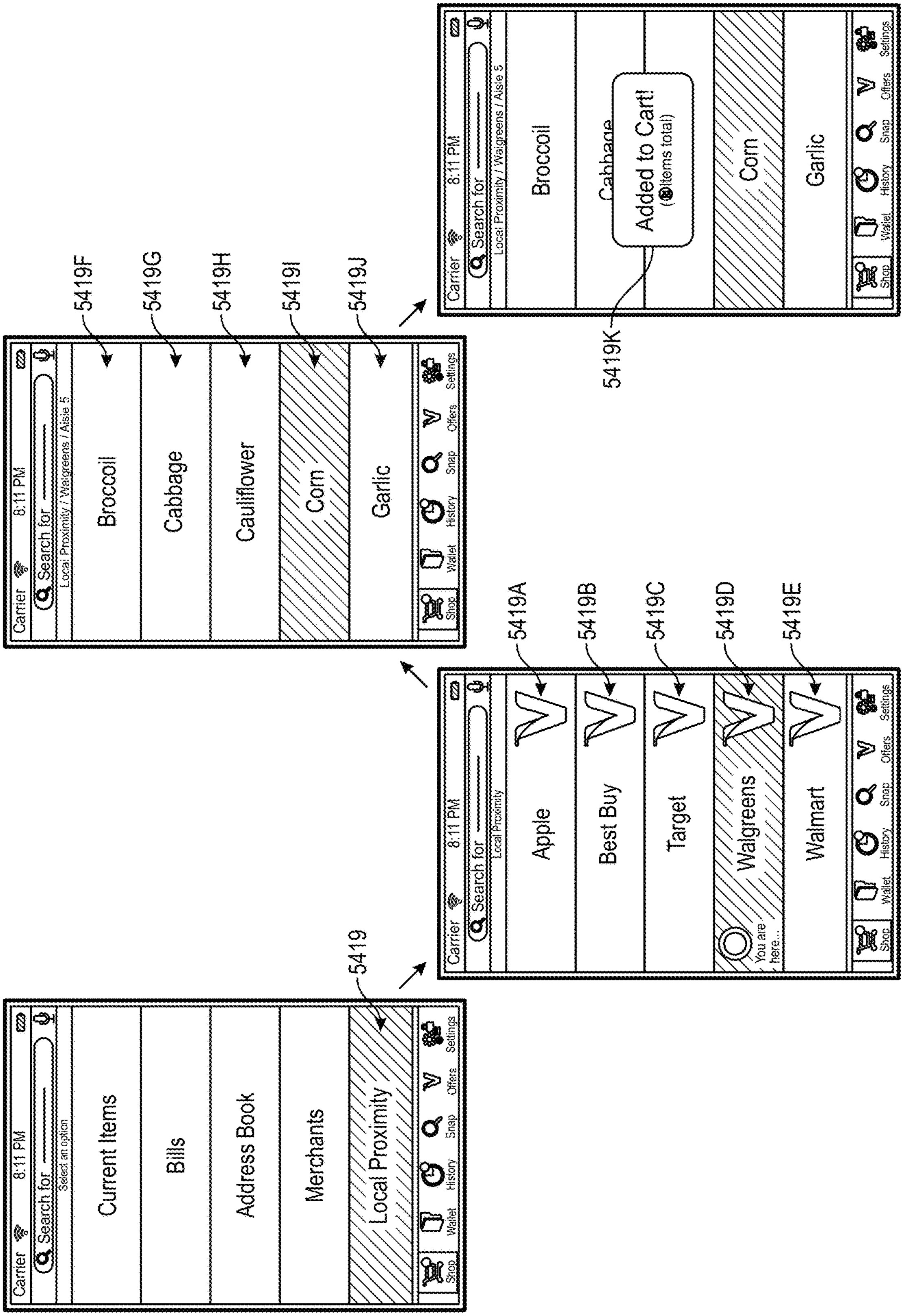

With reference to FIG. 54F, in one embodiment, there may be a local proximity option 5419 which may be selected by a user to view a list of merchants that are geographically in close proximity to the user. For example, the list of merchants 5419*a-e* may be the merchants that are located close to the user. In one implementation, the mobile application may further identify when the user in a store based on the user's location. For example, position icon 5419*d* may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 5419*f-j* available on aisle 5 of Walgreens. In one implementation, the user may select corn 5419*i* from his or her mobile application to add to cart 5419*k*.

Figure 54G:
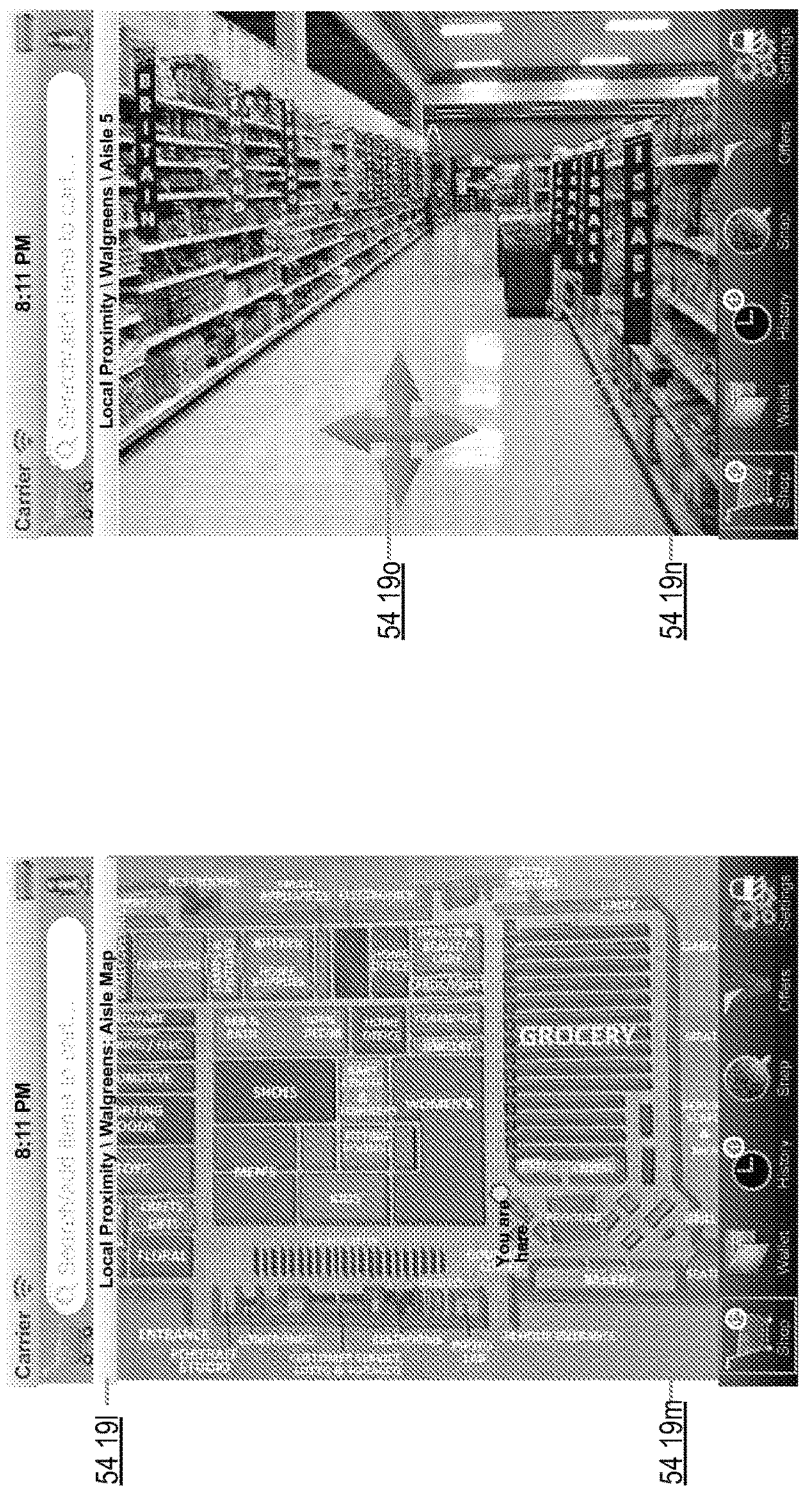
Figure 55A:
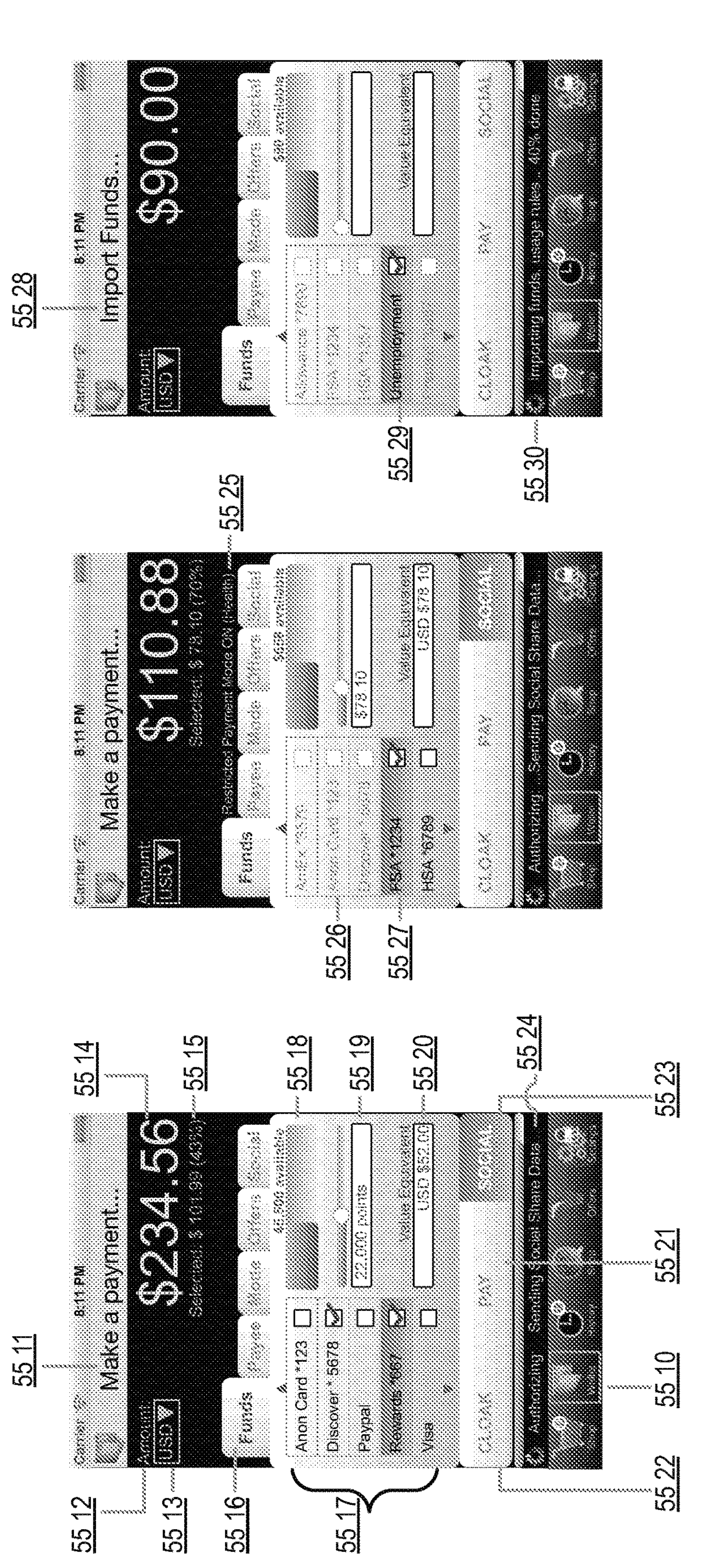
FIGS. 55A-F show user interface diagrams illustrating example features of virtual wallet applications in a payment mode, in some embodiments of the WIP.

With reference to FIG. 54G, in another embodiment, the local proximity option 5419 may include a store map and a real time map features among others. For example, upon selecting the Walgreens store, the user may launch an aisle map 5419*l* which displays a map 5419*m* showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 5419*n* may display images/video of the user's surrounding. For example, if the user is about to enter aisle 5, the store view map may show the view of aisle 5. Further the user may manipulate the orientation of the map using the navigation tool 5419*o* to move the store view forwards, backwards, right, left as well clockwise and counterclockwise rotation FIGS. 55A-F show user interface diagrams illustrating example features of virtual wallet applications in a payment mode, in some embodiments of the WIP. With reference to FIG. 55A, in one embodiment, the wallet mobile application may provide a user with a number of options for paying for a transaction via the wallet mode 5510. In one implementation, an example user interface 5511 for making a payment is shown. The user interface may clearly identify the amount 5512 and the currency 5513 for the transaction. The amount may be the amount payable and the currency may include real currencies such as dollars and euros, as well as virtual currencies such as reward points. The amount of the transaction 5514 may also be prominently displayed on the user interface. The user may select the funds tab 5516 to select one or more forms of payment 5517, which may include various credit, debit, gift, rewards and/or prepaid cards. The user may also have the option of paying, wholly or in part, with reward points. For example, the graphical indicator 5518 on the user interface shows the number of points available, the graphical indicator 5519 shows the number of points to be used towards the amount due 234.56 and the equivalent 5520 of the number of points in a selected currency (USD, for example).

In one implementation, the user may combine funds from multiple sources to pay for the transaction. The amount 5515 displayed on the user interface may provide an indication of the amount of total funds covered so far by the selected forms of payment (e.g., Discover card and rewards points). The user may choose another form of payment or adjust the amount to be debited from one or more forms of payment until the amount 5515 matches the amount payable 5514. Once the amounts to be debited from one or more forms of payment are finalized by the user, payment authorization may begin.

In one implementation, the user may select a secure authorization of the transaction by selecting the cloak button 5522 to effectively cloak or anonymize some (e.g., preconfigured) or all identifying information such that when the user selects pay button 5521, the transaction authorization is conducted in a secure and anonymous manner. In another implementation, the user may select the pay button 5521 which may use standard authorization techniques for transaction processing. In yet another implementation, when the user selects the social button 5523, a message regarding the transaction may be communicated to one of more social networks (set up by the user) which may post or announce the purchase transaction in a social forum such as a wall post or a tweet. In one implementation, the user may select a social payment processing option 5523. The indicator 5524 may show the authorizing and sending social share data in progress.

In another implementation, a restricted payment mode 5525 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 5526 under the funds tab to select specialized accounts such as a flexible spending account (FSA) 5527, health savings account (HAS), and/or the like and amounts to be debited to the selected accounts. In one implementation, such restricted payment mode 5025 processing may disable social sharing of purchase information.

In one embodiment, the wallet mobile application may facilitate importing of funds via the import funds user interface 5528. For example, a user who is unemployed may obtain unemployment benefit fund 5529 via the wallet mobile application. In one implementation, the entity providing the funds may also configure rules for using the fund as shown by the processing indicator message 5530. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 55B:
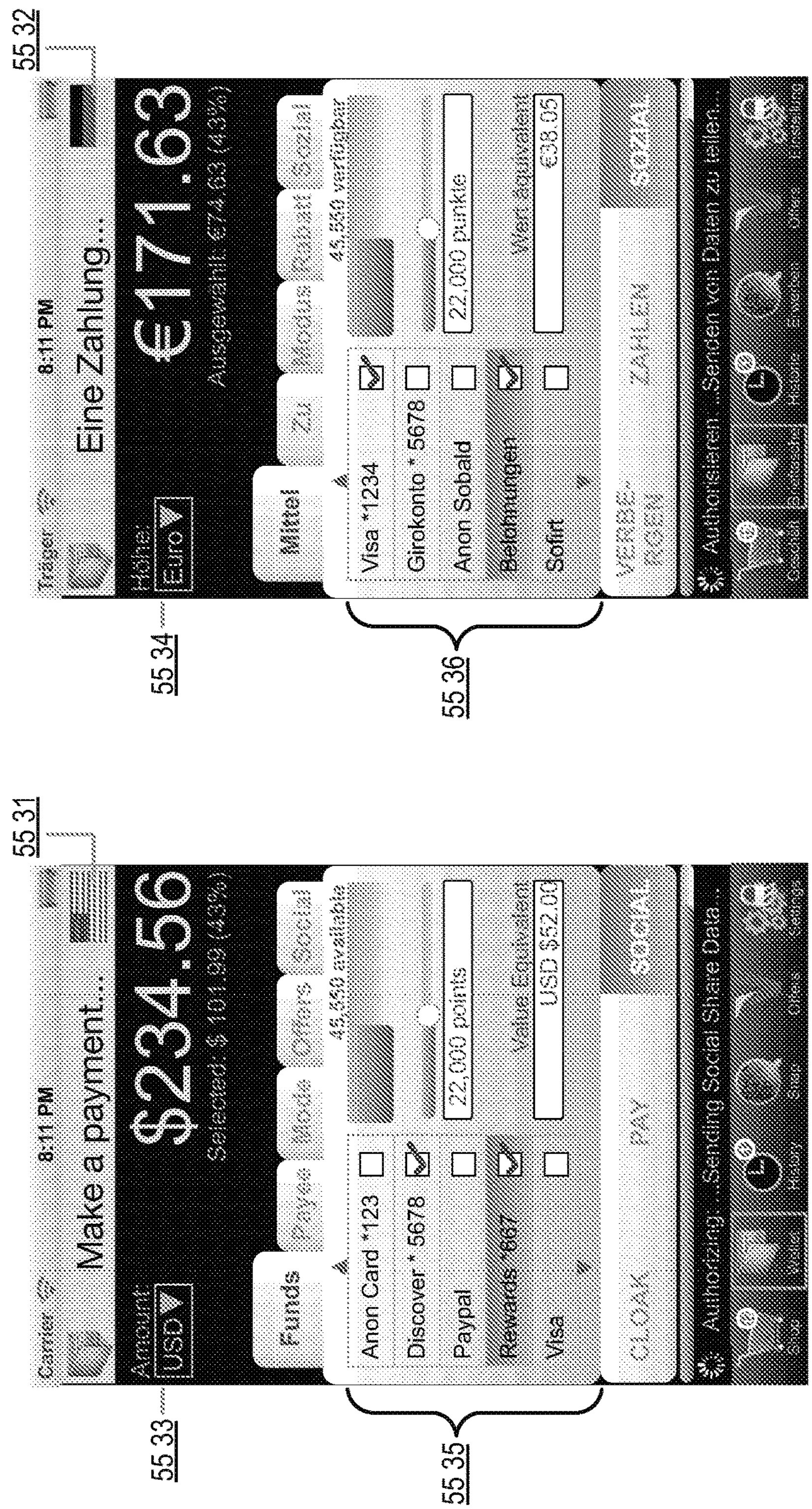

With reference to FIG. 55B, in one embodiment, the wallet mobile application may facilitate dynamic payment optimization based on factors such as user location, preferences and currency value preferences among others. For example, when a user is in the United States, the country indicator 5531 may display a flag of the United States and may set the currency 5533 to the United States. In a further implementation, the wallet mobile application may automatically rearrange the order in which the forms of payments 5535 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 5532 and the currency 5534. In a further implementation, the wallet application may rearrange the order in which different forms of payment 5536 are listed based on their acceptance level in that country. Of course, the order of these forms of payments may be modified by the user to suit his or her own preferences.

Figure 55C:
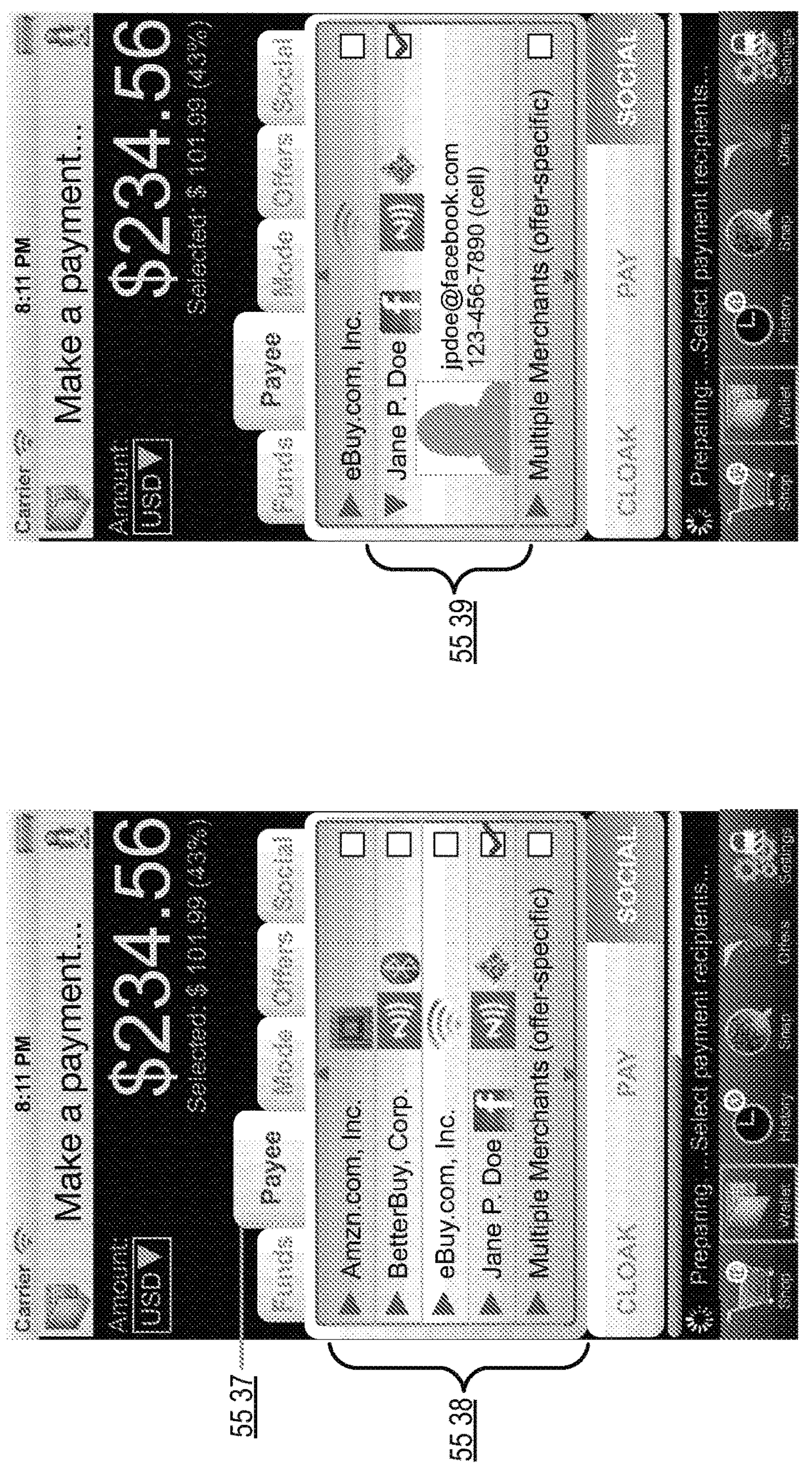

With reference to FIG. 55C, in one embodiment, the payee tab 5537 in the wallet mobile application user interface may facilitate user selection of one or more payees receiving the funds selected in the funds tab. In one implementation, the user interface may show a list of all payees 5538 with whom the user has previously transacted or available to transact. The user may then select one or more payees. The payees 5538 may include larger merchants such as Amazon.com Inc., and individuals such as Jane P. Doe. Next to each payee name, a list of accepted payment modes for the payee may be displayed. In one implementation, the user may select the payee Jane P. Doe 5539 for receiving payment. Upon selection, the user interface may display additional identifying information relating to the payee.

Figure 55D:

With reference to FIG. 55D, in one embodiment, the mode tab 5040 may facilitate selection of a payment mode accepted by the payee. A number of payment modes may be available for selection. Example modes include, blue tooth 5541, wireless 5542, snap mobile by user-obtained QR code 5543, secure chip 5544, TWITTER 5545, near-field communication (NFC) 5546, cellular 5547, snap mobile by user-provided QR code 5548, USB 5549 and FACEBOOK 5555, among others. In one implementation, only the payment modes that are accepted by the payee may be selectable by the user. Other non-accepted payment modes may be disabled.

Figure 55E:
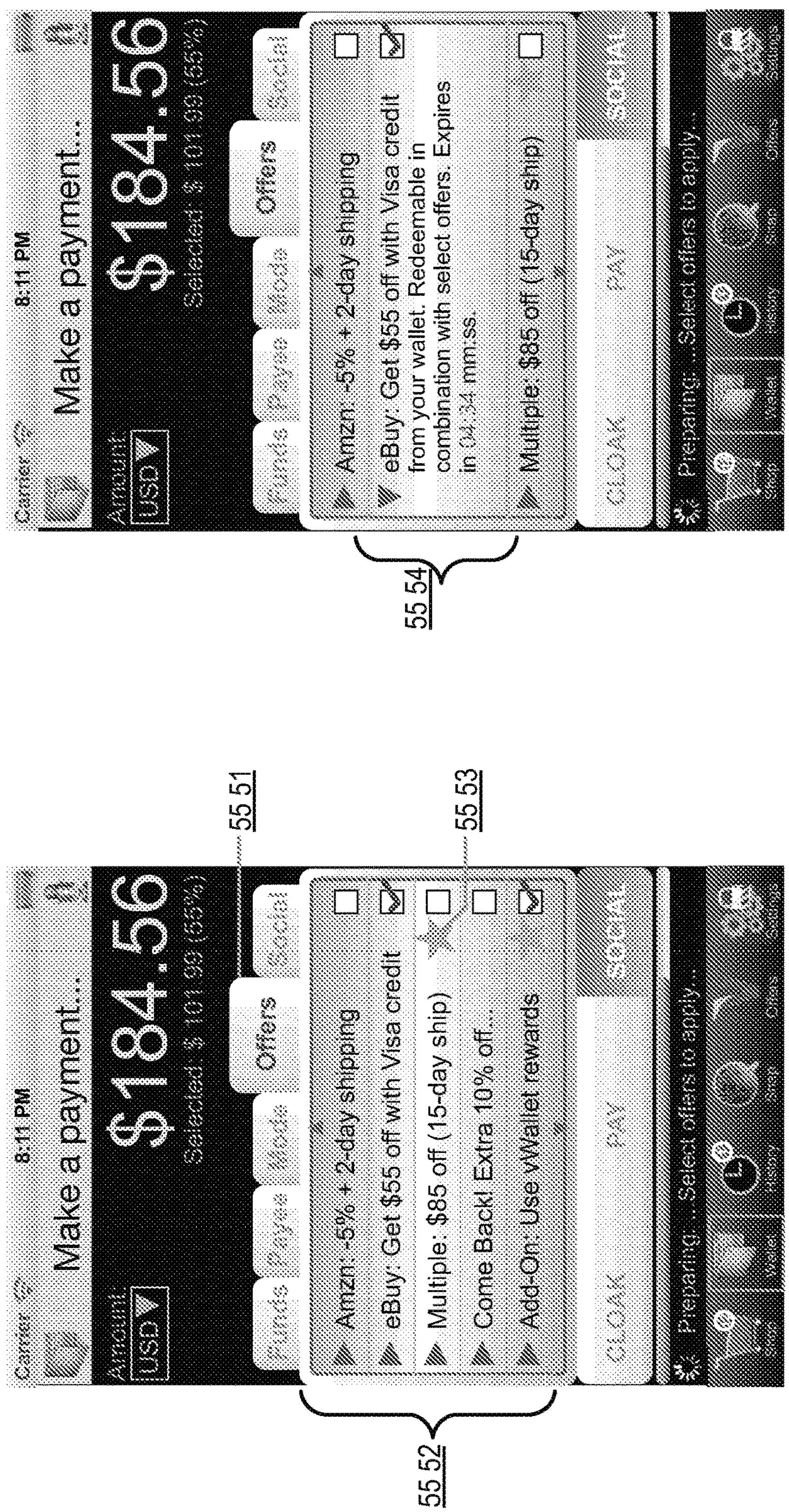

With reference to FIG. 55E, in one embodiment, the offers tab 5551 may provide real-time offers that are relevant to items in a user's cart for selection by the user. The user may select one or more offers from the list of applicable offers 5552 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 5553. In a further implementation, the user may read the details of the offer by expanding the offer row as shown by 5554 in the user interface.

Figure 55F:
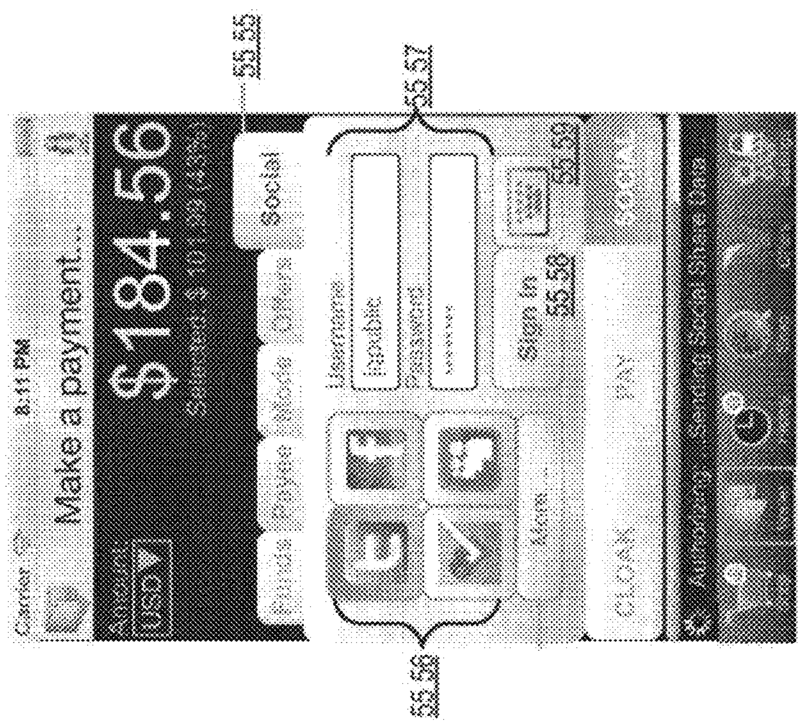

With reference to FIG. 55F, in one embodiment, the social tab 5555 may facilitate integration of the wallet application with social channels 5556. In one implementation, a user may select one or more social channels 5556, 5560 and may sign in to the selected social channel from the wallet application by providing to the wallet application the social channel user name and password 5557 and signing in 5558. The user may then use the social button 5559 to send or receive money through the integrated social channels. In a further implementation, the user may send social share data such as purchase information or links through integrated social channels. In another embodiment, the user supplied login credentials may allow WIP to engage in interception parsing.

Figure 56:
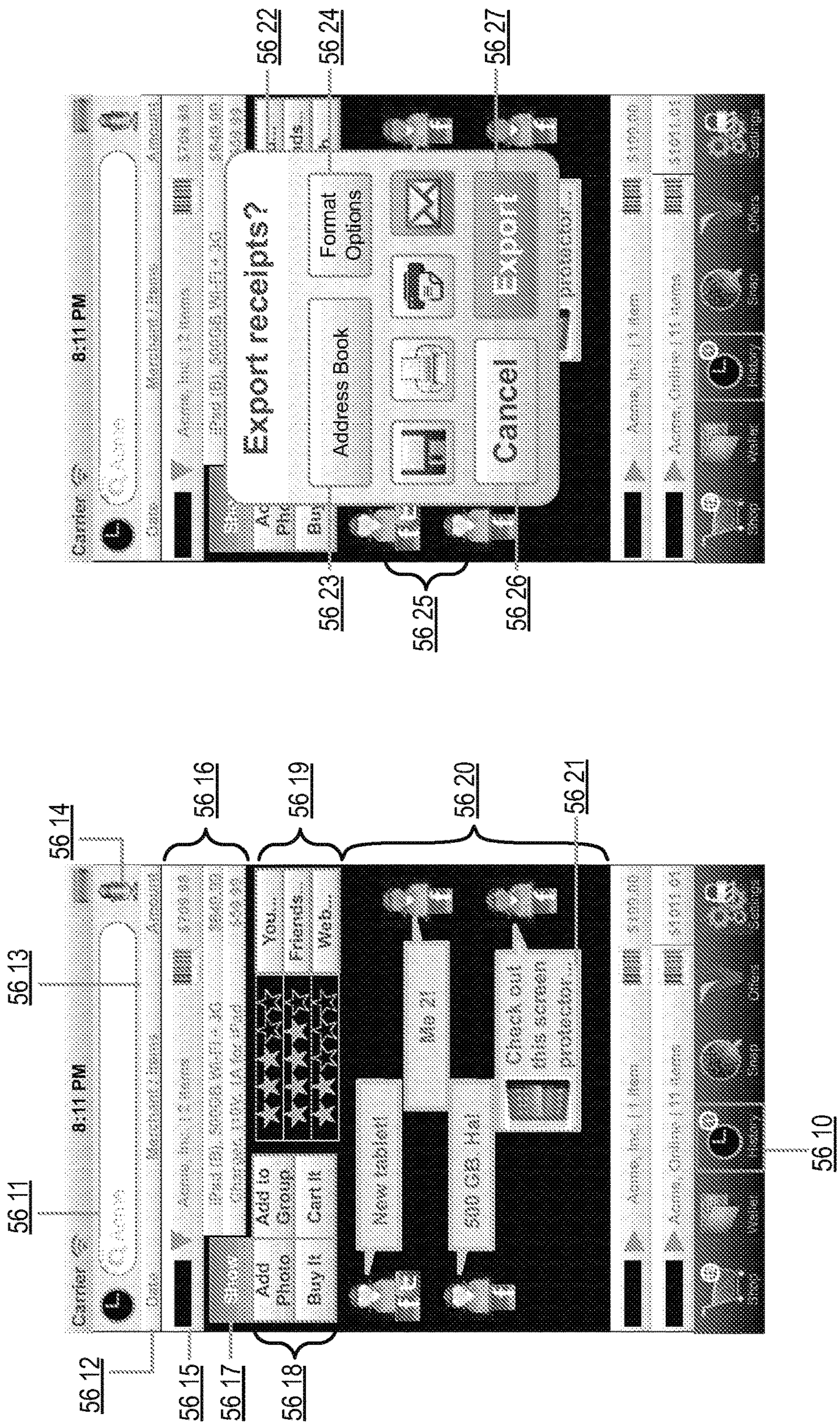
FIG. 56 shows a user interface diagram illustrating example features of virtual wallet applications, in a history mode, in some embodiments of the WIP.

FIG. 56 shows a user interface diagram illustrating example features of virtual wallet applications, in a history mode, in some embodiments of the WIP. In one embodiment, a user may select the history mode 5610 to view a history of prior purchases and perform various actions on those prior purchases. For example, a user may enter a merchant identifying information such as name, product, MCC, and/or the like in the search bar 5611. In another implementation, the user may use voice activated search feature by clicking on the microphone icon 5614. The wallet application may query the storage areas in the mobile device or elsewhere (e.g., one or more databases and/or tables remote from the mobile device) for transactions matching the search keywords. The user interface may then display the results of the query such as transaction 5615. The user interface may also identify the date 5612 of the transaction, the merchants and items 5613 relating to the transaction, a barcode of the receipt confirming that a transaction was made, the amount of the transaction and any other relevant information.

In one implementation, the user may select a transaction, for example transaction 5615, to view the details of the transaction. For example, the user may view the details of the items associated with the transaction and the amounts 5616 of each item. In a further implementation, the user may select the show option 5617 to view actions 5618 that the user may take in regards to the transaction or the items in the transaction. For example, the user may add a photo to the transaction (e.g., a picture of the user and the iPad the user bought). In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 5619 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 5620 shows FACEBOOK message exchanges between two users. In one implementation, a user may share a link via a message 5621. Selection of such a message having embedded link to a product may allow the user to view a description of the product and/or purchase the product directly from the history mode.

In one embodiment, the history mode may also include facilities for exporting receipts. The export receipts pop up 5622 may provide a number of options for exporting the receipts of transactions in the history. For example, a user may use one or more of the options 5625, which include save (to local mobile memory, to server, to a cloud account, and/or the like), print to a printer, fax, email, and/or the like.

The user may utilize his or her address book 5623 to look up email or fax number for exporting. The user may also specify format options 5624 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 5627 to initiate export of receipts.

Figure 57A:
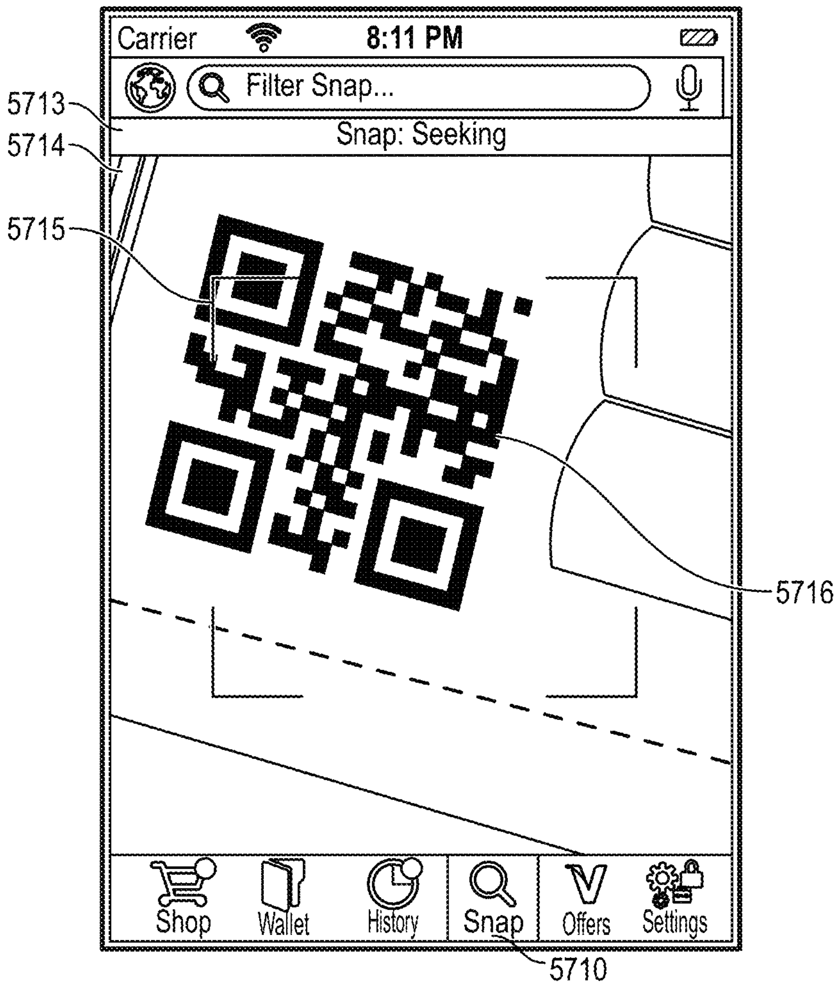
FIGS. 57A-E show user interface diagrams illustrating example features of virtual wallet applications in a snap mode, in some embodiments of the WIP.

FIGS. 57A-E show user interface diagrams illustrating example features of virtual wallet applications in a snap mode, in some embodiments of the WIP. With reference to FIG. 57A, in one embodiment, a user may select the snap mode 2110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 57A. A user may use his or her mobile phone to take a picture of a QR code 5715 and/or a barcode 5714 using an interface which includes an address bar icon and a microphone icon 5711, 5712. In one implementation, the bar 5713 and snap frame 5715 may assist the user in snapping codes properly. For example, the snap frame 5715, as shown, does not capture the entirety of the code 5716. As such, the code captured in this view may not be resolvable as information in the code may be incomplete. This is indicated by the message on the bar 5713 that indicates that the snap mode is still seeking the code. When the code 5716 is completely framed by the snap frame 5715, the bar message may be updated to, for example, "snap found." Upon finding the code, in one implementation, the user may initiate code capture using the mobile device camera. In another implementation, the snap mode may automatically snap the code using the mobile device camera.

Figure 57B:
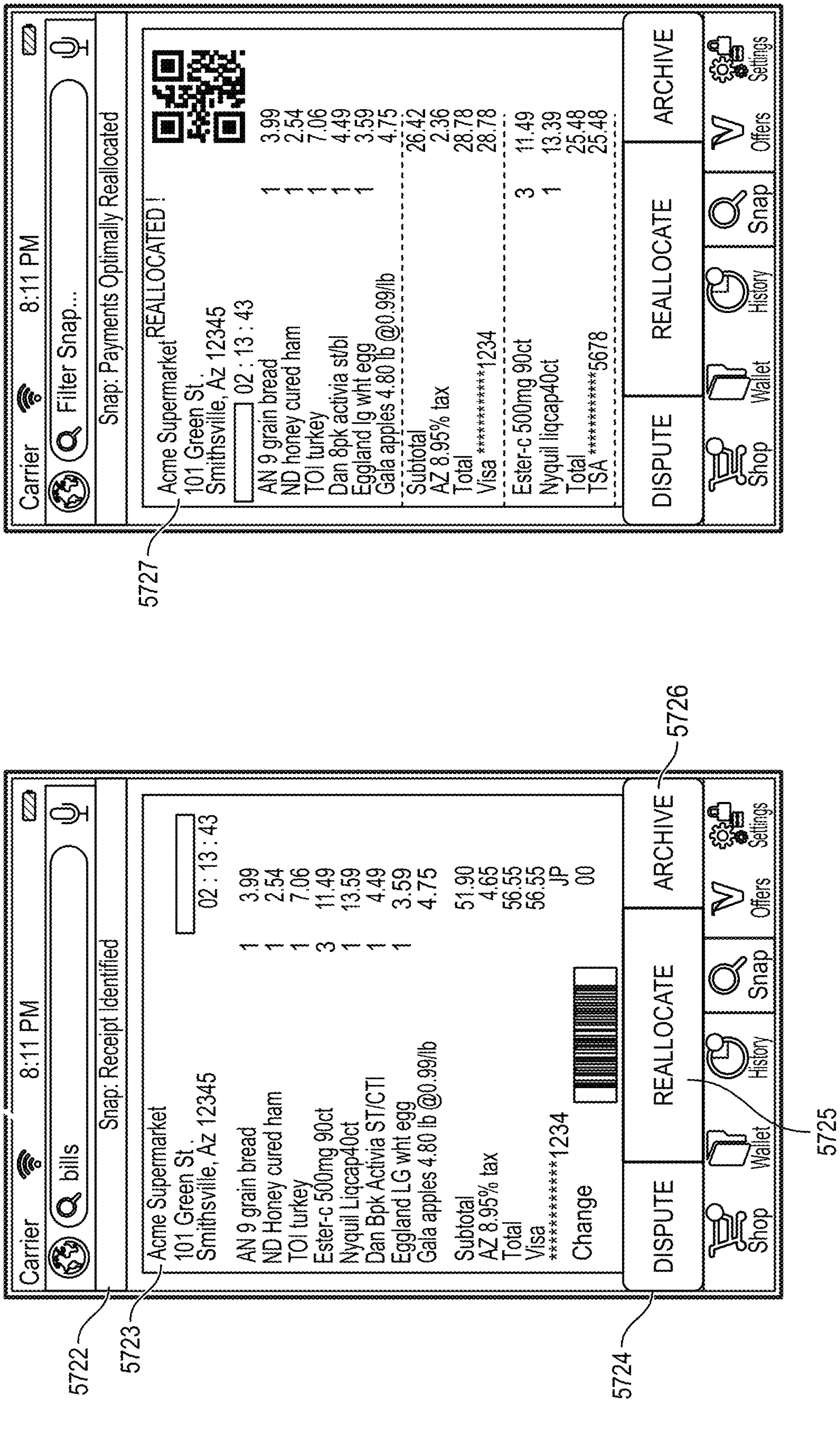

With reference to FIG. 57B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 5721. The user may then identify in the tab 5722 the receipt 5723 the user wants to reallocate. Alternatively, the user may directly snap a picture of a barcode on a receipt, and the snap mode may generate and display a receipt 5723 using information from the barcode. The user may now reallocate 5725. In some implementations, the user may also dispute the transaction 5724 or archive the receipt 5726.

In one implementation, when the reallocate button 5725 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 5727 may be generated after the completion of the reallocation process. As discussed, the receipt shows that some charges have been moved from the Visa account to the FSA.

Figure 57C:
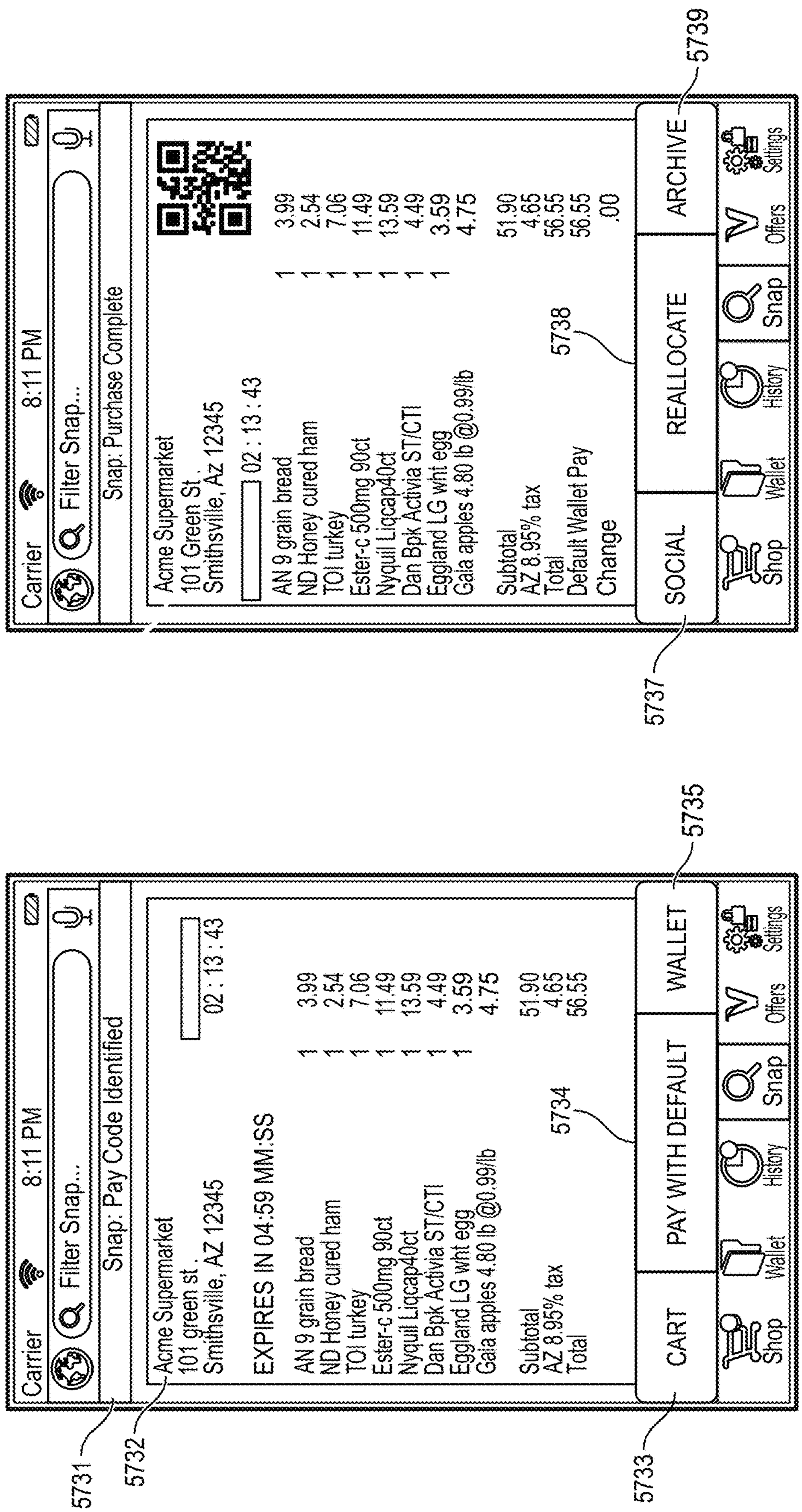

With reference to FIG. 57C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 5732, 5736. Once the QR code is identified, the navigation bar 5731 may indicate that the pay code is identified. The user may now have an option to add to cart 5733, pay with a default payment account 5734 or pay with wallet 5735.

In one implementation, the user may decide to pay with default 5734. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 5737 to share purchase information with others, reallocate 5738 as discussed with regard to FIG. 57B, and archive 5739 to store the receipt.

Figure 57D:
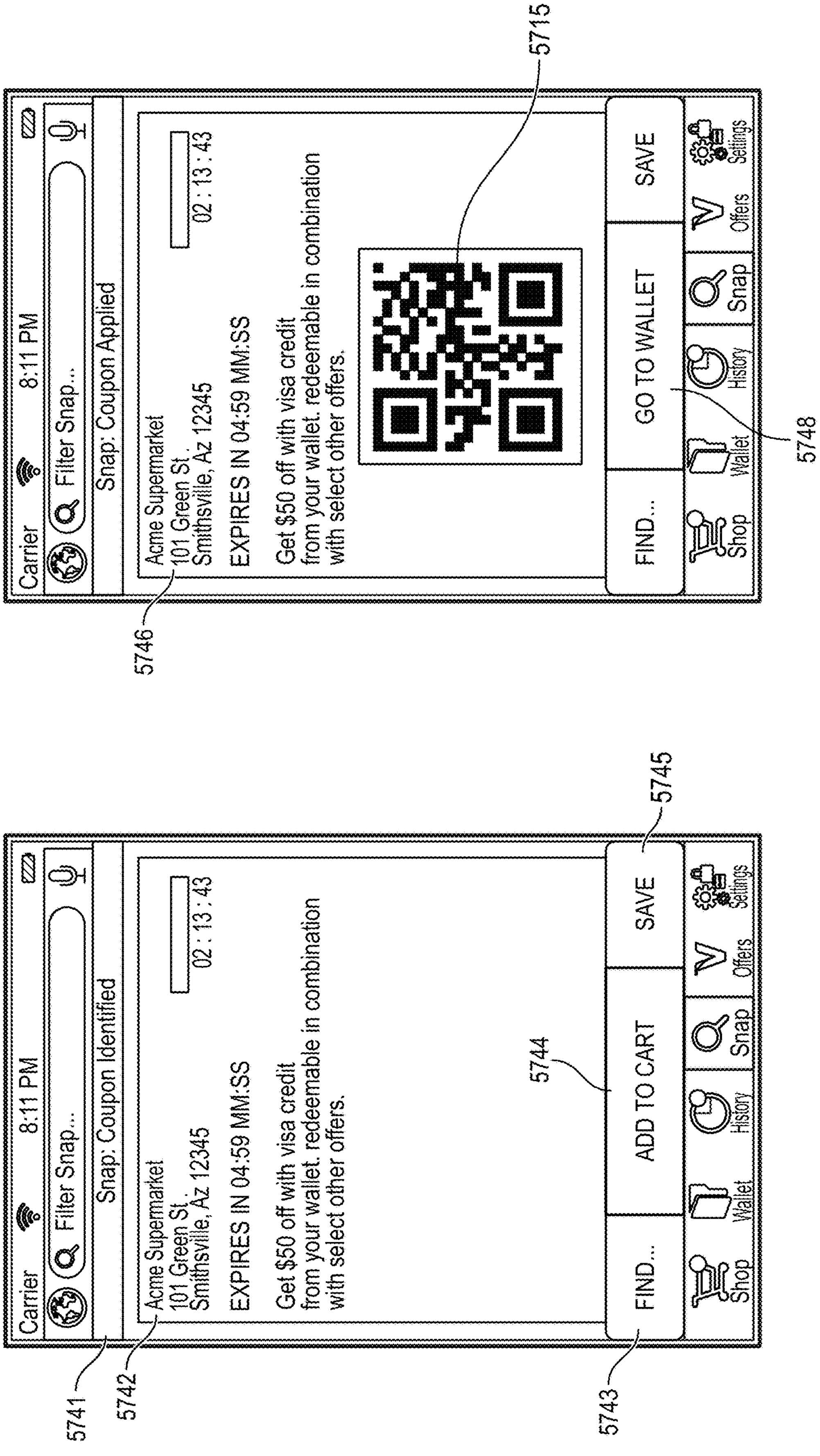

With reference to FIG. 57D, in one embodiment, the snap mode may also facilitate offer identification, application and storage for future use. For example, in one implementation, a user may snap an offer code 5741 (e.g., a bar code, a QR code 5747, and/or the like). The wallet application may then generate an offer text 5742 from the information encoded in the offer code. The user may perform a number of actions on the offer code. For example, the user use the find button 5743 to find all merchants who accept the offer code, merchants in the proximity who accept the offer code, products from merchants that qualify for the offer code, and/or the like. The user may also apply the offer code to items that are currently in the cart using the add to cart button 5744. Furthermore, the user may also save the offer for future use by selecting the save button 5745.

In one implementation, after the offer or coupon 5746 is applied, the user may have the option to find qualifying merchants and/or products using find, the user may go to the wallet using 5748, and the user may also save the offer or coupon 5746 for later use.

Figure 57E:
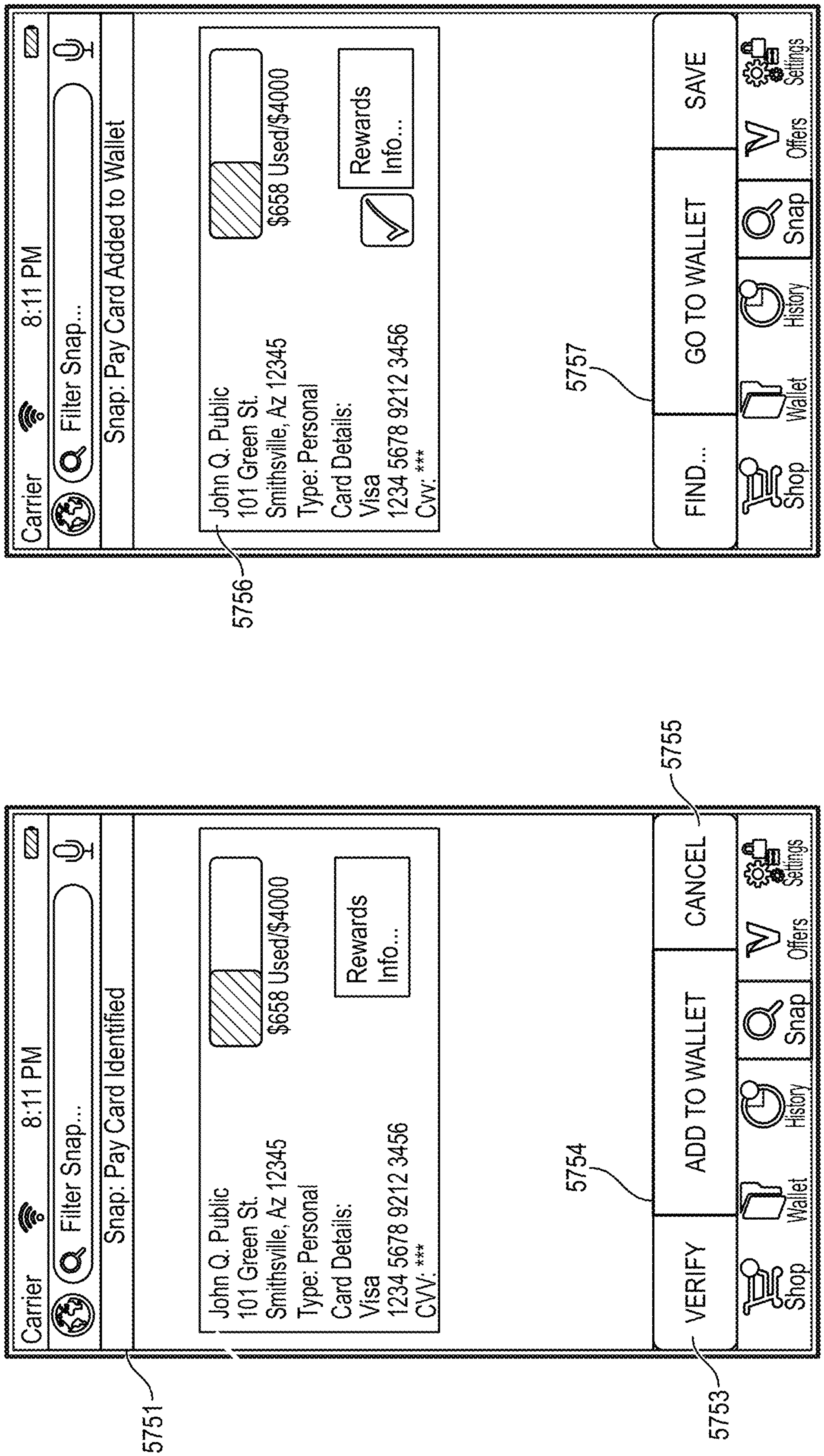

With reference to FIG. 57E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 5751 and may display the textual information 5752 encoded in the pay card. The user may then perform verification of the information 5752 by selecting the verify button 5753. In one implementation, the verification may include contacting the issuer of the pay card for confirmation of the decoded information 5752 and any other relevant information. In one implementation, the user may add the pay card to the wallet by selecting the 'add to wallet' button 5754. The instruction to add the pay card to the wallet may cause the pay card to appear as one of the forms of payment under the funds tab 5516 discussed in FIG. 55A. The user may also cancel importing of the pay card as a funding source by selecting the cancel button 5755. When the pay card has been added to the wallet, the user interface may be updated to indicate that the importing is complete via the notification display 5756. The user may then access the wallet 5757 to begin using the added pay card as a funding source.

Figure 58:
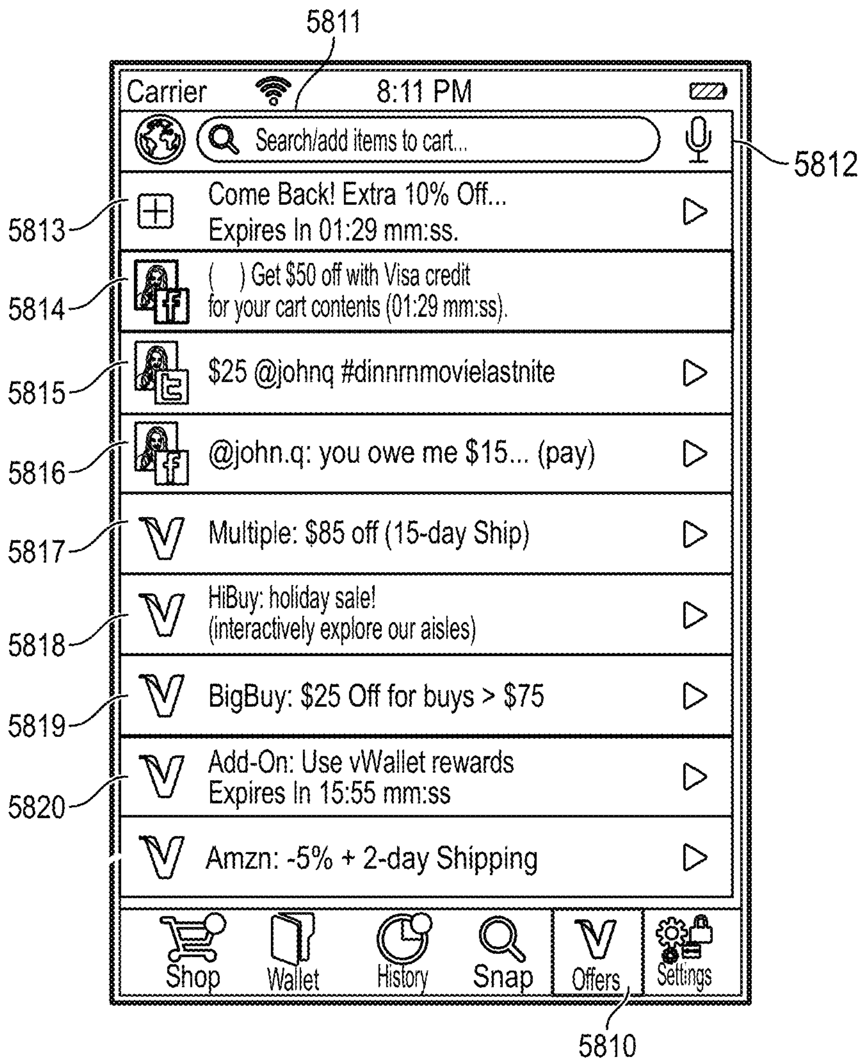
FIG. 58 shows a user interface diagram illustrating example features of virtual wallet applications, in an offers mode, in some embodiments of the WIP.

FIG. 58 shows a user interface diagram illustrating example features of virtual wallet applications, in an offers mode, in some embodiments of the WIP. In some implementations, the WIP may allow a user to search for offers for products and/or services from within the virtual wallet mobile application. For example, the user may enter text into a graphical user interface ("GUI") element 5811, or issue voice commands by activating GUI element 5812 and speaking commands into the device. In some implementations, the WIP may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 5813. For example, the offer may provide a discount, and may include an expiry time. In some implementations, other users may provide gifts (e.g., 5814) to the user, which the user may redeem. In some implementations, the offers section may include alerts as to payment of funds outstanding to other users (e.g., 5815). In some implementations, the offers section may include alerts as to requesting receipt of funds from other users (e.g., 5816). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the WIP, e.g., 5817-5819, 5820. These offers may sometimes be assembled using a combination of participating merchants, e.g., 5817. In some implementations, the WIP itself may provide offers for users contingent on the user utilizing particular payment forms from within the virtual wallet application, e.g., 5820, 5821.

Figure 59A:
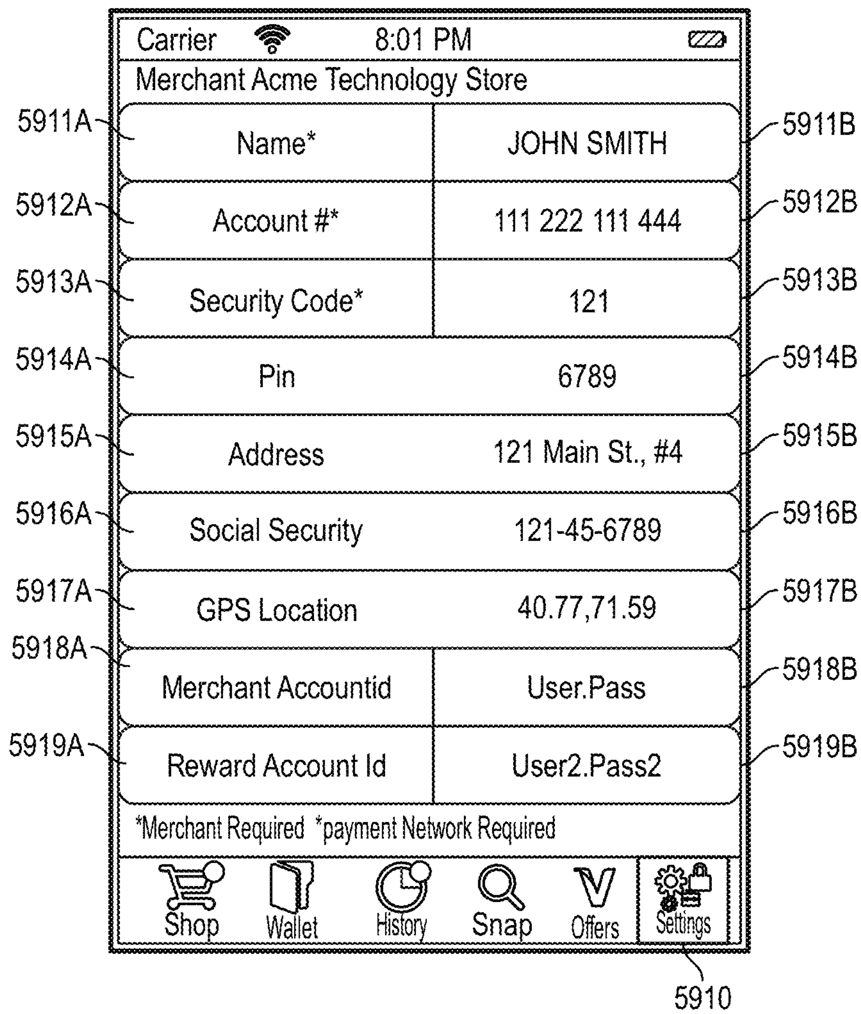
FIGS. 59A-B show user interface diagrams illustrating example features of virtual wallet applications, in a security and privacy mode, in some embodiments of the WIP.
Figure 59B:
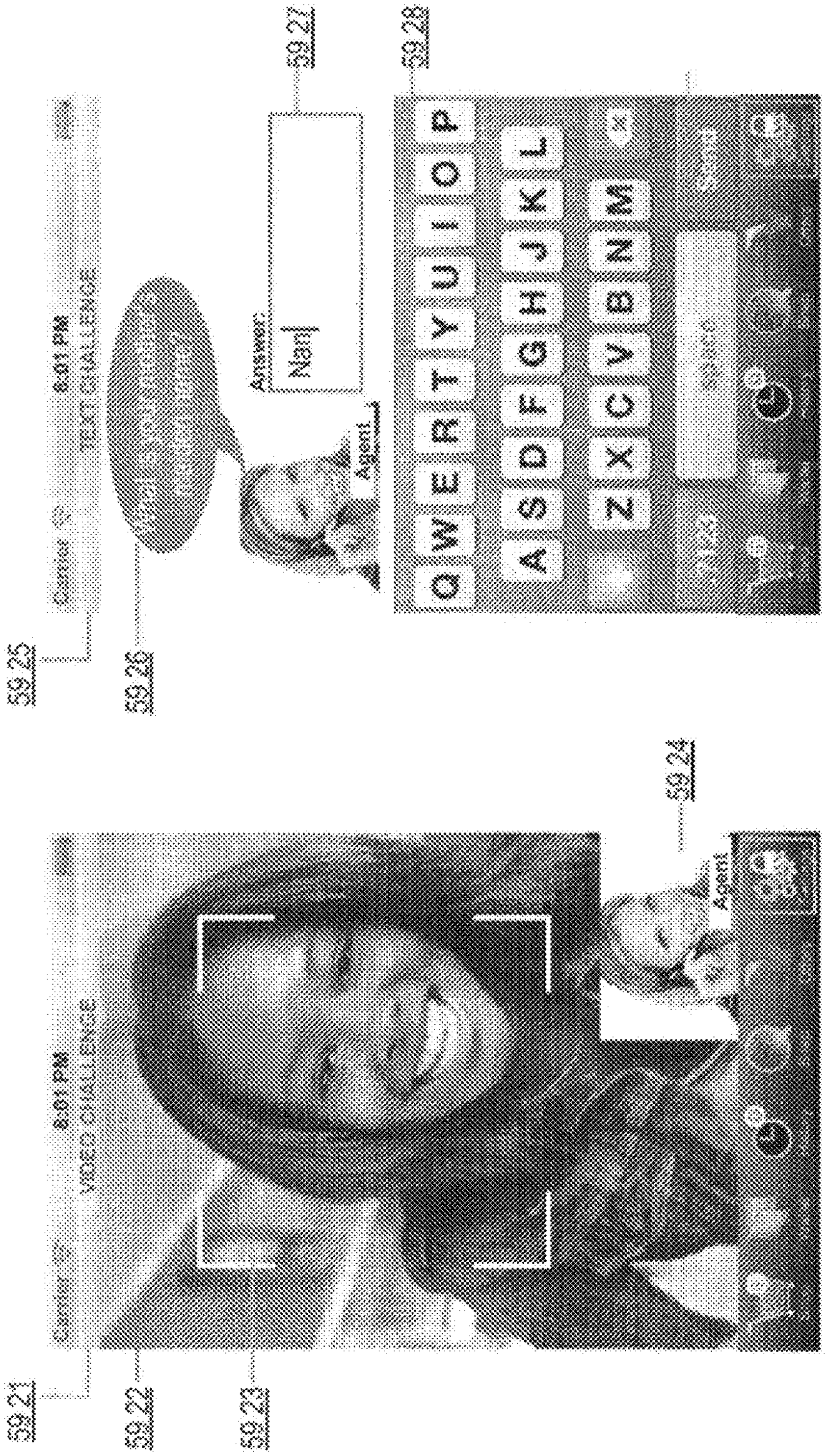
Figure 59:
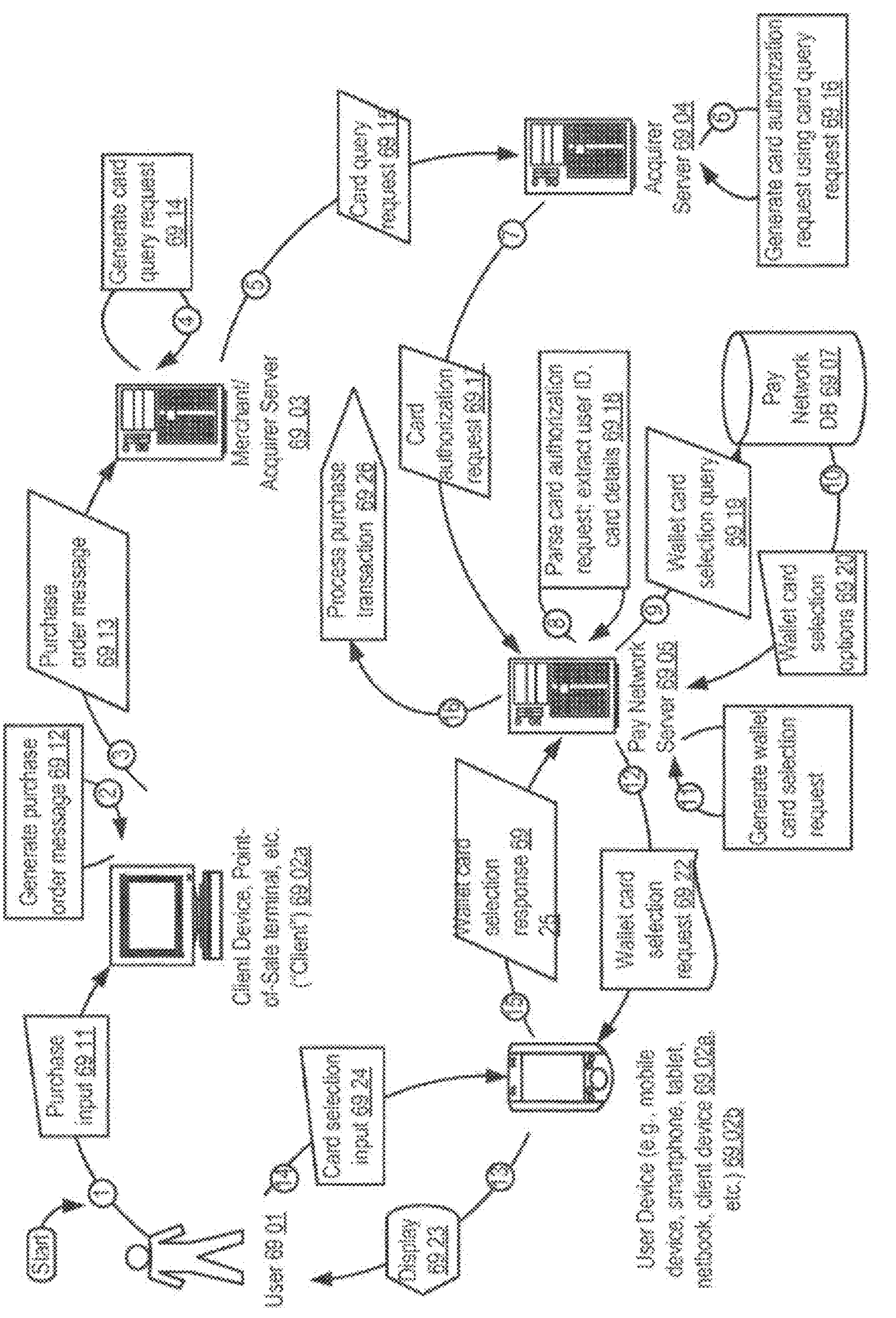

FIGS. 59A-B show user interface diagrams illustrating example features of virtual wallet applications, in a security and privacy mode, in some embodiments of the WIP. With reference to FIG. 59A, in some implementations, the user may be able to view and/or modify the user profile and/or settings of the user, e.g., by activating a user interface element. For example, the user may be able to view/modify a user name (e.g., 5911a-b), account number (e.g., 5912a-b), user security access code (e.g., 5913-b), user pin (e.g., 5914-b), user address (e.g., 5915-b), social security number associated with the user (e.g., 5916-b), current device GPS location (e.g., 5917-b), user account of the merchant in whose store the user currently is (e.g., 5918-b), the user's rewards accounts (e.g., 5919-b), and/or the like. In some implementations, the user may be able to select which of the data fields and their associated values should be transmitted to facilitate the purchase transaction, thus providing enhanced data security for the user. For example, in the example illustration in FIG. 59A, the user has selected the name 5911a, account number 5912a, security code 5913a, merchant account ID 5918a and rewards account ID 5919a as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the WIP with the GPS location of the user. Based on the GPS location of the user, the WIP may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 59B, in some implementations, the app executing on the user's device may provide a "VerifyChat" feature for fraud prevention. For example, the WIP may detect an unusual and/or suspicious transaction. The WIP may utilize the VerifyChat feature to communicate with the user, and verify the authenticity of the originator of the purchase transaction. In various implementations, the WIP may send electronic mail message, text (SMS) messages, Facebook® messages, Twitter™ tweets, text chat, voice chat, video chat (e.g., Apple FaceTime), and/or the like to communicate with the user. For example, the WIP may initiate a video challenge for the user, e.g., 5921. For example, the user may need to present him/her-self via a video chat, e.g., 5922. In some implementations, a customer service representative, e.g., agent 5924, may manually determine the authenticity of the user using the video of the user. In some implementations, the WIP may utilize face, biometric and/or like recognition (e.g., using pattern classification techniques) to determine the identity of the user. In some implementations, the app may provide reference marker (e.g., cross-hairs, target box, etc.), e.g., 5923, so that the user may the video to facilitate the WIP's automated recognition of the user. In some implementations, the user may not have initiated the transaction, e.g., the transaction is fraudulent. In such implementations, the user may cancel the challenge. The WIP may then cancel the transaction, and/or initiate fraud investigation procedures on behalf of the user.

In some implementations, the WIP may utilize a text challenge procedure to verify the authenticity of the user, e.g., 5925. For example, the WIP may communicate with the user via text chat, SMS messages, electronic mail, Facebook® messages, Twitter™ tweets, and/or the like 5927. The WIP may pose a challenge question, e.g., 5926, for the user. The app may provide a user input interface element(s) (e.g., virtual keyboard 5928, 5929) to answer the challenge question posed by the WIP. In some implementations, the challenge question may be randomly selected by the WIP automatically; in some implementations, a customer service representative may manually communicate with the user. In some implementations, the user may not have initiated the transaction, e.g., the transaction is fraudulent. In such implementations, the user may cancel the text challenge. The WIP may cancel the transaction, and/or initiate fraud investigation on behalf of the user.

Figure 60:
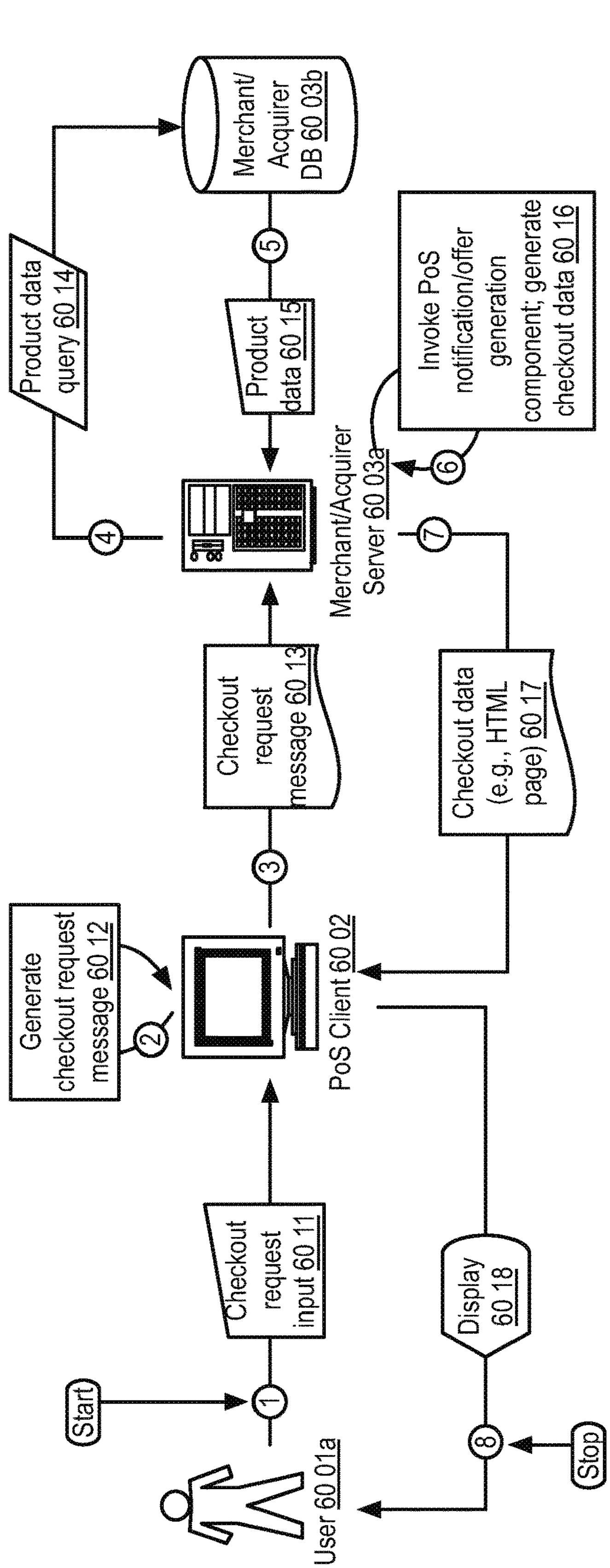
FIG. 60 shows a data flow diagram illustrating an example user purchase checkout procedure in some embodiments of the WIP.

FIG. 60 shows a data flow diagram illustrating an example user purchase checkout procedure in some embodiments of the WIP. In some embodiments, a user, e.g., 6001*a*, may desire to purchase a product, service, offering, and/or the like ("product"), from a merchant via a merchant online site or in the merchant's store. The user may communicate with a merchant/acquirer ("merchant") server, e.g., 6003*a*, via a client such as, but not limited to: a personal computer, mobile device, television, point-of-sale terminal, kiosk, ATM, and/or the like (e.g., 6002). For example, the user may provide user input, e.g., checkout input 6011, into the client indicating the user's desire to purchase the product. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. As an example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. For example, the user may activate a user interface element provided by the client to indicate the user's desire to complete the user purchase checkout. The client may generate a checkout request, e.g., 6012, and provide the checkout request, e.g., 6013, to the merchant server. For example, the client may provide a (Secure) Hypertext Transfer Protocol ("HTTP(S)") POST message including the product details for the merchant server in the form of data formatted according to the eXtensible Markup Language ("XML"). An example listing of a checkout request 6012, substantially in the form of a HTTP(S) POST message including XML-formatted data, is provided below:

```
POST /checkoutrequest.php HTTP/1.1
Host: www.merchant.com
Content-Type: Application/XML
Content-Length: 667
<?XML version = "1.0" encoding = "UTF-8"?>
<checkout_request>
```

-continued

```
        <checkout_ID>4NFU4RG94</checkout_ID>
        <timestamp>2011-02-22 15:22:43</timestamp>
        <purchase_detail>
            <num_products>5</num_products>
            <product_ID>AE95049324</product_ID>
            <product_ID>MD09808755</product_ID>
            <product_ID>OC12345764</product_ID>
            <product_ID>KE76549043</product_ID>
            <product_ID>SP27674509</product_ID>
        </purchase_detail>
    <!--optional parameters-->
        <user_ID>john.q.public@gmail.com</user_ID>
        <PoS_client_detail>
            <client_IP>192.168.23.126</client_IP>
            <client_type>smartphone</client_type>
            <client_model>HTC Hero</client_model>
            <OS>Android 2.2</OS>
            <app_installed_flag>true</app_installed_flag>
        </PoS_client_detail>
    </checkout_request>
```

In some embodiments, the merchant server may obtain the checkout request from the client, and extract the checkout detail (e.g., XML data) from the checkout request. For example, the merchant server may utilize a parser such as the example parsers described below in the discussion with reference to FIG. 66. Based on parsing the checkout request 6012, the merchant server may extract product data (e.g., product identifiers), as well as available PoS client data, from the checkout request. In some embodiments, using the product data, the merchant server may query, e.g., 6014, a merchant/acquirer ("merchant") database, e.g., 6003*b*, to obtain product data, e.g., 6015, such as product information, product pricing, sales tax, offers, discounts, rewards, and/or other information to process the purchase transaction and/or provide value-added services for the user. For example, the merchant database may be a relational database responsive to Structured Query Language ("SQL") commands. The merchant server may execute a hypertext preprocessor ("PHP") script including SQL commands to query a database table (such as FIG. 66, Products 66191) for product data. An example product data query 6014, substantially in the form of PHP/SQL commands, is provided below:

```
<?PHP
header('Content-Type: text/plain');
mysql_connect("254.93.179.112",$DBserver,$password); // access
database server
mysql_select_db("WIP_DB.SQL"); // select database table to
search
//create_query
$query = "SELECT product_title product_attributes_list product_price
    tax_info_list related_products_list offers_list discounts_list
    rewards_list merchants_list merchant_availability_list FROM
    ProductsTable WHERE product_ID LIKE '%' $prodID";
$result = mysql_query($query); // perform the search query
mysql_close("WIP_DB.SQL"); // close database access
?>
```

In some embodiments, in response to obtaining the product data, the merchant server may generate, e.g., 6016, checkout data to provide for the PoS client. In some embodiments, such checkout data, e.g., 6017, may be embodied, in part, in a HyperText Markup Language ("HTML") page including data for display, such as product detail, product pricing, total pricing, tax information, shipping information, offers, discounts, rewards, value-added service information, etc., and input fields to provide payment information to process the purchase transaction, such as account holder name, account number, billing address, shipping address, tip amount, etc. In some embodiments, the checkout data may be embodied, in part, in a Quick Response ("QR") code image that the PoS client can display, so that the user may capture the QR code using a user's device to obtain merchant and/or product data for generating a purchase transaction processing request. In some embodiments, a user alert mechanism may be built into the checkout data. For example, the merchant server may embed a URL specific to the transaction into the checkout data. In some embodiments, the alerts URL may further be embedded into optional level 3 data in card authorization requests, such as those discussed further below with reference to FIGS. 62-63. The URL may point to a webpage, data file, executable script, etc., stored on the merchant's server dedicated to the transaction that is the subject of the card authorization request. For example, the object pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network. In some embodiments, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like. An example listing of a checkout data 6017, substantially in the form of XML-formatted data, is provided below:

```
<?XML version = "1.0" encoding = "UTF-8"?>
<checkout_data>
    <session_ID>4NFU4RG94</session_ID>
    <timestamp>2011-02-22 15:22:43</timestamp>
    <expiry_lapse>00:00:30</expiry_lapse>
    <transaction_cost>$34.78</transaction_cost>
    <alerts_URL>www.merchant.com/shopcarts.php?sessionID=4NFU4RG94</alerts_URL>
    <!--optional data-->
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <offers_details>
        <num_offers>1</num_offers>
        <product>
            <product_type>book</product_type>
            <product_params>
                <product_title>Here's more XML</product_title>
                <ISBN>922-7-14-165720-1</ISBN>
                <edition>1nd ed.</edition>
                <cover>hardbound</cover>
                <seller>digibooks</seller>
            </product_params>
            <quantity>1</quantity>
        </product>
    </offers_details>
    <secure_element>www.merchant.com/securedyn/0394733/123.png</secure_element>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
<checkout_data>
```

Upon obtaining the checkout data, e.g., 6017, the PoS client may render and display, e.g., 6018, the checkout data for the user.

Figure 61:
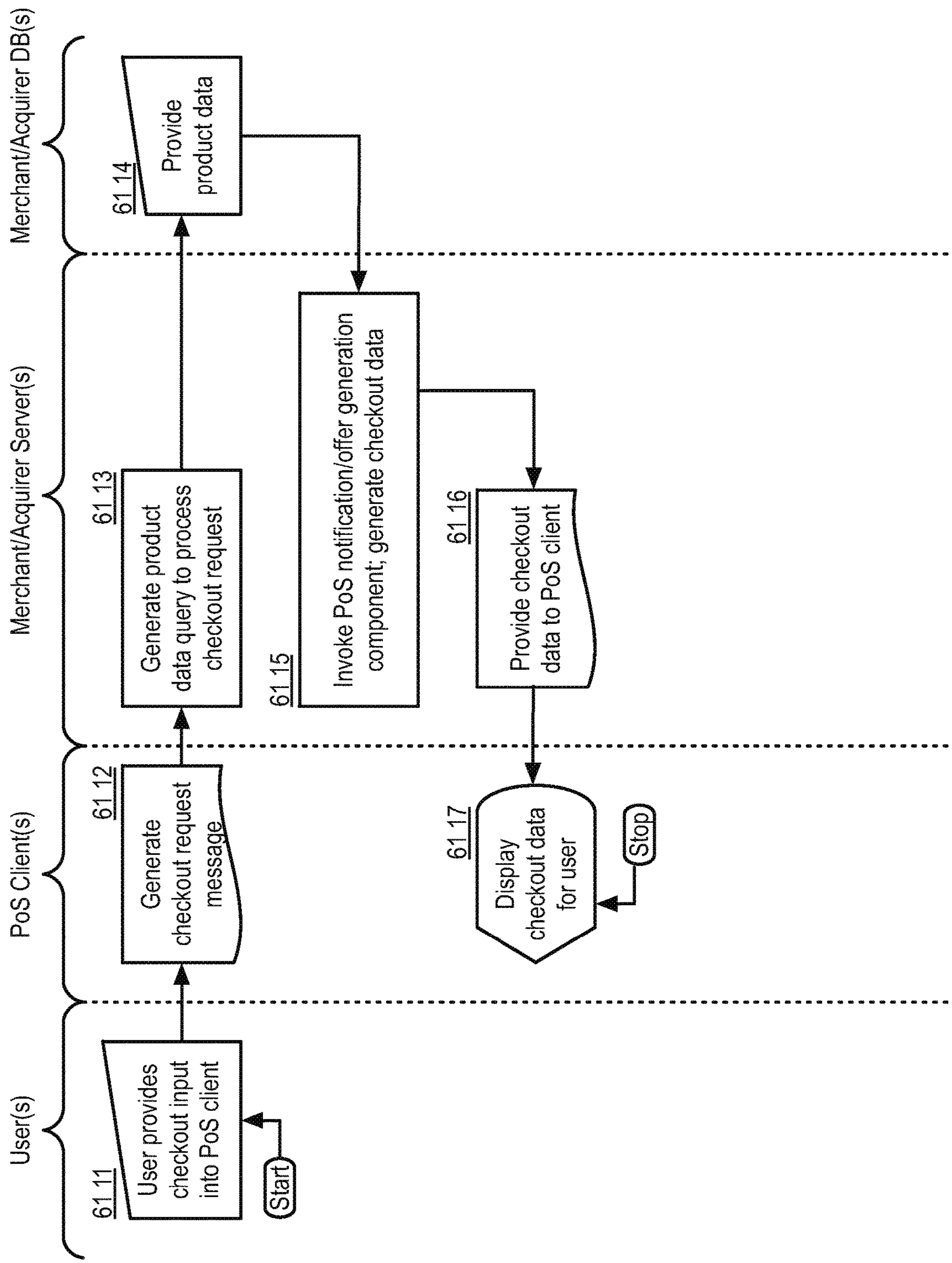
FIG. 61 shows a logic flow diagram illustrating example aspects of a user purchase checkout in some embodiments of the WIP, e.g., a User Purchase Checkout ("UPC") component 6100.

FIG. 61 shows a logic flow diagram illustrating example aspects of a user purchase checkout in some embodiments of the WIP, e.g., a User Purchase Checkout ("UPC") component 6100. In some embodiments, a user may desire to purchase a product, service, offering, and/or the like ("product"), from a merchant via a merchant online site or in the merchant's store. The user may communicate with a merchant/acquirer ("merchant") server via a PoS client. For example, the user may provide user input, e.g., 6111, into the client indicating the user's desire to purchase the product. The client may generate a checkout request, e.g., 6112, and provide the checkout request to the merchant server. In some embodiments, the merchant server may obtain the checkout request from the client, and extract the checkout detail (e.g., XML data) from the checkout request. For example, the merchant server may utilize a parser such as the example parsers described below in the discussion with reference to FIG. 66. Based on parsing the checkout request, the merchant server may extract product data (e.g., product identifiers), as well as available PoS client data, from the checkout request. In some embodiments, using the product data, the merchant server may query, e.g., 6113, a merchant/acquirer ("merchant") database to obtain product data, e.g., 6114, such as product information, product pricing, sales tax, offers, discounts, rewards, and/or other information to process the purchase transaction and/or provide value-added services for the user. In some embodiments, in response to obtaining the product data, the merchant server may generate, e.g., 6115, checkout data to provide, e.g., 6116, for the PoS client. Upon obtaining the checkout data, the PoS client may render and display, e.g., 6117, the checkout data for the user.

Figure 62B:
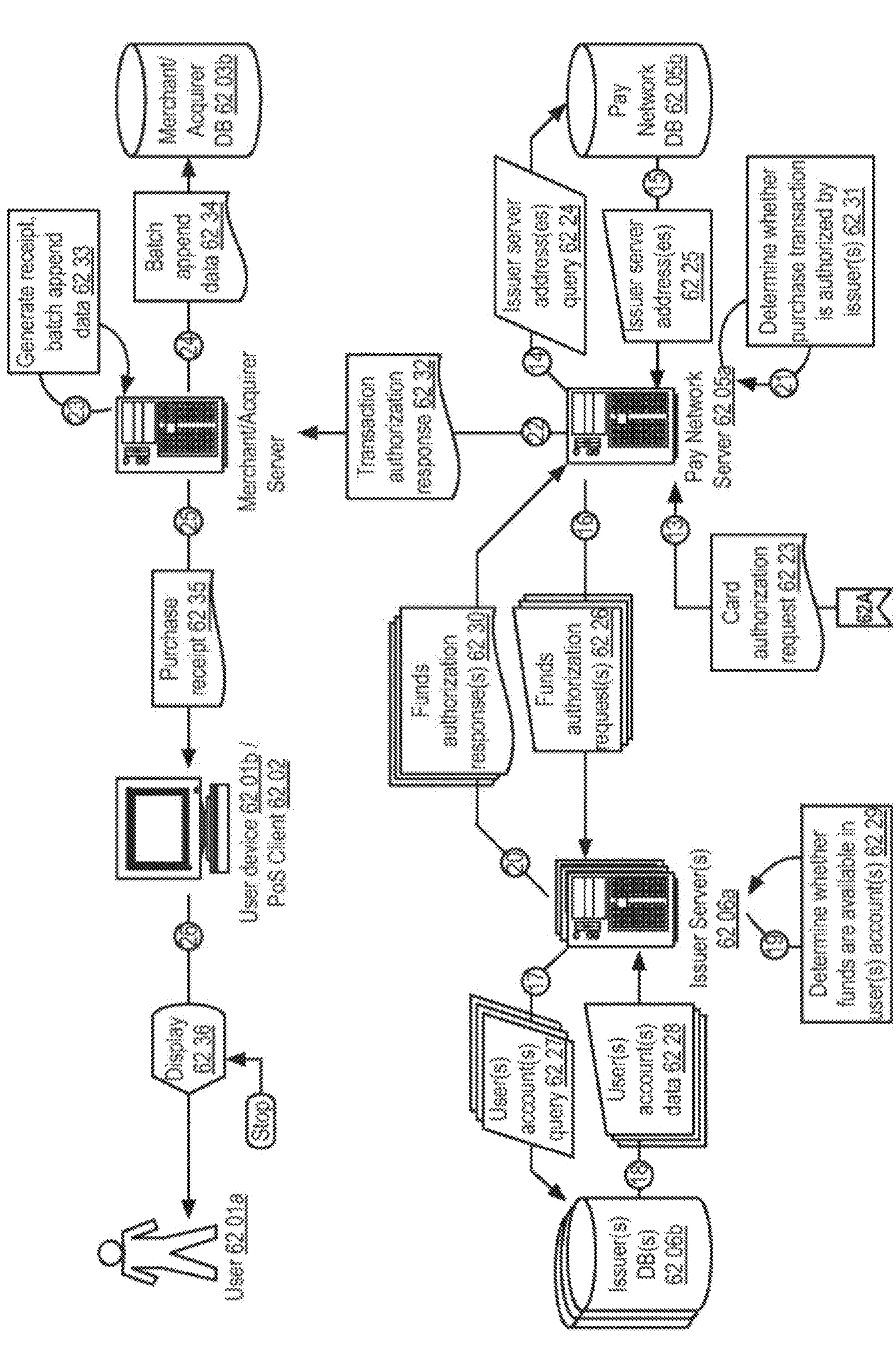

FIGS. 62A-B show data flow diagrams illustrating an example purchase transaction authorization procedure in some embodiments of the WIP. With reference to FIG. 62A, in some embodiments, a user, e.g., 6201*a*, may wish to utilize a virtual wallet account to purchase a product, service, offering, and/or the like ("product"), from a merchant via a merchant online site or in the merchant's store. The user may utilize a physical card, or a user wallet device, e.g., 6201*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 6211 into the user wallet device and may receive a notification 6213. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user.

In some embodiments, upon authenticating the user for access to virtual wallet features, the user wallet device may provide a transaction authorization input, e.g., 6214, to a point-of-sale ("PoS") client, e.g., 6202. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 6214, track 1 data from the user's plastic card (e.g., credit card, debit card, prepaid card, charge card, etc.), such as the example track 1 data provided below:

%B123456789012345^PUBLIC/J.Q.^99011200000000000000901****?*
(wherein '123456789012345' is the card number of 'J.Q. Public' and has a CVV number of 901. '990112' is a service code, and *** represents decimal digits which change randomly each time the card is used.)

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 6214, substantially in the form of XML-formatted data, is provided below:

```
<?XML version = "1.0" encoding = "UTF-8"?>
<transaction__authorization__input>
    <payment__data>
        <account__source>
            <charge__priority>1</charge__priority>
            <charge__type>rewards</charge__type>
            <charge__issuer>Issuer1</charge__issuer>
            <charge__mode>FNC</charge__mode>
            <charge__ratio>40%</charge__ratio>
            <account__number>123456789012345</account__number>
            <account__name>John Q. Public</account__name>
            <bill__add>987 Green St #456, Chicago, IL
            94652</bill__add>
            <ship__add>987 Green St #456, Chicago, IL
            94652</ship__add>
            <CVV>123</CVV>
        </account__source>
        <account__source>
            <charge__priority>1</charge__priority>
            <charge__type>points</charge__type>
            <charge__mode>FNC</charge__mode>
            <charge__issuer>Issuer2</charge__issuer>
            <charge__ratio>60%</charge__ratio>
            <account__number>234567890123456</account__number>
            <account__name>John Q. Public</account__name>
            <bill__add>987 Green St #456, Chicago, IL
            94652</bill__add>
            <ship__add>987 Green St #456, Chicago, IL
            94652</ship__add>
            <CVV>173</CVV>
        </account__source>
        <account__source>
            <charge__priority>2</charge__priority>
            <charge__type>credit</charge__type>
            <charge__mode>FNC</charge__mode>
            <charge__issuer>Issuer1</charge__issuer>
            <charge__ratio>100%</charge__ratio>
            <account__number>345678901234567</account__number>
            <account__name>John Q. Public</account__name>
            <bill__add>987 Green St #456, Chicago, IL
            94652</bill__add>
            <ship__add>987 Green St #456, Chicago, IL
            94652</ship__add>
            <CVV>695</CVV>
        </account__source>
    </payment__data>
    <!--optional data-->
    <timestamp>2011-02-22 15:22:43</timestamp>
    <expiry__lapse>00:00:30</expiry__lapse>
    <secure__key>0445329070598623487956543322</secure__key>
    <alerts__track__flag>TRUE</alerts__track__flag>
    <wallet__device__details>
```

-continued

```
        <device__IP>192.168.23.126</client__IP>
        <device__type>smartphone</client__type>
        <device__model>HTC Hero</client__model>
        <OS>Android 2.2</OS>
        <wallet__app__installed__flag>true</wallet__app__installed__flag>
    </wallet__device__details>
</transaction__authorization__input>
```

In some embodiments, the PoS client may generate a card authorization request, e.g., 6215, using the obtained transaction authorization input from the user wallet device, and/or product/checkout data (see, e.g., FIG. 60, 6015-6017). An example listing of a card authorization request 6215, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8"?>
<card__authorization__request>
    <session__ID>4NFU4RG94</order__ID>
    <timestamp>2011-02-22 15:22:43</timestamp>
    <expiry>00:00:30</expiry>
    <alerts__URL>www.merchant.com/shopcarts.php?sessionID=AEBB4356</alerts__URL>
    <!--optional data-->
    <user__ID>john.q.public@gmail.com</user__ID>
    <PoS___details>
        <PoS__IP>192.168.23.126</client__IP>
        <PoS__type>smartphone</client__type>
        <PoS__model>HTC Hero</client__model>
        <OS>Android 2.2</OS>
        <app__installed__flag>true</app__installed__flag>
    </PoS__details>
    <purchase__details>
        <cart1>
            <num__products>1</num__products>
            <product>
                <product__type>book</product__type>
                <product__params>
                    <product__title>XML for dummies</product__title>
                    <ISBN>938-2-14-168710-0</ISBN>
                    <edition>2nd ed.</edition>
                    <cover>hardbound</cover>
                    <seller>bestbuybooks</seller>
                </product__params>
                <quantity>1</quantity>
            </product>
            <mode>socialpay</mode>
            <payee>
                <ID>merchant1</ID>
                <Address>123 Baker St, Chicago, IL 00000</Address>
            </payee>
            <offer>id#23456768543__2052</offer>
            <social__status>
                <type>twitter</type>
                <message>thx4thetip</message>
            </social__status>
            <cloak>ON</cloak>
        </cart1>
        <cart2>
            <num__products>1</num__products>
            <product>
                <product__type>book</product__type>
                <product__params>
                    <product__title>XML for dummies</product__title>
                    <ISBN>938-2-14-168710-0</ISBN>
                    <edition>2nd ed.</edition>
                    <cover>hardbound</cover>
                    <seller>bestbuybooks</seller>
                </product__params>
                <quantity>1</quantity>
            </product>
            <mode>NFC</mode>
            <payee>
                <ID>johnqpublic</ID>
                <Address>123 Baker St, Chicago, IL 00000</Address>
            <payee>
            <offer>id#23456768543__2052</offer>
            <social__status>
                <type>facebook</type>
                <message>@jqp: dinner was great!</message>
```

-continued

```
            </social_status>
            <cloak>OFF</cloak>
        </cart2>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
        <merchant_mode>snap</merchant_mode>
    </merchant_params>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</card_authorization_request>
```

In some embodiments, the card authorization request generated by the user device may include a minimum of information required to process the purchase transaction. For example, this may improve the efficiency of communicating the purchase transaction request, and may also advantageously improve the privacy protections provided to the user and/or merchant. For example, in some embodiments, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server 6203*a*, e.g., 6216. The merchant server may forward the card authorization request to a pay gateway server, e.g., 6204*a*, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 6203*b*, for a network address of the payment gateway server, for example by using a portion of a user payment card number, or a user ID (such as an email address) as a keyword for the database query. For example, the merchant server may issue PHP/SQL commands to query a database table (such as FIG. 66, Pay Gateways 6619*h*) for a URL of the pay gateway server. An example payment gateway address query 6217, substantially in the form of PHP/SQL commands, is provided below:

```
<?PHP
header('Content-Type: text/plain');
mysql_connect("254.93.179.112",$DBserver,$password); // access
database server
mysql_select_db("WIP_DB.SQL"); // select database table to
search
//create query
$query = "SELECT paygate_id paygate_address paygate_URL
paygate_name FROM
    PayGatewayTable WHERE card_num LIKE '%' $cardnum";
$result = mysql_query($query); // perform the search query
mysql_close("WIP_DB.SQL"); // close database access
?>
```

In response, the merchant/acquirer database may provide the requested payment gateway address, e.g., 6218. The merchant server may forward the card authorization request to the pay gateway server using the provided address, e.g., 6219. In some embodiments, upon receiving the card authorization request from the merchant server, the pay gateway server may invoke a component to provide one or more services associated with purchase transaction authorization (e.g., 6220). For example, the pay gateway server may invoke components for fraud prevention, loyalty and/or rewards, and/or other services for which the user-merchant combination is authorized. The pay gateway server may forward the card authorization request to a pay network server, e.g., 6205*a*, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 6204*b*, for a network address of the payment network server, for example by using a portion of a user payment card number, or a user ID (such as an email address) as a keyword for the database query. For example, the pay gateway server may issue PHP/SQL commands to query a database table (such as FIG. 66, Pay Gateways

6619*h*) for a URL of the pay network server. An example payment network address query 6221, substantially in the form of PHP/SQL commands, is provided below:

```
<?PHP
header('Content-Type: text/plain');
mysql_connect("254.93.179.112",$DBserver,$password); // access
database server
mysql_select_db("WIP_DB.SQL"); // select database table to
search
//create query
$query = "SELECT payNET_id payNET_address payNET_URL
payNET_name FROM
    PayGatewayTable WHERE card_num LIKE '%' $cardnum";
$result = mysql_query($query); // perform the search query
mysql_close("WIP_DB.SQL"); // close database access
?>
```

In response, the payment gateway database may provide the requested payment network address, e.g., 6222. The pay gateway server may forward the card authorization request to the pay network server using the provided address, e.g., 6223.

With reference to FIG. 62B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

In some embodiments, the pay network server may generate a query, e.g., 6224, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 6206*a*, of the issuer(s) may maintain details of the user's account(s). In some embodiments, a database, e.g., pay network database 6205*b*, may store details of the issuer server(s) associated with the issuer(s). In some embodiments, the pay network server may query a database, e.g., pay network database 6205*b*, for a network address of the issuer(s) server(s), for example by using a portion of a user payment card number, or a user ID (such as an email address) as a keyword for the database query. For example, the merchant server may issue PHP/SQL commands to query a database table (such as FIG. 66, Issuers 6619*f*) for network address(es) of the issuer(s) server(s). An example issuer server address(es) query 6224, substantially in the form of PHP/SQL commands, is provided below:

```
<?PHP
header('Content-Type: text/plain');
mysql_connect("254.93.179.112",$DBserver,$password); // access
database server
mysql_select_db("WIP_DB.SQL"); // select database table to
search
//create query
$query = "SELECT issuer_id issuer_address issuer_URL
issuer_name FROM
    IssuersTable WHERE card_num LIKE '%' $cardnum";
$result = mysql_query($query); // perform the search query
mysql_close("WIP_DB.SQL"); // close database access
?>
```

In response to obtaining the issuer server query, e.g., 6224, the pay network database may provide, e.g., 6225, the requested issuer server data to the pay network server. In some embodiments, the pay network server may utilize the issuer server data to generate funds authorization request(s), e.g., 6226, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 6226, substantially in the form of a HTTP(S) POST message including XML-formatted data, is provided below:

```
POST /fundsauthorizationrequest.php HTTP/1.1
Host: www.issuer.com
Content-Type: Application/XML
Content-Length: 624
<?XML version = "1.0" encoding = "UTF-8"?>
<funds_authorization_request>
    <query_ID>VNEI39FK</query_ID>
    <timestamp>2011-02-22 15:22:44</timestamp>
    <transaction_cost>$22.61</transaction_cost>
    <account_params>
        <account_type>checking</account_type>
        <account_num>1234567890123456</account_num>
    </account_params>
    <!--optional parameters-->
    <purchase_summary>
        <num_products>1</num_products>
        <product>
            <product_summary>Book - XML for dummies</product_summary>
            <product_quantity>1</product_quantity?
        </product>
    </purchase_summary>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
</funds_authorization_request>
```

In some embodiments, an issuer server may parse the authorization request(s), and based on the request details may query a database, e.g., user profile database 6206*b*, for data associated with an account linked to the user. For example, the merchant server may issue PHP/SQL commands to query a database table (such as FIG. 66, Accounts 6619*d*) for user account(s) data. An example user account(s) query 6227, substantially in the form of PHP/SQL commands, is provided below:

```
<?PHP
header('Content-Type: text/plain');
mysql_connect("254.93.179.112",$DBserver,$password); // access
database server
mysql_select_db("WIP_DB.SQL"); // select database table to
search
//create query
$query = "SELECT issuer user_id user_name user_balance
account_type FROM
    AccountsTable WHERE account_num LIKE '%' $accountnum";
$result = mysql_query($query); // perform the search query
mysql_close("WIP_DB.SQL"); // close database access
?>
```

In some embodiments, on obtaining the user account(s) data, e.g., 6228, the issuer server may determine whether the user can pay for the transaction using funds available in the account, 6229. For example, the issuer server may determine whether the user has a sufficient balance remaining in the account, sufficient credit associated with the account, and/or the like. Based on the determination, the issuer server(s) may provide a funds authorization response, e.g., 6230, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 6231, the pay network server may invoke a component to provide value-add services for the user.

In some embodiments, the pay network server may generate a transaction data record from the authorization request and/or authorization response, and store the details of the transaction and authorization relating to the transaction in a transactions database. For example, the pay network server may issue PHP/SQL commands to store the data to a database table (such as FIG. 66, Transactions 6619*i*). An example transaction store command, substantially in the form of PHP/SQL commands, is provided below:

```
<?PHP
header('Content-Type: text/plain');
mysql_connect("254.92.185.103",$DBserver,$password); // access database server
mysql_select("WIP_DB.SQL"); // select database to append
mysql_query("INSERT INTO TransactionsTable (PurchasesTable (timestamp,
    purchase_summary_list, num_products, product_summary, product_quantity,
    transaction_cost, account_params_list, account_name, account_type,
    account_num, billing_addres, zipcode, phone, sign, merchant_params_list,
    merchant_id, merchant_name, merchant_auth_key)
VALUES (time( ), $purchase_summary_list, $num_products, $product_summary,
    $product_quantity, $transaction_cost, $account_params_list, $account_name,
    $account_type, $account_num, $billing_addres, $zipcode, $phone, $sign,
    $merchant_params_list, $merchant_id, $merchant_name, $merchant_auth_key)");
    // add data to table in database
mysql_close("WIP_DB.SQL"); // close connection to database
?>
```

In some embodiments, the pay network server may forward a transaction authorization response, e.g., 6232, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 6233, and store the XML data file, e.g., 6234, in a database, e.g., merchant database 404. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365</merchant_auth_key>
    <account_number>123456789</account_number>
</merchant_data>
<transaction_data>
```

-continued

<transaction 1>
...
</transaction 1>
<transaction 2>
...
</transaction 2>
.
.
.
<transaction n>
...
</transaction n>
</transaction_data>

In some embodiments, the server may also generate a purchase receipt, e.g., 6233, and provide the purchase receipt to the client, e.g., 6235. The client may render and display, e.g., 6236, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 63A:
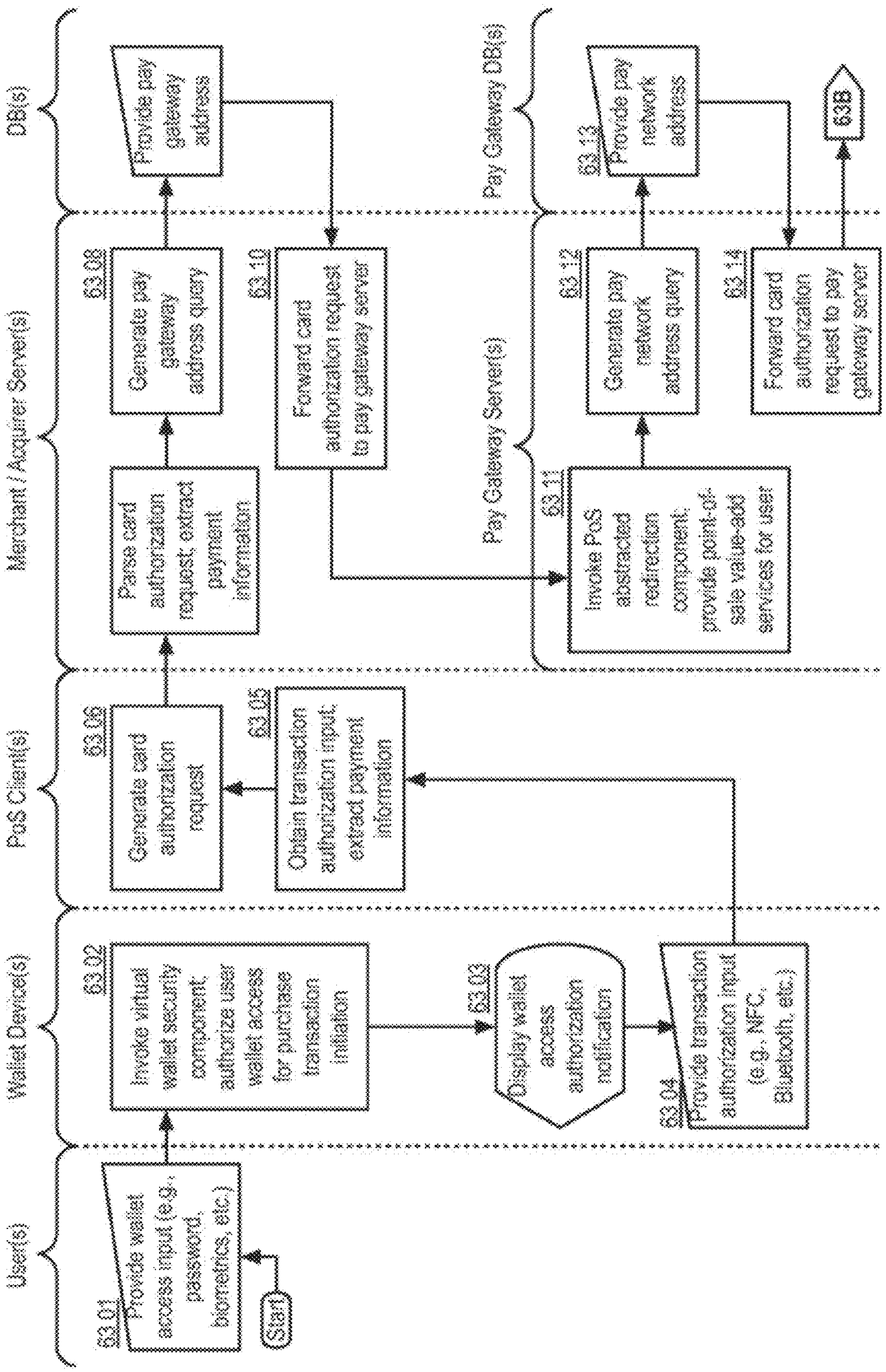
FIGS. 63A-B show logic flow diagrams illustrating example aspects of purchase transaction authorization in some embodiments of the WIP, e.g., a Purchase Transaction Authorization ("PTA") component 6300.
Figure 63B:
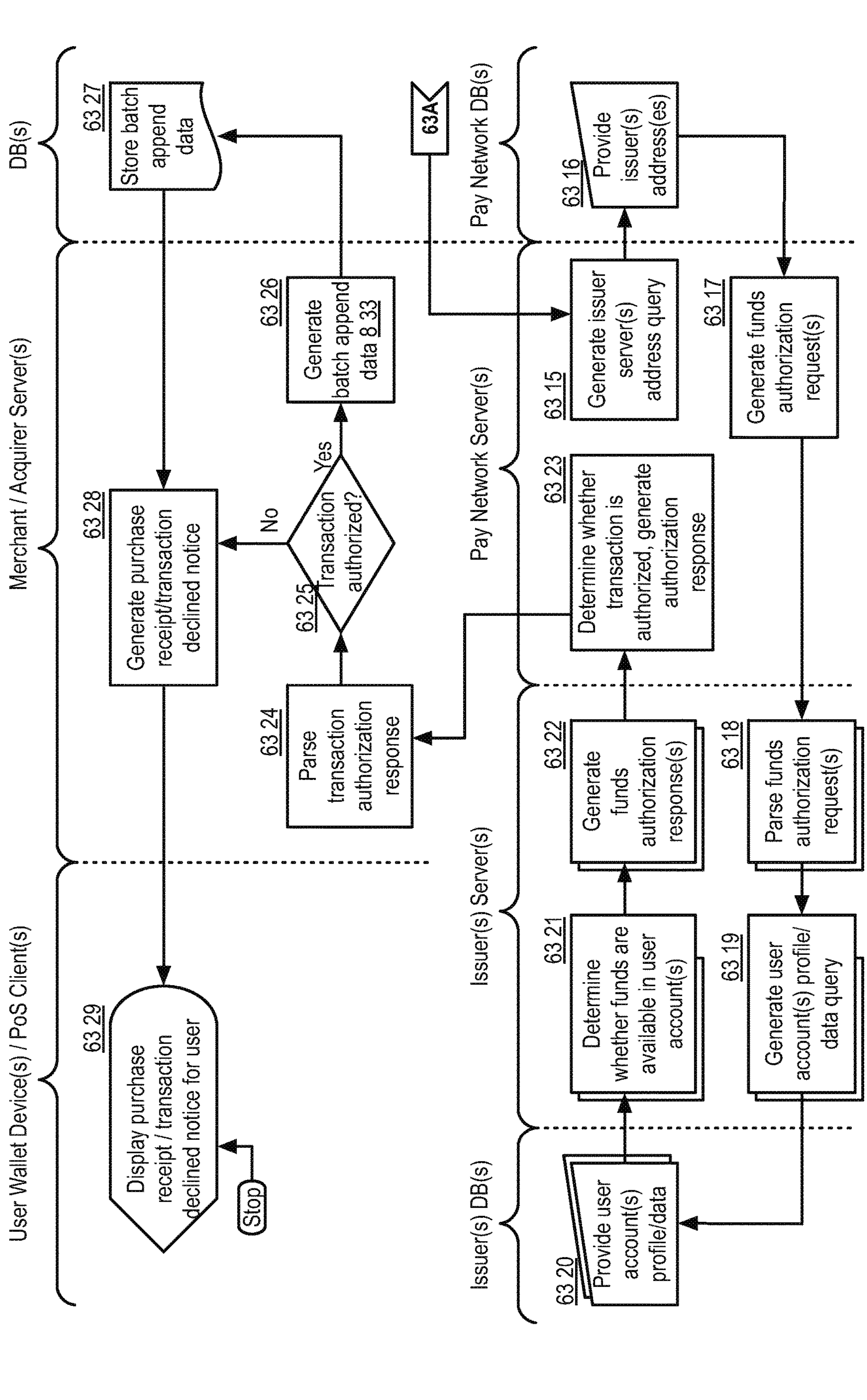

FIGS. 63A-B show logic flow diagrams illustrating example aspects of purchase transaction authorization in some embodiments of the WIP, e.g., a Purchase Transaction Authorization ("PTA") component 6300. With reference to FIG. 63A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 6301, into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 6302-6303.

In some embodiments, upon authenticating the user for access to virtual wallet features, the user wallet device may provide a transaction authorization input, e.g., 6304, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 6305. For example, the PoS client may utilize a parser, such as the example parsers provided below in the discussion with reference to FIG. 66. The PoS client may generate a card authorization request, e.g., 6306, using the obtained transaction authorization input from the user wallet device, and/or product/checkout data (see, e.g., FIG. 60, 6015-6017).

In some embodiments, the PoS client may provide the generated card authorization request to the merchant server 6307. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 6308, for a network address of the payment gateway server, for example by using a portion of a user payment card number, or a user ID (such as an email address) as a keyword for the database query 6309. In response, the merchant/acquirer database may provide the requested payment gateway address, e.g., 6310. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 6311. For example, the pay gateway server may invoke components for fraud prevention, loyalty and/or rewards, and/or other services for which the user-merchant combination is authorized.

The pay gateway server may forward the card authorization request to a pay network server for payment processing, e.g., 6314. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., 6312, for a network address of the payment network server, for example by using a portion of a user payment card number, or a user ID (such as an email address) as a keyword for the database query. In response, the payment gateway database may provide the requested payment network address, e.g., 6313. The pay gateway server may forward the card authorization request to the pay network server using the provided address, e.g., 6314.

With reference to FIG. 63B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the pay network server may generate a query, e.g., 6315, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 6315, for a network address of the issuer(s) server(s), for example by using a portion of a user payment card number, or a user ID (such as an email address) as a keyword for the database query.

In response to obtaining the issuer server query, the pay network database may provide, e.g., 6316, the requested issuer server data to the pay network server. In some embodiments, the pay network server may utilize the issuer server data to generate funds authorization request(s), e.g., 6317, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 6318, and based on the request details may query a database, e.g., 6319, for data associated with an account linked to the user.

In some embodiments, on obtaining the user account(s) data, e.g., 6320, the issuer server may determine whether the user can pay for the transaction using funds available in the account, e.g., 6321. For example, the issuer server may determine whether the user has a sufficient balance remaining in the account, sufficient credit associated with the account, and/or the like. Based on the determination, the issuer server(s) may provide a funds authorization response, e.g., 6322, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 6323, the pay network server may invoke a component to provide value-add services for the user, e.g., 6323.

In some embodiments, the pay network server may forward a transaction authorization response to the user wallet device, PoS client, and/or merchant server. The merchant may parse, e.g., 6324, the transaction authorization response, and determine from it that the user possesses sufficient funds in the card account to conduct the transaction, e.g., 6325, option"Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 6326, and store the XML data file, e.g., 6327, in a database. In some embodiments, the server may also generate a purchase receipt, e.g., 6328, and provide the purchase receipt to the client. The client may render and display, e.g., 6329, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 64A:
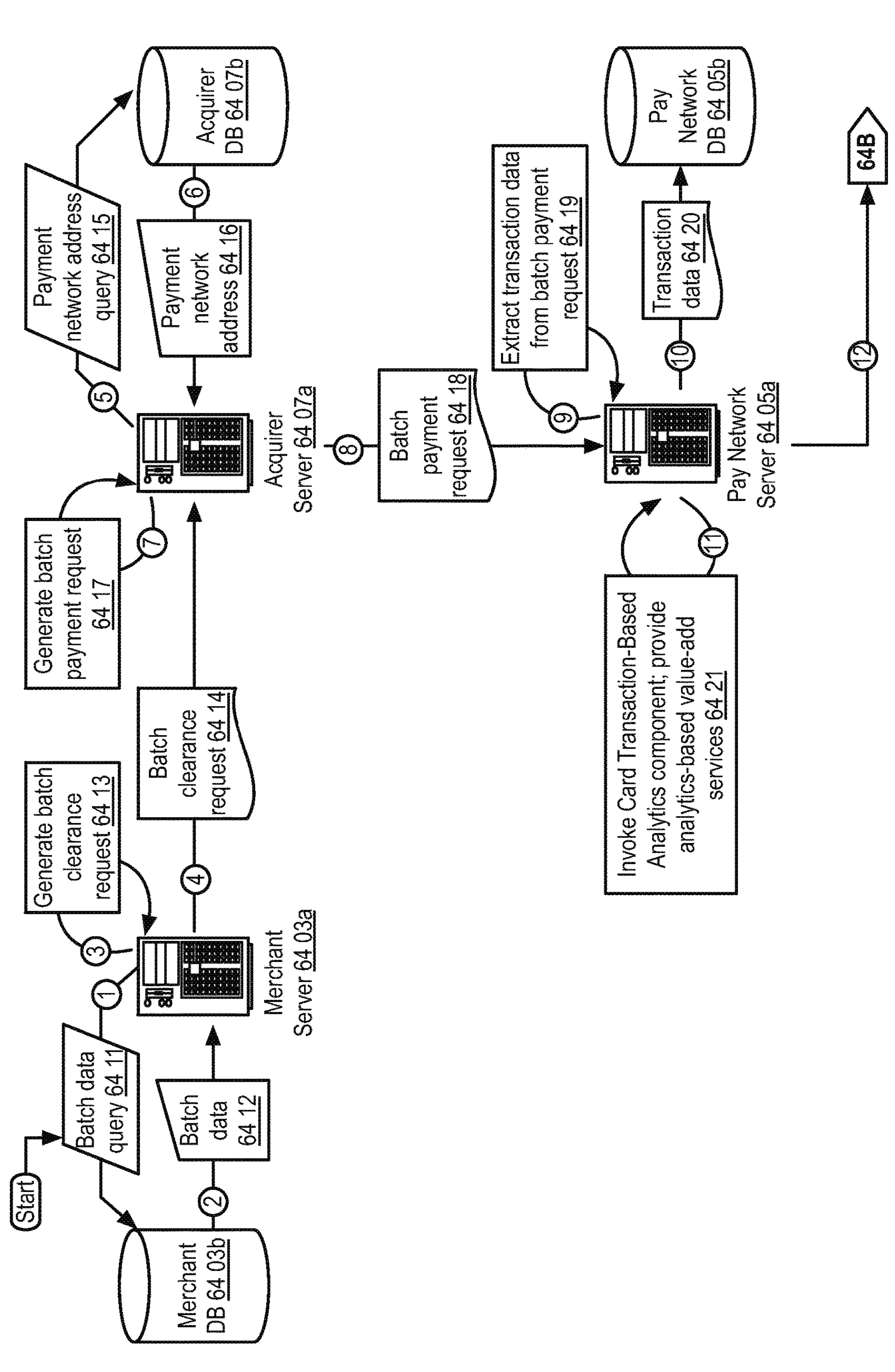
FIGS. 64A-B show data flow diagrams illustrating an example purchase transaction clearance procedure in some embodiments of the WIP.
Figure 64B:
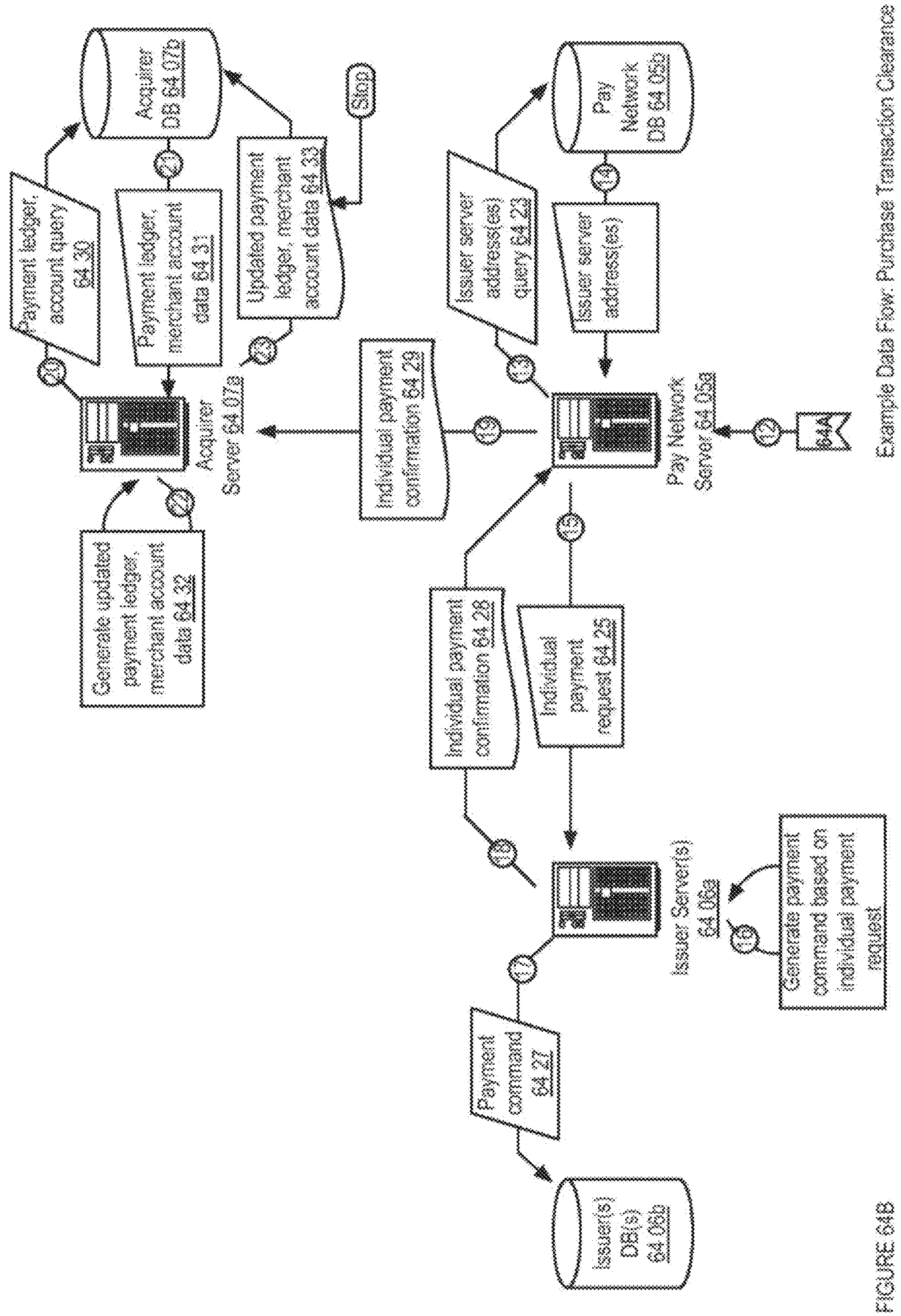

FIGS. 64A-B show data flow diagrams illustrating an example purchase transaction clearance procedure in some embodiments of the WIP. With reference to FIG. 64A, in some embodiments, a merchant server, e.g., 6403*a*, may initiate clearance of a batch of authorized transactions. For example, the merchant server may generate a batch data request, e.g., 6411, and provide the request, to a merchant database, e.g., 6403*b*. For example, the merchant server may utilize PHP/SQL commands similar to the examples provided above to query a relational database. In response to the batch data request, the database may provide the requested batch data, e.g., 6412. The server may generate a batch clearance request, e.g., 6413, using the batch data obtained from the database, and provide, e.g., 6414, the batch clearance request to an acquirer server, e.g., 6407*a*. For example, the merchant server may provide a HTTP(S) POST message including XML-formatted batch data in the message body for the acquirer server. The acquirer server may generate, e.g., 6415, a batch payment request, e.g. 6417, using the obtained batch clearance request, and provide, e.g., 6418, the batch payment request to the pay network server, e.g., 6405*a*. The pay network server may parse the batch payment request, and extract the transaction data for each transaction stored in the batch payment request, e.g., 6419. The pay network server 6405*a* may store the transaction data, e.g., 6420, for each transaction in a database, e.g., pay network database 6405*b*. In some embodiments, the pay network server may invoke a component to provide value-add analytics services, e.g. 6421, based on analysis of the transactions of the merchant for whom the WIP is clearing purchase transactions. Thus, in some embodiments, the pay network server may provide analytics-based value-added services for the merchant and/or the merchant's users.

With reference to FIG. 64B, in some embodiments, for each extracted transaction, the pay network server may query, e.g., 6423, a database, e.g., pay network database 6405*b*, for an address of an issuer server 6424. For example, the pay network server may utilize PHP/SQL commands similar to the examples provided above. The pay network server may generate an individual payment request, e.g., 6425, for each transaction for which it has extracted transaction data, and provide the individual payment request, e.g., 6426, to the issuer server, e.g., 6406*a*. For example, the pay network server may provide an individual payment request to the issuer server(s) as a HTTP(S) POST message including XML-formatted data. An example listing of an individual payment request 6425, substantially in the form of a HTTP(S) POST message including XML-formatted data, is provided below:

```
POST /paymentrequest.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
    <purchase_summary>
        <num_products>1</num_products>
        <product>
            <product_summary>Book - XML for dummies</product_summary>
            <product_quantity>1</product_quantity?
        </product>
    </purchase_summary>
</pay_request>
```

In some embodiments, the issuer server may generate a payment command, e.g., 6427. For example, the issuer server may issue a command to deduct funds from the user's account (or add a charge to the user's credit card account). The issuer server may issue a payment command, e.g., 6427, to a database storing the user's account information, e.g., user profile database 6406*b*. The issuer server may provide an individual payment confirmation, e.g., 6428, to the pay network server, which may forward, e.g., 6429, the funds transfer message to the acquirer server. An example listing of an individual payment confirmation 6428, substantially in the form of a HTTP(S) POST message including XML-formatted data, is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some embodiments, the acquirer server may parse the individual payment confirmation, and correlate the transaction (e.g., using the request ID field in the example above) to the merchant. The acquirer server may then transfer the funds specified in the funds transfer message to an account of the merchant. For example, the acquirer server may query, e.g. 6430, an acquirer database 6407*b* for payment ledger and/or merchant account data, e.g., 6431. The acquirer server may utilize payment ledger and/or merchant account data from the acquirer database, along with the individual payment confirmation, to generate updated payment ledger and/or merchant account data, e.g., 6432. The acquirer server may then store, e.g., 6433, the updated payment ledger and/or merchant account data to the acquire database.

Figure 65A:
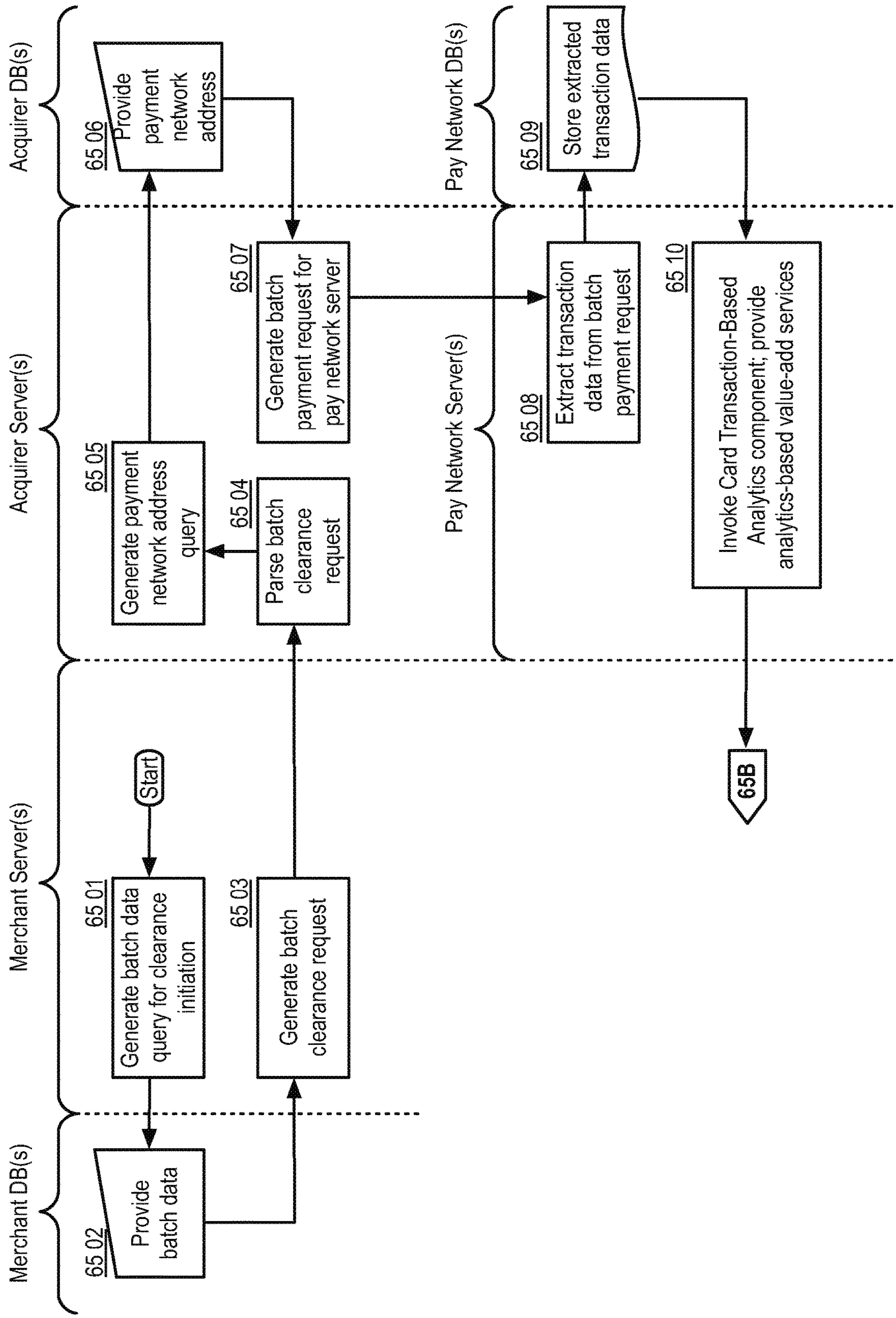
FIGS. 65A-B show logic flow diagrams illustrating example aspects of purchase transaction clearance in some embodiments of the WIP, e.g., a Purchase Transaction Clearance ("PTC") component 6500.
Figure 65B:
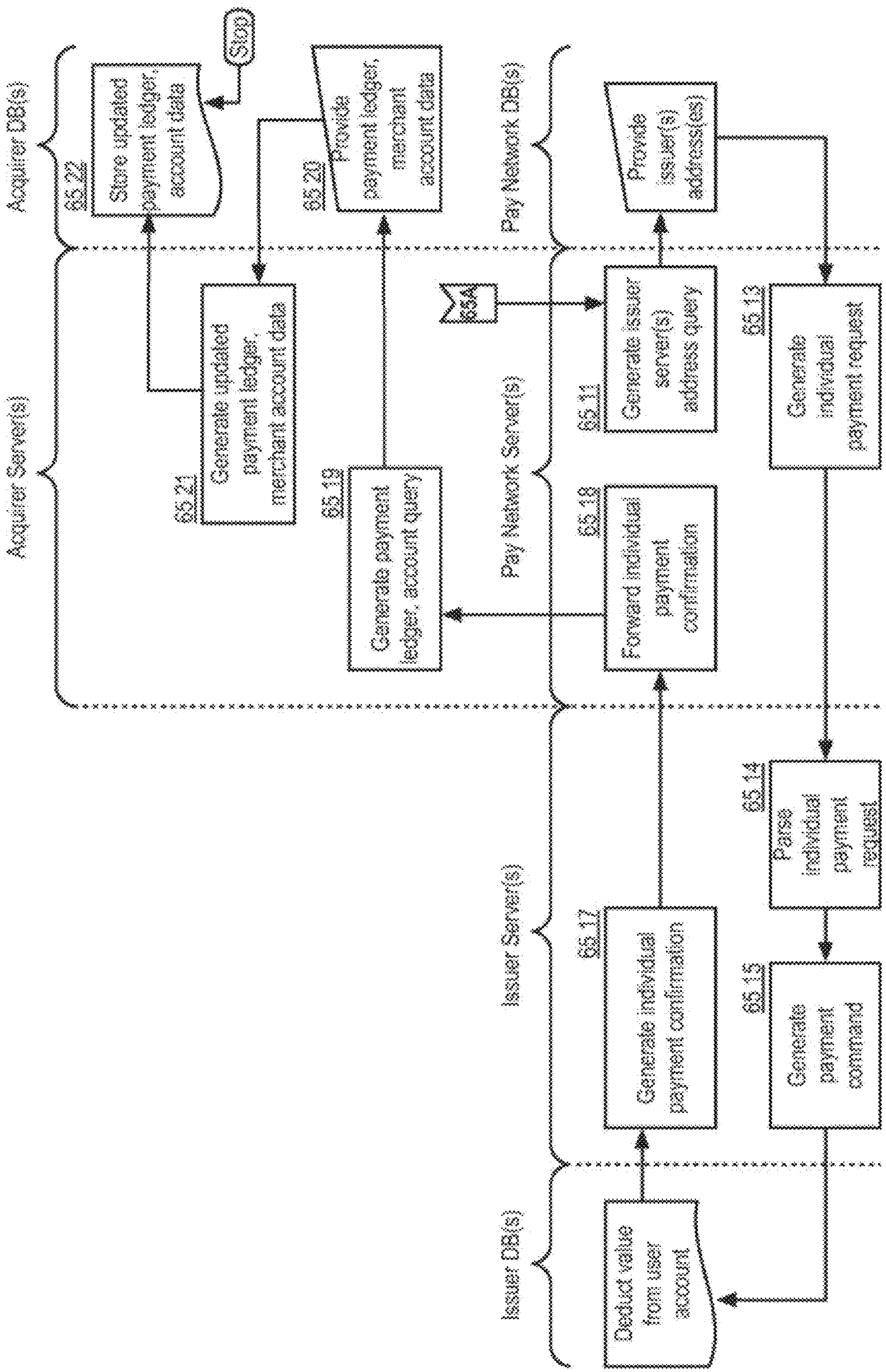

FIGS. 65A-B show logic flow diagrams illustrating example aspects of purchase transaction clearance in some embodiments of the WIP, e.g., a Purchase Transaction Clearance ("PTC") component 6500. With reference to FIG. 65A, in some embodiments, a merchant server may initiate clearance of a batch of authorized transactions. For example, the merchant server may generate a batch data request, e.g., 6501, and provide the request to a merchant database. In response to the batch data request, the database may provide the requested batch data, e.g., 6502. The server may generate a batch clearance request, e.g., 6503, using the batch data obtained from the database, and provide the batch clearance request to an acquirer server. The acquirer server may parse, e.g., 6504, the obtained batch clearance request, and generate, e.g., 6507, a batch payment request using the obtained batch clearance request to provide, the batch payment request to a pay network server. For example, the acquirer server may query, e.g., 6505, an acquirer database for an address of a payment network server, and utilize the obtained address, e.g., 6506, to forward the generated batch payment request to the pay network server.

The pay network server may parse the batch payment request obtained from the acquirer server, and extract the transaction data for each transaction stored in the batch payment request, e.g., 6508. The pay network server may store the transaction data, e.g., 6509, for each transaction in a pay network database. In some embodiments, the pay network server may invoke a component, e.g., 6510, to provide analytics based on the transactions of the merchant for whom purchase transaction are being cleared.

With reference to FIG. 65B, in some embodiments, for each extracted transaction, the pay network server may query, e.g., 6511, a pay network database for an address of an issuer server 6512. The pay network server may generate an individual payment request, e.g., 6513, for each transaction for which it has extracted transaction data, and provide the individual payment request to the issuer server. In some embodiments, the issuer server may parse the individual payment request, e.g., 6514, and generate a payment command, e.g., 6515, based on the parsed individual payment request. For example, the issuer server may issue a command to deduct funds from the user's account (or add a charge to the user's credit card account). The issuer server may issue a payment command, e.g., 6515, to a database storing the user's account information, e.g., a user profile database, which may deduct value from the user's account 6516. The issuer server may provide an individual payment confirmation, e.g., 6517, to the pay network server, which may forward, e.g., 6518, the individual payment confirmation to the acquirer server.

In some embodiments, the acquirer server may parse the individual payment confirmation, and correlate the transaction (e.g., using the request ID field in the example above) to the merchant. The acquirer server may then transfer the funds specified in the funds transfer message to an account of the merchant. For example, the acquirer server may query, e.g. 6519, an acquirer database for payment ledger and/or merchant account data, e.g., 6520. The acquirer server may utilize payment ledger and/or merchant account data from the acquirer database, along with the individual payment confirmation, to generate updated payment ledger and/or merchant account data, e.g., 6521. The acquirer server may then store, e.g., 6522, the updated payment ledger and/or merchant account data to the acquire database.

Figure 66A:
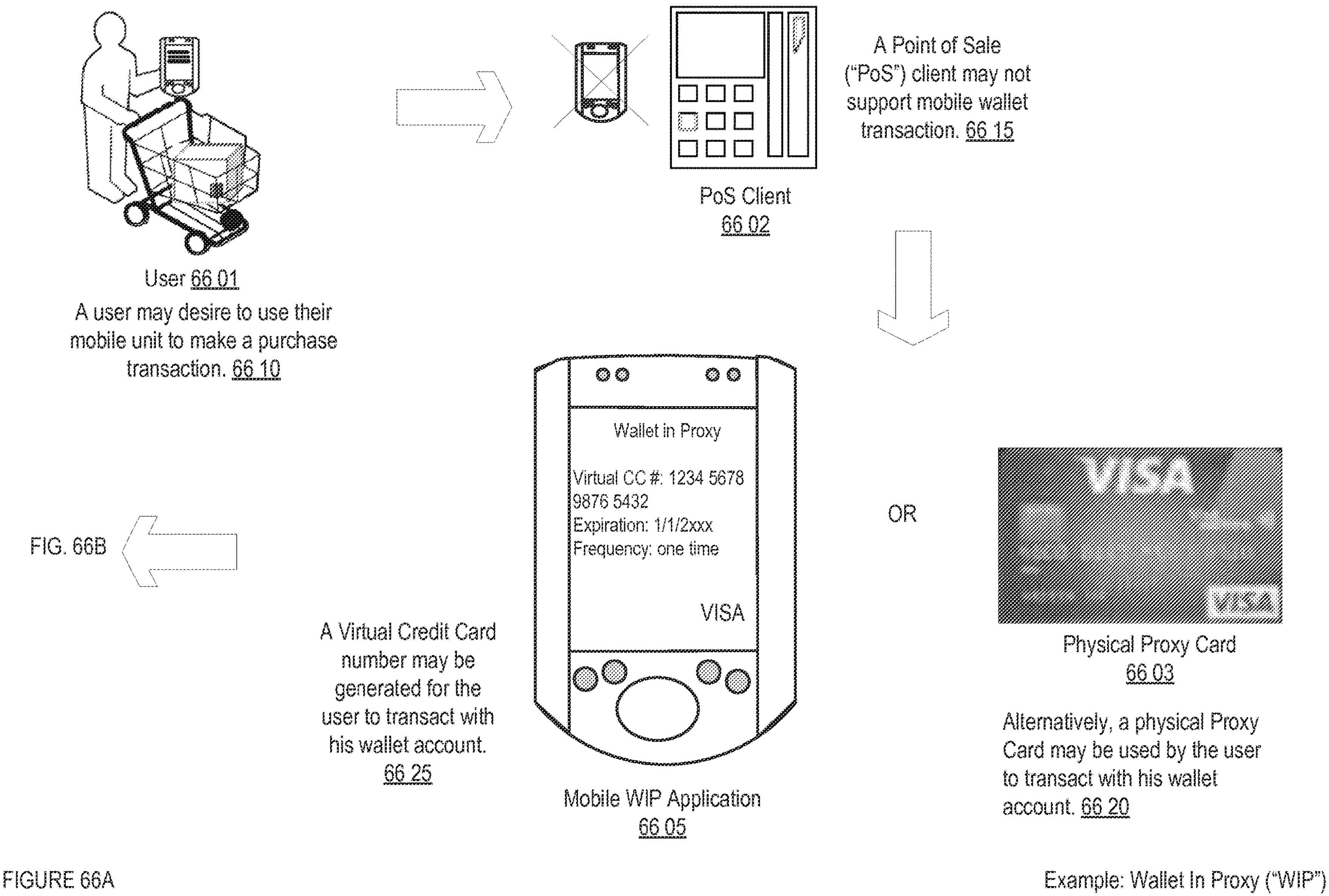
FIGS. 66A-66C show block diagrams illustrating examples of a wallet in proxy purchase transaction in some embodiments of the WIP.
Figure 66B:
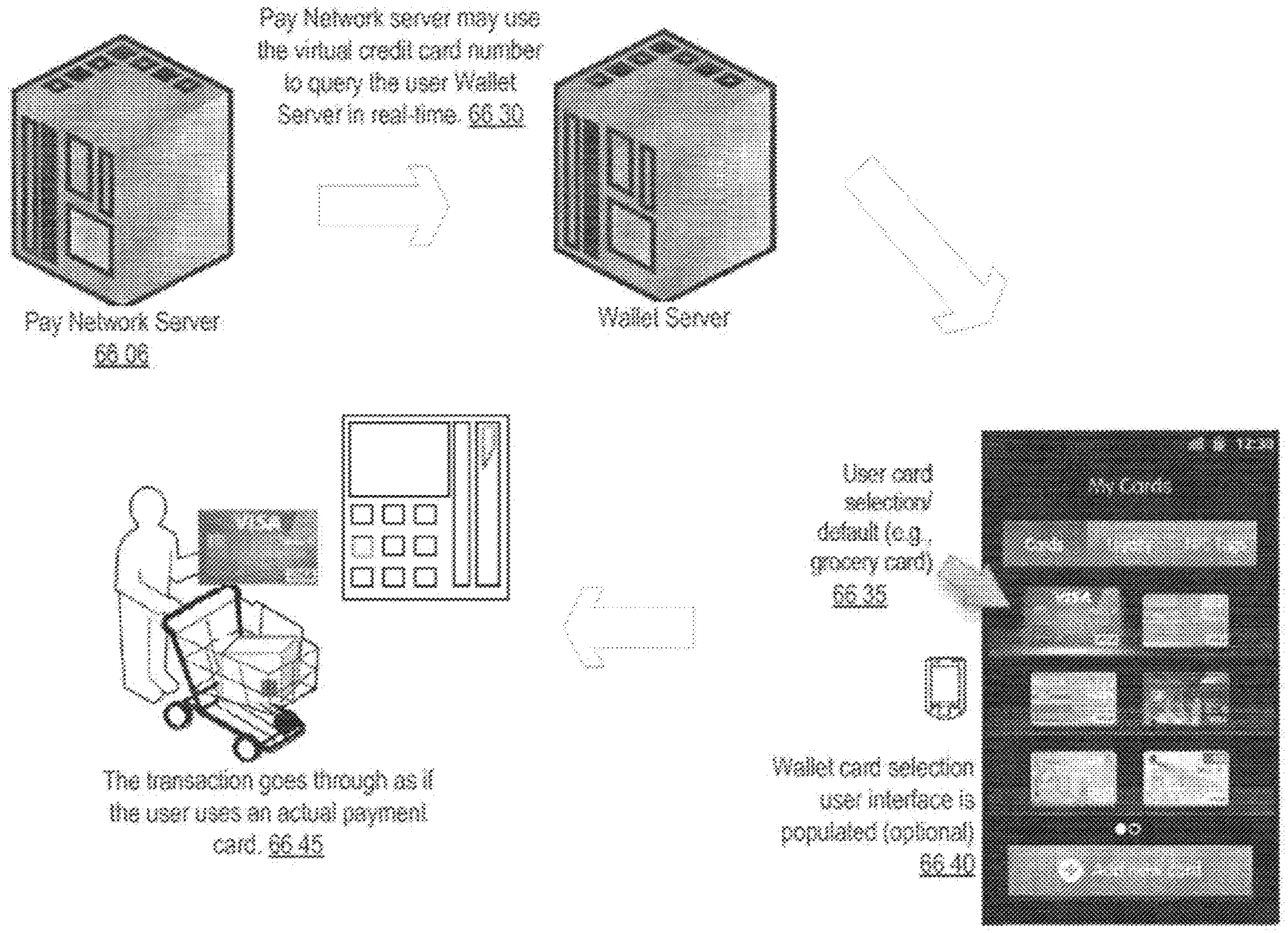
Figure 66C:
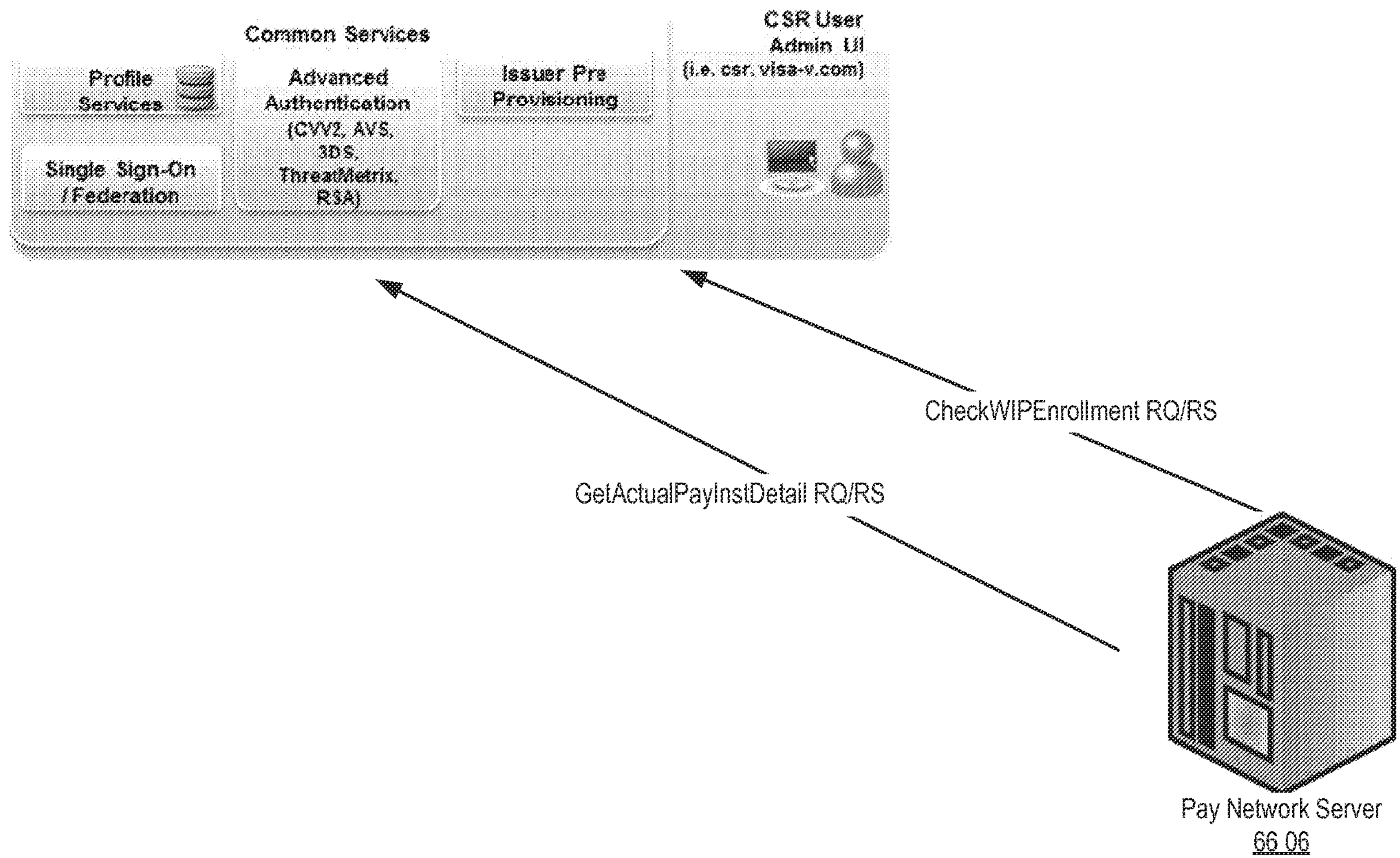

FIGS. 66A-66C show block diagrams illustrating examples of a wallet in proxy purchase transaction in some embodiments of the WIP. In some embodiments, a user 6601 may desire to purchase products, services and/or other offerings ("products") using a mobile wallet device 6610. The mobile wallet device may be a device which stores the user's payment cards (e.g., credit card, debit card, checking account, savings account, and/or the like) and may be used to make transactions. However, a point-of-sale ("POS") terminal 6602 may not support transactions through the mobile wallet device 6615. In some implementations, the user may choose to generate a virtual credit card number using one of the WIP applications on a mobile device 6605 and transact with the virtual credit card number 6625. In some implementations, the user may, before making the purchase at the store, choose to request the WIP server to send a physical proxy card 6603. When making purchase using the virtual credit card number or the physical proxy card 6620 ("proxy card"), the POS terminal may provide the details of the user's proxy card for processing the purchase transaction. For example, the POS terminal may provide the purchase transaction details to a pay network 6606 (e.g., credit card company, issuer bank, acquirer bank, etc.) for payment processing. The pay network may identify, e.g., 6630, based on the proxy card details, that the user associated with the proxy card has access to a virtual wallet of cards 6607. The pay network may, e.g., in real-time, query the user for a selection of one of the cards from user's virtual wallet. For example, the pay network may send to the user's device (e.g., smartphone, tablet computer, netbook, laptop, personal digital assistant, gaming console, etc.) a message (e.g., (Secure) HyperText Transfer Protocol (HTTP(S)) POST/GET message, electronic mail message, Short Messaging Service (SMS) message, HTTP/Real Time Streaming Protocol (RTSP) video stream, text message, Twitter™ tweet, Facebook® message/wall posting, etc.) requesting the user to select a payment option from the user's virtual wallet 6635. Based on the message, a user interface rendered by the user's device may be populated with user card selection options, see 6640. Alternatively, the payment network server may select a pre-set card with which to process the purchase transaction.

In some implementations, upon obtaining the message, the device may provide the user with an interface to make a selection of a card from the user's virtual wallet to utilize to complete the purchase transaction. For example, the user's device may be executing an application module ("app"), via which the user's device may communicate with the pay network. The user's device may display the virtual wallet card selection options obtained from the pay network via the app to the user. In some implementations, the app may provide the user an option to buy the purchase items on the spot by performing a single action (e.g., tap, swipe touchscreen of a mobile device, press a key on a keyboard, perform a single mouse click, etc.).

In some implementations, the app may provide various alternate options for the user. For example, the app may provide the user with alternate merchants where the user may obtain the products and/or similar products, alternate products that may be comparable to the purchase products, competitive pricing information between merchants, discounts, coupons, and/or other offers for the user, etc. In some implementations, the app may indicate that the user may earn rewards points if the user purchases the product at another merchant. In some implementations, the app may indicate that the may be required to use fewer rewards points to pay for the purchase transaction if the user purchases the product at another merchant, because the other merchant may have a better relationship with the rewards points provider. In some implementations, the app may indicate that the user may earn more rewards points if the uses a specific (or alternative) card to pay for the purchase transaction. In some implementations, the app may indicate that the user may obtain a greater amount of cash back if the user purchases the card at an alternate merchant and/or using an alternate card. In various implementations, offers to the user including and similar to those described herein may originate from various entities and/or components, including but not limited to: merchants, pay networks, card issuers, acquirers, and/or the like.

In some implementations, the user may buy the product on the spot from the current merchant and/or other merchant(s) by performing the single action on the user device (e.g., one tap of a touchscreen of the user device). In such implementations, the WIP server may initiate a card-based purchase transaction using a "card" (e.g., checking account, savings account, Paypal™ account, Google Checkout™ account, credit card, debit card, prepaid card, etc.) selected from the user's virtual wallet, see, e.g., 6645. In some implementations, the WIP may be able to arbitrage credit card payment networks in that a merchant, card issuer, acquirer, pay network, and/or the like entities and/or WIP components may switch how payments for the user are processed because of transaction cost considerations.

In some implementations, the pay network may initiate the card-based purchase transaction and may generate a purchase confirmation receipt for the user. The WIP server may provide the purchase confirmation receipt to the client device. In some implementations, the user may desire to exit the store after purchasing items via the app. In such implementations, the user may be required to provide proof of purchase of the product at the exit of the store. The user may utilize the purchase confirmation receipt obtained from the WIP via the app on the client device to provide such proof of product purchase. For example, the receipt may include a purchase identifier. For example, the purchase identifier may include a barcode, a QR code, an image of a receipt, a video of a purchase action, etc. The user may utilize such confirmations of the purchase as proof at the exit of the store. Accordingly, in some implementations, the user may obtain greater security in transactions because a purchase can only be completed if the person has both the user's universal card, and access to the user's device, as well as access to the app executing on the user's device. Further, even at outdated POS terminals, a user may obtain access to the user's virtual wallet via the user's device, thus improving the user's efficiency and ease in the shopping experience.

Some embodiments of the WIP may facilitate a customer to use his Wallet everywhere, irrespective of whether a merchant support it or not.

Some embodiments of the WIP may facilitate a customer to get one unified view of all his transactions. Thus using the Proxy the customer may be transacting from within the wallet.

Some embodiments of the WIP may facilitate a customer to use his wallet outside of his PC/mobile device, similar to a physical credit card.

Some embodiments of the WIP may facilitate a customer to use proxy/virtual cards which may be secured, configured and controlled from within the wallet.

Some embodiments of the WIP may facilitate a customer to store his proxy credit card inside other wallets. For example: a customer may pay via Google Wallet, but in turn use a payment instrument which is proxy to Wallet.

In some embodiments, if an existing wallet customer signs up for the WIP service on his account, the customer may request for the WIP service to be enabled for his account.

The WIP may issue a virtual credit card, which can be linked to a physical credit card. The WIP may send the customer a virtual credit card, which the customer may use for making purchases. In some implementations, the virtual credit card may be an actual credit card, which a pay network server may see as a wallet proxy credit card. The transaction requests that the pay network server receives for this wallet proxy card, may get diverted to wallet stack server. In some implementations, the wallet stack may conduct its checks, and replace the wallet proxy card with the actual physical credit card. The pay network server may process the transaction as usual, and send back the results to the processors.

In some embodiments, a wallet customer, who has the WIP service enabled, may desire to make a purchase at a website which may not accept wallet as a valid payment option. For example, a customer may be presented with a number of payment options at a checkout page at the website. At Amazon checkout page, I select my Credit card as a payment method. The customer may use his virtual credit card which the WIP sent him to his wallet, when he enabled the WIP service. The merchant website may process the transaction and send him a confirmation order is successfully processed. At the back end the WIP may convert this virtual credit card with the actual physical credit card that the customer intended to use. The wallet may take a note of the transaction, along with the merchant details and amount. As a customer the transaction is recorded in wallet, and the customer used his payment instrument from within his wallet to pay for a item at a merchant store which does not support wallet payment as a valid payment option.

In some embodiments, a wallet customer, who has the WIP service enabled, may go for a card present purchase at a physical store that may not support wallet payment as a valid payment option. For example, a customer may go to a physical store and desire to purchase products. The store may only allow a different vendor wallet or a physical credit card to make purchase. The customer may user his wallet proxy credit card to make the purchase. The WIP server may replace the wallet proxy credit card details with the actual credit card details, after communicating to the wallet stack server. The transaction may be completed with the actual credit card.

With reference to FIG. 66C, the transaction processing flow of Pay Network may be altered to check if Wallet Proxy on this Virtual Card is ENABLED. If the Reply is TRUE, the transaction details may be sent to the Wallet network with the WIP/Virtual Credit card. The wallet network may store the transaction details in the user profile, and send the Actual Payment instrument details to the Interchange. The Pay Network may use these Payment details to process the transaction. This alteration may be accompanied by setting up the connectivity with the Wallet network using the XML protocol mentioned below.

Figure 67:
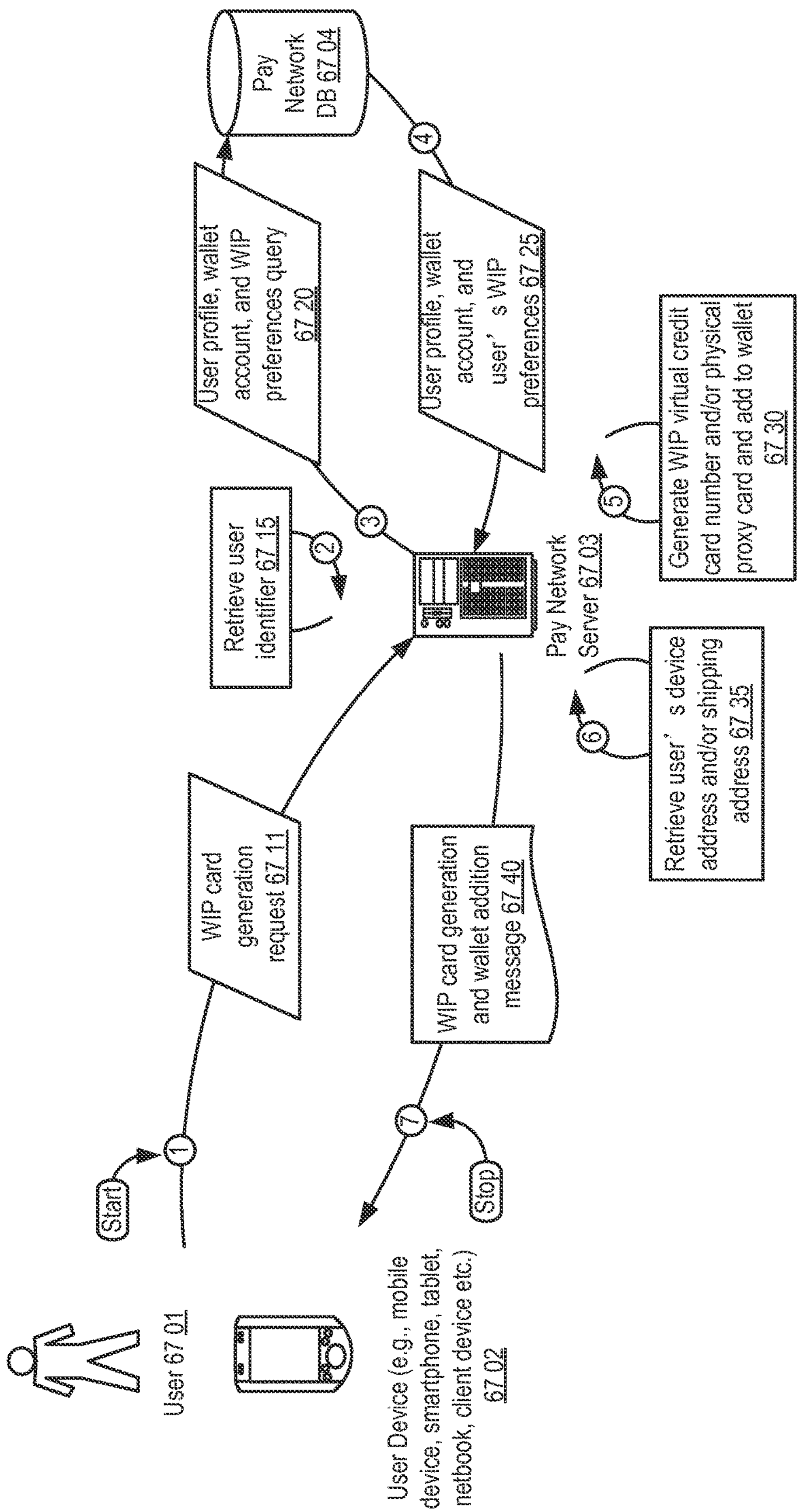
FIG. 67 shows a datagraph diagram illustrating examples of transforming wallet in proxy card generation requests via a WIP wallet card generation component into wallet in proxy card generation notifications.

FIG. 67 shows a datagraph diagram illustrating examples of transforming wallet in proxy card generation requests via a WIP wallet card generation component into wallet in proxy card generation notifications. A user 6701 may start by sending a WIP card generation request 6711 via a user device 6702 (e.g., mobile device, smartphone, tablet, netbook, client device, and/or the like). For example, the user device may provide a HTTP(S) POST message including an XML-formatted WIP card generation request 6711 similar to the example listing provided below:

```
POST /WIPcardgenerationrequest.php HTTP/1.1
Content-Type: Application/XML
Content-Length: 624
<?XML version = "1.0" encoding = "UTF-8"?>
<WIP_card_generation_request>
    <user_ID>john.q.public@gmail.com</user_ID>
    <physical_card>Y</physical_card>
    <client_details>
        <client_IP>192.168.23.126</client_IP>
        <client_type>smarthphone</client_type>
        <client_model>HTC Hero</client_model>
        <OS>Android 2.2</OS>
        <app_installed_flag>true</app_installed_flag>
    </client_details>
</WIP_card_generation_request>
```

In one embodiment, the WIP server may generate a virtual card number. In an alternative embodiment, the WIP server may generate a physical proxy card. The user may check a box in a WIP user interface to select the physical proxy card option.

Upon receiving the WIP card generation request, the Pay Network Server 6703 may retrieve a user identifier 6715. The Pay Network Server may send a user profile, wallet account, and WIP preferences query 6720 associated with the user identifier to the Pay Network Database(s) 6704. For example, the database may be a relational database responsive to Structured Query Language ("SQL") commands. The pay network server may execute a hypertext preprocessor ("PHP") script including SQL commands to query the database for user's profile, wallet account, and WIP preferences. An example PHP/SQL command listing, illustrating substantive aspects of user's profile, wallet account, and WIP preferences 6720 to a database, is provided below:

```
<?PHP
header('Content-Type: text/plain');
mysql_connect("254.93.179.112",$DBserver,$password); // access database server
mysql_select_db("WALLETS.SQL"); // select database table to search
//create query for user profile wallet account and WIP preferences
$query = "SELECT wallet_id wallet_WIP enrollment card_types_list
    card_numbers_list anon_cards_list bank_accounts_list
    WIP_preference_rules_list FROM WIPTable WHERE user_ID LIKE '%' $user ID";
$result = mysql_query($query); // perform the search query
mysql_close("WALLETS.SQL"); // close database access
?>
```

Upon receiving the query, the Pay Network DB may send the user profile, wallet account and user's WIP preferences 6725 data to the Pay Network Server. Then the Pay Network Server may generate a WIP virtual credit card number and/or a physical proxy card, which may be added to the wallet 6730. The Pay Network Server may retrieve the user's device address and/or shipping address 6735. Then the Pay Network Server may send a WIP card generation message and wallet addition message 6740 to the User Device 6702. For example, the Pay Network Server may provide a HTTP (S) POST message including an XML-formatted WIP card generation message and wallet addition message 6740 similar to the example listing provided below:

```
POST /WIPcardgenerationmessage.php HTTP/1.1
Content-Type: Application/XML
Content-Length: 624
<?XML version = "1.0" encoding = "UTF-8"?>
<WIP_card_generation_message>
    <user_ID>john.q.public@gmail.com</user_ID>
    <wallet_ID>1258JSER9W</wallet_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <virtual_card_number_flag>Y</virtual_card_number_flag>
    <virtual_account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
        <refresh_count>after every transaction</refresh_count>
        <add_in_wallet>Y</add_in_wallet>
    </virtual_account_params>
    <card_selection_options>
        <general_1>
            <split_percent>40%</split_percent>
            <account_name>John Q. Public</account_name>
            <account_type>credit</account_type>
            <account_num>123456789012345</account_num>
            <billing_add>123 Green St., Norman, OK 98765</billing_add>
            <phone>123-456-7809</phone>
            <ui_img>http://www.paycards.com/ui?img=8976543</ui_img>
            <img_scale>312x312</img_scale>
        </general_1>
        <general_2>
            <split_percent>60%</split_percent>
            <account_name>John Q. Public</account_name>
            <account_type>credit</account_type>
            <account_num>9876543210123456</account_num>
            <billing_add>123 Green St., Norman, OK 98765</billing_add>
            <phone>123-456-7809</phone>
            <ui_img>http://www.paycards.com/ui?img=8976543</ui_img>
            <img_scale>312x312</img_scale>
        </general_2>
    </card_selection_options>
</WIP_card_generation_message>
```

Figure 68:
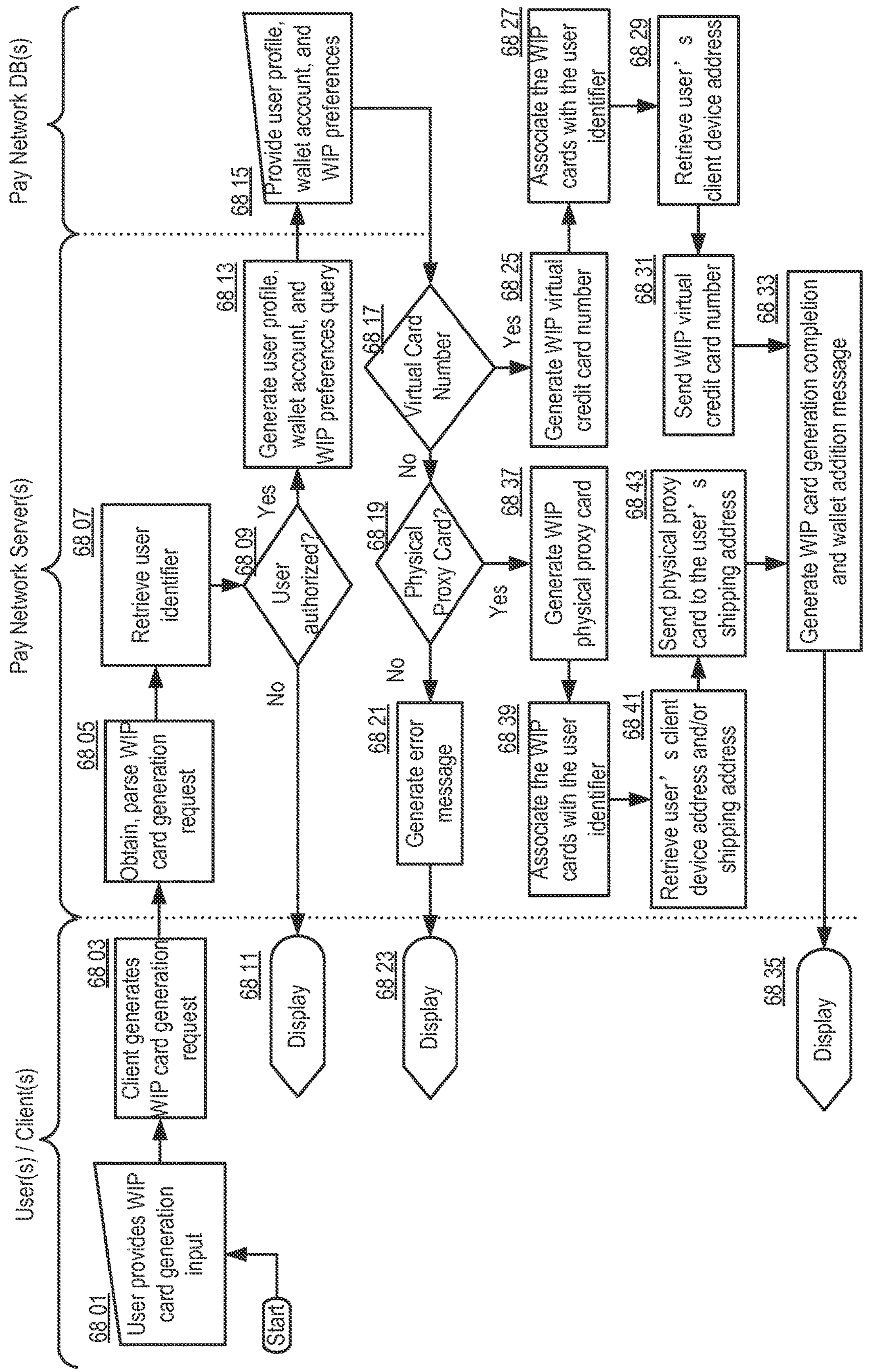
FIG. 68 shows a logic flow diagram illustrating examples of transforming wallet in proxy card generation requests via a WIP wallet card generation component into wallet in proxy card generation notifications.

FIG. 68 shows a logic flow diagram illustrating examples of transforming wallet in proxy card generation requests via a WIP wallet card generation component into wallet in proxy card generation notifications. In some embodiments, a User may provide WIP card generation input 6801. The Client may take the input and generate a WIP card generation request 6803. The Pay Network Server may obtain and parse the WIP card generation request 6805. By doing that the Pay Network Server may retrieve a user identifier 6807. Then the Pay Network Server may perform an examination to check whether the User is authorized 6809. If the User is not authorized, then the Pay Network Server may generate a user unauthorized message and display the message on the User/Client device 6811. If the User is authorized, then the Pay Network Server may generate a query for user profile, wallet account, and WIP preferences 6813. The query may be sent to the Pay Network DB. Upon receiving the query, the Pay Network DB may provide the user profile, wallet account, and WIP preferences 6815. Upon receiving the response from the Pay Network DB, the Pay Network Server may perform an examination on the WIP preferences to check whether a virtual card number is required 6817. If a virtual card number is not required, then the Pay Network Server may perform an examination on the WIP preferences to check whether a physical proxy card is required 6819. If a physical proxy card is not required, then the Pay Network Server may generate an error message 6821. Then the error message may be displayed on the User/Client device 6823. In some embodiments, if a virtual card number is required 6817, then the Pay Network Server may generate a WIP virtual credit card number 6825. Then the Pay Network Server may associate the WIP cards with the user identifier 6827. Then the Pay Network Server may retrieve the user's client device address 6829. Then the Pay Network Server may send the WIP virtual credit card number to the user 6831. Then the Pay Network Server may generate a WIP card generation completion and wallet addition message 6833 to add the generate WIP card to the user's wallet account. Then the WIP card generation completion message may be sent to the user/client device for display 6835. In some embodiments, if a virtual card number is not required, and a physical proxy card is required 6819, then the Pay Network Server may generate a WIP physical proxy card 6837. The Pay Network Server may associate the WIP cards with the user identifier 6839, and retrieve the user's client device address and/or shipping address 6841. Then the Pay Network Server may send the physical proxy card to the user's shipping address 6843. The Pay Network Server may generate a WIP card generation completion message 6833, and send the message to the user/client device for display 6835.

FIG. 69 shows a datagraph diagram illustrating examples of transforming purchase inputs using a wallet in proxy card via a WIP wallet card selection component and a WIP purchase transaction component into wallet in proxy card-based transaction purchase notifications. In some implementations, a user, e.g., 6901, may desire to purchase a product, service, offering, and/or the like ("product"), from a merchant. The user may communicate with a merchant server, e.g., 6903, via a client such as, but not limited to: a personal computer, mobile device, television, point-of-sale terminal, kiosk, ATM, and/or the like (e.g., 6902*a*). For example, the user may provide user input, e.g., purchase input 6911, into the client indicating the user's desire to purchase the product. In various implementations, the user input may include, but not be limited to: keyboard entry, card swipe, activating a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the merchant, and may select a product from the website via clicking on a hyperlink presented to the user via the website. As another example, the client may obtain track 1 data from the user's card (e.g., credit card, debit card, prepaid card, charge card, etc.), such as the example track 1 data provided below:

```
%B123456789012345^PUBLIC/J.Q.^99011200000000000000**901******?*
(wherein '123456789012345' is the card number of 'J.Q. Public' and has a CVV
    number of 901. '990112' is a service code, and *** represents decimal digits
    which change randomly each time the card is used.)
```

In some implementations, the client may generate a purchase order message, e.g., 6912, and provide, e.g., 6913, the generated purchase order message to the merchant server. For example, a browser application executing on the client may provide, on behalf of the user, a (Secure) Hypertext Transfer Protocol ("HTTP(S)") GET message including the product order details for the merchant server in the form of data formatted according to the eXtensible Markup Language ("XML"). Below is an example HTTP(S) GET message including an XML-formatted purchase order message 6913 for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <merchant_ID>FDFG23</merchant_ID>
    <store_ID>1234</store_ID>
    <location>129.94.56.456</location>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <account_params>
        <account_name>John Q. Public</account_name>
        <account_type>credit</account_type>
        <account_num>123456789012345</account_num>
        <billing_address>123 Green St., Norman, OK
        98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
```

-continued

```
        <ship__account>123-45-678</ship__account>
        <tracking__flag>true</tracking__flag>
        <sign__flag>false</sign__flag>
    </shipping__info>
</purchase__order>
```

In some implementations, the merchant server may obtain the purchase order message from the client, and may parse the purchase order message to extract details of the purchase order from the user, e.g. 6918. The merchant server may generate a card query request, e.g., 6914, to determine whether the transaction can be processed. For example, the merchant server may attempt to determine whether the user has sufficient funds to pay for the purchase in a card account provided with the purchase order. The merchant server may provide the generated card query request, e.g., 6915, to an acquirer server, e.g., 6904. For example, the acquirer server may be a server of an acquirer financial institution ("acquirer") maintaining an account of the merchant. For example, the proceeds of transactions processed by the merchant may be deposited into an account maintained by the acquirer. In some implementations, the card query request may include details such as, but not limited to: the costs to the user involved in the transaction, card account details of the user, user billing and/or shipping information, and/or the like. For example, the merchant server may provide a HTTP(S) POST message including an XML-formatted card query request 6915 similar to the example listing provided below:

```
POST /cardquery.php HTTP/1.1
Host: www.acquirer.com
Content-Type: Application/XML
Content-Length: 624
<?XML version = "1.0" encoding = "UTF-8"?>
<card__query__request>
    <query__ID>VNEI39FK</query__ID>
    <timestamp>2011-02-22 15:22:44</timestamp>
    <purchase__summary>
        <num__products>1</num__products>
        <product>
            <product__summary>Book - XML for dummies</product__summary>
            <product__quantity>1</product__quantity?
        </product>
    </purchase__summary>
    <transaction__cost>$34.78</transaction__cost>
    <account__params>
        <account__name>John Q. Public</account__name>
        <account__type>credit</account__type>
        <account__num>123456789012345</account__num>
        <billing__address>123 Green St., Norman, OK 98765</billing__address>
        <phone>123-456-7809</phone>
        <sign>/jqp/</sign>
    </account__params>
    <merchant__params>
        <merchant__id>3FBCR4INC</merchant__id>
        <merchant__name>Books & Things, Inc.</merchant__name>
        <merchant__auth__key>1NNF484MCP59CHB27365</merchant__auth__key>
    </merchant__params>
</card__query__request>
```

In some implementations, the acquirer server may generate a card authorization request, e.g., 6916, using the obtained card query request, and provide the card authorization request, e.g., 6917, to a pay network server, e.g., 6905. For example, the acquirer server may redirect the HTTP(S) POST message in the example above from the merchant server to the pay network server. The pay network server 6905 may parse the authorization request 6918.

In some implementations, the pay network server may obtain the card authorization request from the acquirer server, and may parse the card authorization request to extract details of the request, e.g., the user ID and purchase card details. The pay network server may attempt to determine whether the user has access to a virtual wallet from which the user may select a card to use to complete the purchase transaction 6918. In some implementations, the pay network server may query, e.g., 6919, a pay network database, e.g., 6907, to obtain data on virtual card selection options for the user. In some implementations, the database may store details of the user, a flag indicating whether the user has access to a virtual wallet, account numbers associated with the user's virtual wallet, and/or the like. For example, the database may be a relational database responsive to Structured Query Language ("SQL") commands. The pay network server may execute a hypertext preprocessor ("PHP") script including SQL commands to query the database for virtual wallet card selection options available to the user. An example PHP/SQL command listing, illustrating substantive aspects of a virtual wallet card selection query 6919 to a database, is provided below:

```
<?PHP
header('Content-Type: text/plain');
mysql__connect("254.93.179.112",$DBserver,$password); // access
database server
mysql__select__db("WALLETS.SQL"); // select database table to search
//create query for virtual wallet card selection options
```

-continued

```
$query = "SELECT wallet__id wallet__auth__challenge card__types__list
    card__numbers__list anon__cards__list bank__accounts__list
    rewards__accounts__list external__accts__list FROM
    VirtualWalletsTable WHERE universalcard__num LIKE '%'
    $universalcardnum";
```

-continued

```
$result = mysql_query($query); // perform the search query
mysql_close("WALLETS.SQL"); // close database access
?>
```

In response to obtaining the virtual wallet card selection query, e.g., 6919, the pay network database may provide, e.g., 6920, the requested virtual wallet card selection options to the pay network server. The pay network server may generate a request 6921 for a selection of one of the payment options from the user's virtual wallet, and provide, e.g., 6922, the virtual wallet card selection request to a user device, e.g., 6902*b*, such as, but not limited to: a personal computer, mobile device, (interactive) television, personal digital assistant, tablet computer, e-book reader, gaming console, netbook, laptop computer, and/or the like. For example, the pay network server may provide a HTTP(S) POST message including an XML-formatted virtual wallet card selection request 6922 similar to the example listing provided below:

```
POST /selectionrequest.php HTTP/1.1
Content-Type: Application/XML
Content-Length: 624
<?XML version = "1.0" encoding = "UTF-8"?>
<card_selection_options>
    <order_ID>VNEI39FK</query_ID>
    <timestamp>2011-02-22 15:22:44</timestamp>
    <transaction_cost>$34.78</transaction_cost>
    <merchant_id>3FBCR4INC</merchant_id>
    <card_options>
        <grocery>
            <account_name>John Q. Public</account_name>
            <account_type>credit</account_type>
            <account_num>123456789012345</account_num>
            <billing_add>123 Green St., Norman, OK 98765</billing_add>
            <phone>123-456-7809</phone>
            <ui_img>http://www.paycards.com/ui?img=9083245</ui_img>
            <img_scale>256x256</img_scale>
        </grocery>
        <shopping>
            <account_name>John Q. Public</account_name>
            <account_type>paypal</account_type>
            <account_num>123456789012345</account_num>
            <billing_add>123 Green St., Norman, OK 98765</billing_add>
            <phone>123-456-7809</phone>
            <ui_img>http://www.paycards.com/ui?img=32456</ui_img>
            <img_scale>256x256</img_scale>
        </shopping>
        <general - default>
            <account_name>John Q. Public</account_name>
            <account_type>credit</account_type>
            <account_num>123456789012345</account_num>
            <billing_add>123 Green St., Norman, OK 98765</billing_add>
            <phone>123-456-7809</phone>
            <ui_img>http://www.paycards.com/ui?img=8976543</ui_img>
            <img_scale>312x312</img_scale>
        </general - default>
    </account_params>
</card_selection_options>
```

The user device may display the virtual wallet card selection options for the user, e.g., 6923. For example, the user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

In some implementations, the user may provide a card selection input, e.g., 6924, in response to the virtual wallet card selection options presented by the user device to the user. For example, the user may tap, swipe touchscreen of a mobile device, press a key on a keyboard, perform a single mouse click, etc. to provide a selection of a card from the user's virtual wallet with which to complete the purchase transaction. The user device may generate a virtual wallet card selection response based on the user's card selection input, and provide, e.g., 6925, the virtual wallet card selection response to the pay network server. For example, the user device may provide a HTTP(S) POST message including an XML-formatted virtual wallet card selection response 6925 similar to the example listing provided below:

```
POST /selectionrequest.php HTTP/1.1
Content-Type: Application/XML
Content-Length: 624
<?XML version = "1.0" encoding = "UTF-8"?>
<card_selection_options>
     <order_ID>VNEI39FK</query_ID>
     <timestamp>2011-02-22 15:22:44</timestamp>
     <transaction_cost>$34.78</transaction_cost>
     <merchant_id>3FBCR4INC</merchant_id>
     <card_options>
          <grocery>
               <split_percent>60%</split_percent
               <account_name>John Q. Public</account_name>
               <account_type>credit</account_type>
               <account_num>123456789012345</account_num>
               <billing_add>123 Green St., Norman, OK 98765</billing_add>
               <phone>123-456-7809</phone>
               <ui_img>http://www.paycards.com/ui?img=9083245</ui_img>
               <img_scale>256x256</img_scale>
          </grocery>
          <general>
               <split_percent>40%</split_percent
               <account_name>John Q. Public</account_name>
               <account_type>credit</account_type>
               <account_num>123456789012345</account_num>
               <billing_add>123 Green St., Norman, OK 98765</billing_add>
               <phone>123-456-7809</phone>
               <ui_img>http://www.paycards.com/ui?img=8976543</ui_img>
               <img_scale>312x312</img_scale>
          </general>
     </account_params>
</card_selection_options>
```

The Pay Network server may process the purchase transaction with the selected card from the user's virtual wallet 6926.

Figure 70:
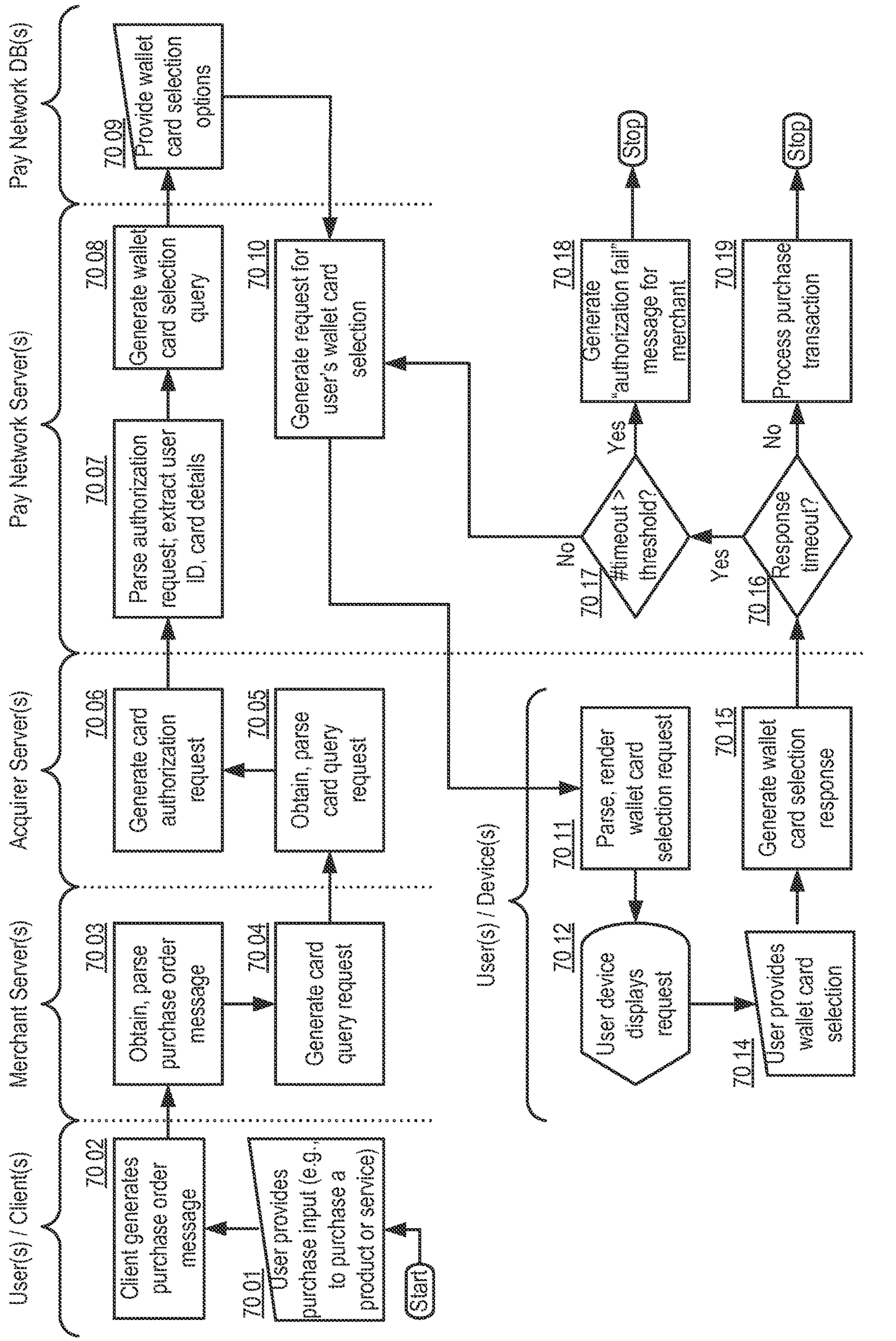
FIG. 70 shows a logic flow diagram illustrating examples of transforming purchase inputs using a wallet in proxy card via a WIP wallet card selection component and a WIP purchase transaction component into wallet in proxy card-based transaction purchase notifications.

FIG. 70 shows a logic flow diagram illustrating examples of transforming purchase inputs using a wallet in proxy card via a WIP wallet card selection component and a WIP purchase transaction component into wallet in proxy card-based transaction purchase notifications. In some implementations, a user may provide user input, e.g., 7001, into a client indicating the user's desire to purchase a product from a merchant. The client may generate a purchase order message, e.g., 7002, and provide the generated purchase order message to the merchant server. In some implementations, the merchant server may obtain, e.g., 7003, the purchase order message from the client, and may parse the purchase order message to extract details of the purchase order from the user. Example parsers that the merchant client may utilize are discussed further below with reference to FIG. 6. The merchant server may generate a card query request, e.g., 7004, to determine whether the transaction can be processed. For example, the merchant server may process the transaction only if the user has sufficient funds to pay for the purchase in a card account provided with the purchase order. The merchant server may provide the generated card query request to an acquirer server. The acquirer server may parse the card query request, e.g., 7005. The acquirer server may generate a card authorization request, e.g., 7006, using the obtained card query request, and provide the card authorization request to a pay network server.

In some implementations, the pay network server may obtain the card authorization request from the acquirer server, and may parse the card authorization request to extract details of the request, e.g., 7007. For example, the pay network server may obtain the user ID of the user, card account number of the card the user swiped at the client, etc. The pay network server may attempt to determine whether the user has access to a virtual wallet from which the user may select a card to use to complete the purchase transaction. In some implementations, the pay network server may generate a query, e.g., 7008, to a pay network database to obtain virtual card selection options available to the user, as discussed above in the description with reference to FIG. 4A. In response to the virtual wallet card selection query, e.g., 7008, the pay network database may provide, e.g., 7009, the requested virtual wallet card selection options to the pay network server. The pay network server may generate a request for a selection of one of the payment options from the user's virtual wallet, e.g., 7010, and provide the virtual wallet card selection request to a user device. For example, the query results may return a listing of several user e-wallet accounts (e.g., credit, debit, prepaid, etc., from numerous issuers, and merchants); this list of query results may be wrapped into a dynamic user-interface object (e.g., an HTML, XML, CSS, etc. wrapper; see FIG. 4A, 422), which may then be rendered by the user device. In some implementations, the user device may render, e.g., 7011, the virtual wallet card selection options provided by the pay network server, and display the virtual wallet card selection options for the user, e.g., 7012. For example, the selection object may be rendered in a display portion of the screen, e.g., in a web-rendering object view.

In some implementations, the user may provide a card selection input, in response to the virtual wallet card selection options presented by the user device to the user. The user device may generate a virtual wallet card selection response based on the user's card selection input, e.g., 7014, and provide the virtual wallet card selection response to the pay network server 7015. In some implementations, the pay network server may wait for at least a predetermined amount of time for a response from the user to the virtual wallet card selection request. If the wait time exceeds the predetermined amount of time, the pay network server may determine that the user's time has run out, resulting in a timeout. This may provide an element of security to the user's virtual wallet. If the user has timed out, e.g., 7016, option "Yes," the server may determine whether the user timed out more than a pre-specified number of times in the processing of the current transaction. If the user has not responded (or if the user's selections all have failed to result in successful authorization) more than a pre-specified threshold number of times, e.g., 7017, option "Yes," the pay network server may determine that the transaction must be cancelled, and generate an "authorization fail" message for the merchant server, e.g., 7018. In some implementations, if the pay network server determines that the user has timed out (and/or that the number of timeouts for the current transaction has exceed a predetermined threshold), the server may utilize a default virtual wallet card selection previously set by the user, and continue transaction processing using the default selection 7019. In some implementations, the pay network server may always use the default virtual wallet card selection of the user, and may not attempt to contact the user via the user device to obtain a user selection. It is to be understood that varying permutations and/or combinations of the features presented herein may be utilize to balance the security interest in contacting the user to obtain authorization and a custom selection of the card to utilize from the virtual wallet, against minimizing the number of times a user is contacted in order to effect a purchase transaction.

Figure 71A:
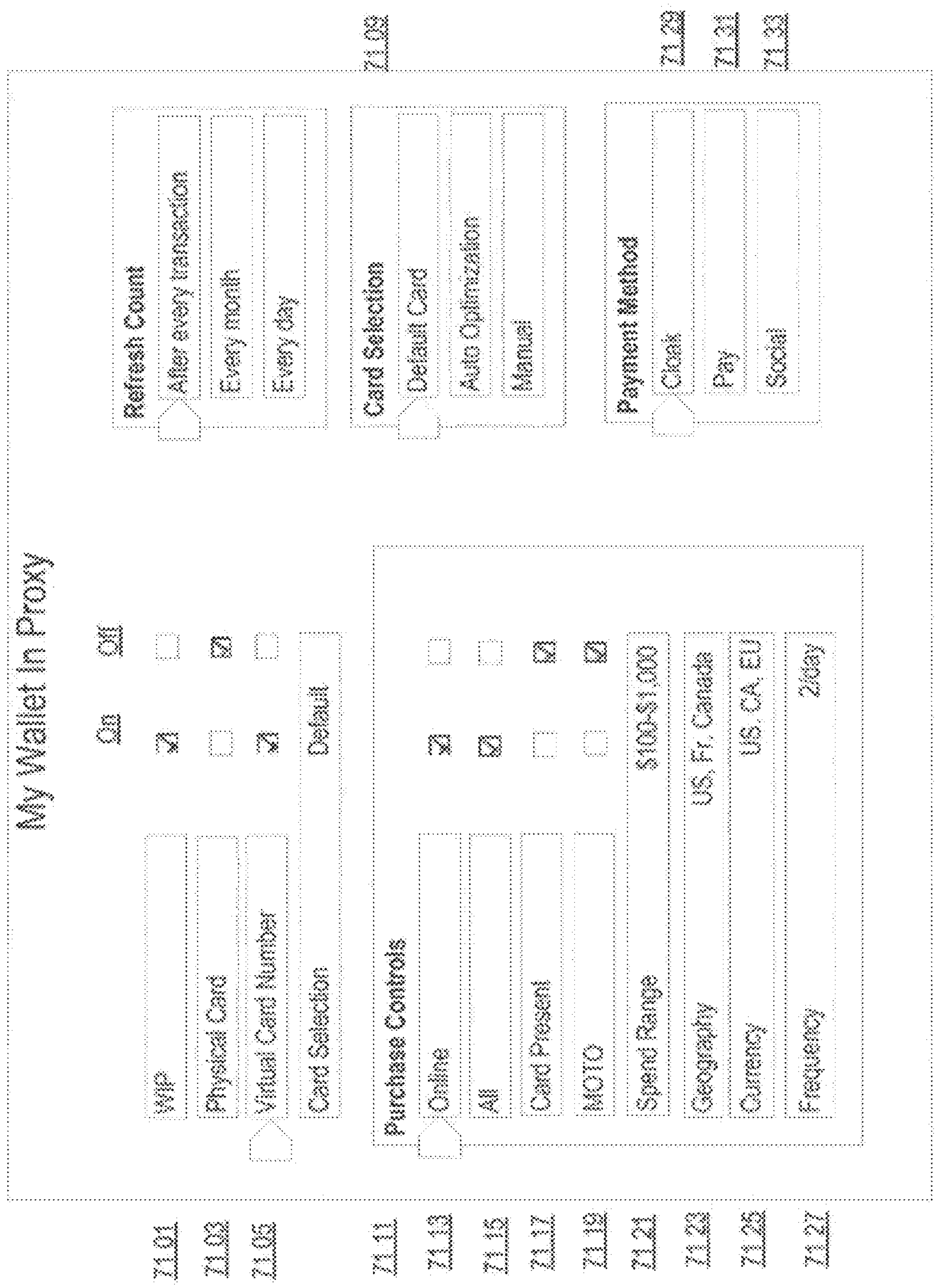
FIGS. 71A-71G show screen shot diagrams illustrating example user interface(s) of WIP applications in some embodiments of the WIP.

FIGS. 71A-71G show screen shot diagrams illustrating example user interface(s) of WIP applications in some embodiments of the WIP. With reference to FIG. 71A, in some embodiments, a WIP service user may set up WIP service preferences through a WIP user interface. The user interface may be populated through the user's mobile device and/or other electronic devices. The user may choose to turn the WIP service on or off anytime 7101. The user may choose to use a physical proxy card 7103 or a virtual card number 7105 as a proxy to their wallet account. The virtual card number may be generated after every transaction, every month, every day, and/or the like 7107. The user may also choose how the actual payment card is selected from the wallet account 7109. For example, the user may set a default card to use for transactions, or use the WIP auto optimization feature to choose the card which may maximize the user's benefits. The user may also choose to manually select the card to use. In some implementations, the user may set up various purchase controls for the WIP service 7111. For example, the user may only allow online purchase with WIP service 7113, or allow all purchases 7115. The user may set up the controls so that a physical card needs (or does not need) to be present when making purchases 7117. The user may or may not allow Mail Order And Telephone Order ("MOTO") when using WIP service 7119. The user has the option to change the settings of product category, benefit preference, spend range 7121, proximity, geography 7123, frequency 7127, overall spend, currency 7125 and/or the like.

Figure 71B:
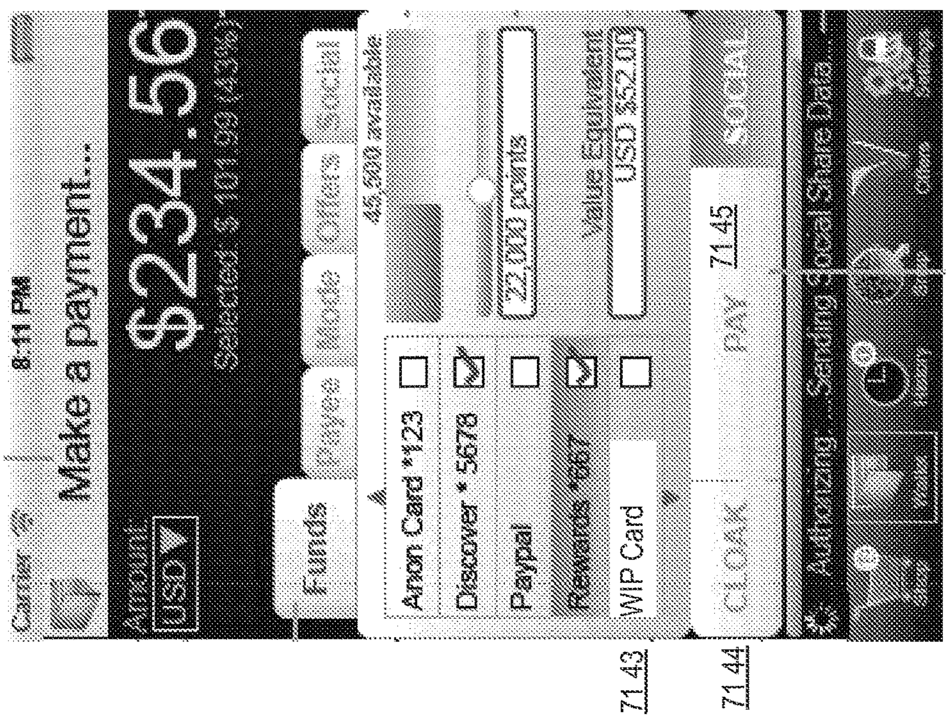

In one implementation, the user may select a secure authorization of the transaction by selecting the cloak button 7129 (and/or 7144 in FIG. 71B) to effectively cloak or anonymize some (e.g., pre-configured) or all identifying information such that when the user selects pay button 7131 (and/or 7145 in FIG. 71B), the transaction authorization is conducted in a secure and anonymous manner. In one embodiment, the cloak feature may engage the WIP to trigger the use of WIP card number, whereby a virtual proxy PAN may be used instead of providing a user identifiable PAN. In another implementation, the user may select the pay button 7131 which may use standard authorization techniques for transaction processing. In yet another implementation, when the user selects the social button 7133, a message regarding the transaction may be communicated to one of more social networks (set up by the user) which may post or announce the purchase transaction in a social forum such as a wall post or a tweet. An example screenshot of this feature is shown in FIG. 71B. As shown in FIG. 71B, the WIP proxy card may be added to the wallet account 7143 and may be selected by the user as one of the payment options. In one implementation, the user may select a social payment processing option 7142. The indicator 7141 may show the authorizing and sending social share data in progress.

Some parameters that the WIP service may support include:

Physical and Virtual: This section may allow the customer to specify if they only want to use WIP for online transactions or for all types of transaction ex: Online, Card Present, MOTO etc. The physical card may only get sent to customers who wish to use the WIP service for Card present purchases.

Refresh Count: This setting specifies how often does the wallet owner want to refresh their Virtual Credit card numbers ex: After every transaction, every month, every day and/or the like.

Disable WIP: this setting helps the customer to disable the Proxy for a specified period of time. Ex: going on vacation, and want to make sure the Wallet disables the proxy setting.

Amount: This section may allow the customer to specify the maximum amount for which they wish to use the WIP card for. This may be a security mechanism to guard the WIP from not being abused by a fraudster. Amount parameters may further be subdivided as follows:

Max and Min Amount: A user may specify the max and minimum amount for which they will use the Proxy/Virtual credit card for. Any transaction outside of this window may be denied Valid Currency: A user may specify the valid currency in which the transaction may be performed using the WIP credit card. If the user needs to modify the currency, they may have to change the settings in the user interface.

Transaction Count: Customer may set throttles such that my Proxy/Virtual Credit card should not get used more than 2 times in a day. Etc.

In some implementations, the user may not need to set all these parameters. Some of them may be set to default values.

Figure 71C:
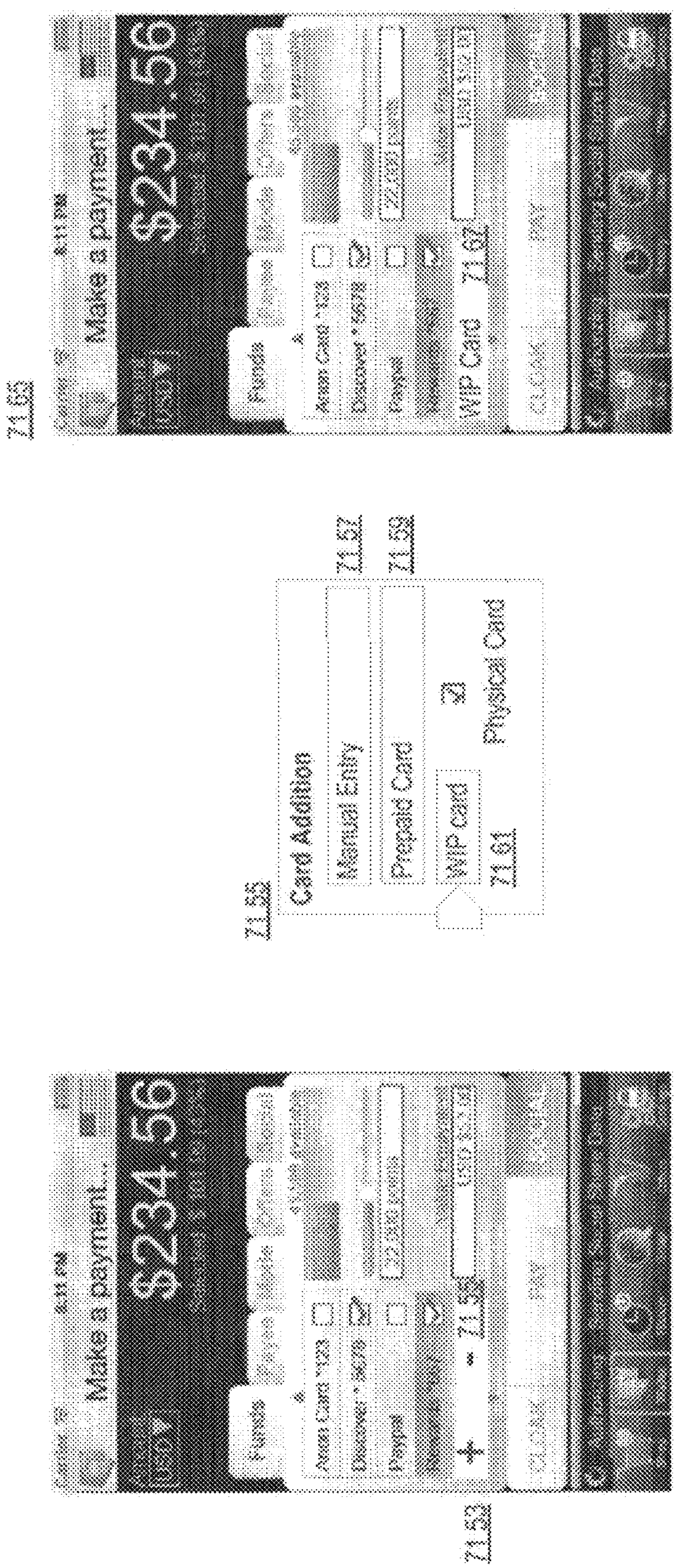

With reference to FIG. 71C, the user may go to the wallet account application to add the generated WIP card into their wallet account 7151. In some embodiments, the wallet account may store the user's other payment card information, for example, the Anon Card, Discover Card, Paypal card, and/or the like. The user may click the "add" button 7153 to add a payment card, or click the "delete" button 7155 to delete one of the stored payment cards. When the user desires to add a payment card, the user may be presented with options of how they want to add the new payment card 7155. For example, the user may manually enter the new payment card information 7157, or add a prepaid card 7159, or select the generated WIP card to add to the wallet account 7161. The user may also check the physical card box to choose to have a physical proxy card as their WIP card 7163. Once the WIP card addition step is finished, an example screenshot of the user interface is shown as 7165 with WIP card added as one of the payment options 7167. In one embodiment, the WIP card may already exist, and the "add" button may allow the user to key in the existing WIP account and add it to the wallet account. In an alternative embodiment, the add button may engage the WIP server to generate a WIP card number and advance the application to the WIP approval and addition of the WIP card, as discussed in FIG. 67.

Figure 71D:
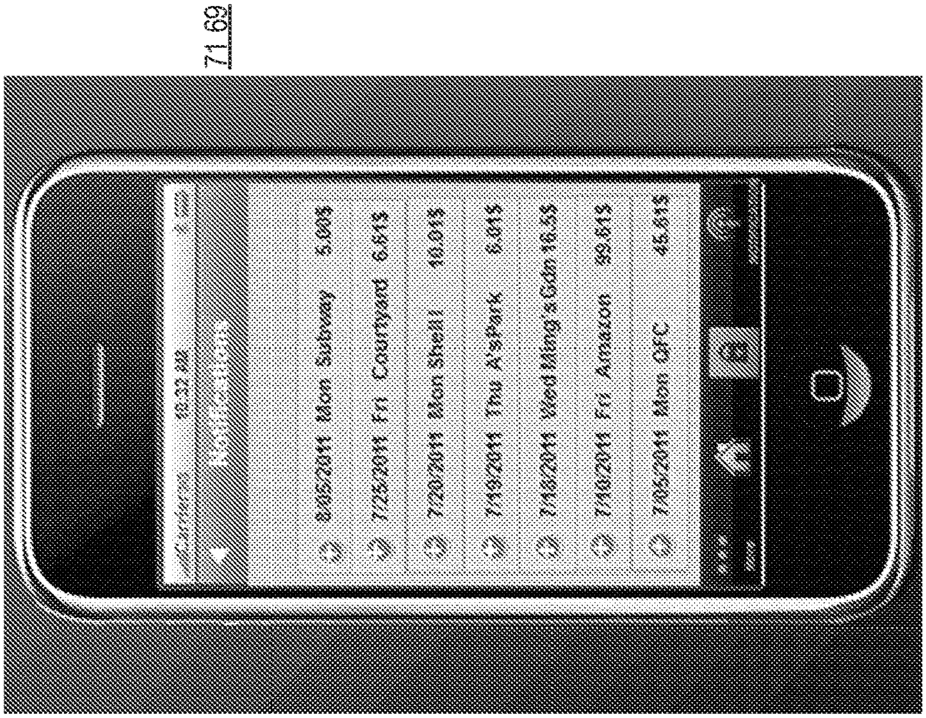

With reference to FIG. 71D, the transactions that get generated using the Proxy or the Virtual Credit Card may be notified back to the customer in the wallet. These notifications may be filtered to include all Success, all Failure or all transactions using the Proxy/Virtual card. An example of the notification page may be shown 7169.

In some embodiments of the WIP, any updates by the customer to change the WIP preferences may be updated in real-time in the WIP DB, and may be readily available to the Pay Network Server for successful transaction processing.

In some embodiments, the WIP server may determine if the card the user uses to make purchase is actually a Proxy/Virtual Card and is enrolled for WIP service. In case the reply for the above request is TRUE, the WIP server may make a subsequest call with the transaction details to validate the transaction as per the customer set WIP properties, and replace the Virtual/Proxy card with the actual Credit card details.

The CheckWIPEnrollment API call may be a blocking call. If the reply to this request is “ENROLLED”, the WIP server may make a second API call to the to replace the WIP credit card details with the Actual Credit Card details from the customer’s wallet. During this call the WIP server may verify if the transaction conforms to the customer set properties as described above and records the transaction for reporting purposes.

As a non limiting example only, an XML-API call may be used by the WIP server to verify the user’s enrollment:

-continued

```
<StatusInfo>
<TimeZone>Pacific Time Zone</TimeZone>
<DateTime>12/31/2011 10:20AM</DateTime>
<StatusInfo>
    <PersonalInfo>
      <details>
            <amount type="decimal">100.01</amount>
            <currency>USD</currency>
            <description>Product description</description>
            <email>shriabhi@example.com</email>
            <ip>10.12.27.11</ip>
      </details>
    <BillingInfo>
            <address>111 1st Street</address>
            <city>Denver</city>
            <country>US</country>
            <first_name>Abhinav</first_name>
            <last_name>Shri</last_name>
            <phone>1555555777</phone>
            <state>AL</state>
            <zip>92006</zip>
      </BillingInfo>
    </ PersonalInfo >
</Transaction>
```

As a non limiting example only, an XML-API call may be received about the actual payment instrument details:

```
<?xml version="1.0" encoding="UTF-8"?>
<Transaction>
<Status>SUCCESS</Status>
```

```
<?xml version="1.0" encoding="UTF-8"?>
<Transaction>
    <PersonalInfo>
    <payment_method_type>CreditCard</payment_method_type>
            <payment_method>
                    <exp_month>12</exp_month>
                    <exp_year>2011</exp_year>
                    <holder>Abhinav Shri</holder>
                    <number>4222222222222</number>
                    <verification_value>029</verification_value>
                <hashValue>098fdf98df0h98f09hs87df87fh67r234jl223m42df4f5fh45jd3s8a1fg
        </hashValue>
"THIS IS THE HASH OF CUSTOMER NAME AND CC NUMBER. THIS VALUE IS TO QUICKY
        LOCATE THE USER ACCOUNT IN THE COMMON SERVICE DB, AND DETERMINE IF THE
        USER IS A VALID WALLET CUSTOMER, AND IF THEY HAVE SIGNED UP FOR
        WIP SERVICE"
            </payment_method>
    </ PersonalInfo >
</Transaction>
```

As a non limiting example only, an XML-API call may be received after verifying the user’s enrollment:

```
        <Transaction>
            <enrollmentStatus>Y</type>
        <SessionToken>CXYZ1234ASD</SessionToken>
        </Transaction>
```

As a non limiting example only, an XML-API call may be used by the WIP server to get actual payment instrument details:

```
    <?xml version="1.0" encoding="UTF-8"?>
    <Transaction>
    <SessionToken>CXYZ1234ASD</SessionToken>
        <type>Sale</type>
```

-continued

```
<SessionToken>CXYZ1234ASD</SessionToken>
    <PersonalInfo>
    <payment_method_type>CreditCard</payment_method_type>
        <payment_method>
            <exp_month>12</exp_month>
            <exp_year>2013</exp_year>
            <holder>Abhinav Shri</holder>
            <number>4876543219991223</number>
            <verification_value>170</verification_value>
        <payment_method>
    </PersonalInfo >
</Transaction>
```

Figure 71E:
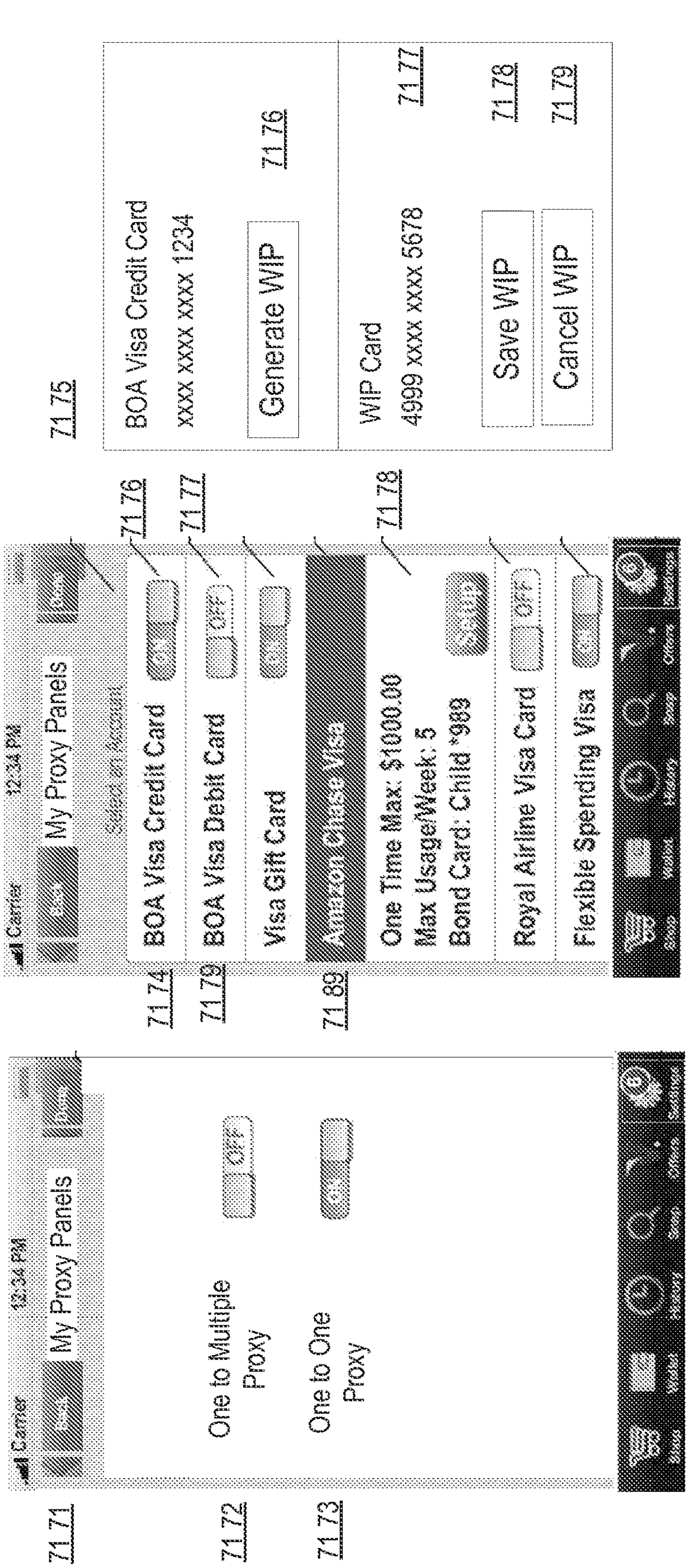

With reference to FIG. 71E, in one embodiment, the WIP may generate a proxy card or proxy virtual number for selection of a card from multiple cards in the consumer’s wallet 7172, e.g., on-to-multiple proxy. In an alternative embodiment, the WIP may generate a proxy card or proxy virtual number for each payment card in the consumer's wallet 7173, e.g., one-to-one proxy. These embodiments may be displayed and set up in the my proxy panels 7171. Take a one-to-one proxy as an example, my proxy panels list the consumer's accounts, e.g., BOA Visa Credit Card 7174, BOA Visa Debit Card 7179. You may choose to use WIP for each card or not. For example, for BOA Visa Credit Card, the consumer may choose to activate WIP feature 7176; for BOA Visa Debit Card, the consumer may choose not to activate the WIP feature 7177. The my proxy panels also allows the consumer to set up payment controls for each account 7189. The details of the payment controls are described in FIGS. 4A-4Q. Once the consumer chooses to activate the WIP feature for, a account, a WIP account with either a physical WIP card or a virtual WIP card number may be generated automatically. Alternatively, the consumer may press the button 7176 to generate the WIP account.

In one embodiment, the WIP account may be generated to contain a 16 digit Permanent Account Number ("PAN"). For example, the first digit of the WIP PAN number may be 3, 4, 5, or 6, known as the Major Industry Identifier (MII). For payment network like Visa, the first digit may be 4. Digits from two through six are the bank number. In one embodiment, the first three bank number may be assigned 999 for WIP accounts. Digits seven through twelve or seven through fifteen are the account number and digit thirteen or sixteen (depending on credit card numbers length) is the check digit 7177. Once a WIP account is generated, the consumer may choose to save the WIP 7178 or cancel the WIP 7179. In one embodiment, payment network like Visa, may open a card with the issuer to generate WIP card having such a WIP prefix, e.g., 4999, employing a prepaid cards generation mechanism having such a special WIP prefix.

Figure 71F:
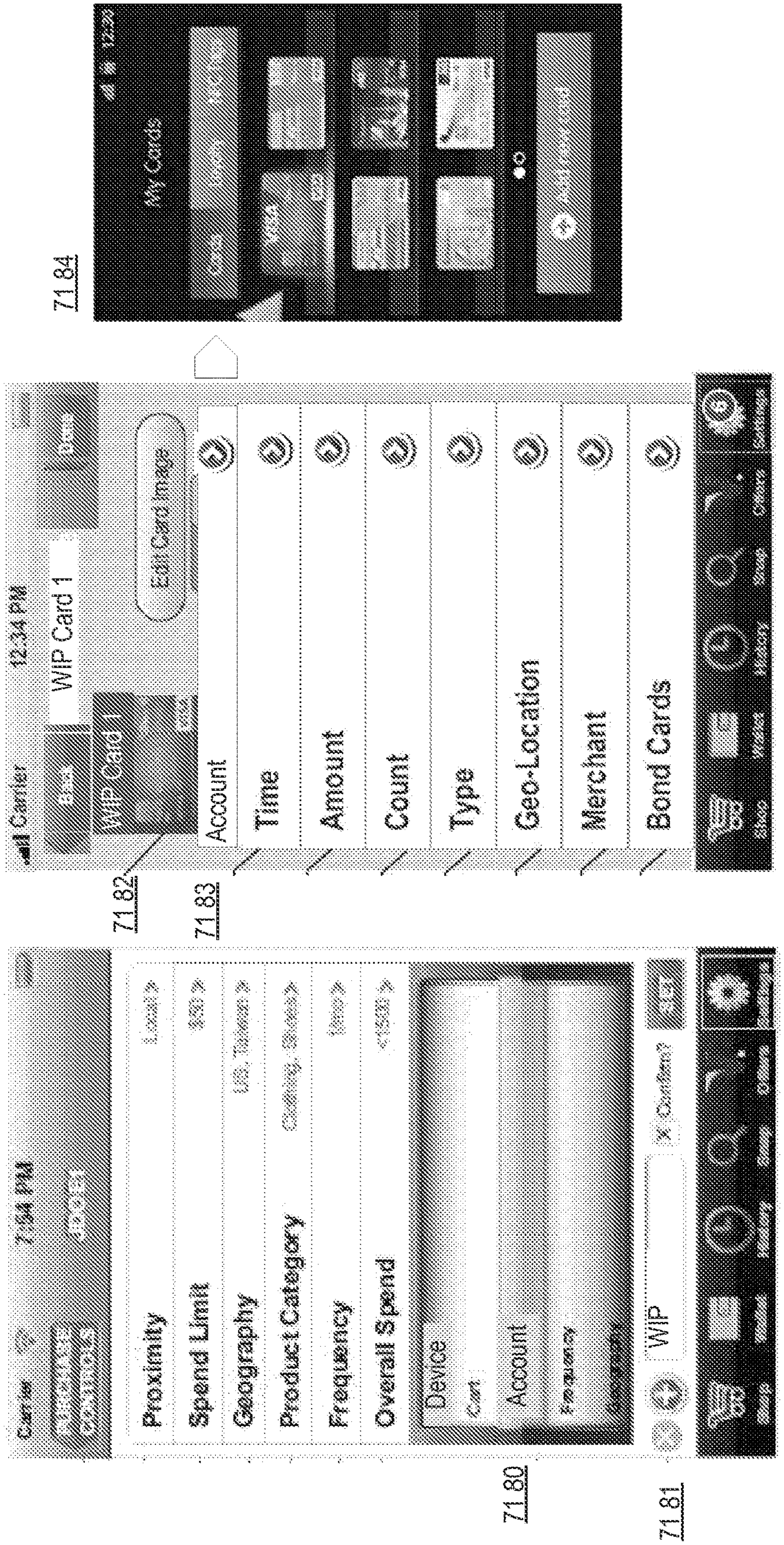

With reference to FIG. 71F, the consumer may add account 7180 via the payment controls panel. The details of the Lego-like payment control panel are described in FIGS. 21A-21C. The consumer may desire to add a WIP account 7181. The consumer may continue to set up the WIP account 7182 as in what condition this card may be used. For example, the consumer may choose to use the WIP account as a proxy to a number of payment cards 7184. The consumer may check on or off which payment cards he wants to be associated with the WIP card. As such, these additional (e.g., credit card) accounts become associated with the WIP card, and will be the accounts charged when the WIP card/account is used. When more than one account is associated with a WIP, the various other payment controls may dictate when one of these accounts is used with the WIP card/account. For example, a WIP may be set up to use a Visa Gold credit card in one geography, while using another Visa Select card in another geography through the use of multiple payment controls. In another embodiment, a heuristic may be setup to use multiple cards/accounts associated with the WIP (e.g., splitting a charge across multiple cars, round-robin charging one transaction to a first card and then charging a second transaction to the next card, etc.). The consumer may further set up additional payment controls of the WIP account. The payment controls may include time, amount, count, type, geo-location, merchant, bond cards, and/or the like as discussed throughout the disclosure.

Figure 71G:
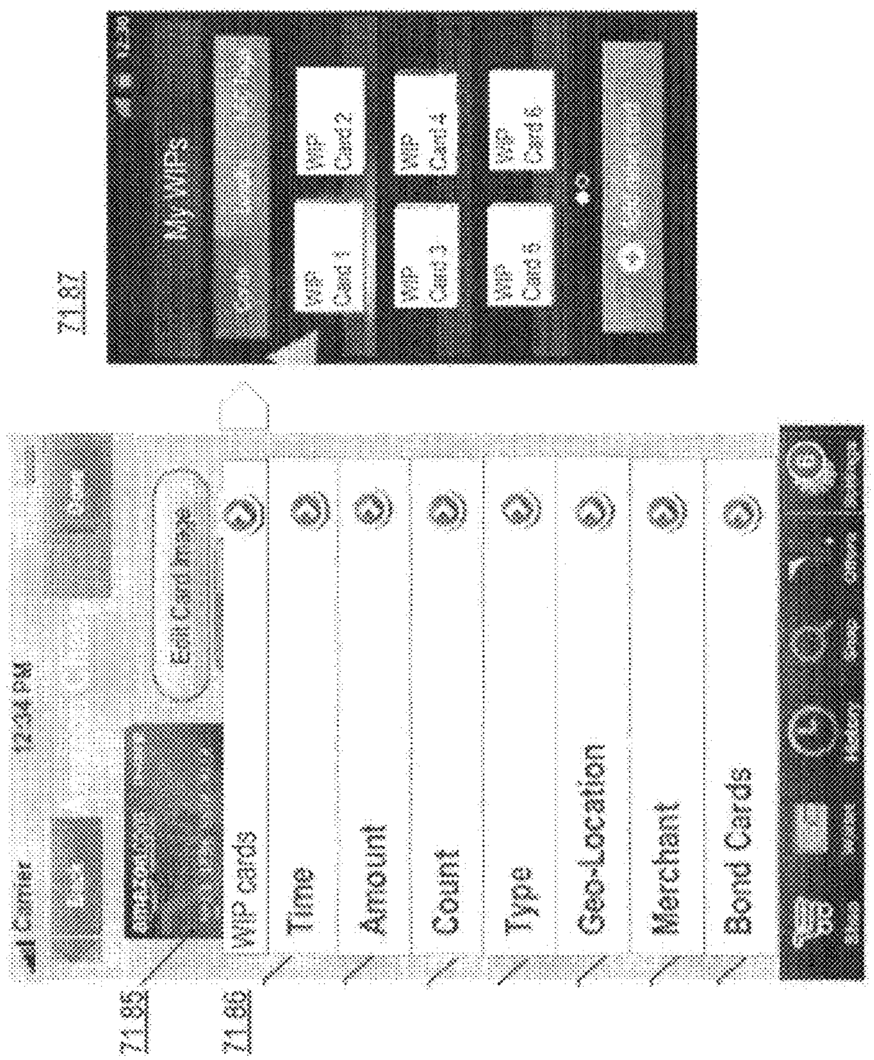

With reference FIG. 71G, the payment controls, similarly, may also be set up for each payment card. For example, for the Amazon Chase card 7185, the consumer may choose to associate one or multiple WIP cards 7186 7187 with the payment card. The consumer may choose conditions in which the Amazon Chase card may be used, or in which a WIP card may be associated with 7188.

WIP Controller

Figure 72:
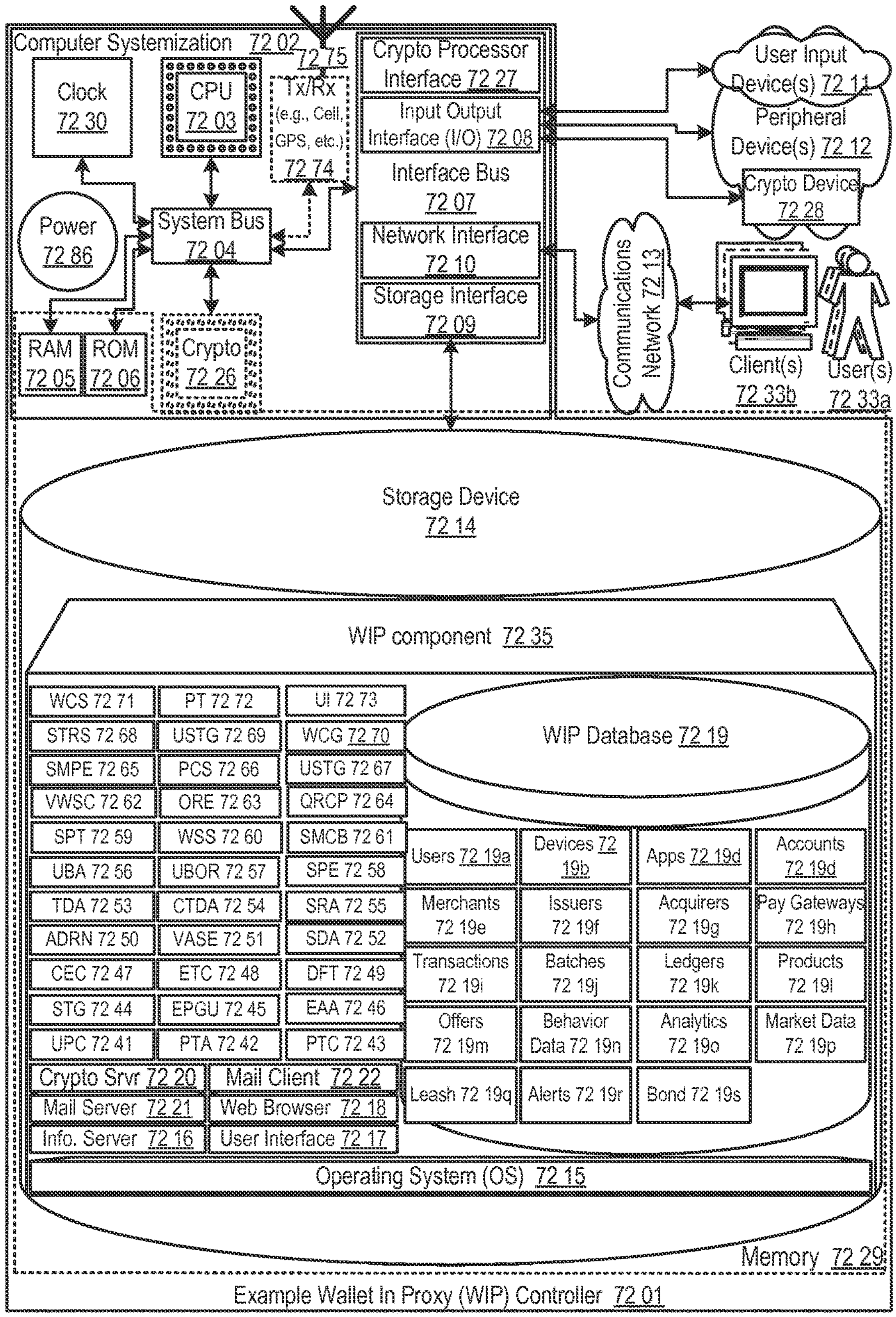
FIG. 72 shows a block diagram illustrating examples of a WIP controller.

FIG. 72 shows a block diagram illustrating examples of a WIP controller 7201. In this embodiment, the WIP controller 7201 may serve to aggregate, process, store, search, serve, identify, instruct, generate, match, and/or facilitate interactions with a computer through various technologies, and/or other related data.

Users, e.g., 7233*a*, which may be people and/or other systems, may engage information technology systems (e.g., computers) to facilitate information processing. In turn, computers employ processors to process information; such processors 7203 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 7229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the WIP controller 7201 may be connected to and/or communicate with entities such as, but not limited to: one or more users from user input devices 7211; peripheral devices 7212; an optional cryptographic processor device 7228; and/or a communications network 7213. For example, the WIP controller 7201 may be connected to and/or communicate with users, e.g., 7233*a*, operating client device(s), e.g., 7233*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The WIP controller 7201 may be based on computer systems that may comprise, but are not limited to, components such as: a computer systemization 7202 connected to memory 7229.

Computer Systemization

A computer systemization 7202 may comprise a clock 7230, central processing unit ("CPU(s)" and/or "processor(s)" (these terms are used interchangeably throughout the disclosure unless noted to the contrary)) 7203, a memory 7229 (e.g., a read only memory (ROM) 7206, a random access memory (RAM) 7205, etc.), and/or an interface bus 7207, and most frequently, although not necessarily, are all interconnected and/or communicating through a system bus 7204 on one or more (mother)board(s) 7202 having conductive and/or otherwise transportive circuit pathways through which instructions (e.g., binary encoded signals) may travel to effectuate communications, operations, storage, etc. The computer systemization may be connected to a power source 7286; e.g., optionally the power source may be internal. Optionally, a cryptographic processor 7226 and/or transceivers (e.g., ICs) 7274 may be connected to the system bus. In another embodiment, the cryptographic processor and/or transceivers may be connected as either internal and/or external peripheral devices via the interface bus I/O. In turn, the transceivers may be connected to antenna(s) 7275, thereby effectuating wireless transmission and reception of various communication and/or sensor protocols; for example the antenna(s) may connect to: a Texas Instruments WiLink WL1283 transceiver chip (e.g., providing 802.1 in, Bluetooth 3.0, FM, global positioning system (GPS) (thereby allowing WIP controller to determine its location)); Broadcom BCM4329FKUBG transceiver chip (e.g., providing 802.1 in, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc. and even specialized processing sub-units like graphics processing units, digital signal processing units, and/or the like. Additionally, processors may include internal fast access addressable memory, and be capable of mapping and addressing memory 7229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the WIP controller and beyond through various interfaces. Should processing requirements dictate a greater amount speed and/or capacity, distributed processors (e.g., Distributed WIP), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the WIP may be achieved by implementing a microcontroller such as CAST's R8051XC2 microcontroller; Intel's MCS 51 (i.e., 8051 microcontroller); and/or the like. Also, to implement certain features of the WIP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the WIP component collection (distributed or otherwise) and/or features may be implemented via the microprocessor and/or via embedded components; e.g., via ASIC, coprocessor, DSP, FPGA, and/or the like. Alternately, some implementations of the WIP may be implemented with embedded components that are configured and used to achieve a variety of features or signal processing.

Depending on the particular implementation, the embedded components may include software solutions, hardware solutions, and/or some combination of both hardware/software solutions. For example, WIP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the WIP features. A hierarchy of programmable interconnects allow logic blocks to be interconnected as needed by the WIP system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the WIP may be developed on regular FPGAs and then migrated into a fixed version that more resembles ASIC implementations. Alternate or coordinating implementations may migrate WIP controller features to a final ASIC instead of or in addition to FPGAs. Depending on the implementation all of the aforementioned embedded components and microprocessors may be considered the "CPU" and/or "processor" for the WIP.

Power Source

The power source 7286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 7286 is connected to at least one of the interconnected subsequent components of the WIP thereby providing an electric current to all their interconnected components. In one example, the power source 7286 is connected to the system bus component 7204. In an alternative embodiment, an outside power source 7286 is provided through a connection across the I/O 7208 interface. For example, a USB and/or IEEE 1394 connection carries both data and power across the connection and is therefore a suitable source of power.

Interface Adapters

Interface bus(ses) 7207 may accept, connect, and/or communicate to a number of interface adapters, frequently, although not necessarily in the form of adapter cards, such as but not limited to: input output interfaces (I/O) 7208, storage interfaces 7209, network interfaces 7210, and/or the like. Optionally, cryptographic processor interfaces 7227 similarly may be connected to the interface bus. The interface bus provides for the communications of interface adapters with one another as well as with other components of the computer systemization. Interface adapters are adapted for a compatible interface bus. Interface adapters may connect to the interface bus via an expansion and/or slot architecture. Various expansion and/or slot architectures that be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 7209 may accept, communicate, and/or connect to a number of storage devices such as, but not limited to: storage devices 7214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 7210 may accept, communicate, and/or connect to a communications network 7213. Through a communications network 7213, the WIP controller is accessible through remote clients **7233*b* (e.g., computers with web browsers) by users 7233*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed WIP), architectures may similarly be employed to pool, load balance, and/or otherwise increase the communicative bandwidth required by the WIP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 7210 may be used to engage with various communications network types 7213**. For example, multiple network interfaces may be employed to allow for the communication over broadcast, multicast, and/or unicast networks.

Input Output interfaces (I/O) 7208 may accept, communicate, and/or connect to user input devices 7211, peripheral devices 7212, cryptographic processor devices 7228, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 7211 often are a type of peripheral device 7212 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 7212 may be connected and/or communicate to I/O and/or other facilities of the like such as network interfaces, storage interfaces, directly to the interface bus, system bus, the CPU, and/or the like. Peripheral devices may be external, internal and/or part of the WIP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 7228), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the WIP controller may be embodied as an embedded, dedicated, and/or monitor-less (i.e., headless) device, wherein access would be provided over a network interface connection.

Cryptographic units such as, but not limited to, microcontrollers, processors 7226, interfaces 7227, and/or devices 7228 may be attached, and/or communicate with the WIP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard);/(e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 7229. However, memory is a fungible technology and resource, thus, any number of memory embodiments may be employed in lieu of or in concert with one another. It is to be understood that the WIP controller and/or a computer systemization may employ various forms of memory 7229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 7229 will include ROM 7206, RAM 7205, and a storage device 7214. A storage device 7214 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 7229 may contain a collection of program and/or database components and/or data such as, but not limited to: operating system component(s) 7215 (operating system); information server component(s) 7216 (information server); user interface component(s) 7217 (user interface); Web browser component(s) 7218 (Web browser); database(s) 7219; mail server component(s) 7221; mail client component(s) 7222; cryptographic server component(s) 7220 (cryptographic server); the WIP component(s) 7235; Wallet Card Generation 7241; Wallet Card Selection 7242; Purchase Transaction 7243; WIP User Interface 7244; and/or the like (i.e., collectively a component collection). These components may be stored and accessed from the storage devices and/or from storage devices accessible through an interface bus. Although non-conventional program components such as those in the component collection, may be stored in a local storage device 7214, they may also be loaded and/or stored in memory such as: peripheral devices, RAM, remote storage facilities through a communications network, ROM, various forms of memory, and/or the like.

Operating System

The operating system component 7215 is an executable program component facilitating the operation of the WIP controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the WIP controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the WIP controller to communicate with other entities through a communications network 7213. Various communication protocols may be used by the WIP controller as a subcarrier transport mechanism for interaction, such as, but not limited to: multicast, TCP/IP, UDP, unicast, and/or the like.

Information Server

An information server component 7216 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the WIP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the WIP database 7219, operating systems, other program components, user interfaces, Web browsers, and/or the like.

Access to the WIP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the WIP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the WIP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 7217 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 7218 is a stored program component that is executed by a CPU. The Web browser may be a hypertext viewing application such as Google's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the WIP equipped nodes. The combined application may be nugatory on systems employing standard Web browsers.

Mail Server

A mail server component 7221 is a stored program component that is executed by a CPU 7203. The mail server may be an Internet mail server such as, but not limited to Apple's Mail Server (3), dovecot, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the WIP.

Access to the WIP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 7222 is a stored program component that is executed by a CPU 7203. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 7220 is a stored program component that is executed by a CPU 7203, cryptographic processor 7226, cryptographic processor interface 7227, cryptographic processor device 7228, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the WIP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the WIP component to engage in secure transactions if so desired. The cryptographic component facilitates the secure accessing of resources on the WIP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The WIP Database

The WIP database component 7219 may be embodied in a database and its stored data. The database is a stored program component, which is executed by the CPU; the stored program component portion configuring the CPU to process the stored data. The database may be any of a number of fault tolerant, relational, scalable, secure database such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the WIP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the WIP database is implemented as a data-structure, the use of the WIP database 7219 may be integrated into another component such as the WIP component 7235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 7219 includes several tables 7219*a-s*. A Users table 7219*a* may include fields such as, but not limited to: user_id, ssn, dob, first_name, last_name, age, state, address_firstline, address_secondline, zipcode, devices_list, contact_info, contact_type, alt_contact_info, alt_contact_type, linked_wallets_list, wallet_id, WIP_enrollment, WIP_preference_rules_list, and/or the like. The Users table may support and/or track multiple entity accounts on a WIP. A Devices table 7219*b* may include fields such as, but not limited to: device_ID, device_name, device_IP, device_MAC, device_type, device_model, device_version, device_OS, device_apps_list, device_securekey, wallet_app_installed_flag, and/or the like. An Apps table 7219*c* may include fields such as, but not limited to: app_ID, app_name, app_type, app_dependencies, and/or the like. An Accounts table 7219*d* may include fields such as, but not limited to: account_number, account_security_code, account_name, issuer_acquirer_flag, issuer_name, acquirer_name, account_address, routing_number, access_API_call, linked_wallets_list, wallet_id, and/or the like. A Merchants table 7219*e* may include fields such as, but not limited to: merchant_id, merchant_name, merchant_address, ip_address, mac_address, auth_key, port_num, security_settings_list, and/or the like. An Issuers table 7219*f* may include fields such as, but not limited to: issuer_id, issuer_name, issuer_address, ip_address, mac_address, auth_key, port_num, security_settings_list, and/or the like. An Acquirers table 7219*g* may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 7219*h* may include fields such as, but not limited to: gateway_ID, gateway_IP, gateway_MAC, gateway_secure_key, gateway_access_list, gateway_API_call_list, gateway_services_list, and/or the like. A Transactions table 7219*i* may include fields such as, but not limited to: order_id, user_id, timestamp, transaction_cost, purchase_ details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 7219*j* may include fields such as, but not limited to: batch_id, transaction_id_list, timestamp_list, cleared_flag_list, clearance_trigger_settings, and/or the like. A Ledgers table 7219*k* may include fields such as, but not limited to: request_id, timestamp, deposit_amount, batch_id, transaction_id, clear_flag, deposit_account, transaction_summary, payor_name, payor_account, and/or the like. A Products table 7219*l* may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 7219*m* may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 7219*n* may include fields such as, but not limited to: user_id, timestamp, activity_type, activity_location, activity_attribute_list, activity_attribute_values_list, and/or the like. An Analytics table 7219*o* may include fields such as, but not limited to: report_id, user_id, report_type, report_algorithm_id, report_destination_address, and/or the like. A Market Data table 7219*p* may include fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. A Leash table 7219*q* may include fields such as, but not limited to: user_id, device_id, account_id, account_no, account_routing, account_name, account_alias, leash_type, leash_time_start, leash_time_end, leash_item_type, leash_max_amount, leash_max_count, leash_merchant, leash_geo, and/or the like. An alert table 7219*r* may include fields such as, but not limited to: alert_id, alert_user_id, alert_time, alert_transaction_id, alert_transaction_time, alert_transaction_item, alert_transaction_amount, alert_reason, and/or the like. A Bond card table 72195 may include fields such as, but not limited to: bond_id, bond_card_no, bond_type, bond_holder_name, bond authorization, bond_leash_parameters, and/or the like.

In one embodiment, the WIP database may interact with other database systems. For example, employing a distributed database system, queries and data access by search WIP component may treat the combination of the WIP database, an integrated data security layer database as a single database entity.

In one embodiment, user programs may contain various user interface primitives, which may serve to update the WIP. Also, various accounts may require custom database tables depending upon the environments and the types of clients the WIP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 7219*a-s*. The WIP may be configured to keep track of various settings, inputs, and parameters via database controllers.

The WIP database may communicate to and/or with other components in a component collection, including itself, and/or facilities of the like. Most frequently, the WIP database communicates with the WIP component, other program components, and/or the like. The database may contain, retain, and provide information regarding other nodes and data.

The WIPs

The WIP component 7235 is a stored program component that is executed by a CPU. In one embodiment, the WIP component incorporates any and/or all combinations of the aspects of the WIP discussed in the previous figures. As such, the WIP affects accessing, obtaining and the provision of information, services, transactions, and/or the like across various communications networks.

The WIP component may transform touchscreen inputs into a virtual wallet mobile application interface including consumer configured payment control parameters (e.g., 205 in FIG. 2A, etc.) via WIP components into transaction completion notices and/or alerts (e.g., 223 in FIG. 2A), and/or the like and use of the WIP. In one embodiment, the WIP component 6635 takes inputs (e.g., checkout request 6011; product data 6015; wallet access input 6211; transaction authorization input 6214; payment gateway address 6218; payment network address 6222; issuer server address(es) 6225; funds authorization request(s) 6226; user(s) account(s) data 6228; batch data 6412; payment network address 6416; issuer server address(es) 6424; individual payment request 6425; payment ledger, merchant account data 6431; wallet in proxy card generation requests and purchase inputs; and/or the like) etc., and transforms the inputs via various components (e.g., UPC 7241; PTA 7242; PTC 7243; STG 7244; EPGU 7245; EAA 7246; CEC 7247; ETC 7248; DFR 7249; ADRN 7250; VASE 7251; SDA 7252; TDA 7253; CTDA 7254; SRA 7255; UBA 7256; UBOR 7257; SPE 7258; SPT 7259; WSS 7260; SMCB 7261; VWSC 7262; ORE 7263; QRCP 7264; SMPE 7265; PCS 7266; UST 7267; STRS 7268; USTG 7269; Wallet Card Generation ("WCG") 7270; Wallet Card Selection ("WCS") 7271; Purchase Transaction ("PT") 7272; WIP User Interface ("UI") 7273; and/or the like), into outputs (e.g., checkout request message 6013; checkout data 6017; card authorization request 6216, 6223; funds authorization response(s) 6230; transaction authorization response 6232; batch append data 6234; purchase receipt 6235; batch clearance request 6414; batch payment request 6418; transaction data 6420; individual payment confirmation 6428, 6429; updated payment ledger, merchant account data 6433; WIP card generation message 6740; Wallet card selection request 6922; purchase transaction completion message 6926 and/or the like).

The WIP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the WIP server employs a cryptographic server to encrypt and decrypt communications. The WIP component may communicate to and/or with other components in a component collection, including itself, and/or facilities of the like. Most frequently, the WIP component communicates with the WIP database, operating systems, other program components, and/or the like. The WIP may contain, communicate, generate, obtain, and/or provide program component, system, user, and/or data communications, requests, and/or responses.

Distributed WIPs

The structure and/or operation of any of the WIP node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the WIP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

```
w3c -post http://... Value1
```

where Value1 is discerned as being a parameter because "http://" is part of the grammar syntax, and what follows is considered part of the post value. Similarly, with such a grammar, a variable "Values" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the WIP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein.

In order to address various issues and advance the art, the entirety of this application for MULTI-PURPOSE VIRTUAL CARD TRANSACTION APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows, by way of illustration, various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components, and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like also are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a WIP individual and/or enterprise user, database configuration and/or relational model, data type, data transmission and/or network framework, syntax structure, and/or the like, various embodiments of the WIP may be implemented that allow a great deal of flexibility and customization. For example, aspects of the WIP may be adapted for fraud prevention, online/virtual shopping, online financial management; and/or the like. While various embodiments and discussions of the WIP have been directed to electronic purchase transactions, however, it is to be understood that the embodiments described herein may be readily configured and/or customized for a wide variety of other applications and/or implementations.

What is claimed is:

1. A method comprising:

receiving a proxy payment identifier, by a point of sale terminal from a client device comprising a first digital wallet storing the proxy payment identifier for a transaction, wherein the proxy payment identifier is valid for only the transaction;

receiving, by a server computer, an authorization request comprising the proxy payment identifier for the transaction from the point of sale terminal via a merchant server;

determining that the proxy payment identifier is associated with a second digital wallet;

obtaining, by the server computer, accounts associated with the second digital wallet;

presenting, by the server computer, the accounts to the client device over a communication network, wherein the client device displays the accounts to a user via a user interface, and starting a timer for a user response;

receiving, by the server computer from the client device over the communication network, a selection of an account from the accounts associated with the second digital wallet;

after receiving the selected account and after determining that an elapsed time of the timer does not exceed a predetermined threshold, processing, by the server computer, the transaction using a payment identifier associated with the account in the second digital wallet by replacing the proxy payment identifier in the authorization request with the payment identifier;

generating, by a wallet server computer in communication with the server computer, a purchase identifier encoded in a QR Code on a purchase receipt;

transmitting, by the wallet server computer, the purchase identifier encoded in the QR Code on the purchase receipt to the client device, wherein purchase identifier on the purchase receipt provides proof that the transaction was authorized; and reading, by a merchant device, the purchase receipt and then allowing the user to exit the store.

2. The method of claim 1, wherein the client device is a mobile phone.

3. The method of claim 1, wherein the client device generated the proxy payment identifier.

4. The method of claim 3, wherein the client device is a mobile phone.

5. The method of claim 1, wherein the first digital wallet stores a credit card, prepaid card, and a debit card of the user of the client device.

6. The method of claim 1, wherein the point of sale terminal does not support transactions using the first digital wallet.

7. The method of claim 1, wherein the point of sale terminal comprises a payment card reader.

8. The method of claim 1, wherein the proxy payment identifier is generated by the server computer.

9. The method of claim 8, wherein the proxy payment identifier is transmitted from the server computer to the client device.

10. The method of claim 8, wherein the server computer automatically selects the account associated with the second digital wallet for payment processing if the user does not select the account.

11. The method of claim 10, wherein the second digital wallet comprises a plurality of payment accounts.

12. The method of claim 1, further comprising:

transmitting an authorization message comprising the payment identifier to an issuer.

13. The method of claim 1, wherein the payment identifier is a debit card number.

14. A system comprising:

a point of sale terminal comprising a first processor and a first non-transitory computer readable medium comprising code, executable by the first processor to perform operations including receiving a proxy payment identifier from a client device comprising a first digital wallet storing the proxy payment identifier for a transaction, wherein the proxy payment identifier is valid for only the transaction;

a server computer comprising a second processor, and a second non-transitory computer readable medium comprising code, executable by the second processor to implement a method comprising: receiving an authorization request comprising the proxy payment identifier for the transaction from the point of sale terminal via a merchant server, determining that the proxy payment identifier is associated with a second digital wallet, obtaining accounts associated with the second digital wallet, presenting the accounts to the client device over a communication network, wherein the client device displays the accounts to a user via a user interface, and starting a timer for a user response, receiving, from the client device over the communication network, a selection of an account from the accounts associated with the second digital wallet, after receiving the selected account and after determining that an elapsed time of the timer does not exceed a predetermined threshold, processing the transaction using a payment identifier associated with the account in the second digital wallet by replacing the proxy payment identifier in the authorization request with the payment identifier;

a wallet server computer in communication with the server computer, the wallet server computer comprising a third processor and a third non-transitory computer readable medium comprising code executable by the third processor to perform operations comprising generating a purchase identifier encoded in a QR Code on a purchase receipt, and transmitting the purchase identifier encoded in the QR Code on the purchase receipt to the client device;

the client device; and a merchant device comprising a fourth processor and a fourth non-transitory computer readable medium comprising code executable by the fourth processor to perform operations comprising reading the purchase receipt and then allowing the user to exit the store.

* * * * *